US007225249B1

(12) United States Patent
Barry et al.

(10) Patent No.: US 7,225,249 B1
(45) Date of Patent: May 29, 2007

(54) INTEGRATED SYSTEMS FOR PROVIDING COMMUNICATIONS NETWORK MANAGEMENT SERVICES AND INTERACTIVE GENERATING INVOICE DOCUMENTS

(75) Inventors: B. Reilly Barry, Colorado Springs, CO (US); Mark A. Chodoronek, Centreville, VA (US); Eric DeRose, Falls Church, VA (US); Mark N. Gonzales, Manassas, VA (US); Angela R. James, Chevy Chase, MD (US); Lynne Levy, Herndon, VA (US); Michael Tusa, Ridgefield, CT (US)

(73) Assignee: MCI, LLC, Basking Ridge, NJ (US)

( * ) Notice: Subject to any disclaimer, the term of this patent is extended or adjusted under 35 U.S.C. 154(b) by 0 days.

(21) Appl. No.: 09/159,695

(22) Filed: Sep. 24, 1998

Related U.S. Application Data

(60) Provisional application No. 60/060,655, filed on Sep. 26, 1997.

(51) Int. Cl.

| | |
|---|---|
| ***G06F 15/173*** | (2006.01) |
| ***G06F 15/16*** | (2006.01) |
| ***G09G 5/00*** | (2006.01) |
| ***H04M 15/00*** | (2006.01) |

(52) U.S. Cl. ....................... 709/224; 709/223; 709/225; 709/229; 345/156; 379/111; 379/112; 379/140

(58) Field of Classification Search ................. 709/217, 709/203, 303, 224, 227, 229; 707/501, 513; 345/335, 329, 369, 356, 357
See application file for complete search history.

(56) References Cited

U.S. PATENT DOCUMENTS

| | | |
|---|---|---|
| 4,160,129 A | 7/1979 | Peyser et al. |
| 4,345,315 A | 8/1982 | Cadotte et al. |
| 4,817,050 A | 3/1989 | Komatsu et al. |

(Continued)

FOREIGN PATENT DOCUMENTS

| | | |
|---|---|---|
| EP | 0 747 841 | 12/1996 |
| EP | 0 809 387 A2 | 5/1997 |
| JP | 09064870 A | 3/1997 |
| WO | WO97/11443 | 3/1997 |
| WO | WO 97/16911 | 5/1997 |
| WO | 97/18515 | 5/1997 |
| WO | WO 97/23988 | 7/1997 |
| WO | WO 98/19472 | 5/1998 |
| WO | WO 99/01826 | 1/1999 |
| WO | 00/11573 | 3/2000 |

OTHER PUBLICATIONS

*Computer Networks,* Andrew S. Tanenbaum, pp. 410–412.
"XIIR6.3 (Broadway) Overview", http://www.x.org/broadway.htm.
"Stac Unveils Windows NT 4.0 and Web Browser Support in New ReachOut 7" http://www.stac.com/news/pressrel/pr_ro7_unveil.html.
Briggs, M.m "Help for the Web enhances customer support, reduces help desk load" *Inforworld*, Jun. 16, 1997, v. 19, No. 24, pp. 82.

(Continued)

*Primary Examiner*—Bunjob Jaroenchonwanit
*Assistant Examiner*—Ramsey Refai

(57) ABSTRACT

A integrated customer interface for providing telecommunications management to a customer at a browser involves a web server and a client application. The web server manages a client session supports communication of request messages received from the browser to a network management resource. The client application is integrated for use within the browser, downloadable from the web server in accordance with a predetermined customer entitlement, and programmed to be in interactive communications with the network management resource.

68 Claims, 125 Drawing Sheets

U.S. PATENT DOCUMENTS 4,823,373 A 4/1989 Takahashi et al.
4,893,248 A 1/1990 Pitts et al.
4,972,504 A 11/1990 Daniel, Jr. et al.
5,041,972 A 8/1991 Frost
5,075,771 A 12/1991 Hashimoto
5,131,020 A 7/1992 Liebesny et al.
5,136,707 A 8/1992 Block et al.
5,223,699 A 6/1993 Flynn et al.
5,228,076 A 7/1993 Hopner et al.
5,245,533 A 9/1993 Marshall
5,262,760 A 11/1993 Iwamura et al.
5,285,494 A 2/1994 Sprecher et al.
5,313,598 A 5/1994 Yamakawa
5,315,093 A 5/1994 Stewart
5,327,486 A 7/1994 Wolff et al.
5,361,259 A 11/1994 Hunt et al.
5,369,571 A 11/1994 Metts
5,452,446 A 9/1995 Johnson
5,475,836 A 12/1995 Harris et al.
5,481,542 A 1/1996 Logston et al.
5,483,596 A 1/1996 Rosenow et al.
5,490,060 A 2/1996 Malec et al.
5,491,779 A 2/1996 Bezjian
5,491,796 A 2/1996 Wanderer et al.
5,506,893 A 4/1996 Buscher et al.
5,526,257 A 6/1996 Lerner
5,530,744 A 6/1996 Charalambous et al.
5,533,108 A 7/1996 Harris et al.
5,537,611 A 7/1996 Rajagopal et al.
5,539,734 A 7/1996 Burwell et al.
5,548,726 A 8/1996 Pettus
5,551,025 A 8/1996 O'Reilly et al.
5,555,290 A 9/1996 McLeod et al.
5,563,805 A 10/1996 Arbuckle et al.
5,566,351 A 10/1996 Crittenden et al.
5,586,260 A 12/1996 Hu
5,602,918 A 2/1997 Chen et al.
5,610,915 A 3/1997 Elliott et al.
5,621,727 A 4/1997 Vaudreuil
5,623,601 A 4/1997 Vu
5,630,066 A 5/1997 Gosling
5,649,182 A 7/1997 Reitz
5,650,994 A 7/1997 Daley
5,659,601 A 8/1997 Cheslog
5,666,481 A 9/1997 Lewis
5,671,354 A 9/1997 Ito et al.
5,689,645 A 11/1997 Schettler et al.
5,692,030 A 11/1997 Teglovic et al.
5,692,181 A 11/1997 Anand et al.
5,694,546 A 12/1997 Reisman
5,699,403 A 12/1997 Ronnen
5,699,528 A 12/1997 Hogan
5,706,502 A 1/1998 Foley et al.
5,708,780 A 1/1998 Levergood et al.
5,710,882 A 1/1998 Svennevik et al.
5,721,913 A 2/1998 Ackroff et al.
5,727,129 A 3/1998 Barrett et al.
5,734,709 A 3/1998 DeWitt et al.
5,734,831 A 3/1998 Sanders
5,742,762 A 4/1998 Scholl et al.
5,742,763 A * 4/1998 Jones ........................ 709/317
5,742,768 A 4/1998 Gennaro et al.
5,742,905 A 4/1998 Pepe et al.
5,745,754 A 4/1998 Lagarde et al.
5,754,830 A 5/1998 Butts et al.
5,757,900 A 5/1998 Nagel et al.
5,764,756 A 6/1998 Onweller
5,768,501 A 6/1998 Lewis
5,774,660 A 6/1998 Brendel et al.
5,778,178 A 7/1998 Arunachalam
5,778,377 A 7/1998 Marlin et al.
5,781,550 A 7/1998 Templin et al.
5,787,160 A 7/1998 Chaney et al.
5,787,412 A 7/1998 Bosch et al.
5,790,780 A 8/1998 Brichta et al.
5,790,789 A 8/1998 Suarez
5,790,797 A 8/1998 Shimada et al.
5,790,809 A 8/1998 Holmes
5,793,762 A 8/1998 Penners et al.
5,793,964 A 8/1998 Rogers et al.
5,796,393 A 8/1998 MacNaughton et al.
5,799,154 A 8/1998 Kuriyan
5,802,320 A 9/1998 Baehr et al.
5,805,803 A 9/1998 Birrell et al.
5,812,533 A 9/1998 Cox et al.
5,812,654 A 9/1998 Anderson et al.
5,812,750 A 9/1998 Dev et al.
5,815,080 A 9/1998 Taguchi
5,815,665 A 9/1998 Teper et al.
5,819,225 A 10/1998 Eastwood et al.
5,819,271 A 10/1998 Mahoney et al.
5,825,769 A * 10/1998 O'Reilly et al. ............ 370/360
5,825,890 A 10/1998 Elgamal et al.
5,826,029 A 10/1998 Gore, Jr. et al.
5,826,269 A 10/1998 Hussey
5,832,519 A 11/1998 Bowen et al.
5,835,084 A 11/1998 Bailey et al.
5,844,896 A 12/1998 Marks et al.
5,845,067 A 12/1998 Porter et al.
5,845,267 A 12/1998 Ronen
5,848,233 A * 12/1998 Radia et al. ............. 39/181.01
5,848,396 A 12/1998 Gerace
5,848,399 A 12/1998 Burke
5,850,517 A 12/1998 Verkler et al.
5,852,810 A 12/1998 Sotiroff et al.
5,852,812 A 12/1998 Reeder
5,862,325 A 1/1999 Reed et al.
5,867,495 A 2/1999 Elliott et al.
5,870,558 A * 2/1999 Branton et al. ............. 709/224
5,875,236 A 2/1999 Jankowitz et al.
5,875,296 A 2/1999 Shi et al.
5,877,759 A 3/1999 Bauer
5,881,237 A 3/1999 Schwaller et al.
5,883,948 A 3/1999 Dunn
5,884,032 A 3/1999 Bateman et al.
5,884,312 A 3/1999 Dustan et al.
5,892,900 A * 4/1999 Ginter et al. ............... 395/186
5,907,681 A 5/1999 Bates et al.
5,909,679 A 6/1999 Hall
5,909,682 A 6/1999 Cowan et al.
5,915,001 A 6/1999 Uppaluru
5,920,542 A 7/1999 Henderson
5,923,016 A 7/1999 Fredregill et al.
5,923,756 A 7/1999 Shambroom
5,930,764 A 7/1999 Melchione et al.
5,930,804 A * 7/1999 Yu et al. ..................... 707/104
5,933,142 A 8/1999 LaStrange et al.
5,937,165 A 8/1999 Schwaller et al.
5,938,729 A 8/1999 Cote et al.
5,949,976 A 9/1999 Chappelle
5,953,389 A 9/1999 Pruett et al.
5,956,714 A 9/1999 Condon
5,958,016 A * 9/1999 Chang et al. ............... 709/229
5,960,411 A 9/1999 Hartman et al.
5,961,602 A 10/1999 Thompson et al.
5,963,925 A 10/1999 Kolling et al.
5,966,695 A 10/1999 Melchione et al.
5,970,467 A 10/1999 Alavi
5,974,396 A 10/1999 Anderson et al.
5,974,441 A 10/1999 Rogers et al.
5,982,864 A 11/1999 Jagadish et al.

| | | | | | |
|---|---|---|---|---|---|
| 5,982,891 | A | | 11/1999 | Ginter et al. | |
| 5,983,350 | A | | 11/1999 | Minear et al. | |
| 5,987,134 | A | | 11/1999 | Shin et al. | |
| 5,991,733 | A | | 11/1999 | Aleia et al. | |
| 5,991,746 | A | | 11/1999 | Wang | |
| 5,991,806 | A | | 11/1999 | McHann, Jr. | |
| 5,995,948 | A | | 11/1999 | Whitford et al. | |
| 5,999,525 | A | | 12/1999 | Krishnaswamy et al. | |
| 5,999,965 | A | | 12/1999 | Kelly | |
| 5,999,972 | A | | 12/1999 | Gish | |
| 5,999,973 | A | | 12/1999 | Glitho et al. | |
| 6,003,079 | A | | 12/1999 | Friedrich et al. | |
| 6,006,265 | A | | 12/1999 | Rangan et al. | |
| 6,011,844 | A | | 1/2000 | Uppaluru et al. | |
| 6,012,090 | A | * | 1/2000 | Chung et al. | 709/219 |
| 6,014,647 | A | | 1/2000 | Nizzari et al. | |
| 6,014,702 | A | | 1/2000 | King et al. | |
| 6,018,768 | A | | 1/2000 | Ullman et al. | |
| 6,021,409 | A | | 2/2000 | Burrows | |
| 6,023,762 | A | | 2/2000 | Dean et al. | |
| 6,029,182 | A | | 2/2000 | Nehab et al. | |
| 6,031,904 | A | | 2/2000 | An et al. | |
| 6,032,132 | A | | 2/2000 | Nelson | |
| 6,032,184 | A | * | 2/2000 | Cogger et al. | 709/223 |
| 6,041,325 | A | | 3/2000 | Shah et al. | |
| 6,041,357 | A | | 3/2000 | Kunzelman et al. | |
| 6,044,144 | A | | 3/2000 | Becker et al. | |
| 6,044,362 | A | | 3/2000 | Neely | |
| 6,049,602 | A | | 4/2000 | Foladare et al. | |
| 6,049,789 | A | | 4/2000 | Frison et al. | |
| 6,052,450 | A | | 4/2000 | Allison et al. | |
| 6,058,170 | A | | 5/2000 | Jagadish et al. | |
| 6,058,381 | A | * | 5/2000 | Nelson | 705/40 |
| 6,064,667 | A | | 5/2000 | Gisby et al. | |
| 6,065,002 | A | | 5/2000 | Knotts et al. | |
| 6,065,059 | A | | 5/2000 | Shieh et al. | |
| 6,065,116 | A | | 5/2000 | Isaacson et al. | |
| 6,072,493 | A | | 6/2000 | Driskell et al. | |
| 6,073,105 | A | | 6/2000 | Sutcliffe et al. | |
| 6,073,122 | A | | 6/2000 | Wool | |
| 6,073,241 | A | | 6/2000 | Rosenberg et al. | |
| 6,078,891 | A | | 6/2000 | Riordan et al. | |
| 6,078,924 | A | | 6/2000 | Ainsbury et al. | |
| 6,084,953 | A | | 7/2000 | Bardenheuer et al. | |
| 6,085,171 | A | | 7/2000 | Leonard | |
| 6,085,190 | A | | 7/2000 | Sakata | |
| 6,088,451 | A | | 7/2000 | He et al. | |
| 6,088,796 | A | * | 7/2000 | Cianfrocca et al. | 713/152 |
| 6,091,808 | A | * | 7/2000 | Wood et al. | 379/201 |
| 6,094,655 | A | | 7/2000 | Rogers et al. | |
| 6,104,704 | A | | 8/2000 | Buhler et al. | |
| 6,104,716 | A | | 8/2000 | Crichton et al. | |
| 6,105,131 | A | * | 8/2000 | Carroll | 713/155 |
| 6,108,700 | A | | 8/2000 | Maccabee et al. | |
| 6,108,782 | A | | 8/2000 | Fletcher et al. | |
| 6,112,238 | A | | 8/2000 | Boyd et al. | |
| 6,112,242 | A | | 8/2000 | Jois et al. | |
| 6,115,040 | A | * | 9/2000 | Bladow et al. | 715/741 |
| 6,115,458 | A | | 9/2000 | Taskett | |
| 6,115,693 | A | | 9/2000 | McDonough et al. | |
| 6,115,737 | A | | 9/2000 | Ely et al. | |
| 6,118,780 | A | | 9/2000 | Dunn et al. | |
| 6,119,109 | A | | 9/2000 | Muratani et al. | |
| 6,122,258 | A | | 9/2000 | Brown | |
| 6,128,624 | A | | 10/2000 | Papierniak et al. | |
| 6,130,933 | A | | 10/2000 | Miloslavsky | |
| 6,131,095 | A | | 10/2000 | Low et al. | |
| 6,131,116 | A | * | 10/2000 | Riggins et al. | 709/219 |
| 6,134,584 | A | | 10/2000 | Chang et al. | |
| 6,137,869 | A | | 10/2000 | Voit et al. | |
| 6,144,727 | A | | 11/2000 | Mashinsky | |
| 6,145,001 | A | | 11/2000 | Scholl et al. | |
| 6,154,744 | A | | 11/2000 | Kenner et al. | |
| 6,161,102 | A | | 12/2000 | Yanagihara et al. | |
| 6,161,126 | A | | 12/2000 | Wies et al. | 709/203 |
| 6,161,128 | A | | 12/2000 | Smyk | |
| 6,163,597 | A | | 12/2000 | Voit | |
| 6,173,311 | B1 | | 1/2001 | Hassett et al. | |
| 6,182,113 | B1 | | 1/2001 | Narayanaswami | |
| 6,205,456 | B1 | | 3/2001 | Nakao | |
| 6,212,506 | B1 | | 4/2001 | Shah et al. | |
| 6,212,546 | B1 | | 4/2001 | Starkovich et al. | |
| 6,212,558 | B1 | | 4/2001 | Antur et al. | |
| 6,240,450 | B1 | | 5/2001 | Sharples et al. | |
| 6,253,239 | B1 | | 6/2001 | Shklar et al. | |
| 6,275,490 | B1 | | 8/2001 | Mattaway et al. | |
| 6,282,281 | B1 | | 8/2001 | Low | |
| 6,286,050 | B1 | | 9/2001 | Pullen et al. | |
| 6,292,481 | B1 | | 9/2001 | Voit et al. | |
| 6,295,551 | B1 | | 9/2001 | Roberts et al. | |
| 6,337,858 | B1 | | 1/2002 | Petty et al. | |
| 6,377,993 | B1 | | 4/2002 | Brandt et al. | |
| 6,597,685 | B2 | | 7/2003 | Miloslavsky et al. | |
| 6,606,708 | B1 | * | 8/2003 | Devine et al. | 713/201 |
| 6,615,258 | B1 | * | 9/2003 | Barry et al. | 709/223 |
| 6,715,080 | B1 | | 3/2004 | Starkovich et al. | |
| 6,760,844 | B1 | | 7/2004 | McCarthy et al. | |
| 6,782,425 | B1 | | 8/2004 | Germscheid et al. | |
| 2001/0003828 | A1 | | 1/2001 | Narayanaswami | |
| 2004/0139178 | A1 | * | 7/2004 | Mendez et al. | 709/220 |

OTHER PUBLICATIONS

Burch, B., "AT&T, MCI to release new management tools,", *Network World*, Jan. 17, 1994, p. 19.

Low, C., "Integrating Communication Services", *IEEE Communication Magazine*, Jun. 1997, pp. 164–169.

"McAfee's New 'Self–Service' Help Desk Web Suite Makes PCs Help Desk–Read", Newswire Asssociation Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages", *UNIX Review*, v. 16, n. 2, p. 29, Feb. 1998.

"Carriers Improve Net Management Services", *Communications Week*, May 2, 1994, p. 74.

"Network management:; new software platform enhances network management capabilities; MCI ServiceView offers greater cost savings, increased flexiblity.", Product Announcement , Edge, Oct. 2, 1995, on & about AT&T, v. 10, n. 375, p. 11(1).

"New software platform enhances network management capabilities . . .", *Business Wire*, Sep. 28, 1995 p. 9281122.

"User's Guide: Microsoft Access", Microsoft Corporation, 1994, pp. 378, 594, 599, 630–632 (13).

Jainschigg, J., "Billing confirmed: this easy–to–use box turns guest calls into revenue." *Teleconnect*, vol. 12, No. 9, p. 39(4).

Chapman, D. Brent et al., "Building Internet Firewalls", Nov. 1995, O'Reilly & Associates, p. 58.

He, Taniguchi, "Internet Traffic Control and Management Architecture", IEEE, Oct. 22–24, 1998, pp. s46–03–1–s46–03–5.

Sixth International Conference on Network Protocol, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Meteorology; Databases, "Inforonics offers controlled access to Web Meteorology", Information Today, Apr. 1997, vol. 14 Issue 4, p. 53, 2p. This article reporst that Inforonics has developed a controlled access gateway to MGA (Meteorological and Geoastrophysica).

Rose, Michelle, "BPCS steps into new millennium", Midrange Systems; Spring House; May 10, 1996. This article informs about the new release of BPCS Client/Server Software as the most extensive upgrade of the product since 1980s. It incorporates onject tech.

Inoue et al., "Secure Mobile IP Using Security Primitives", IEEE 1997.

"Cryptography and the Internet", www.echony.com/~ysue/crypt.html., 1995.

Lee et al., "Supporting Multi–User, Multi–Applet Workspaces in CBE". Computer Supported Cooperative Work 1996, Cambridge, MA.

"Netscape 2.0 Beta Hip or Hype?", www.plant.net.au/innovations/20beta.html, Planet Internet, 1995.

Kenney, Kathleen, "American Management Systems Launces Internet–Based Customer Care and Billing Tool for Telecom Firms", PR Newswire, New York, Oct. 9, 1996, extracted from http://proquest.umi.com on internet Feb. 28, 2002.

Morgan, Rick, "When Used Right, Internet can be Effective Marketing Tool", Madison Capital Times, Madison, WI, Nov. 8, 1996, extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on Internet on Feb. 28, 2002.

Quadri et al., Hewlett–Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value–added Services", Copyright 198 Cisco Systems, Inc. http://www.cisco.com/warp/public/146/pressroom/1998/apr98/28.html.

HP Smart Internet, "Transform User Data Into Revenue", Copyright Hewlett–Packard Company, 1999.

HP Smart Internet Usage Analysis Solution, "Transform User Data Into Competitive Advantage", Copyright Hewlett–Packard Company, 1999.

HP/Cisco, Internet Usage Platform, "Transforming Internet Services Into Revenue" 201 Hewlett–Packard Co. 1998.

"Release Note for Netflow FlowCollector Release 2.0," © Jul. 1998 and "Release Notes for Netflow Flow Analyzer Release 1.0" © Sep. 1997.

HP Invent, "Capturing the Usage Billing Advantage", Copyright 1994–2001, Hewlett–Packard http://www.hp.com/communications/usage/infolibrary/whitepaperss/dsforum__print.html Anonymous, "Call Accounting Products", Teleconnect, vol. 15, No. 3, p. 89, Mar. 1997.

Deixler, Lyle, "Call Accounting Update", Teleconnect, vol. 15, No. 3, p. 87, Oct. 1997.

Deixler, Lyle, "Micro–Tel's Microcall for Windows 95/NT", Teleconnect, vol. 15, No. 12, p. 35, Dec. 1997.

"Help–Desk Market Seeks Suite Success", Computer Reseller News, Jan. 5, 1998, p. 49.

Strom, D., "Control Everything", Network World, Aug. 20, 2001, 18, 34, pp. 39–41.

* cited by examiner

793

INTEGRATED SYSTEMS FOR PROVIDING COMMUNICATIONS NETWORK MANAGEMENT SERVICES AND INTERACTIVE GENERATING INVOICE DOCUMENTS

CROSS-REFERENCE TO RELATED APPLICATIONS

This patent application claims the benefit of U.S. Provisional Patent Application Serial No. 60/060,655 filed Sep. 26, 1997.

FIELD OF THE INVENTION

The present invention relates generally to information delivery systems over the public Internet, and, particularly, to a WWW/Internet-based, telecommunications data management service for customers of telecommunications service providers.

BACKGROUND OF THE INVENTION

In conventional customer enabled reporting and data management systems, a connection is made with a large legacy system via a dial-up connection from a customer owned personal computer or work station. This connection frequently, although not always, emulates a terminal addressable by the legacy system. The dial-up access requires custom software on the customer workstation to provide dial-up services, communication services, emulation and/or translation services and generally some resident custom form of the legacy application to interface with the mid range or main frame computer running the legacy system.

There are several problems associated with this approach:

First, the aforementioned software is very hardware specific, and customers generally have a wide range of workstation vendors, which requires extensive inventory for distribution, and generally, intensive customer hand holding through initial setup and installation before reliable and secure sessions are possible. If the customer hardware platform changes through an upgrade, most of these issues need renegotiation.

Secondly, dial-up, modem, and communications software interact with each other in many ways which are not always predictable to a custom application, requiring extensive trouble shooting and problem solving for an enterprise desiring to make the legacy system available to the customer, particularly where various telephone exchanges, dialing standards or signal standards are involved.

Third, when an enterprise desires to make more than one system available to the customer, the custom application for one legacy system is not able to connect to a different legacy system, and the customer must generally logoff and logon to switch from one to the other. The delivery technology used by the two legacy systems may be different, requiring different interface standards, and different machine level languages may be used by the two systems, as for example, the 96 character EBCDIC language used by IBM, and the 127 character ASCII language used by contemporary personal computers.

Finally, the security and entitlement features of the various legacy systems may be completely different, and vary from system to system and platform to platform.

In the context of telecommunications services and products offered by large telecommunications network service providers for their customers, the assignee of the present invention, MCI, has deployed an MCI ServiceView ("MSV") platform comprising a number of independent legacy systems enabling dial-up connectivity for those customers desiring to obtain the following network management service and reporting data pertaining to their telecommunications networks: priced call detail data and reporting; toll-free network manager "800NM" call routing data; outbound network management data; trouble ticket information; fault manager alarms. Limited interactive toll free network control is additionally supported whereby customers may change the configuration of their toll-free networks and "virtual" networks, i.e., Vnet networks. In addition to the MSV platform, the present assignee has implemented a variety of stand alone applications including: a Traffic View system enabling customers to perform real-time network traffic monitoring of their toll-free networks, and obtain near-real time call detail data and reports, and, a "Hyperscope" reporting system for providing reports on the performance of customers' Broadband (data) networks.

More particularly, MCI's ServiceView platform ("MSV") provides for the generation of Toll-free Network Management data, priced call detail ("Perspective") data for usage analysis and trending, each of which requires a different reporting mechanism due to the nature of the data being presented. Such reporting systems typically do not provide any report customization or presentation options for the customer, and any reporting customization is provided by an application specific program running on the client workstation. Furthermore, such systems do not readily provide for the scheduling of periodic or ad hoc "one-shot" reports.

Thus, what is needed is a comprehensive system that facilitates and simplifies customer access to, and management of, all of their telecommunications network assets and enterprise telecommunications network management products and services to which they have subscribed.

The rapid adoption and use of the internet for data exchange has prompted a desire on the part of customers to access their data over the internet.

The popularity of the public Internet provides a measure of platform independence for the customer, as the customer can run their own Internet web-browser and utilize their own platform connection to the Internet to enable service. This resolves many of the platform hardware and connectivity issues in the customers favor, and lets the customer choose their own platform and operating system. Web-based programs can minimize the need for training and support since they utilize existing client software which the user has already installed and already knows how to use, i.e., the browser. Further, if the customer later changes that platform, then, as soon as the new platform is Internet enabled, service is restored to the customer. The connectivity and communications software burden is thus resolved in favor of standard and readily available hardware and the browser and dialup software used by the public Internet connection.

An Internet delivered paradigm obviates many of the installation and configuration problems involved with initial setup and configuration of a customer workstation, since the custom application required to interface with the legacy system can be delivered via the public Internet and run within a standard web-browser, reducing application compatibility issues to browser compatibility issues.

For the enterprise, the use of off-the-shelf web browsers by the customer significantly simplifies the enterprise burden by limiting the client development side to screen layouts and data presentation tools that use a common interface enabled by the web browser. Software development and support resources are thus available for the delivery of the enterprise legacy services and are not consumed by a need for customer support at the work station level.

It would be highly desirable to provide an integrated system that provides for secure connectivity to telecommunications enterprise legacy systems over the public Internet. The public Internet provides access connectivity world wide via the TCP/IP protocol, without need to navigate various disparate security protocols, telephone exchanges, dialing standards or signal standards, thereby providing a measure of platform independence for the customer.

Furthermore, it would be desirable to provide an Intranet/Internet/Web-based reporting system that provides a common GUI enabling both report requesting, customizing, scheduling and viewing of various types of data from different back-end telecommunications service and applications.

It would also be highly desirable to provide a Intranet/Internet/Web-based data management system infrastructure capable of providing telecommunications products and services data to customer's over the Intranet.

It is therefore desired to provide connectivity to enterprise legacy systems providing telecommunications network management services over the public Internet, as the Internet provides access connectivity world wide via the TCP/IP protocol, without need to navigate various telephone exchanges, dialing standards or signal standards.

SUMMARY OF THE INVENTION

The present invention is directed to a Web-based, integrated customer interface system for telecommunications network management. The customer interface system is provided with a graphical user interface for enabling a user to interact with one or more telecommunications network management services provided by remote servers located in a telecommunications service provider's Intranet, and utilizes a Web paradigm to allow easy and convenient access to all of the telecommunications services from the user's perspective.

In the preferred embodiment, the telecommunications products and services delivered to a client workstation having the integrated customer interface include: 1) report requester, report viewer, and report management applications enabling a customer to request, specify, customize and schedule delivery of reports pertaining to customer's real time "unpriced" call detail data and priced call detail data; 2) centralized inbox system for providing on-line reporting, presentation, and notifications to a client workstation from one or more Intranet application services over an Internet/Intranet network; 3) a real-time monitoring system enabling a customer to monitor call detail statistics and call detail data pertaining to their special service network usage, e.g., 800/8xx toll-free networks; 4) a toll-free network management system enabling customers to define their own 800/8xx toll free number routing plans via the Web/Internet, enabling customers to change and modify their existing 800/8xx toll free number routing plans, and, temporarily change the percent allocation of traffic for a particular 800/8xx toll free number based on certain criteria; 5) an outbound network management system enabling customers to manage and track features and services associated with their virtual networks ("Vnet") including management of calling party number orders, dialing plan orders, calling card number management, and ID code sets orders; 6) an event monitor system for providing customers with various reports and real-time alarm information relating to their switched-circuit (data and voice) networks in real time or near-real time, including: provision of physical and logical views of customers'Broadband data networks, physical and logical view of Broadband network alarms, and physical and logical performance information relating to the circuits which comprise a customer's Broadband data network, e.g., frame-relay, thus, allowing customers to make informed network management decisions in controlling their business telecommunications networks; 7) a trouble ticket tool enabling a customer to open and monitor trouble tickets relating to network events on an enterprise network; 8) a Web-based invoice reporting system allowing the customers access to their billing and invoice reports associated with network services provided to a customer; 9) a web-based call manager service enabling call center customers to control delivery of toll free calls from the telecommunications enterprise network to call centers, including call centers having multiple automatic call distributors (ACD's); 10) an Internet "online" order entry and administration service to enable customers to manage their telecommunications accounts; and, 11) a system for handling security and authentication requests from both client and server side of the applications implementing the suite of telecom products and services.

Integrated within the customer interface system is an application backplane unit for controlling and managing the overall user interface system to a number of Web enabled application services. By invoking the backplane unit a user may receive a number of disparate services available from the remote servers.

Each remote telecom service provided includes its own user interface unit, referred to as a client application, independently implemented of one another and the backplane. Although the client applications are independently developed as separate modules, the interface of the present invention integrates the client applications into one unified system, allowing users to access the individual client applications via the backplane unit. Thus, the present invention provides interoperability between each of the client applications and the backplane, as well as among each of the client applications.

Accordingly, the present invention provides an integrated customer interface and web-based delivery system for delivering to customers a number of telecommunications products and services available from remote servers, wherein separate client applications may communicate with one another and with the backplane unit.

Thus, in accordance with the principles of the invention, there is provided an integrated system for providing a plurality of communications network management services and products to a customer over the public internet, the network management services and products accessible from a client workstation employing a client browser associated with said customer and capable of receiving web based communications from a communications service enterprise, the system comprising: one or more secure web servers for managing one or more secure client sessions over the internet in response to customer entry into the system, each secure web server supporting secure communications with the client workstation; a plurality of client applications integrated within a web-based GUI and downloaded from a secure web server according to pre-determined customer entitlements, each client application for providing a customer interface integrated within the web based GUI and enabling interactive communications with one or more communications network management resources provided by the communications service enterprise via a secure web server; and, each secure web server supporting communication of request messages entered by the customer via the customer interface to the one or more network management resources capable of providing a desired communications network management function, wherein one or more remote application resource processes the request messages and provides responses to the one or more secure web servers for secure uploading to the client browser and display via the integrated customer interface, thereby enabling a customer to manage its communications network assets.

Advantageously, the integrated customer interface implementing an Internet delivered paradigm for telecom network management services obviates many of the installation and configuration problems involved with initial setup and configuration of a dial-up customer workstation, since the custom application required to interface with the legacy system can be delivered via the public Internet and run within a standard web-browser, reducing application compatibility issues to browser compatibility issues.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 13(*b*) illustrates an example report viewer dialog box used for requesting view of available generated reports;

FIG. 14(*b*) depicts generally the process performed by the DSS in fulfilling a priced reporting request received from StarWRS;

FIGS. 23(*c*)–23(*j*) illustrate example screen displays illustrating the real-time monitoring (RTM) system functionality of the nMCI Interact.

FIGS. 25(*c*)–(*d*) illustrates the Service Inquiry application server architecture 36 interfacing with the Legacy Backend 40(*a*), CSM/SI through Requester and Receiver objects;

FIGS. 25(*d*)–25(*m*) illustrate examples of SI application dialog windows enabling user creation and querying of trouble tickets;

FIG. 25(*n*) illustrates domain object model (DOM) 2600 implemented in Service Inquiry;

FIG. 27(*d*) illustrates an example display when the File/Select Corp ID menu option of FIG. 27(*a*) is selected;

FIG. 27(*e*) illustrates an exemplar screen display depicting a hierarchical tree view of an example toll-free number routing plan;

FIG. 27(*f*) illustrates an example IMPL dialog screen enabling the user to generate a TEMP IMPL/IMPL order for a desired Corp Id;

FIG. 27(*g*) illustrates an example QUIK dialog screen enabling the user to generate a TEMP QUIK/QUIK order for a desired Corp Id;

FIG. 27(*h*) illustrates an exemplar screen display showing the results of an order query;

FIG. 27(*i*) illustrates an exemplary screen display showing the options for changing existing network plan routing orders;

FIG. 53(*b*) is a sample screen displaying a list of invoice reports;

FIG. 61(*b*) is a schematic illustration of the message format passed between the application specific proxy back to the Dispatcher server.

DETAILED DESCRIPTION OF THE INVENTION

The present invention is directed to a Web-based, telecommunications network application delivery system for delivering an integrated suite of customer network management tools to customers of telecommunications service providers using a Web browser paradigm. The integrated suite of customer network management tools described herein and provided by the assignee of the present invention, is collectively referred to as the networkMCI Interact system ("nMCI Interact"). Such an integrated suite of Web-based interactive applications provides all of the tools necessary to enable customers to manage their telecommunication assets, quickly and securely, from anywhere in the world.

The nMCI Interact system architecture is basically organized as a set of common components comprising the following:

1) a software architecture detailing the client and server based aspect of nMCI Interact;
2) a network architecture defining the physical network needed to satisfy the security and data volume requirements of the networkMCI System;
3) a data architecture detailing the back-end or data sources for the networkMCI reporting system; and
4) an infrastructure covering security, order entry, fulfillment, billing, self-monitoring, metrics and support. Each of these common component areas will be discussed in further detail herein.

Figure 1:
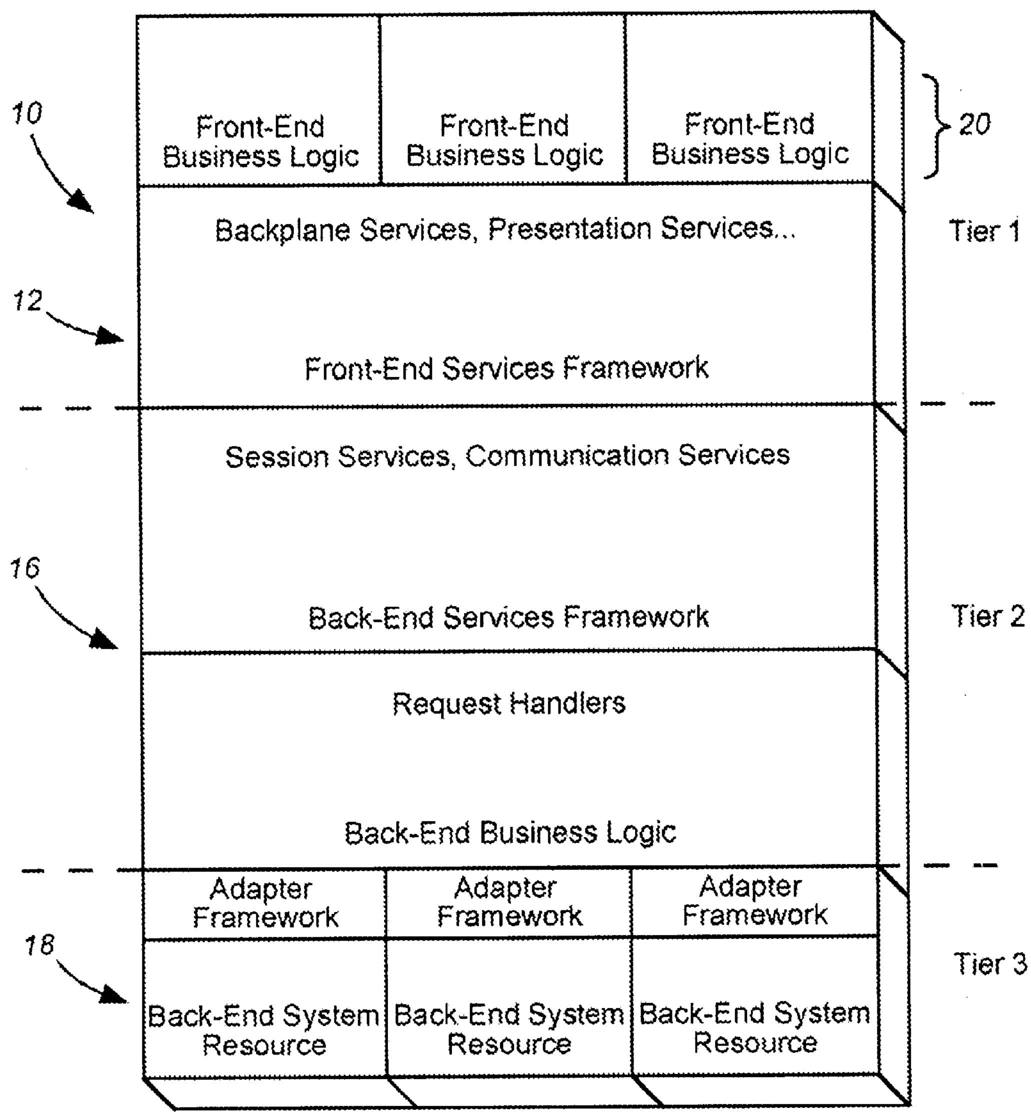
FIG. 1 illustrates the software architecture component comprising a three-tiered structure.

FIG. 1 is a diagrammatic illustration of the software architecture in which the present invention functions. A first tier of software services are resident on a customer work station 20 and provides customer access to the enterprise system, having one or more downloadable application objects 10 directed to front end business logic and application services, a backplane service layer 12 for managing sessions, one or more presentation services objects for the presentation of telecom network management options and customer requested telecommunications network management data in a browser recognizable format, and a customer supplied browser for presentation of customer options and data to the customer and for internet communications over the public Internet.

A second or middle tier 16 is provided, having secure web servers and back end services to provide applications that establish user sessions, govern user authentication and their entitlements, and communicate with adaptor programs to simplify the interchange of data across the network.

A back end or third tier 18 having applications directed to legacy back end services includes database storage and retrieval systems and one or more database servers for accessing system resources from one or more legacy systems.

Generally, the customer or client tier or workstation 20 is client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, Service Inquiry, Toll Free Network Management ("TFNM") or Call Manager ("CM") functions. The system is capable of delivering to customers the functionality appropriate to their product mix.

Figure 2:
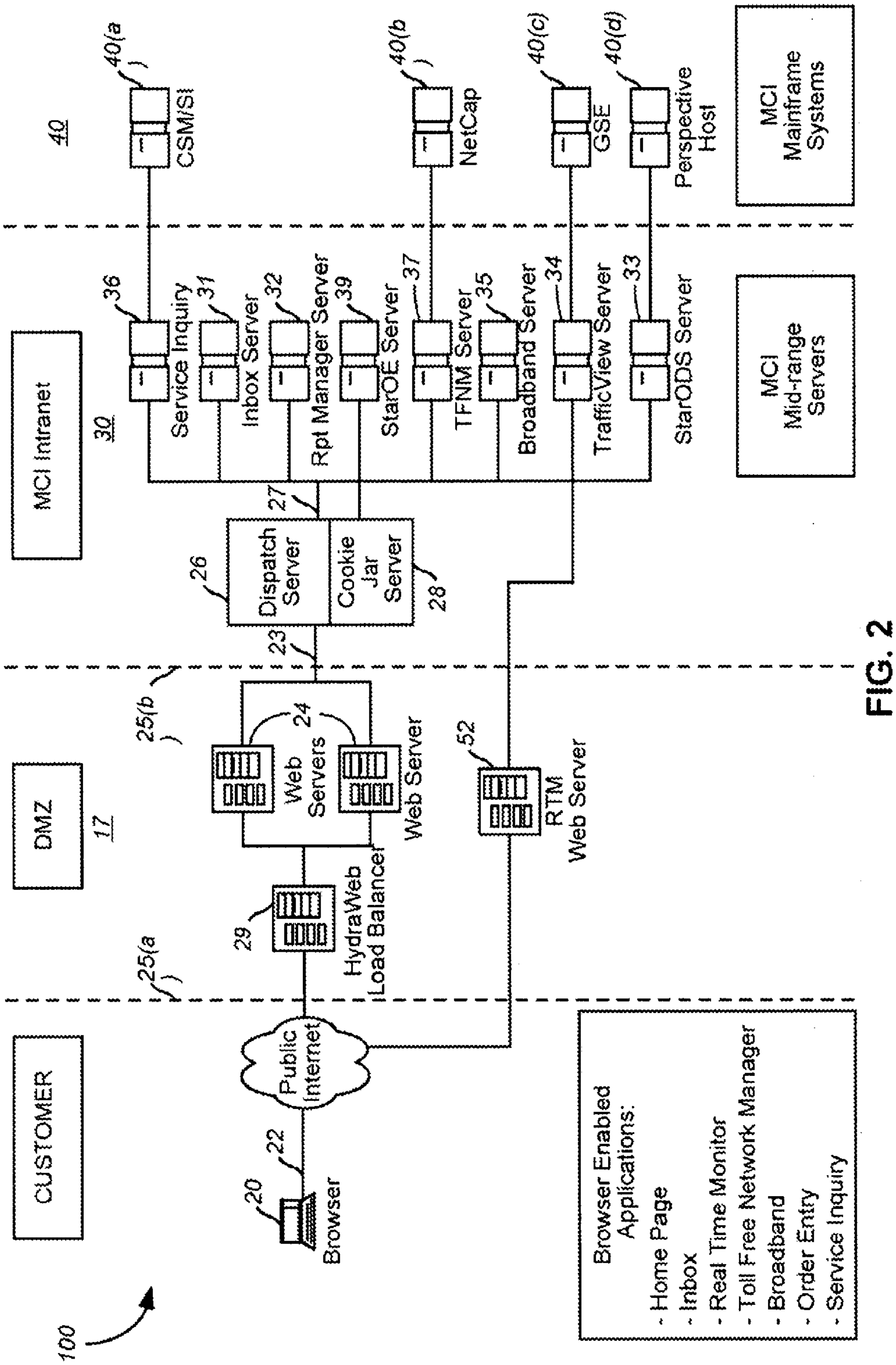
FIG. 2 is a diagrammatic overview of the software architecture of the networkMCI Interact system.

FIG. 2 is a diagrammatic illustration of the network and platform components of the nMCI Interacts system, including: the Customer workstation 20; the Demilitarized Zone 17 (DMZ); Web Servers cluster 24; the MCI Intranet Dispatcher/Proxy Servers cluster 30; and the MCI Intranet Application servers 40, warehouses, legacy systems, etc.

The customer workstation 20 is browser enabled and includes client applications responsible for presentation and front-end services. Its functions include providing a user interface to various MCI services and supporting communications with MCI's Intranet web server cluster 24. As illustrated in FIG. 2, and more specifically described in the commonly owned, U.S. Pat. No. 6,115,040 entitled GRAPHICAL USER INTERFACE FOR WEB ENABLED APPLICATIONS, the contents and disclosure of which are incorporated by reference as if fully set forth herein, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects which provide the front end business logic and manages their launch.

As will be described, each of the nMCI Internet suite of network management applications implements a set of common objects (CO) that minimizes the replication of code, and provides a framework in which a family of internet applications may be managed and created including: communications, I/O services to local resources, user authentication, internationalization, common look and feel, application management, and a model view controller (MVC) framework. The primary common object services for each of the suite of applications include: graphical user interface (GUI); application launch; window navigation among applications; inter-application communications; printing; user identity, session management, authentication, and entitlements; data import and export; logging and statistics; error handling; version management; and messaging services.

The use of a set of common objects for implementing the various functions provided by the integrated interface system of the present invention, and particularly the use of browser based objects to launch applications and pass data therebetween is more fully described in the above referenced, U.S. Pat. No. 6,115,040 entitled GRAPHICAL USER INTERFACE FOR WEB ENABLED APPLICATIONS, and Appendix A, attached to that application, provides descriptions for the common objects which includes various classes and interfaces with their properties and methods.

As shown in FIG. 2, the aforesaid objects communicate data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second secure socket connection 23 to the dispatch server 26 inside the enterprise Intranet.

As will be hereinafter described in greater detail, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The present invention is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 32 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 32 or the Dispatch Server 26, may maintain the "cookie jar" to map these keys to the associated session. A separate cookie jar server 32, as illustrated in FIG. 2 has been found desirable to minimize the load on the dispatch server 26. A new cookie will be generated when the response to the HTTPS request is sent to the client. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25*b* over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 39 at logon time and cached.

If the requester is authorized to communicate with the target service, the message is forwarded to the desired service's proxy. Each application proxy is an application specific daemon which resides on a specific Intranet server, shown in FIG. 2 as a suite of midrange servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and scheduling the transmission of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(*a*). Such network management and customer network data is additionally accessible by authorized MCI management personnel. As shown in FIG. 2, other legacy platforms 40(*b*), 40(*c*) and 40(*d*) may also communicate individually with the Intranet servers for servicing specific transactions initiated at the client browser. The illustrated legacy platforms 40(*a*)–(*d*) are illustrative only and it is understood other legacy platforms may be integrated into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 20 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 20 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous which is used for situations in which data will be returned by the application server 30 quickly; 2) Asynchronous which is used for situations in which there may be a long delay in application server 30 response; and 3) Bulk transfer which is used for large data transfers.

The DMZ Web servers 24 are found in a special secure network area set aside from the Intranet to prevent potentially hostile customer access. All DMZ equipment is physically isolated and firewalled as illustrated at 25(*a*), 25(*b*) from the company Intranet. Similarly, the DMZ equipment is firewalled and obscured from hostile attacks from the public Internet, except for limited web browser access to the web servers which are located in the DMZ. The customer's web browser connects to a web server in the DMZ which in turn connects to the Dispatcher server 26 which acts as a proxy to extract select information from the midrange servers 30. A user may not directly connect to any enterprise server in the enterprise intranet, thus ensuring internal company system security and integrity.

The DMZ also isolates the company Intranet from the public Internet because the web servers 24 located in the DMZ never store or compute actual customer sensitive data. The web servers only put the data into a form suitable for display by the customer's web browser. Since the DMZ web servers 24 do not store customer data, there is a much smaller chance of any customer information being jeopardized in case of a security breach.

Client Browser Application

Figure 3:
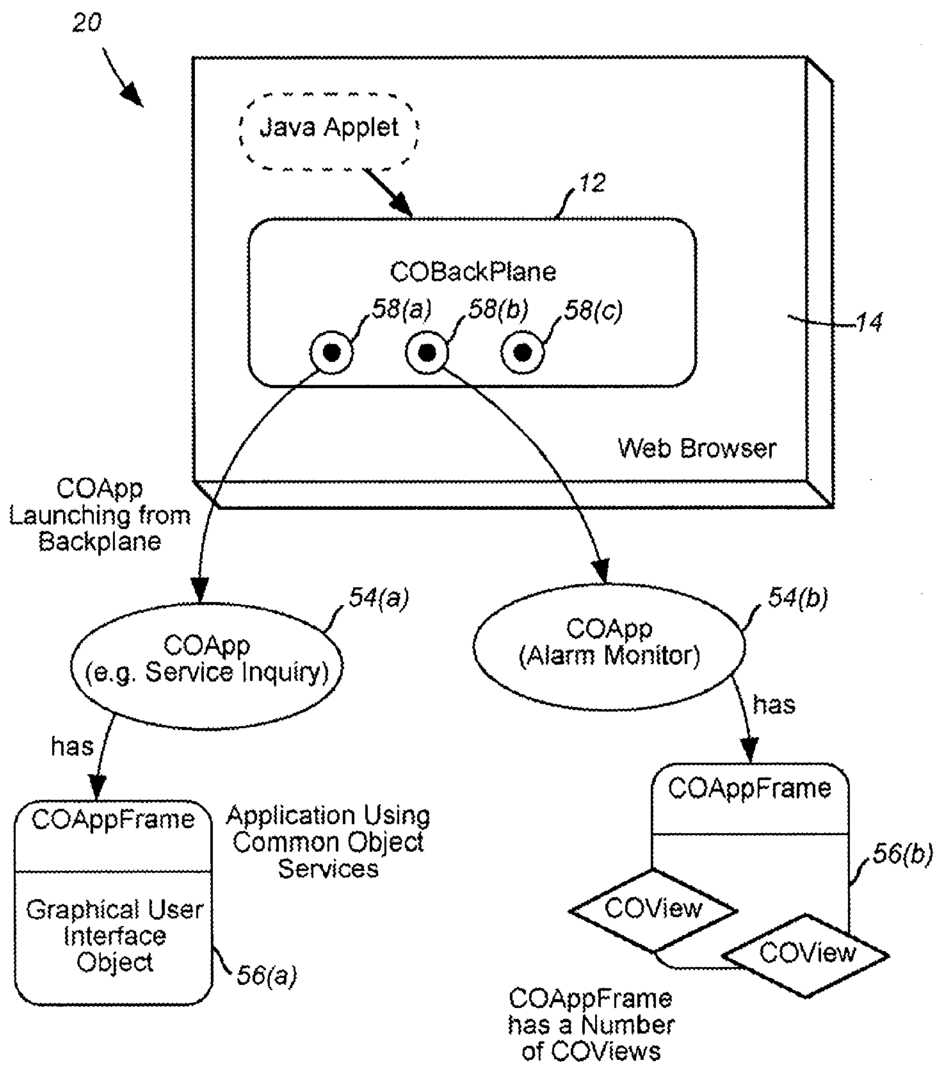
FIG. 3 is an illustrative example of a backplane architecture schematic.

As mentioned, one component of the nMCI Interact system is the client-tier software component which provides the integrated and unified interface to each of the telecommunications network management services available to a user. As shown in FIG. 3, the system of the present invention implements an "application backplane" 12, a single object which keeps track of all the client applications, and which has capabilities to start, stop, and provide references to any one of the client applications. The application backplane 12 is typically implemented as a Java applet and is launched when a Web page is retrieved via a URL pointing to the enterprise's Web site. The client applications typically comprise graphical user interface programs which enable a user to interact with one or more Web enabled remote services.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54*a*, 54*b*, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ) stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The COBackPlane 12 includes methods for providing a reference to a particular COApp, for interoperation. For example, the COBackPlane class provides a getApp( ) method which returns references to application objects by name. Once retrieved in this manner, the application object's public interface may be used directly.

COApp is the base interface for the applications. The applications, e.g., Service Inquiry 54*a* or Call Manager 54*b*, generally have their startup code and inter-application interface in a class which implements COApp. Generally, two classes are available for the applications, COAppImpl or COApplet. Alternately, they may provide their own implementation of the interface. In the preferred embodiment, applications typically extend COAppImpl.

COAppImpl is an "applet-like" class, but it does not derive from java.applet.Applet nor from java.awt.Panel. By not deriving from Applet, the applications may be launched at any time without browser having to be pointed to specific page, and frees the applications from running within the browser frame. Classes derived from COAppImpl are created, launched, stopped, and destroyed by the COBackPlane 12. This provides a tight and controlled integration by the system of the present invention.

The COApplet class, on the other hand, extends the Applet class and is intended to be launched by the browser from an HTML <Applet> tag. Extension from Applet is provided for applications needing more isolation from the present integrated system, or requiring a separate browser-based display space. The COApplet class implements most of the COApp interface by forwarding it to a contained COAppImpl object.

COAppFrame 56*a*, 56*b* is a desktop window created and used by a COApp to contain its user interface. The COAppFrame 56*a*, 56*b* is a separate window from the Web browser 50. Generally, the COAppFrame 56*a*, 56*b* has a menu, toolbar, and status bar. The COAppFrame's attachToViewArea( ) method may be used to paste a COView object 60*a*, 60*b*, 60*c* into a COAppFrame 56*a*, 56*b*. The COView class is an extension of java.awt.Panel. It provides a general purpose display space and container for an application's visual representation. Application classes typically extend the COView class to implement their presentation logic. COApp may use none, one, or many COAppFrames 56*a*, 56*b*.

COParm is a generic data class used to pass parameters between applications. COApp interface provides a public method for passing COParm message objects, for example, public void processMessage (COParm message), which may be used to pass messages between applications. The COParm class including a set of name-value pairs which are used to present information or requests.

Logon

Figure 4:
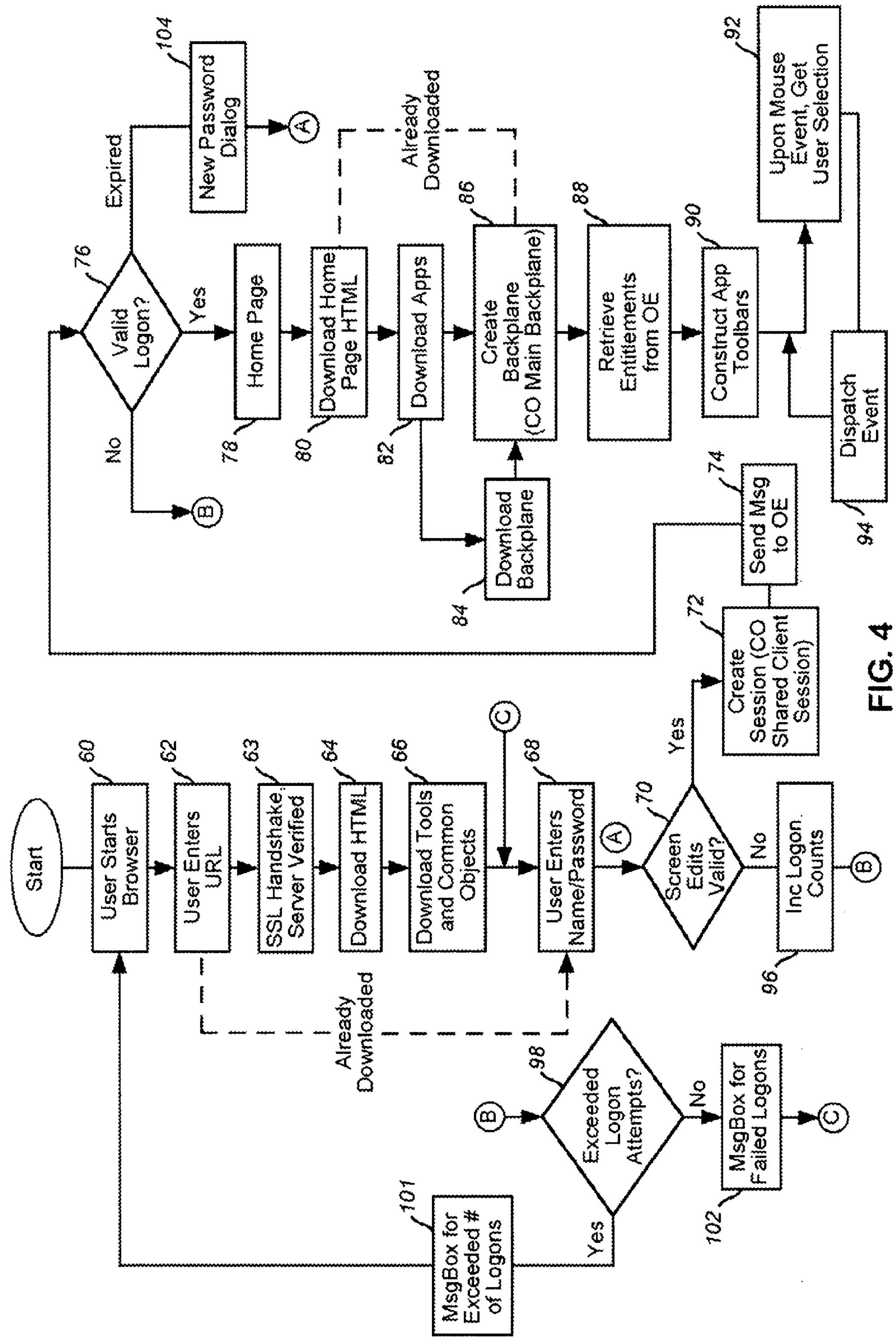
FIG. 4 depicts the logon process for the nMCI Interact system.

As illustrated in FIG. 4, a logon process for the nMCI Interact's integrated customer interface of the present invention starts with the browser launch as indicated at step 60, and the entry of the enterprise URL, such as HTTPS://www.enterprise.com, as indicated at step 62. Following a successful connection, an SSL handshake protocol may be initiated at this point as indicated at step 63. As will be explained in greater detail herein, when a SSL client and server first start communicating, they agree on a protocol version, select cryptographic algorithms, authenticate the server (or optionally authenticate each other) and use public-key encryption techniques to generate shared secrets.

After successful SSL handshake at step 63, an HTML file invoking and an associated logon applet is downloaded with software tools and common objects in steps 64, 66, to present a web page including name and password entry fields for user to enter. The user is then prompted to enter name and password on the Web page. If the nMCI Interact system determines that the software files including classes for initiating a session, have been already downloaded, for example, from a previous session, the steps 62, 64, 66 are skipped.

The logon applet checks for the name/password entry and instantiates a session object in step 72, communicating the name/password pair. The session object sends a message including the name/password to a remote server for user validation in step 74. When the user is properly authenticated by the server in step 76, another Web page having backplane object is downloaded in steps 78, 80, 84. This page is referred to as a home page. At the same time, all the application software objects are downloaded in step 82. If the system of the present invention determines that the backplane and application files have been already downloaded, the steps 80, 82, 84 are not performed. The backplane object is then instantiated in step 86.

As will be explained, the backplane communicates with a remote order entry server component ("StarOE") server 39 (FIG. 2) to retrieve the user's entitlements in step 88. The entitlements represent specific services the user has subscribed and has privilege to access. It also describes what entitlements the user may have within any single service. For example, from the COUser context, the backplane can obtain the list of applications that the user is entitled to access. In addition, each COApp holds set of entitlements within that application in COAppEntitlements object.

Using the information from the COUser context, the backplane knows which COApps to provide, e.g., which buttons to install in its toolbar. The backplane stores the user specific entitlements in memory for other processes to access. After determining the entitlements, the backplane initiates a new thread and starts an application toolbar in step 90. The application toolbar includes the remote services to which the user has subscribed and may select to run. From the application toolbar, a user is able to select a service to run. Upon user selection, the selection is communicated from the application toolbar to the backplane in steps 92, 94, which then launches the graphical user interface program associated with the selected service. The application toolbar remains on the user display, even after a particular service has been initiated. This is useful when a user desires to start up another remote service directly from having run a previous service because the user then need not retrieve the home page again.

If it is determined that the user entered password is not valid in step 70 or step 76, an attempted logon count is incremented in step 96. If the user's attempted logon count is greater than a predefined allowed number of tries as indicated in step 98, a message is conveyed to the user in step 101 and the user must restart the browser. If the user's attempted logon count is not greater than the predefined allowed number of tries, a "failed login" message is conveyed to the user in step 102, and the user is prompted to reenter name/password in step 68. If it is determined that the user password has expired, the user is prompted to change the password in step 104. For example, the user may be required to change the password every 30 days for security reasons. Whenever the user changes the password, the new password is transmitted in real time to a server responsible for updating and keeping the password entry for the user. The user than enters the new password in step 104 and continues with the processing described above in step 70.

An illustrative example of the nMCI Interact logon Web page may be found in U.S. Pat. No. 6,113,040 which typically includes a name field and a password field for the user to enter. After the user is properly authenticated via the logon page, the nMCI Interact home page is retrieved.

Figure 5A:
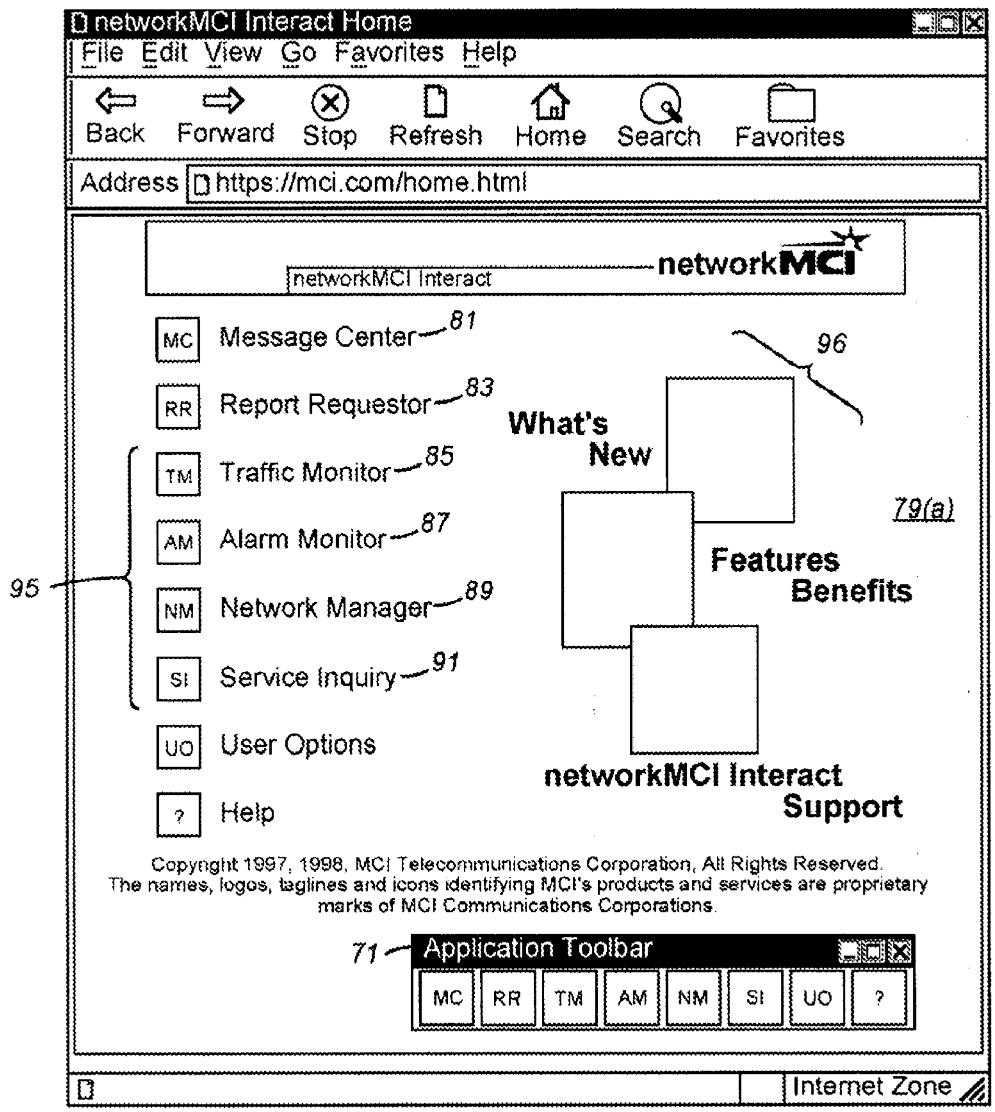
FIGS. 5(*a*) and 5(*b*) illustrate example nMCI Interact system web home pages presenting customer-selectable telecommunications network services to which the client/customer is entitled.
Figure 5B:
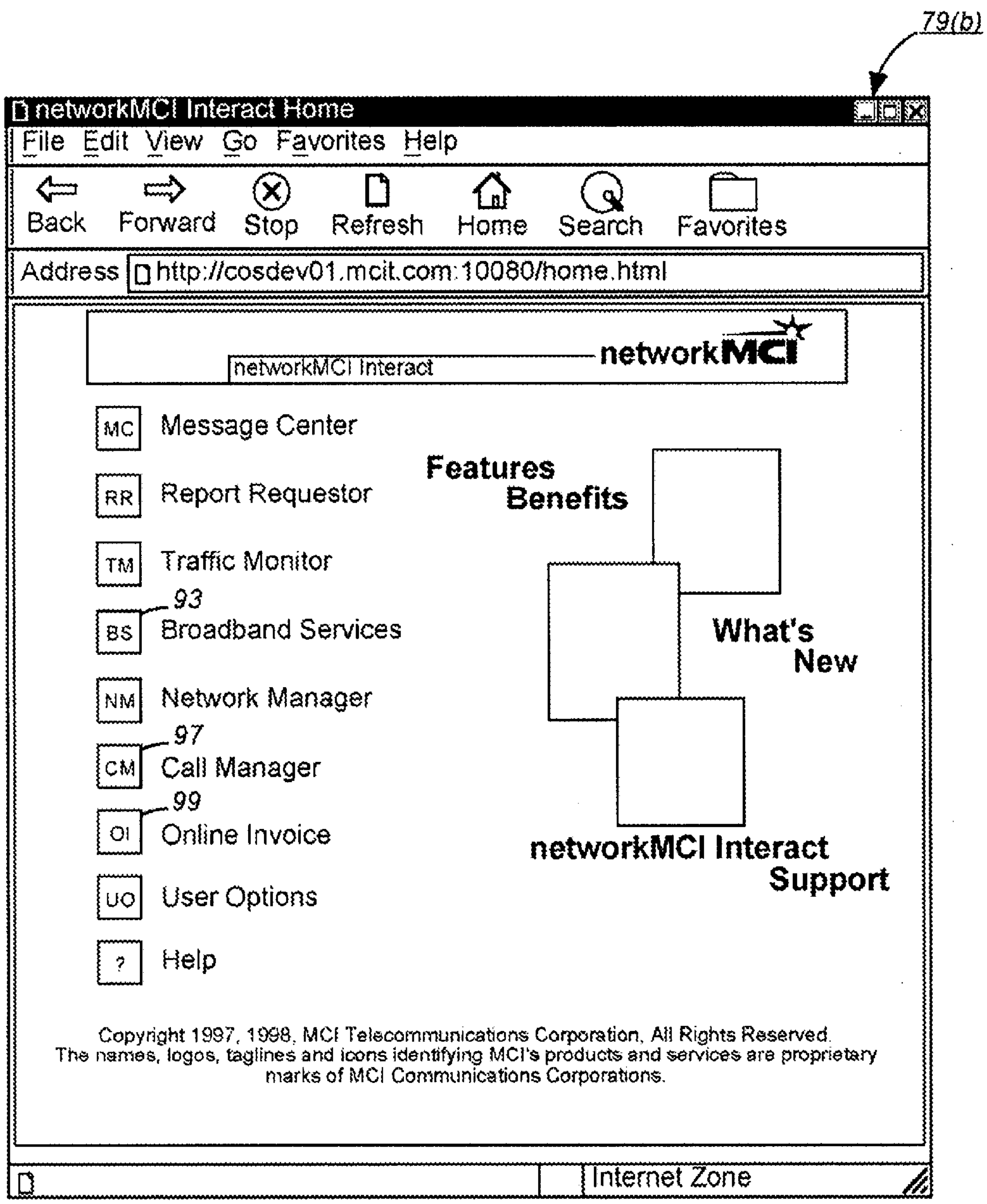

FIGS. 5(*a*) and 5(*b*) illustrate example nMCI Interact home pages, i.e., a Web page having the backplane object 12. The home page 79(*a*) is downloaded after the authentication via a logon page and provides, for example, a suite 95 of network management reporting applications including: MCI Traffic Monitor application 85; an alarm monitor application 87; a Network Manager application 89 and the Service Inquiry application 91. Access to network functionality is also provided through Report Requester 83, which provides a variety of detailed reports for the client/customer and a Message Center 77 for providing enhancements and functionality to traditional e-mail communications. An application toolbar 71 is also provided that is different from the icons 95 in that the application tool bar remains on a screen, even when the home page 79(*a*) is no longer displayed. The home page also typically comprises HTML links to other services 96. These services may be new information center, features benefits, or support center for the system of the present invention.

Backplane Logic

Figure 6:
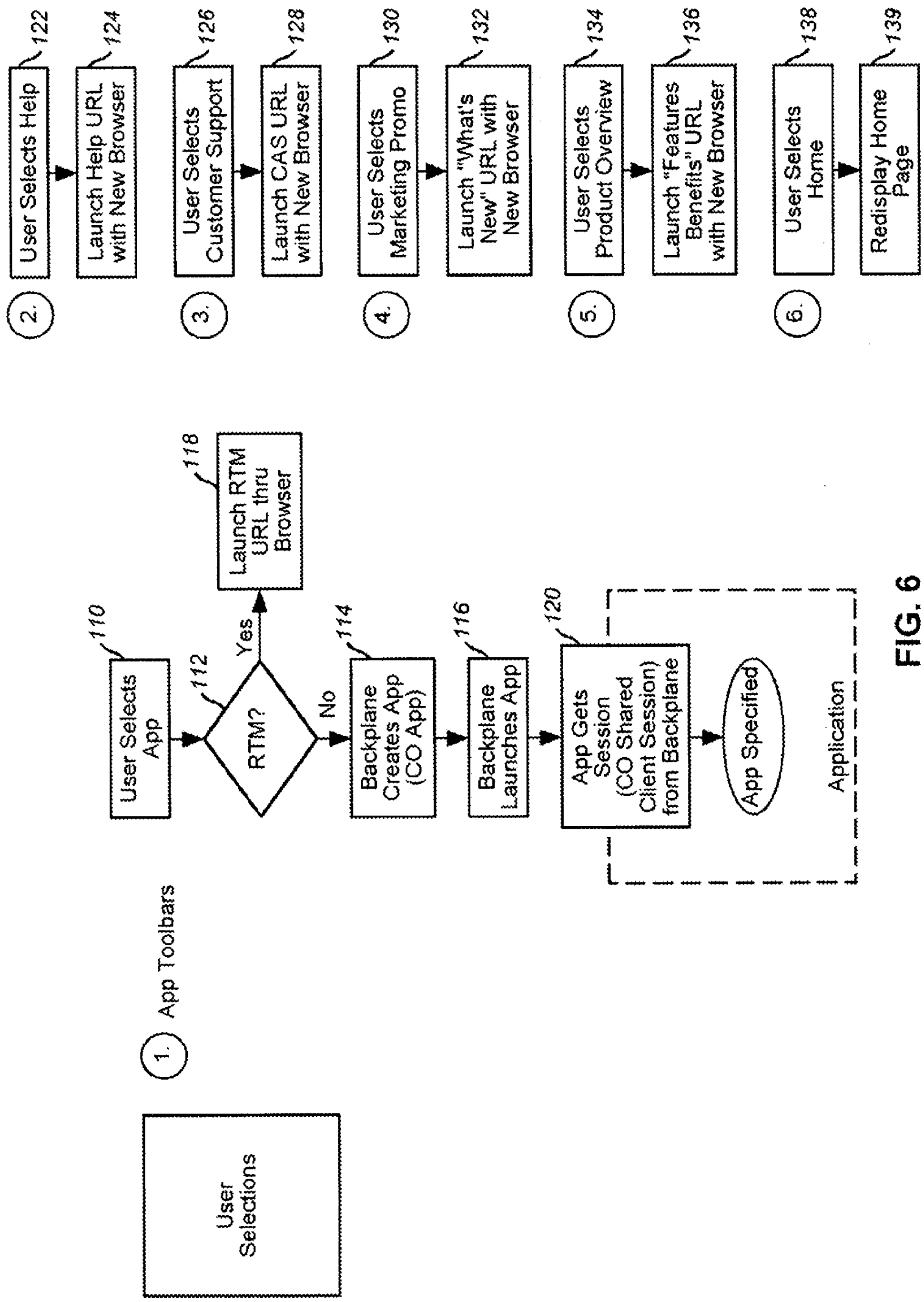
FIG. 6 is a flow diagram illustrating the backplane logic process when a user selects a service.

FIG. 6 is a flow diagram illustrating the backplane logic process when a user selects a service from a home page or the application toolbar. The user initially selects an application in step 110. If the selected application is derived from COAppImpl, the COBackPlane object 12 instantiates the desired application object by name. The COBackPlane 12 also creates a COAppStartThread object to manage the startup of the COAppImpl in step 116. Each COAppImpl is started in it's own thread. CoAppStartThread calls the COAppImpl's init( ) method. Here the COAppImpl typically creates the application-specific classes it needs, including a COAppFrame (or a derived class thereof) if desired. COAppStartThread calls the COApp's start( ) method. Once the start( ) method has completed, the COAppStartThread ends.

If the desired application is derived from java.applet.Applet, a new browser window is created, and directed to the HTML page from which the applet is to be loaded 338. This will cause the browser to load the applet, and call its init( ) and start( ) method. In its init( ) method, the applet obtains a reference to the backplane by calling the static method of the COBackPlane class getBackPlane( ). Also in its init( ) method, the applet notifies the backplane that it has been launched by calling the backplane's registerApp( ) method. Alternately, if the desired application is an application requiring a direct URL launch from the home page, for example RTM as shown at step 112, the desired application is invoked by retrieving a Web page having the application's URL as shown at step 118.

Each application gets a session identifier in step 120 upon its startup. Should the applications desire to perform some further authentication, they are free to retrieve the COUser object, and perform whatever special authentication they need, without troubling the user to re-enter his/her username and password. During the processing of functions specific to each application, the applications are able to communicate with one another as well as with the backplane by getting a reference to the applications or the backplane and invoking the public interfaces or methods with the reference.

After a user is finished with interacting with COApp, the user requests the selected COApp to exit via a menu selection, clicking on a close box button on a window frame, or a keyboard command, for example. The COApp then requests exit from the COBackPlane. If the selected application is derived from COAppImpl, the COBackPlane creates a COAppStopThread to manage the exit of the COApp. As with startup, each COApp is stopped in its own thread. COAppStopThread calls COApp's stop( ) method. Typically a COApp would not override this method. It is called for consistency with the applet interface of the COApp class. An applet's stop( ) method is called by the Web browser when the Web browser leaves the page from which the applet was loaded, in order to allow the applet to, for instance, stop an animation. For consistency with this model, COApps may use this method to stop long-running threads. COAppStartThread calls COApp's destroy( ) method. Here the COApp typically performs resource cleanup routines, including stopping any threads, and calling the dispose( ) method for any COAppFrame objects.

If the selected application is derived from java.applet.Applet, the Web browser window comprising the page from which the applet was launched is closed. This will cause the applet's stop( ) method to be called by Web browser. In its stop( ) method, the applet notifies the backplane that it has been stopped by calling the backplane's deregisterApp( ) method.

Then a user typically requests logoff via menu, close box, etc. When such a request is received the backplane sends Logoff transaction to the Web Server. The backplane closes toolbar and directs the Web browser to logon URL. Then the backplane exits.

As further shown in FIG. 6, the homepage provides links to other Web pages. For example, if help hypertext is selected in step 122 from the application toolbar, a help URL is launched in a new browser window in step 124. Similarly, if customer support hypertext is selected in step 126, a customer support URL is launched in a new browser window in step 128. If a user selects a marketing promotion hypertext in step 130, URL for new product information will be launched in a new browser window in step 132. If a product overview hypertext is selected in step 134, a URL pertaining to the product's features will be launched in a new browser window in step 136. If a user selects home in step 138, the home page will be redisplayed in step 139.

User

The present invention also includes a user unit for representing a user of a current session. The user unit is generally implemented as a COUser class extending java.lang.Object. The COUser class object holds information including a user profile, applications and their entitlements. In order to minimize network traffic, the amount of data carried by the COUser is minimal initially, and gets or becomes populated as requests are processed. The requests are generally processed by retrieving information from the Order Entry service. The profile information is then stored and populated in the COUser object should such information be requested again.

A COUser object is created when the user logs in, and holds the username and password of the user as an object in the COClientSession object. The session object is contained within the backplane, which manages the session throughout its lifetime. The code below illustrates how this occurs:

```
// Within the backplane
COClientSession session = new
COClientSession();
try {
     Session.logon ("username", "password");
} catch (COClientLogonException e) {. . .};
// Should the User object be required
COUser user = session.getUser();
```

The logon method of the COClientSession object communicates with the StarOE (Order Entry) server (FIG. 2), a back-end authentication mechanism, for authenticating the user.

The COUser that may be obtained from the COClientSession immediately after the login process is very sparse. It includes a limited set of information such as username, a list of applications that user is entitled to, for example. The details of each entitlement information are retrieved at the time of actual processing with those information.

StarOE

As briefly mentioned, the StarOE server 39 of the networkMCI Interact system (FIG. 2) is used to order, fulfill, and bill for, as well as administer, the suite of network applications, providing a horizontal service for use by all applications. The applications communicate to StarOE for all authentication, entitlement and system administration as well as order entry services. StarOE centrally processes these service requests for the individual applications by providing all order entry and security information for the "networkMCI Interact" suite of applications.

The security information which the StarOE maintains and provides describes identification, authentication and access control used in the suite of applications. All access to the "networkMCI Interact" is controlled by userids and passwords, as explained herein. In addition, individual users are specifically granted access to only the necessary system objects, i.e., file, programs, menus, reports, etc. Access to these individual objects are based upon the customer privilege models, i.e., entitlements, stored in a StarOE database. Thus, all information regarding customers and their access levels for each product in the suite of network applications to which the customers have subscribed are stored in a customer security profile database local to the StarOE. Accordingly, StarOE provides the ability to prevent unauthorized, non-customer access to "networkMCI Interact" data and applications; the ability to allow customers to access multiple enterprises with one userid; the ability to restrict authorized users to specific Intranet applications and databases based on applications ordered by the customer; and the ability for users to restrict view and/or update capabilities within an application or data set, i.e., customers may provide or restrict views of their "enterprise" data to subgroups within their organization.

By utilizing the system of the present invention, customers no longer have to place manual calls to order entry hubs when requesting order transactions. For example, users may be added to the system without an enterprise's support team intervention. In sum, customers may manage their communications services in a secure environment and also, for example, monitor their network traffic via the Internet, as well as have a capability to add products and services to their account, in an automated fashion and all in one session without having to enter and exit the individual application services separately, and without having to contact a customer support representative.

Figure 7:
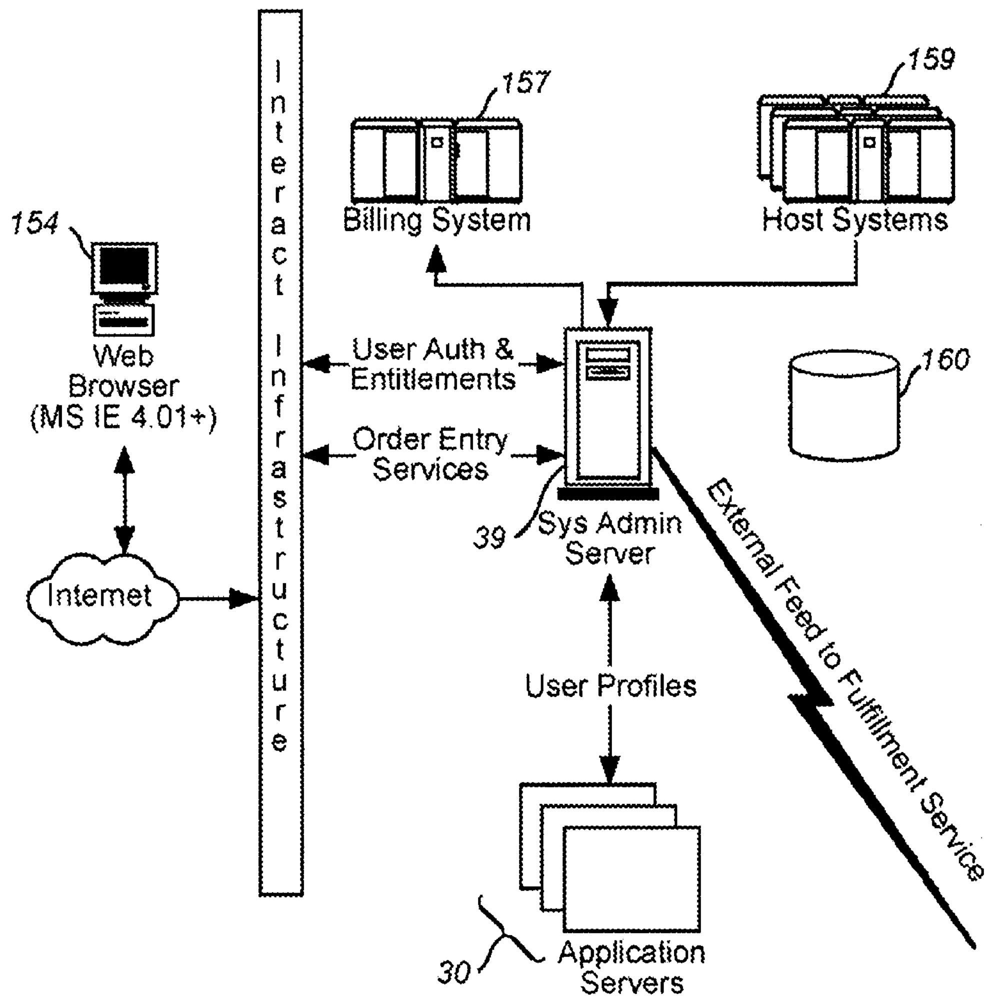
FIG. 7 illustrates an architectural overview of the StarOE order entry component of the nMCI Interact system.

FIG. 7 illustrates a general architectural overview of the StarOE component which includes a StarOE server 39 resident in a midrange computer, and an associated client application 154 running in a user platform having a Web browser, hereinafter referred to as a StarOE client application. The StarOE server 39 processes a number of transaction requests relating to authentication and entitlements, from other application services, both from the client and the application server 158 sides of the network. In addition, the StarOE server 39 receives transaction requests from the StarOE client application. The transactions are typically message driven and comprise requesting transactions and response transactions. The StarOE server 39 responds to the message requests by formulating transaction responses and transmitting them to the requesting servers and clients.

The StarOE Client Application

The StarOE client application 154 is one of the client browser applications running in the Web browser 14, and provides a Web-based GUI interface implemented accordingly and conforming to the networkMCI Interact GUI interface standard for the integrated suite of customer network management and report applications, as described herein. As described, the StarOE client application 154 is launched at the client initiation by the backplane object and generally includes Java applications and applets for providing a common Web-based GUI for interacting with customers at the front-end side.

Figure 16:
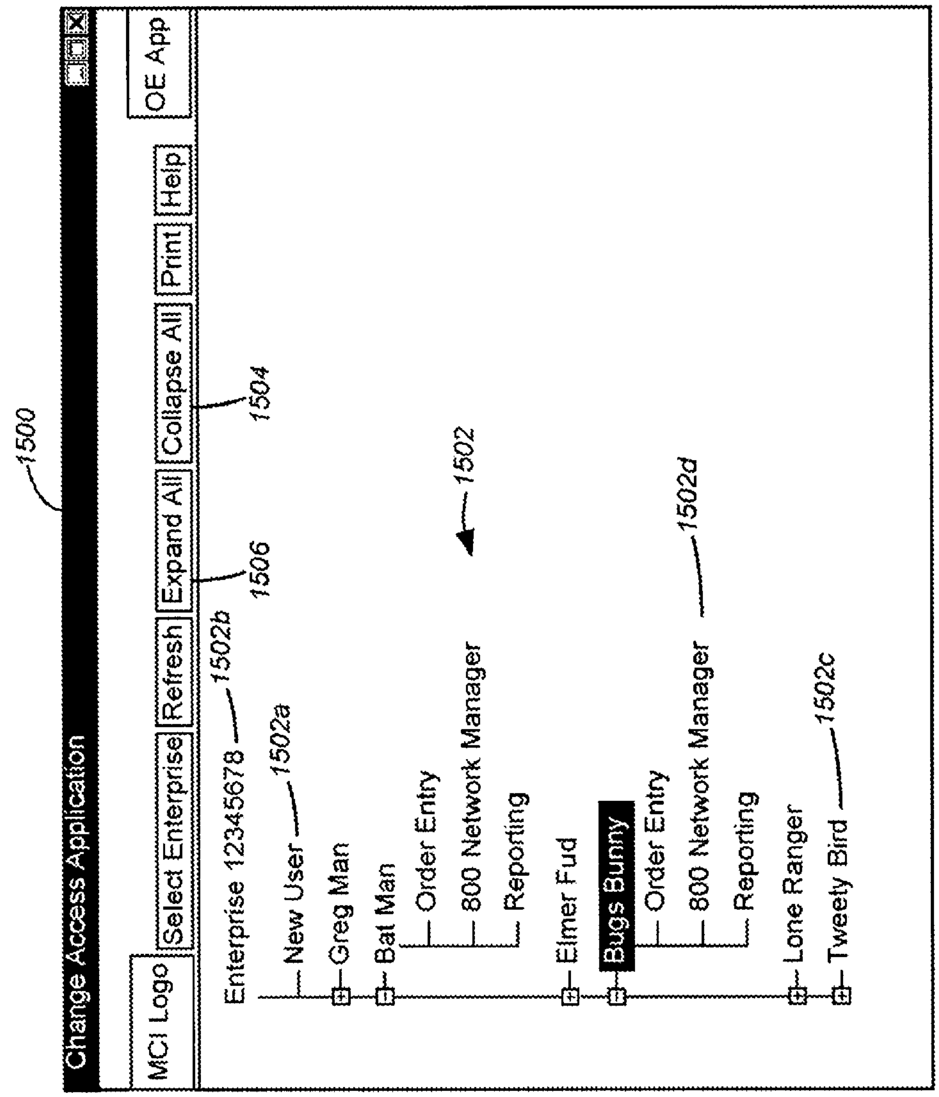
FIG. 16 illustrates an example screen display when the StarOE application is launched.

When a customer launches the StarOE application from the home page, the main window as illustrated in FIG. 16, is presented. From this main window 1500, a customer may select to order and fulfill application services, request user id's, and create user security profiles for the "networkMCI Interact" suite of applications. The main window 1500 includes a menu bar 1506 with options to perform various StarOE tasks. The main window also includes a toolbar 1504, common to all networkMCI Interact applications. The toolbar 1504 has buttons that also perform the various StarOE functions. Typically, the user list is presented, i.e., displayed as a tree 1502, within the main window 1500.

The menu options 1506 include: file menu options which includes a select enterprise option for allowing administrators to open a user list for a different enterprise, or add a new enterprise to their enterprise list, print option, and exit option which shuts down the StarOE application; edit menu option which includes add new application, modify, and delete options; options menu which enables a global security setup for the toll free manager application; view menu which includes options to refresh the screen by retrieving the latest user list for the opened enterprise from the StarOE server and displaying the list on the screen, to expand all nodes in the user list, and to collapse all nodes in the user list; and help menu option which launches the help engine with StarOE help text. The toolbar 1504 also includes the options for a select enterprise, refresh, expand all, collapse all, print and help options.

A typical process flow logic for StarOE client application starts with the home page launching the StarOE client and passing a reference to a common user information object. This object includes the user id, and the default enterprise for that user. The main window 1500 having the menu options 1506 and the toolbar 1504 is then presented. The StarOE client application then sends a transaction message "get StarOE security" including the user id, enterprise id, and the StarOE application code in the message. The StarOE server 39 returns racf id, an access level representing whether the user is an external admin, a member of an account team, an internal admin, or a customer support admin, for example. If the user that launches the StarOE application is an external admin, the user list is displayed immediately since external administrators may view only one enterprise. For external administrators, an enterprise name is retrieved from the StarOE server 39 by sending and receiving a "get user enterprise list" transaction request and response.

If the user is not an external administrator, then a dialog is presented for the user to select which enterprise to view. When user selects an enterprise to view, a "get user list" transaction message having enterprise id is sent to the StarOE server 39 to retrieve a list of user ids, a list of applications for each user, an access type for each application, and reporting types for StarWRS (e.g., Toll Free, Vnet, Vision, CVNS). The client application also sends a "get application list" transaction message to retrieve from the StarOE server 39 a list of application codes, description, and an application array position. The user list is then displayed within the main window as shown at 1502.

Every user list has a New User node **1502*a* as the first node under an enterprise 1502*b*. This node may be selected to order a new user. An existing user node 1502*c* may be selected to edit and add new applications for that user. When an existing user node 1502*c* is selected, the edit/add new application options on the menu 1506 is enabled and disabled according to what applications the user already has. An existing user application node 1502*d*** may be selected to edit/modify/delete options within the application.

With regard to user selection of the select enterprise menu option or toolbar button in FIG. 16, the browser displays the web page having a dialog box as shown in commonly owned, co-pending U.S. patent application Ser. No. 09/159,408 entitled AUTHENTICATION AND ENTITLEMENTS FOR USERS OF WEB BASED DATA MANAGEMENT PROGRAMS, the contents and disclosure of which are incorporated by reference as if fully set forth herein, which enables an administrator to work with a different enterprise, as well as add an enterprise to their enterprise list and additionally includes the ability to set up new users or modify various options available to existing users.

During the StarOE add or modify procedure described above, security information regarding customer entitlements for application services may also be initialized as described in commonly owned, co-pending U.S. patent application Ser. No. 09/159,408. For example, a screen may be presented for setting up Toll Free Network Manager ("TFNM") security information and is displayed when TFNM is ordered or modified. Preferably, a user's TFNM security profile includes at least one corp id, with each corp id having an associated racf id. Preferably, a setup security object handles the process of setting up security for each application. A constructor for this object initializes the user id and a modify flag as passed in from the StarOE client application 154. The object retrieves the toll free hierarchy from the StarOE server 39 using the "get hierarchy" message. The client application 154 sends the enterprise id, and toll-free flag in the request, and the StarOE server 39 returns the list of toll-free corp ids for the enterprise. If the modify flag is set, a "get security" message is sent to the server 39 to retrieve the user's TFNM security profile. As a displayed tree structure is loaded with each toll free corp id, racf id is entered by a user. When the submit button is pressed, the setup security object calls its send security method which causes the formatting and sending of "setTFNM security" message to the StarOE server 39. When the StarOE server 39 receives the message, it sets the security accordingly for the TFNM application.

Figure 17:
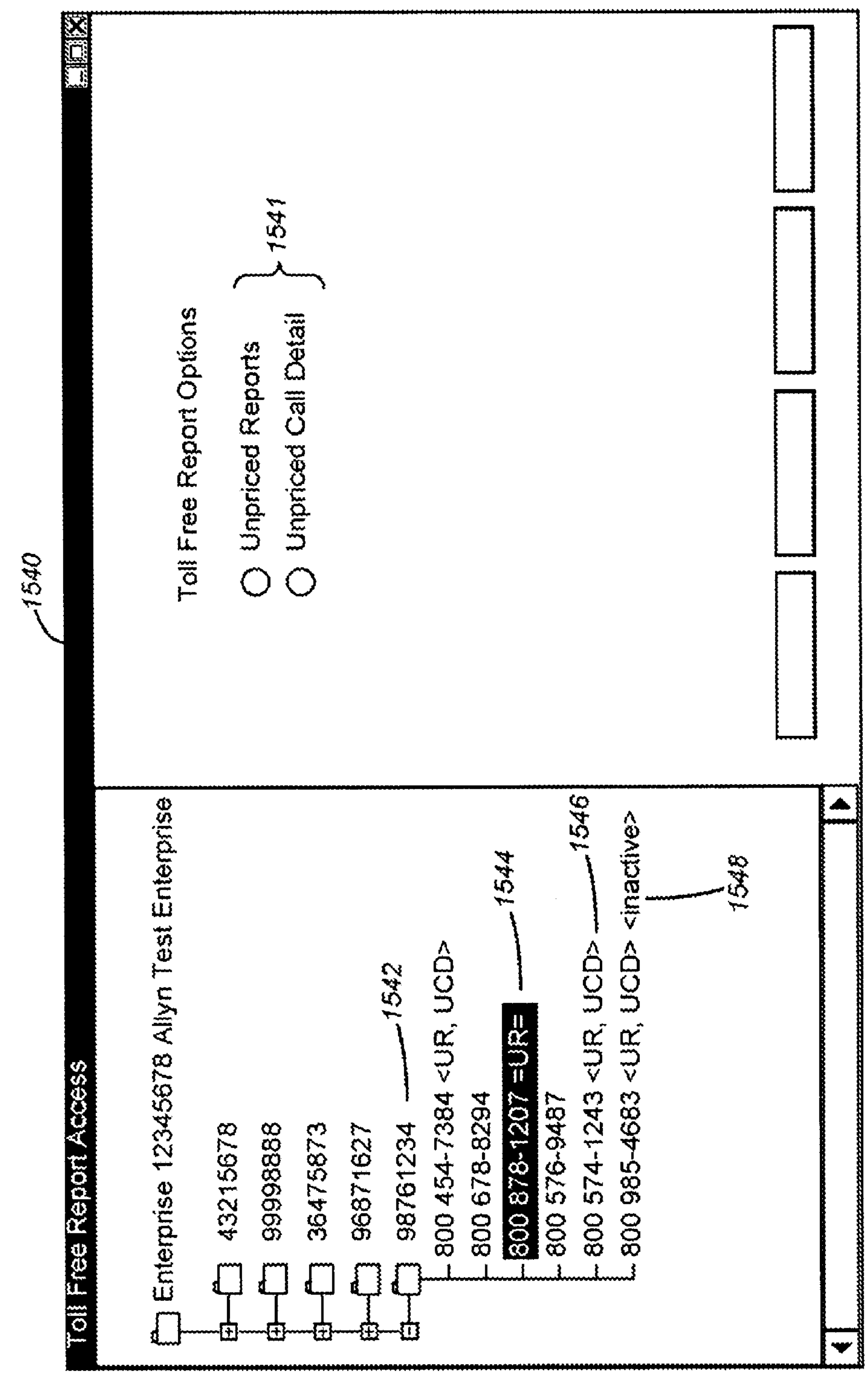
FIG. 17 is a sample StarOE screen 1540 for adding and modifying reporting options which are used by the StarWRS.

The StarOE administration component is also utilized to order, for example, to add or modify, various reporting options used during web based report generation by the nMCI Interact StarWRS system as will be described. FIG. 17 is a sample StarOE screen 1540 for adding and modifying reporting options which are used by the StarWRS. The StarOE displays the toll free hierarchy for security setup when toll free reporting is ordered or modified. The hierarchy includes a list of corp ids for a given enterprise, with each corp id 1542 having a list of toll free numbers 1544 under it. The list may be displayed in a tree format. The reporting options at the toll free number level include unpriced reports (UR), unpriced call detail (UCD), and real time monitor reports.

Typically, a user's toll free reporting security profile includes at least one toll free number with at least one reporting option associated therewith. The client application 154 generally invokes an object to handle the reporting option changes and passes in the user id and a modify flag. This object then retrieves the toll free hierarchy from the StarOE server 39 using the "get hierarchy" message. The client application 154 sends the enterprise id, and toll free flag in the request, whereby, the server 39 returns the list of toll free corp ids for the enterprise. If a modify flag is set, a "get toll-free security" message is sent to the server to retrieve the user's toll free security profile.

As each corp id is expanded, a "get toll-free numbers" message is sent to the server 39 asking for all the numbers for the corp id selected. As each toll free number is added, a search in the user's profile for that number is conducted. If the number is found, the report options are added next to number text as shown at 1546. Furthermore, if the number has been deactivated, a text "<inactive>", for example, is added to the display as shown at 1548. The inactive numbers are not modifiable. When the unpriced reports or unpriced call detail check boxes 1541 are changed, the text next to the toll free numbers selected reflects the state of the check box. The check boxes depict report options to which a user has access for toll free numbers. When more than one toll free number is selected, the check boxes are marked unchecked. When a submit button is pressed, the object calls its send security class method which causes the formatting and sending of a "set user toll-free security" message to the StarOE server 39.

It should be understood that besides performing various order entry and administrative functions for the TFNM application, other application services, including reporting for VNET, Vision, Broadband, Call Manager, and invoice reporting may be ordered and the security information pertaining to each application may be modified in a similar manner.

StarOE client application 154 particularly provides screen displays by invoking associated class objects launched by the backplane unit as described above. The StarOE client application 154 employs a Java application program and is implemented by extending the COApp class, one of common objects provided and utilized in the present invention.

Because the client program 154 is not implemented as an applet, and also because the client program 154 employs the container Frame for customer display windowing purposes, the client program 154 runs, to a degree, independent of the browser within which the backplane is deployed.

Referring back to FIG. 7, the StarOE client application interacts with the StarOE server in providing various order entry functions for all applications as described above and, as described herein with reference to the back-end functionality of the nMCI Interact system. Communications between the StarOE client 154 and the server 39 typically use TCP/IP, running a UNIX process listening in on a known TCP port.

Figure 9:
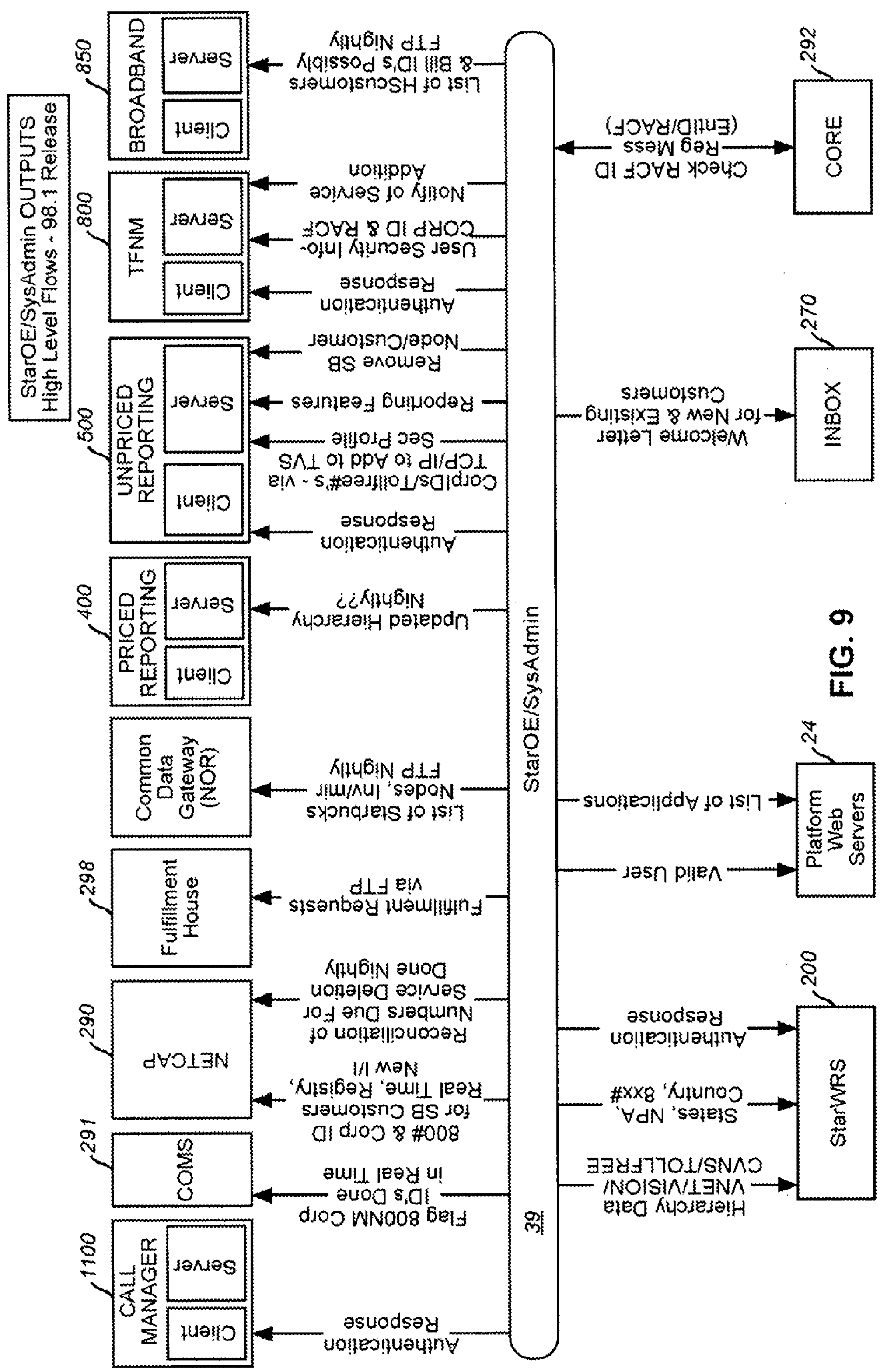
FIG. 9 is an output process flow diagram, illustrating outputs from the StarOE order entry component of the nMCI Interact system.

In the preferred embodiment, as shown in FIG. 7, the StarOE server 39 provides a number of processes for performing a number of specific functions. For example, a fulfillment process monitors new customers being added to the system and notifies a fulfillment house 298 accordingly (FIG. 9). The fulfillment house then may send appropriate subscription packages according to the information received from the fulfillment process to the new customer. Another process, a reconciliation process, may handle synchronization of data with a mainframe system database and also with databases associated with the individual fulfilling systems. Yet another process, a billing process, may handle directing billing information to different billing streams 157 (FIG. 7).

The StarOE server 39 further maintains a database 160 for storing all the "networkMCI Interact" users and their security information such as passwords and application entitlements and hierarchies describing the user's access privileges to specific application services/sub-services which may be requested by other application servers and clients in the network. Generally, the hierarchies are customer-defined during the order entry process, and describe the subdivision of calls into nodes arranged in a n-way tree. The "networkMCI Interact" back-end servers apply the hierarchy definitions to their data at report time when generating reports, typically as queries on a node-by-node basis to the result data set which was extracted using any other criteria supplied. The trees of the hierarchies have essentially arbitrary complexity, i.e., the number of nodes is unlimited. Each node is assigned calls according to a template of conditions. Conditions may be defined as a combination of one or more ANIs, corp IDs, ID codes, Card numbers, account codes, location/node ids, etc. These filters can be applied at any node in the tree. The hierarchies may be applied as both selection criteria (e.g., "report on all calls at these nodes or their descendants", in combination with other criteria) and roll-up targets (e.g., group the results in this report at this level in the tree). These entitlements and hierarchies may be modified via the StarOE client application 154 executed at the customer workstation 20.

Referring to FIG. 7, a process running in a StarOE client application process 154 sends transaction request messages via the nMCI Interact infrastructure, comprising, e.g., the web server cluster 24 and a dispatcher server 26 (FIG. 2), to the OE server 39. The StarOE server 39 responds to requests by searching the security profile for the information requested, formulating appropriate transaction response messages and transmitting them back to the requesting process. As an example, other during the login procedure, the client login process formulates a transaction message including a user name/password and a validation request for a given customer. The StarOE server 39 looks for the matching name/password pair in the security profile for the customer, and if the name/password pair is found, the server 39 formulates a valid user message response for the login process running in the client platform, including in the message the enterprise id, time zone, user id and password information and transmits the response via TCP/IP back to the login process. When the StarOE server 39 detects that the password has expired, the server 39 notifies the customer, via the client application 154 to change the password. The changed password is sent to the StarOE server 39 formatted in a message interface, "change password request," for example. The server 39 upon receiving the message updates the password for the given user in its user profile stored in StarOE database 160, and responds with appropriate return codes to the StarOE client 154. The login process, upon receiving the response may then continue with its normal course of processing.

Another example of a service provided by the StarOE is retrieving an application entitlement list for a given customer. As described briefly above, an entitlement describes a privilege or authorization that a customer has. It describes what applications a customer may access and also describes what the customer can do within that application. In addition, it describes what back-end services that application and customer combination may access. For example, a customer may be entitled to use or access many applications and for each application, the customer can have a different set of entitlements. Thus, entitlements may come in two different sets: a first set specifying what the customer may do within the application, e.g., allow the customer to have update access to a particular view and only read-only access in a different view; and, a second set specifying what back-end services this particular application and customer may access.

As described previously, all the information relating to entitlements for a given customer is stored in customer profile database 160 located with the StarOE server. When the backplane requests via TCP/IP the entitlement transaction, for example, in a "get application list" request message, the security module retrieves and transmits back via TCP/IP to the backplane the list of authorized applications accessible by a given customer in a transaction response. The backplane uses the list to determine which buttons on the "networkMCI Interact" home page should be activated, thus controlling access to products. Similarly, individual back-end application servers 158 may make a request for entitlements within that application for a given customer. For example, the reporting component of the "networkMCI Interact" system, herein referred to as "StarWRS" web-based reporting system which provides a customer with their network priced and un-priced call detail data, generates a request for hierarchy data for Vnet, VISION, CVNS and Toll-free customers whenever reports need be generated. In response, the StarOE retrieves the corresponding hierarchy data and transmits them in real time to the StarWRS system as will be described.

In providing the authentication, entitlement, and hierarchy information, including those described above, the StarOE server database 160 stores user profiles locally. Additional data needed are typically accessed from the enterprise host systems 159. The StarOE server 39 may be implemented as a concurrent server allowing simultaneous multiple client connections. The server 39 listens on a known port, and when a client connects, the server 39 forks a new process to handle the client connection. The server 39 may also implement a thread to handle each client connection.

As further described in the herein incorporated, co-pending U.S. patent application Ser. No. 09/159,408, the StarOE server 39 is preferably implemented utilizing object oriented programming (OOP). As an example, when a "get hierarchy list" message is initiated at the client application to invoke retrieval of a toll free corp id list from the server 39, a "Hierarchy" class may be instantiated which includes a Get ( ) method to determine which Hierarchy product is to be retrieved (e.g., Toll-free, Vnet/CVNS, or Vision) and to return the appropriate information. Another object may be invoked to format the data into a response message and return the message back to the client. As another example, when a "get application list" request message is initiated at the client application, an "Application" class may be instantiated which encapsulates the interface into a database table (not shown) having applications information. Particularly, the Get( ) method in this class accesses the Applications table in the database and returns the list of application codes and their descriptions. The details of the message format, including request and response messages, are described in commonly owned, co-pending U.S. patent application Ser. No. 09/159,408.

Figure 8:
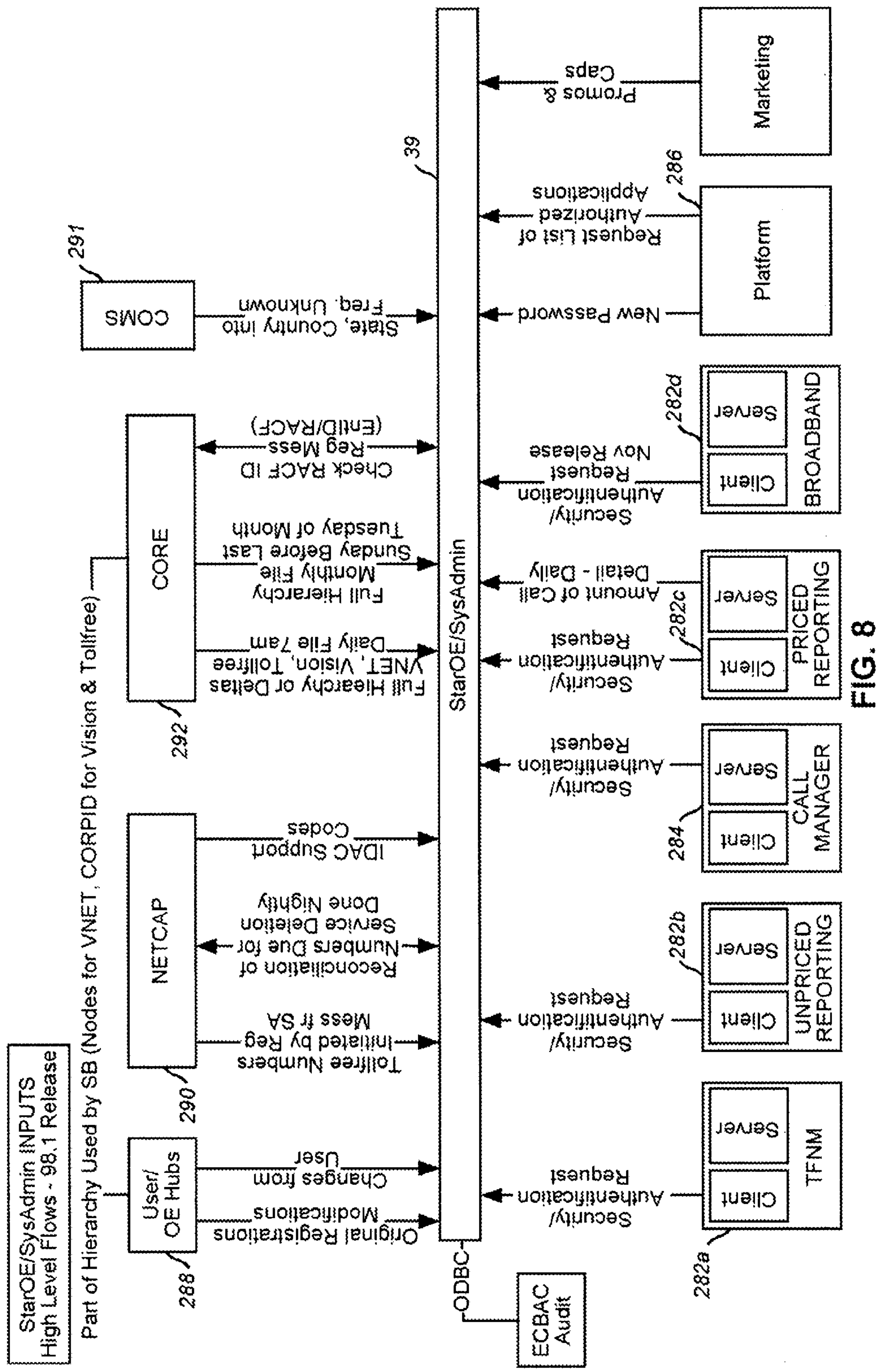
FIG. 8 is an input process flow diagram, illustrating inputs to the StarOE order entry component of the nMCI Interact system.

FIG. 8 is a high level input process flow diagram, illustrating inputs to the StarOE server 39 of the nMCI Interact system. Through the StarOE server, the integrated interface system of the invention handles a wide variety of key functions for the suite of network applications. Each application will, herein forth, be also referred to as a fulfilling system, having a fulfilling client and a fulfilling server. The system of the present invention handles security and authentication requests from both the client and server sides of each fulfilling system as shown in 282*a–d* and 284. These requests are automatically generated whenever the customer makes a request of the server. For example, they are generated when a customer clicks on the icon from the homepage (FIG. 4) for a service such as TFNM.

In addition, as mentioned, when a customer first logs on, the customer is presented with a dialog box prompting for user ID and password. When the customer clicks a submit button, for example, the backplane (or platform) verifies the customer is valid by inquiring with the StarOE system as shown in 286. The return response is either "invalid user/password" or "valid user." When the customer has been authenticated, the customer is then presented with a list of authorized applications. This list determines which buttons, for example, representing each application are active, thus controlling customer access to products and services.

In addition, also shown in 286, the customer may be issued a temporary password with the customer's fulfillment package, which enables a user to log into the system the first time.

Information may also be entered and requested by a number of sites other than a user platform. For example, order entry "OE" Hubs 288 may enter information directly into the StarOE database 160 to register new customers to the integrated suite of network applications. They may also access the data in StarOE directly to modify customer information, and to add or remove subscribed services.

Other inputs to the StarOE server may include entitlement data from a legacy order entry system referred to as Network Capabilities System ("NetCap") 290 and from a circuit order management system ("COMS") 291. For example, the NetCap mainframe 290 may send the appropriate hierarchy of toll-free numbers for a specific customer in response to registry message registering the new customer to the mainframe 290. The hierarchy of toll-free numbers describes the new customer's entitlements to the TFNM services. This hierarchy may be used by other services in the integrated suite of network applications, for example, the StarWRS reporting application.

Additional authentication and entitlement data may be transmitted from a corporate order entry system ("CORE") 292 which generates two sets of hierarchy files on a daily basis. One set comprises deltas only, the other comprises a full hierarchy. Notification is made to the StarOE when these are available. As described in co-pending U.S. patent application Ser. No. 09/159,408, StarOE performs a reconciliation process to update the hierarchy files. FIG. 9 is an output process flow diagram, illustrating outputs and responses from the StarOE server 39 to the requesting systems and processes. An example of an output is an authentication response to the client side of the individual applications, e.g., call manager 1100, priced reporting system 400, etc., as well as the backplane. In addition, a list of accessible applications for a given customer, is output to the backplane platform via platform web servers 24. The StarOE also outputs various updated data to database systems associated with specific individual applications in the suite of network applications. In addition, the individual fulfilling systems receive messages from the StarOE regarding modifications effected by a customer interaction. For example, as part of the reconciliation process, the StarOE may pass a list of toll free numbers which represent services which are to be discontinued and deleted from Traffic View. Upon receipt of this information, the Traffic View server sends another message to a system responsible for collecting call detail information which system then discontinues collection of call data for the numbers deleted. Another example output to individual fulfilling system is hierarchy data to reporting fulfilling systems 400, 500 when a customer requests reports. The customer hierarchy data is sent in real time by the StarOE for up-to-date report information.

StarWRS

As mentioned herein, and in greater detail in commonly owned, co-pending U.S. patent application Ser. No. 09/159,409 entitled INTEGRATED PROXY INTERFACE FOR WEB BNASED REPORT REQUESTOR TOOL SET, the contents and disclosure of which is incorporated by reference as if fully set forth herein, the data architecture component of the networkMCI Interact system focuses on the presentation of real time (un-priced) call detail data and reports, such as presently provided by MCI's TrafficView ("TVS") Server, and priced call detail data and reports, such as presently provided by MCI's operational data store "StarODS" Server.

Figure 10:
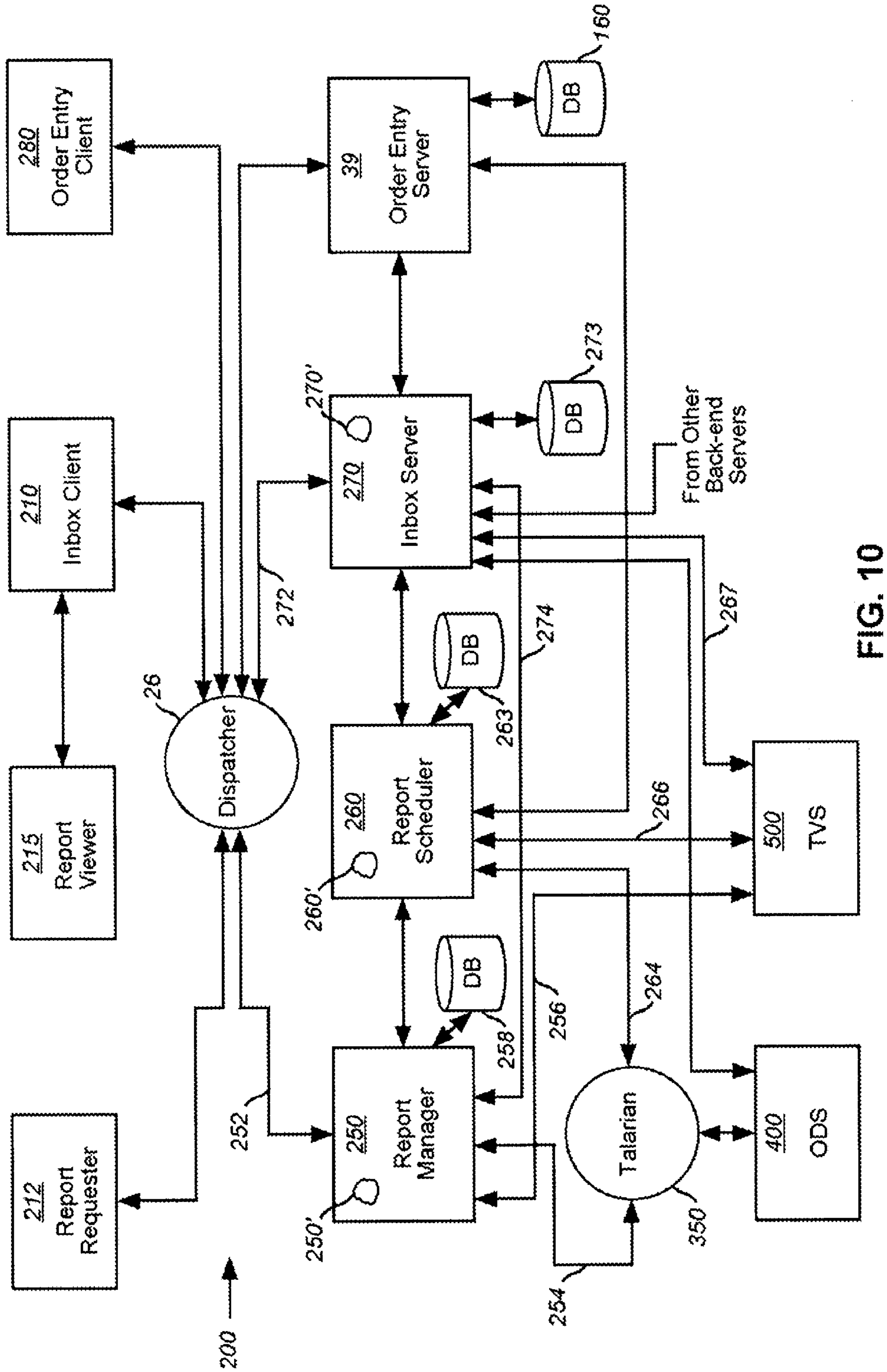
FIG. 10 is a block diagram depicting the physical architecture of the StarWRS component of networkMCI Interact Reporting system.

Referred to as "StarWRS," the WWW/Internet Reporting System 200, as shown in FIG. 10, provides a client, middle-tier service and application proxy components enabling customers to request, specify, customize, schedule and receive their data and account information in the form of reports that are generated by the various back-end application servers. As will now be described in detail, the StarWRS reporting system 200 comprises the following components and messaging interfaces:

1) those components associated with the Client GUI application front end including a report requester client application 212, a report viewer client application 215 and, an Inbox client application 210 which implement the logical processes associated with a "Java Client," i.e., employs Java applets launched from the backplane (FIG. 3) that enable the display and creation of reports and graphs based on the fields of the displayed reports, and, allows selection of different reporting criteria and options for a given report; and, 2) those middle-tier server components enabling the above-mentioned reporting functionality including: a Report Manager server 250, a Report scheduler server 260, and an Inbox Server 270. Supporting the StarWRS reporting functionality as will be described are the StarOE client and corresponding StarOE server 39 applications.

The Report Manager ("RM") server 250 is an application responsible for the synchronization of report inventory with the back-end "Fulfilling" StarODS server 400 and Traffic View server 500; retrieval of entitlements, i.e., a user's security profiles, and report pick list information, i.e., data for user report customization options, from the StarOE server 39; the transmission of report responses or messages to the Dispatcher server 26; the maintenance of the reporting databases; and, the management of metadata used for displaying reports. In the preferred embodiment, the RM server 250 employs a Unix daemon that passively listens for connect requests from the GUI client applications and other back-end servers and deploys the TCP/IP protocol to receive and route requests and their responses. Particularly, Unix stream sockets using the TCP/IP protocol suite are deployed to listen for client connections on a well-known port number on the designated host machine. Client application processes, e.g., report requester 212, desiring to submit report requests connect to RM 250 via the dispatcher 26 by providing the port number and host name associated with RM 250 in a request message. Request messages received by the RM server are translated into a "metadata" format and validated by a parser object built into a report manager proxy 250' that services requests that arrive from the GUI front-end. If the errors are found in the metadata input, the RM 250 will return an error message to the requesting client. If the metadata passes the validation tests, the request type will be determined and data will be retrieved by the fulfilling server in accordance with the meta data request after which a standard response is sent back to the requesting client. As shown in FIG. 10, interface sockets 252 are shown connecting the Dispatcher server 26 and the RM server 250 and, other socket connections 254, 256 are shown interfacing with respective back end servers 400 and 500. In one embodiment, as described in commonly owned, co-pending U.S. patent application Ser. No. 09/074,072 entitled INTEGRATED PROXY INTERFACE FOR WEB BASED DATA MANAGEMENT REPORTS, the contents and disclosure of which is incorporated by reference as if fully set forth herein, a back-end midrange application known as the TrafficView System receives the metadata requests to provide unpriced traffic call detail and reporting data through messaging interface 256 to the Report Manager. Additionally, as described in commonly owned, co-pending U.S. patent application Ser. No. 09/159,684 entitled INTEGRATED PROXY INTERFACE FOR WEB BASED DATA MANAGEMENT REPORTS, the contents and disclosure of which is incorporated by reference as if fully set forth herein, a back-end midrange application known as the StarODS server receives report requests for priced call detail data through a Talarian smart socket messaging interface 350 to the Report Manager. Additionally, as shown in FIG. 10, the priced and unpriced data is FTP'd directly to the Inbox Server and a notification message is sent to the report manager server 250 from the Traffic View server 500. Although not shown in FIG. 10, it should be understood that the RM 250 server can manage reporting data for customer presentation from other back-end and legacy servers including, e.g., Event Monitor and Service Inquiry servers, etc., in order to present to a customer these types of network management and reporting data.

The report manager server additionally utilizes a database 258, such as provided by Informix, to provide accounting of metadata and user report inventory. Preferably, an SQL interface is utilized to access stored procedures used in processing requests and tracking customer reports. A variety of C++ tools and other tools such as Rogue Wave's tools.h++ are additionally implemented to perform metadata message parsing validation and translation functions.

The Report Manager server 250 additionally includes the scheduling information, however, a report scheduler server component passes the report request to the back-end fulfilling servers 400, 500 at the scheduled times.

As shown in FIG. 10, the Report Scheduler ("RS") server component 260 interfaces directly with the Report Manager server 250 to coordinate report request scheduling and processing. It should be understood that the respective report management and scheduling functions could be performed in a single server. Particularly, the RS 260 is a Unix program deploying Unix stream sockets using the TCP/IP protocol suite to send requests to the back-end fulfilling servers such as the StarODS server 400, TVS server 500, at pre-specified times, and receives their responses. As shown in FIG. 10, RS interface socket connections 264, 266 are shown interfacing with respective back end servers 400 and 500. In the case of priced billing data from StarODS 400, report requests are published by the RS server 260 to a pre-defined subject on the Talarian Server. When handling other incoming messages published by back end servers using Talarian SmartSockets 4.0, another daemon process is necessary that uses Talarian C++ objects to connect their message queue and extract all messages for a given subject for storage in a database table included in database 263. Each message includes the track number of the report that was requested from the fulfilling server.

From the report requester interface, the user may specify the type of reporting, including an indication of the scheduling for the report, e.g., hourly, daily, weekly or monthly. For priced data the user has the option of daily, weekly, or monthly. For real-time, or unpriced data, the user has the option of hourly, daily, weekly or monthly. The report scheduler interface additionally enables a user to specify a pager or E-mail account so that an e-mail or pager message may be sent to indicate when a requested report is in the Inbox server 270.

The Inbox Server component 270 serves as the repository where completed report data and event notification data are stored, maintained, and eventually deleted and is the source of data that is downloaded to the client user via the dispatcher (FIG. 2) over a secure socket connection 272. It is also a Unix program that is designed to handle and process user requests submitted in metadata format using an Informix database. Once report results are received from the StarODS 400 and TVS 500 and any other back-end or fulfilling servers (not shown), the Report Manager server 250 communicates the corresponding report metadata to the Inbox server 270 over socket connection 274 as shown in FIG. 10. The metadata will be stored in the Inbox server database 273 along with the report results. Thus, if the metadata is required to be changed, it will not interfere with the information needed to display the reports included in the Inbox. Additionally, as shown in FIG. 10, the Inbox server interfaces with the report scheduler to coordinate execution and presentation of reports.

As described above, the StarOE server 39 and database 160 is the repository of user pick lists and user reporting entitlements. Particularly, it is shown interfacing with the Inbox server 270 and report scheduler servers 260. The Report Manager server does include information in the report metadata that will tell the Report Requestor client application it needs to get information (e.g., Pick Lists) from the StarOE server 39.

With regard to the front-end client GUI components, the above-mentioned Inbox client application 210 functions as an interface between the client software and the Inbox server 270 for presenting to the customer the various types of reports and messages received at the Inbox including all completed reports, call detail, and news. Preferably, the messages for the user in the inbox are sorted by type (report, call detail) and then by report type, report name, date, and time.

Particularly, the Inbox client application uses the services of the backplane (FIG. 3) to launch other applications as needed to process report messages. The inbox will also use the services of the data export objects to provide a save/load feature for inbox messages, and, is used to provide a user-interface for software upgrade/download control. Inbox messages are generated by the versioning services of the backplane; actual downloads will be accomplished by a request through the inbox.

In the preferred embodiment, the inbox client is able to receive information on multiple threads to allow a high priority message to get through even if a large download is in progress. Typically, the browser is configured to allow more than one network connection simultaneously, i.e., the polling thread on the client uses a separate connection to check for new messages, and starts a new thread on a new connection when a new message is detected. In this way, multiple messages may be downloaded simultaneously.

The Report Requestor application 212 is a client application enabling user interaction for managing reports and particularly includes processes supporting: the creation, deletion, and editing of the user's reports; the retrieval and display of reports based on selected criteria; the display of selected option data; and the determination of entitlements which is the logical process defining what functionality a user can perform within the StarWRS application. In the preferred embodiment, a Report request may be executed immediately, periodically, or as "one-shots" to be performed at a later time. As described herein, the report scheduler service maintains a list of requested reports for a given user, and forwards actual report requests to the appropriate middle-tier servers at the appropriate time. Additional functionality is provided to enable customers to manage their inventory, e.g., reschedule, change, or cancel (delete) report requests.

The Report Viewer application 215 is a GUI Applet enabling a user to analyze and display the data and reports supplied from the fulfilling servers such as ODS 400, Traffic View (TVS) 500, and other systems such as Broadband and toll free network manager. Particularly, all reporting is provided through the Report Viewer client application 215 which supports text displays, a spreadsheet, a variety of graphic and chart types, or both spreadsheet/graph simultaneously, and, is launched from the inbox client 210 when a report is selected. The Report Manager 250 includes and provides access to the metadata which is used to tell the Report Requestor what a standard report should look like and the "pick-list" options the user has in order for them to customize the standard report. It is used to tell the Report Viewer client how to display the report, what calculations or translations need to be performed at the time of display, and what further customization options the user has while viewing the report. It additionally includes a common report view by executing a GUI applet that is used for the display and graphing of report data and particularly, is provided with spreadsheet management functionality that defines what operations can be performed on the spreadsheet including the moving of columns, column suppression, column and row single and multiple selection, import and export of spreadsheet data, printing of spreadsheet, etc. It is also provided with report data management functionality by defining what operations can be performed on the data displayed in a spreadsheet including such dynamic operations as sorting of report data, sub-totaling of report data, etc.. Furthermore, the report viewer 215 is provided with functionality enabling the interpretation of Meta Data; and, functionality enabling communication with the Backplane (FIG. 3). The report viewer application 215 will also be able to accept messages telling it to display an image or text that may be passed by one of the applications in lieu of report data (e.g., Invoice, Broadband report, etc.)

By associating each set of report data which is downloaded via the Inbox server 270 with a "metadata" report description object, reports can be presented without report-specific presentation code. At one level, these metadata descriptions function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels.

The same metadata descriptions may be used to provide common data export and report printing services. When extended to describe aggregation levels of data within reporting dimensions, it can even be used for generic rollup/drilldown spreadsheets with "just-in-time" data access.

The metadata data type may include geographic or telecommunications-specific information, e.g., states or NPAs. The report viewer may detect these data types and provide a geographic view as one of the graph/chart types.

An overview of the report request/scheduling process 600 implemented by StarWRS Report Manager and Report Requestor tools will now be described.

After preliminary logon, authentication and verification of StarWRS web based reporting entitlements, as described above with respect to FIGS. 4–6, the user may select the Report Requestor icon 83(*a*) from the home page screen display 79(*a*) of FIG. 5(*a*), which initiates display of a StarWRS report requester web page.

FIG. 12(*a*) illustrates an exemplar dialog box 1550 provided on the report requester web page that is presented to the user after the logon and authentication process. From this dialog, the user is enabled to edit an existing report maintained in the report manager inventory, by selecting "edit" button 1551, generate a new report by selecting "new" button 1553, copy an existing report by selecting button 1554, or delete an existing report by selecting button 1555. When creating a new report or editing an existing report, the user may enter the desired reporting options including: 1) the report product, as indicated by menu 1558, and which includes toll-free, vision, and Vnet options; 2) the report category, as indicated by menu 1559, and which includes options for: analyzing traffic, call center, call detail, checking calling frequencies, financial, marketing, monitoring usage, and telecommunications categories; 3) the report type, as indicated by menu 1560, and which includes priced call detail data or traffic data options; and 4) a report direction, as indicated by selection areas 1563, and which includes inbound, outbound, or both directions.

Figure 11A:
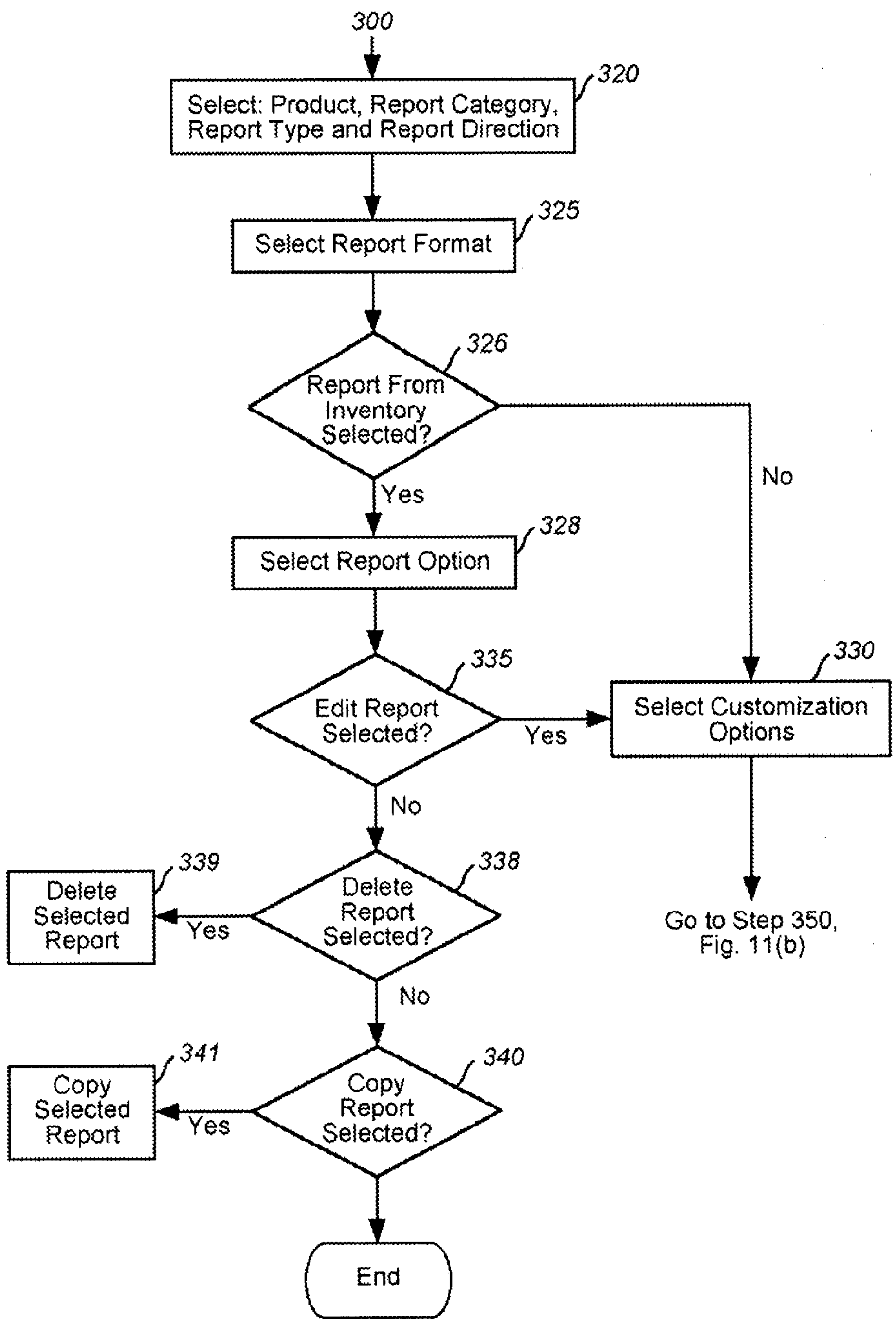
FIGS. 11(*a*)–11(*c*) illustrate flow diagrams depicting the report request/scheduling process 600 implemented by StarWRS Report Manager and Report Requestor tools of the invention.
Figure 11B:
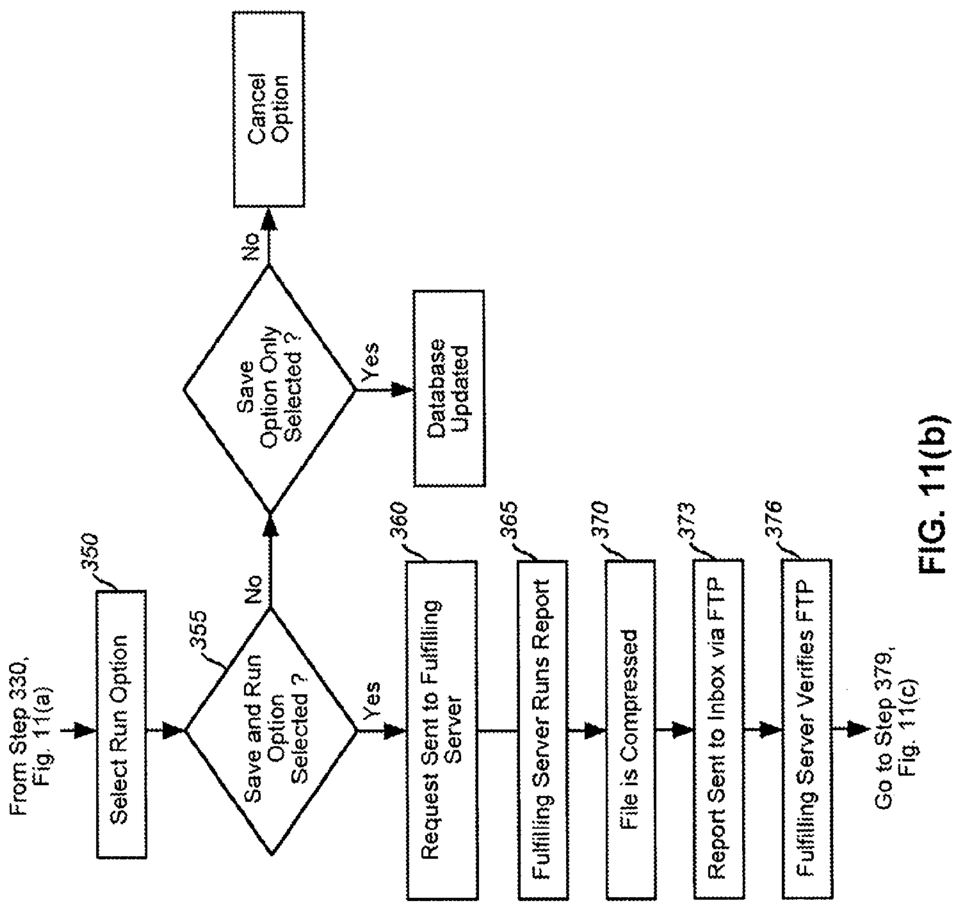
Figure 11C:
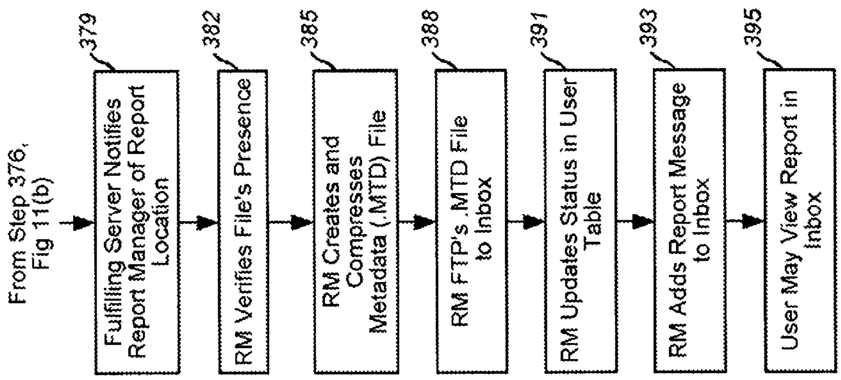
Figure 12A:
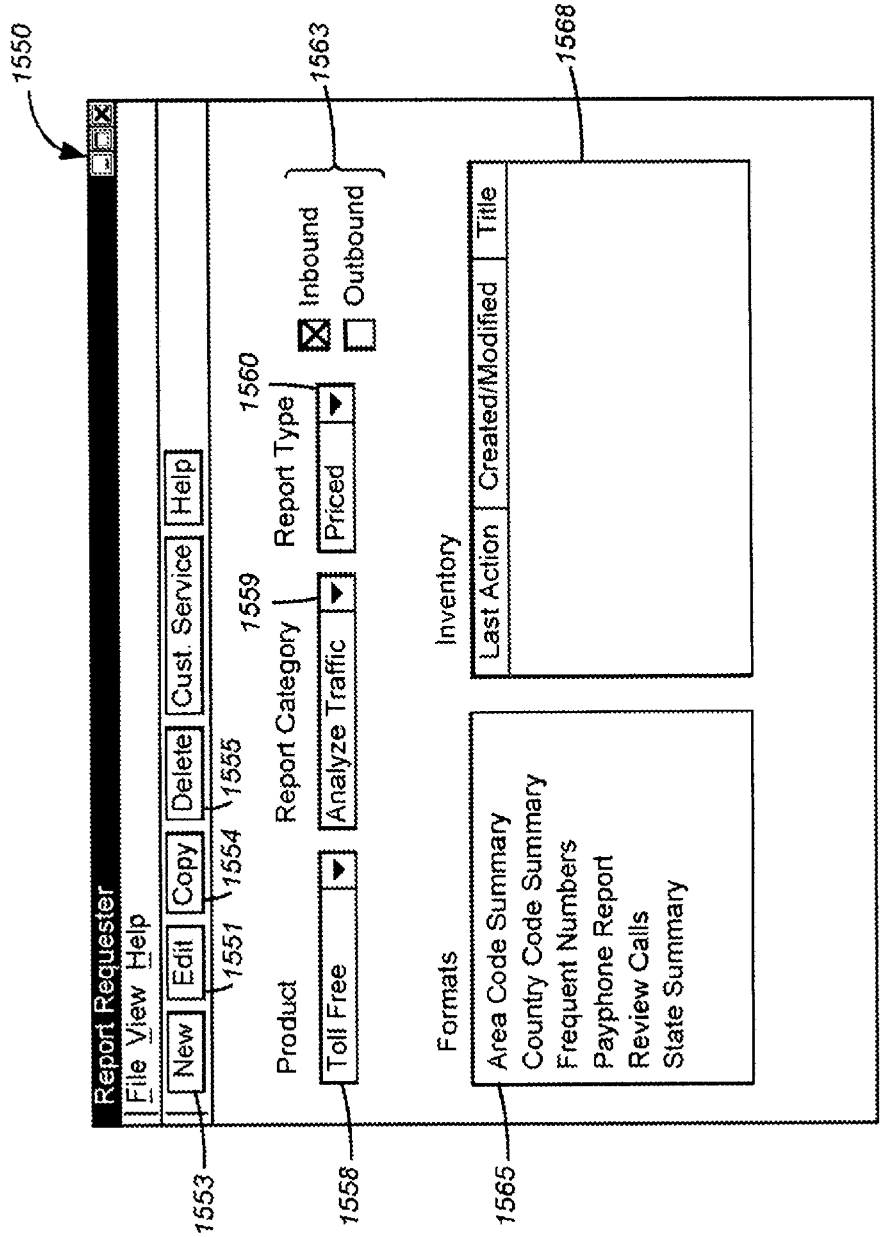
FIGS. 12(*a*)–12(*h*) illustrate various examples of report requester screen dialogs enabling user customization of report requests.
Figure 12B:
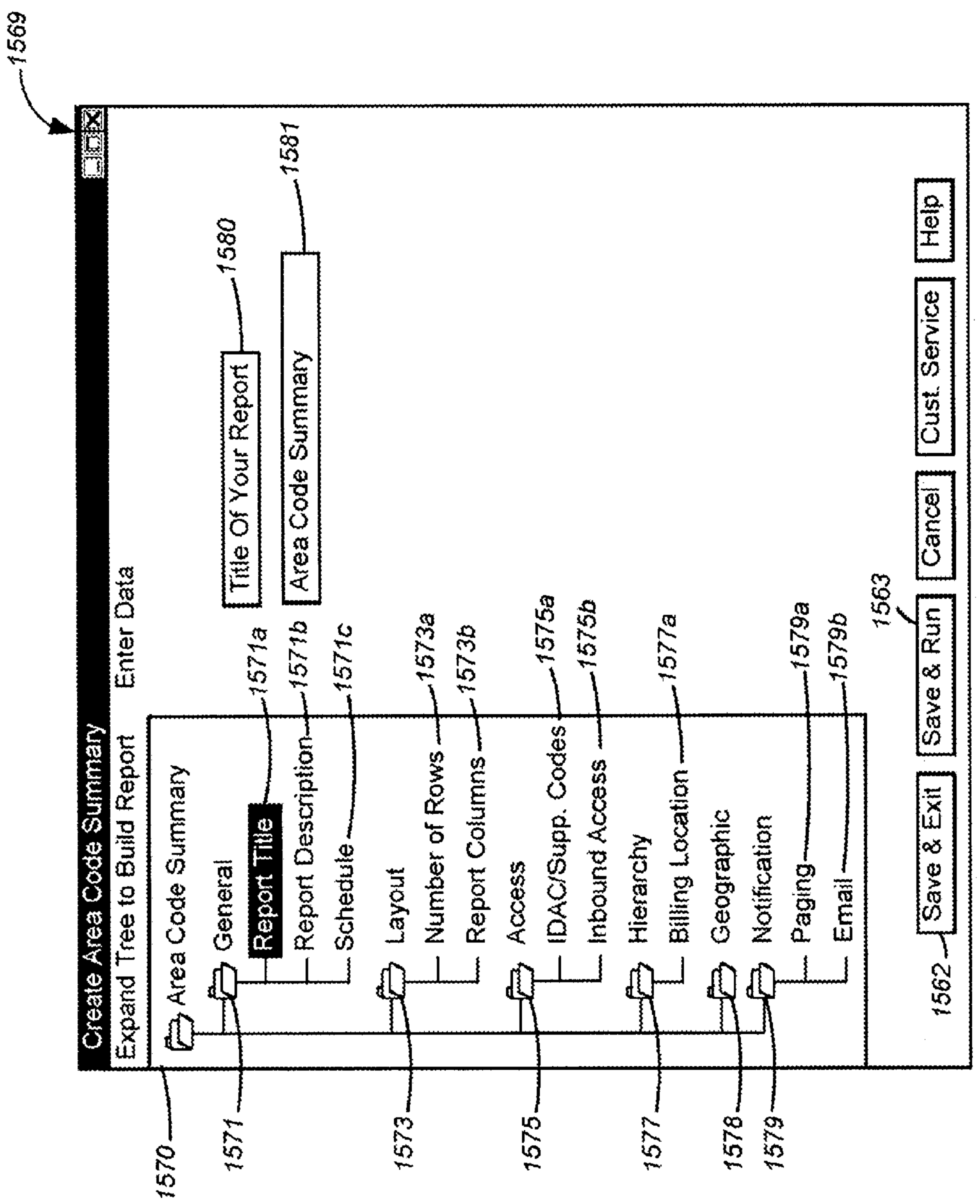
Figure 12C:
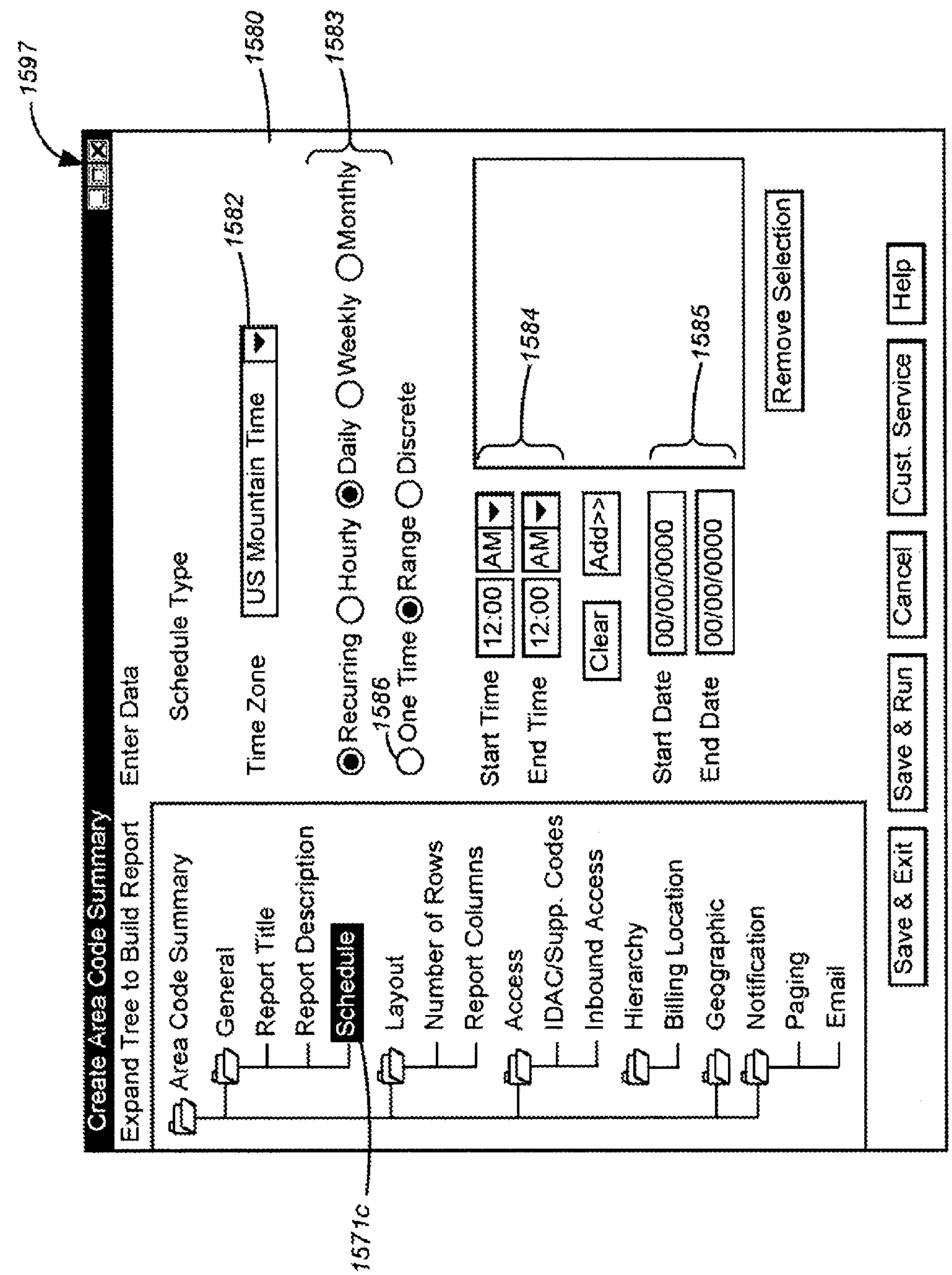
Figure 12D:
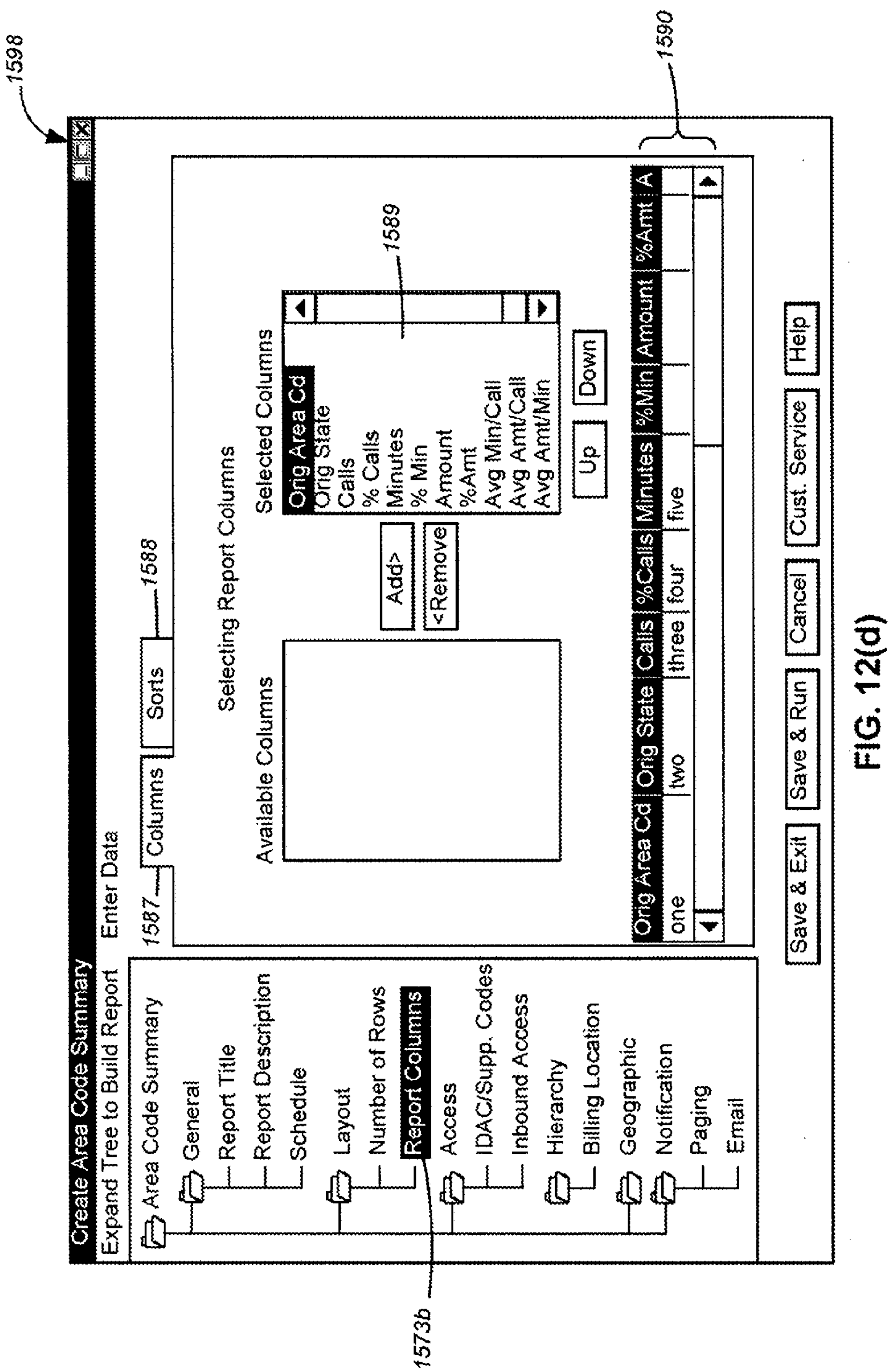
Figure 12E:
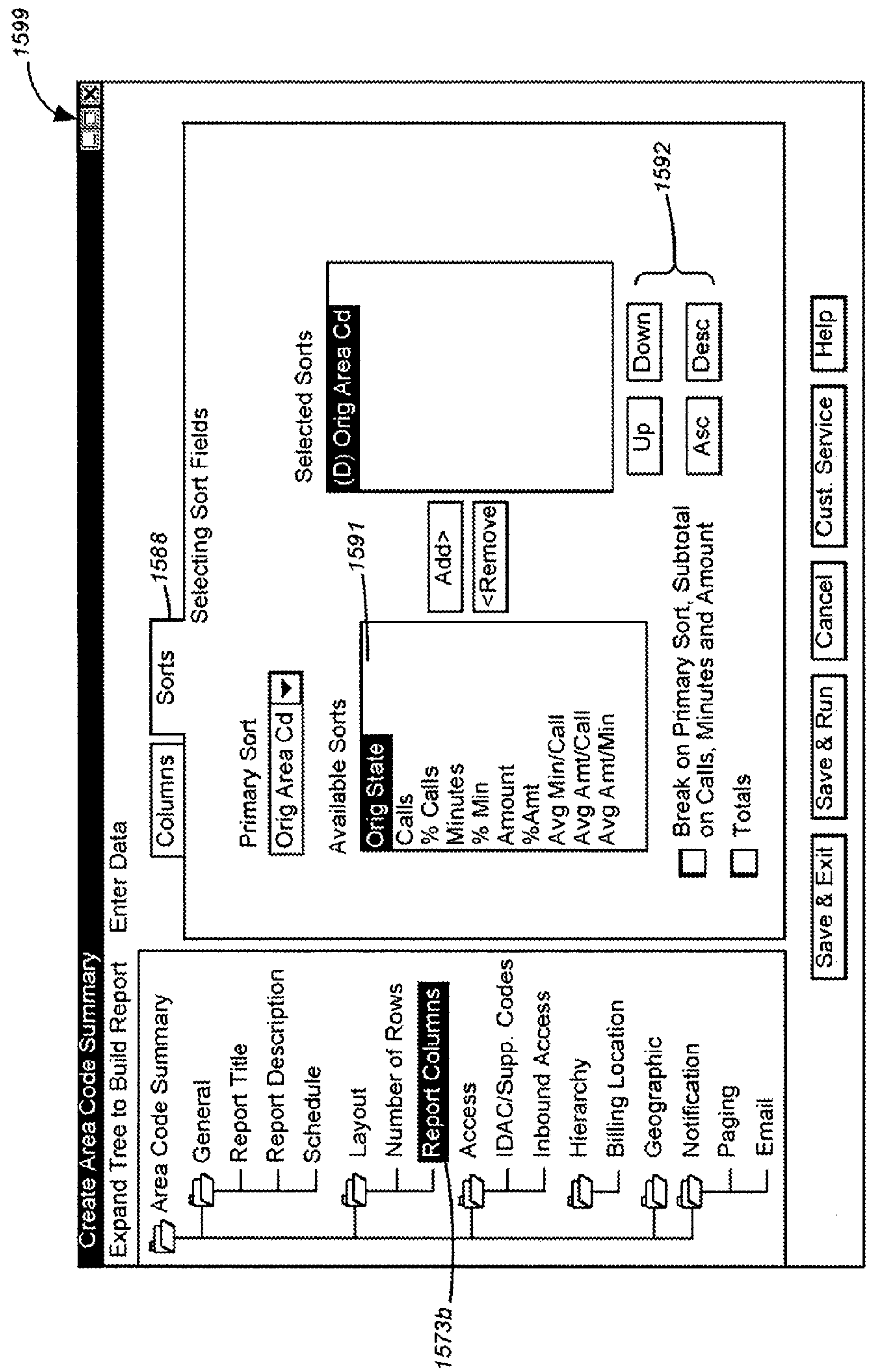
Figure 12F:
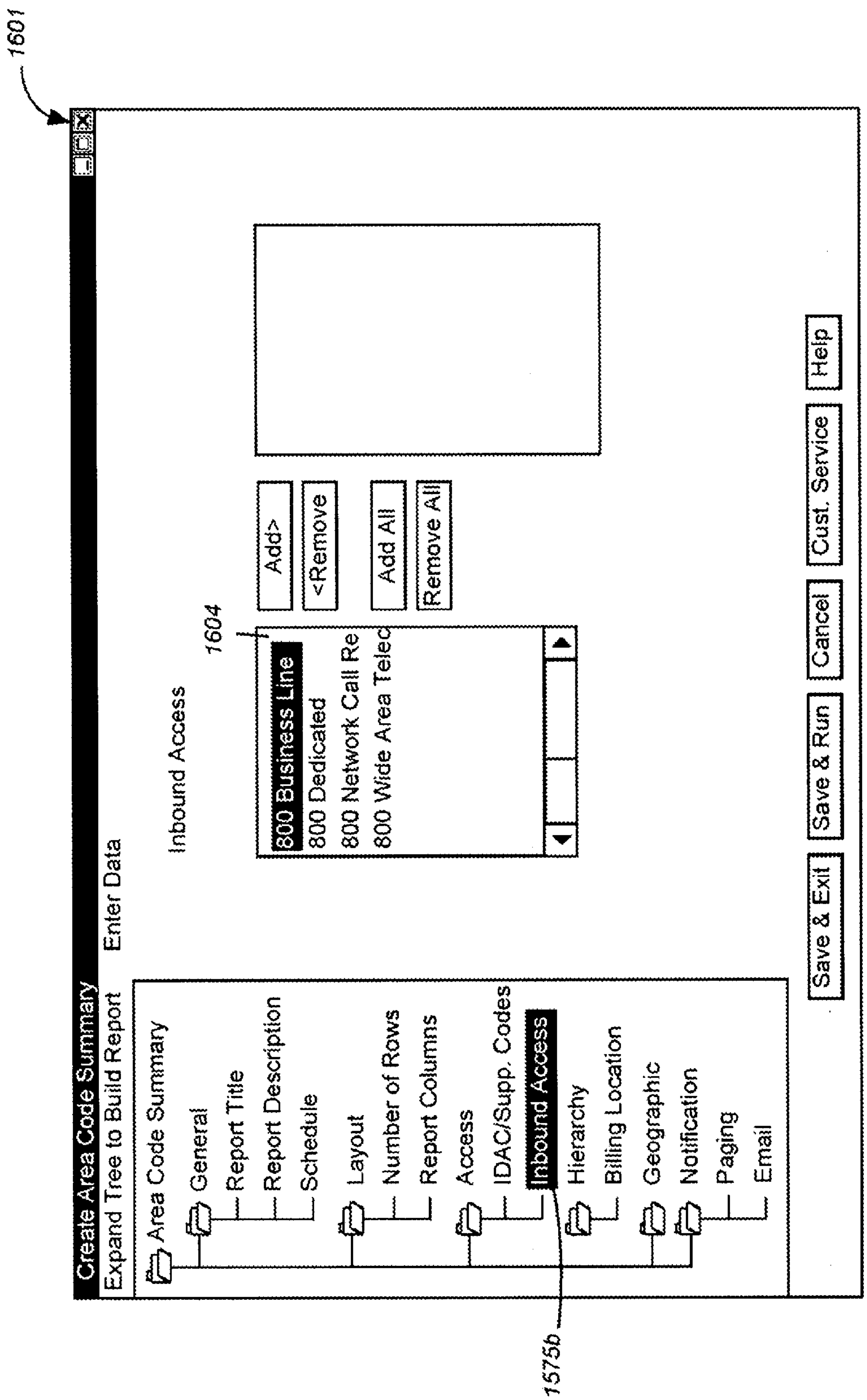
Figure 12G:
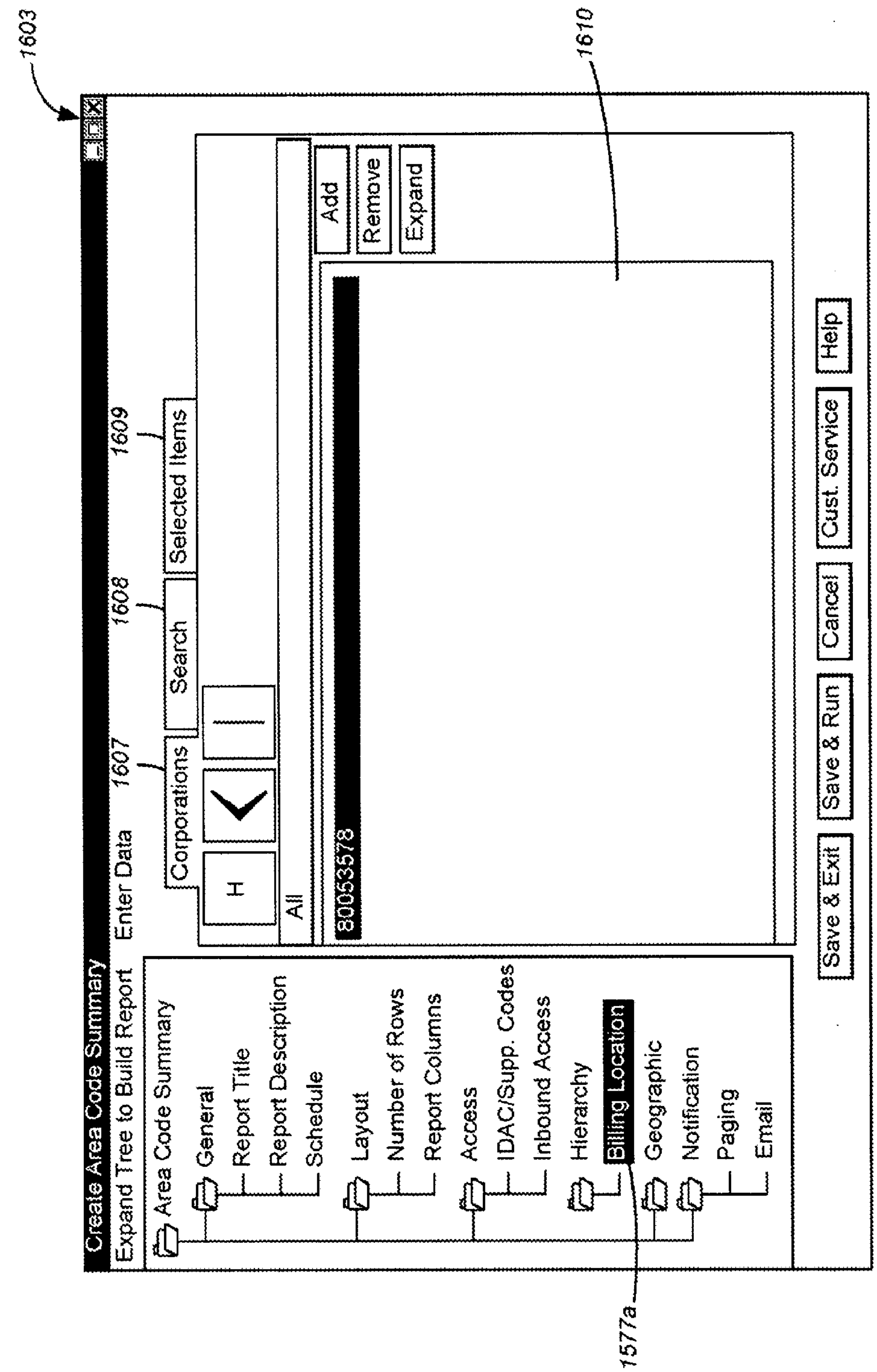
Figure 12H:
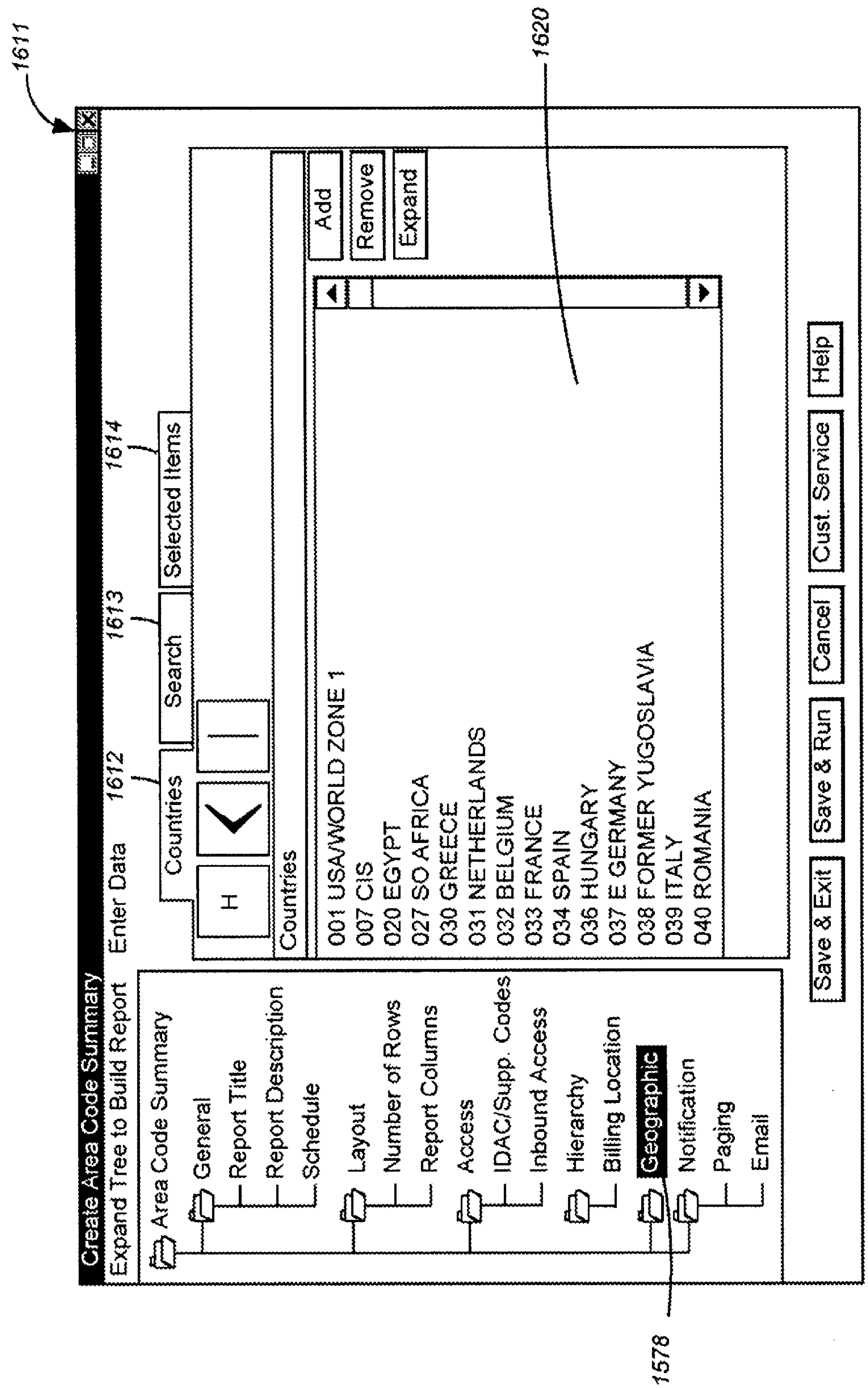

Referring to the flow chart of FIG. 11(*a*) depicting the StarWRS reporting options, user selection of the report product, report category, report type, and report direction, is indicated at step 320. Additionally, at step 325, the user may select the report format associated with a reporting category. For example, in the screen display of FIG. 12(*a*), associated with the analyze traffic report category, the report format options indicated in selection field 1565 include the following: area code summary, country code summary, state summary, frequent numbers, payphone report and review calls options. For the financial report category, report formats include: longest calls, most expensive calls, payphone report, and area code summary; for marketing report category, report formats include: country code summary, state summary, frequent numbers, frequent area code summary, frequent state, and frequent cities. For the telecommunications report category, report formats include: call duration summary; for the call center report category, report formats include: most active toll free numbers, state summary, and country code summary. For the monitor usage report category, report formats include: longest calls, most expensive calls, most active calling card and most active toll free numbers. For the check calling frequencies report category, report formats include: frequent numbers, frequent area code, frequent state and frequent cities. It should be understood that enablement of any of these reporting options is based according to predefined user entitlements. That is, as described above, a "Get User Security" message with a reporting application set, and a "Get User Report Security" message are sent to the StarOE server 39 via the Dispatcher server 26 to retrieve that user's detailed security profile (entitlements) for a user that has the reporting application option. These entitlements include a list of all the report products, i.e., Vnet, Vision, Toll free, report types (priced or unpriced) and the report categories that are available for that user.

In accordance with the user report selections, if a report had already been created and maintained in the report manager database, it will be displayed in the report inventory field 1568 of FIG. 12(*a*). Referring back to FIG. 11(*a*), at step 326, a determination is made as to whether an existing report from inventory is selected. If an existing report is not selected then the user is prompted to generate a new report according to customization options that the user is entitled for the selected report product, category, type, etc., as indicated at step 330. If an existing report is selected at step 326 based on the report product, category, type, etc., then the user is prompted at step 328 to select from among the following options: a report edit option, as shown at step 335; a report delete option, in which case the selected report will be deleted at steps 338 and 339; and, a report copy option, in which case an existing report will be copied, e.g., for subsequent editing, as shown at steps 340 and 341.

Whether creating a new report or editing an existing report, the user is enabled to select customization options as indicated at step 330, FIG. 11(*a*). FIG. 12 (*b*) illustrates the dialog screen 1596 presented to the user showing all the report customization categories for building a new report and editing an existing report. From this screen and related report building dialog boxes, all of the initial values for retrieving the MetaData, customization options and GUI builder options from the report manager server 250 necessary to build (edit) a report are provided in accordance with the user's entitlements. Thus, in view of the exemplar web page shown in FIG. 12(*b*), a user may provide the following customization and report builder options as indicated in the field 1570: general customization options, by selecting field 1571; layout customization options, by selecting field 1573; access customization options, by selecting field 1575; hierarchy customization options, by selecting field 1577; geographic customization options, by selecting field 1578; and, notification customization options, by selecting field 1579. For the following description regarding FIG. 12(*b*) it is assumed that the area code summary format had been selected, however, it should be understood that the same principles apply to any selected format.

With regard to the "general" customization options, the user is enabled to specify or change the report title, by selecting field 1571*a,* report description, by selecting field 1571*b,* and the report schedule, by selecting field 1571*c*. For the example selection of report title customization shown in FIG. 12(*b*), the right hand field 1580 will present the user with a field 1581 for entering the title of the report. If an existing inventory report had been selected, then the field 1580 will display the existing title. Generally, for each of the customization screens displayed for existing reports, Report Manager will autopopulate the right hand field 1580 with the existing report values.

When selecting the report schedule 1571*c,* the user is presented with a screen 1597, as shown in FIG. 12(*c*). The entry options for selection in the right hand field 1580 includes: selection of time zone, by menu choice 1582; selection of the report schedule radio buttons 1583 to specify the report as recurring, daily, weekly, monthly, or hourly entry field the nature of screen; a time range for the report as specified by entry fields 1584; and, a date range for the report as specified by entry fields 1585. The user may also specify the report as a "one-shot" by selecting radio button 1586.

Referring back to the exemplar screen shown in FIG. 12(*b*), with regard to the layout customization options, the user is enabled to specify or change the number of report rows, by selecting field 1573*a,* and specify or change the report columns, by selecting field 1573*b*. For example, selection of report columns customization will present the user with a columns customization screen such as example screen display 1598 presented as shown in FIG. 12(*d*). In FIG. 12(*d*), the right hand field 1580 indicates a column tab 1587, and a sorts tab, 1588. The column tab enables the user to specify add or remove columns, with the selection of individual columns names provided in field 1589. An example description of the column headers for an example selection of columns is shown in field 1590.

Referring back to FIG. 12(*d*), selection of report sorts customization tab 1588 will present the user with a sorts customization screen such as example screen display 1599 presented as shown in FIG. 12(*e*). The sorts tab enables the user to specify columns to be sorted in an available sorts selection field 1591, whether totals are to be made, whether the column data to be provided is in ascending or descending order, for example, as provided by selection of buttons 1592, shown in FIG. 12(*e*). In the preferred embodiment, the Report Manager provides the customer with the ability to specify select columns as primary and secondary sorts. The user may specify additional secondary sorts in addition to the default sorts. For example, the user may provide the following sorts: for a Longest Call Report, a primary sort is Number of Minutes in descending order. For a Most Expensive Call Report, the primary sort is dollars in descending order.

Referring back to exemplar screen shown in FIG. 12(*b*), with regard to the access customization options, the user is enabled to specify or change an accounting "IDACC" code or supplemental code, by selecting field 1575*a,* and specify or change the inbound access type, by selecting field 1575*b*. For example, selection of inbound access customization presents the user with a web page having an inbound access customization screen such as example screen display 1601 presented as shown in FIG. 12(*f*). In FIG. 12(*f*), depending upon the selected report format, the right hand entry field 1604 presents the user with the following selectable access types: dial 1, card, dedicated, 800 Remote Access, Direct Dial fax, store/forward fax, 800 Business line (highlighted in the FIG. 12(*f*)), 800 wide area telecommunications service, 800 dedicated, 800 Network Call Redirect, local, cellular.

Referring back to exemplar screen shown in FIG. 12(*b*), with regard to the hierarchy customization options, the user is enabled to specify or change the billing location by selecting field 1577*a*. Upon selection of the billing location customization option, the user is presented with a web page having a customization screen such as example screen display 1603 presented as shown in FIG. 12(*g*). In FIG. 12(*g*), depending upon the selected report format, the right hand screen presents the user with three tabs: a corporations tab 1607, a search tab, 1608, and, a selected items tab 1609. When selected, the corporations tab 1607 enables the user to add or remove a corporate ID to/from a billing location hierarchy in the entry field 1610. A search of corporate IDs may be performed by selecting the search tab 1608, and items that have been selected may be displayed in a field (not shown) presented by selection of the selected items tab. Likewise, referring back to exemplar web page screen shown in FIG. 12(*b*), with regard to the geographic customization options, the user is enabled to specify or change the billing location by selecting field 1577*a*. Upon selection of the billing location customization option, the user is presented with a web page having a customization screen such as example screen display 1611 presented as shown in FIG. 12(*h*).

In FIG. 12(*h*), depending upon the selected report format, the right hand screen presents the user with three tabs: a countries tab 1612, a search tab, 1613, and, a selected items tab 1614. When selected, the countries tab 1612 enables the user to select, add or remove a country that may be a subject for reporting as provided in the entry field 1620. A search of countries may be performed by selecting the search tab 1613, and items that have been selected may be displayed in a field (not shown) presented by selection of the selected items tab 1614.

Referring back to exemplar screen shown in FIG. 12(*b*), with regard to the notification customization options, the user is enabled to specify report notification by paging, by selecting field 1579*a*, and, report notification by e-mail, by selecting field 1579*b*. Upon selection of the paging notification option, the user is presented with a web page having a customization screen (not shown) presenting the user to select or enter that user's page number, PIN number and a paging message description. Upon selection of the e-mail notification option, the user is presented with a web page having a customization screen (not shown) presenting the user to select or enter that user's e-mail address.

As mentioned above with respect to FIG. 10, the Report Requestor client application 212 gains access to the metadata stored at the Report Manager server 250 through messaging. Particularly, as hereinafter described, a message generated by the Report Requestor in accordance with the user request is first received by the report manager proxy 250'. In the preferred embodiment, the report manager proxy comprises a set of tools in the form of reusable objects, preferably written in C++ code, or the like. For example, a parser object tool is employed to decompose the Metadata messages sent by the report requester 212 to validate the message. If errors are found in the Metadata input, the RM will return an error message to the requesting client. If the Metadata passes the validation tests, the request type is then determined and the appropriate service will be invoked after which a standard response is sent back to the requesting client.

The Report Manager 250 implements stored procedures to translate the message, perform the request, and send the information back to the Report Requestor 212 which uses the metadata to determine what a standard report should look like, the customization options the user has, and the types of screens that should be used for the various options (i.e., single selection, multiple selections, etc.).

It is understood that the selection of available standard template reports is based on the user's entitlements.

As described in above-referenced, co-pending U.S. patent application Ser. No. 09/159,409, and particularly Appendices A–H provided therein, the following types of metadata requests and responses that may be generated by the StarWRS Report Requestor 212 and Report Manager 250 components include: 1) Get/Send report template list (GRTL/SRTL)—which request enables retrieval of the list of all standard report templates for all products and is used only to obtain general report information, e.g., report title, description, etc.; 2) Get/Send report template detail (GRTD/SRTD)—which request retrieves the details of a specific standard report template; 3) Get/Send user report list (GURL/SURL)—which request retrieves the list of all user reports for the report format selected from a user report table and is used only as a request for general report information, e.g., report title, status, etc.; 4) Get/Send user report detail (GURD/SURD)—which request retrieves the details of a specific user's report; 5) Add report definition/Acknowledgment (ARD/ARDA)—which requests addition of a user-created report to a user report table. If the report is a scheduled report, this request is also communicated to the fulfilling server at the time the report is due; 6) Delete report definition/Acknowledgment (DRD/DRDA)—which request deletes a user-created report from the user table; 7) Copy report definition/Acknowledgment (CRD/CRDA)—which request creates a duplication of the report the user is editing (other than the report title) and creates a new report ID for it; 8) Update Reporting Schedule/Acknowledgment (URD/URDA)—which request updates the scheduling information on a report without having to send a Delete and Add request; and, 9) Get Pick List/Acknowledgment (GPL)—which request enables the Report Requestor 212 to get a pick list provided by StarOE server.

The aforementioned Appendices A–H provides a series of tables comprising the content for each metadata message request that can be sent by the report requester 212 for each of the enumerated user requests, in addition to the format of the corresponding metadata message responses by the RM server 250.

Having described the functionality of selecting and/or generating a report and customizing it, reference is now had to FIG. 11(*b*) which describes the next step 350 of presenting the user with report run and save options. Particularly, in the preferred embodiment, as shown in each of the customization screens (FIGS. 12(*b*)–12(*h*)), the user may select a save and exit option, depicted in FIG. 12(*b*) as button 1562 or a save and run option, depicted in FIG. 12(*b*) as button 1563. In either scenario, an WRSEdit object enables a WRSScnMgr object to save the report to the RM server. The WRSScnMgr object launches each screens save method which communicates with the DataManager object to place the screens data in its corresponding WRSNode. Once all of the WRSNode objects have been updated, the WRSScnMgr object calls the DataManager object's SaveReport method to build a hash table to include all of the report's data. The CommunicationManager utilizes the RptManagerMsg object to create the ARD metadata message from the hash table, the WRSCommWrapper for direct communication with the backend, and the WRSReportManagerUtilParser to handle any errors thrown by the server. The Report Manager creates the Dispatcher object, and utilizes the services of the RMParser class and validation objects. Upon determining that the client has sent a valid message, the appropriate member function is invoked to service the request. The response is built inside the esql wrapper function after obtaining the necessary information through the stored procedure from the RM database. The Report Manager creates the RMServerSocket object and sends the ARDA message back to the client. When a report is submitted the selected report type and reporting criteria are sent to the Report Manager.

As illustrated in FIG. 11(*b*), at step 355, in reference to user selection of a Save and Run report option, the report is marked as scheduled and saved in the Report Scheduler server 260 via the report Manager. Subsequently, as indicated at step 360, the Report Scheduler server 260 sends the ARD message to the fulfilling server which queues the report and runs the report at the specified time(s), as indicated at step 365.

The process for generating a report for StarODS priced call detail data is described in detail in aforementioned co-pending U.S. patent application Ser. No. 09/159,684, and, for TVS unpriced call detail data, in aforementioned co-pending U.S. patent application Ser. No. 09/074,072. Generally, whether the report is to be currently run for immediate ad hoc reporting, or, is scheduled for normal scheduled reporting, the following sequence of operations, as indicated at steps 370–395, FIGS. 11(*b*)–11(*c*), are performed: First, in response to receipt of the ARD message, e.g., submitted to the fulfilling server by the Report Scheduler, the fulfilling server completes the report and compresses the report/data, as indicated at step 370. Then, the report/data is "pushed," implementing FTP, to the fulfilling server's directory on the Inbox server 270, as indicated at step 373. Each application server, e.g., TVS server 550 (FIG. 10), is responsible for generating unique file names within their directory on the Inbox server 270. For example, the following directory and file naming conventions used for reports generated by the TrafficView server are labeled inbox\files\TVs with text files having the suffix *.txt or *.txt_zip (compressed), and comma separated files having a suffix *.csv or *.csv_zip (compressed). The fulfilling server then verifies that the FTP process was successful, as indicated at step 376, and, at step 379, a notification is sent by the fulfilling server to the Report Manager to notify the Report Manager server 250 of the location of a scheduled report. This is accomplished by using a "NRL" metadata message.

Aforementioned Appendix B of co-pending U.S. patent application Ser. No. 09/159,409 provides a table comprising the Notify Report Location parameters used for the NRL Metadata messaging sent by a fulfilling server to the RM Server 250 when a requested report is complete. Also provided in above referenced Appendix B is the acknowledgment table sent back to the fulfilling server in response. An example NRL message sent from the TVS server 500 to the RM server 250 can be found in co-pending U.S. patent application Ser. No. 09/074,072.

In the preferred embodiment, the NRL message received by the RM server 250 includes parameters verifying whether or not the FTP process was successful. If it was successful, then the fulfilling server messages the Inbox that the file has been transmitted successfully by transmitting the report name (filename) and location. When the fulfilling server encounters a problem executing a report, a notification is sent to the Report Manager. Particularly, an error flag is placed in the status field of the User_report by the Report Manager which is displayed to the user during Report Request. The error message description will be placed in a text file and FTP'd to the fulfilling server's report location on the Inbox server (e.g., \inbox\files\TVs) by the fulfilling server.

Referring to FIG. 11(*b*), step 379, once the RM server 250 has received the NRL message from the fulfilling server, it verifies the file's presence, as indicated at step 382. The RM server 250 then builds a metadata file, e.g., by compressing the appropriate metadata (for displaying the report) into a .MTD file, as indicated at step 385. This .MTD file is utilized by the Report Viewer to know how to display the report. The Report Manager server creates a file including the metadata using the same file name as the report/data file, but having the following suffix: *.mtd or *.mtd_zip indicating a metadata or compressed metadata file, respectively.

Above referenced Appendix F of co-pending U.S. patent application Ser. No. 09/074,072 details the parameters that are passed in the GET METADATA messaging for indicating to the Report Viewer how to display a requested report. An example message in metadata format to initiate the generation of a .MTD file corresponding to a user-created report for StarODS priced call detail data and TVS unpriced call detail data may be found in co-pending U.S. patent application Ser. No. 09/159,409.

Once the metadata file corresponding to the requested report is built by the Report Manager, the RM ftp's the .MTD file to the Inbox server, as indicated at step 388, FIG. 11(*c*). The RM server additionally updates the User_report table status field with a status "C" indicating completion, as indicated at step 391.

Once the Report Manager has updated the status field, the RM server 250 then adds the report to the Inbox server, as indicated at step 393.

Above referenced Appendix C of co-pending U.S. patent application Ser. No. 09/159,409 provides a table showing the fields for the metadata messaging between the RM server 250 and the Inbox server 270 for adding an item into the StarWRS system Inbox server 270, and the respective acknowledgment message format back from the Inbox server. In the add "A" message found in Appendix C, the "LOC" field includes information about where the data is located. An example metadata message indicating to the Inbox server that an unpriced TVS fulfilling server report is available is described in co-pending U.S. patent application Ser. No. 09/159,409. Particularly, the RM server supplies a metadata "A" message to the Inbox indicating the FTP file location. Via the report viewer, the report is now available for viewing, downloading, saving, or printing by the user, as indicated at step 395, and as described in further detail in co-pending U.S. patent application Ser. No. 09/159,512.

Figure 13A:
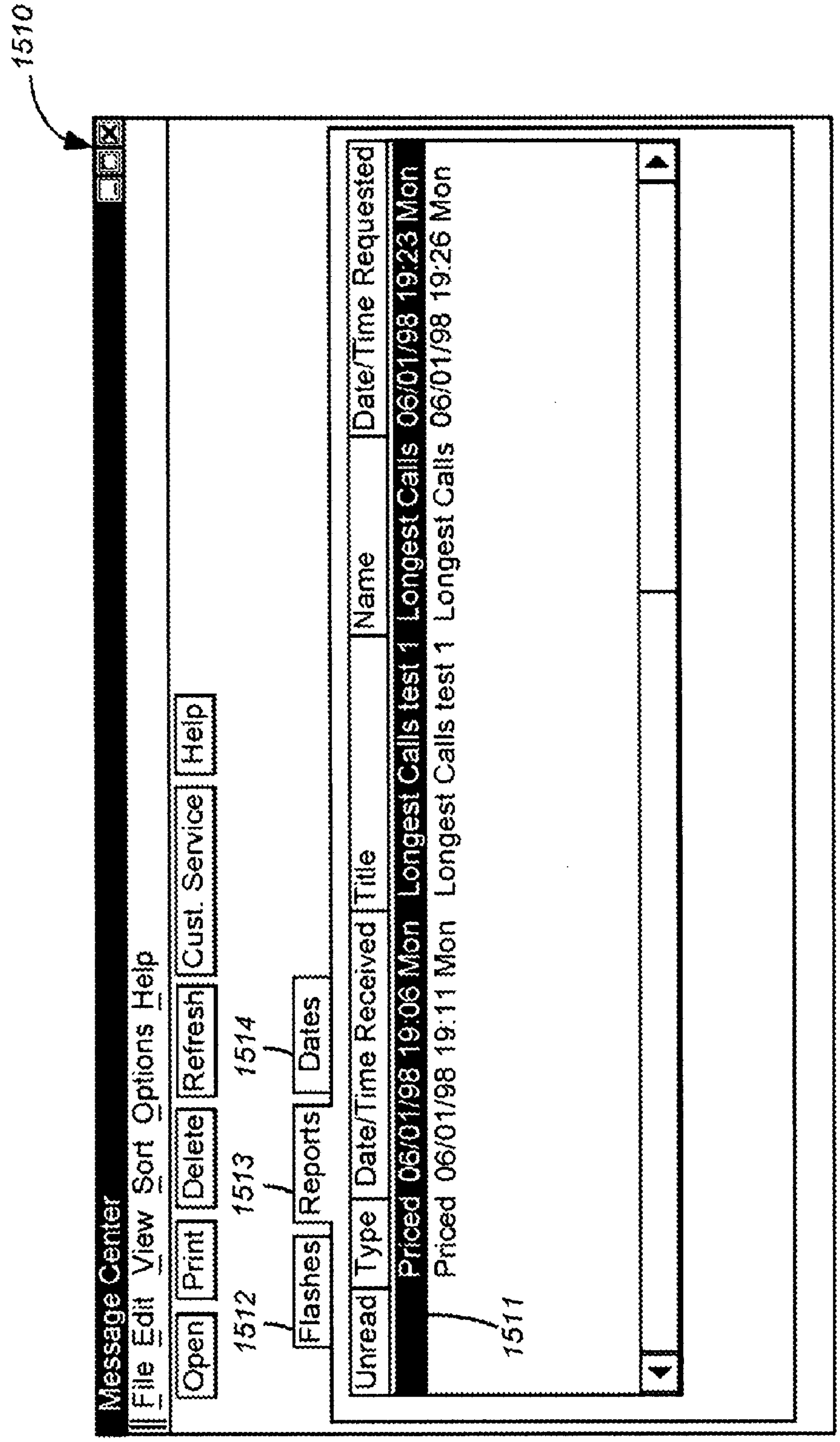
FIG. 13(*a*) illustrates an example browser based message center screen dialog.
Figure 13B:
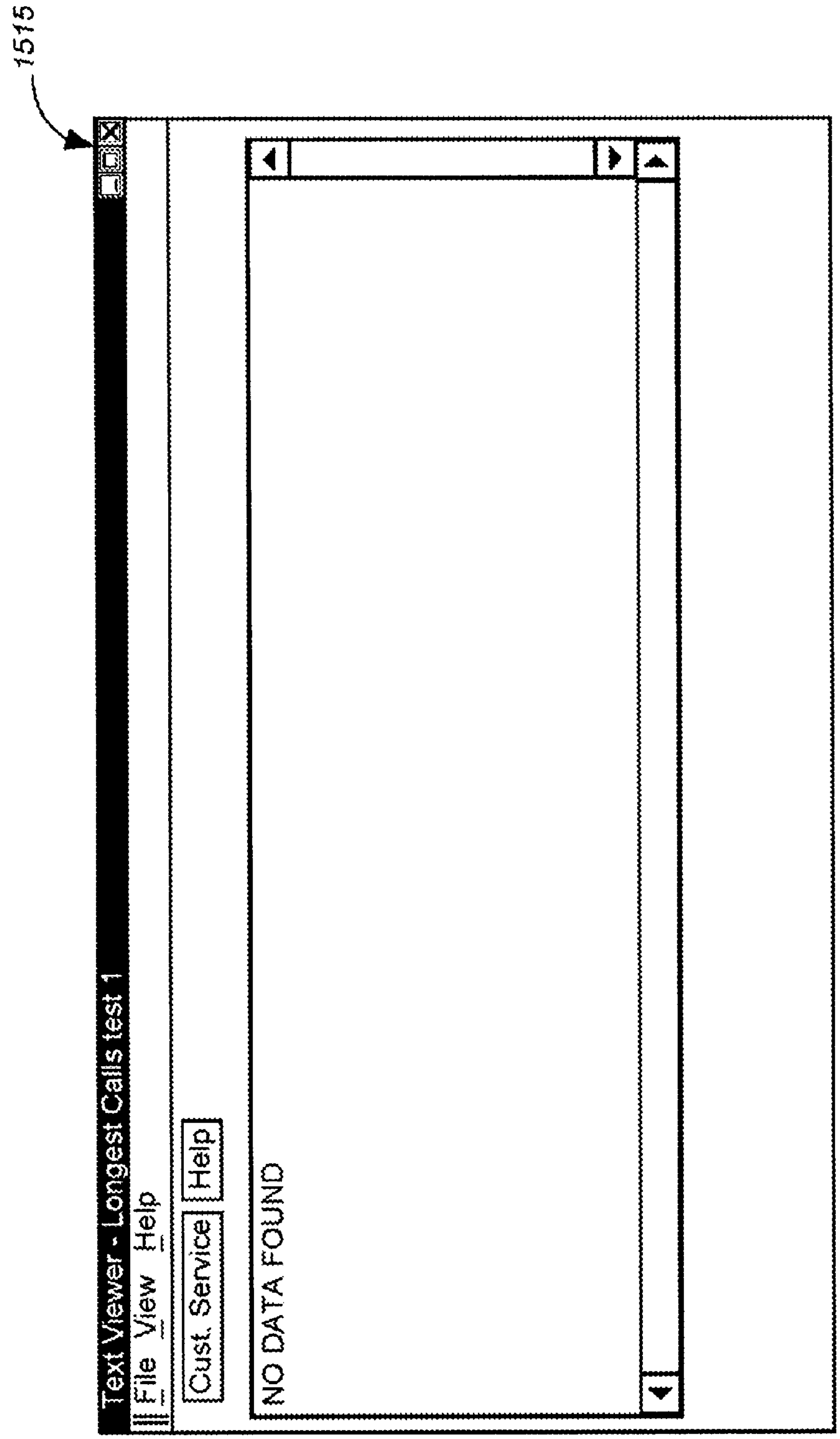

Particularly, as shown in the exemplary nMCI home page in FIG. 5(*a*), the nMCI Interact "Message Center" icon 81 may be selected which will cause the display of a web page including the message center dialog box 1510 such as shown in FIG. 13(*a*). From the dialog box 1510, a user may select from among three tabs, a news tab 1512, a reports tab 1513 and a data tab 1514. Selection of the reports tab 1513 enables the retrieval of both a data file and a metadata file from the Inbox Server corresponding to those reports that have been run and available for customer viewing. Information provided for display by the message center display 1510 is provided by the User_table which keeps track of the status of all reports for a particular user. Particularly, by double-clicking a chosen report, a report viewer application is enabled to display the chosen report on a web-page. FIG. 13(*b*) illustrates an example web-page presenting a text viewer screen 1515 enabled by selecting the highlighted report 1514 in FIG. 13(*a*).

Referring back to FIG. 10, the Report Viewer 215 interfaces with the user's Inbox 210 for presenting to the customer the various type of reports received at the Inbox. Preferably, all Report Requestor and Report Viewer applications communicate with the RM server 250 through the use of the common object communication classes, as described in greater detail in commonly-owned, co-pending U.S. patent application Ser. No. 09/159,512 entitled MULTI-THREADEDWEB-BASED USER INBOX FOR REPORT MANAGEMENT, the contents and disclosure of which is incorporated by reference as if fully described herein.

It should be understood that fulfilling servers such as the Broadband, and Toll Free Network Manager 500, StarODS 400, Report Scheduler server, and any other back-end or fulfilling servers (not shown), send report results and event notifications to the inbox server 270. The fulfilling servers, and Report Manager server may communicate to the inbox server 270 by making requests to the inbox proxy 270'. The proxy, generally waits for a request from an application and then services the request.

The inbox proxy's main responsibility is to process requests by either handling them internally within the inbox proxy 270' or forwarding them to the inbox server 270, and then responding back to the client (i.e., the fulfilling servers in this case). In order to maintain secure connectivity throughout the system, the inbox proxy 270' uses the application program interfaces (APIs) provided by the "networkMCI Interact" supporting different types of data transport mechanisms: synchronous transaction; asynchronous transaction; and, synchronous bulk transfer. The transport mechanisms are implemented as sockets message protocol, and the proxy handles its conversation processing on a thread or process per conversation basis for servicing multiple simultaneous clients.

As an alternative to the transports above, the inbox server 270 offers direct File Transport Protocol (FTP) "put" for very large transfers in order to alleviate some of the network server loads. The fulfilling servers 400, 500 with large data transfers typically use the common shareware compression format ZIP which is also PKZIP compatible. Alternately, the fulfilling servers 400, 500 distributing information via the inbox may "put" the data to the inbox and defer zipping until after the inbox receives the data.

As described, the fulfilling servers, when placing the data in the inbox, notify the report manager server 250 they are adding new data in the inbox. The report manager 250 then retrieves and FTPs the appropriate metadata associated with the new data in the inbox, notifying the inbox of the new additions to the inbox, i.e., the new data and the associated metadata. The metadata is then stored in the inbox server database 273 along with the report results. Thus, if the metadata is required to be changed, it does not interfere with the information needed to display the reports included in the inbox.

Particularly, as shown in FIG. 16, the Inbox server 270 interface with the Inbox Client 210 supports messaging that enables the User to remove an item from the Inbox, e.g., delete a report, or, to delete all items from the Inbox, e.g., for a particular Enterprise and User ID as well as other associated reports. Above referenced Appendix G of co-pending U.S. patent application Ser. No. 09/159,409 illustrates the parameters used in the metadata messaging between the Inbox client and the Inbox server. Particularly, the List "L" message is a synchronous request for a list of all Inbox items for a specific user. The Inbox fetch "F" function is a bulk transfer request that enables bulk transfer of the requested file to the Inbox client.

Referring back to FIG. 12(*b*), after editing or modifying an existing report, the user may simply select to save the report and exit. In this case, the ARD message is sent from the Report Requestor client to the RM server and is saved in the RM inventory database for subsequent execution. Consequently, the report is flagged as incomplete in the User_table and may not be run until a run option for that report is chosen. Otherwise, the report may be immediately scheduled if the user selects the save and run button.

As described, Metadata messaging is used throughout the various components of the StarWRS system 200. The format of an interface message that is sent to the Report Scheduler server is identical to the format as the interface messaging format returned by the RS server 260. Thus, in the case of automatic recurring reports, a variation of the process outlined in FIG. 11(*b*) occurs at step 360, whereby the ARD request is instead sent from the report scheduler to the fulfilling server at the programmed frequency. Particularly, when a report is required to be run, the Report scheduler server 260 (FIG. 10) sends an ARD request to the fulfilling server in a metadata message format having parameters as included in the Add Report Definition table provided in above-referenced Appendix D. Upon processing of the metadata message, the fulfilling server will respond to the report Scheduler with an acknowledgment of the command, and the process outlined in FIGS. 11(*b*) and 11(*c*) is executed.

As described in greater detail in co-pending U.S. patent application Ser. No. 09/159,409 the Report Scheduler server 260 is additionally capable of updating the User_report status table and, preferably, is provided with a tracking mechanism for tracking the scheduling of user reports. If the report is an Ad hoc report, it is marked as inactive in the user report table once the status is complete.

StarODS

As mentioned, the StarODS data management tool of the integrated suite of telecommunications network applications comprises a back-end architecture providing customers with priced reporting data pertaining to usage of their telecommunications networks.

Figure 14A:
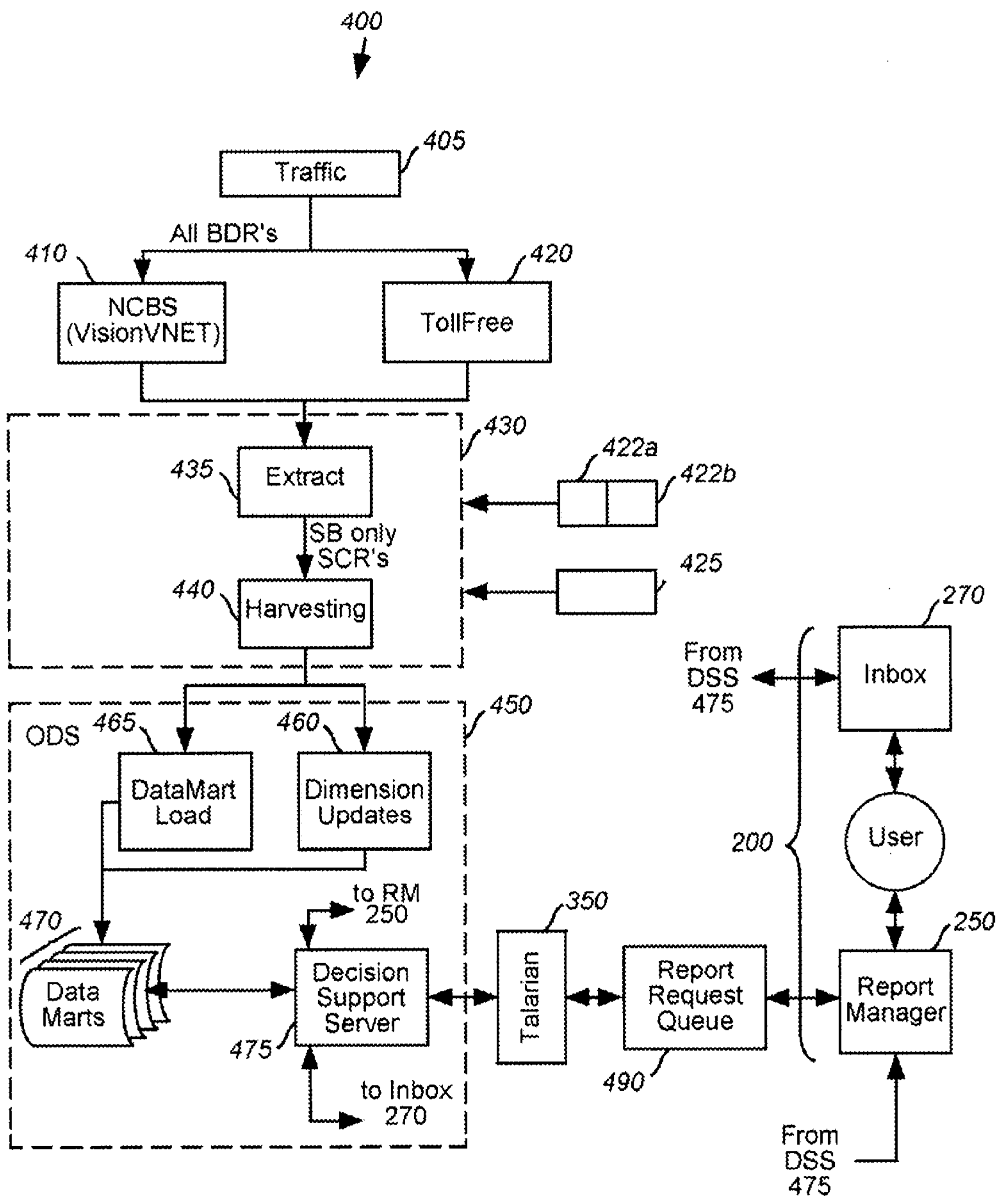
FIG. 14(*a*) illustrates the primary components implemented in the StarODS priced reporting component 400.
Figure 14B:
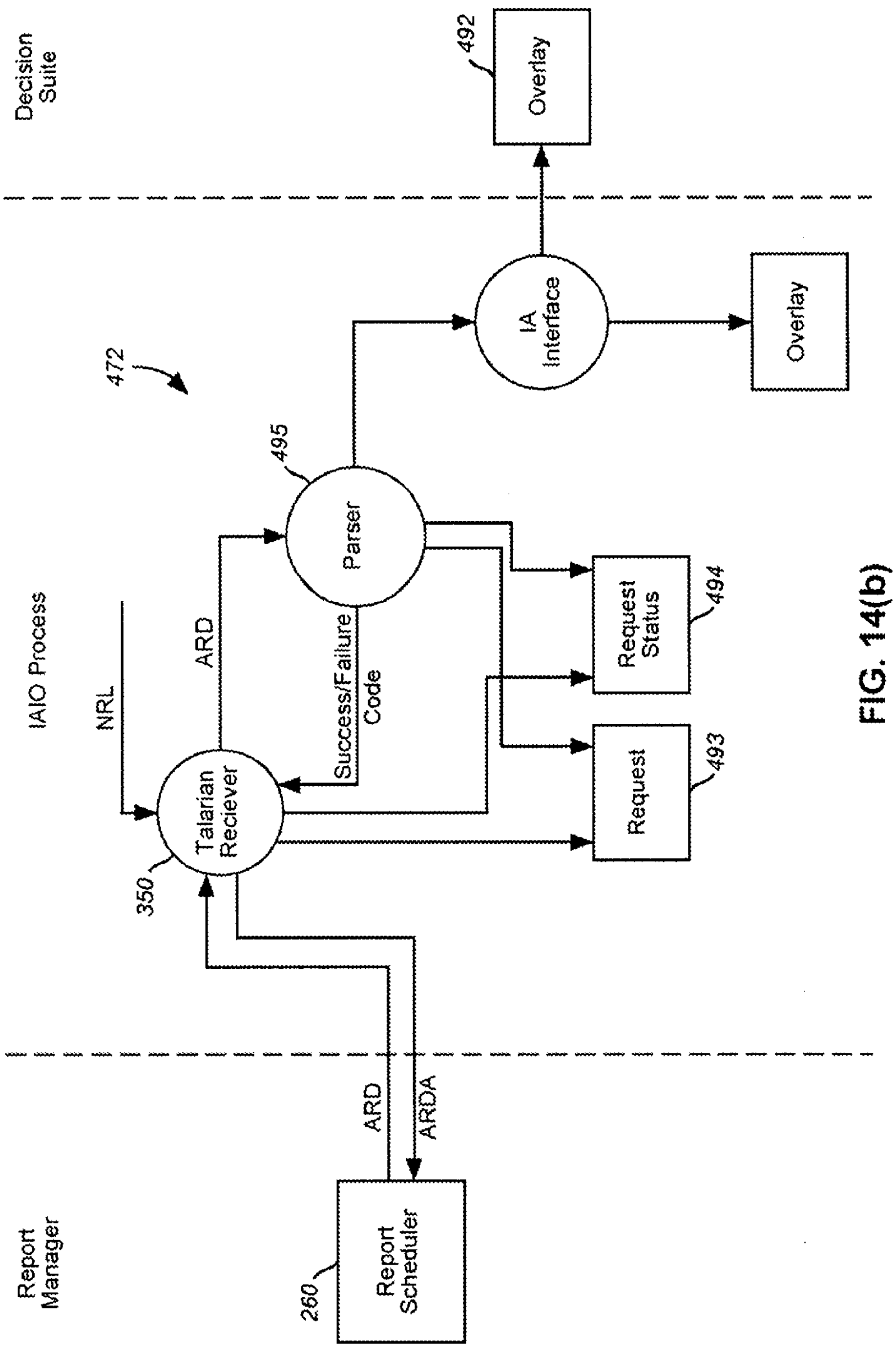

In FIG. 14(*a*), there is shown the high-level logical approach of the StarODS data management system 400 integrated with the StarWRS component 200 of the nMCI Interact architecture. Generally, the data management system 400 of the invention, referred to herein as "StarODS," provides customers with priced reporting data pertaining to telecommunications services. Although the description herein pertains to priced billing data, it should be understood that the principles described herein could apply to any type of reporting data. Through StarWRS web-based reporting, the StarODS system provides priced reporting data and implements a DataMart approach for maintaining the data used for customer reporting. StarODS stores and incrementally processes customer's priced data included in call detail records, and loads this processed data in Data Marts in a manner such as described in commonly owned, co-pending U.S. patent application Ser. No. 09/073,885 entitled DATA WAREHOUSING INFRASTRUCTURE FOR WEB-BASED REPORTING TOOL, the contents and disclosure of which are incorporated by reference as if fully set forth herein. From these data marts customer's priced reporting data may be provided to customers on a daily basis via the StarWRS reporting system.

For priced reporting data, report categories from which a variety of reports can be generated include: a) Financial category—for providing priced data reports relating to longest calls, most expensive calls, Off Peak Calls, payphone report, usage summary, calling card summary, and area code summary for Toll Free, VNET, Vision, and CVNS customers; b) Marketing category—for providing priced data reports relating to country code summary, state summary, frequent numbers, frequent area code summary, frequent state, and frequent cities; c) Telecommunications category—for providing priced data reports relating to call duration summary, IDACC/Supp Code Summary and Call Access Summary for Toll Free, VNET, Vision, CVNS customers; d) Call Center report category—for providing priced data reports relating to most active toll free numbers, Hourly Distribution, Day of Week Distributions, state summary, and country code summary for their Toll Free, VNET, Vision, CVNS customers; e) Monitor Usage—for providing priced data reports relating to longest calls, most expensive calls, most active calling card and most active toll free numbers for their Toll Free, VNET, Vision, CVNS customers; f) Analyze Traffic—area code summary, country code summary, state summary, range summary, city summary, frequent numbers, payphone report, usage summary, calling card summary, IDACC/Supp Code Summary, Day of Week Distributions, Hourly Distribution, Call Access Summary and review calls; and, a g) Check Calling Frequencies category—for reporting on frequent numbers, frequent area code, frequent country codes, frequent state and frequent cities.

FIG. 14(*a*) illustrates the primary components implemented in the StarODS priced reporting data management component 400. As shown in FIG. 14(*a*), a first traffic feed 405 provides raw call detail records from external network switches, translates and sorts the data into billable records for input into two systems: a Commercial Billing system ("NCBS") mainframe server process 410 for pricing the records at tariff for customers subscribing to, e.g., MCI's VNET and Vision telecommunications products; and, a toll-free billing server process 420 for pricing the records at tariff for customers subscribing to toll-free telecommunications products. A common data gateway component 430 including a mainframe extract process 435 and a data harvesting process 440 receives these inputs on both a daily and monthly basis for processing. Particularly, the mainframe extract process 435 creates a selection table including all subscribing customers, compresses files for transmissions and extracts priced reporting records from the runstreams. The harvesting process 440 is responsible for performing data validations, filtering, data translations, data grouping, data routing, and data logging functions. According to a dimension table based on data within selected BDRs, the harvesting process applies business rules to the data, cleanses the data, transforms the data, creates load files for DataMarts and compresses files for storage in the DataMarts. The harvesting component 440 may additionally perform an aggregation function for supporting long term storage and rapid access of data for customer reporting, and performs trigger actions/events based on predefined criteria.

Additionally, as shown in the FIG. 14(*a*), other external systems and applications may interface with the common data gateway component 430 including: Cyclone Billing system 422*a* and Concert Virtual Network Services 422*b* which provide additional billing detail records; and, a calling area database 425 which provides geographical reference information, i.e., identify city, state and country information.

After the data has been processed in the Harvesting component 440 it is input to an Operational Data Store component ("ODS") 450 that stores the billing detail records and dimension tables as a data model. This ODS layer 450 is comprised of all data harvested from all applications in the data harvesting layer 430, and feeds report-supporting DataMarts 470 in a manner which supports customized data access. The Datamarts may be engineered to pre-process data, create aggregates, and otherwise perform transformations on the data prior to DataMart loading 465 in order to implement a defined data model, e.g., star schema key structures, fact and dimension tables depicted as block 460. In the preferred embodiment, as shown in FIG. 14(*a*), the ODS 450 includes multiple datamarts 470 each for storing and retrieving daily and monthly priced data on a periodic basis. It primarily is responsible for hosting highly current data, typically at least 72 hours old. In accordance with customer-reporting needs, data marts 470 are partitioned in accordance with partitioning schemes which, in the invention, is based on customer-ID. Particularly, each DataMart is engineered for servicing specific customers or specific product sets, as well as engineered for the specific requirements of the customer/product such as high insert activity, heavy reporting requirements, etc. As data is volatile and changing and may not produce consistent results for the same query launched at multiple times, ODS is engineered for high performance through appropriate storage technologies and parallel processing. Although not shown, a common data warehouse is provided in this ODS layer that is responsible for performing storage, retrieval and archiving of data, typically of relaxed currency (e.g., more than 24 hours) and is targeted at trend analysis and detection. In the preferred embodiment, the datamarts utilize an Informix database in a star topology.

As described herein, from the data included in these data marts, one-time or recurring priced data reports are available for reporting through the NMCI Interact StarWRS reporting system 200.

Additionally, the ODS component 450 includes a Decision Support Server ("DSS") reporting engine component 475 that performs the following functions: 1) receives various customer report requests from the StarWRS GUI Report Requestor component and accordingly generates database queries; 2) routes the query to the appropriate data marts 470, data warehouse or operational data store; and, 3) responds to the requester with a formatted result set. The DSS server 475 may also perform cost estimation, agent scheduling, workflow broadcasting interface, and transaction logging functions. In the preferred embodiment, the DSS 475 is a cluster of DEC (Digital Equipment Corp.) UNIX 8400 servers running Information Advantage® software accessing an Informix database, e.g., Informix Dynamic Server V.7.3. database product, distributed across multiple Data Marts.

In accordance with the invention, the primary function of the DSS 475 is to generate priced billing report data in accordance with the customer's request which is received from the StarWRS reporting component as a metadata message. To accomplish this, the DSS interfaces with two StarWRS systems: Report Manager/Scheduler 250, and Inbox 270, as shown in FIG. 14(*a*). As described herein, the Report Manager/Scheduler formats the customer's request in accordance with a defined set of rules and sends a metadata request message to the DSS. The DSS 475 reads the customer's metadata descriptions of the type of priced data report requested by a customer, translates the metadata into database queries, and implements commercial off-the-shelf ("COTS") tools such as Information Advantage's Decision Suite™ to generate SQL queries, and run the queries against the data in the DataMarts. Afterwards, the query results are formatted by a formatter process into a form readable by StarWRS report viewing components, and the completed reports are transmitted to the directory of the customer's Inbox, e.g., via FTP.

In the preferred embodiment, a publish-and-subscribe communications tool 350 such as Talarian SmartSockets™ messaging middleware is used to coordinate report requests transmitted from the StarWRS report Manager to DSS, and report completion notification from DSS to the StarWRS Report Manager. The Report Manager formats the customer's request in accordance with a defined set of rules and sends the request to the DSS as a Talarian message with the Report Manager 250 maintaining the Talarian Sender program, and the Decision Support Server 475 maintaining the Talarian Receiver program. Messages are sent with guaranteed message delivery ("GMD"), thus assuring all request data sent by RM is received by the DSS. As known, Talarian messaging middleware defines a message as types and subjects. A message type is a structure that defines the format of the message. Message subjects are subsets of message types and describe messages by which Talarian receivers can subscribe. Conversely, message subjects describe messages by which Talarian senders publish.

Above-referenced U.S. patent application Ser. No. 09/159,684 describes in greater detail the application programming interface "API" whereby the RM server 250 publishes the message to the Decision Support Server in response to its receipt of a report request. Similarly, a DSS/Inbox API is provided to manage FTP transmission of completed customer report files including: error handling, retry logic, and the ability to maintain the file name and location of where report files are stored. Particularly, the DSS/Inbox API sends the report file to the inbox (FIG. 14(*a*)).

In the preferred embodiment, the DSS architecture is transparent to the Report Manager which publishes Talarian messages to which the DSS will subscribe. More particularly, an RTServer process located in the RM is provided for maintaining connections, implementing a report request queue 490 for ensuring guaranteed message delivery, and tracking the success of all messaging operations. In addition to the tokenized character string request message which specifies report type, filters, and any customer request-specific information, RM server provides additional fields as part of the Talarian request message including: a Corp_ID, Priority, and RequestID. Corp_ID allows the DSS to route the request to the appropriate data store without having to invoke a parser. Data are partitioned on Corp_ID in the ODS database warehouse. Request_id is used to send back an ARDA failure message, in the event of an invalid message. The Priority field allows DSS to pickup the next high priority request from a queue of non-processed requests, without invoking the parser.

FIG. 14(*b*) illustrates the implementation of an Information Advantage® Interface Object ("IAIO") 472, which is a process running in the DSS 475 for performing the following functions: 1) publishes and subscribes Talarian messages to Report Scheduler; 2) parses the request metadata ARD (Add Report Definition) message received from the RS 260; 3) publishes an ARDA (Add Report Definition Acknowledgment); 4) populates a request table 493 with total, sub-total and sort information according to the received report request; 5) transforms the ARD tokens from the metadata request into an overlay file 492 which is a text file that is submitted to IA's Decision Suite™ process to generate the corresponding SQLs; 6) updates a Request Status table 4941 with appropriate status, e.g., process complete, failed, in progress, etc.; and, 7) if a failure occurs, it updates an error log (not shown).

More particularly, in view of FIG. 14(*b*), ARD metadata request messages are received into the ODS system via arbitrator processes which are responsible for routing the request message to the appropriate ODS database according to a Corp/ODS mapping table (not shown).

In FIG. 14(*b*), a Talarian receiver, referred to herein as a Talarian Interface Object ("TIO") 350, is a process that receives the Talarian message, manages the GMD functionality, and posts updates to the request table 493 and request status table 494. Appendix "I" of above-referenced, co-pending U.S. patent application Ser. No. 09/159,684 illustrates the contents of the ODS Request table 493 which is the table maintained for the purpose of holding specific report request information from the received ARD message, and, a Request Status table 494, for tracking the status of DSS processes for the current request. As further shown in FIG. 14(*b*), the receiver 350 inserts the message received from an arbitrator into the request table 493 and request status table 494 along with the priority, timestamp and status fields. The request status table resides on the ODS database and the messages are stored in the queue to provide queuing, log and tolerance from the failures. To determine the pending messages to be processed, a status field and history_stat flags are used.

As further shown in FIG. 14(*b*), in operation, the Information Advantage® Interface Object ("IAIO") 472 reads the status table 494 for new entries. When a new entry is posted, it invokes a parser process 495, for parsing the received report request ARD message, and generates an overlay text file 492 comprising tokens corresponding to the requested report format and data descriptions. An SQL engine generator, e.g., Decision Suite™, receives the overlay file 492 and performs the following functions: 1) generates SQL; 2)submits the SQL to the appropriate datamart (ODS database); 3) generates a Report file with a *.txt extension; 4) updates Request Status table 494 with appropriate status; and, 5) if a failure occurs, updates the error log. Following generation of the *txt file, a sort process is invoked to perform the following functions: 1) reads the Request table 390 for column(s) on which to sort the Report; 2) reads the *.txt file; 3) sorts the *.txt file and generates two files: i. a file with a *.hdr extension which file contains the header information, consisting only of only column id's, and, ii. a file with a *.data extension which file contains sorted data provided in the *.txt file and is the body of the report; 4) it further updates the request status table with a 'success' or 'failure' code; and, 5) if a failure occurs, updates the error log.

Continuously running FTP, NRL and ARDA processes are provided to take appropriate actions in accordance with the entries in the request status table 494. For example, an FTP process performs the following functions: 1) reads the status table 493 for entries ready to be sent to the Inbox and FTP's the .csv or .txt to the inbox 270; 2) Determines success or failure of file transfer; 3) Updates the Request Status table 494; and, if a failure occurs, updates an error log. The NRL (Notification of Report Location) process performs the following functions: 1) reads the Request Status table 494 for any success status or failure of any process; 2) Invokes a receiver process with appropriate status and file location populated in the NRL; and, 3) If failure occurs, updates the error log.

Figure 15A:
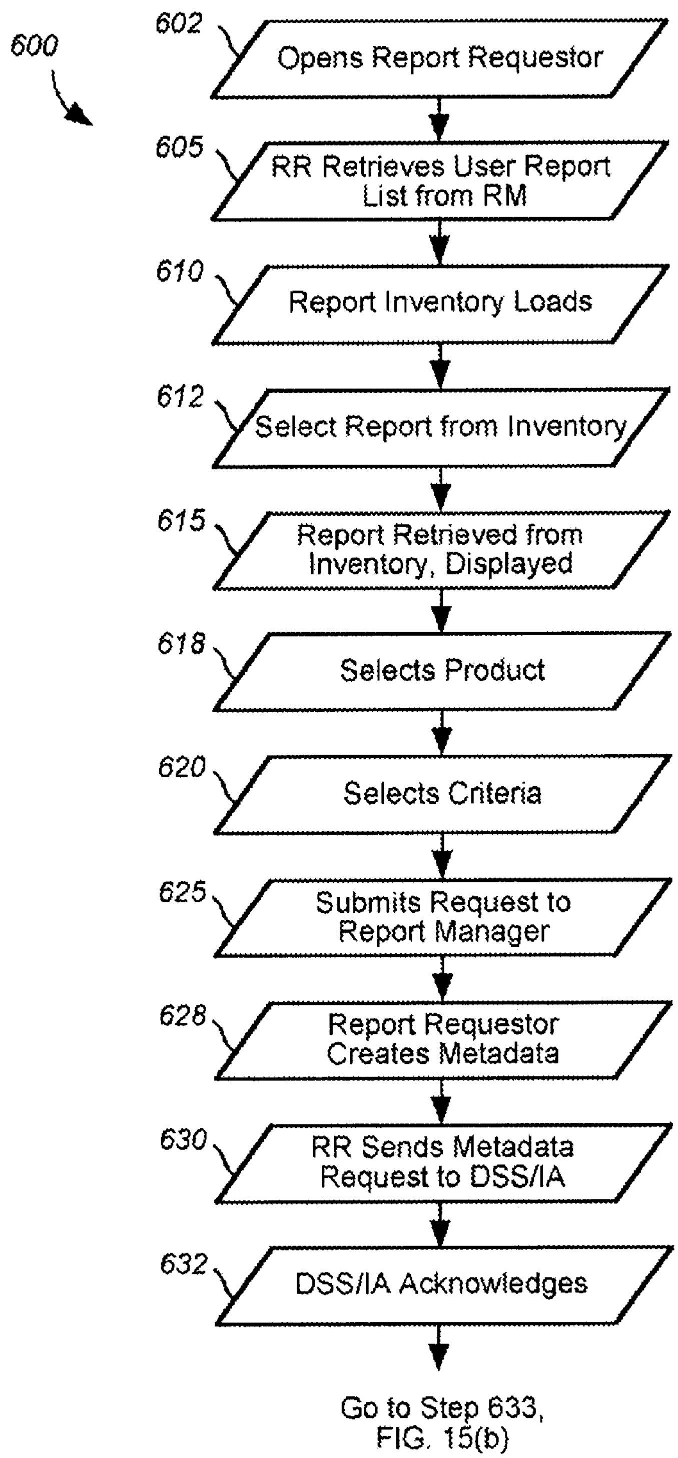
FIGS. 15(*a*)–15(*c*) illustrate the end-to-end process 600 for fulfilling priced call detail data report request.
Figure 15B:
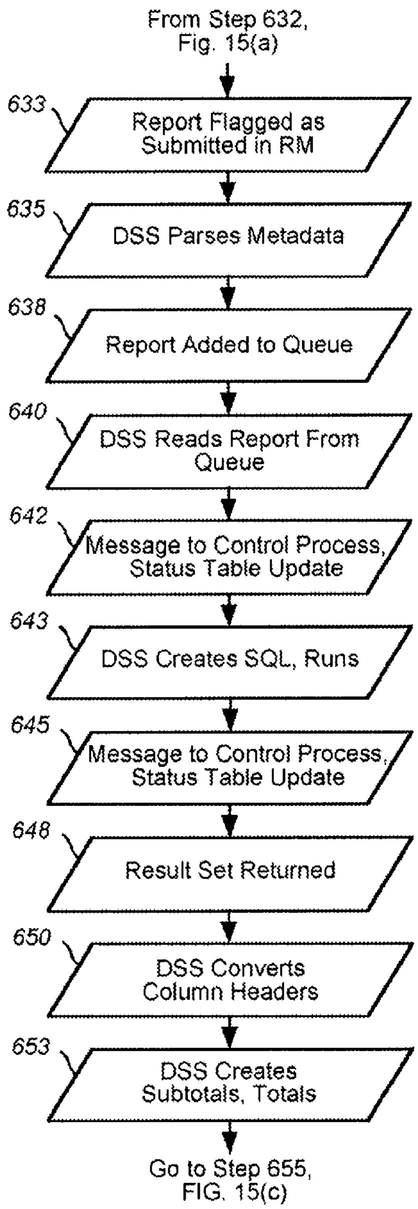
Figure 15C:
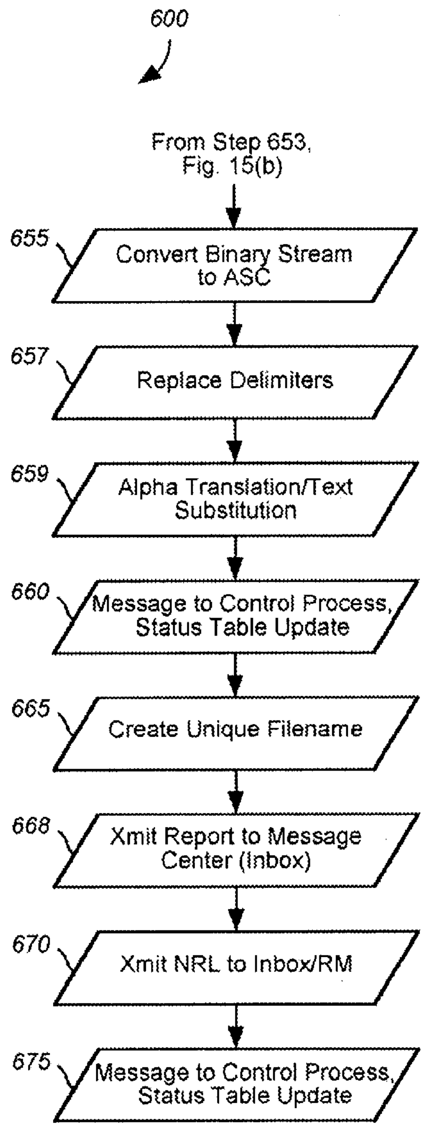

The end-to-end process 600 from a priced report request to report delivery is shown in FIGS. 15(*a*)–15(*c*).

Assuming successful user logon and authentication, as described herein, the first step 602 of FIG. 15(*a*), indicates that a user has opened the report requester dialog box from the nMCI Interact home page (FIG. 5(*a*)) by selecting the Report Requestor icon 83.

Using metadata messaging, the StarWRS Report Requester retrieves an available report list (including user defined list) from StarWRS Report Manager, as indicated at step 605. This process entails invoking a Communication Manager object to communicate with the RM server in order to obtain a SURL metadata message, as described.

Next, as indicated at step 610, the Report inventory for the specific user is loaded and displayed for the user on the user report request display screen, enabling the user to select a report, as indicated at step 612. Then, at step 615, the selected report is retrieved from StarWRS Report Manager and displayed in the manner as described.

Then, as indicated at steps 618 and 620, the user selects a product, including phone numbers and geographic locations, etc. and enters criteria, i.e., reporting interval and frequency, if a new report is desired. Specifically, when the user selects a report from the Inventory List or a new report, an WRSEdit Screen is launched to provide the editing capabilities which are available for the Report format, as described.

Once a report is created the user may save the report request, e.g., by clicking a "Save and Exit" button, or submit the request, as indicated at step 625, e.g., by clicking a "Save and Run" button. When a report is submitted the selected report type and reporting criteria are sent to the Report Manager. As indicated at step 628, the RM creates the metadata request for which the DSS has a predefined interface. The metadata request is submitted by StarWRS Report Requester to a COTS software module, e.g., such as provided by Information Advantage® which module is used for the generation and execution of SQL statements and retrieval and formatting of the results. Particularly, the metadata requests are transmitted via an interface with the Talarian Smart Sockets product and a header is built for each report request including the Carped and Enterprise information which is used by the IAIO to select the proper DataMart as the target for the query. At this time, the report requester additionally creates an entry in a RM table to track the progress of the request. The RM communicates with the StarODS using Talarian Smart Sockets® which creates a header comprising the product and other information, and controls the delivery of the report request. Smart Sockets guaranteed messaging feature automatically routes the call and repeatedly tries until the delivery is successful.

Next, as indicated at steps 630 and 632, the DSS receives the request and acknowledges receipt. Specifically, when the request is received it is first validated with StarOE to ensure that the user is entitled to receive information about the selected product corp and number(s). Once the request passes validation, the DSS IAIO reads the header to determine which Data Mart will ultimately be queried. It then parses the metadata into a format which the COTS software can readily convert into an SQL statement, as indicated at step 635, FIG. 15(*b*), and adds the report to the DSS report queue based upon type (Daily, Weekly, Monthly, Adhoc) and associated DataMart, as indicated at step 638. It should be understood that at this point, the request has been flagged as submitted in the RM database, as indicated at step 633.

From this point forward, DSS activity is controlled by a control process and progress or errors are logged internally in the DSS system. This control process includes logic enabling the prioritization of report requests and application of rules defining the order in which they should be executed. Thus, at the appropriate time, depending on the type or report, reporting period and other parameters, the Information Advantage query engine selects the report from the queue, as indicated at step 640, which action is logged in the report status table (Appendix I) as indicated at step 642. The SQL statement is then built by Decision Suite™ and routed to the appropriate data mart for execution in the manner as described herein, as indicated at step 643. The query engine generates the SQL statement from the metadata and executes the report which action is logged in the report status table as indicated at step 645. Next, as indicated at step 648, the query results are returned, and, a post-SQL formatting process is invoked.

More particularly, as described in further detail in co-pending U.S. patent application Ser. No. 09/159,684, the report result set from Decision Suite™ is input to a Formatter module which performs various report result transformations including: 1) Converting of column headers generated by Information Advantage® into appropriate column ids that are recognizable to the StarWRS client viewer functionality (as indicated at step 650); 2) Provide subtotaling for specific requested "subtotal by" columns in the format required by the StarWRS client interface (as indicated at step 653) and provides report-based totals as requested by customer; 3) converting binary stream data file to ASCII text file (as indicated at step 655); 4) implementing Replace logic, e.g., replacement of "TAB" delimiters with appropriate "Comma" field delimiters (as indicated at step 657); 5) implementing Repeat/Padding logic, i.e., identifying compressed columns/values and decompressing (or repeating) the values that were compressed; 6) providing alphanumeric translations for any encoded data elements returned in the result set data file (as indicated at step 659); and, 7) adding new computed/derived columns, e.g., percents, averages of column data values, etc., as requested by customers on specific reports.

After formatting the report, as indicated at step 660, a message is sent to the control process to update the request status table 494 (FIG. 14(*b*)). It should be understood that, if a failure occurs during formatting, the error log is updated and a status message sent to the request status table 494, as well. Then, as indicated at step 665 (FIG. 15(*c*)), the formatter creates a *.csv (Comma Separated Value) or .txt file, gives the file a unique name and saves the file. Preferably, a *.csv is the file generated if the report is successfully generated. As indicated at step 668, the *.csv report/data file is then "pushed," implementing FTP, to the StarODS server's directory on the Inbox server 270.

Finally, as indicated at step 670, once the file has been successfully transferred to the Priced reporting directory on the Inbox server, and the request status table 494 appropriately updated at step 675, an NRL message is sent to the RM Server 250 notifying it of the report file name and location in the Inbox, requester information, and if the transfer was successful. This is accomplished by using a "NRL" metadata message with a corresponding NRLA message sent back to the DSS. Report Manager is subsequently notified of the successful completion of the report and the report request is marked as completed in the RM database. If the report is a recurring report, it is not marked as complete. After the control process updates the report status table, the Report Manager is notified that the report is complete and the Inbox server notifies the user that report is ready.

A user may subsequently retrieve the report by clicking on the message center icon 81 from the home page of FIG. 5(*a*) which will present to the customer a list of all the available reports. To view a report the user selects the report and, the report metadata and the appropriate viewer are downloaded to the user (client) workstation.

TVS

As mentioned, the traffic view system ("TVS") 500 of the present invention comprises a Traffic View Server 550 which functions to store network call detail records (CDRs) and statistics, generate reports and deliver reports and/or call detail to the customer via the StarWRS Web Reporting System, and, supplies on-line customer access to call detail and hourly statistics that aid the customer in Network management, call center management and customer calling pattern analysis. For real time (unpriced) data, statistics are generated for the following totals: minutes, attempts, completes, incompletes, other, dto (direct termination overflow), short calls, didn't wait, didn't answer, tcc, and equipment failures.

The process by which the TVS server 550 gets data is now explained in greater detail with reference to FIGS. 18 and 19. As shown, call records are created by a network switch 501. An AP (Adjunct processor) or Storage and Verification Elements ("SAVE") platform 502 is co-located with each switch and receives all the call records from the switch as soon as possible after a call disconnects. The AP/SAVE sends all the call records to a (Network Information Concentrator (NIC) 503 where records are grouped together and those groupings numbered for a more efficient network utilization. If the NIC determines that it is missing a gap in the numbers, it will request the AP/SAVE resend that group of data to ensure that no data is lost. Should the NIC be unavailable to receive data, the AP/SAVE queues the data for later delivery. The NIC 503 receives all calls from all switches as soon as possible after a call has disconnected (hangs up) and distributes records to clients that match a certain criteria.

A generalized statistics engine (GSE) component 504 receives all records that are considered to be a toll free (800/8xx, etc) call from the NIC and also employs the same sequencing of groups of records to ensure that no data is lost. Should the GSE be unavailable, the NIC will queue the data for later delivery. The GSE component 504 further filters toll-free calls to only process calls that match a subscriber list which is maintained by an order entry OE process on the GSE (not shown) that accepts add & delete requests from TVS via a messaging interface 507 as shown in FIG. 18. The GSE component then formats the CDRs, i.e., enhances the call records, from the form as originally provided at the switch, into a normalized form to allow for a common record format regardless of the type of switch that created the record, or the exact call record type. For example, different network switches generate different call detail records, e.g., call detail record, enhanced call detail records, etc., which denote differences in toll-free services and features. This type of call detail record generated by GSE component is herein referred to as a TCR (Translated Call Record).

Groups of TCRs are sent from the GSE to TVS via TCP/IP. When TVS has safely stored that record it sends an acknowledgment to the GSE 504 so that the GSE may dispose of the group. Should TVS not be available to receive data, GSE queues data to be sent later.

Figure 18:
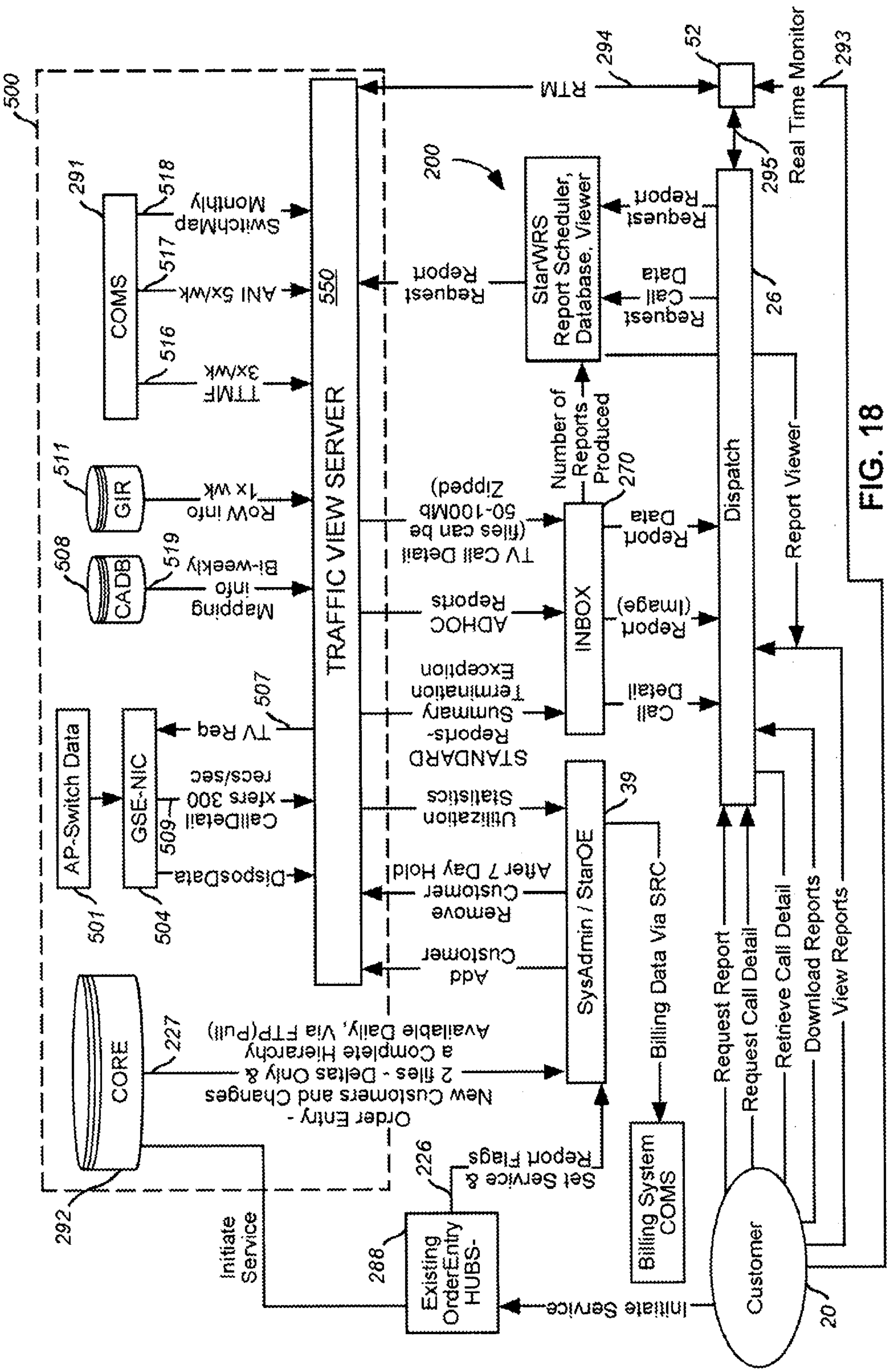
FIG. 18 illustrates the unpriced call detail reporting and real-time traffic monitoring component 500 for nMCI Interact system.
Figure 19:
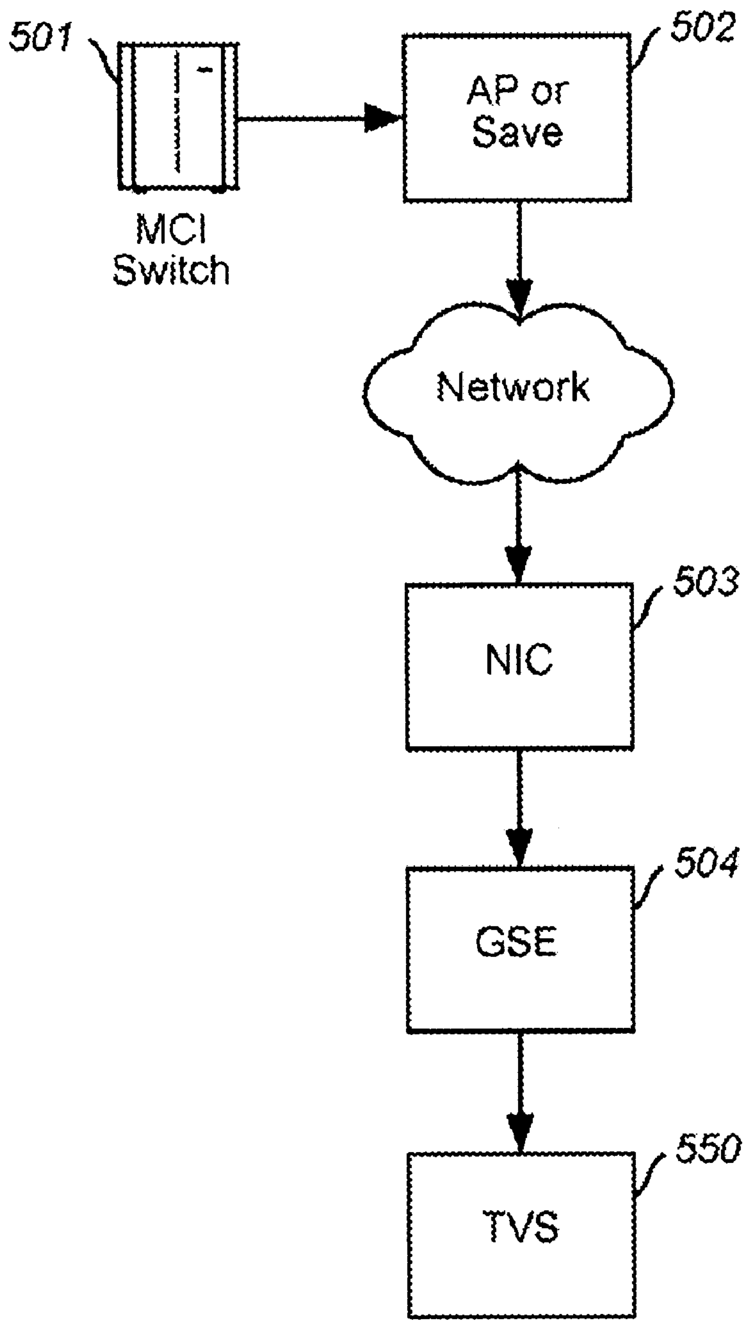
FIG. 19 is an general flow diagram of the process by which the TVS server 550 gets data.

As shown in FIG. 18, in the preferred embodiment, initial customer provisioning occurs at either the Corporate Order Entry system 292 (CORE) or the StarOE server 39 component of MCI Interact. As shown in FIG. 19, CORE 292 transmits daily to the TVS server 550 via Network Data Mover (NDM) files which comprise information about new reports for TVS to create, and where to send those reports, e.g., FAX, E-Mail, or US Mail. In the NMCI Interact TrafficView Server 550, a CORE FEED process 523 provisions reporting order and profiles into a reference database 551, and sets up scheduled reports to work on the next boundary, e.g., hourly, daily reports at midnight the next complete day, weekly reports at the end of the next week, monthly reports at the end of the month, etc. If this report requires Call detail records, as opposed to aggregated data, a CDR database is selected based on weighted values for the existing database. If a request contains a toll-free number that has not been provisioned with the GSE, a GSE_OE process 524 is invoked to forward the order, e.g., toll-free number, from the reference database onto a DEC Message Queue™ "DMQ" 526*a*. A GSE_OE_SEND process 527 is invoked to keep a TCP/IP socket open to the GSE process so that the pending order may be forwarded to the GSE 504 via a TCP/IP interface. Once the order has been provisioned in GSE the GSE may start to collect CDRs based on the requested toll-free number. In response, the GSE will invoke the GSE_OE_SEND process 527 to send an order response to a DMQ 526*b*, where it will be accessed by the GSE_OE process 524. The GSE_OE process 524, in turn, will confirm that the number has been provisioned within the TVS server and will update the reference database accordingly by removing the order from a pending order list. Invocation of the GSE_OE process and the GSE_OE_SEND process enables tracking of new customer orders, i.e., new toll-free network numbers for which CDR data is to be collected.

Figure 20:
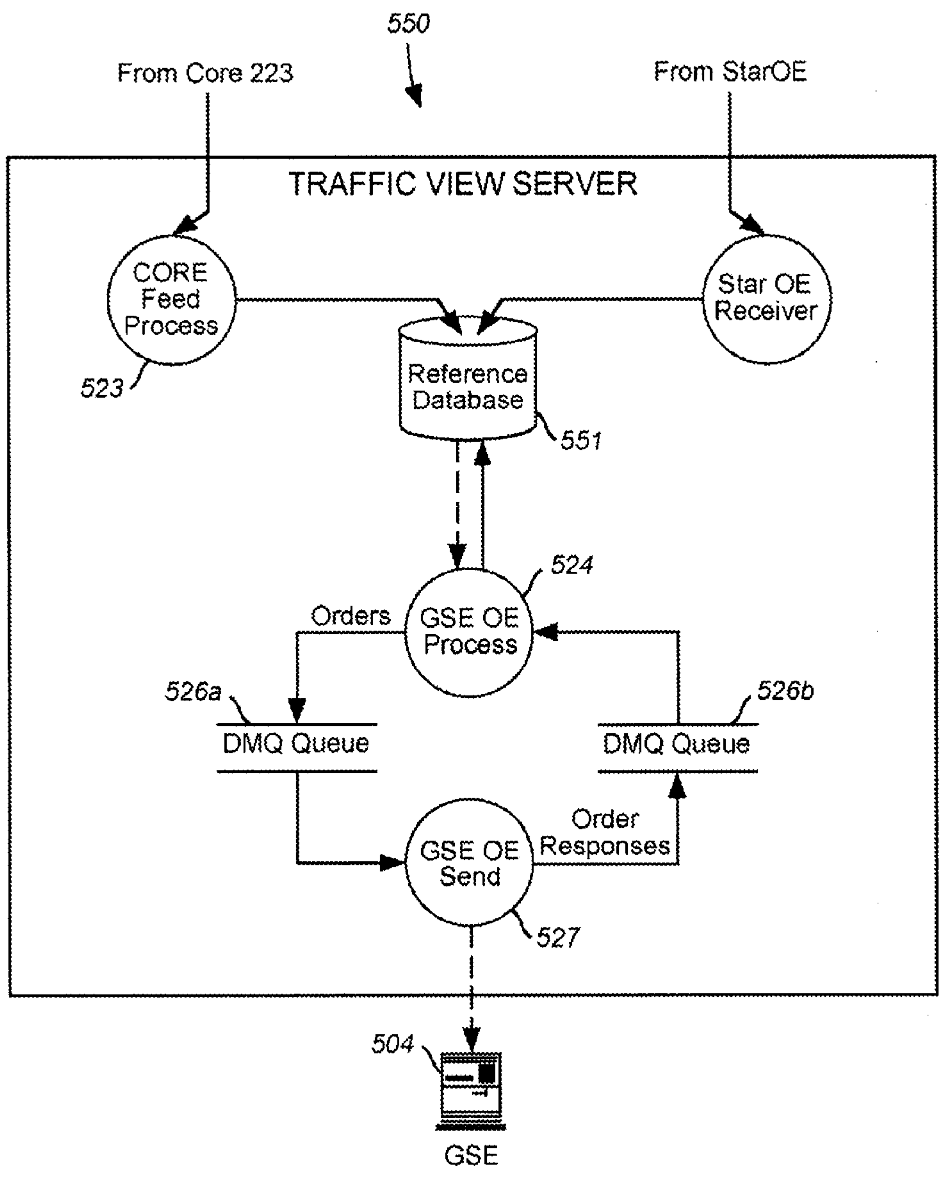
FIG. 20 is a detailed flow diagram depicting the internal TVS server processes for receiving customer TVS enablement data from order entry and CORE systems.

As further shown in FIGS. 18 and 20, in the preferred embodiment, requests to enable TrafficView customers are received in real-time from StarOE 39 via TCP/IP. Generally, StarOE specifies what general categories of reports can be requested for a given nMCI Interact subscriber. These categories include: 1) reports that only require data aggregation; 2) reports that require call detail records to be collected; and 3) real-time monitor (RTM) reports. This is provisioned into the reference database 551 for future verification of requests from the nMCI Interact platform. If a request contains a toll-free number that has not been provisioned with the GSE, a subscription request is sent to the GSE 504 to start collecting TrafficView data pertaining to that toll-free number. This request is sent by placing a request onto the DMQ queue 553, and the GSE_SEND_OE process 554 then forwards this request to the GSE 504 via a TCP/IP interface. In the preferred embodiment, the content and format of an "order entry" message generated by the TVS server for requesting unpriced traffic data from the GSE is provided in Appendix H. In accordance with this messaging, the GSE selects all TCR's for TVS enabled customers and places them in a SAVE storage queue, e.g., Versant or Talarian, for subsequent distribution to the TVS server.

As further shown in FIG. 18, an input feed from the calling area database component 508 ("CADB") provides the TVS server 550 with reference data including state and country information for mapping NPA/NXX (Numbering Plan Area/Number Exchange) to city name and state code, and, for mapping country codes to country names. Data is transported from the CADB database 518 to the TVS server via a network data mover ("NDM") or FTP via interface 519.

A further input feed from the Global Information Repository "GIR" component 511 provides the TVS server with International toll-free number terminations on a periodic basis.

From the circuit order management system ("COMS") component 515, TVS receives three NDM feeds: 1) a Trunk Type Master feed 516 used in Un-priced Reporting to map enhanced voice service/dedicated access line (EVS/DAL) information to specific service locations; 2) an automatic number identification ("ANI") feed 517 also used in Unpriced Reporting to map EVS/DAL information to specific service locations; and, 3) a switch mapping feed 518 to map the switch ID (per Network control system) to the billing representations of the same switch.

As further shown in FIG. 18, unpriced data collection process begins with the placement of an order for unpriced reporting with the customer's account team. Specifically, the account team places the order in real time using an ordering system component. In a periodic process, this order information is transmitted to OEHubs 224, e.g., via e-mail which later inputs the necessary service and reporting flags to the StarOE component 285, via messaging interface 226. The OEHubs 224 further adds new customers to the corporate order entry ("CORE") system component 292, which provides customer billing hierarchy information used by the StarWRS system. The new customer hierarchy information is extracted by the CORE system 292, and is available for pickup by the StarOE server 39 via messaging interface 227.

The StarOE server 39 then messages the Traffic View Server 550 in real time via TCP/IP that the number has been added for Unpriced Reporting. The TVS additionally messages the GSE component 505 in real time to immediately initiate the collection of call detail for that number, as will be described in greater detail herein. Due to latency inherent in the fulfillment process, customers may select and receive daily reports after CDR collection begins.

In accordance with the invention, a wide variety of reports and reporting frequencies are available. In the preferred embodiment, reports are available in hourly, daily, weekly, and monthly frequencies. Types of TVS reports that are available to customers include: Standard reports; Summary reports; Termination Reports; Exception reports; and, unpriced call detail. For example, Standard reports that may be generated from stored Toll Free hourly statistics include, but are not limited to: Summary by Toll Free Number and Hour which is available in the following frequencies (Ad-hoc "A," Daily "D," Weekly "W," and Monthly "M"); Summary by Toll Free Number and Date(A,D,W,M); Summary by Toll Free Number and day of week ("DOW") (A,W,M); Summary by Toll Free Number and Week (A,M); Summary by Toll Free Number and NPA (A,D,W,M); Summary by Toll Free Number, Service Location and Hour(A, D,W,M); Summary by Toll Free Number, Service Location and Date (A,D,W,M); Summary by Toll Free Number, Service Location and DOW (A,W,M); Summary by Toll Free Number, Service Location and Week (A,M); Summary by Service Location and Hour (A,D,W,M); Summary by Service Location and Date (A,D,W,M); Summary by Service Location and DOW (A,W,M); Summary by Service Location and Week (A,M); Summary by Service Location, Toll Free Number and Hour (A,D,W,M); Summary by Service Location, Toll Free Number and Date(A,D,W,M); Summary by Service Location, Toll Free Number and DOW (A,W,M); Summary by Service Location, Toll Free Number and Week (A,M). The Toll Free Summary Reports generally comprise three sections: Summary, Incomplete Call Analysis, and Network Customer Blocked Analysis (other category breakdown). The Termination Summaries include three types of termination reports: Toll Free by Location, i.e., showing termination summary and incomplete call analysis by service location for a specific Toll Free number; By Location, i.e., by service location across all Toll Free numbers terminating to the same service location; and, Location by Toll Free, i.e., for a specific service location, shows each Toll Free number terminating to this location. The originating NPA/Country Code summary reports provide information by NPA and Country for each Toll Free number attached to the report.

Additionally available are what are called Call Detail Exception Reports/images which provide reporting information pertaining to the following: Completion Rate and Retry (A,D,W,M); Completion Rate and Retry with Queue Abandonment (A,D,W,M); Lost Caller and Retry (A,D,M); Lost Caller and Retry with Queue Abandonment (A,D,M); Most Frequent Calling Numbers (A,D,W,M); Most Frequent Calling NPA/NXX (A,D,W,M); Most Frequent Calling Country (A,D,W,M).

The nMCI Interact Exception reports (images) includes: Completion Rate and Retry (A,D,W,M); Completion Rate and Retry with Queue Abandonment (A,D,W,M); Lost Caller and Retry (A,D,M); Lost Caller and Retry with Queue Abandonment (A,D,M); Most Frequent Calling Numbers (A,D,W,M); Most Frequent Calling NPA/NXX (A,D,W,M); and, Most Frequent Calling Country (A,D,W,M). The nMCI Interact Exception reports (data) includes: Call Detail by Originating ANI (A,D,W,M); Call Detail by ID Code (A,D, W,M); Call Detail by NCR Indicator (A,D,W,M); Call Detail by Originating State (A,D,W,M); Call Detail by Disposition (A,D,W,M); Call Detail by Service Location (A,D,W,M); Payphone Summary (A,M). Downloadable nMCI interact Call Detail reports includes Traffic view call detail (available as ad-hoc and daily) and Outbound traffic view call detail data (available as ad-hoc, daily and weekly).

As mentioned, via TCP/IP messaging, the TVS system 550 receives a request in real-time from the nMCI Interact StarOE component 285 to begin collecting call detail records for a particular TVS/Unpriced reporting customer, which number had been previously assigned during the order entry process. When a customer discontinues Unpriced Reporting for a number, this information is entered in StarOE tables where it is stored for a predetermined period subsequent to termination of the number. After the predetermined period of time, e.g., seven days, the numbers scheduled for service deletion are passed to TVS via TCP/IP connectivity in real time. After receiving this information, TVS instructs the GSE 504 in real time to stop collecting CDRs for these numbers.

Figure 21:
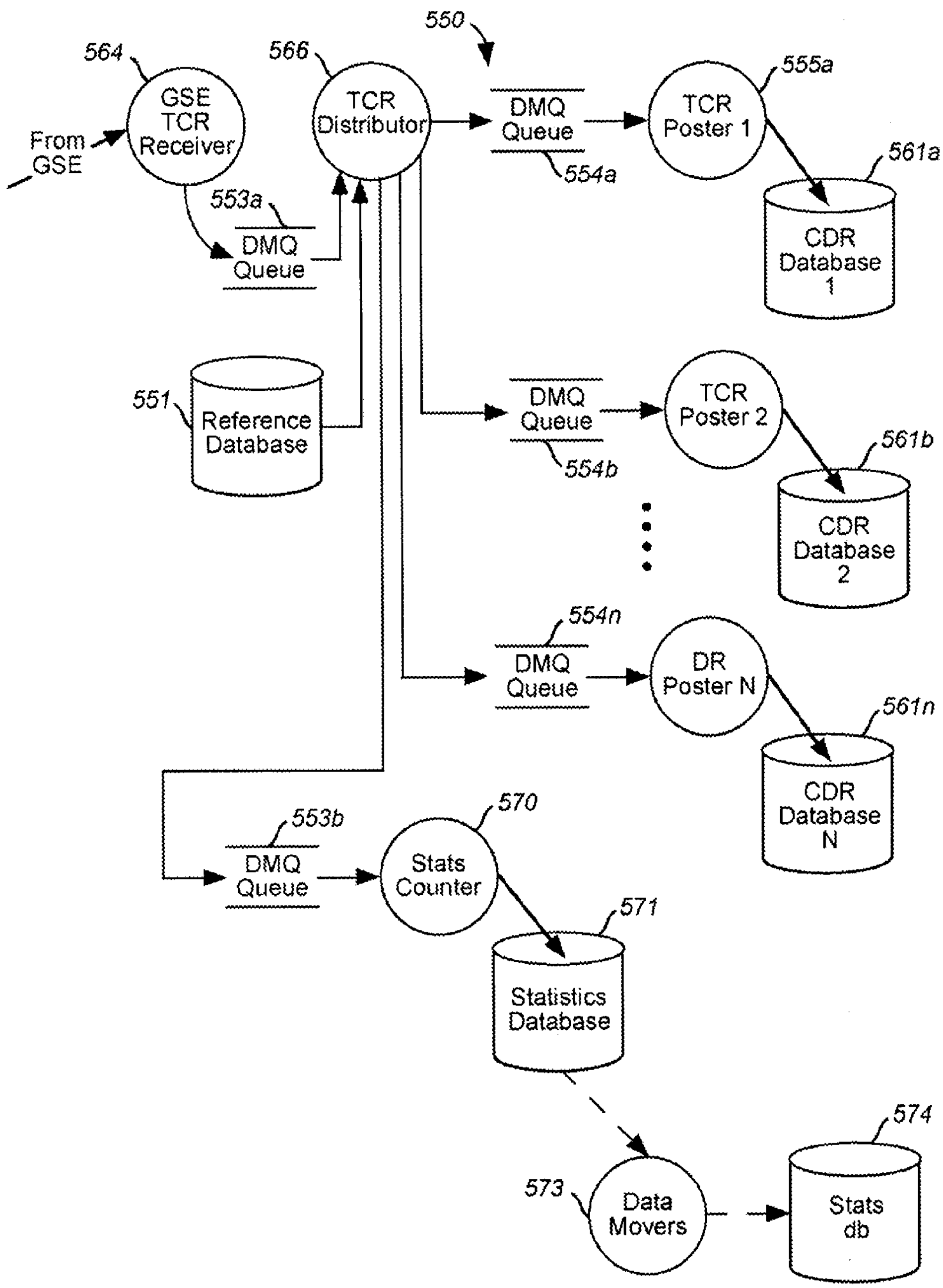
FIG. 21 is a high-level diagram depicting TCR data flow between processes internal to the TVS server.

FIG. 21 illustrates a generalized block diagram detailing the internal TVS data acquisition processes. As shown in FIG. 21, a TVS server "GSE_TCR_RCVR" process 564 receives a group of TCR records from the GSE component 504. The GSE_TCR_RCVR process 564 inserts that group into a DMQ (DecMessageQueue) queue 553*a* that provides a guaranteed message delivery. Upon successful storing of a record into the DMQ queue 553*a*, the GSE_TCR_RCVR process 564 sends an acknowledgment to the GSE component 504 so that it may delete that group. If TVS fails to acknowledge this group after a predetermined timeframe, the GSE continues to resend this group until an acknowledgment is received. The TCR_DISTRIB process 566 reads groupings of records and distributes a record based on the toll-free number associated with that record in the following manner:

First, as the reference database 551 contains information on which toll-free number belongs in which CDR database associated with the TVS server, records are grouped for each CDR database 561*a*,561*b*, . . . ,561*n*, to which they belong. The reference database 551 additionally flags which numbers are to have statistics collected for them. Thus, an additional group of records is created and may be routed to a DMQ Queue 553*b* which inputs these records into a statistics "stats" counter process 570 for statistics processing, as will be described in greater detail herein. When all the records in the group have been read, each group is written to it's DMQ queue 554*a*,554*b*, . . . ,554*n* associated with its destination database CDR Database 561*a*, 561*b*, . . . ,561*n*. For instance, via a TCR Poster process 555*a*, records destined for CDR database 561*a* are forwarded from the DMQ Queue 554*a*. Particularly, each CDR poster process 555*a*, 555*b*, . . . ,555*n* reads data from it's corresponding DMQ Queue and formats & stores those records in their database.

With further regard to the stats counter 570 shown in FIG. 21, TCRs are rolled up into statistics records. Specifically, the stats counter 570 keeps counts of the following: summary information about each toll free number for an hour; summary information about each toll free number and termination for an hour; and, summary information about each toll free number and origination NPA for an hour. These statistics are kept in memory for a pre-determined amount of time, e.g., one hour. As matching records come in, statistics are updated. At the end of the time period, these records are written to the statistics database 571, and particularly high speed electronic data drives.

The statistics that are gathered for each subscriber's toll-free number in the TVS system of the invention include: total completions, total call duration, total attempts, total switch control call, total Network Control System (NCS) blocked, total NCS rejected, total network blocked (all routes busy), total supp code blocked, and out-of-band blocked. Appendix I of co-pending U.S. patent application Ser. No. 09/074,072, provides a summary table processing algorithm detailing the collection of statistics by the GSE and the TVS summary table processing.

Additionally, statistics gathered for NP table processing include: originating NPA, total attempts per NPA, total calls completed (tcc) per NPA, total call not delivered (blocked) per NPA, total attempts for International Originations, tcc for International Originations ("IO"), total calls not delivered (blocked) for IO.

Additionally, call statistics for terminations include: termination type, termination address, total completions, total call duration, and call dispositions indicating the cause of an incomplete call including: total short calls, total didn't write, and total didn't answer.

With more particularity regarding the statistics database design, and, in further view of FIG. 21, the stats_counter 570 contains processes that read TCR's from a DMQ queue, and create statistics records for input to "c_tables" in the statistics database 571.

Appendix I of co-pending U.S. patent application Ser. No. 09/074,072 depicts the algorithms implemented in TVS stats_counter process 570 for generating statistics data tables so that TCR records may be processed in batches. As shown, the processes include: a summary table process which process generates statistics for call summary data; a NPA table process; Country table process and Termination table process. The stats_counter 570 enables multiple processes to be run at the same time on the same machine. To allow an arbitrary number of Stats_Counter processes, the stats databases are organized as a series of configurable tables, e.g., "C_Tables" 572, which are temporary tables that the stats counters first insert records to. These tables are identical to normal statistics tables with the exception that they include a field for the date in them. In accordance with the provision of C_tables, a pending_stats_list table and stats_table_usage_list table are used to keep track of what data is in the C_tables, and to drive the movement of data from the C_tables to a more permanent database tables 574.

Particularly, when the stats_counter process 570 starts, it performs a check of the set of "c_tables" by inserting its process name in the used_by_process field of the stats_table_usage_list table. If the stats_counter process unexpectantly dies, it reclaims the tables previously used by searching the stats_table_usage_list for tables marked with it's process name. The stats_counter process adds an entry into the pending_stats_list every time it creates stats for a new day. The usage_flag is initially set to "1" in that table. At the top of the hour, for example, the stats_counter processes marks all of the usage_flag entries to "2," and modifies the value of the used_by_process field in the stats_table_usage_list to "MOVER." The stats_counter process then searches the stats_table_usage_list for another set of tables to use for the next hours counting. If the stats_counter process cannot find a set of tables, it aborts. To avoid this, there is extra sets of "c_tables" configured with entries in the stats_table_usage_list.

Table 1 of co-pending U.S. patent application Ser. No. 09/074,072, depicts an example pending_stats_list table which comprises a directory of what the stats_counter is working on, or finished with. Each record represents a name of a c_table that contains statistics, and dates that are contained in this c_table. The report generator process, and on-line access use this table to determine if there is any data in the c_tables that they may be interested in, and what the table name is. The Stats_counter processes insert records into this table, and data_mover processes 573, shown in FIG. 21, remove entries from this table.

Table 2 of co-pending U.S. patent application Ser. No. 09/074,072, depicts an example stats_table_usage_list table which comprises a list of all the c_tables that are configured and used by the stats_counter processes and data_mover processes to allocate tables amongst themselves. The number of records in this table remains static. Stats_counter processes 570 update the "used_by_process" field with their process name when they are in control of that table. At the top of the hour, they may change the used_by_process to "MOVER," and attempt to find another table that is unallocated. The movers change the used_by_process name to "NONE" when they have completed moving data from that c_table.

In the preferred embodiment, there are four types of movers are currently configured to run: NPA, summary, country, and termination. Each type of mover looks in the pending_stats_list for the name of the "c_table" of the same type with a usage_flag of "2", for instance, and the earliest date. The mover then transfers the data for this date from the "c_table" to appropriate the permanent table. When the data transfer is finished, the matching record in pending_stats_list is deleted. If there are no more entries for this "c_table" in pending_stats_list, the mover process takes the precautionary step of searching the "c_table" for additional data that was not noted in pending_stats_list. Entries are then added to pending_stats_list for any data found in the "c_table." If no additional data is found, used_by_process in stats_table_usage_list is changed from "MOVER" to "NONE" for this "c_ *table*."

Figure 22:
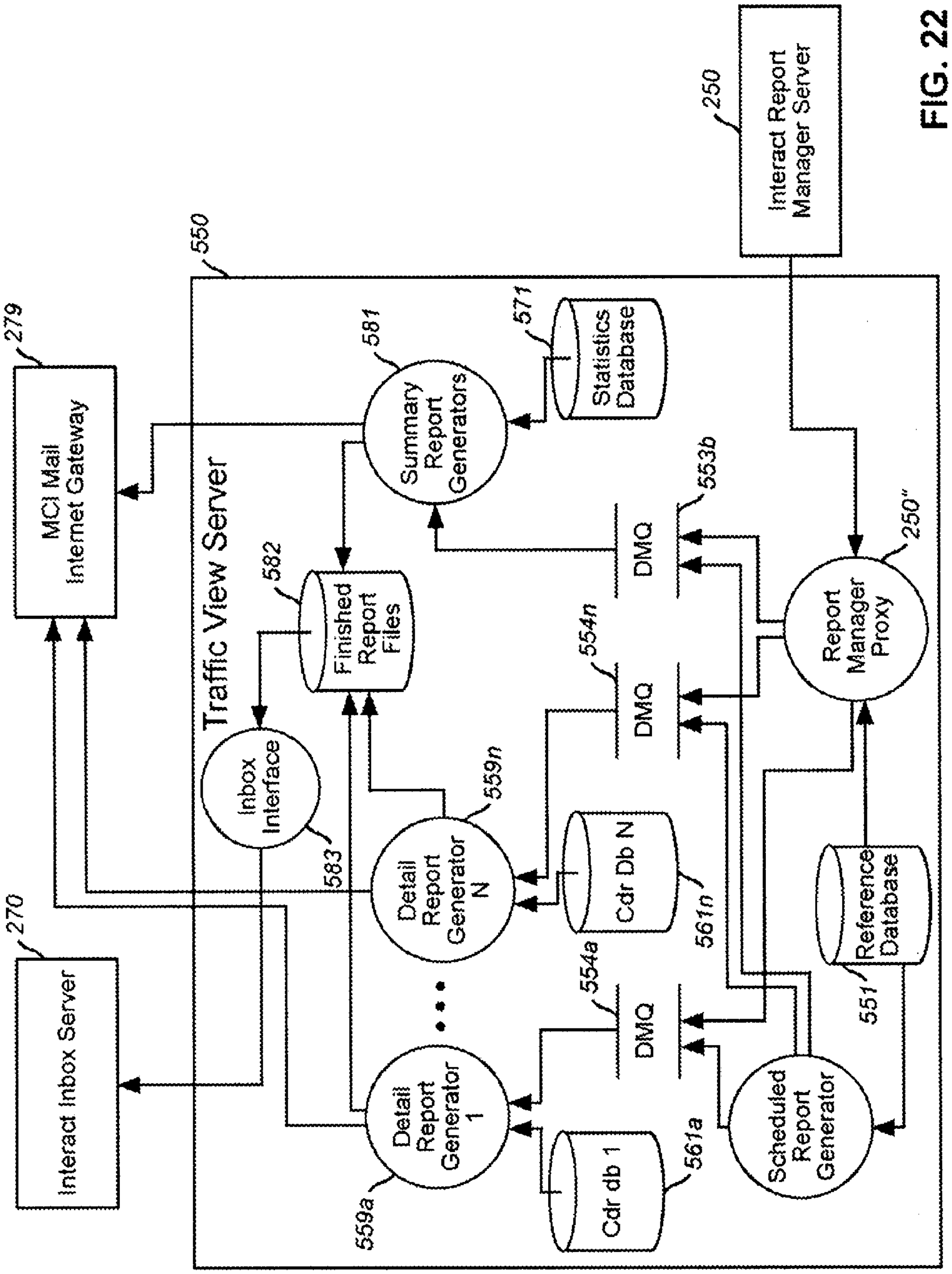
FIG. 22 is a high-level flow diagram depicting TVS unpriced call detail data report generation process.
Figure 23B:
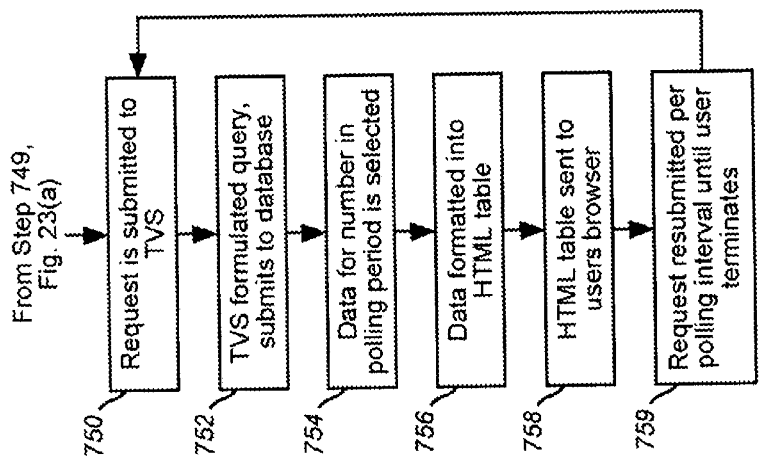
FIGS. 23(*a*)–23(*b*) illustrate flow charts describing the real-time monitoring process of the invention.
Figure 23A:
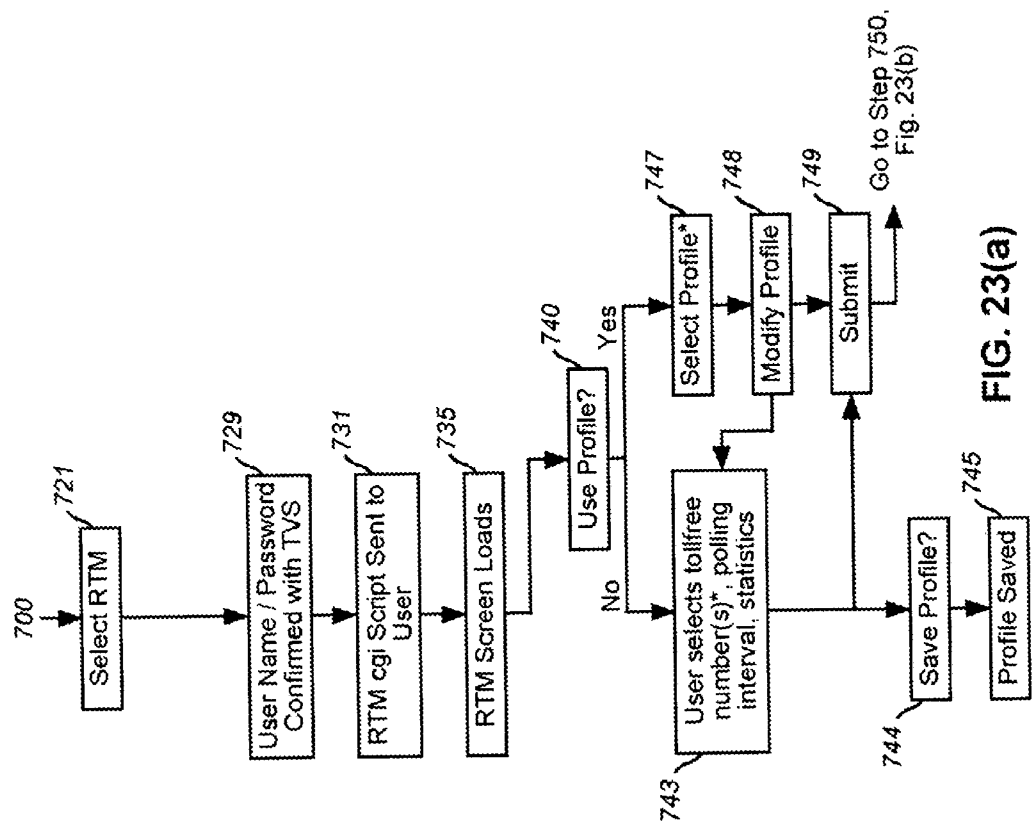
Figure 23C:
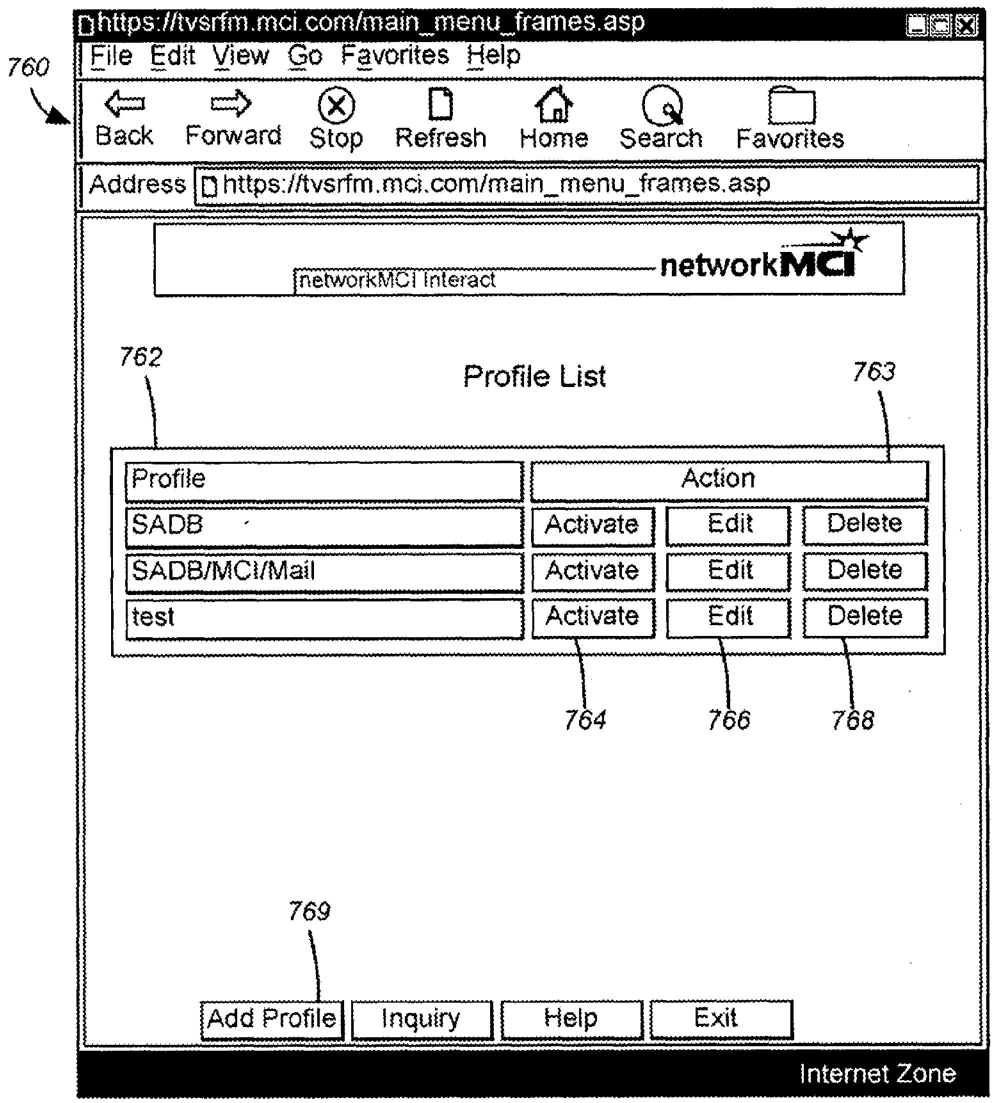
Figure 23D:
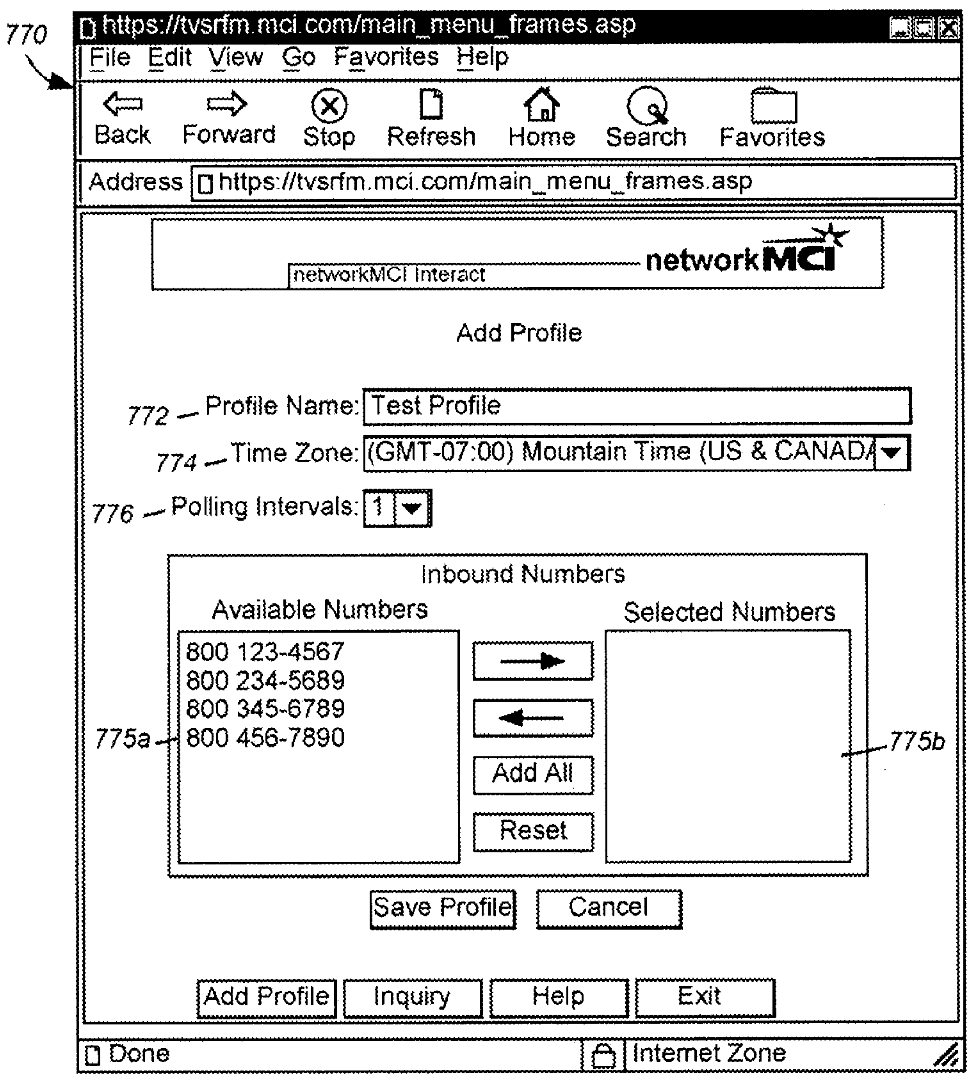
Figure 23E:
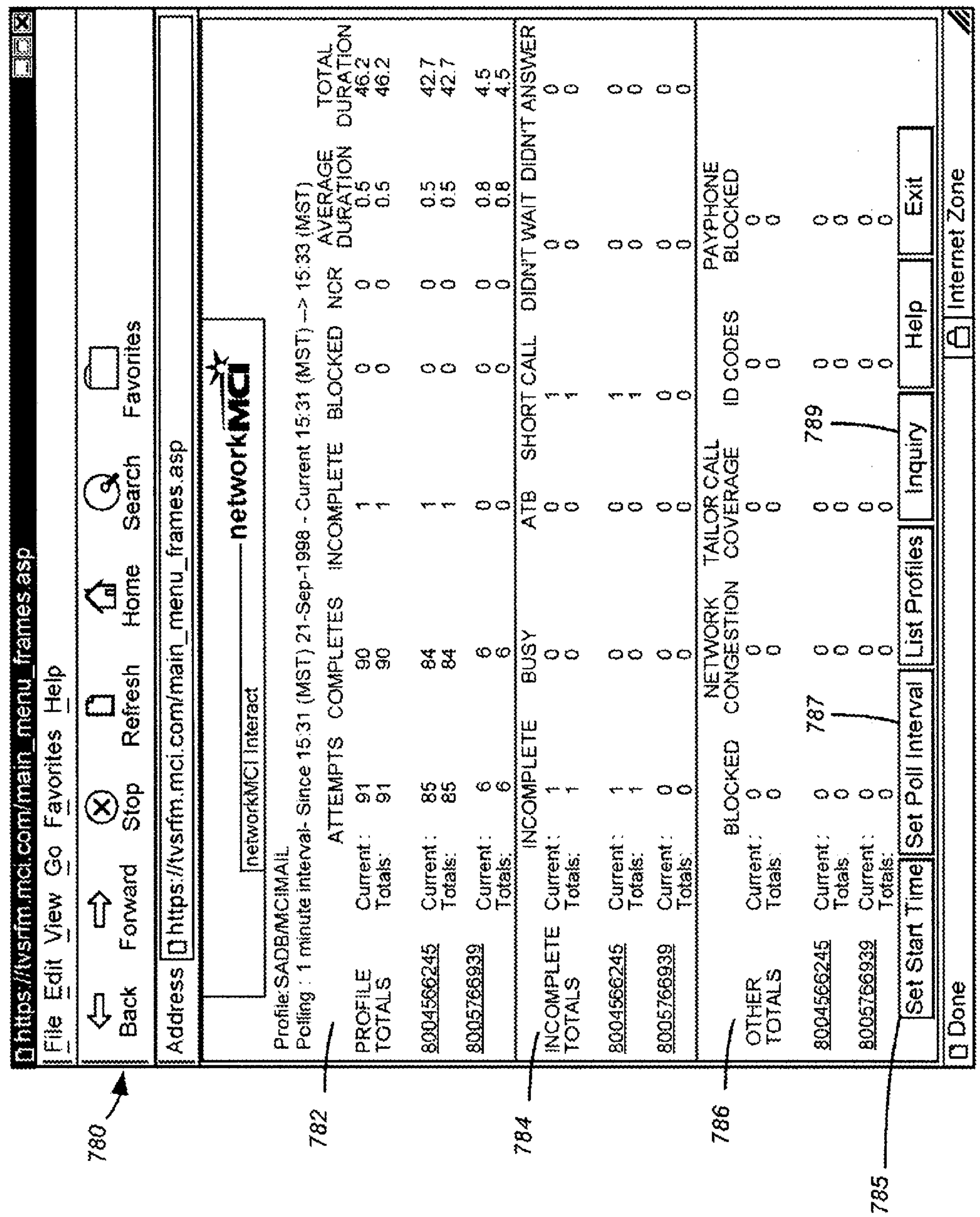
Figure 23F:
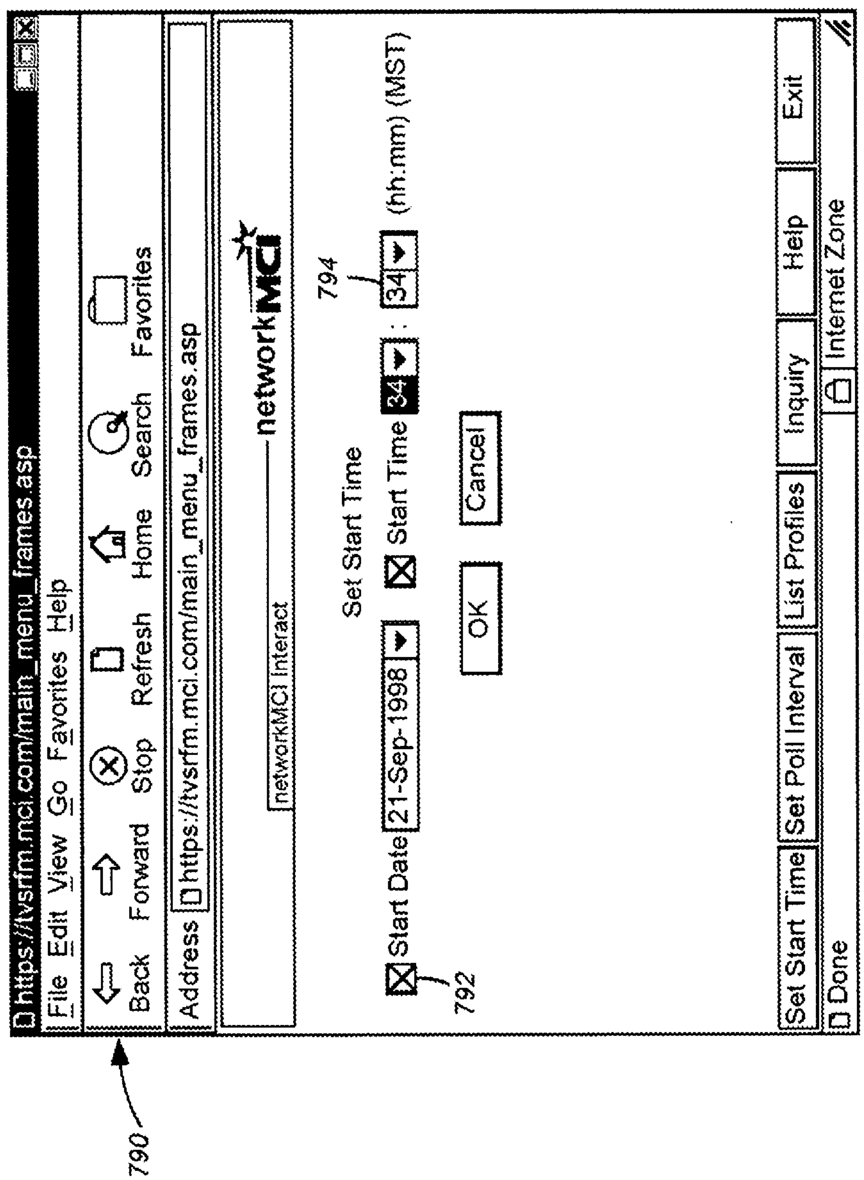
Figure 23G:
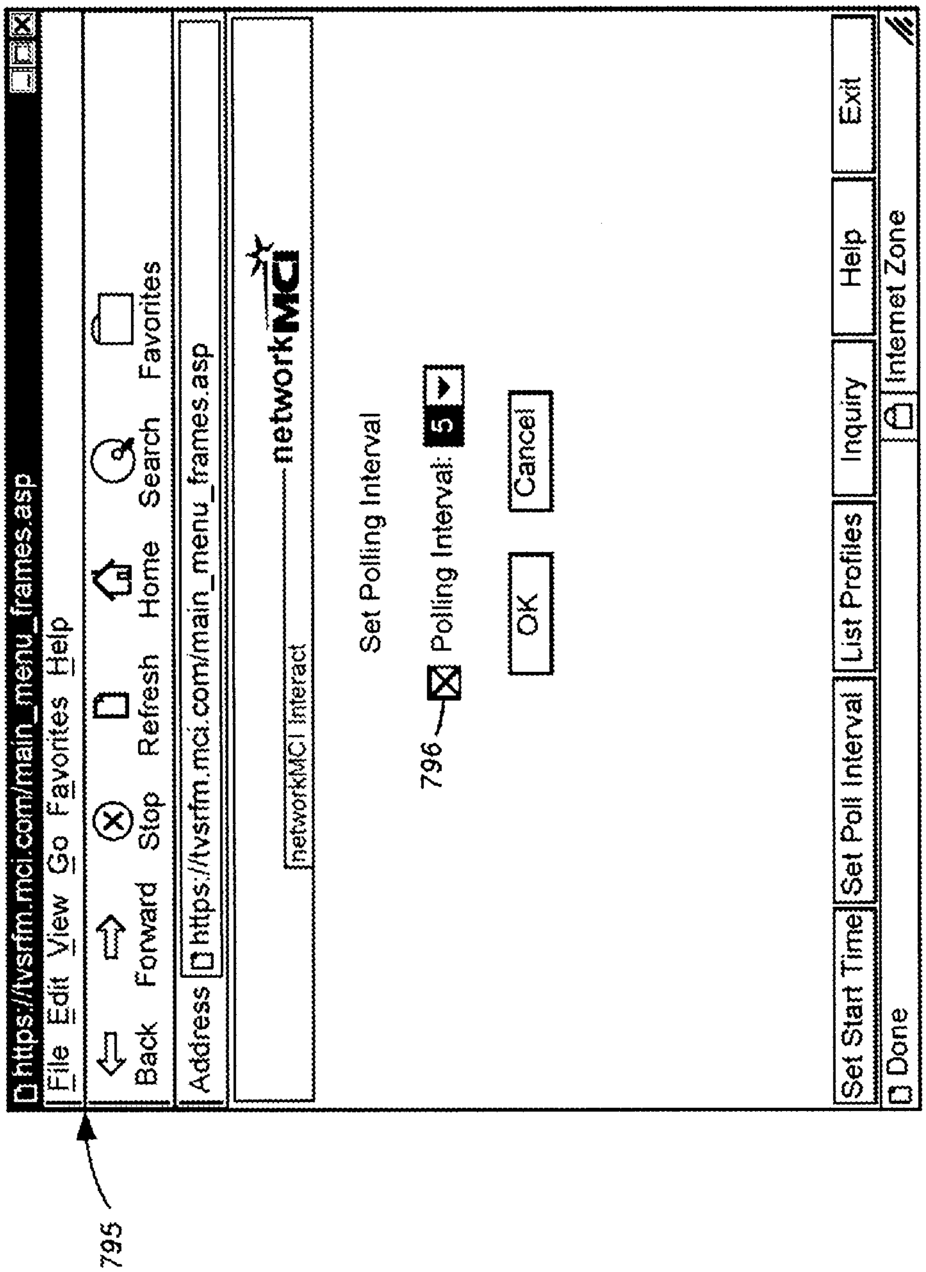
Figure 23H:
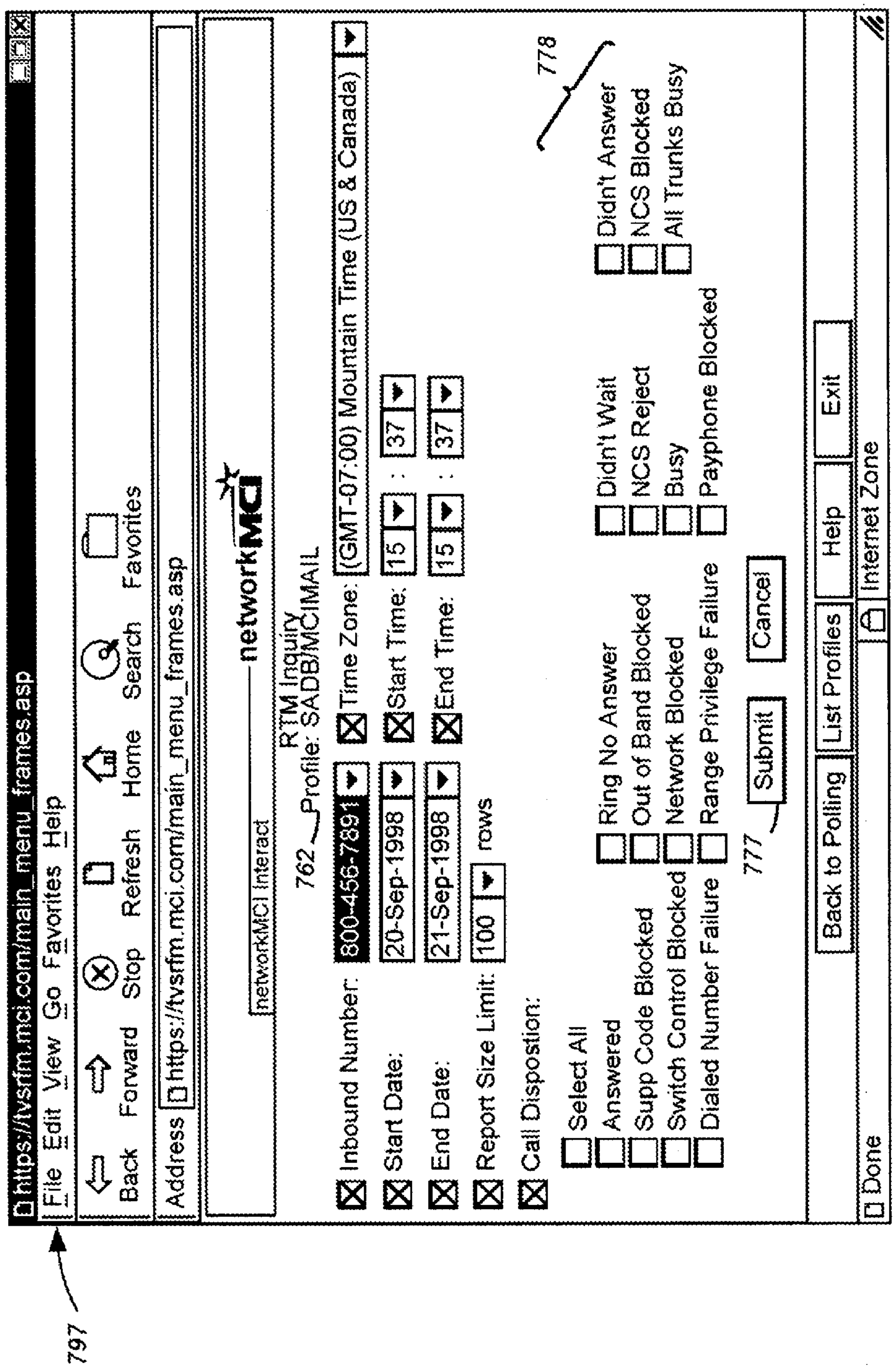
Figure 23I:
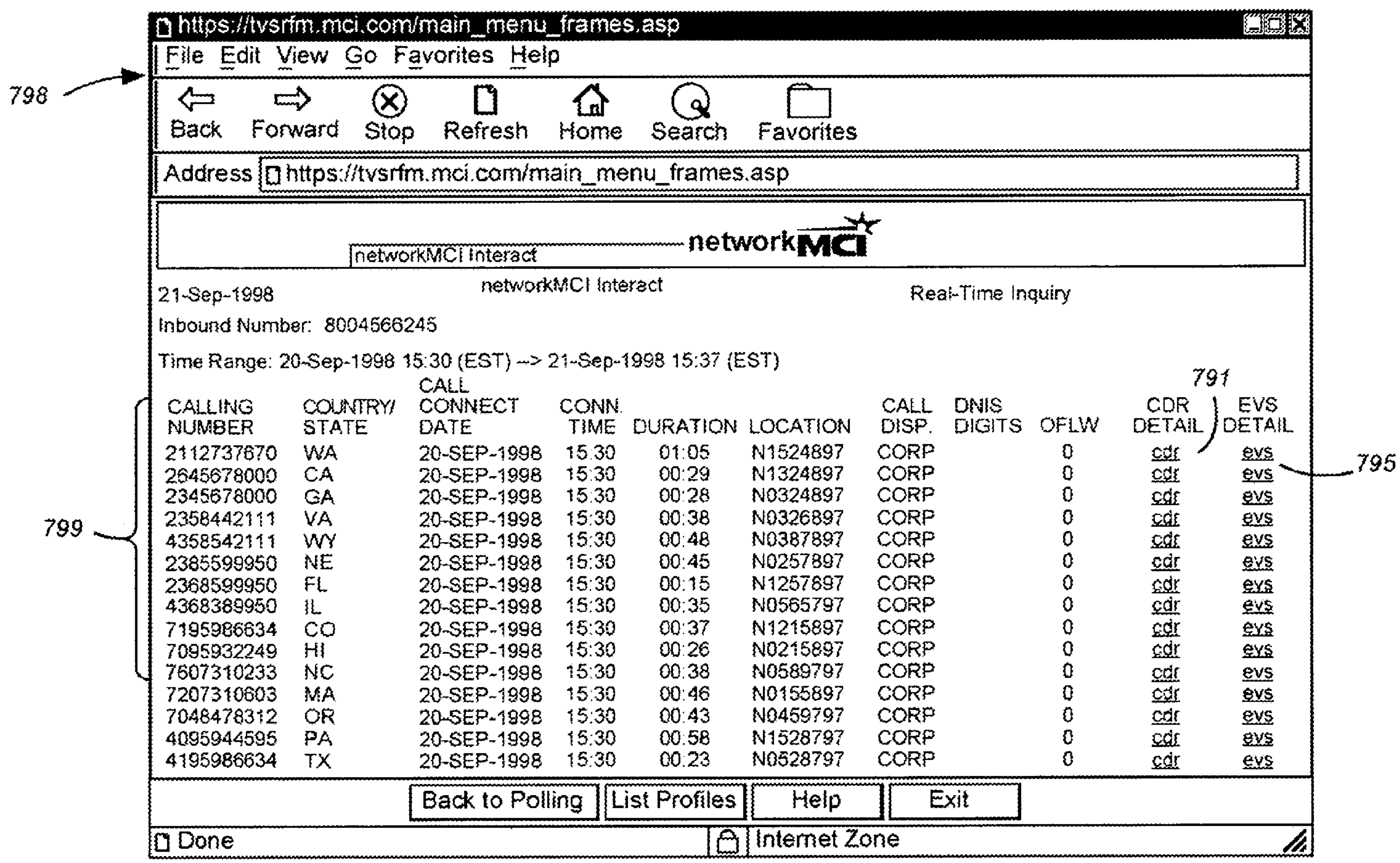
Figure 23J:
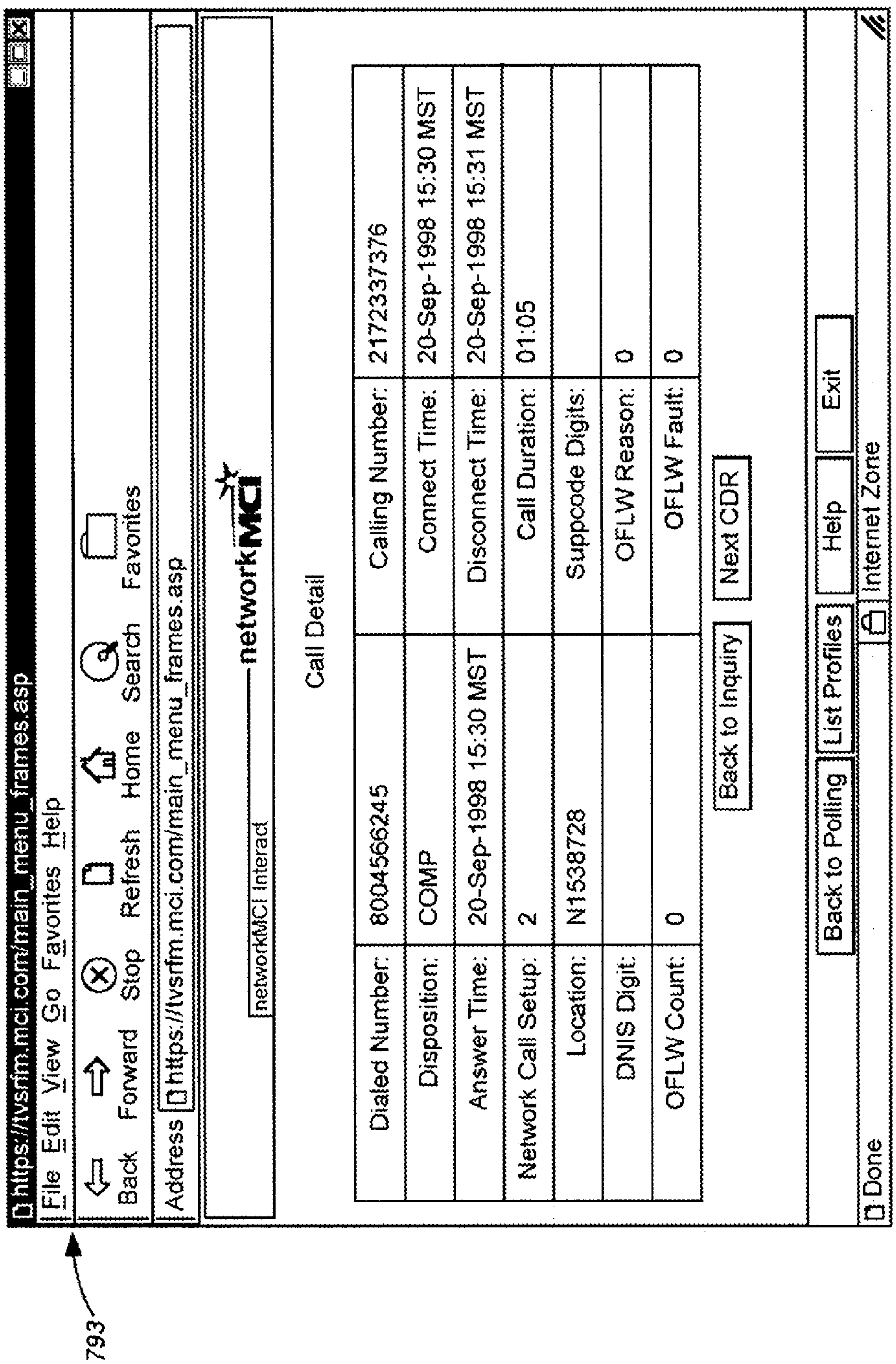

The interaction between StarWRS web-based reporting system and TVS system 550 will now be explained in greater detail with respect to FIG. 22. In the preferred embodiment, reports may be triggered by two possible sources: Scheduled report setup by a CORE order; and, real time report requests as forwarded from the report request/Report Manager Server 250. The report generation process is hereinafter described with respect to real-time reports from the StarWRS system.

As mentioned, requests are received in real-time from the Report Manager Server 250 which either passes on-demand reports from an end-user, or reports that it has internally scheduled via Report scheduler server 260. In the TVS server 550, a report manager proxy process 250" gathers information about the reports to be generated from the reference database 551 by determining whether the report request may be fulfilled by statistics processing, or the CDR's. If CDR's are needed, a determination is then made as to which database contains the necessary data. Additionally determined is whether the needed CDR data to fulfill the request spans a long period of time, e.g., several days. Once these determinations are made, the requests are sent from the report manager proxy process 250" to the appropriate DMQ queue 554*a*,554*b*, . . . , 554*n*, or 553*b* where they are queued up for report generation.

For the scenario requiring generation of call detail data reports, i.e., those requiring Call detail records, the destination of the report, e.g., StarWRS Inbox server 270, fax, U.S. mail, etc., is determined from the reference database 551. Then, the requested data is gathered based on the metadata request, analyzed, and formatted by various corresponding detail report generator processes indicated in FIG. 11 as processes 559*a*, . . . , 559*n*. Although not shown in FIG. 11, it should be understood that reference data that originates from CADB and COMS may be necessary to complete these reports. Furthermore, although not shown, the TVS server is provided with an additional set of queues and report generator processes for each of the CDR processing to allow longer reports to not interfere with shorter reports.

In the detail report generator processes, the data is formatted in a comma separated value (CSV) format and are input to a finished report files database 582 whereupon, an inbox server interface process 583 FTPs the report to the nMCI Interact Inbox Server 270. The Inbox interface will particularly input the completed report to the pre-defined directory in the Inbox database. Particularly, the Inbox is notified via TCP/IP that the report is complete by the Inbox Interface process and that the appropriate metadata is available for report presentation via the report viewer.

If the requested report is destined for MCI Mail delivery (Fax, Mail, US Mail): then the data is formatted with headers, page breaks, line numbers into a report that is saved to a file. The report is then sent to an Internet Gateway 279, e.g., the MCI Mail Internet Gateway directly from the detail report generators 559*a*, . . . ,559*n* for delivery by MCI Mail. Once the file is successfully sent it is deleted, thus allowing for report generation to continue when the MCI Mail Internet Gateway is not available.

An identical process is implemented for those customer report requests for aggregate data, i.e., statistics. However, the data that is gathered and analyzed is retrieved from a summary report generator process 581 which retrieves the requested report data from the statistics database 571 upon a receipt of a report request from the DMQ 553*b*.

As described herein, when the user requests call detail for a particular period of time, this request is translated by the StarWRS component into a metadata file which is sent to TVS in the manner described herein. Users schedule reports for execution using the Report Scheduler in StarWRS in the manner as described herein and in co-pending U.S. patent application Ser. No. 09/159,409. When the user has completed report selection, modifications and scheduling, the StarWRS Report Scheduler component 260 creates a metadata message comprising this information which file is passed to TVS in real time. The TVS then uses this file to formulate a query and runs the report for the scheduled time period.

After TVS runs the report, TVS sends the report to the Inbox server component 270 of StarWRS immediately after they are completed.

RTM

As further shown in FIG. 18, the nMCI Interact's web-based front-end and middle-tier TVS system infrastructure 500 implements processes enabling customers to monitor in real time, their network traffic call detail statistics, in real time, via TCP/IP connections 293 and 294. As shown, customer requests are entered by the customer 100 via an RTM graphic user interface and preferably communicated over secure TCP/IP socket connections for input over the firewall 25 to at least one secure server, e.g., a DMZ RTM Web Server 52 (FIG. 2) that provides for authentication, validation, and session management in the manner as described herein.

Particularly, the user first establishes communication with the RTM Web server 52 (FIG. 2), Dispatcher and StarOE systems to enable logon, authentication and verification of Real Time traffic Monitor entitlements, as described above with respect to FIGS. 4–6. If the customer subscribes to Real Time Monitor, a Traffic Monitor icon 85 (FIG. 5(*a*)) is automatically enabled when the home page appears.

The process flow 700 for implementing real time monitoring of a customer's network traffic is shown in FIGS. 23(*a*)–23(*b*). Preferably, as shown in FIG. 23(*a*), in response to selecting the RTM function, at step 721, a hot link connection to the TVS CGI/HTML implementation of RTM is made to initiate a security/authentication process for the Unpriced data RTM products for which the customer is provisioned. With more particularity, the user connects to the RTM URL. and checks the RTM Web Server implementing an HTTP Post method. In response, the RTM Web Server generates a cookie and implements the RTM Web Server common gateway interface protocol ("CGI") to send a validation request to TVS via TCP/IP with the cookie. The TVS server 550 validates the logon request by referencing Level of Service tables (not shown) provided in the Traffic View server that confirm the customer is enabled for RTM, as indicated at step 729. The TVS server stores user information with the cookie, and returns the validation information to the Web Server. Next, via CGI, an HTML page is sent to the user as indicated at step 731 presenting the user with an RTM screen and menu options, as indicated at step 735, thus allowing customer access to all RTM functionality which that user is entitled. As will be explained, this functionality includes interaction with the RTM application to formulate and transmit requests and receive the results. For example, the user may select the toll-free numbers to be tracked, enter a polling period, and define the call detail statistics desired.

Particularly, selection of the traffic monitor icon enables display of the traffic monitor profile list page 760, shown in FIG. 23(*c*), which presents a list of the user-defined profiles 762 for which real time monitoring functions 763 may be invoked. Particularly, from the web page 760, a user may activate a real time monitoring function by selecting an activate button 764, edit an existing RTM profile by selecting button 766, or delete an existing RTM profile by selecting button 768. Additionally, a user may create a new RTM profile for a new toll-free number, by selecting an add profile button 769.

Upon selection of the add profile button 769, a new dialog window 770, such as the example window shown in FIG. 23(*d*), is presented which may allow a customer to enter desired RTM profile parameters for a selected toll-free (inbound) number 775*b* including: a profile name 772, a time zone 774, and, a polling interval 776, which specifies the time interval in which statistics data is to be gathered by the GSE and which, in the preferred embodiment, may be down to a one (1) minute interval. Particularly, a customer may be presented with a list of available numbers 775*a* from which a number may be selected for profile generation.

It should be understood that a profile selected from the profile list page 760 (FIG. 23(*c*)), may be edited upon selection of a profile edit button 766. An edit profile page will be presented to the customer that is similar to the add profile page 770 (FIG. 23(*d*)). Thus, from the dialog shown in FIG. 23(*d*), the profile parameters of an existing RTM profile for a particular number, may be modified.

Referring back to FIG. 23(*c*), upon selection of the activate button 764 for a selected profile, an active profile web page 780 will be displayed, such as shown in FIG. 23(*e*), which presents the real-time summary data for the selected toll free number/profile. As shown in FIG. 23(*e*), the active profile web page 780 is broken down into three sections: a first section 782 displaying profile summary data for the selected toll-free number including call attempts, call completes, call incompletes, blocked, NCR, average duration and total duration; a second section 784 displaying a summary breakdown of the call incompletes for the selected profile including busy, (all trunks busy) ATB, short calls, didn't waits, or didn't answers; and, a third section 786 displaying other summary data not presented in the first two sections such as network congestion, ID codes, payphone blocked, etc. It is from this screen that a customer may view real-time information pertaining to their toll-free network usage, and make informed business decisions regarding call-routing plans.

As further shown in FIG. 23(*e*), the customer may select a start time button 785 enabling selection of a specific time for which real-time traffic statistics are to be gathered for presentation to the customer. Thus, upon selection of the start time button 785, a set start time web page 790 will be displayed, such as shown in FIG. 23(*f*), which enables specification of a start date from a drop-down menu 792, and specification of a start time from a drop-down menu 794.

Likewise, as further shown in FIG. 23(*e*), the customer may select a polling interval specifying the time interval at which the summary data displayed on the active profile web page may be updated. Thus, upon selection of the start time button 787, a set polling interval page 795 will be displayed, such as shown in FIG. 23(*g*), enabling selection of a polling interval, e.g., in minutes, from a drop-down menu 796, for which real-time, statistical network traffic data is to be refreshed for display on the active profile page 780 (FIG. 23(*e*)).

Furthermore, as shown in the active profile page display of FIG. 23(*e*), the customer may select an Inquiry button 789 enabling a display of selected RTM call disposition parameters for the current selected RTM profile. Thus, upon selection of the inquiry button 789, an inquiry request page 797 will be displayed, such as shown in FIG. 23(*h*), enabling further inquiry selection/and or modification of RTM parameters for the selected profile 762 including: the inbound telephone number, start date, end date, report size limit, time zone, start time and end time. Additionally, further call disposition parameters 778 may be inquired into for display in the active profile page of FIG. 23(*e*) including: call answered, supp code blocked, switch control blocked, dialed number failure, ring no answer, out of band blocked, network blocked, range privilege failure, didn't wait, (network control system) NCS reject, busy, payphone blocked, didn't answer, NCS blocked, and all trunks busy. Particularly, upon selection of the submit button 777 of display 797, an inquiry results page 798 will be presented, such as shown in FIG. 23(*i*), which displays the collected raw real-time call detail statistic data in display line format 799 for the selected RTM profile.

As further shown in FIG. 23(*i*), the customer may select a CDR detail link 791 to invoke a display showing the details of a specific call detail record, such as the example display 793 shown in FIG. 23(*j*). Likewise, the customer may select an enhanced voice services (EVS) detail link 795 to invoke a display presenting the selected EVS details (not shown).

Thus, referring back to FIG. 23(*b*), the customer is enabled to select or modify his/her predefined RTM use profile, as indicated at step 740, FIG. 23(*a*). Specifically, the customer may create or edit their user profile, for example, by entering selection criteria such as: 800/8xx or Vnet number to report, a polling interval, and time zone. The user may also delete a user profile. The entered selection criteria may be saved by the subscriber as a new user profile for storage in the TVS server Level_of_use tables, as indicated at steps 744 and 745, or submitted directly to the TVS server, as indicated at steps 749 and 750. It should be understood that all TVS RTM functionality as described in co-pending U.S. patent application Ser. No. 08/587,381 filed Jan. 17, 1996, entitled SYSTEM AND METHOD THEREFOR OF VIEWING IN REAL TIME CALL TRAFFIC OF A TELECOMMUNICATIONS NETWORK, the contents and disclosure of which is incorporated by reference as if fully set forth herein, may be available to the customer.

If, at step 740, the subscriber has selected a previously defined use profile, as indicated at step 747, the subscriber may modify the profile, i.e., 800/8xx or VNET number to report, polling interval, and define statistics, as indicated at step 748, and submit it directly to the TVS server, as indicated at steps 749 and 750 (FIG. 23(*b*)).

At this point, the user can interact with the RTM application to formulate a request, transmit it and receive the results according to the user-selected toll-free number(s) to be tracked, polling period and defined statistics desired.

Briefly, after receiving the request, at step 752, FIG. 23(*b*), the TVS formulates a query and submits the query to the call detail database which is the repository of all call detail records for the particular number selected. The TVS server selects the call detail data in accordance with the user profile or selection at step 754, and passes the data to the RTM Web Server which formats the data into an HTML table, as indicated at step 756. This HTML table is sent to the user's browser at step 758 and the process continues at step 759 for each successive polling interval until the user terminates the request.

As mentioned, the networkMCI Interact Real-time Traffic Monitor provides a customer with a real-time summary display of calls made to their toll-free numbers. This information is displayed on the Active Profile page 780 such as shown in FIG. 23(*e*), which may be automatically refreshed at a specified polling interval of, e.g., 1 to 30 minutes. This value is selectable by the user upon profile creation. The information on the Active Profile page is refreshed at this interval by the user's browser (a "client pull" operation). This happens automatically because the Active Profile page contains an HTML Refresh meta tag which tells the user's browser software to re-display the current page after the indicated number of seconds has passed.

Figure 24:
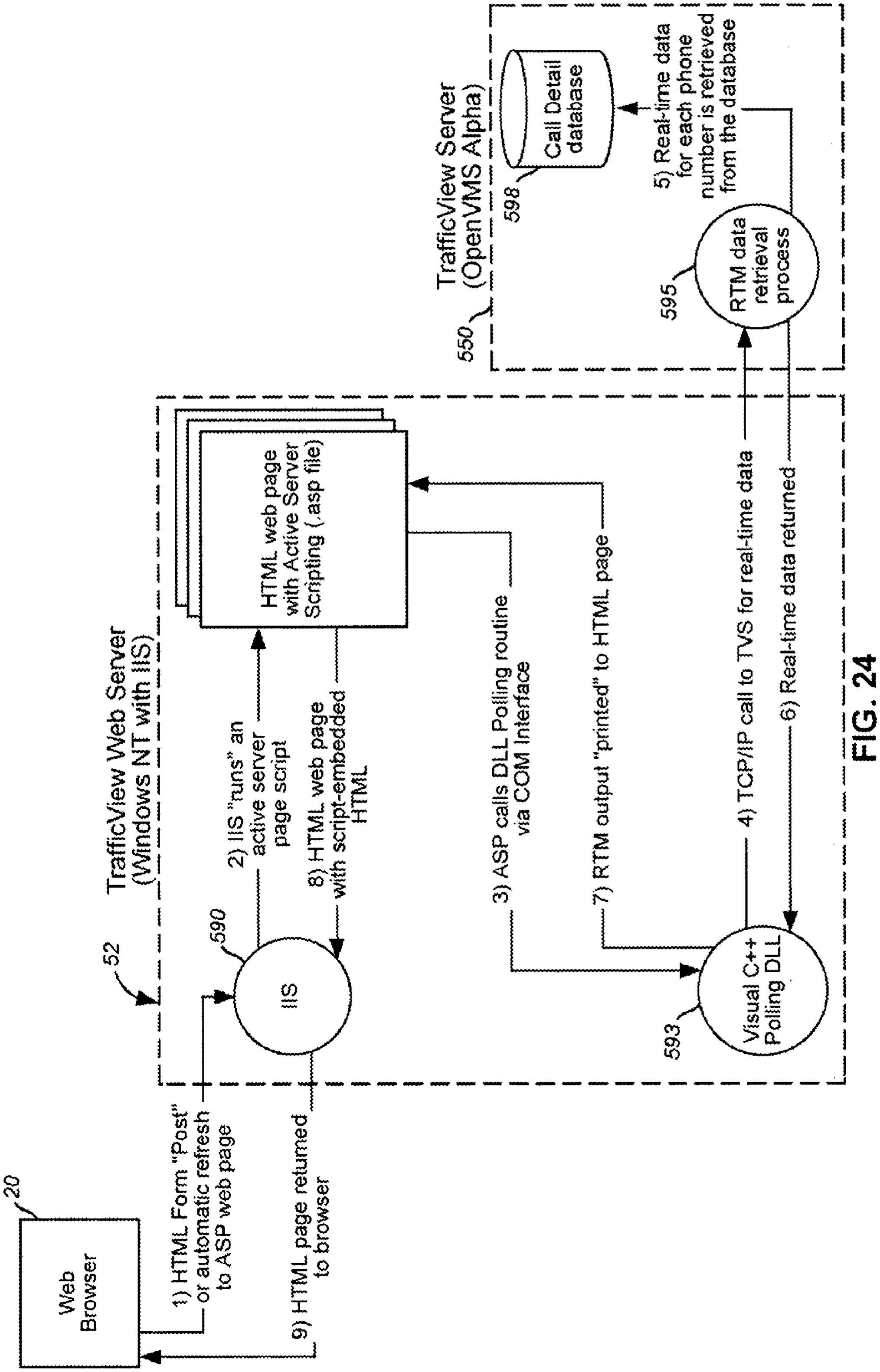
FIG. 24 illustrates the particular methodology employed for periodically updating a Web page with updated statistical data.
Figure 25A:
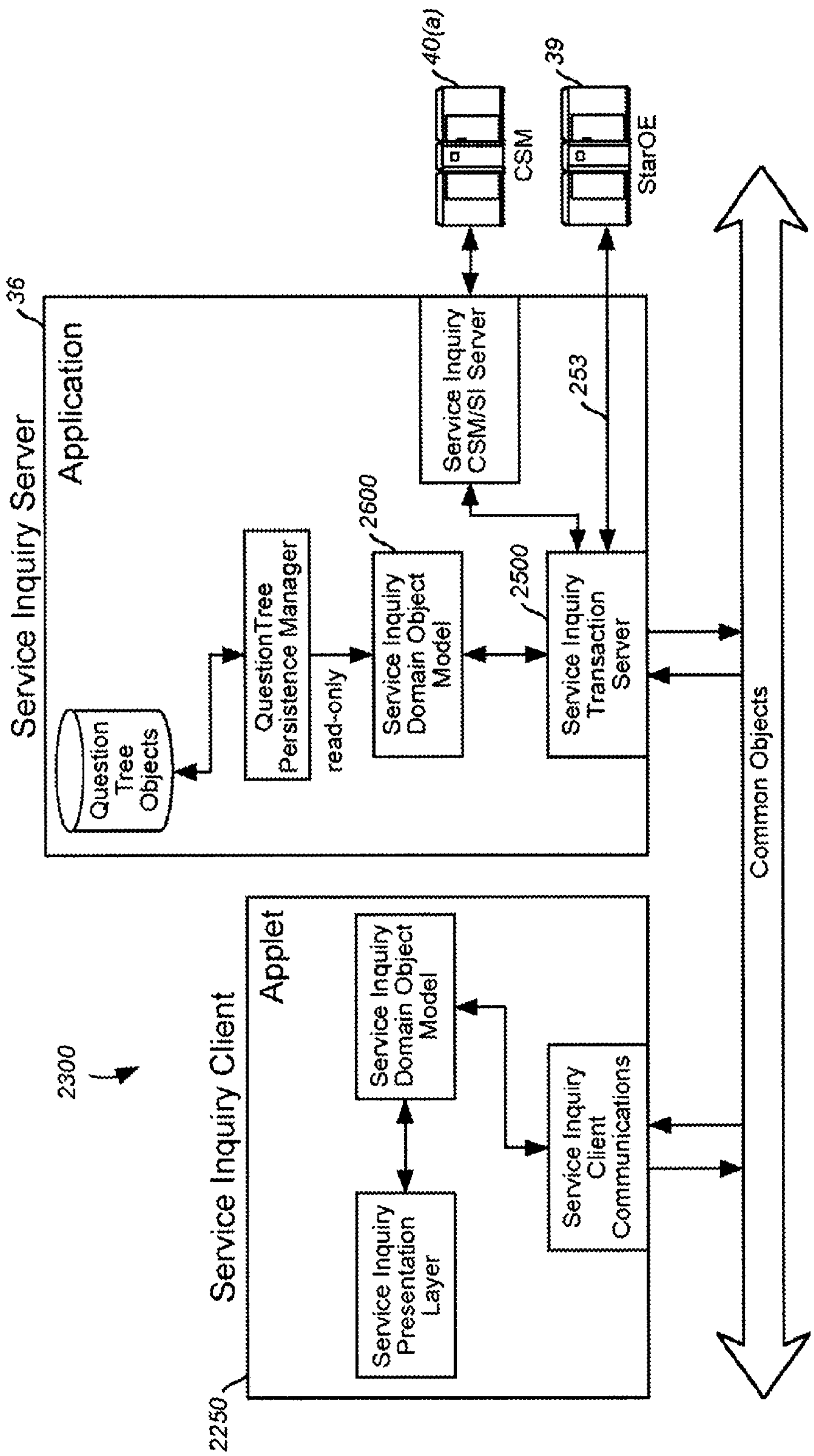
FIG. 25(*a*) illustrates the high-level design of the Service Inquiry application architecture 2200.
Figure 25B:
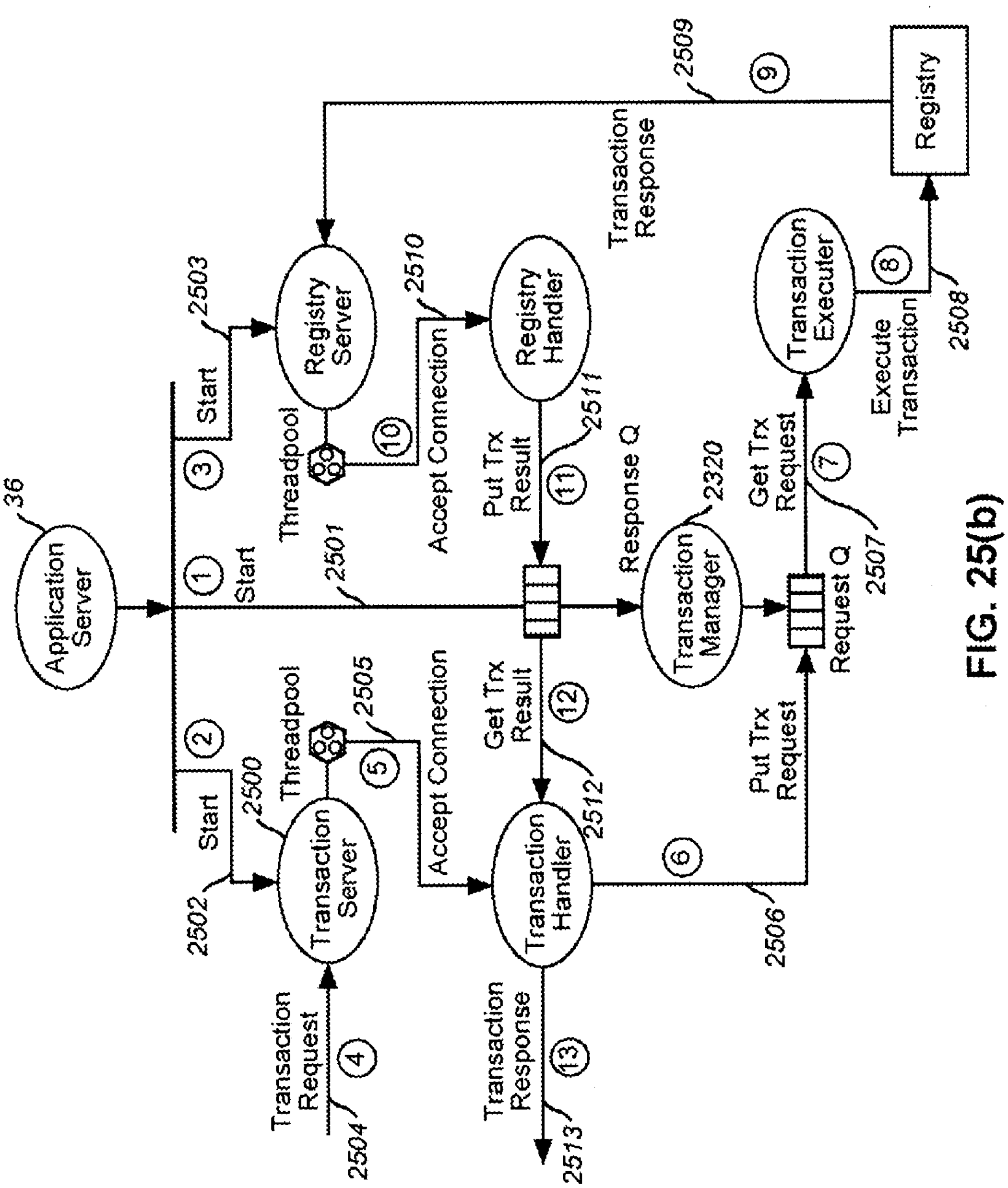
Figure 25C:
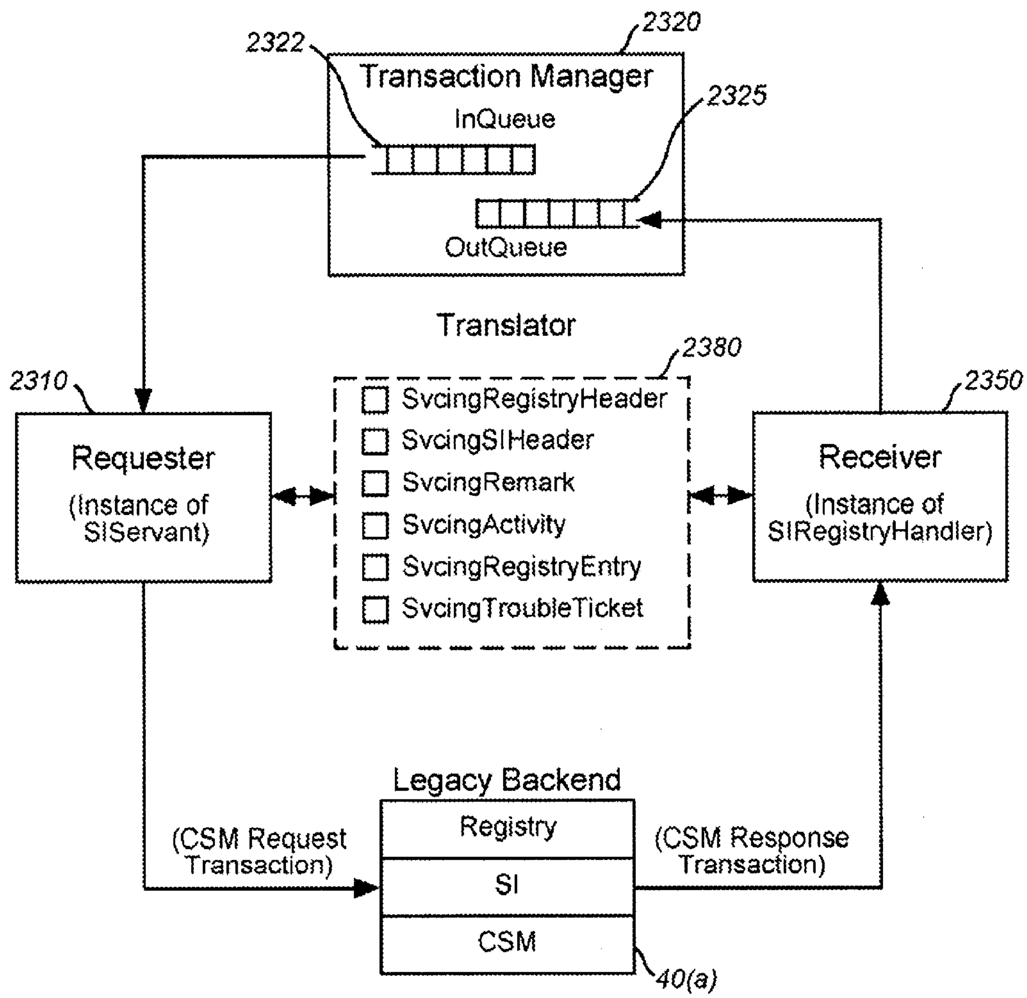
Figure 25D:
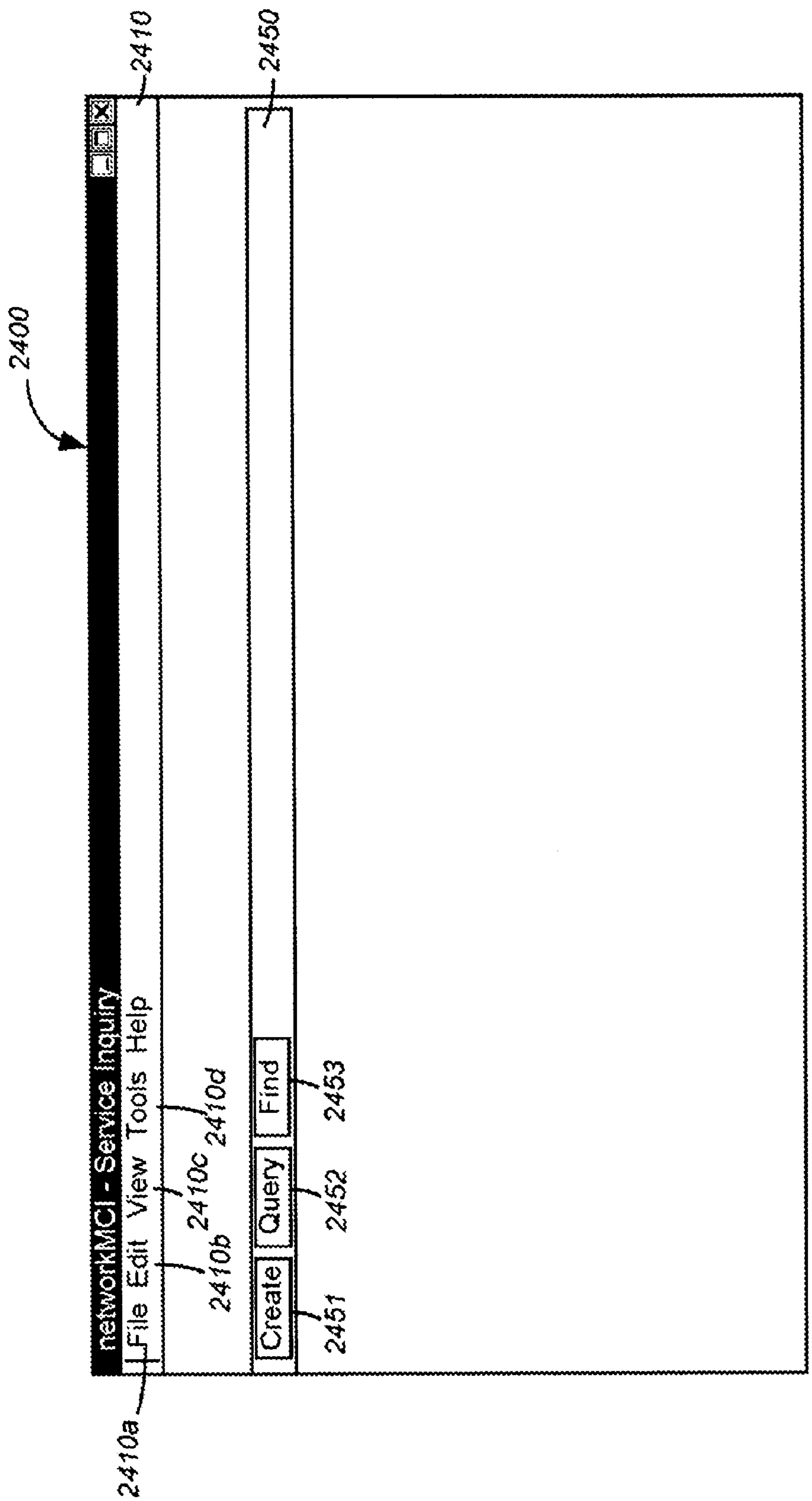
Figure 25E:
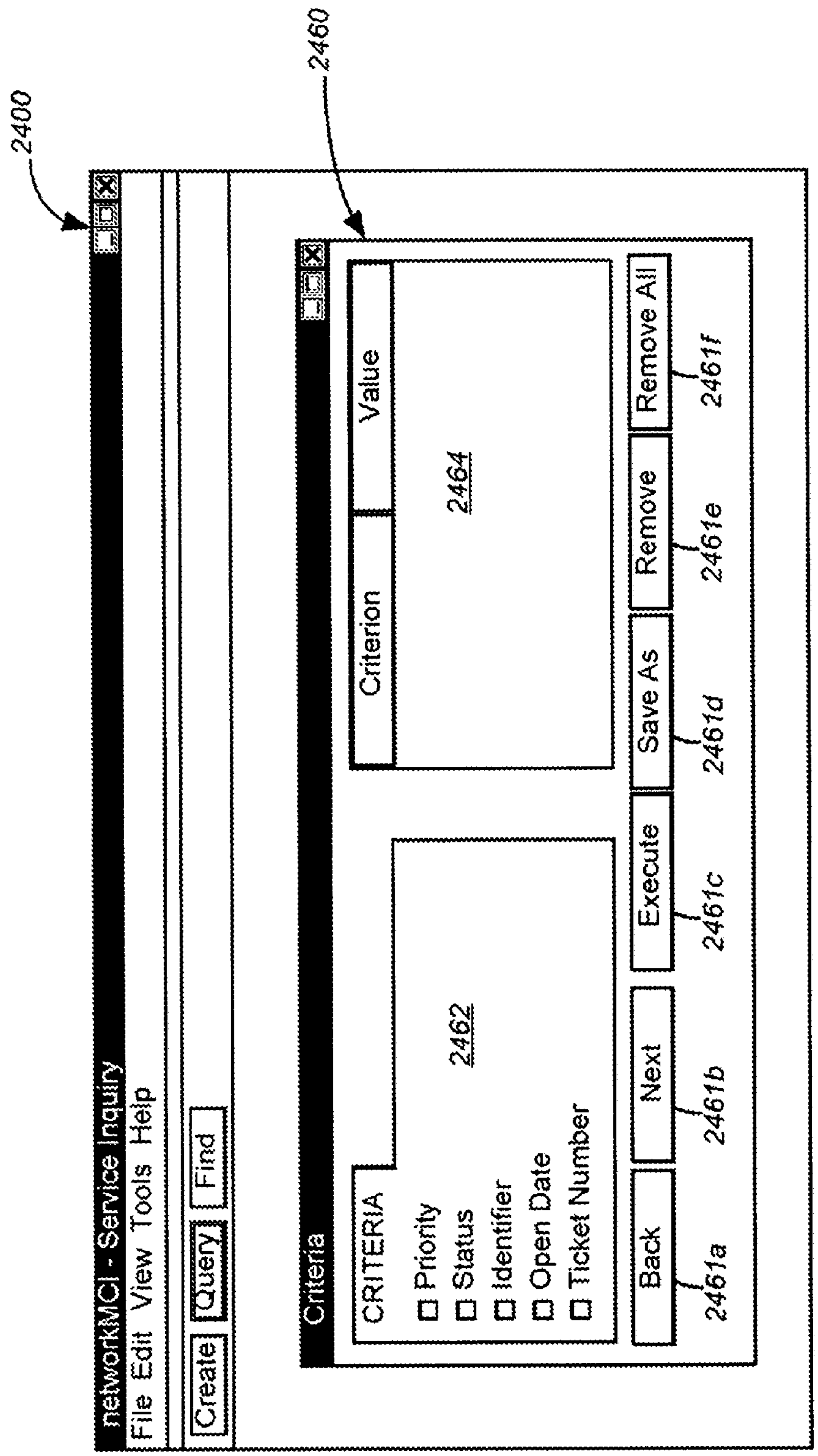
Figure 25F:
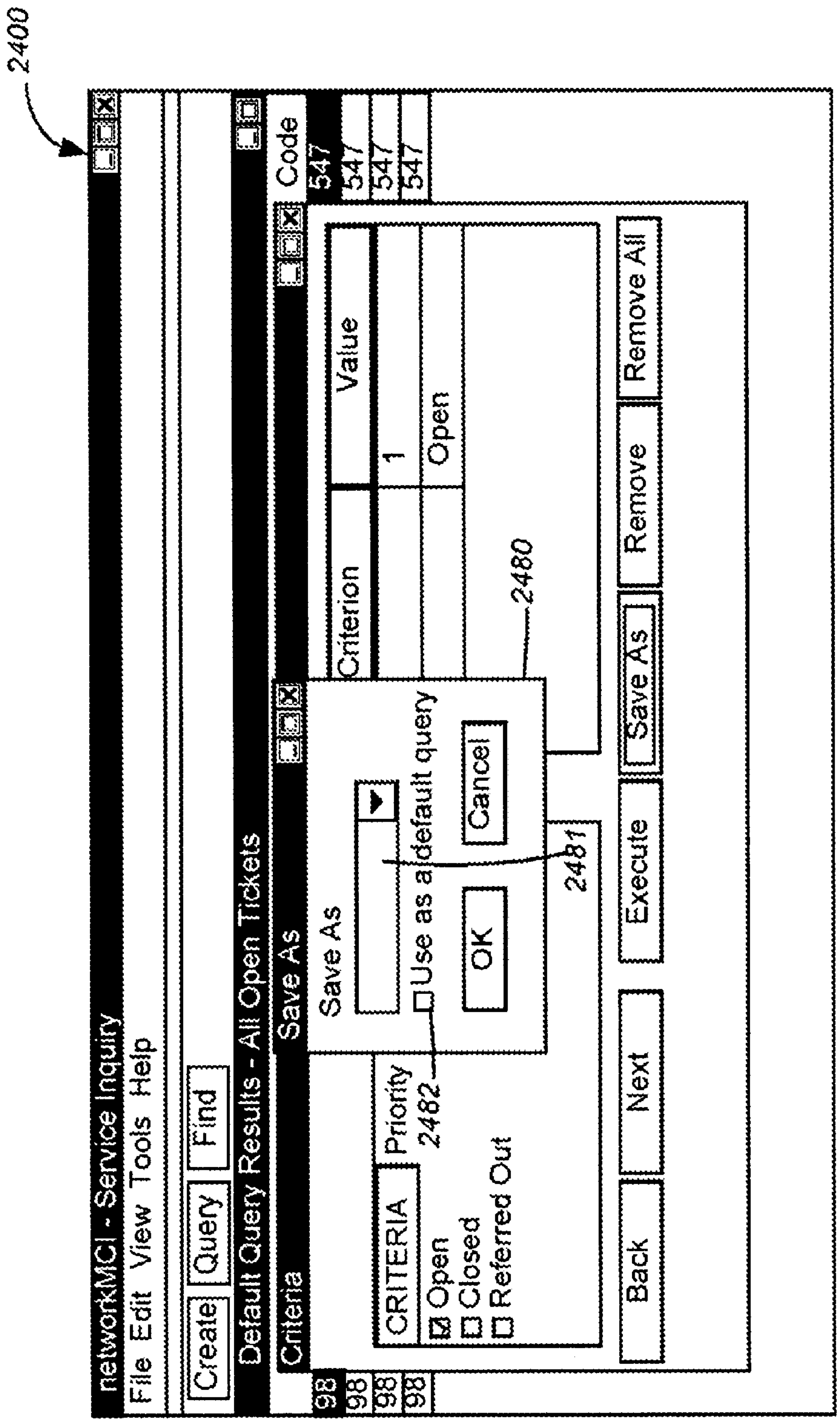
Figure 25G:
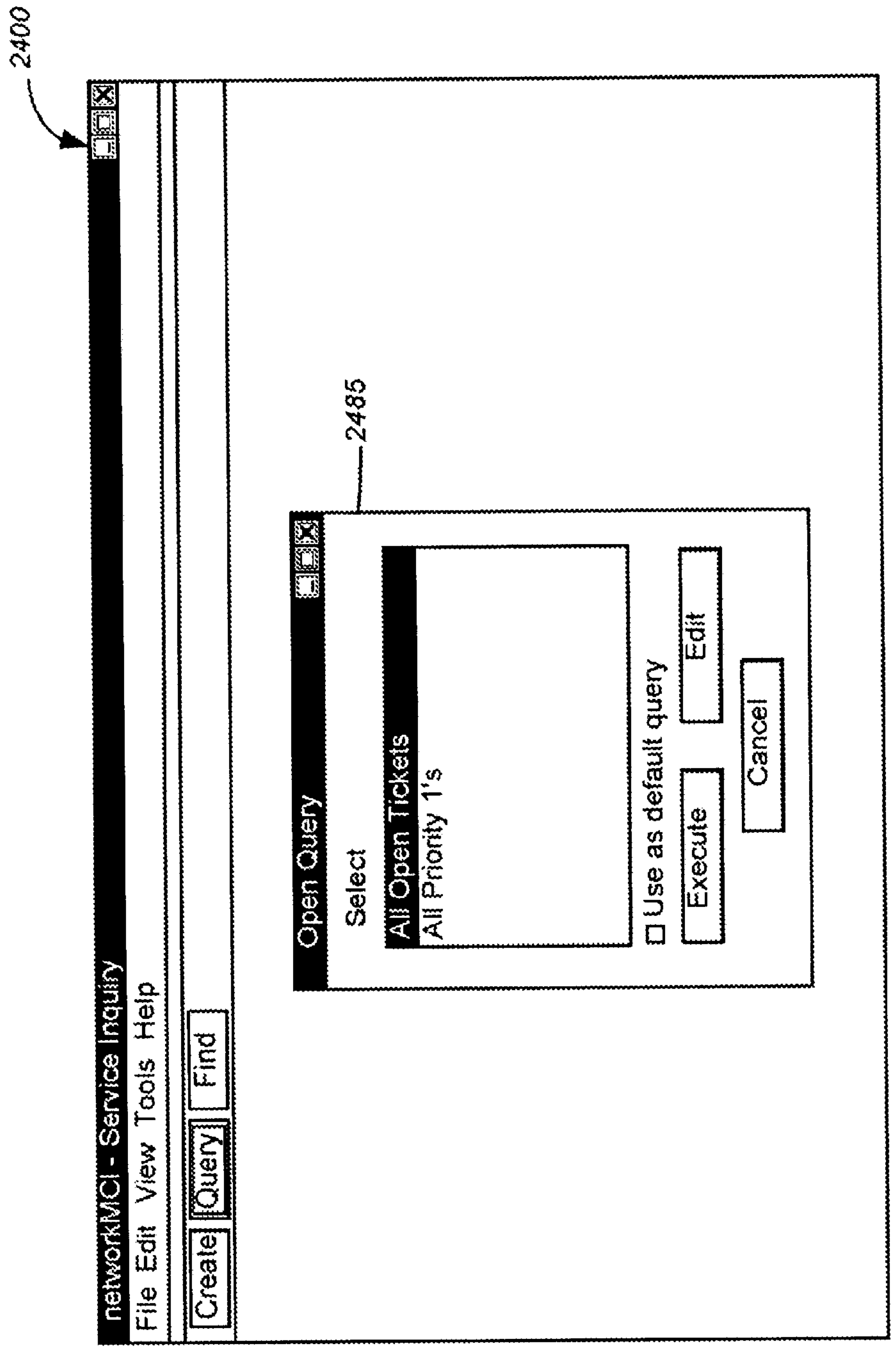
Figure 25H:
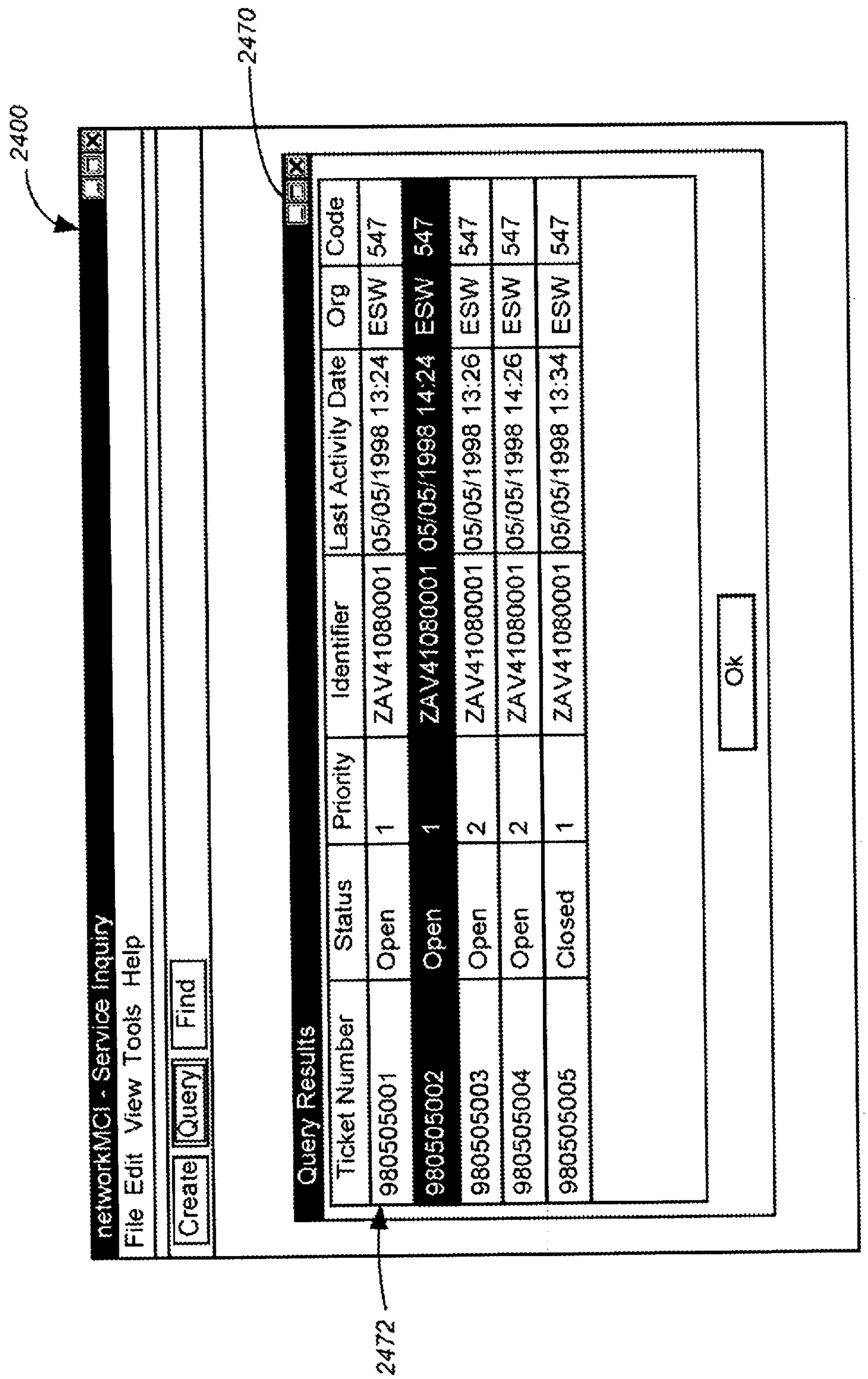
Figure 25I:
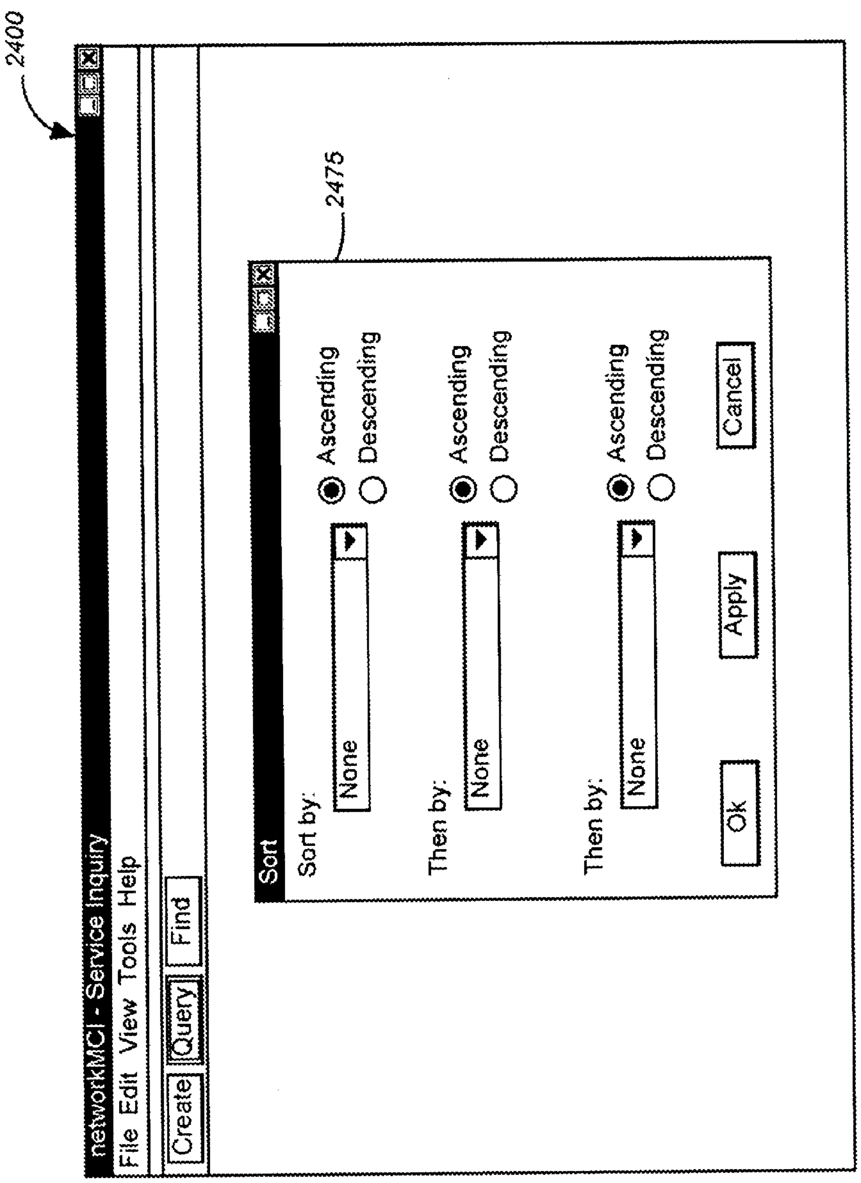
Figure 25J:
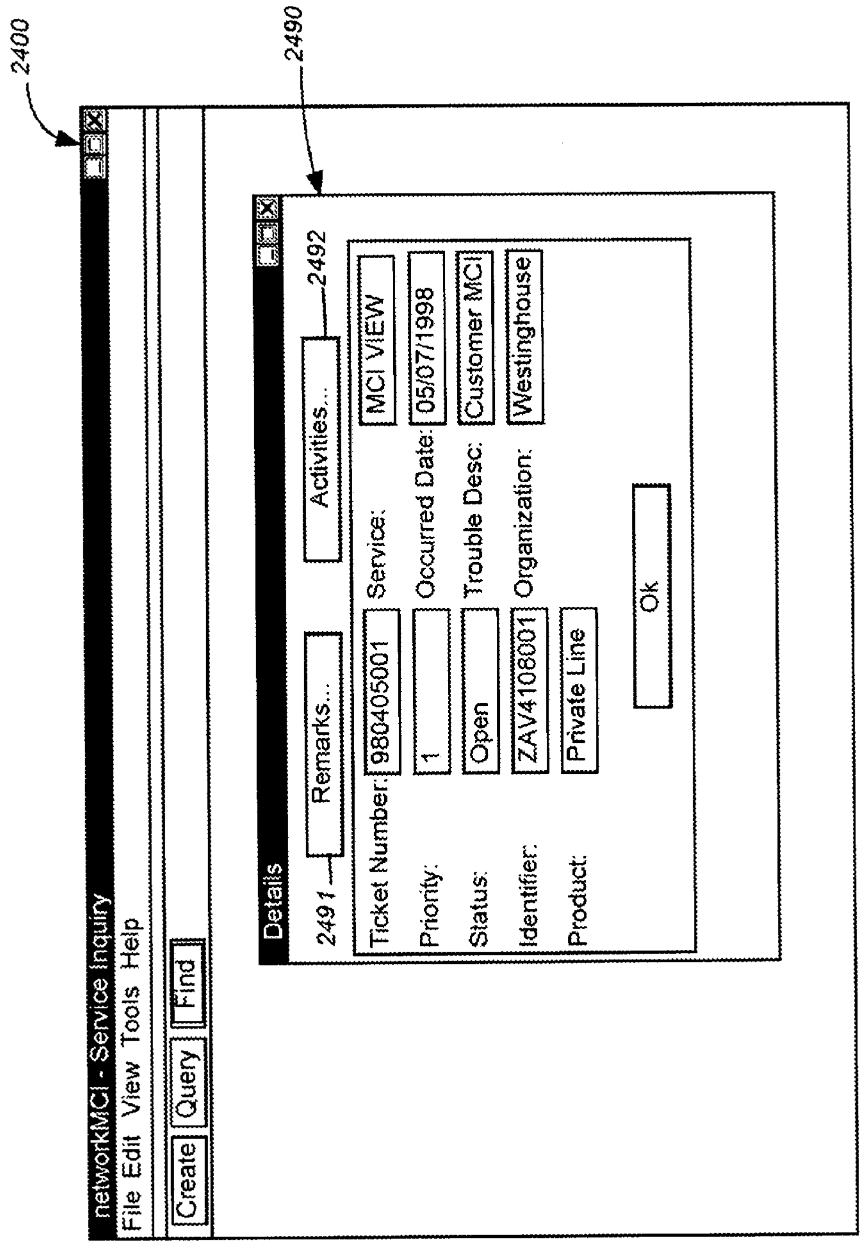
Figure 25K:
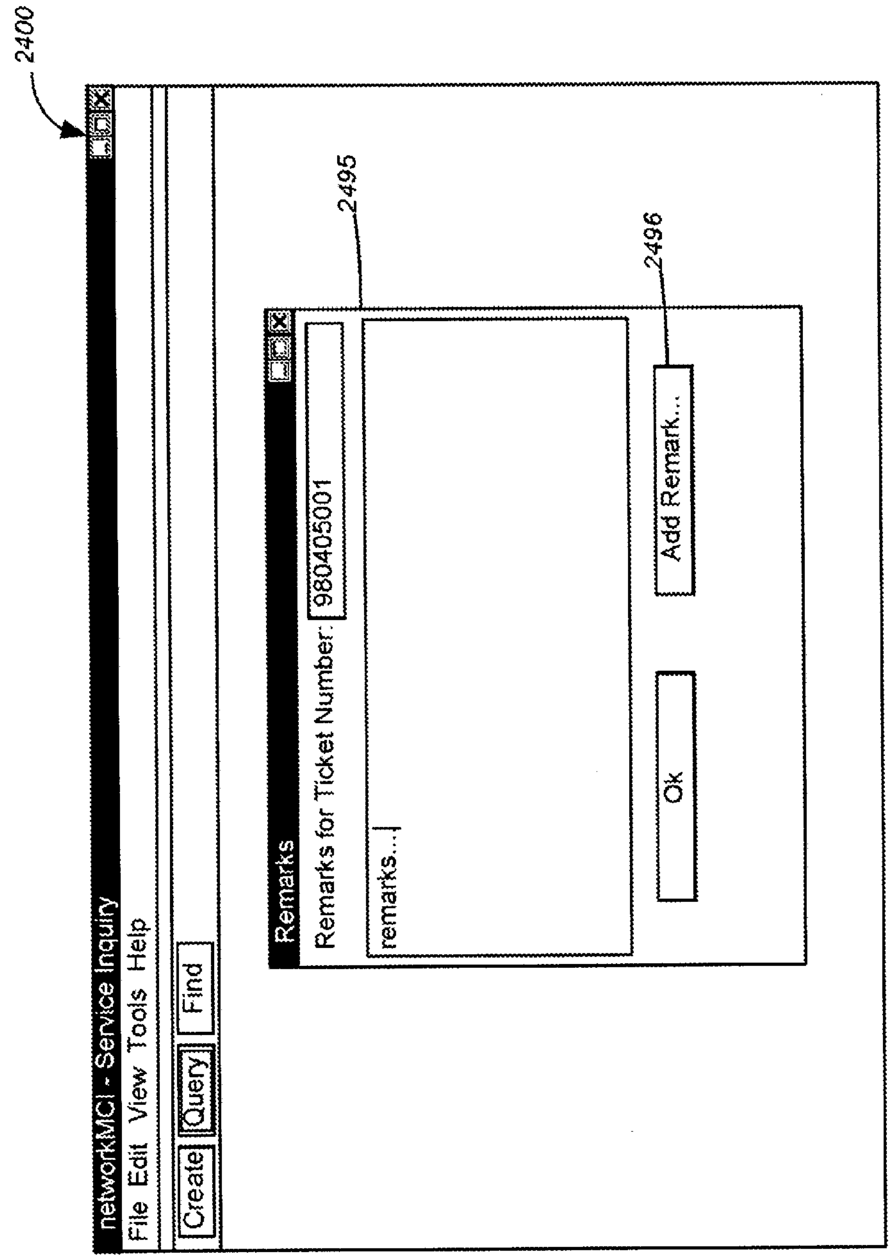
Figure 25I:
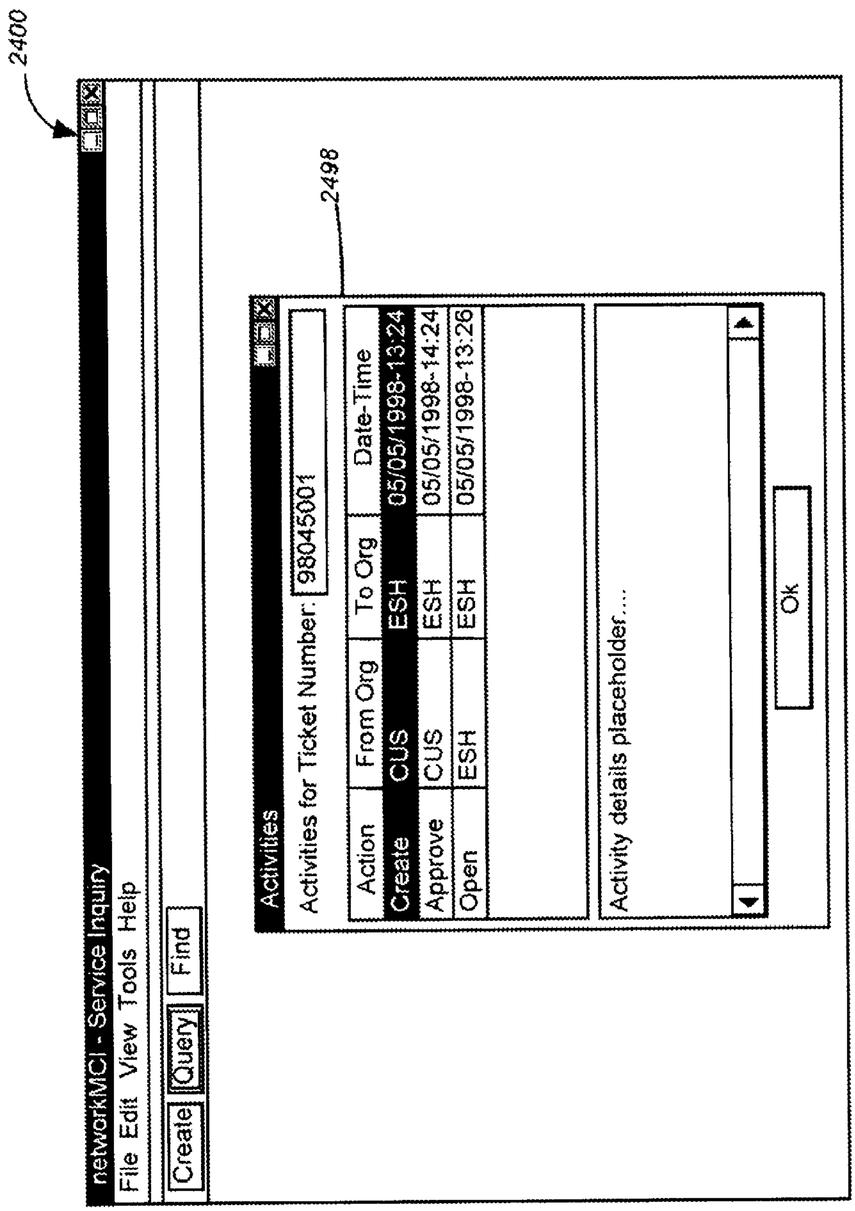
Figure 25M:
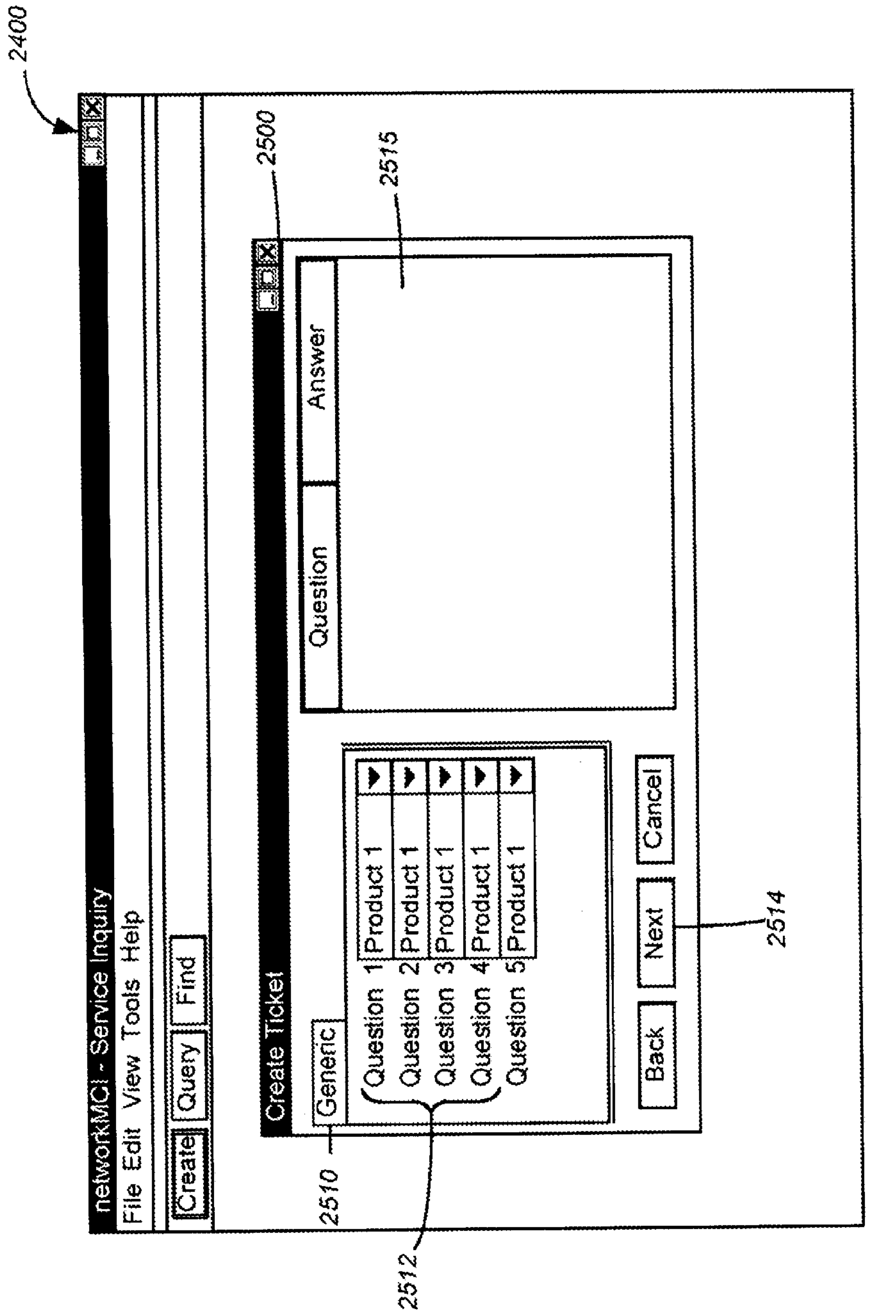
Figure 25N:
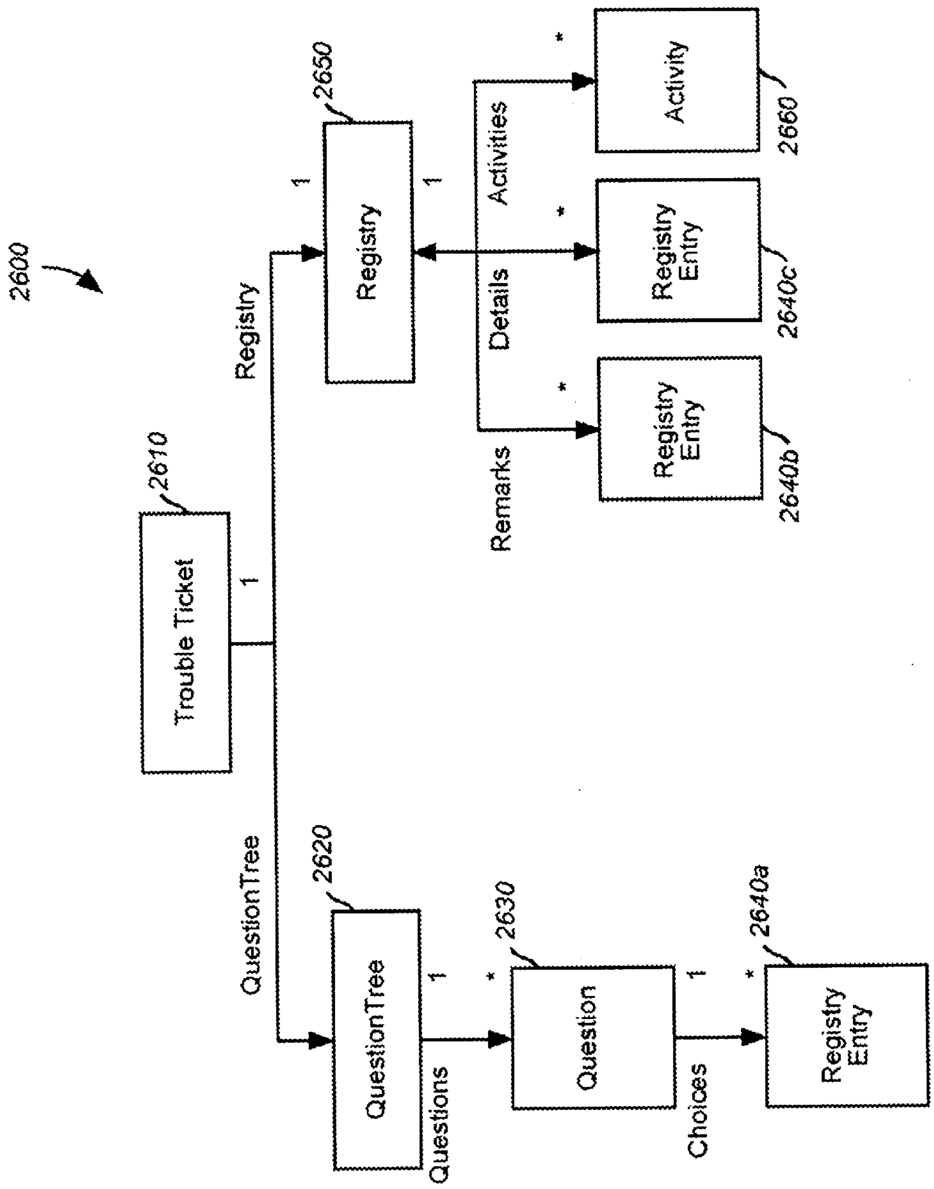

FIG. 24 is an illustration depicting the nMCI Interact RTM polling process. As shown in FIG. 24, the RTM system supports an HTML form "Post" or automatic refresh, to an active server page script. Thus, a Web page providing real-time unpriced call detail data has a timeout interval, e.g., one minute or greater, at which point the Web browser 20 will re-post a request for data (HTTP Post). The Post request is received by an Internet Information (web) Server ("IIS") process 590 in the RTM server 52 that executes an active server page (".asp") script. This .asp script calls a DLL polling routine 593 via a communications (COM) interface. This polling DLL is a Visual C++ application running in the RTM Web server 52. Upon receipt of the timeout request, the DLL calls the TVS server 550 for real-time call detail data retrieval via TCP/IP messaging. Particularly, the call detail request is received by a RTM data retrieval process 595 executing in the TVS server 550. Then, the real time data for each phone number (e.g., 800/8xx or VNET) is retrieved from the call detail database 598, which is the repository of real-time call detail data. The retrieved real time data is returned to the polling DLL process 593 and the current RTM output is formatted by the polling DLL and printed to the HTML page. The HTML page with the script-embedded HTML is then communicated back to the Web Browser 20 via the IIS process 590.

In the preferred embodiment, the RTM server 52 application dynamically adjusts the number of seconds appearing in the meta tag of the summary display page, which feature allows the user's display to stay in sync with their selected polling interval regardless of how long the polling operation took for the last poll. When the user's browser requests a refresh, the data-retrieval software on the RTM web server 52 starts a timer. When the data-retrieval software has obtained the data necessary to lay out the next Active Profile page, it stops the timer. The page is then laid out with a Refresh meta tag containing a value of the polling interval less the amount of time, e.g., seconds, the data-retrieval process took. Finally, the page is sent back to the user's browser. For example, if the current profile has a 1 minute polling interval and the data-retrieval process took 3 seconds, then the next refresh will begin in 1 minute minus 3 seconds, or 57 seconds. During the next refresh, the data-retrieval process may take 5 seconds, in which case the next refresh will begin in 55 seconds. Without the dynamic refresh functionality, if the refresh rate were left at the full polling interval each time, the polling would drift forward in time.

In sum, a subscriber via a client workstation running a Web browser can monitor in real time, or, in addition, using the RTM system, has the ability to monitor in substantially real time, the operation of the network as it relates to the calls directed to that subscriber's special service call number(s). For example, the subscriber may see in real time how many calls are being attempted minute by minute, how many calls are being allowed through the network, how many calls are incompletes, how many calls are blocked, etc.

This ability to monitor the operation of the network gives the subscriber the ability to decide in real time the specific actions that need to be taken. For instance, if there is an abnormal number of incompletes for a given period, the subscriber can look at the specific call records that made up those incomplete calls. In the manner described herein and in co-pending U.S. patent application Ser. No. 09/159,702, the subscriber may then request the management of the network to restructure the network so as to reroute the incoming calls of the subscriber to different locations where they may better be handled.

Service Inquiry

Another application of the suite of telecommunications network applications is the networkMCI Interact Service Inquiry ("SI") application which is a web-based network management product that enables customers to manage, i.e., create, status, and display service requests ("trouble tickets"), to the enterprise service provider (MCI). Particularly, through a client application GUI, customers have the ability to create and query trouble tickets ("tickets").

FIG. 2 illustrates the service inquiry "SI" application server 36 interfacing with a back-end Customer Service Management" ("CSM") legacy host system 40(*a*). The SI application server component 36 includes processes for handling all requests made of Service Inquiry by the customer (as relayed via the Dispatcher 26). Specifically, requests are handed off to Service Inquiry back-end processes and responses are received from the Service Inquiry back-end processes to be routed back through the Dispatcher to the client workstation web browser 20.

As in any of the above-described suite of telecommunications network applications, the Service Inquiry application utilizes the Common Objects application framework (COF) to inter-operate with the networkMCI Interact back plane and integrate with the other elements of the networkMCI Interact architecture. The Common Objects framework is utilized to leverage existing infrastructure services such as logon and authentication, transaction management, and security. Particularly, the Service Inquiry application extends the COAppImpl class in order to inter-operate with the Interact back plane and other networkMCI Interact applications (as required), and, includes one or more screens derived from the COAppFrame class. Most of the high level classes dealing with the initiation of transactions are utilized by Service Inquiry. The COClientSession class is available to the Service Inquiry application upon successful login to the networkMCI Interact system and is utilized for session management (e.g., connect, disconnect, and logoff). The family of COTransaction classes is used to send and receive messages to the back-end Service Inquiry service. These classes include CONonblockTransaction, COSynchTransaction, and COAsynchTransaction and, a COBulkTransaction may also be used if necessary. Additionally, the SI utilizes all of the COCommunications classes with the exception of the COBulkTransaction. However, as development and testing continues, the COBulkTransactions class may be utilized.

FIG. 25(*a*) illustrates the high-level design of the Service Inquiry application 2200 including the client application 2250 and server 2300 components. As shown, Service Inquiry requires integration with a number of external systems and utilizes the Common Objects Framework for inter-application communications. Interfacing with the Service Inquiry application server 36 via the common objects framework are the StarOE server, e.g., for user profile information, as well as other Service Inquiry specific data, and, the CSM legacy host that provides the ability to query, status, and take action on service inquiries. Communication between the SI application server 36 and CSM 40(*a*) is via Registry middleware, such as described in commonly owned, co-pending U.S. patent application Ser. No. 08/560,550 incorporated by reference herein. FIG. 3 shows COF-based inter-application communication between Service Inquiry and StarOE. It should be understood that if an external system does not use the COF, Service Inquiry may utilize that system's API set and communication mechanism for inter-application communication. The above-referenced Registry system has a number of options for inter-application communication, including both Java and CORBA interfaces.

The Service Inquiry communications and application server packages provide the framework for transporting client messages to the mid-tier application server for invocation of domain objects. The domain objects encapsulate the logic to translate the actual client messages and deliver the request to the back-end services. The response from the back-end service is then received by the application server and returned to the originating client. The framework enables customers to develop the business logic independent of the underlying transport layer and negate the need to modify the transport layer whenever a new domain model is introduced into the framework. The separation of the framework from the domain is accomplished through the use of reflection by dynamically loading and executing the business logic at the application server once the client request specification is received.

As described herein and in greater detail in co-pending U.S. patent application Ser. No. 09/159,403 entitled INTEGRATED INTERFACE FOR WEB BASED CUSTOMER CARE AND TROUBLE MANAGEMENT, the contents and disclosure of which is incorporated by reference as if fully set forth herein, the SI application server 2300 interfaces with the Legacy Backend 40(*a*), CSM/SI through a Requester object 2310 and Receiver object 2350 as shown in FIG. 25(*b*). Particularly, the SvcInqCSMRequester object 2310 is the class that represents the requester which takes the request data that comes from the Front-End/Client application through the Transaction Manager 2320, builds the CSM/SI request transactions by interacting with the Translator classes 2380 and ships off the requests to CSM. The request data that comes from the Front End/Client is an array of strings that are required from the customer for the request to be made. Minimal information is passed from the client to reduce the communication overhead from the client to the SI application server. All other information is packaged in the Requester. Particularly, the Requester object 2310 uses the SvcInqRegistryHeader and SvcInqSIHeader classes in the Translator 2380 to build the "Registry Header" and "SI Header" strings that are required for the CSM/SI request transactions. It also talks to the SvcInqActivity or the SvcInqRemarks classes to build the data portion of the CSM/SI requests. Once the CSM/SI Transaction String is formatted the actual request to CSM is made. Sending the transaction to CSM's Standard Interface (SI) via Registry classes does this.

The receiver object is an instance of the SIRegistryHandler class whose responsibility is to obtain the responses from CSM, parse the response, strip off the headers and build objects from the response data, by interacting with the Translator classes 2380. Particularly, it uses the SvcInqRemark, the SvcInqActivity, the SvcInqTroubleTicket or the SvcInqRegistryEntry class in the Translator to build the remark, activity, detail or list of Ticket object from the response string that is received from CSM. The built object is then sent back to the Transaction Manager 2380 who passes it back to the Front-End/Client.

FIG. 25(*b*) illustrates a flow diagram depicting the execution of a transaction by the SI application server 36 with each bubble representing a separate thread. First, at step 2501, the SI Application Server 36 instantiates and starts the Transaction Manager 2500 in a separate thread. The SI Application Server then instantiates and starts the Transaction Server 2500 in a separate thread at step 2502. The SI Application Server 36 instantiates and starts the Registry Server in a separate thread at step 2503.

More particularly, as shown in FIG. 7(*a*), the Transaction Server receives a client transaction request, as shown at step 2504. The connection is accepted and Transaction Handler thread is removed from the thread pool for execution, as indicated at 2505. The Transaction Handler unpackages the transaction request at step 2506 and puts the request message into the Transaction Manager's RequestQ. The Transaction Manager 2600 removes the request message from its RequestQ at step 2507 and spawns a Transaction Executer thread to execute the transaction. Then, at step 2508, the Transaction Executer translates the message and executes the transaction by loading the domain class and invoking the specified method which send the request to the back-end services.

As indicated at step 2509, the back-end service responds by sending the result of the transaction to the Registry Server which accepts the connection. At step 2510, a Registry Handler is removed from the thread pool for execution for performing translation of the received message and placing the result into the Transaction Manager's ResponseQ, as indicated at step 2511. The Transaction Handler retrieves the transaction result from the ResponseQ at step 2512 and the transaction response is delivered to the client at step 2513.

The mainframe legacy back-end 40(*a*) "Registry" is the cross-platform communication mechanism that is used by Service Inquiry to send messages to and receive messages from the CSM host. It shields applications from network protocols. CSM is provided with a mainframe database (not shown) that provides a set of Transactions to request CSM information through its Standard Interface (SI) which uses Registry as the messaging system. The Service Inquiry Application Server 2300 is configured to communicate asynchronously with CSM using Registry's RQS as the Inter-Process Communication (IPC) mechanism. Since CSM supports only one-way messaging, the communication between Service Inquiry and CSM/SI is asynchronous. When CSM 40(*a*) receives a request from the Requester, it does not send any acknowledgment back to the requester. The requester only receives a confirmation from Registry that the request was successfully sent. When CSM finishes processing the request, it sends the response to the Receiver.

Registry configuration consists of configuring the Registry client which sends request messages to CSM from the Service Inquiry Requester and Registry server that receives responses from CSM and passes it to the Service Inquiry Receiver. As shown in FIG. 25(*b*) the Registry Queuing system, RQS is an asynchronous mode of inter process communication where there is one queue on the client and one on the server and there is only one TCP/IP connection always open between the client and the server. The client puts its requests on its own local queue 2322 and it is then forwarded to the queue on the server. The server takes the request off the queue, processes the request and the response messages are put in the client's queue 2325. Since there is only one TCP/IP connection at any given time between the client and the server this mode is very efficient in terms of both network and system resources.

As in the other application of the nMCI Interact suite, the Service Inquiry client application is written as a Java application to be executed at the client web browser running, for example, Microsoft Internet Explorer 4.0. The Service Inquiry client will be started from the networkMCI Interact homepage upon selection of the service inquiry icon 91 shown in the home page 70(*a*) of FIG. 5(*a*).

FIG. 25(*c*) illustrates an example service inquiry main screen 2400 presented upon entry into the SI system selection. As shown in FIG. 25(*c*), the Service Inquiry display 2400 presents a title bar, menu bar, tool bar, work area, and message window to provide the user alternative ways to manage different components of Service Inquiry product. It should be understood that any action available from the tool bar will also be available within the menu bar. Preferably, there are two permission levels that a user can have: 1) a View permission allowing a user to view the Service Inquiry application desktop (Default Query), define Service Inquiry queries, view the details, remarks and activities, print, and report; and, 2) an edit permission allowing a user to create trouble tickets, refer out trouble tickets, close trouble tickets, add remarks to trouble tickets, and, update trouble tickets.

With more particularity, the menu bar 2410 consists of the following items that correspond to the associated functionality: a File option 2410*a* including selections for creating a new ticket or new query, opening an existing query, saving a query being edited; printing and exiting the SI service; an Edit option 2410*b* including selections for querying on a specific ticket number, closing a currently selected ticket, or referring back to a currently selected ticket; a View option 2410*c* including selections for showing details of a currently selected ticket, and refreshing current query results; a Tools option 2410*d* including selections for sorting tickets in the active window; and, a Help option. The tool bar 2450 provides a Create button 2451 for creating a new ticket, a Query button 2452 for generating a new query, and, a find button 2453 enabling queries on a specific ticket number.

The Query component of the Service Inquiry application enables Service Inquiry users to query trouble ticket information within the system, i.e., the listing or viewing of tickets based on, e.g., different selection criteria. This component also allows provides users with the ability to add remarks to tickets. A Default Query functionality is provided that allows users to keep a dedicated query available at all times. This query enables users to monitor the subset of tickets that are of most interest to them. A refresh mechanism is additionally provided so that the user may keep up with as current a status of these tickets as needed. The Default Query may be executed and displayed immediately on startup of the Service Inquiry application and is available throughout the Service Inquiry session. Preferably, the Service Inquiry application includes a set of predefined queries, one of which is preset as the Default Query and which may be redefined at any time. The user can only set their Default Query from a saved query.

To create a new query, e.g., upon selection of the "Query" button 2452 from the tool bar 2450, a "Criteria" window is displayed such as the example window display 2460 shown in FIG. 25(*d*) which enables the customer to select from among the following criteria to be used in the query: priority, status, identifier, open date, and ticket number. As criteria are selected from the "CRITERIA" tab 2462, new tabs (not shown) appear that are associated with the selected criteria. It is from these tabs that the actual parameters are specified for which the query is executed against. As the query is built, the parameters that are selected will populate themselves in the table 2464 to the right of the tabbed panel. At any point in this selection process, the user may perform the following: move back and forth to any criteria tab by selecting the "Back" and "Next" buttons 2461*a*, 2461*b* respectively, or selecting the desired tab directly; add or remove criteria tabs by selecting or deselecting the associated checkbox from the "CRITERIA" tab 2462; execute the query by selecting the "Execute" button 2461*c*; save the query by selecting the "Save As" button 2461*d*; remove highlighted parameters in the table by selecting the "Remove" button 2461*e*; or, remove all parameters in the table by selecting the "Remove All" button 2461*f*.

As an example, a "List Tickets by Status Request" transaction will provide all the tickets for a given organization (ORG) code with the requested status and created after a specified date. The ORG code to be passed in this transaction is one of the selection criteria representing the originating organization or the organization where the ticket was created. The customer may choose from a list of ORGs that the customer has authority over and a primary ORG is obtained from every customer and is stored locally in the user profile. The resulting information from all of the tickets will be cached for future processing. Generally, only one type of status may be specified in a single request: Open, Closed, Referred or Cancelled status. If a customer has authority over more than one organization that customer is able to view tickets for any organization he/she has authority over. If a customer has access to a primary organization, then he/she has implied access to all the subordinate organizations meaning that the request will apply to the subordinate organizations as well. Furthermore, this transaction may only display some of the details/fields of the tickets which means that the data cached from this request may only be used to process the Queries on tickets. It cannot be used to view all the details of the tickets for which further CSM/SI transactions will have to be made as will be herein described.

Once the query is specified and executed, the "Query Results" window such as provided in the example window 2470 of FIG. 25(*e*) is displayed to present the results of the query in a table 2472. Preferably, these results may be sorted by column by either clicking on the column in the table to sort by or by selecting "Tools/Sort" from the menu bar 2410. Selecting "Tools/Sort" from the menu bar will initiate display of a "Sort" window such as the example display 2475 shown in FIG. 25(*f*) which is capable of a three level sort by column in the table. The table columns can also be reordered by dragging and dropping them to their desired locations. Details of a particular ticket may also be viewed.

The ability to save and retrieve queries allows a user to persist queries not only for the current session but for future sessions as well. This gives the user the ability to define a query once, then save it such that there will be no need to define it again, i.e., all the user needs do is retrieve and execute it. To save a query, the user must first create the query and then select the "Save As" button which enables display of the "Save As" window such as the example window 2480 shown in FIG. 25(*g*). This window enables a user to select from the list of existing saved queries or type a new name in entry field 2481. If an existing saved query is selected its query will be copied over and its name will refer to this new query. A checkbox 2482 is available to designate this new query as the Default Query. To retrieve a saved query, e.g., upon selection of the "File/Open/Query" from the menu bar 2410, an "Open Query" window such as the example window 2485 shown in FIG. 25(*h*) is displayed which provides a list of all saved queries. Once the desired query is selected the user may perform the following: execute the query, i.e., run the query and display the results in the "Query Results" window or the "Default Query" window if the user selects it as their default query; or, edit the query by bringing up the "Criteria" window 2460 (FIG. 25(*d*)) with the appropriate parameters already in the table.

The customer may then view the results of a query, i.e., the details, remarks or activities of a Ticket chosen from a list of Tickets. To view the details of a ticket, the user may either select it from the query results and select "View/Details" from the menu bar or double click the ticket in the query results. Particularly, a "Display Ticket Request Transaction" (CSM/SI transaction) may be used to obtain the details, activities and remarks of a ticket. This transaction allows several display requests to be made, e.g., by setting corresponding flags to 'Y'. Whenever the customer wishes to view details, remarks or activities of a particular ticket, this request will be made with all the three flags set and the ticket number stuck into the SI header which will generate three or more responses. The "Display Detail Response Transaction" is a response that returns all the data elements corresponding to a given ticket in a "Details" window such as the example window 2490 shown in the FIG. 25(*i*). This window 2490 provides information about the selected ticket including: ticket number, ticket priority, ticket status, ticket identifier, ticket product, ticket service, date occurred, trouble description, and organization (ORG). It should be understood that the number of data elements will be different for different types of tickets.

Alternately, to find a ticket, e.g., upon selection of the "Find" button 2453 from the tool bar 2450, the CSM/SI Transaction, "Display Ticket Request Transaction" is invoked, where the ticket number is passed on the request for handling as described above. It should be understood that, in the preferred embodiment, a "Change Ticket Request Transaction" may be implemented allowing the customer to change some of the fields of a ticket that is already created. This restriction is enforced by the GUI as this CSM/SI transaction does not impose any such conditions on the field being modified.

Remarks are comments added to a ticket for historical purposes and can aid in the resolution of the problem. A customer must be viewing the particular ticket's details that contain the remarks desired. The "Display Remarks Response Transaction" is a response that shows all the comments added on the ticket either by the customer or by the enterprise (MCI). The CSM legacy system supports "public" and "private" remark types. Thus, from the "Details" window 2490 shown in FIG. 25(*i*), the user may click on the "Remarks" button 2491 which will bring up the "Remarks" window such as the example window 2495 shown in FIG. 25(*j*). From the remarks window, the remarks for that ticket are displayed. It should be understood that remarks may be added to a ticket for historical purposes, e.g., to aid in the resolution of the problem. From the "Remarks" window the customer may click on the "Add Remarks" button 2496 which enables display of the "Add Remarks" window (not shown) which allows the customer to add remarks to that Ticket. Thus, by implementing an "Add Remarks Request Transaction," the customer may add remarks on a ticket that is in an open status at any time. This may be used as a final step, just after creating a ticket, for example, to enable the customer to describe the trouble in his/her own words or add any comments. This transaction returns a success or failure response.

Activities are events that occur to a ticket throughout its lifecycle. These events include changing status, changing priority, and reassignment of the person working the ticket. The customer must be viewing the particular ticket's details that contain the activities desired. The "Display Activity Response Transaction" is a response that provides all the activities, i.e., actions that have been taken on the ticket. Specifically, from the "Details" window 2490 (FIG. 25(*i*)), the customer may click on the "Activities" button 2492 which will bring up the "Activities" window 2498 such as shown in the example screen display of FIG. 25(*k*). From the activities window, the activities for that ticket are displayed. This is a useful transaction in checking the status of a ticket and, it aids in tracking a ticket as it shows which organization the ticket is currently in.

The create component of Service Inquiry application provides Service Inquiry customers with the ability to create a ticket within the system. The first step in the creation of a trouble ticket is to identify the Event-Type/Call-Type of the problem which is basically the way CSM handles different problem types and is required for most CSM/SI transactions. To do that the client front end asks the customer the problem/identifier type and then narrow down the problem by having the customer choose from a list of Product types, Service types and Trouble Descriptions as described herein with respect to FIG. 25(*l*). Based on these choices the system maps it to the correct Event-Type/Call-Type which mapping is done using database tables stored locally on the client. Once the Event-Type/Call-Type is determined, the data fields that correspond to that Event-Type/Call-Type is obtained from the database tables. The information required for all these fields is then gathered from the customer by presenting appropriate questions. Once all the required information is available, the system performs an "Open Ticket Request Transaction" and passes all of the data fields. The CSM legacy system then attempts to open a Trouble Ticket based on the data passed, and performs an "Open Ticket Response Transaction" to indicate if the ticket was created successfully along with the ticket number. Based on this response a confirmation message along with the ticket number is displayed to the customer.

As an example, to create a service request from scratch, the customer may select, for example, the "Create" button 2451 from the tool bar 2450 of FIG. 25(*c*). This will initiate display of a "Create" window such as the example window 2500 shown in FIG. 25(*l*). From this window, the customer provides answers to the questions for each tab 2510 shown as questions 2512, and clicks the "Next" button 2514 when ready to go to the next set of questions. As the next tab appears, the answers from the previous tab populate the table 2515. The user may navigate via the "Back" and "Next" buttons or by using the tabs. In the preferred embodiment, the questions are dynamic depending on previous answers. Thus, if the user goes back and changes the answer to a question that later questions depend on, then those questions will be overwritten by the new set of questions. The user will be warned if this is the case.

Once the ticket is opened, it has to be referred out to a "Customer Facing Organization" to initiate the problem resolution process. To do this, the CSM system refers the ticket out to an organization obtained from the user up front and stored in the User Profile. This is done using an "Enter Activity Request Transaction" which allows the customer to enter different activities like 'Refer Out', 'Close', 'Refer Back' and 'Open' on a ticket by passing the appropriate activity code.

Finally, the SI application allows the customer to close the ticket by using an "Enter Activity Request Transaction" described with respect to ticket creation. When a customer wishes to close a ticket, the system will make this transaction on behalf of the customer by passing the activity code for 'Close'. A customer is allowed to close a ticket only if it were created by that organization and if the ticket is currently in that organization, i.e., it has been referred out to that organization. Since only the organization that opened the ticket has authority to close it, once a ticket has been resolved the ticket is referred out to the customer's organization. If the customer is not satisfied with the problem resolution, that customer may refer the ticket back to the enterprise (MCI). This is also accomplished using the Enter Activity Request Transaction. Again, the system will make this transaction and pass the activity code for 'Refer Back'.

The creation of trouble tickets through Service Inquiry will now be described in greater detail in view of FIG. 25(*m*). In the preferred embodiment, the Service Inquiry application implements a domain object model (DOM) 2600 that allows the collection of information regarding a problem with a product offered by MCI. The questions that need to be asked to open a ticket vary by product and problem type. In addition to specifying a problem with a particular product, Service Inquiry provides the user with the functionality to perform queries for Trouble Tickets and to view the details of Trouble Tickets. The DOM's responsibility is the creation and query of Trouble tickets and it accomplishes its tasks via interaction with the client presentation layer and interaction with the back-end systems. Information that is gathered via the presentation layer is used to construct back-end transactions. The information returned from these back-end transactions is formatted to DOM classes, which are forwarded to the presentation layer.

As shown in FIG. 25(*m*), the TroubleTicket 2610 is the root of the Service Inquiry DOM. TroubleTicket instances contain identifying information that is used by the presentation layer to sort and filter a collection of TroubleTickets. The TroubleTicket class is responsible for accepting requests from the presentation layer, forwarding the requests to the back-end and returning results to the presentation layer. In addition to maintaining identifying information, a Trouble Ticket also contains references to a QuestionTree 2620 and a Registry 2650.

Specifically, a Question Tree 2600 is comprised of three Domain Classes: QuestionTree 2620, Question 2630 and RegistryEntry 2640. QuestionTrees 2620 are essentially a set of questions for a particular product and problem type. The QuestionTree is responsible for the grouping of questions and the navigation between the groups. In addition, a QuestionTree knows if it has been completely specified, i.e., all of its required Questions have been answered. Within a QuestionTree, the group or category is designated by a unique name String). Preferably, questions are stored in a hashtable (not shown). A group name is the key and a vector of Questions is the value for each entry in the hashtable. The order of the groups is significant and since hashtables do not maintain order, a vector of Group names is required. This Vector of names is used for some of the navigational behaviors of a QuestionTree.

The Registry 2650 is responsible for maintaining collections of objects that represent information retrieved from CSM via the client interface. The collections of objects represent Remarks, Details and Activities in CSM. Remarks and Details are also represented by vectors of instances of a "RegistryEntry" class. Activities are represented by a vector of instances of the Activity class 2660 which is an information holder having instance variables containing information that corresponds to fields in the CSM/SI Activity Record.

The RegistryEntry class is a class in the ServiceInquiry DOM comprising instances 2640*a* that are used by Question instances 2630 and instances 2640*b,c* used by Registry instances 2650. When used by a Question, RegistryEntry instances 2640 represent the possible choices for answers to the Question. Once the user selects a RegistryEntry "choice," this RegistryEntry instance becomes the answer to the question. When used by a Registry, the RegistryEntry instances 2640*b,c* represent remark or detail information respectively, that is retrieved from CSM/SI. Specifically, RegistryEntry 2640*a,b,c* comprise the following instance variables: 1) a Text instance variable which is an optional variable used to specify text that will be presented to the user as a choice for an answer to a Question if the value is different than that specified by the registryValue; 2) registryKey instance variable which maps to a key in CSM/SI; 3) a registryValue instance variable which maps to the value in CSM/SI specified by the key in registryKey; 4) a nextGroupID instance variable which is an optional field used by the Question to assist the QuestionTree in some navigational tasks; and 5) a question instance variable which is a reference to the Question instance to which this RegistryEntry belongs. A RegistryEntry is contained by its Question; this instance variable is a back-pointer.

The Registry Classes, i.e., classes that represent CSM/SI Registry records, have two additional responsibilities that are variations of a single behavior. The Registry Classes (RegistryEntry and Activity) are used for communication between Service Inquiry and CSM/SI. CSM/SI requires Remark, Detail and Activity information in fixed-length field record format; Service Inquiry requires Remark, Detail and Activity information in Java object format (instances of RegistryEntry or Activity). To provide these two formats, the Registry Classes contain behavior to convert instances to fixed-length field record format and to instantiate themselves from fixed-length field record format.

Questions are the main component in a QuestionTree. A Question has a vector of group identifiers that indicate the groups to which it belongs. A Question has a vector of RegistryEntry instances 2640*a* called choices. When the user "answers" the Question, the answer is set to the selected choice; i.e., the selected RegistryEntry. Short answer or text answer questions are a specialization of this behavior. Within each group of Questions, there is one question that is designated as the decision point which is used to determine the next group of Questions that need to be presented to the user. As a Registry Entry may contain a nextGroupID, the nextGroupID of the RegistryEntry instance selected as an answer to a decision point Question is used to derive the next group of Questions. Occasionally, the only difference between two groups of Questions is the inclusion or exclusion of a particular Question. One solution is to create two identical groups, one with the optional question and one without and rely on the decision point mechanism. In the preferred embodiment, an optional parent-child relationship between Questions is created. The inclusion/exclusion of a Question (child) in a group is based on the answer to a previous Question (parent). A child Question maintains a reference to one of the possible choices (RegistryEntry) of the parent Question. If the parent Question's answer is the same as the child Question's parentAnswer, the child Question is included in the group; otherwise, it is excluded from the group. Details regarding the process by which a system administrator may generate trouble ticket queries corresponding to particular types of trouble tickets are provided in above-referenced, co-pending U.S. patent application Ser. No. 09/159,403 entitled INTEGRATED INTERFACE FOR WEB BASED CUSTOMER CARE AND TROUBLE MANAGEMENT.

TFNM

Figure 26:
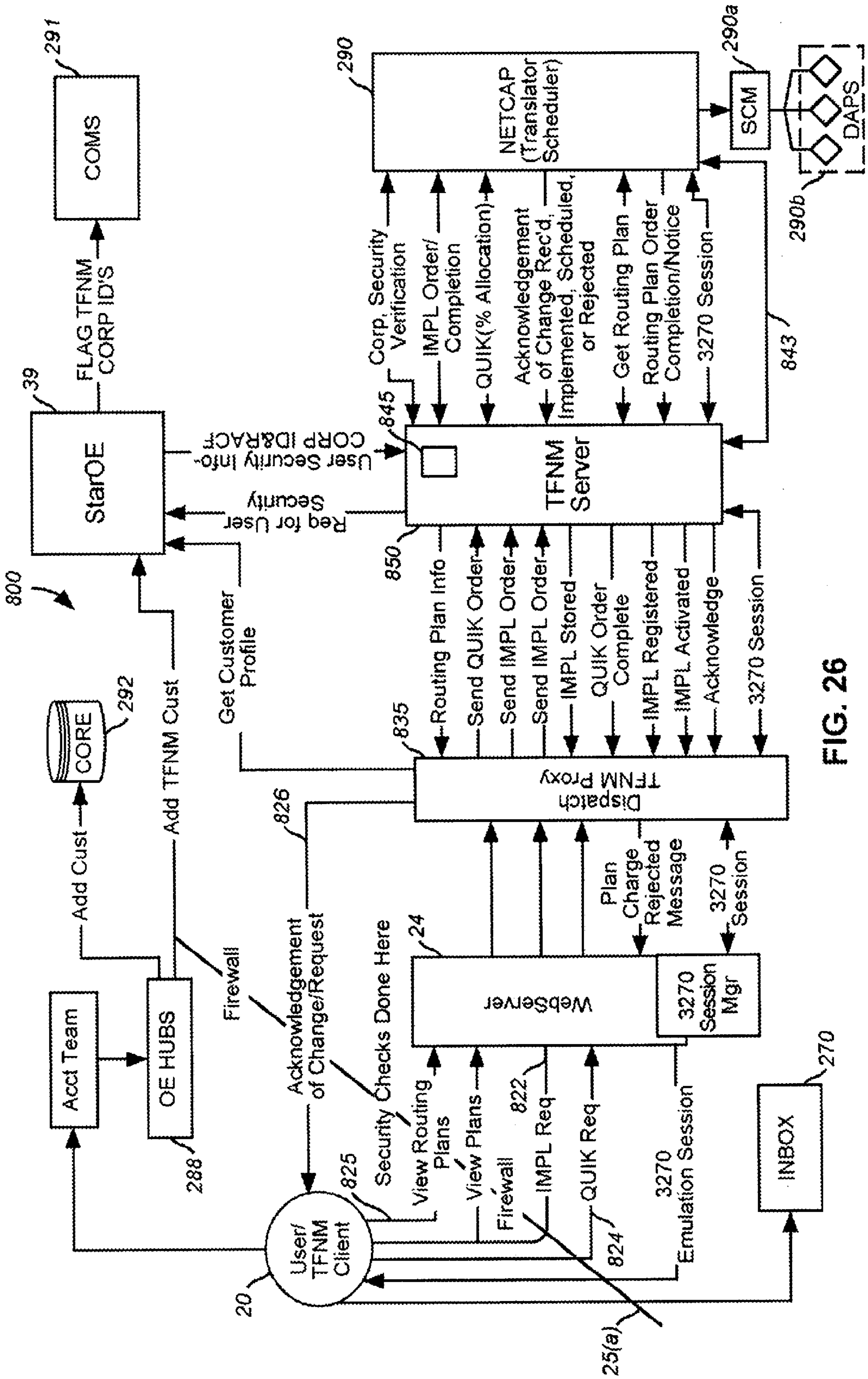
FIG. 26 is a general block diagram depicting the physical architecture of the TFNM system components.
Figure 27A:
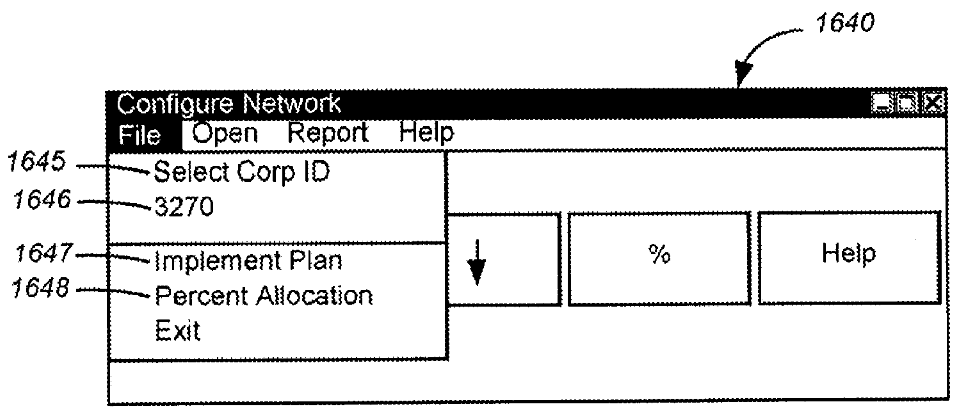
FIGS. 27(*a*)–27(*c*) illustrate exemplary screens providing TFNM functionality through option menus.
Figure 27B:
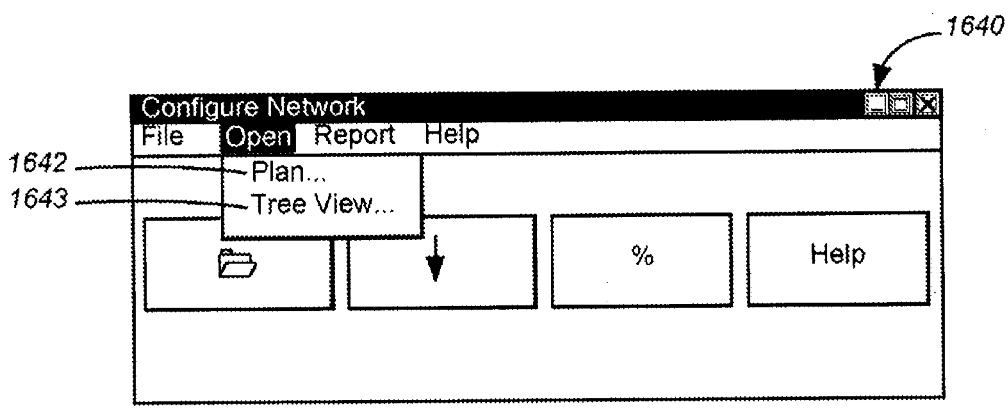
Figure 27C:
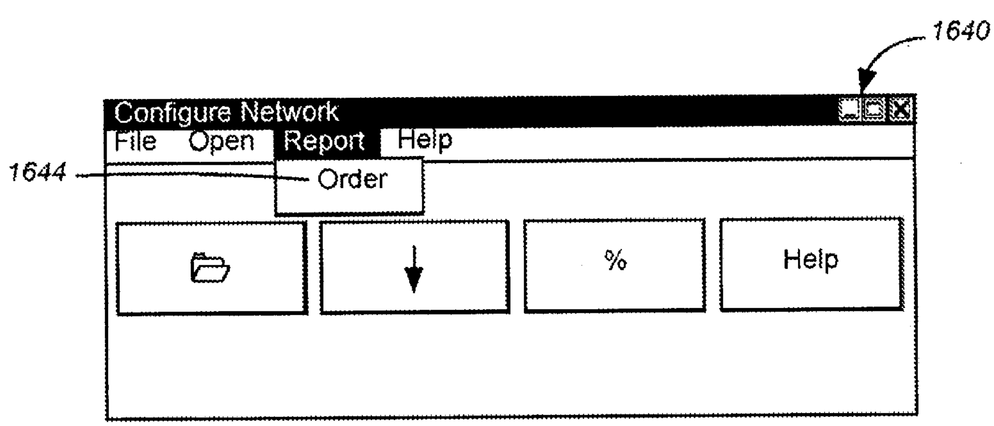
Figure 27D:
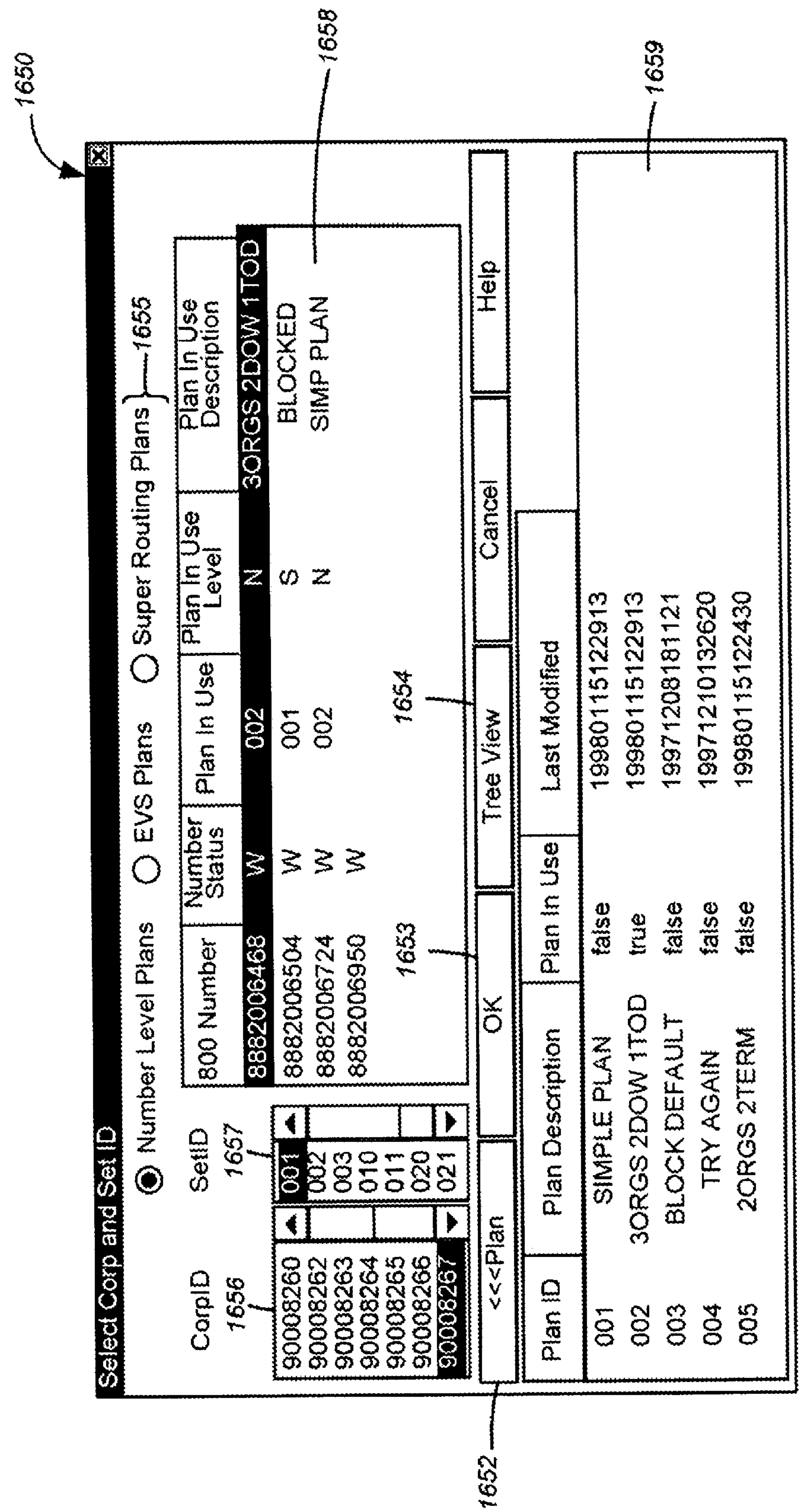
Figure 27E:
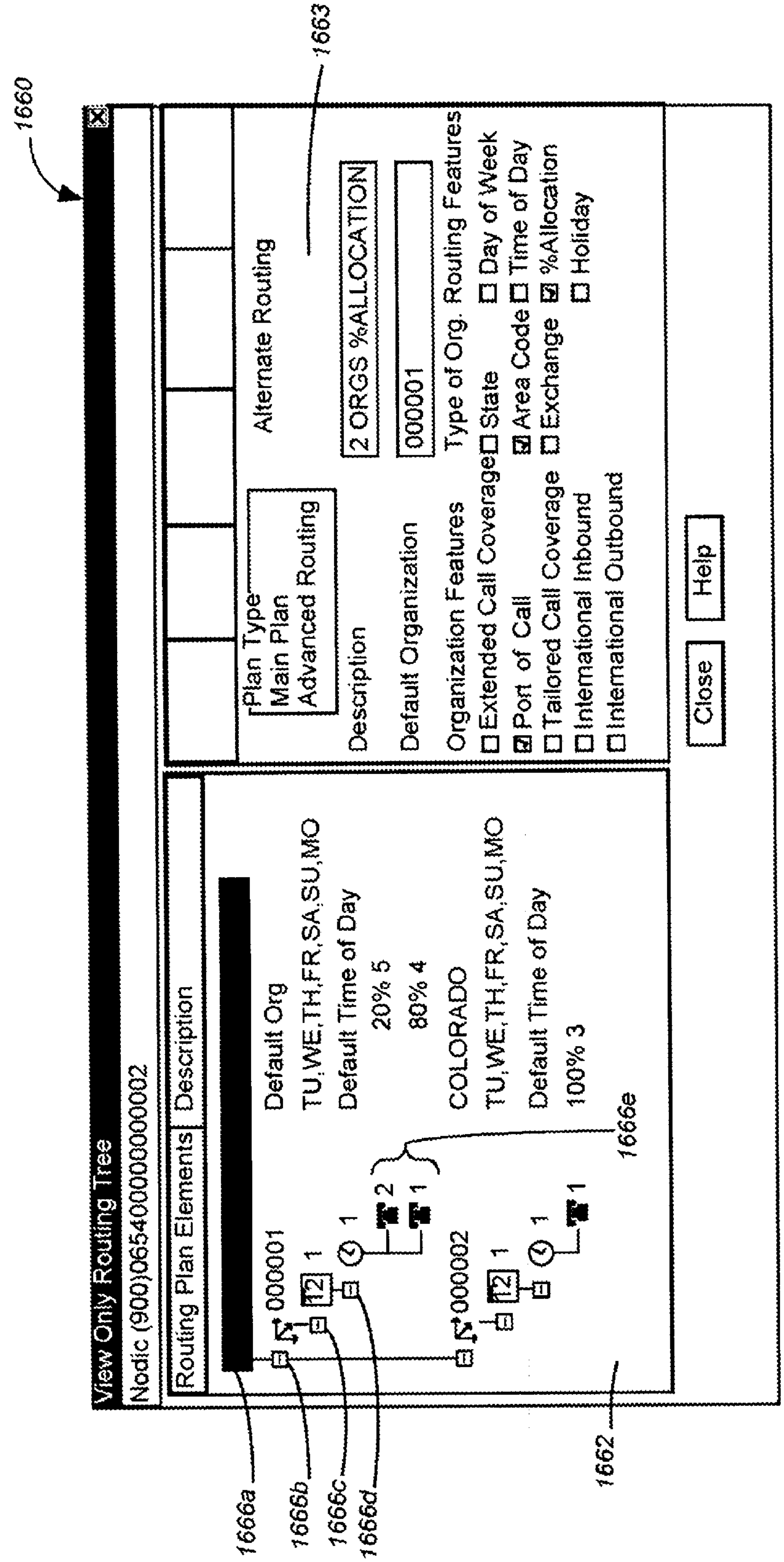
Figure 27F:
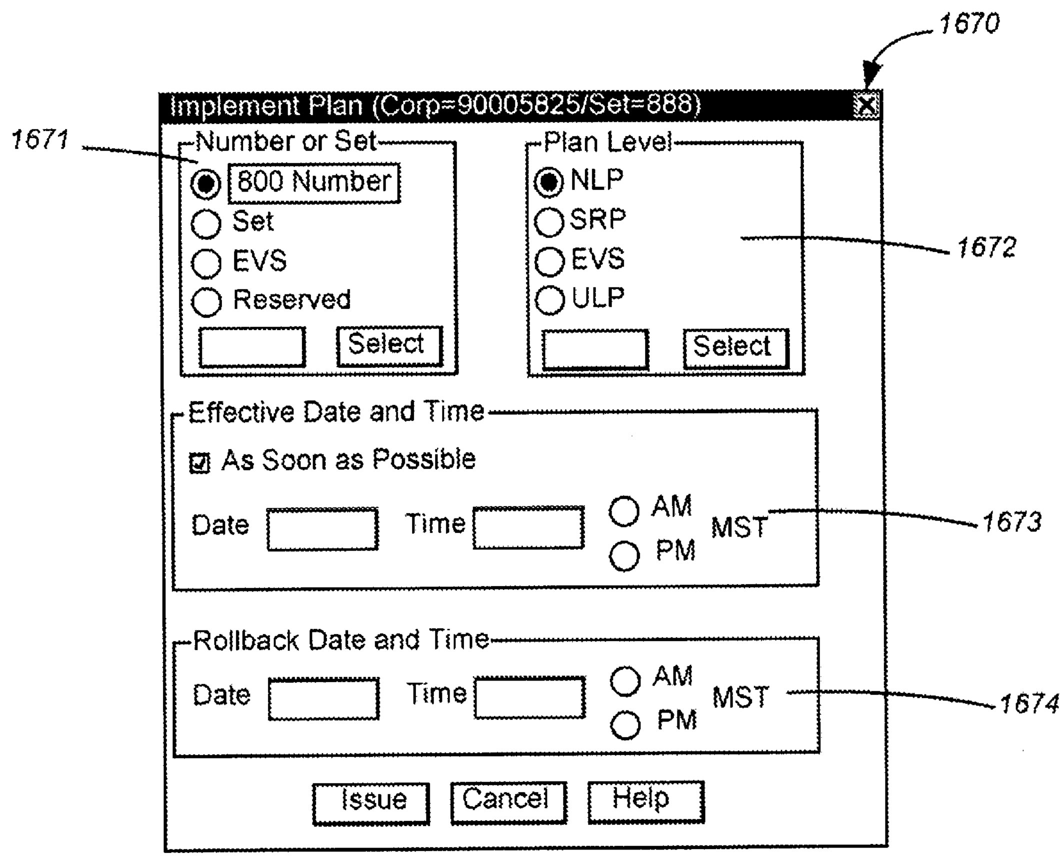
Figure 27G:
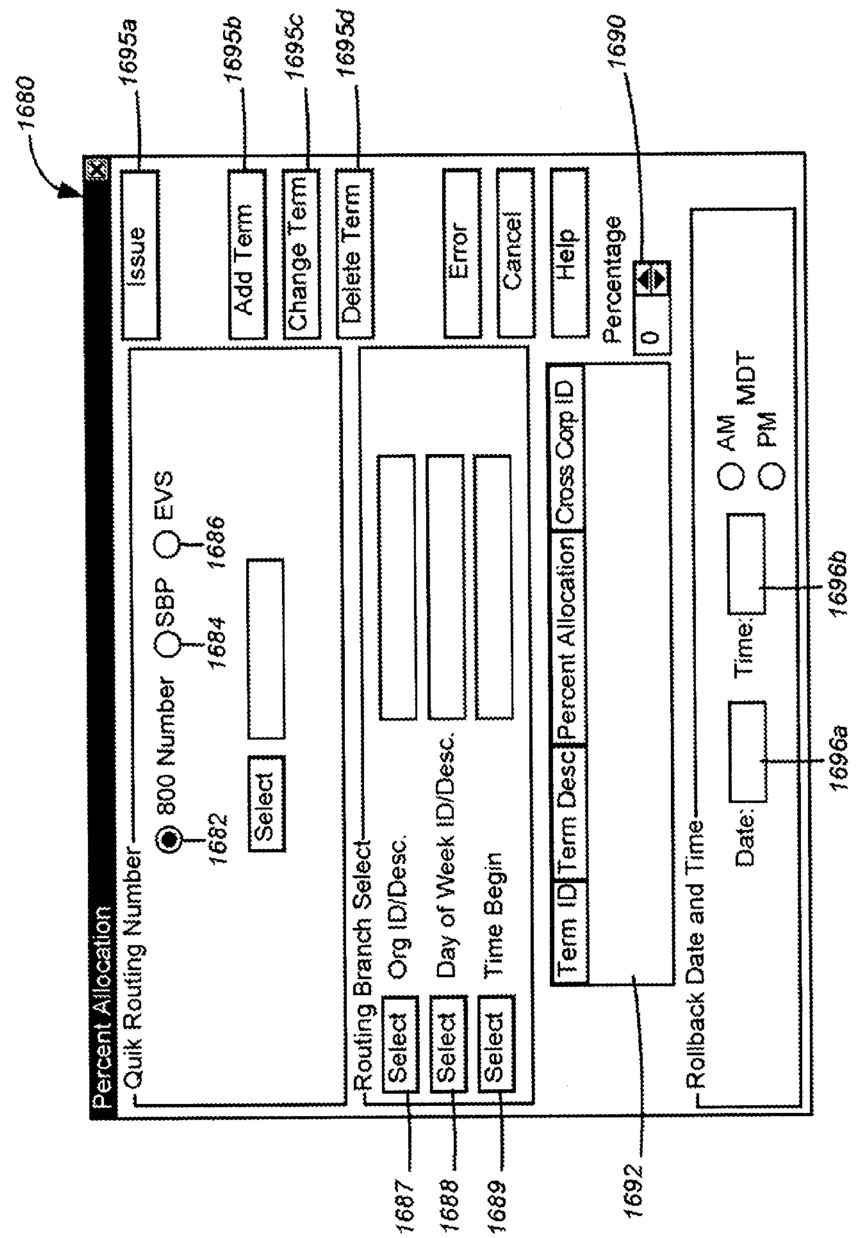
Figure 27H:
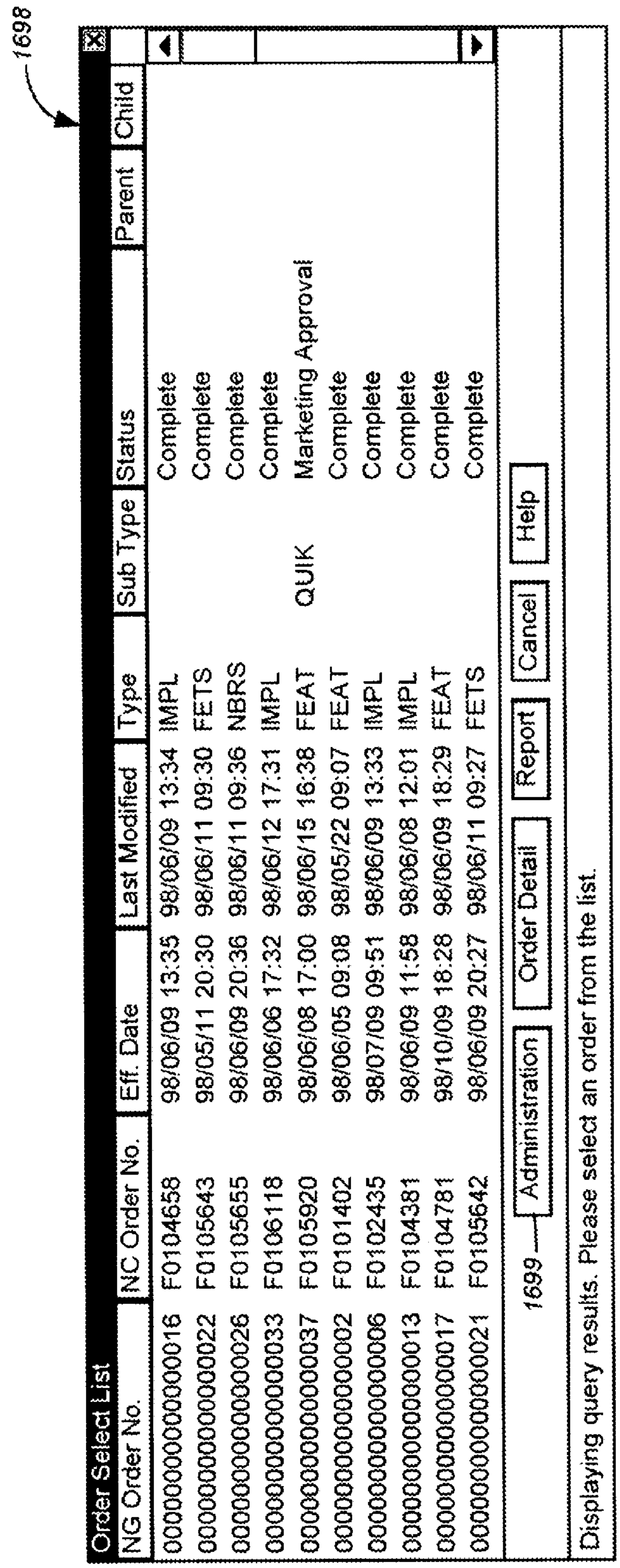
Figure 27I:
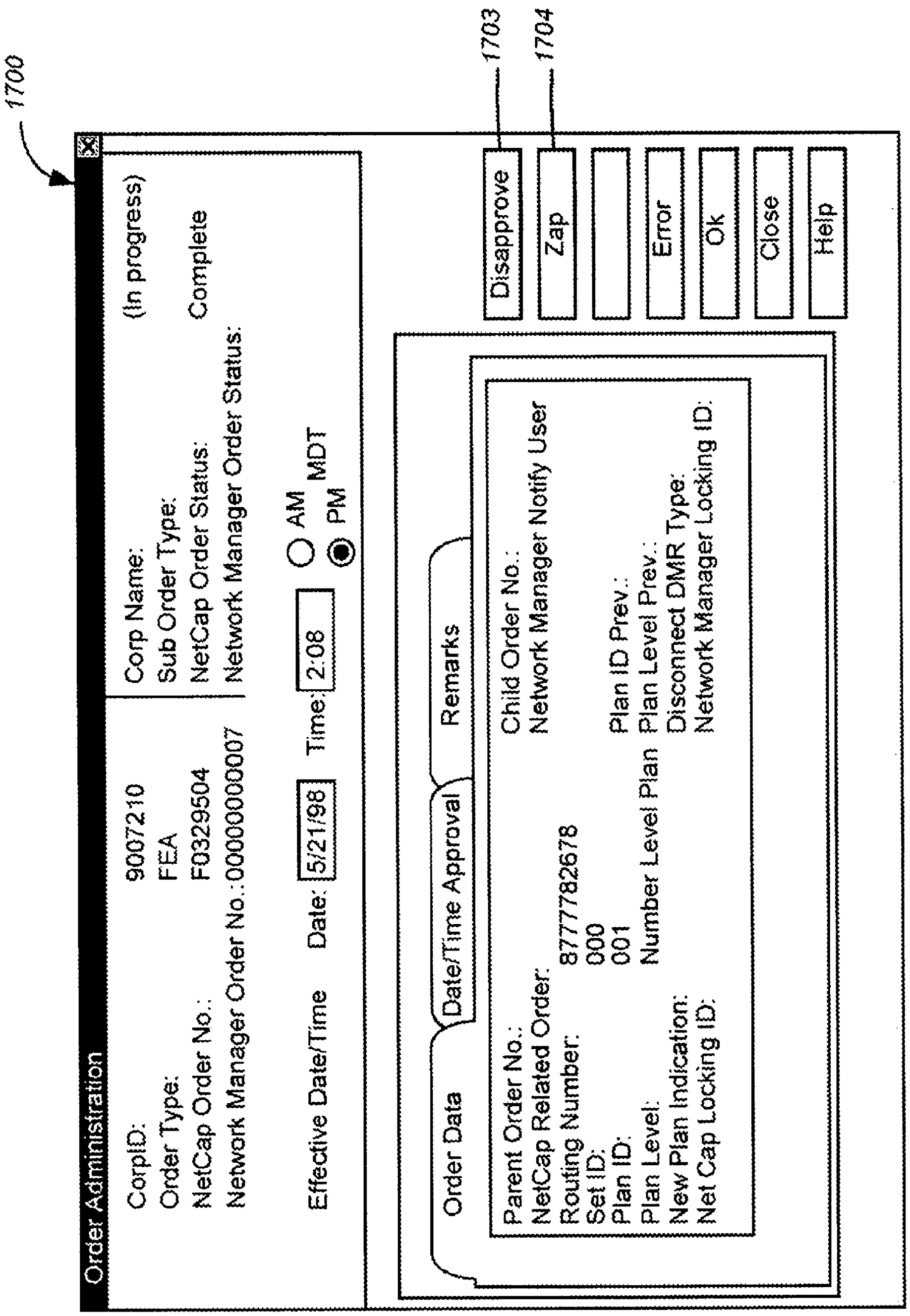

As mentioned above, another application of the suite of telecommunications network management applications is the toll free network management tool 800 as shown in FIG. 26. Referred to herein as "TFNM," the toll free network management tool 200 provides the client GUI and middle-tier service that enable customers to request, specify, receive and view data pertaining to their toll free network management assets, e.g., toll free number routing plans, and to generate orders for changing aspects of the routing plans via a World Wide Web interface. Particularly, customer directives are entered by the user 100 via a TFNM graphic user interface. These directives are preferably communicated as Java applets over secure TCP/IP socket connections for input over the firewall 25*a* to at least one secure Web server 24, e.g., a DMZ Web server that provides for authentication, validation, and session management in the manner as described herein. In view of FIG. 26, as will be described, the TFNM tool 800 implements a TFNM domain server 840 which is one component part of a back-end MCI infrastructure comprising: MCI's NetCap system 240, a Service Control Manager 290*a* ("SCM"), and Data Access Points 290*b* ("DAP"). Particularly, the legacy NetCap order entry system 290 processes (i.e., edits, validates, logs) call routing feature orders for customer's 800/8xx traffic and submits orders to the Service Control Manager ("SCM") which then formats and distributes orders to each of three redundant data access points ("DAPS") which implements the plan orders at the network switches. Once an order is implemented on the DAPS, calls to the customer's 800/8xx number are processed with the features specified in the order. The TFNM server 840 interfaces with the "NetCap" 290 mainframe system that provides user interface to the network control system, i.e., DAP switches 290*b*. The TFNM domain server 840 includes Java object classes whose methods are invoked by Java applets running on the customer browser. The browser Java applets specifically execute the customer directives by invoking certain methods on the TFNM Domain server 840. These Java objects additionally provide the interface functions to the NetCap 240. In the preferred embodiment, the Java objects at the TFNM domain server function as a proxy, and are invoked remotely implementing a Java remote method invocation "RMI"-like methodology.

Particularly, as described herein with respect to FIG. 3, within the networkMCI Interact framework for producing Java applications over the Internet, there is provided common objects and an infrastructure allowing secure communications between a client (which resides on a browser) and a server (which resides safely within MCI's firewalls). As briefly mentioned, the security strategy includes: encrypting communication from the client to the web-server via SSL (HTTPS) and implementing HTTPS as the preferred method for allowing communication into the web server from the Internet; providing an additional firewall between the web-server and the dispatcher to allow only specific traffic from the web server to the dispatcher to occur; encrypting traffic between the web server and the dispatcher via DSA encryption; and enabling the dispatcher to validate all packets destined to internal MCI servers to ensure that they are from an authenticated client, and that a particular client has permission to communicate with a specific back-end server. To make this seamless for the client, the aforementioned set of common objects performs this messaging. In the preferred embodiment, the invention implements a modified RMI which is referred to as "CORMI" (Common Objects RMI) which provides an RMI-like interface between the client and the server using the networkMCI Interact protocol. The CORMI procedures implemented have additional controls built in to provide the necessary session security and maintenance for communication over the firewalls.

More specifically, CORMI is nMCI Interact's protocol for providing secure, client-to-server communication with Java RMI-like semantics and comprises a library of Java classes used by both the client applet and server application. In view of FIG. 26, the communication path from the client and the server is as follows:

The TFNM server application 840 registers remote objects with CORMI's CORemoteSessionServer (analogous to Java RMI's Registry service) and then blocks waiting for connections. The TFNM client applet initiates communication by performing a logon through a COClientSession object. The COClientSession creates a COSynchTransaction (an atomic unit of work based over an HTTPS socket) which connects to the MCI Interact system dispatcher server 835 (which is behind the outer firewall 25(*b*)) and interfacing with StarOE server 39. The dispatcher server 26 validates the client's authorization to logon (a process that involves contacting the StarOE service and generating a session key with a 'cookiejar' process). After validating the client, the dispatcher uses a round-robin protocol to select a TFNM server and then opens an HTTPS connection to an instance of the TFNM server application. On this server, the CORemoteSessionServer creates a new session for this client and records the session key.

A reply to a logon is sent back through the dispatcher server 235 to the client 20. The client then can do a lookup which results in a serialized remote interface of the remote object registered earlier being passed back to the client. The client can then use this remote interface as it would with Java RMI-doing remote method invocations. The remote method invocations are handled by CORMI as COSynchTransactions through the dispatcher to the same TFNM server instance that the logon and interface lookup took place at.

It should be understood that there is no permanent connection between the TFNM client and server; CORMI, through a COSynchTransaction, creates a new HTTPS connection to the dispatcher (and the dispatcher creates a connection to the TFNM server) for each unit of communication.

After the above-described logon, authentication and entitlement processes, the user is presented with the nMCI Interact home page (FIG. 5(*a*)) whereby the user may select the Network Manager icon 89 to enter into the TFNM system. Upon selection of the Network Manager icon, a client TFNM application is downloaded to the customer who is presented with the TFNM web-page display 1640, such as shown in FIGS. 27(*a*)–27(*c*). As shown, this TFNM web-page display presents a variety of TFNM file menu options including: 1) an option 1645 enabling a user to select a Corp ID, i.e., a corp, set, number, and plan to establish a working environment; 2) an option 1646 enabling a user to cut-through to a 3270 mainframe NetCap application; 3) an option 1647 enabling a user to Implement Plan, i.e., put a plan in use by creating an IMPL order; and, 4) an option 1648 enabling a user to modify the termination information on a plan by creating a QUIK order. As further shown in FIG. 27(*b*), the open menu includes a Plan option 1642 which allows the user to select from a list of plans in the current working environment and enables opening of the plan in a graphical mode on a VORT ("View Only Routing Tree"), as will be explained; and a Tree View option 1643 which displays the last plan accessed on the VORT screen. As further shown in FIG. 27(*c*), the report menu includes an option 1644 for allowing the user to set up and execute an order filter query which results in the display of an order list, as will be hereinafter described in greater detail.

Thus, the customer is enabled to select a view of his/her routing plans in accordance with that user's privileges. To determine privileges, TFNM user security profile information is requested from StarOE that comprises a list of Corp Ids and AccessId combinations, referred to herein as "RACF ID" combinations that the customer is allowed to access within TFNM. Particularly, user security profile elements obtained from StarOE include: Corp Id, i.e., the Corporation Id the customer user has access to within StarOE; and DefaultInd, i.e., a default Carped indicator having, for example, 'Y' or 'N' values.

Once the customer has logged into TFNM and has received the StarOE security message, a communication is made from the TFNM server 840 to NetCap 290 requesting a user security profile. Particularly, the messaging system implemented for all communications between the TFNM server and NetCap is referred to herein as "Registry," such as shown and described in commonly-owned, co-pending U.S. patent application Ser. No. 08/560,550, the contents and disclosure of which are incorporated by reference as if fully set forth herein. Security from NetCap is by Racf Id and Corp Id. For each Corp Id a user has access to, that user must have a Racf Id. If a user has Enterprise level security, then the list of Corps under that Enterprise within NetCap have the same security as the Enterprise. Particularly, in response to a user login, in the preferred embodiment, a TFNM server application is executed. From this application, the TFNM server instantiates a Profile Manager Java object which is registered with CORMI and called upon to invoke further objects relating to the following: user profile, e.g., preferences, user security profiles, i.e., for tracking customer entitlements/privileges including rights for creating or modifying specific TFNM routing plans or generating QUIK or IMPL orders; and, session management, i.e., objects which encapsulate the state and behavior associated with a specific user login, e.g., time logged in.

In the preferred embodiment, once profile manager is instantiated, the TFNM server additionally instantiates objects related to view screens and options according to the user's entitlements/privileges. Specifically, a Corporation Manager ("CorpMngr") object is invoked to enable the user to select the corporation having the desired routing plan to be looked at. Then, the following objects are sequentially invoked: a Set Manager object for the corporation selected; a Number Manager object that knows the TFNM numbers (e.g., 1-800/8xx) belonging to the Set and/or Corp; and, a Plan Manager object, which knows the routing plans that belong to the selected corporation, set, and/or number selected by the user up to that point. It should be understood that the TFNM server is enabled to communicate with NetCap server for this data if not provided in the TFNM database, or, if the information in TFNM is not current. For instance, for some messages, a data sync may always be invoked. Thus, TFNM may contact NetCap and pass date and time stamps indicating the last update for the record. If NetCap determines that they have later data version, it will pass down the updated version, otherwise, it will pass an empty message back to TFNM. Alternately, an internal table 845, as shown in FIG. 26, may be accessed indicating the intervals for data record updates and which will indicate the last time a data sync was performed for a particular record. By checking this table, a determination may be made as to whether contact must be made to NetCap for a data update.

In the preferred embodiment, as shown in FIG. 26, the TFNM server 840 communicates a plan/data sync message 843 via Registry messaging to NetCap. Appendix A of commonly owned, co-pending U.S. patent application Ser. No. 09/159,702 entitled INTEGRATED PROXY INTERFACE FOR WEB BASED TELECOMMUNICATION TOLL-FREE NETWORK MANAGEMENT, the contents and disclosure of which is incorporated by reference herein, illustrates the Registry message call "NPSNC" which is the request to sync a plan and transmitted from the TFNM server to NetCap. A variety of Registry response messages for this request is provided in Appendix B of above-referenced, co-pending U.S. patent application Ser. No. 09/159,702.

As shown in FIG. 27(*d*), the File/Select Corp ID menu option causes a screen 1650 to be displayed in the web page that enables the user to select elements (Corp ID, Set ID, Routing Number) that invoke objects for establishing a working environment, or, to select a plan for view. The data elements displayed on this screen differ according to the type of plan chosen. In the preferred embodiment, the TFNM Network Manager component 800 enables the customer to create or modify orders for four types of TFNM routing plans: a Number Level Plan ("NLP"), Super Routing Plans ("SRP"), Enhanced Voice Service Routing plans ("EVS"), and universal routing plans ("URP"). As shown in FIG. 27(*d*), Number Level, EVS, or Super Routing plan radio buttons 1655 may be selected to access corresponding visible screen elements. When an NLP plan is selected, for instance, the following elements are displayed: a Corp ID element 1656 which is a single selection list box that becomes populated with corp id's available to the user in accordance with that user's entitlements; a Set ID element 1657 which is a single selection list box populated with Set ID's that the user has security access to for a chosen Corp ID; a Number list box element 1658 which is a single selection list box populated with number information for the indicated corp./set; and, a Plan list box 1659 which is a single selection list box populated with plan information such as: a plan description, plan in use, or when the plan was last modified, for the selected number. It should be understood that corporate security is obtained from NetCap whenever a new Corp ID is selected, in the manner described.

In the preferred embodiment, using additional buttons 1652, 1653 and 1654 from the screen shown in FIG. 27(*d*), the user respectively, is enabled to open or close the "plan" portion of the screen; save the selected corp/set/number/plan id as the user's current working environment; and/or display a tree view of the highlighted plan.

When the user chooses to view a selected routing plan, and after verifying security with both StarOE and NetCap, the TFNM server may execute the synch process with NetCap 290 as described above. During this process, TFNM updates any records in the TFNM server copy of the customer's chosen routing plan with changes that were made in NetCap since the user last accessed the system. The TFNM server database is updated with the latest routing plan information for that customer, and the updated routing plan information is sent to the user, as indicated at step 333. The customer is now presented with the requested routing plan view via the TFNM client application.

A user may view a routing plan in several formats, e.g., a hierarchical tree graphic or a spreadsheet. In the preferred embodiment, as shown in the exemplar screen display 1660 of FIG. 27(*e*), the Routing Plan is displayed as a tree structure comprising of a series of linked node types in a specific hierarchy. As shown in FIG. 27(*e*), the screen is divided into two main sections: a first section 1662 comprising the graphical representation of the routing tree having nodes tree branches that can be expanded and collapsed; and, a second section 1663 for displaying the details of the currently highlighted tree node. The node types that are available include: 1) a Plan node 1666*a* which is shown highlighted in FIG. 27(*e*) and details the features for the plan; 2) an Origination node ("ORIG") 1666*b* which details the geographical elements used in determining where to route the call. Multiple Origination nodes may exist under a plan node; 3) a Day of Week node ("DOW") 1666*c* which details how to route calls based on days of the week. Multiple Day of Week nodes may exist under an Origination and all seven days of the week must be accounted for under each origination; 4) a Time of Day node ("TOD") 1666*d* which details specific time ranges for routing calls. Multiple Time of Day nodes may exist under a Day of Week and all 24 hours of the day must be accounted for under each Day of Week; and, 5) a Percent Logical Termination node ("%LTERM") 1666*e* which details where the calls terminate and at what percentage of the time. As shown in FIG. 27(*e*), multiple %LTERM nodes may exist under a Time of Day. The percentages in "sibling" nodes must add up to 100 percent. A user can select details of any node by clicking or scrolling. Trigger Points (not shown) may also be displayed as children of the node they ride on. For example, a Trigger Point that rides on an Origination node would be displayed under the Origination on the same level as a Day-of-Week node. At each node, decisions related to the call routing are executed.

As further shown in FIG. 27(*e*), for a plan node, the corresponding plan detail screen 1663 is populated with the existing plan description; the Orig id of the default orig on the plan; and Origination Features having values derived based on the features in use on the plan. Likewise, for an origination node 1666*b*, the corresponding plan detail screen displays: the ID of the highlighted origination node and the corresponding description including listboxes displaying the geographic elements (countries, states, area codes and exchanges) associated with the highlighted Origination node. For the DOW node 1666*c*, the corresponding plan detail screen displays the Day Id of the DOW node and the list of days associated with the DOW node. For the TOD node 1666*d*, the corresponding plan detail screen displays the list of time ranges associated with the TOD node. For the Termination node 1666*e*, the corresponding plan detail screen displays: the ID of the termination associated with the highlighted node; a description of the termination associated with the highlighted node; an indication of whether a cross corp term is associated with the highlighted node, and, if the Cross Corp Term indicator is "Yes," a field displaying the cross corp Id associated with the termination in the Termination ID field; and an indication of the percentage of calls allocated to this termination node. Further details may be displayed including a Details tab (not shown) for displaying: the customer service id associated with the termination; the activation date of the termination; the activation date received associated with the termination; the service status associated with the termination; the Switch Trunk ID associated with the termination; and, an indication of whether the termination is EVS; whether the Termination has a real-time ANI Delivery and, the activation date for the Real Time ANI. Additionally, an ANI tab (not shown) may be displayed for presenting the user with information as to whether the termination has an Automatic Number Identifier ("ANI"), the country code associated with the termination and the Termination ANI. An "Overflow" tab of the termination details screen displays for the user: a network call redirect indicator indicating whether the termination has an NCR; a direct termination overflow indicator indicating whether the termination has a DTO. Likewise, a "DNIS" tab (not shown) may be displayed for presenting the user with information as to whether DNIS/Enhanced DNIS is active on the termination; the date that DNIS is activated; an indication of whether the Dialed Digit Outpulsing (DDO) is active on the termination; the prefix digits used for DNIS, and the number of digits to be reused for DNIS. Finally, an "International Outbound" tab (not shown) may be displayed for presenting the user with information as to whether international outbound is active on the termination; the Country code associated with the termination if international outbound is active; the Carrier code associated with the termination if international outbound is active; and the free phone number associated with the termination if international outbound is active.

Via the TFNM Client Application, the user is now able to invoke TFNM functions such as the "IMPL" depicted in FIG. 26 as the IMPL request 822 which enables the user to quickly change the number routing plan that a working number or set of working numbers is routing to; or "QUIK" depicted in FIG. 26 as the QUIK request 824 which enables the user to quickly add, change and/or delete one or more termination locations, and/or change the percentage allocation of two or more of these locations, for a currently implemented routing plan. In accordance with the present invention, additional directives may include: a temporary ("TEMP") IMPL directive which is created in conjunction with an Impl by entering a roll-back date so that the routing plan will revert to its prior use status prior to creation of the Impl; and a TEMP QUIK directive which enables roll-back of the changes made by a QUIK order to what they were before the QUIK.

For the case when a user desires to implement the IMPL/TEMP IMPL plan, or the QUIK/TEMP QUIK, the user selects the Setup IMPL from the TFNM screen. Specifically, the TFNM Client application causes the instantiation of an "Order Manager" object which invokes methods capable of accessing all the information pertaining to orders for a given corp id, set, TFNM telephone number and plan. An order comprises two components: 1) an order administration record comprising data such as: order status, effective data time and order number, etc.; and, 2) order administration detail record which includes the detailed information pertaining to that order, e.g., changes to percent allocation or effective dates/times etc. for a plan, etc. The Order Manager object includes an ImplOrder sub-class which knows about IMPL orders, e.g., IMPL functionality, and invokes objects to obtain order records, pertaining to plans. As mentioned, an IMPL order allows a user to change which routing plan they want to be "in use" for a specific number or a set of numbers.

FIG. 27(*f*) illustrates the IMPL dialog screen 1670 enabling the user to generate a TEMP IMPL/IMPL order for the desired Corp Id. Particularly, as shown in FIG. 27(*f*), a number/set selection dialog box 1671 is displayed having radio buttons enabling selection of the desired 800/8xx Number, a set of numbers, a reserved number; or, an EVS Number for implementing an EVS plan. Selection of one of these will invoke a "data controller" object for retrieving information from a TFNM database causing a corresponding dialog to appear enabling user search for the desired 800/8xx Number, set, reserved number, or EVS Number for the desired Corp Id. After selecting the desired number or set, the user is prompted to select from dialog box 1672 the specific plan type that is to be IMPL'd for the number or set. As shown, the dialog box 1672 comprises radio buttons enabling user selection of the desired plan IDs including, but not limited to, a Number Level Plan ("NLP") implemented for an 800/8xx Number or a set of numbers, a Super Routing Plan (SRP) implemented for an 800/8xx Number, a set of numbers, or a reserved number; and, an EVS plan implemented for an EVS Number. It should be understood that if the user has privileges for only one Corp ID, the system will select only the plans associated with that Corp ID for the user. If the user has privileges for more than one Corp ID, the user is presented with a list of all Corp IDs and will select one Corp ID. Any subsequent actions the user takes within the application are applicable to that selected corporation.

After having selected the Corp, set, Routing Plan Number or Routing Plan ID, the user may set or modify the routing plan. In the preferred embodiment, the user can define the routing plan according to any of the above-described options: Origin, Country, State, NPA, NXX, Day of week, Time of day, and Termination. These options can be defined for each Corp ID, Set or number. In the preferred embodiment, the user is enabled to implement NLPs, SRPS, and EVSs and URPs for a selected toll free number or, implement NLPs and SRPs for a set of numbers that they want routed differently. Via IMPL request messaging, the user selects the desired routing plan for the number/set and the desired date and time when they want to start routing the number to the selected plan and forwards the request to the TFNM server via HTTPS messaging.

As shown in FIG. 26, the customer's Send IMPL request 822 is communicated over the HTTPS connection as a request to invoke methods in the Order Manager class/sub-classes via CORMI. Once the plan has been submitted to the TFNM server via the send IMPL message 822, the TFNM server receives the new routing plan and verifies the user's security with NetCap. Once the user's security has been verified, the TFNM server submits the IMPL request to NetCap 290 via Registry messaging. Particularly, the Order Manager classes/sub-classes execute methods for translating the IMPL order in a form suitable for submission to NetCap.

Appendix A of above-referenced, co-pending U.S. patent application Ser. No. 09/159,202, illustrates the Registry message calls that are transmitted from the TFNM server to NetCap for the IMPL/TEMP IMPL order and the corresponding NetCap responses. Included is the message for submitting an IMPL order (NIMPL) to NetCap.

It should be understood that, in the case of a user implementing a TEMP IMPL request, the user follows the same procedure as for the IMPL order, e.g., selecting the desired routing plan for the number/set and Corp Id. However, as shown in FIG. 27(*f*), the user is presented with a dialog 1673 for submitting the desired date and time when the user wants to start routing the number to the selected plan, and, a dialog 1674 for submitting the roll back date and time when they want the previous routing plan to be effective again. Thus, both an IMPL and TEMP IMPL message pair is sent to the TFNM server for processing as described herein.

After a TEMP IMPL and/or IMPL request has been transmitted to NetCap 290, it is stored for future implementation. In view of FIG. 26, NetCap sends an acknowledgment via Registry messaging back to the TFNM server.

Appendix B of above-mentioned, co-pending U.S. patent application Ser. No. 09/159,702 illustrates the Registry message calls that are transmitted to the TFNM server from NetCap in response to the submitted IMPL order. Included is the message indicating successful processing of the IMPL request (NSUCS) and the message indicating completion of the order in NetCap (UCOMP). The TFNM server passes this information on to the user via CORMI messaging over the HTTPS connection. If the user is still logged on, this acknowledgment appears as a pop-up message on their screen, as indicated via line 826 in FIG. 26. If the user has logged off, TFNM retains the acknowledgment that the IMPL has been received and saved for the next user logon.

Likewise, when an IMPL has been transmitted to NetCap and either implemented or terminated, NetCap sends a registry message back to the TFNM server which, in turn, passes this information back to the user via HTTPS connectivity.

The user of the TFNM system may instead desire to execute the QUIK feature that enables customers to quickly add, change and/or delete one or more termination locations (nodes), and/or change the percentage allocation of two or more of these locations, for a currently implemented routing plan, FIG. 27(*g*) illustrates an exemplary web-page screen 1680 instantiated by the TFNM client application for the QUIL/TEMP QUIK order process which is presented to the user. As shown in FIG. 27(*g*), there is provided a number of radio buttons which the user may select: 1) an 800/8xx number button 1682 which causes a dialog to be displayed for enabling the user to enter or select an 800/8xx number from a list of 800/8xx #'s (not shown) having an associated "plan in use." Once the 800/8xx # is entered, the system returns the corresponding NLP or SRP Plan in use; 2) an SRP button 1684 which causes a dialog to be displayed for enabling the user to enter or select an SRP Id from a list (not shown). Once entered, the system returns the SRP Routing Plan for the SRP Id; 3) an EVS button 1686 which causes a dialog to be displayed for enabling the user to enter or select an EVS number. Once entered, the system returns an EVS Plan In Use if available. In each dialog, a corresponding "data controller" object is invoked for retrieving information from a TFNM database causing a corresponding dialog to appear enabling user selection.

After selecting the desired plan, the user is required to key or select each of the following buttons: Origination Id/Description 1687, Day of Week Id/Desc. 1688, and Time Begin/Desc. 1689. Selection of the Origination Id/Description button 1687 causes a list of Origination Id and corresponding descriptions to be displayed. In this mariner a user may scroll through the list and identify the branch comprising the terminations that are to be modified. Likewise, selection of the Day of Week Id/Desc. button 1688 causes a list of Day of Week node ids/descriptions to be displayed for the selected Origination Id node and through which the user may scroll through and select for modification. Similarly, selection of the Time Begin button 1689 causes a list of Time of Day node ids/descriptions to be displayed for the selected DOW and through which the user may scroll through and select for modification. Through use of the Order Manager classes/sub-classes the system auto-populates the Orig, DOW, TOD, and, once populated, the system displays in display field 1692 the Lterms for the TOD node which comprise the terminations and percent allocations. In the preferred embodiment, the user may change percentage allocations by overtyping the amount or using the spin box up/down arrows 1690 (increments of 1 percent). The user may additionally modify the percentages for the remaining termination(s) as long as the sum of the percentages for all the terminations attached to the selected Time interval node equals 100 percent. Action keys 1695*a*–1695*d* may additionally be enabled for user selection in accordance with enterprise business rules and/or user security. Specifically, key 1695*a* enables the submission of the QUIK/TEMP QUIK order to NetCap for approval (Issue key). Key 1695*b* allows the user to add a termination to the TOD node (including cross-corp terms that the customer has cross corp agreements with), or change the termination id, description, or percent allocated to the termination for this plan. Preferably, selection of key 1695*b* enables display of a web page having a Termination screen enabling these choices.

Key 1695*c* enables the user to select the termination that the user wants replaced and presents the user with the Termination screen to select the term for change (Change Term key). The key 1695*d* enables the user to select the term they want to delete on the selected routing branch. In the preferred embodiment, the system defaults effective date/time to the current date/time, however, the user may enter a future rollback date/time up to 1 year in the data and time entry fields 1696*a,b* in FIG. 27(*g*). If the user enters a Rollback date/time in the rollback date fields, the system generates a TEMP QUIK order that sets the Routing Plan back to its state before the QUIK order. Preferably, the Rollback date/time may not be greater than 1 year in the future.

Thus, from the dialog box 1680 (FIG. 27(*g*)), the user is enabled to perform the following: 1) change one or more terminations for NLP or SRP; 2) replace one or more terminations on an EVS Routing Plan; 3) change the percent allocation of currently implemented NLP, EVS, or SRP Plan; 4) add one or more terminations to the currently implemented NLP or SRP Plan; 5) add one or more terminations to an EVS Routing Plan; and, 6) delete one or more terminations from the currently implemented plan of an NLP, EVS or SRP Plans. It should be understood that, in the case of a user implementing a TEMP QUIK request, the user selects the desired routing plan for the number/set, the desired date and time when they want to add, change and/or delete one or more termination locations and/or percentage allocation of these locations for a currently implemented routing plan, and, optionally, the roll back date and time when the changes are to revert back to their original settings. Thus, a QUIK and TEMP QUIK message pair is sent to the TFNM server for processing as described herein.

Referring back to FIG. 26, the customer's Send QUIK request 824 is communicated by the TFNM client applet by communication between the Dispatcher server 235 and the TFNM server objects using CORMI. The Object manager/sub-classes execute methods for translating the QUIK/TEMP QUIK order in a form suitable for submission to NetCap.

The above referenced Appendix A of co-pending U.S. patent application Ser. No. 09/159,702 also illustrates the Registry message calls that are transmitted from the TFNM server to NetCap for the QUIK/TEMP QUIK order and the corresponding NetCap responses. Included is the message for submitting an QUIK order (NQUIK) to NetCap.

Once the plan has been submitted to the TFNM server via the send QUIK message, the TFNM server receives the new routing plan and verifies the user's security with NetCap. Once the user's security has been verified, the TFNM server submits the QUIK request to NetCap 290 via Registry messaging.

After a TEMP QUIK and/or QUIK request has been transmitted to NetCap, it is stored for future implementation. In view of FIG. 26, NetCap sends a registry message to the TFNM server acknowledging that the request has been stored.

Appendix B of co-pending U.S. patent application Ser. No. 09/159,702 also illustrates the Registry message calls that are transmitted to the TFNM server from NetCap in response to the submitted QUIK order. Included is the message indicating successful processing of the QUIK request (NSUCS) and the message indicating completion of the order in NetCap (UCOMP). The TFNM server then passes this information on to the user via CORMI messaging over the HTTPS connection. If the user is still logged on, this acknowledgment appears as a pop-up message on their screen, as indicated via line 826 in FIG. 26. If the user has logged off, TFNM retains the acknowledgment that the QUIK order has been received and saved for the next user logon. Likewise, when a QUIK has been transmitted to NetCap and either implemented or terminated, NetCap sends a registry message back to the TFNM server which, in turn, passes this information back to the user via HTTPS connectivity.

As described, a change to a routing plan is saved locally before being submitted to NetCap. The submission happens when the plan changes are converted into an approved order having an approved order admin record and with a condition that NetCap has no preceding orders queued against the plan. The submission process takes place in two steps: first, the order admin record is sent to NetCap immediately, and second, when no orders are pending against the plan, the order admin detail record is then sent. The delay results because NetCap does not queue more than one order against a plan at a time. The TFNM server is configured to hide this limitation by stacking orders—a process of accepting multiple submissions and queuing them internally for later transmission to NetCap. The order admin record is sent immediately. The order admin detail record is sent soon as possible thereafter.

Further functionality provided by the TFNM server is the ability to open plans, i.e., display a list of routing plans under the current working environment for display as a VORT (FIG. 27(*e*)), or, view orders and filter through orders. Particularly, the TFNM client will instantiate the Order Manager object which instantiates order administration detail objects and other objects for retrieving administrative records comprising the details for a particular order in the TFNM database. For example, selection of the Report Order menu option shown in the screen display of FIG. 27(*c*), will cause the display of an order filter screen enabling a user to enter elements that they would like to use to query for orders and submit order queries. The results of an order query are displayed in an order select list 1698, such as shown in FIG. 27(*h*). From this list, a user can retrieve details pertaining to an order, or, change an order's status or update remarks. Particularly, from an administration button 1699, the user is presented with a dialog 1700 as shown in FIG. 27(*i*), for example, enabling the user to update the order status and the effective date/time. It is from these dialogs that a user may select a button 1703 to un-approve an order (if the selected order has been approved by NetCap) and, a button 1704 to "zap" (delete) an existing order.

Appendix A of co-pending U.S. patent application Ser. No. 09/159,702 also illustrates the Registry message calls that are transmitted from the TFNM server to NetCap for un-approving an order (NOUAP), zapping an order (NOZAP), and, requesting pending order data (NPIUO). Corresponding NetCap responses are provided in Appendix B of co-pending U.S. patent application Ser. No. 09/159,702.

It should be understood that, in accordance with the principles described herein, the TFNM management tool of the invention is capable of supporting "feature" orders, i.e., functionality enabling customers to add a new TFN routing plan, e.g., NLP, SRP, URP, or EVS, or, change other the attributes or structure of an existing plan, e.g., changing attributes of a routing plan directly from the VORT (FIG. 24(*b*)). The TFNM tool additionally may provide "drag and drop" enabling users to configure routing elements between plans.

Although the TFNM web/Internet network management tool has been described herein with respect to a customer's toll-free, e.g., 1-800/8xx networks, the principles may be readily applied to other types of telecommunications network numbers.

Another application of the suite of telecommunications network applications is the networkMCI Interact Outbound Network Manager application 2700. Referred to herein as "ONM," the outbound network management tool 2700 provides the client GUI and middle-tier service that enable customers to manage and track Calling Party Number Orders, Calling Card Orders, Dialing Plan Orders, and ID Code Set Orders relating to their private networks such as Vnet and Vision networks.

Figure 28:
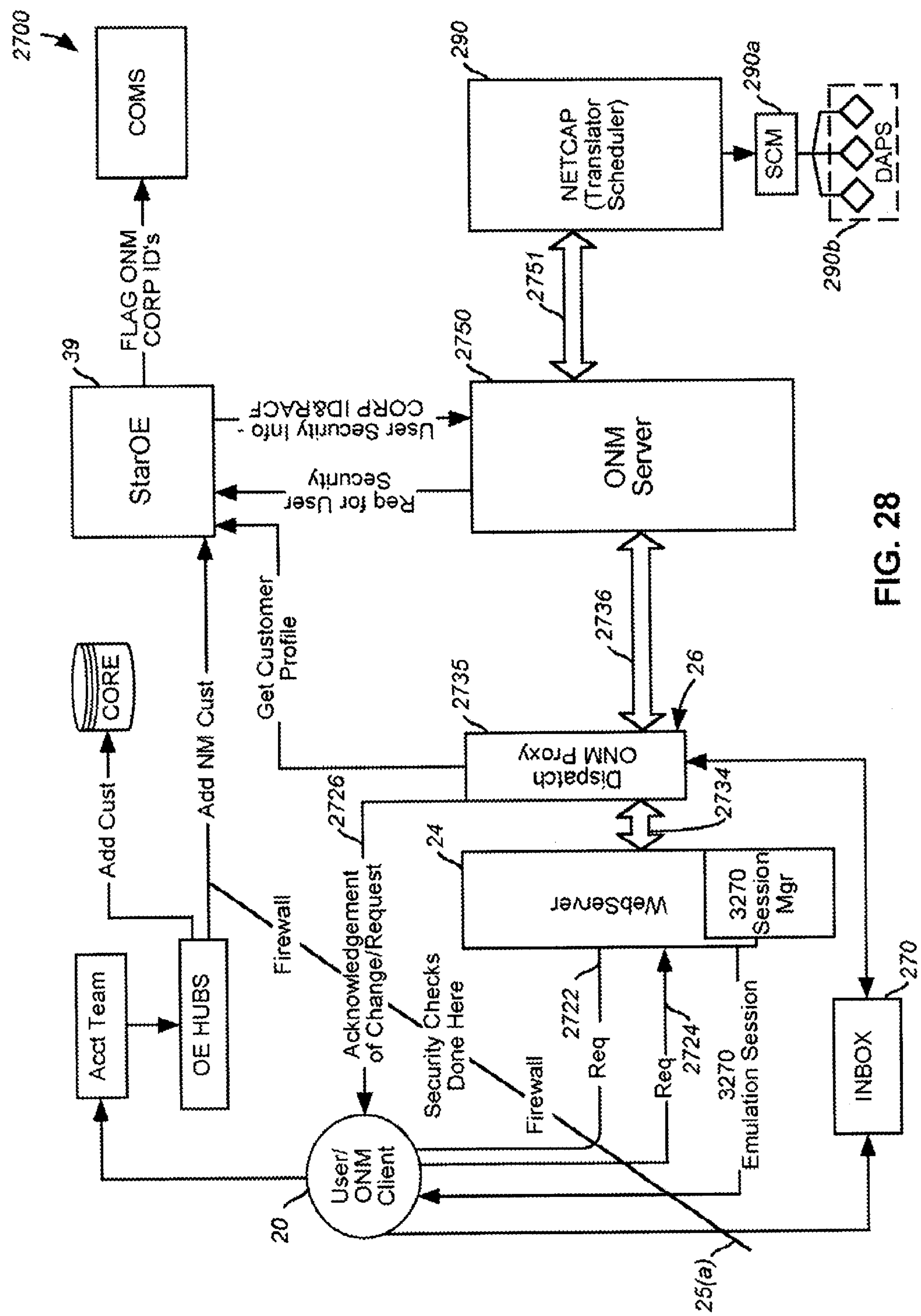
FIG. 28 is a block diagram depicting the physical architecture of the ONM system 200 of the invention.
Figure 29A:
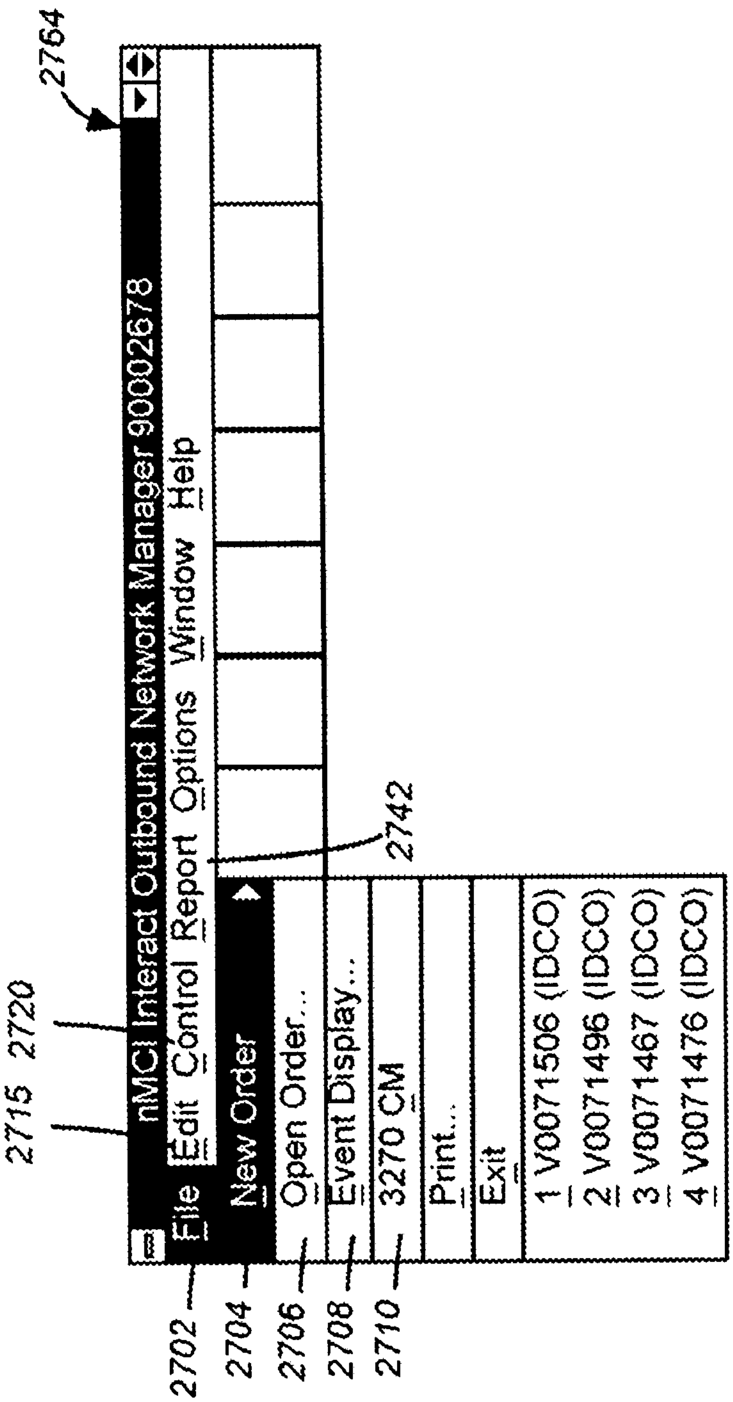
FIGS. 29(*a*)–29(*p*) illustrate various examples of ONM web page screen dialogs enabling user interaction with Outbound Network management system.
Figure 29B:
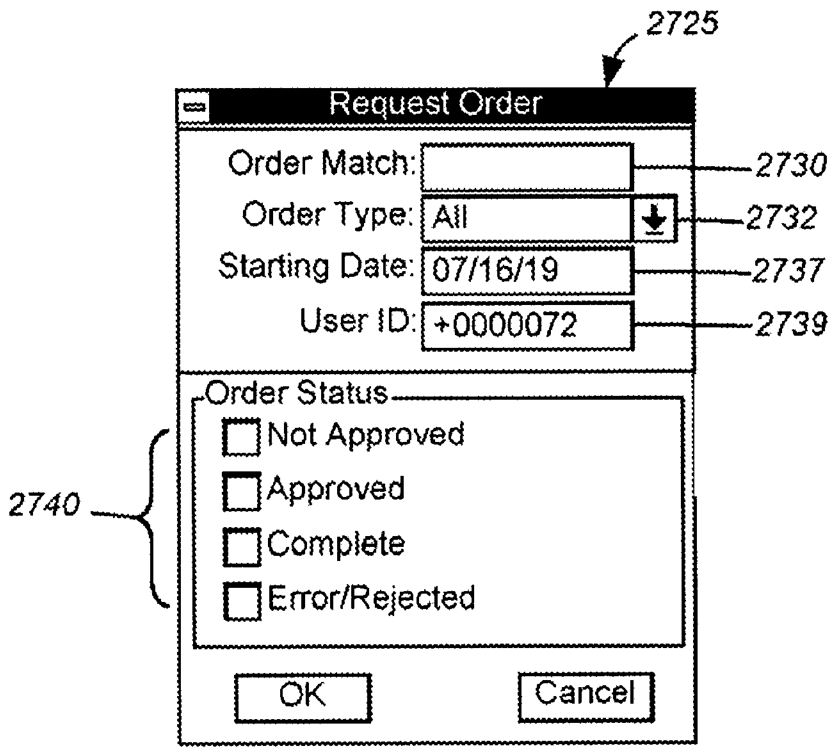
Figure 29C:
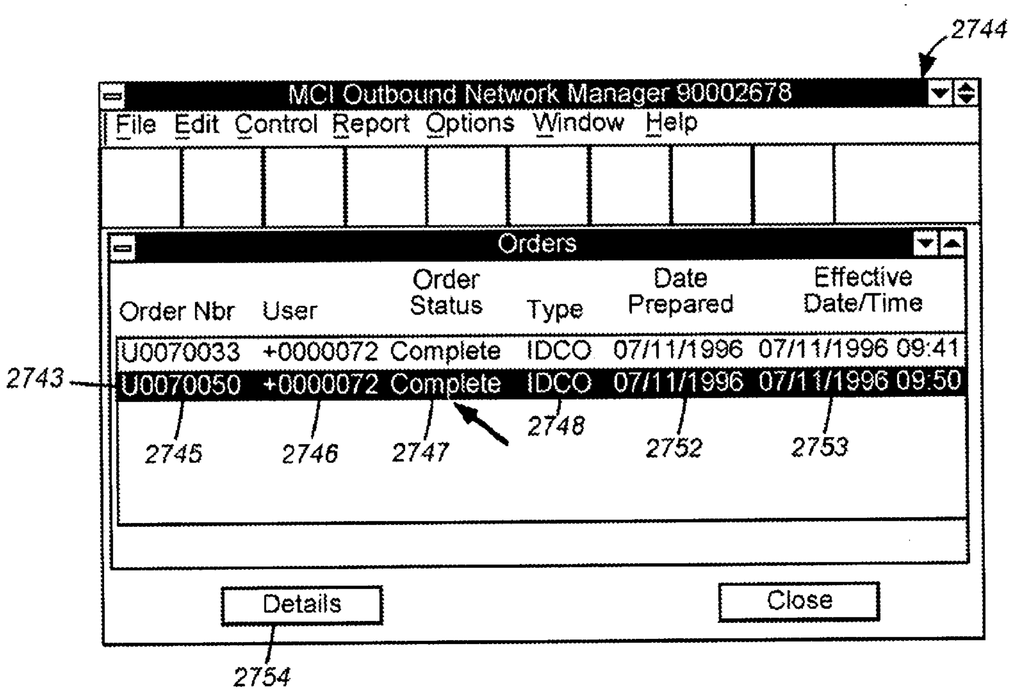
Figure 29D:
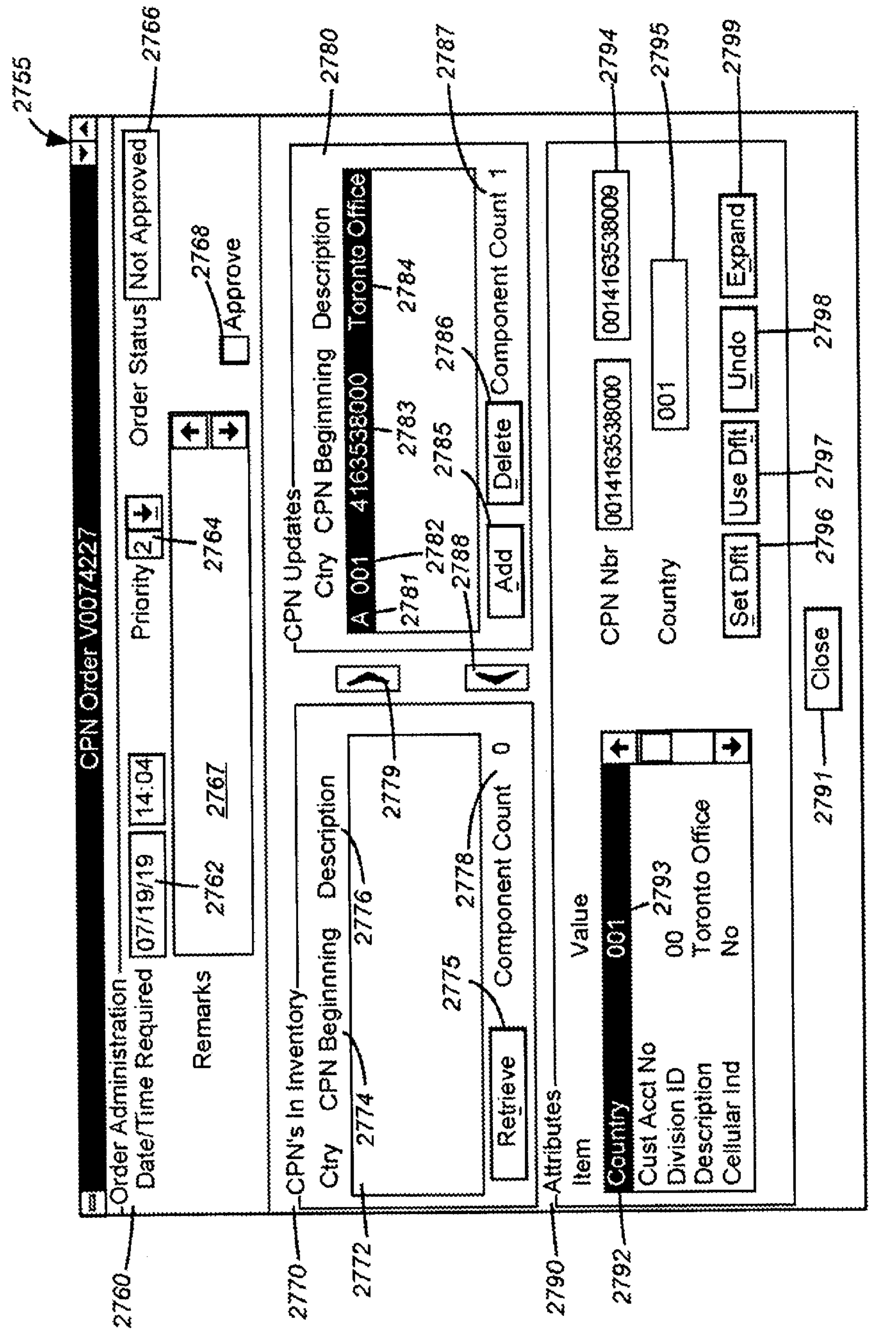
Figure 29E:
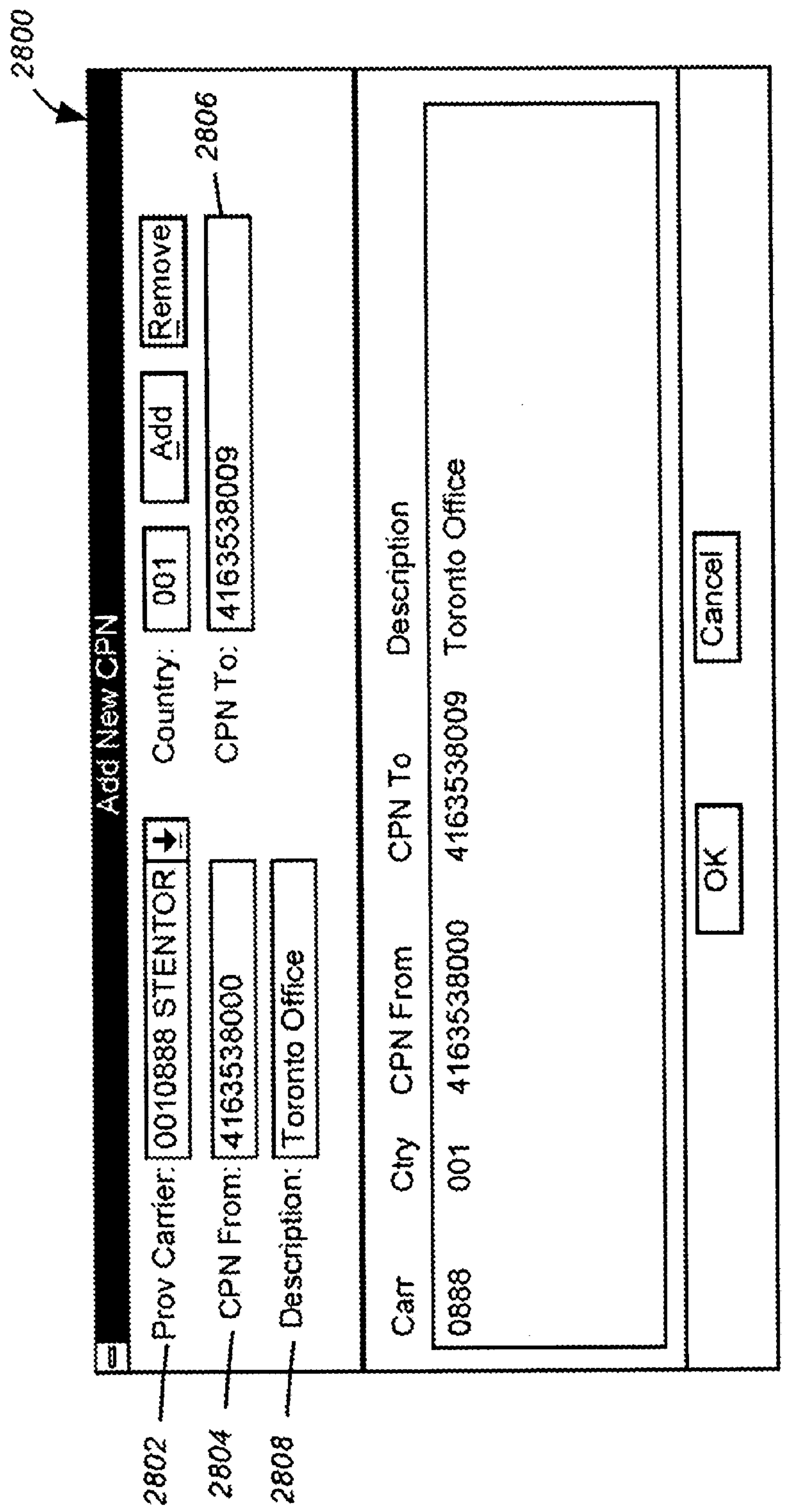
Figure 29F:
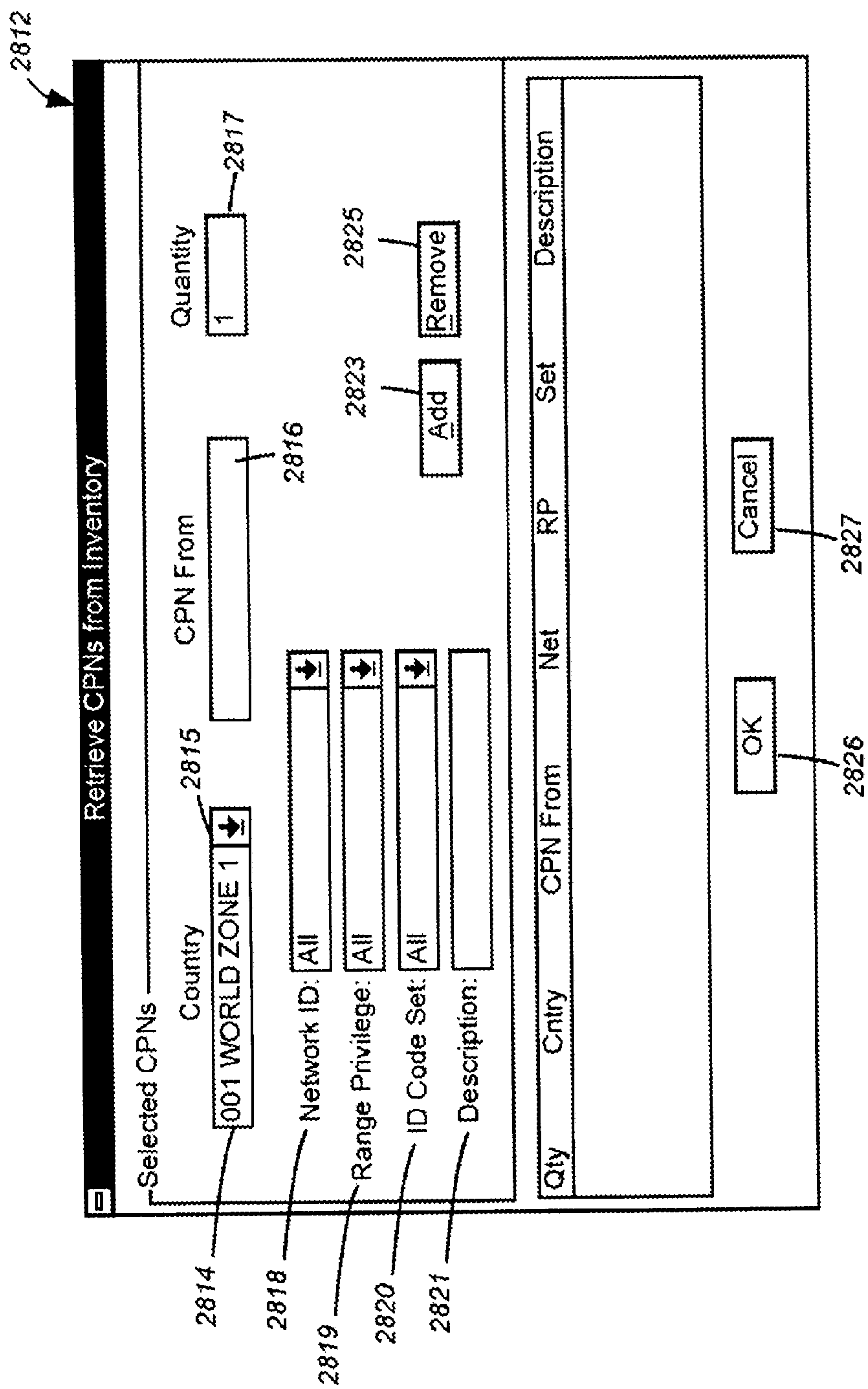
Figure 29G:
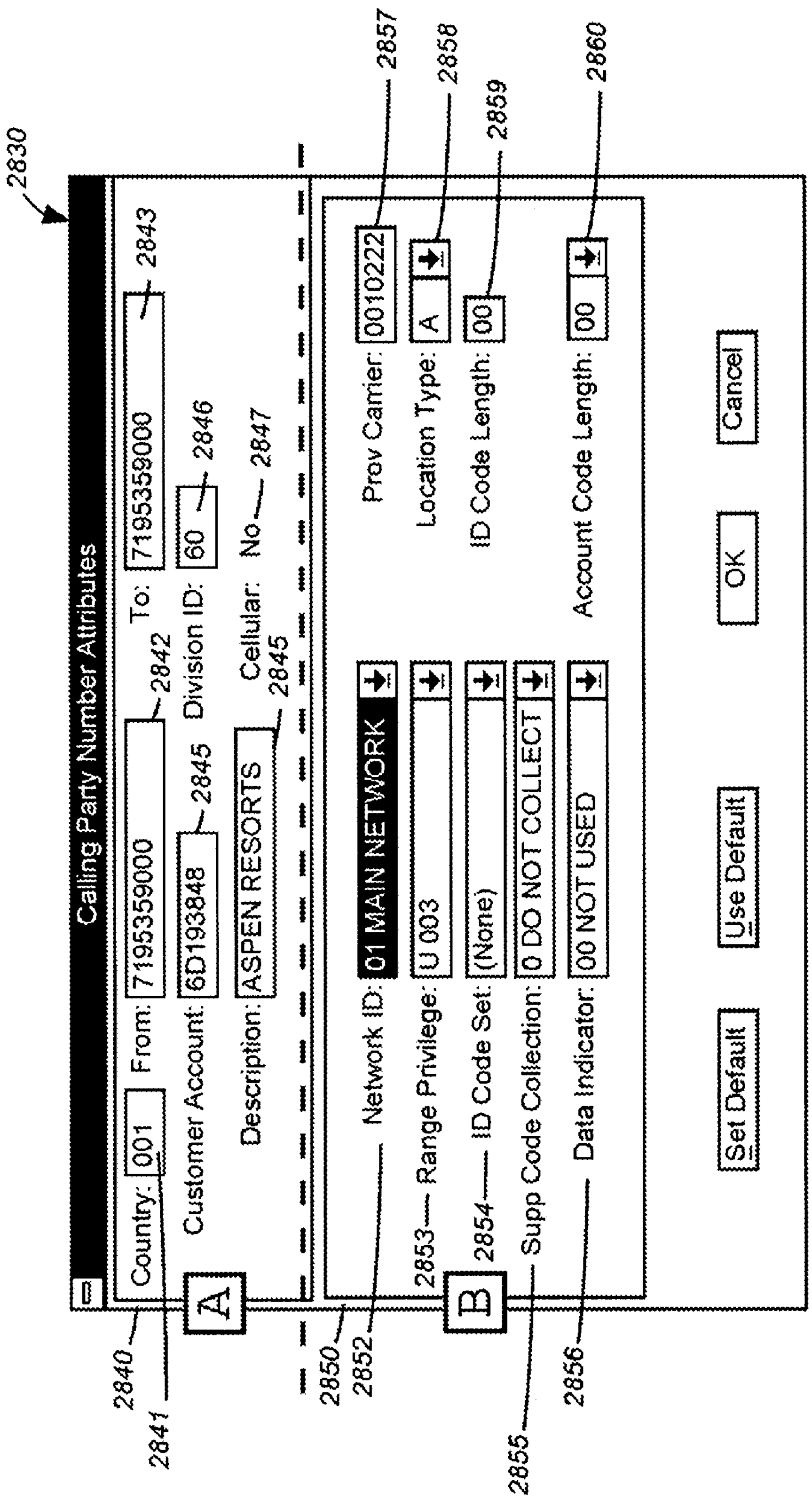
Figure 29H:
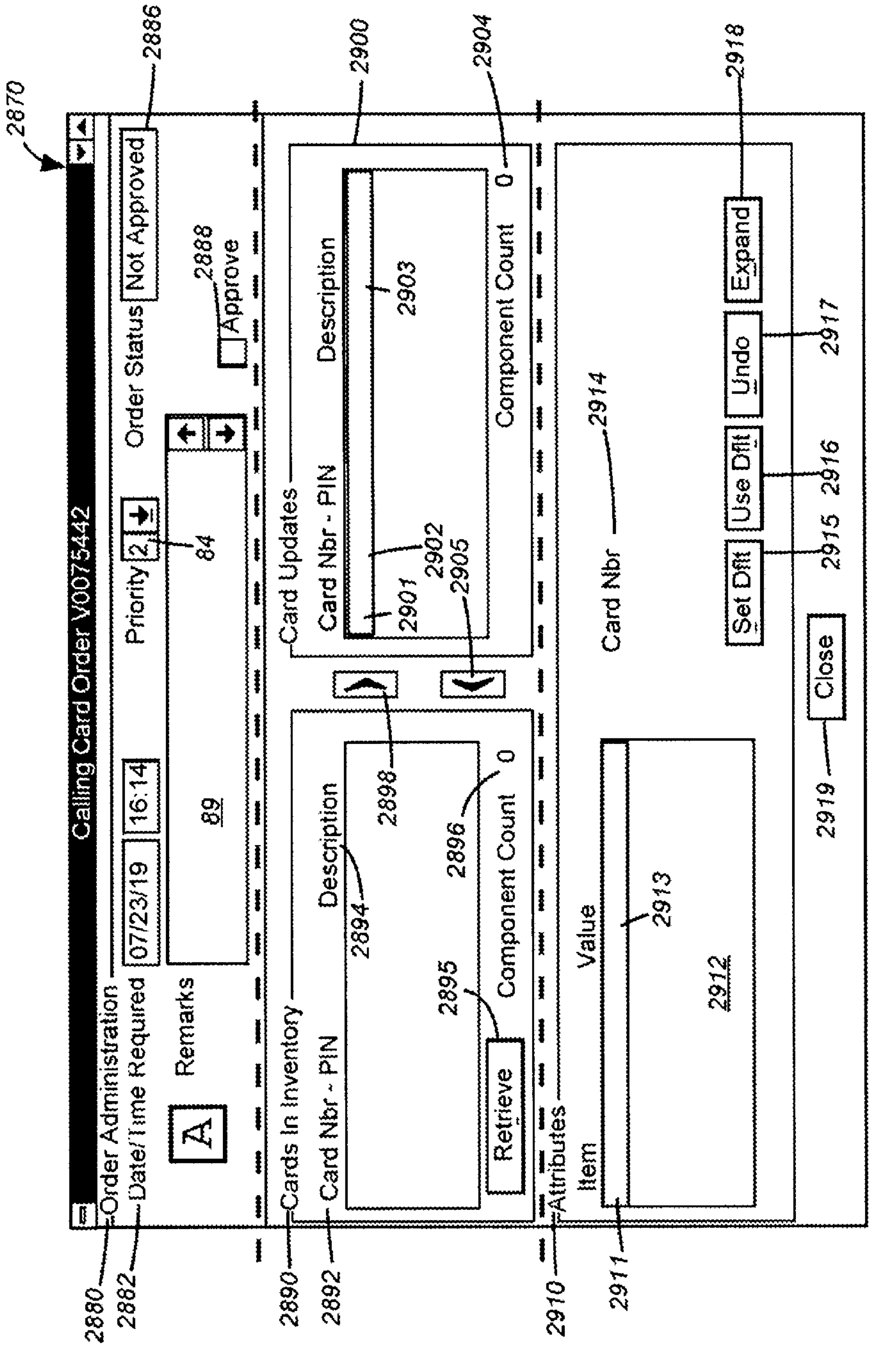
Figure 29I:
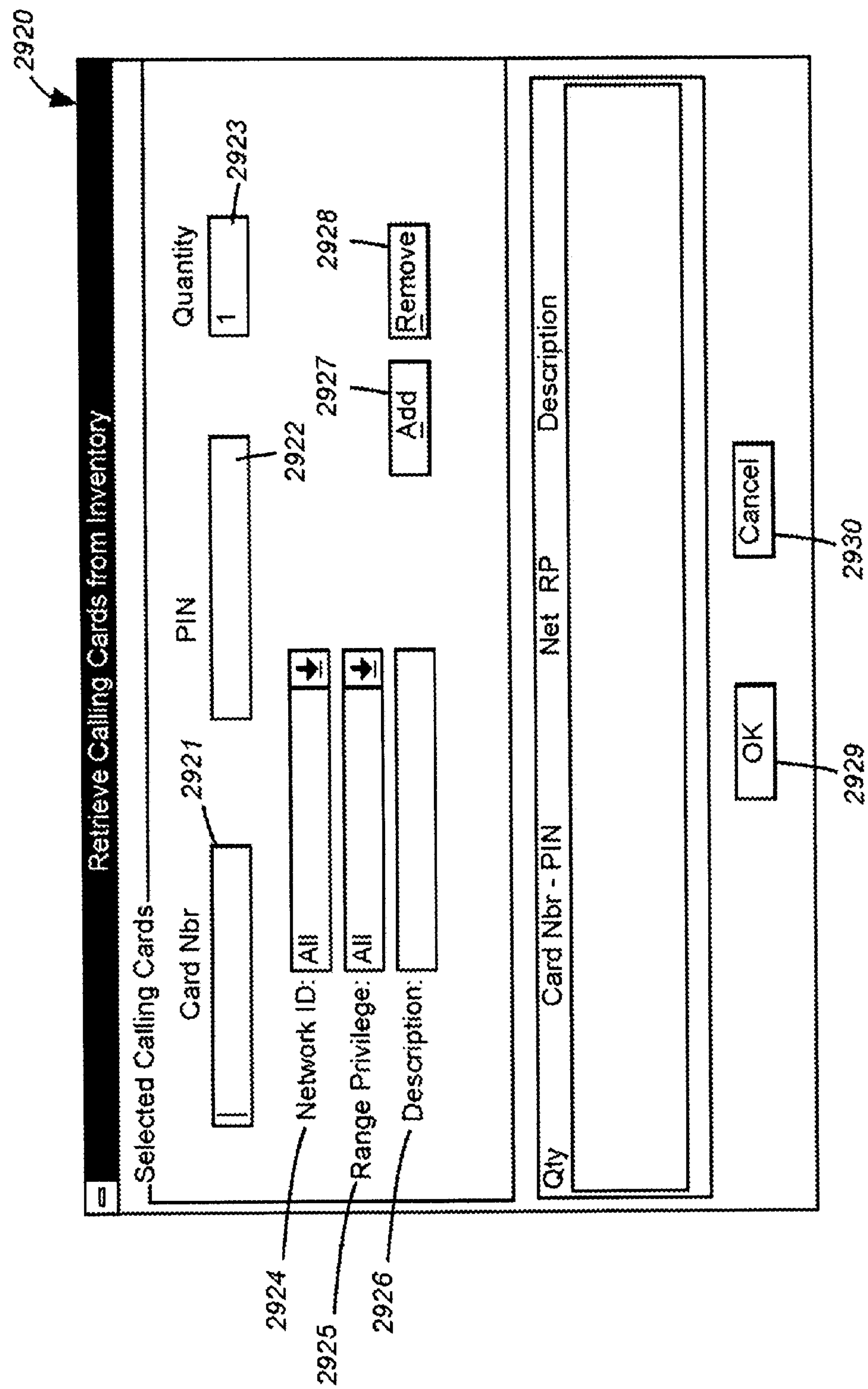
Figure 29J:
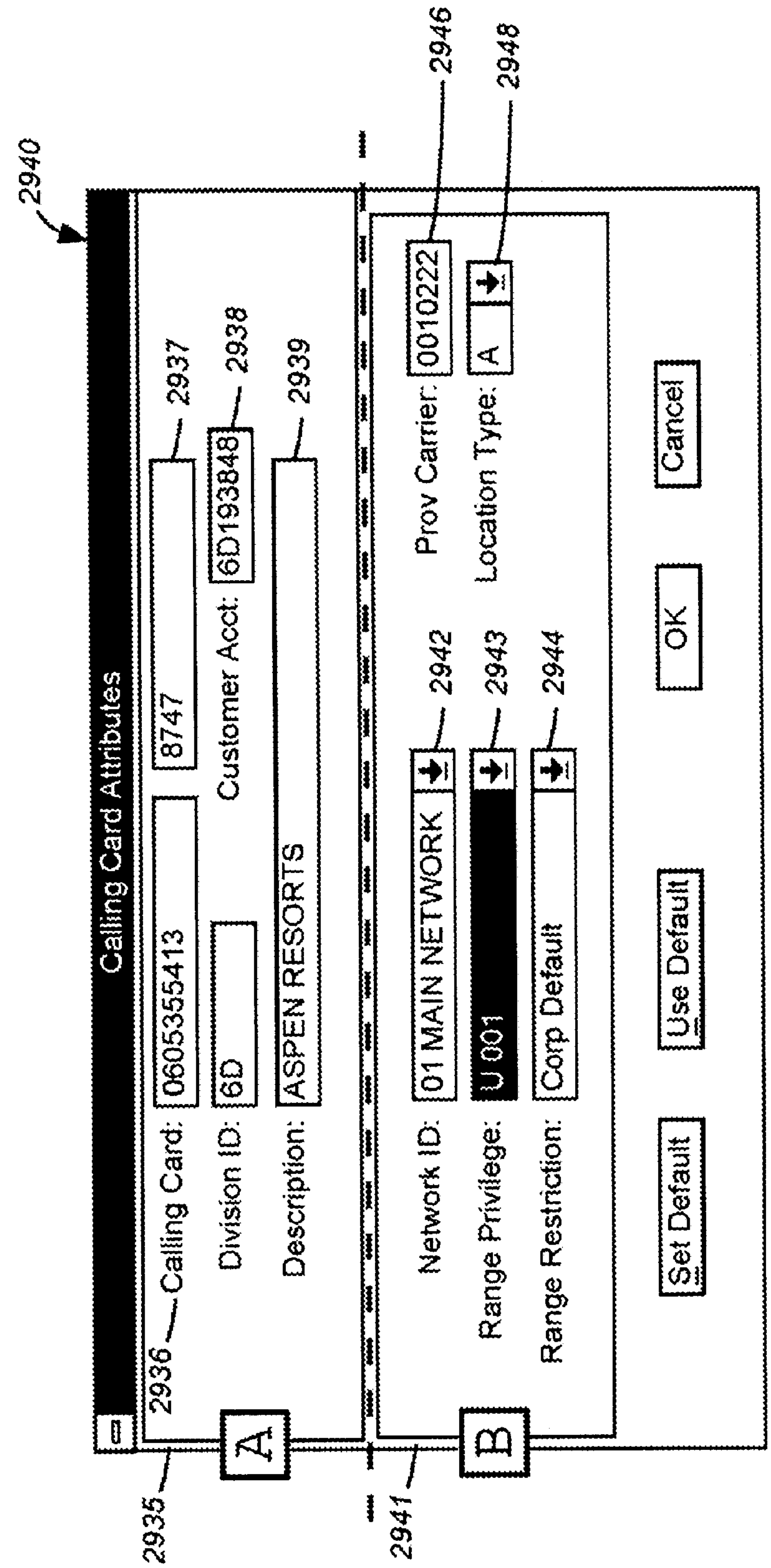
Figure 29K:
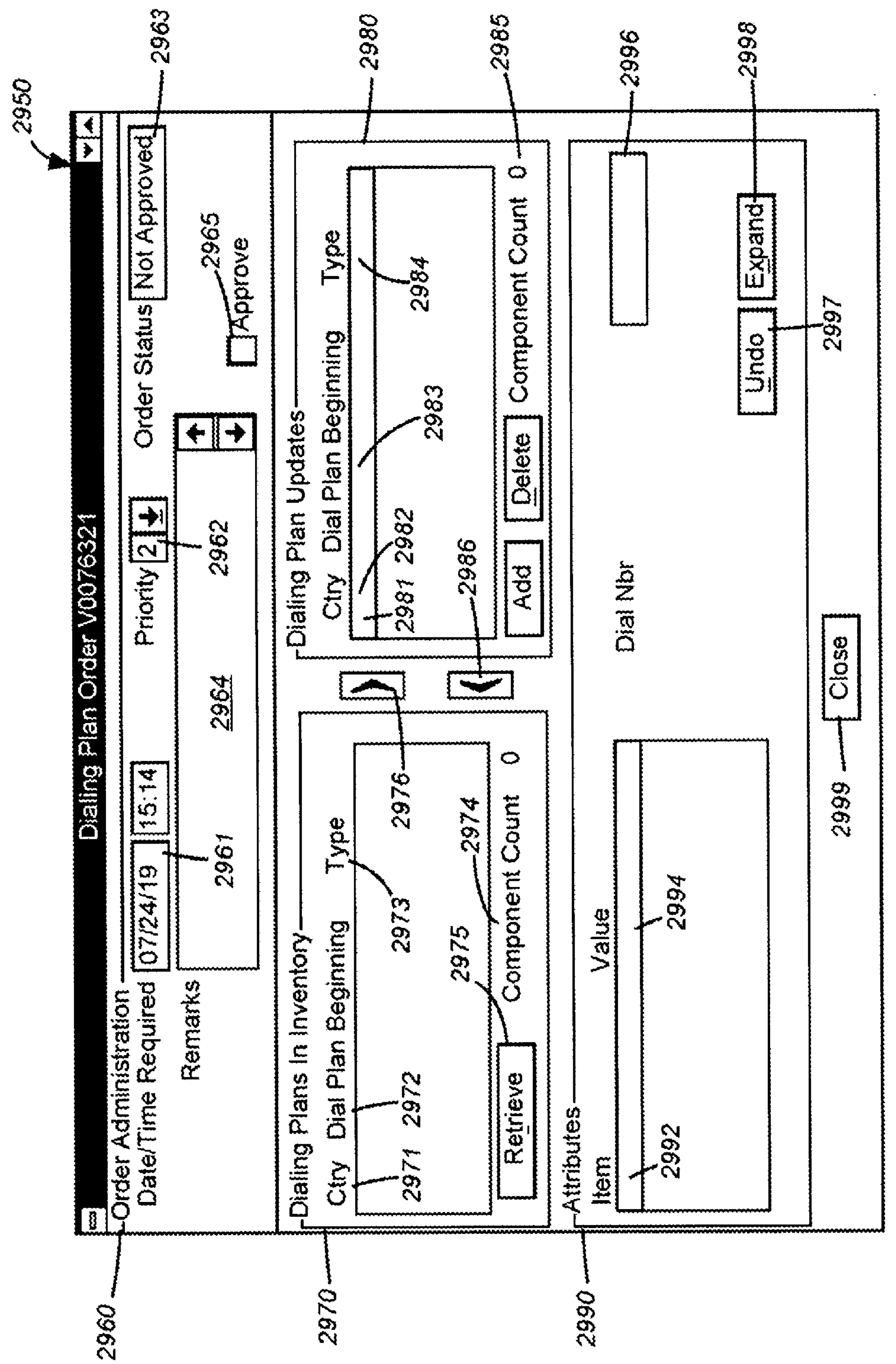
Figure 29I:
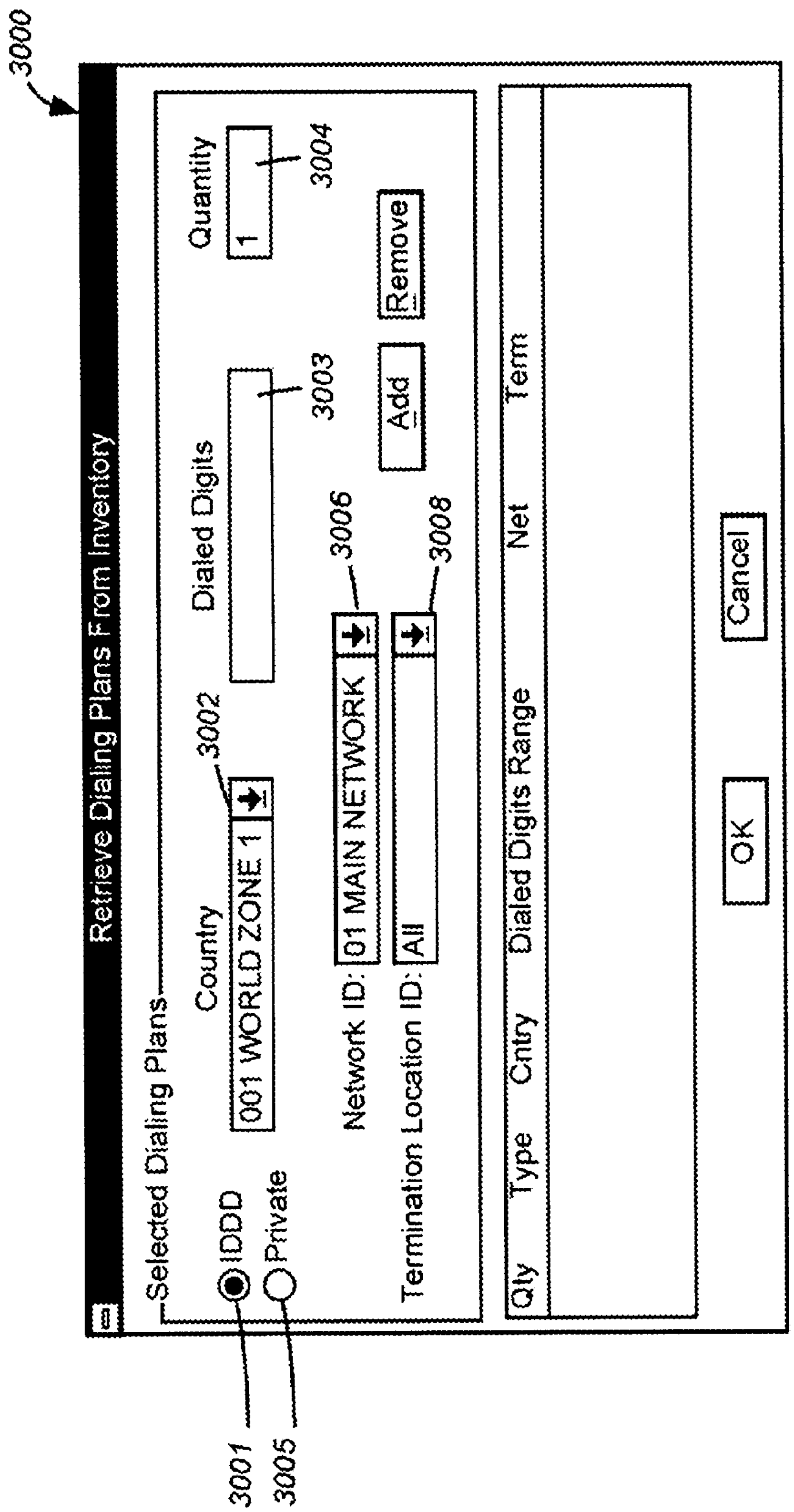
Figure 29M:
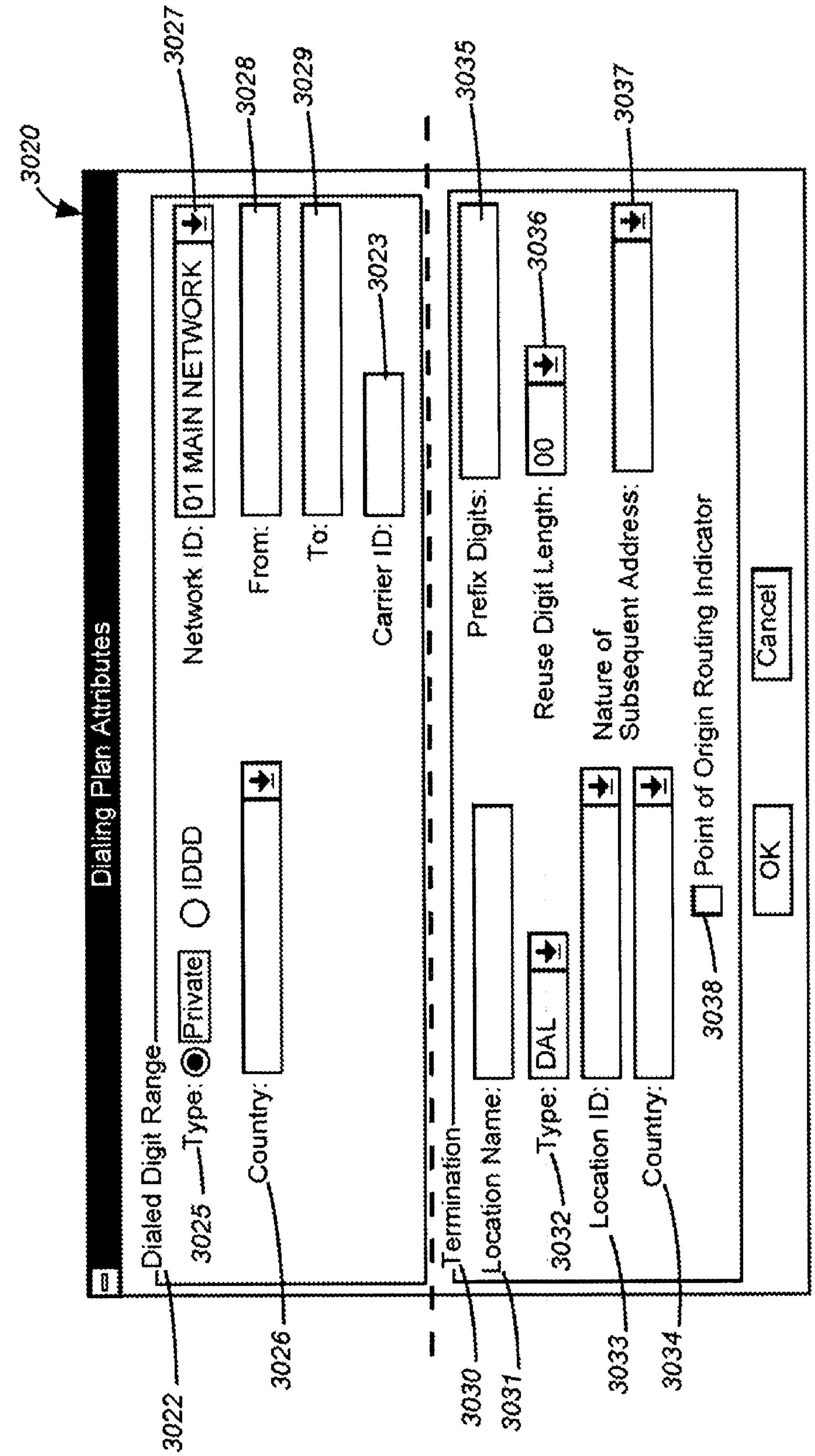
Figure 29N:
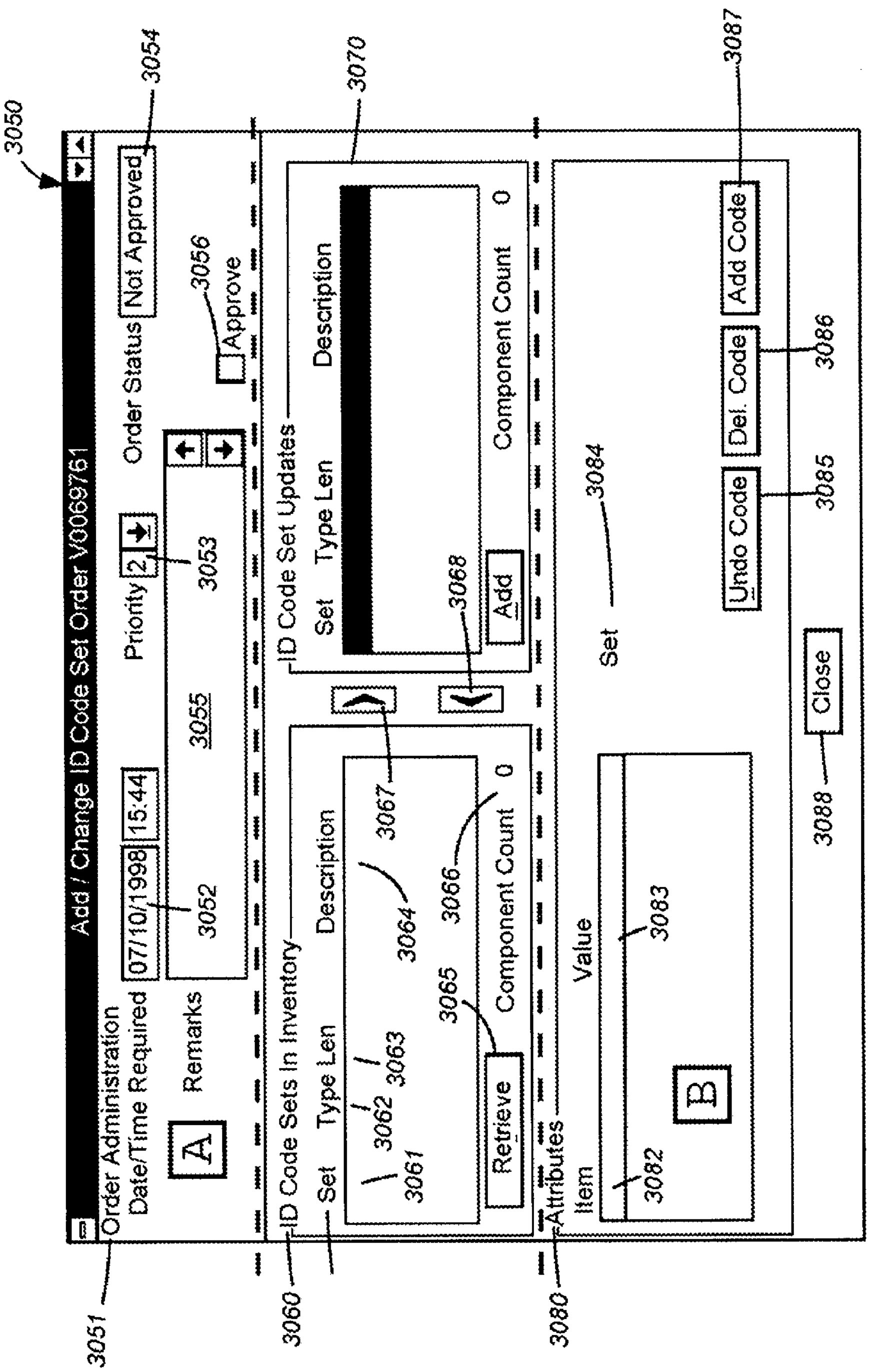
Figure 29O:
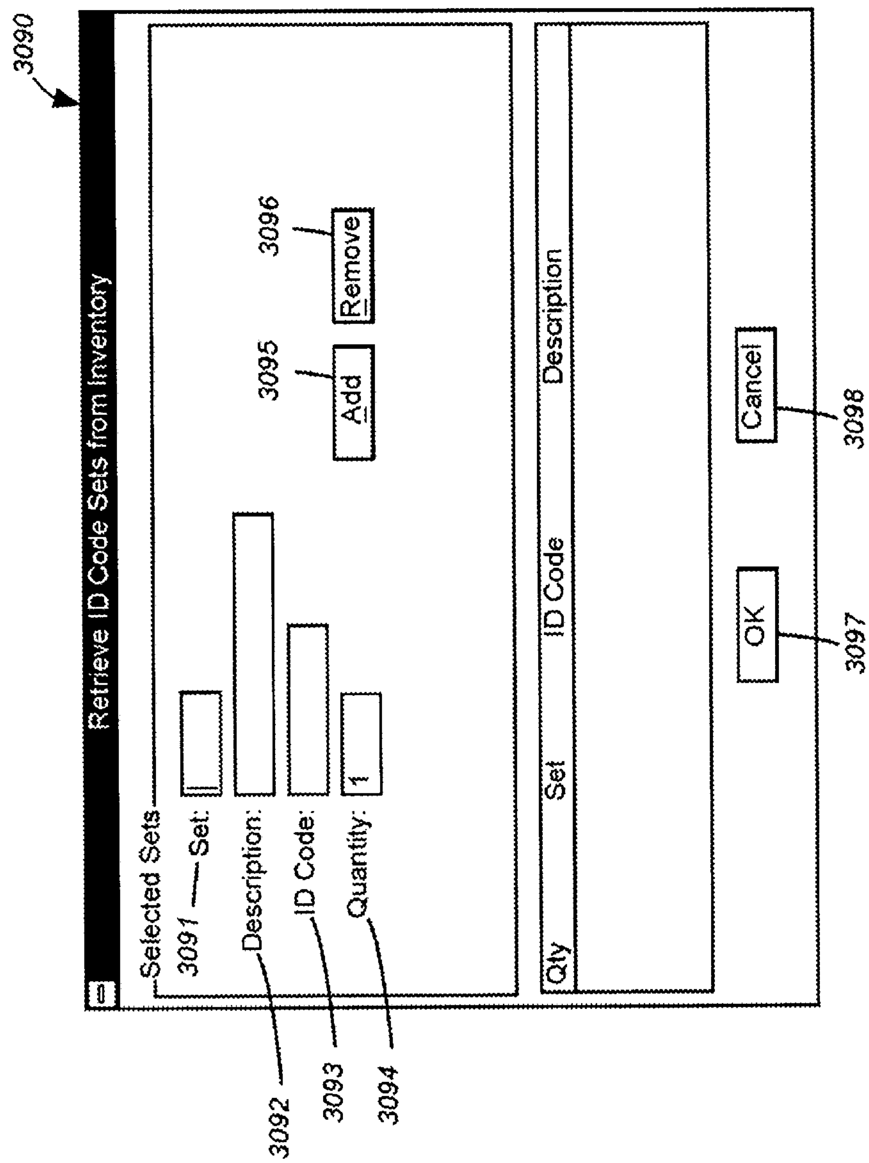
Figure 29P:
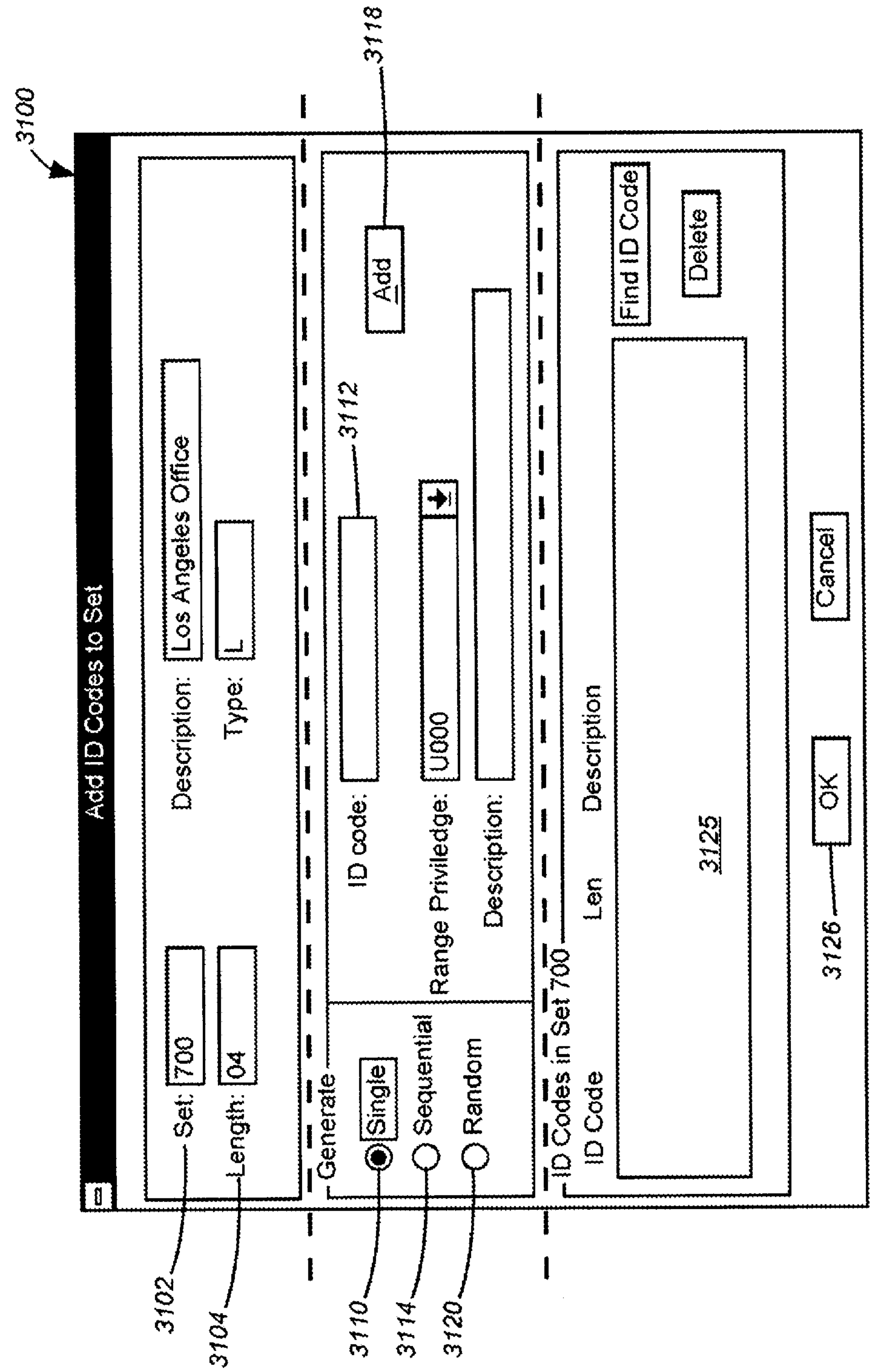

As shown in FIG. 28, the ONM tool 2700 of the invention implements an ONM domain server 2750 integrated with a back-end MCI intranet and legacy system infrastructure comprising above-described MCI's NetCap order entry system 290, Service Control Manager 290*a* ("SCM") and Data Access Points 290*b* ("DAP"). The ONM server 2750 enables customers to change their Vnet/Vision network management plans, both in real-time and on a scheduled basis, via nMCI Interact's web-based front-end and middle-tier infrastructure. Particularly, customer order directives are entered by the customer 20 via an ONM graphic user interface. These directives are preferably communicated as Java applets over secure HTTPS socket connections 2722, 2724 for input over the firewall 25(*a*) to at least one secure server, e.g., a DMZ Web server 24 that provides for authentication, validation, and session management in the manner as herein described. After validation and authentication, the DMZ Web server 24, in turn, re-encrypts messages and dispatches them to the Dispatcher 26 server over TCP/IP connection 2734. The Dispatcher server may implement an ONM proxy 2735 which properly receives ONM order messages from the web server, and translates them into a format suitable for transmission over another TCP/IP connection 2736 to the ONM domain server 2750. As will be described, the ONM domain server 2750 interfaces with the "NetCap" 290 mainframe system that provides user interface to the network control system, i.e., DAP switches 290*b* (FIG. 6). The ONM domain server 2750 may include Java object classes whose methods are invoked by Java applets running on the customer browser. The browser Java applets specifically execute the customer directives by invoking certain methods on the ONM Domain server 2750. These Java objects additionally provide the interface functions to the NetCap 290. In the preferred embodiment, the Java objects at the ONM domain server function as the ONM proxy, and are invoked remotely implementing a Java remote method invocation "RMI"-like methodology.

Particularly, as described herein with respect to FIG. 2, within the networkMCI Interact framework for producing Java applications over the Internet, there is provided common objects and an infrastructure allowing secure communications between a client (which resides on a browser) and a server (which resides safely within MCI's firewalls). As described, the security strategy includes: encrypting communication from the client to the web-server via SSL (HTTPS) and implementing HTTPS as the preferred method for allowing communication into the web server from the Internet; providing an additional firewall between the web-server and the dispatcher to allow only specific traffic from the web server to the dispatcher to occur; encrypting traffic between the web server and the dispatcher via DSA encryption; and enabling the dispatcher to validate all packets destined to internal MCI servers to ensure that they are from an authenticated client, and that a particular client has permission to communicate with a specific back-end server. To make this seamless for the client, the set of Common Objects performs this messaging. In the preferred embodiment, a "CORMI" (Common Objects RMI) which provides an RMI-like interface between the client and the server using the networkMCI Interact protocol is implemented. The CORMI procedures implemented have additional controls built in to provide the necessary session security and maintenance for communication over the firewalls.

After customer logon, authentication and entitlement determination, a networkMCI Interact applet is downloaded to the customers Web Browser via the established TCP/IP connection, and the browser presents the customer with the networkMCI Interact systems home page including a Network Manager icon 89 (FIG. 5(*a*)). Selection of this icon, enables a client ONM application to be downloaded to the customer who is then presented with the ONM screen, as indicated at step 318.

An exemplary ONM web-page display 2764 is shown in FIG. 29(*a*) which presents a variety of ONM menu options including: 1) a File menu option 2702 providing a selection 2704 for creating a new order, a selection 2706 for opening an existing order, a selection 2708 for displaying events, and a selection 2710 for enabling 3270 cut through to a Vnet/Vision configuration management system; 2) an Edit menu 2715 providing options for deleting an ONM order or, enabling a search for specific components, e.g., within an Order detail and Inventory windows pertaining to a Calling Party Number ("CPN"), Calling Card, Dialing Plan, and ID Code/Set, such as will be described; 3) a Control menu 2720 providing a refresh option to enable a user to retrieve a list of all updated lists that have been altered on the host system including: Network IDs, Range Privileges, ID Code Set, Billing location ID, Customer Service ID, Location/Access type and Provisioning Carrier; and 4) a Report menu 2723 providing options enabling a customer to inquire on his/her inventory of CPNs, Calling Cards, Dialing Plans and ID Code Sets.

With more particularity regarding the File menu option 2702, when a user selects the new order menu option 2704, he/she is presented with a drop down menu (not shown) presenting a section of the order types which can be created via their Web Browser, e.g., CPN, Calling Card, Dialing Plan, and ID Code Set. When the user selects the open order selection 2706 from the drop down menu of FIG. 29(*a*), the user is presented with a web page 2725 displaying a request order window where the user may enter search criteria from which a user may select orders, or, choose all orders. As shown in FIG. 29(*b*), the user may enter the following search criteria: an exact order number or partial order number in the "order match" field 2730; an order type, e.g., Calling Card, CPN, Dialing Plan, ID Code Set, or all, from a drop down list presented by "order type" drop down menu 2732; a starting date or current default date in the "starting date" field 2737; a user ID or default current user ID from the "user ID" field 2739; and, a set of order status check boxes 2740 which enables the user to choose an order status, e.g., not approved, approved, complete, and error/rejected.

When multiple orders are retrieved, as a result of an entered search criteria, a web page 2744 presenting an "Orders" window will appear such as shown in FIG. 29(*c*). From the Order detail window, an order may be selected, e.g., by double clicking an order summary line 2743. The field descriptions for an order displayed in the orders window include: an order Number 2745 which is a unique number assigned to the order for identification; a currently logged-on user ID 2746; the current order status 2747; the order type 2748, e.g., ID Code, as depicted in FIG. 29(*c*); the date the order was prepared 2751, and the effective date/time 2752 when the order will be implemented in the network by the host. The details of an order may be retrieved by highlighting the order summary line 2743 and pressing the details button 275453 or, by double-clicking the order summary line 2743. It should be understood that the user may retrieve a web page having an Order window by either selection of a New Order, from FIG. 29(*a*), or, selection from the Open Orders Window, when retrieving existing order(s).

Selection of a new or existing CPN Order option via the nMCI Interact ONM system allows a customer to "link" or attach network features to any Calling Party Number (CPN) that exists in that customer's inventory, i.e., CPNs that are active in that customer's database. Preferably, the following features can be defined/linked to CPNs: 1) Multiple Networks; 2) Supplemental Codes including ID Codes and Accounting Codes; 3) Range Privileges including Universal and Customized; 4) Data vs. Voice Specification; and Extended Enterprise (Location/Access Type).

FIG. 29(*d*) illustrates a web page 2755 comprising a CPN order window comprising the following sections: an order administration section 2760 for handling administrative aspects of the CPN order; a CPN inventory section 2770 used to retrieve CPNs from inventory that are not included on another order. This is accomplished by selection of the retrieve button 2775 and enables display of, inter alia, the CPNs and associated PINs, a description assigned to the CPN, and a component count; a CPN updates section 480 which populates the CPN order window by moving selected calling cards from the cards in inventory section or by adding new calling cards to the current order; and, an attributes section 2790 for populating an area of the web page screen display 2755 with a list of attributes, or features, for a selected CPN in the inventory or updates section.

With more particularity, the CPN order administration section 2760 of web page display 2755 comprises the following field descriptions: 1) a field 2762 enabling a customer to set the date/time when the order is to be implemented by the host. For example, a default time is the current PC date and time, shown in the format of MM/DD/YYYY HH:MM (24 hour clock); 2) a field 2764 enabling the establishment of a priority (depending on security access privileges); 3) a field 2766 for describing the order's current status. For example, new CPN orders default to "not approved"; 4) a Remarks text field 2767 optionally used to describe the contents of the CPN order; and, 5) an Approve field 2768 such that when checked, indicates the order is approved and transmitted to the host. After transmission, the field name changes to Approved and the Order Status field displays Approved. It should be understood that, if authorized, a customer may unapprove an approved order that has not completed by reselecting the Approved check box. A pop-up message (not shown) in the web display will prompt the customer to confirm the action.

With more particularity, the CPN inventory section 2770 used to retrieve CPNs from CPN order inventory comprises the following field/command button descriptions: a CTRY field 2772 including a three-digit country code for the CPN; a CPN Beginning field 2774 comprising the remaining digits of the CPN or the beginning number within a range; a Description field 2776 comprising an alphanumeric description assigned to the CPN, e.g., the CPN location or company name; a Component Count field 2778 indicating how many CPNs are within the CPNs in Inventory section; a Retrieve button 2775 such that, when selected, retrieves a list of a customer's available CPNs in inventory that are not included in other orders. Selection of this option will enable a web page display of a Retrieve CPNs from Inventory Window 2812 such as shown in FIG. 29(*f*); and, a right arrow ">" command button 2779 enabling a customer to move single or multiple (selected) CPNs from the CPNs in inventory section to the CPN Updates to include in the current order.

With more particularity, the CPN updates section 2780 comprises the following field/command button descriptions: a status code indication field 2781 displayed next to a CPN, with the following designations: a (blank) indication meaning no status; an "A" indicating that a new CPN is being added, e.g., Stentor customers; a "C" displayed next to CPNs that have been changed; and a "D" indicating that a CPN has been marked for deletion; a CTRY field 2782; a CPN Beginning field 2783; a Description field 2784; and, a Component Count field 2787 as described above; a left arrow "<" command button 2788 enabling a customer to remove a CPN from the current order, and to restore its attributes back to those that were last transmitted to the host, i.e., move one or more highlighted CPNs to the CPNs in Inventory section; an "Add" command button 2785, e.g., displayed for Stentor customers, which presents a web page having an Add New CPN window such as shown in FIG. 29(*c*); and, a "Delete" command button 2786, e.g., displayed for Stentor customers marks the highlighted CPN displayed in the CPN Updates section for deletion.

With more particularity, the CPN attributes section 2790 comprises the following field/command button descriptions: an "Item" field 2792 comprising those Vnet/Vision feature items that are listed in this column once linked to CPN(s), e.g., Range Privilege, ID Code Set, etc.; a "Value" field 2793 which comprises the defined value of the network features (e.g., U 001) linked to CPN(s); a "CPN Nbr" field 2794 which designates the information displayed in the Attributes section is for the selected CPN, which can be either in the CPNs In Inventory or CPN Updates sections; a "Variable" field 2795 which changes according to the item selected in the Attributes section and enables customers to add/change information for the selected item, except when any prepopulated information is dimmed; a <Set Dflt> button 2796 which enables a customer to define the PC default for CPN attributes. Once set, the PC default values can be applied to other CPNs by selecting the <Use Dflt> button 2797 which command provides the option of applying either the host default or the user-defined PC default attributes for the selected CPN. For example, if the Location Type of the current CPN is "C", default attributes that would change it to "A" or "B" cannot be applied. On the other hand, if Location Type "C" was established as a default with <Set Dflt>, a pop-up message will prompt the user to confirm using it as a default when you select <Use Dflt>; an <Undo> button 2798 for removing any changes made to the selected CPN, and restoring its attributes back to those that were last transmitted to the host, an <Expand> button 2799 enabling the display of the Calling Party Number Attributes window, such as shown in FIG. 29(*g*); and a <Close> button 2791 for closing the CPN Order window.

The Add New CPN window 2800 such as shown in FIG. 29(*e*) enables a customer, if authorized, to add a new CPN to their inventory and assign it attributes. In the example web page display shown in FIG. 29(*e*), the Add new CPN functionality includes: assigning a provisioning carrier in entry field 2802; adding a CPN-From number in entry field 2804; adding a CPN-To number in entry field 2806; and, adding a CPN description in entry field 2808. Preferably, the added CPN(s) are displayed in the CPN Updates section 2780 with the "A" indication 2781 as shown in FIG. 29(*d*).

It should be understood that CPN orders may be deleted by selecting the delete button 2786 (FIG. 29(*d*)).

As mentioned above, selection of the CPN Retrieve button 2775 enables a web page display of a Retrieve CPNs from Inventory Window 2812 such as shown in the example web page display of FIG. 29(*f*). From this window, a customer may specify search criteria or retrieve a predetermined amount of CPNs having defaulted criteria. Particularly, the Retrieve CPNs from Inventory Window 2812 comprises the following field/command button descriptions for retrieving CPNs from customer inventory: a country field 2814 for a country code from a drop-down list by selecting a "down" arrow 2815 when specifying a CPN in the CPN From field; a CPN From field 2816 enabling a customer to enter a partial or whole CPN, e.g., from 3–25 numeric characters. The nMCI Interact ONM system matches the partial CPN and retrieves the first 10 exchanges available in inventory; a Quantity field 2817 enabling a customer to enter a value, from 1 to 200 per CPN group, specifying the quantity of CPNs to include in the retrieval; a Network ID field 2818 enabling a customer to select a specific Network ID from the drop-down list by selecting the down arrow; a Range Privilege field 2819 enabling a customer to select a specific Range Privilege from the drop-down list by selecting the down arrow; an ID Code Set field 2820 enabling a customer to select a specific ID Code Set number from the drop-down list by selecting the down arrow. It should be understood that ID Code Sets must be defined prior to creating the CPN Order, as will be described herein; a Description field 2821 enabling a customer to type a full or partial CPN description as retrieval criteria; an <Add> button 2823 for updating the list box with the group information from the Country, CPN From, Quantity, Network ID, Range Privilege, ID Code Set and Description edit boxes; a <Remove> button 2825 enabling a customer to remove a highlighted display item so that it is not included in the retrieval request; an <OK> button 2826 for accepting all entries in the Retrieve CPNs from Inventory window, and messaging the host. If nMCI Interact ONM finds one or more CPNS that matches specified search criteria, it will close the Retrieve CPNs from Inventory window. If the Retrieve CPNs from Inventory window is accessed from the CPN Order window, the results are displayed in the CPNs in Inventory section and replaces any CPNs that may have been in this section prior to retrieval; and, a <Cancel> button 2827 for closing the Retrieve CPNs from Inventory window without accepting any changes.

As mentioned above, selection of the CPN attributes <Expand> button 2799 (FIG. 29(*d*)) enables a web page display of a Calling Party Number Attributes window 2830, such as shown in the example web page display of FIG. 29(*g*). From this window, a customer may "view only" CPN attributes or features, if the selected CPN is located in the CPNs in Inventory section of the CPN order window, or, view or modify attributes if the selected CPN is in the CPN Updates section.

As shown in the example web page display of FIG. 29(*g*), a first section referred to as the CPN information section 2840 comprises view only fields presenting information such as: a three digit country code field 2841 which identifies the country of origin for this CPN; a "From" field 542 indicating the beginning number of a possible range of CPNs affected by this CPN Order; a "To" field 2843 indicating the last number of a range of numbers affected by this CPN Order; a Customer Account field 2844; a Division ID field 2845; a Description field 2846 describing the CPN(s); and, a yes or no Cellular field 2847 indicating whether this CPN originates from a cellular phone. Additionally, a second section referred to as the CPN feature information section 2850 comprises the following field/command buttons including: a Network ID field 552 obtained from the drop-down list by selecting the down arrow; a Range Privilege field 2853 for selecting the Range Privilege (customized or universal) to be linked to this Calling Card from the drop-down list by selecting the down arrow; an ID Code Set field 2854 for selecting an ID Code Set to be associated with this CPN from the drop-down list by selecting the down arrow. When an ID Code Set is chosen, nMCI Interact ONM automatically populates the ID Code Length; a Supp Code Collection field 2855 enabling selection from the drop down list to indicate when ID and/or accounting codes will be collected for this CPN. A tone will prompt callers to enter code(s) after the dialed number. Selections include: 0—Do not collect Supplemental Codes; 1—Collect Supplemental Codes for all numbers; 2—Collect Supplemental Codes on all calls except 7-digit Private On-Net Numbers; 3—Collect Supplemental Codes only for international Off-Net numbers; 4—Collect Supplemental Codes for all Off-Net numbers; a Data Indicator field 2856 enabling a user to denote data versus voice traffic by selecting from the drop-down list; a Prov Carrier 2857 indicating the provisioning carrier (MCI or Stentor) associated with the CPN, in the format of Country Code, padded to three digits with leading zeros, and the 4-digit Carrier Code; a Location Type field 2858 which may be selected by clicking on the down arrow to activate the drop down list; an ID Code Length field 2859 which is autopopulated with a 2-digit number according to the ID Code Set selected; an Account Code Length field 2860; and, <Set Default>, <Use Default>, <OK> and <Cancel> option buttons, as described herein.

When opening an existing Calling card order, the nMCI Interact ONM system Calling Card Order option allows a customer to "link" or attach network features to a Calling Card(s) that exist in that customer's inventory, i.e., Calling Cards that are active in that customer's database, or link network features to a new calling card. The following features can be defined/linked to Calling Cards: 1) Multiple Networks; 2) Range Privileges including Universal and Customized; Range Restrictions including Corporate and Custom; and Extended Enterprise (Location/Access Type).

FIG. 29(*h*) illustrates an example web page 2870 comprising a Calling Card order window comprising the following sections: 1) an order administration section 2880 for providing administrative aspects of the Calling Card order such as: enabling entry of a date/time when the order is to be implemented by the host; selecting a priority based on the user's security access privilege; establishing an order status, e.g., approved or not approved for new orders in accordance with a users authorization; 2) a Cards in Inventory Section 2890 used to retrieve Calling Cards from inventory that are not included on another order. This is accomplished by selection of the retrieve button 2895 and enables display of, inter alia, the Calling card numbers and associated PINs, a description assigned to the calling card, and a component count; 3) a Card updates section 2900 which populates the calling card order window by moving selected calling cards from the cards in inventory section or by adding new calling cards to the current order; and, 4) an attributes section 2910 for populating an area 2912 of the screen display with a list of attributes, or features, for a selected calling card in the inventory or updates section.

With more particularity, the Calling Card order administration section 2880 of web page display 2870 comprises the same field descriptions as mentioned herein with respect to the CPN order administration including: 1) a set date/time field 2882 for when the calling card order is to be implemented by the host; 2) a priority field 2884 for establishing calling card order priority (depending on security access privileges); 3) a current order status field 2886; 4) a Remarks text field 2889 optionally used to describe the contents of the Calling card order; and, 5) an Approve field 2888 such that when checked, indicates the order is approved and transmitted to the host.

The Calling Card inventory section 2890 used to retrieve a Calling Card(s) from the Calling Card inventory comprises the following field/command button descriptions: a Card Nbr-PIN field 2892 that displays the Calling Card number and associated PIN if the user has security access to view the PINS; a Description field 2894 which comprises a description assigned to the Calling Card, e.g., the employee or company name; a Component Count field 2896 indicating how many Calling Cards are within the Calling Cards Inventory section; a Retrieve button 2895 such that, when selected, retrieves a list of a customer's available Calling cards in inventory that are not included in other orders. Selection of this option enables a web page display of a Retrieve Calling Cards from Inventory Window 2920 such as shown in FIG. 29(*i*); and, a right arrow ">" command button 2898 enabling a customer to move single or multiple (selected) Calling Cards from the Calling Cards in inventory section to the Calling card Updates to include on the current order.

The Calling card updates section 2900 comprises the same field/command button descriptions as mentioned herein with respect to the CPN order administration including: a status code indication 2901 displayed next to a Calling card having the same designations, i.e., no status, "A", "C", and "D"; a Card Nbr-PIN field 2902, a Description field 2903 and, a Component Count field 2904 as described above; a left arrow "<" command button 2905 enabling a customer to remove a Calling card from the current order, and to restore its attributes back to those that were last transmitted to the host, i.e., move one or more highlighted Calling cards to the Calling cards in Inventory section; an "Add" command button, e.g., only displayed for Stentor customers; and, a "Delete" command button.

The Calling Card attributes section 2910 comprises the same field/command button descriptions as mentioned herein with respect to the CPN order administration including: a table 2912 including an item field 2911 comprising those Vnet/Vision feature items that are listed in this column once linked to Calling cards, e.g., Range Privilege, Location type, etc.; a "Value" field 2913; a "Card Nbr" field 2914 which designates the information displayed in the Attributes section is for the selected Calling card, which can be either in the Calling card In Inventory or Calling cards Updates sections; a <Set Dflt> button 2915 which enables a customer to define the PC default for Calling card attributes. Once set, the PC default values can be applied to other Calling cards by selecting the <Use Dflt> button 2916 which command provides the option of applying either the host default or the user-defined PC default attributes for the selected Calling card; an <Undo> button 2917; an <Expand> button 2918 enabling the display of the Calling Card Attributes window, such as shown in FIG. 29(*j*); and a <Close> button 2919 for closing the Calling card Order window.

As mentioned above, selection of the Calling card "Retrieve" button 2895 in FIG. 29(*h*) enables a web page display of a Retrieve Calling cards from Inventory Window 2920 such as shown in the example web page of FIG. 29(*i*). From this web page, a customer may specify search criteria or retrieve a predetermined amount of Calling cards having defaulted criteria. Particularly, the Retrieve Calling cards from Inventory Window 2920 comprises the following field/command button descriptions for retrieving Calling cards from customer inventory: a Card Nbr field 2921 enabling entry of a partial or whole 10-digit calling card number; a PIN field 2922 enabling entry of an optional 4-digit personal identification number that is associated with the Calling Card number and can only be used in combination with Card Nbr; a Quantity field 2923 enabling a customer to enter a value, from 1 to 200 per Calling card group, specifying the quantity of Calling cards to include in the retrieval; a Network ID field 2924; a Range Privilege field 2925 enabling a customer to select a specific Range Privilege from the drop-down list by selecting the down arrow; a Description field 2926 enabling a customer to type a full or partial Calling card description as retrieval criteria; an <Add> button 2927 for updating the list box with the group information from the Card Nbr, PIN, Quantity Network ID, Range Privilege, and Description edit boxes; a <Remove> button 2928 enabling a customer to remove a highlighted display item so that it is not included in the retrieval request; an <OK> button 2929 for accepting all entries in the Retrieve Calling cards from Inventory window, and messaging the host; and, a <Cancel> button 2930 for closing the Retrieve Calling cards from Inventory window without accepting any changes.

As mentioned above, selection of the Calling card <Expand> button 2918 (FIG. 29(*h*)) from the calling card attributes section enables a web page display of a Calling card Attributes window 2940, such as shown in FIG. 29(*j*). From this window, a customer may "view only" calling card attributes or features, if the selected calling card is located in the Cards in Inventory section of the calling card order window, or, view or modify attributes if the selected calling card is in the Card Updates section. As shown in the web page display of FIG. 29(*j*), a first section referred to as the calling card information section 2935 comprises view only fields presenting information such as: the Calling Card Number 2936 and the associated PIN 2937; the Customer Account number 2938; and the calling card description 2939 which is user-defined and accessible. Additionally, a second section referred to as the feature information section 2941 comprises the following field/command buttons including: a Network ID field 2942 obtained from the drop-down list by selecting the down arrow; a Range Privilege field 2943 for selecting the Range Privilege (customized or universal) to be linked to the Calling Card from the drop-down list by selecting the down arrow; a Range Restriction field 2944 for selecting a Corporate or Custom Range Restriction to be linked to this Called Card from the drop-down list by selecting the down arrow; a Prov Carrier field 2946 which indicates the provisioning carrier (MCI or Stentor) associated with the Calling Card, in the format of Country Code, padded to three digits with leading zeros, and the 4-digit Carrier Code; a Location Type field 2948 for example, host default, which, once selected, cannot be changed until the Calling Card is deactivated and reinstalled; a <Set Default> button; an <Use Default> button; an <OK> command button for returning to the Calling Card Order window; and a <Cancel> button for exiting the Calling Card Attributes window without making changes to the feature information.

In a similar manner as described above with respect to the Add New CPN web page display (FIG. 29(*e*)), a Stentor customer, if authorized, may add a new Calling Card to their inventory and assign attributes. The Add new Calling Card functionality includes: assigning a card number and associated personal identification number (PIN), adding a provisioning carrier in the format of a country code, and, adding a Calling card description. It should be understood that Calling card orders may be deleted by selecting a delete button.

When opening an existing Dialing Plan order or creating a new one, the nMCI Interact ONM system Dialing Plan Order option allows a company to define their call routing Dialing Plans to meet their business needs and manage their network costs. Thus, the nMCI Interact Outbound NM Dialing Plan order enables a customer to: 1) Create 7-digit Private Numbers that translate to Public Numbers, used for caller convenience and easy association of locations; 2) Force Public Numbers On-Net so that it is no longer routed according to Public Network rules, but rather by the customer's dialing plan; 3) Exclude a specific number, or range of Public Numbers, to control network abuse; assign specific numbers to terminate to Customized Message Announcements to provide user-defined information lines; and, establish "Hotlines" to enhance customer service by providing caller convenience and local presence.

Within a dialing plan order, a user may specify the origination, or dialed digit range (the number dialed), and the termination data (where or how the call is answered, e.g., terminating to Dedicated Access Lines (DALs).

FIG. 29(*k*) illustrates an example web page comprising a Dialing Plan order window 2950 comprising the following sections: 1) an order administration section 2960 for providing administrative aspects of the Dialing Plan order such as: enabling entry of a date/time when the order is to be implemented by the host; selecting a priority based on the user's security access privilege; establishing an order status, e.g., approved or not approved for new orders in accordance with a users authorization; 2) a Dialing Plans in inventory section 2970 used to retrieve Dialing Plans from inventory that are not included on another order. This is accomplished by selection of the retrieve button 2975 and enables display of the country codes associated with the Dialing Plan; display of the dial plan single number or beginning number within a range; a termination type for the dialing plan; and, a component count indicating the amount of dialing plans that are in the inventory section; 3) a Dialing Plan updates section 2980 for populating the dialing plan order window by moving selected dialing plans from the Dialing Plan inventory section or by adding new dialing plans to the current order; and, 4) an attributes section 2990 for populating an area of screen display 2950 with a list of attributes, or features, for a selected dialing plan in the inventory or updates section.

With more particularity, the Dialing Plan order administration section 2960 of example web page display 2950 comprises the same field descriptions as mentioned herein with respect to the CPN order administration including: 1) a set date/time field 2961 for when the dialing plan order is to be implemented by the host; 2) a priority field 2962 for establishing dialing plan order priority (depending on security access privileges); 3) a current order status field 2963; 4) a Remarks text field 2964 optionally used to describe the contents of the Dialing Plan order; and, 5) an Approve field 2965 such that when checked, indicates the order is approved and transmitted to the host.

The Dialing Plans in Inventory section 2970 used to retrieve Dialing Plan(s) from the Dialing Plan inventory comprises the following field/command button descriptions: a Ctry field 2971 that displays the Dialing Plan's country code; a Dial Plan Beginning field 2972 indicating the remaining digits of the Dialing Plan number of beginning number within a range; a type field 2973 indicating the termination type for the dialing plan; a Component Count field 2974 indicating how many Dialing Plans are within the Calling Cards Inventory section; a Retrieve button 2975 such that, when selected, retrieves a list of a customer's available Dialing Plans in inventory that are not included in other orders. Selection of this option will enable a web page display having a Retrieve Dialing Plans from Inventory Window 3000 such as shown in FIG. 29(*l*); and, a right arrow ">" command button 676 enabling a customer to move single or multiple (selected) Dialing Plans from the Dialing Plans in inventory section to the Dialing Plan Updates to include on the current order.

The Dialing Plan updates section 2980 comprises the same field/command button descriptions as mentioned herein with respect to the CPN updates section including: a status code indication 2981 displayed next to a Dialing Plan having the same designations, i.e., no status, "A" (added), "C" (changed), and "D" (deleted); a Ctry field 2982, a Dial Plan Beginning field 2983, a termination "type" field 2984, and, a Component Count field 2985 as described above; a left arrow "<" command button 2986 enabling a customer to remove a Dialing Plan from the current order, and to restore its attributes back to those that were last transmitted to the host, i.e., move one or more highlighted Dialing Plans to the Dialing Plans in Inventory section; an "Add" command button enabling entry of new Dialing Plan record(s); and, a "Delete" command button for deleting Dialing Plan records.

The Dialing Plan attributes section 2990 comprises the same field/command button descriptions as mentioned herein with respect to the CPN attributes section including: an "Item" field 2992, e.g., Network ID; a "Value" field 2994; a "Dial Nbr" field 2996 which designates the information displayed in the Attributes section is for the selected Dialing Plan, which can be either in the Dialing Plans In Inventory or Dialing Plan Updates sections; an <Undo> button 2997; an <Expand> button 2998 enabling the display of the Dialing Plan Attributes window, such as shown in FIG. 29(*m*); and a <Close> button 2999 for closing the Dialing Plan Order window.

As mentioned above, selection of the Dialing Plan "Retrieve" button 2975 in FIG. 29(*k*) enables a web page display of a Retrieve Dialing Plans from Inventory Window 3000 such as shown in the example web page of FIG. 29(*l*). From this display, a customer may specify search criteria or retrieve a predetermined amount of Dialing Plans having defaulted criteria. Particularly, the Retrieve Dialing Plans from Inventory Window 3000 comprises the following field/command button descriptions for retrieving Dialing Plans from customer inventory: an International Direct Dialed Digits "IDDD" radio button 3001 enabling entry of dialed digits as a public number in a dialed digits field 3003. When IDDD is selected, the user is required to designate a Country Code in a Country field 3002; a Private radio button 3005 enabling entry of a Private Number in the Dialed Digits field when selected. The Country field is protected when this type of dialed digits is selected; a Country field 3002 that must be selected from the drop-down list when IDDD is selected as the type of dialed digits; a dialed digits field 3003 enabling entry of a partial or whole number (dialed digits) not including the Country Code); a Quantity field 3004 enabling a customer to enter a value, from 1 to 100, specifying the quantity of Dialing Plans to include in the retrieval; a Network ID field 3006; a Termination/Location ID field 3008 indicating the Location ID of a DAL which can be selected from the drop-down list (if available within the customer's network); an <Add> button for updating the list box in the selected dialing plans section with the group information from the IDDD, Private, Country (only when IDDD is selected), Dialed Digits, Quantity, Network ID and Termination Location ID edit boxes, where applicable; a <Remove> button enabling a customer to remove a highlighted display item so that it is not included in the retrieval request; an <OK> button for accepting all entries in the Retrieve Dialing Plans from Inventory window, and messaging the host; and, a <Cancel> button for closing the Retrieve Dialing Plans from Inventory window without accepting any changes.

As mentioned above, selection of the Dialing Plan <Expand> button 2998 from the Dialing Plan attributes section enables a web page display of a Dialing Plan Attributes window 3020, such as the example web page display shown in FIG. 29(*m*). From this display, a customer may view Dialing plan attributes or features, if the selected dialing plan is located in the Dialing Plans in Inventory section of the Dialing Plans Order window, or, view or modify attributes if the selected calling card is in the Dialing Plan Updates section.

As shown in the web page display of FIG. 29(*m*), a first section referred to as the Dialed Digit Range section 3022 comprises fields/command buttons enabling a customer to define the origination data (number dialed) for a dialing plan. The field/command buttons include: "type" radio buttons 3025 enabling the selection of the originating number as a private number or public number (IDDD); a country field 3026 for enabling entry of a country code from a drop-down list when IDDD is selected as the dialed digit type; a network ID field 3027 enabling entry of a network in which a new Dialing plan is defined; a "From" field 3028 enabling entry of a beginning number of a range of numbers; a "To" field 3029 enabling entry of a last number of a range of numbers; a Carrier ID field 3023 which is an optional entry for numbers defined in the Dialing Plan order that are only completed by the DAP if originated by the specified Carrier Code within that originating country, and, that are only entered when a Country and Carrier Code is specified.

As shown in the example web page display of FIG. 29(*m*), a second section referred to as the Termination section 3030 comprises fields/command buttons enabling a customer to define the termination data for a dialing plan. The field/command buttons include: location name field 3031 which is an alphanumeric field enabling entry of a description of the termination, e.g., company name or location; a type field 3032 enabling selection from a drop-down list of the following termination types to which the Private or Public Number sends the call: a DAL—used for Dedicated Access Lines, an IDDD—used for all Public Numbers, a CMA—used for Customized Message Announcements, and, a EXCL—used to exclude a number or range of numbers; a Location ID field 3033 of a Dedicated Access Line (DAL) which can be entered (e.g., Shared DALs) or selected from the drop-down list. If the termination type is "DAL," a section/entry is required; a Country field 3034 for selection of the Country Code (where call will terminate) from the values in the drop-down list and is required entry when "IDDD" is the termination type; a Prefix Digits field 3035 for entering the numbers at the beginning of the terminating number (not including the Country Code) which are the same for all numbers in a range, or the entire terminating number when entering individual numbers; a Reuse Digit Length field 3036 enabling entry of the number of digits from the dialed digits that will be reused in the terminating number when used in a range with Prefix Digits. This field displays the default value, e.g., "00", and is protected when terminating numbers are entered individually or when the termination type is CMA or EXCL. When a value is required, it can either be typed in or selected from the drop-down list; a Nature of Subsequent Address field 3037 enabling entry of the out pulse digits delivered to a customer's equipment (CPE). When the termination type is a DAL, the default is changed from "None" to any of the other selections. However, "Subscriber" is typically selected, as "National" and "International" would only be used by a private network owner; a Point of Origin Routing Indicator check box 3038 to indicate Point of Origin Routing which enables a customer to designate an alternate DAL, that overrides the DAL specified in that customer's Dialing Plan, based on the originating switch. This helps to manage load balancing for DALS, e.g. for Vnet; and, an <OK> button and a <Cancel> button for closing the Dialing Plan Attributes window without making changes to the feature information.

When opening an existing ID Code/Set order or creating a new one, the nMCI Interact ONM system ID Code/Set Order option allows a customer to define a unique 1–11 digit number ID Code and assign that number to an individual. ID Codes preferably have a range privilege assigned to them, therefore, a customer can tailor calling privileges and assign them to individuals via their ID Code. Once an ID Code system is established, the code is entered after the dialed number on every call made. It should be noted that the network DAP switches (FIG. 28) verifies ID Codes. Thus, a correct ID Code must be entered or the MCI switch will not complete the call. In the preferred embodiment, there are two types of ID Code Set Orders in nMCI Interact Outbound NM: 1) Add/Change ID Code Set Order; and 2) Delete ID Code Set Order.

In the preferred embodiment, the Add/Change ID Code Set Order enables a customer to perform the following functions to implement ID Codes within that customer's Vnet/Vision Network: 1) Define ID Code Length (1–11 digits); 2) Assign Range Privileges to ID Codes; 3) Define Local Sets; 4) Generate ID Codes Sequentially or Randomly to an ID Code Set; 5) Individual Entry of ID Codes; and 6) Modify/Delete ID Codes within a Set.

FIG. 29(*n*) illustrates an example web page 3050 comprising an Add/Change ID Code Set Order Window comprising the following sections: 1) an order administration section 3051 for providing administrative aspects of the order such as: enabling entry of a date/time when the order is to be implemented by the host; selecting a priority based on the user's security access privilege; establishing an order status, e.g., approved or not approved for new orders in accordance with a users authorization; 2) an ID Code Sets in Inventory section 3060 used to retrieve ID Code Sets from inventory that are not included on another order. This is accomplished by selection of the retrieve button 3065 and enables display of the ID Code Set details including: ID Code, Set ID, set types, defined ID Code length; a description of the ID Code Set, e.g., by location; and, a component count indicating the amount of ID Code Sets in the ID Code/Sets inventory section; 3) an ID Code Set Updates Section 3070 for populating the ID Code/Set order window by moving selected ID Code/Sets from the ID Code/Set inventory section or by adding new ID Code/Set to the current order; and, 4) an attributes section 3080 for populating an area of screen display with a list of attributes, or features, for a selected ID Code/Set in the inventory or updates section.

With more particularity, the ID Code Set Order administration section 3051 of web page display 3050 comprises the same field descriptions as mentioned herein with respect to the Dialing Plan order administration including: 1) a set date/time field 3052 for when the ID Code/Set order is to be implemented by the host; 2) a priority field 3053 for establishing dialing plan order priority (depending on security access privileges); 3) a current order status field 3054; 4) a Remarks text field 3055 optionally used to describe the contents of the ID Code/Set order; and, 5) an Approve field 3056 such that when checked, indicates the order is approved and transmitted to the host.

The ID Code/Sets in inventory section 3060 used to retrieve ID Code/Set(s) from the ID Code/Sets inventory comprises the following field/command button descriptions: a Set field 3061 indicating the ID Code/Set; a "type" field 762 having an indication of a local ("L") set or a global ("G") set; a Len field 3063 indicating the defined length of the ID Code; a description field 3064 indicating the description of the ID Code Set, e.g., location; a Component Count field 3066 indicating how many ID Code Sets are within the ID Code Sets in Inventory section; a Retrieve button 3065 such that, when selected, retrieves a list of a customer's available ID Code Sets in inventory that are not included in other orders. Selection of this option will enable a web page display having a Retrieve ID Code Sets from Inventory Window 3090 such as shown in FIG. 29(*o*); and, a right arrow ">" command button 3067 enabling a customer to move single or multiple (selected) ID Code Sets from the ID Code Sets in inventory section to the ID Code Set Updates to include on the current order.

The ID Code Sets updates section 3070 comprises the above-described Set, "type," Len, description and component count fields and, a left arrow "<" command button 3068 enabling a customer to move one or more highlighted ID Code Sets to the ID Code Sets in Inventory section; a "Delete" command button; and, an "Add" command button 3069 enabling the addition of new ID Code Sets to the order including functionality enabling the creation of an ID Code Set which can be added to an order and which must contain at least one ID Code prior to approving the order. Adding a new Set to the order entails specification of either a local or global ID Codes sets.

The ID Code Sets attributes section 3080 comprises the same field/command button descriptions as mentioned herein with respect to the Dialing Plan attributes section including: an "Item" field 3082, e.g., including ID Code Set and ID Code Information; a "Value" field 3083; a "Set" field 3084 which designates the information displayed in the Attributes section is for the selected ID Code Set, which can be either in the ID Code Sets In Inventory or ID Code Set Updates sections; an <Undo> button 3085; a <Del Code> button 3086 for deleting a selected ID Code; an <Add Code> button 3087 enabling display of a further Web page including an Add ID Codes to Set window, such as shown in FIG. 29(*p*); and a <Close> button 3088 for closing the Add/Change ID Code Set Order window.

As mentioned above, selection of the ID Code Sets "Retrieve" button 3065 in FIG. 29(*n*) enables a web page display of a Retrieve ID Code Sets from Inventory Window 3090 such as shown in the example web page display of FIG. 29(*o*). From this window, a customer may specify search criteria or retrieve a predetermined amount of ID Code Sets having defaulted criteria. Particularly, the Retrieve ID Code Sets from Inventory Window 3090 comprises the following fields for retrieving ID Code Sets from customer inventory: a Set field 3091 enabling entry of the Set number; a description field 3092 enabling entry of a full or partial ID Code Set description, e.g., alphanumeric description; an ID Code field 3093 enabling entry of a specific ID Code; a Quantity field 3094 enabling a customer to enter a value specifying the quantity of ID Code Sets to include in the retrieval; an <Add> button 3095 for updating the list box in the selected dialing plans section with the group information from the Set, Description, ID Code, and Quantity text boxes; a <Remove> button 3096 enabling a customer to remove a highlighted display item so that it is not included in the retrieval request; an <OK> button 3097 for accepting all entries in the Retrieve ID Code Sets from Inventory window, and messaging the host; and, a <Cancel> button 3098 for closing the Retrieve ID Code Sets from Inventory window without accepting any changes.

As mentioned above, selection of the Add Code button 3087 in FIG. 29(*n*), enables display of the Add ID Codes to Set window such as shown in the example Add ID Codes to Set web page 3100 of FIG. 29(*p*). As shown in FIG. 29(*p*), the Add ID Codes to Set window 3100 enables the customer to delete ID codes from a set; add ID codes one at a time, e.g., single generation; sequentially generate ID Codes to the Set; and randomly generate ID Codes to the Set. For instance, the customer may enter the set information in the following fields: the Set field 3102 for which the ID Code changes will take effect; a length field 3104 setting forth the length of the ID Codes contained in the set; a description field enabling entry of text describing the set; and a type field indicating the set as local or global. With regard to the ID Codes generate options, a single generate option 3110 enables a user to add ID Codes one at a time to a set, e.g. by entering the number in the ID Code field 3112; a sequential generate option 3114 enables the user to specify a beginning ID Code number and a Quantity in entry fields (not shown). The nMCI Interact ONM will automatically generate sequential ID codes according to the quantity specified by selecting the Add button 3118 which updates a list box 3125 with information from the generated id Codes; and, a random generate option 3120 enables the user to specify a beginning ID Code number, an ending ID Code number, and, a Quantity in entry fields (not shown). The nMCI Interact ONM will randomly-generate the specified number of ID codes within the beginning and ending range by selecting the Add button 3118 to update list box 3125. Selection of the <OK> button 3126 will enable acceptance of all the newly generated ID Code entries, messaging the host of the new codes, and, returning control to the Add/Change ID Code Set order page (FIG. 29(*n*)).

As mentioned above with respect to FIG. 29(*a*) depicting the nMCI Interact ONM web page display 2764, the control menu option 2720 provides a refresh option which enables an update of all internal lists that have been altered on the host NetCap system. Specifically, the nMCI Interact ONM system 2700 updates the following lists: the network ID, Range Privilege, ID Code Set, Billing Location ID, Customer Service ID, location/access type, and, provisioning carrier. It should be understood that Refresh option will not change the values of an open window that includes data from one of the lists.

Furthermore, with respect to the report menu option 2742 provided in the main web page display of FIG. 29(*a*), users are enabled to inquire on their respective inventory for CPNs, Calling Cards, Dialing Plans, and ID Code Sets. The ONM system will display a respective "Retrieve" item from inventory, e.g., selection of report option for CPNs enables the display of the Retrieve CPNs from inventory screen as shown in FIG. 29(*f*). Particularly, in the ONM system 2700, four inventory reports may be provided to customers: CPN, Calling Card, Dialing Plan, and ID Code Set. Reports may be requested from the screen display of FIG. 29(*a*), however, will be delivered to the nMCI Interact Inbox message center 270, for client viewing and retrieval in the manner as described herein.

Event Monitor

As mentioned above, another application of the suite of telecommunications network management applications is the event monitor and Broadband network performance reporting system 850. As shown in the high level process flow diagram of FIG. 30 customers are enabled to request, specify, schedule and receive data reports relating to their Broadband, e.g., packet-switched, data networks.

Figure 30:
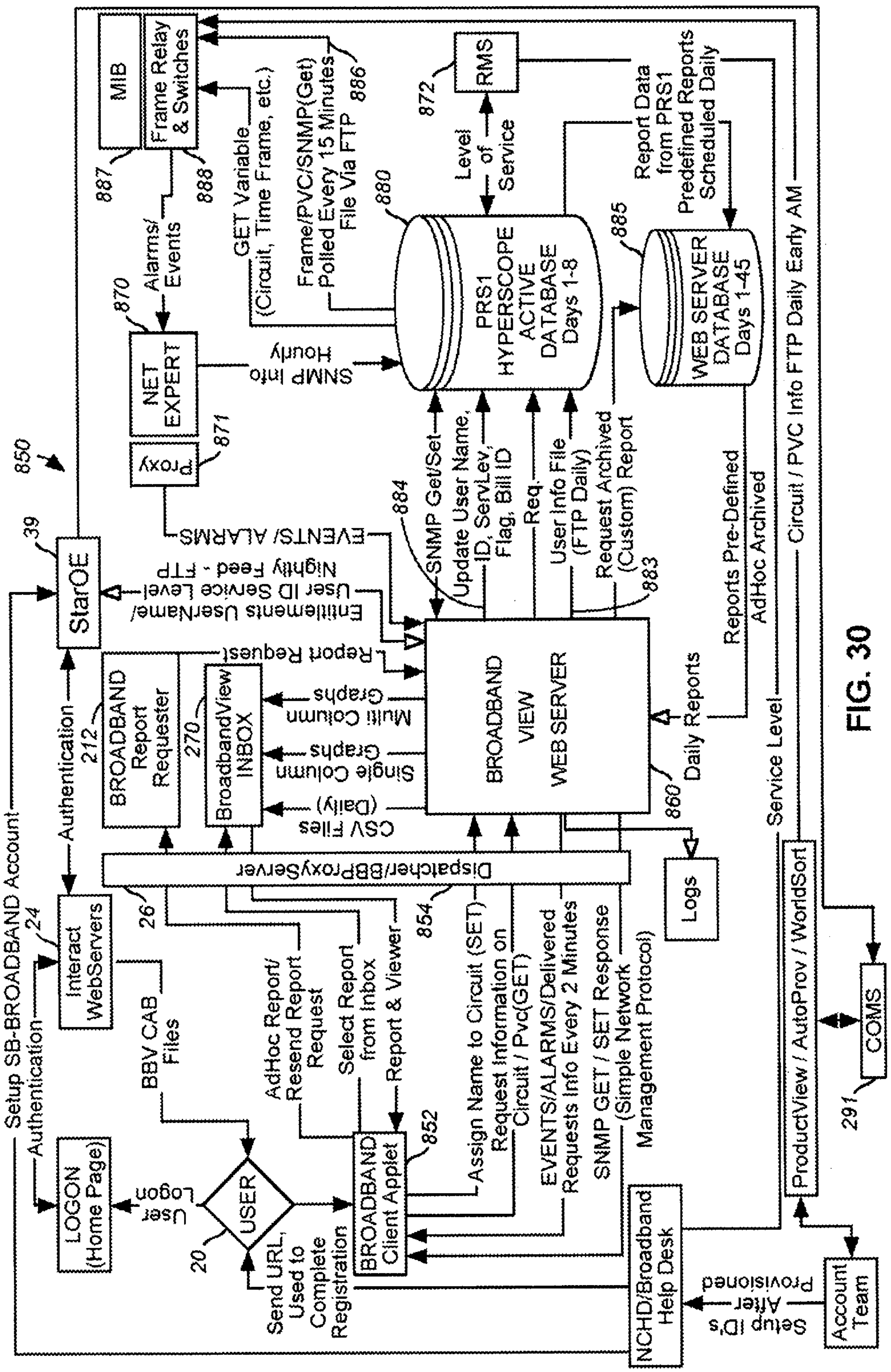
FIG. 30 is a detailed block diagram depicting the physical architecture of the Broadband reporting system component of the present invention.

As shown in FIG. 30, the Broadband ("BB") reporting system includes a Broadband view client comprising the client workstation component 20 employing a web browser running, for example, Internet Explorer® 4.0 or greater, for enabling the generation of requests and receipt of responses from the Broadband system processes over the Web/Internet via a secure socket connection. As described herein, the StarWRS component 200 of the nMCI Interact system may be implemented to support Broadband report request, report retrieval, and alarm monitoring functions. All interactions with the Broadband reporting and system network management platform ("SNMP") features occur between the Broadband client applet 852 and a Broadband server 860. Particularly, Broadband application's Java classes invoke a "message class" that has the Common Object code as an interface definition.

Integrated within the Broadband reporting system architecture 850 of FIG. 30 is the nMCI Interact Web Server 24 and Dispatcher components 26 which provides for the transport between the BB client browser and a Broadband proxy interface including all authentication and encryption. Thus, secure communication from the customer browser to a DMZ Web server is enabled over a first secure TCP/IP socket connection, such as SSL, and, communication from the DMZ Web server over a corporate firewall to the Dispatcher server is enabled over a second TCP/IP socket connection, such as DES. These secure paths enable customer requests and server responses to be communicated between the client browser and the Broadband server 860. Specifically, the Dispatcher server 26 includes an integrated Broadband proxy application to forward user requests and responses to/from the Broadband server process 860 and to enable the Broadband functionality. As described herein, this proxy capability includes a multi-thread engine enabling multiple, simultaneously executing sessions supporting anticipated user load. The interface between the Dispatcher server and the Broadband proxy process is also message-based employing, e.g., TCP/IP socket transport, and, as will be described, a messaging protocol is defined that comprises a generic message header followed by proxy-specific data. For messages sent to the Broadband server, the generic message header is first sent followed by the proxy specific data. In the other direction, the same process is employed, i.e., the Broadband proxy sends the generic header followed by the proxy-specific response back to the dispatch server for communication over the firewall and back to the Web server.

In the embodiment shown in FIG. 30, all Broadband responses including CSV data files are forwarded through the Dispatcher server 26 and intervening DMZ Web server 24 to the Broadband Inbox messaging server for subsequent access and eventual display at the client.

In the preferred embodiment, the Broadband ("BB") server 860 performs the various database queries and function calls in response to requests received from the customer via the Broadband proxy 854. That is, the BB Client submits all requests and queries to the BB Server 860 using a generic proxy framework called BBProxyServer 854. These communications include Report requests, retrieval and viewing; requests for circuit information using SNMP Get commands; assignments of mnemonics for circuit names using SNMP Set commands; and, establishing a session to monitor alarm activities on circuits. Particularly, the Broadband server 860 is responsible for all tasks leading up to and including the generation of performance report and SNMP information including data collection, calculation, storage, and report generation.

As further shown in FIG. 30, the components feeding information to the Broadband server 860 include: 1) a Performance Reporting System ("PRS") server 880 for sending performance and statistical data to the Broadband server; and, 2) the SNMP platform 870 which is a tool that feeds real- or near real-time SNMP alarm and network event data to the Broadband Web server 860 via proxy interface 871. One such SNMP tool implemented by the assignee of the present invention is entitled "NetExpert." The Broadband server 860 additionally supports SNMP "get/set" functionality which is a menu-driven facility enabling a user to query the SNMP database for the value of a variable in a Management Information Base ("MIB") 887, or, to set the value of certain variables in the MIB, as will be described in further detail hereinafter.

The Broadband server 860 additionally supports communication with the StarOE component 39 which provides order entry functions including functionality necessary to manage (create, update, delete) Broadband users and, allows for a feed of the appropriate information to the Broadband server in order to associate the appropriate reports and Broadband functionality to the right customer once given admission to the Broadband service. As described, the StarOE order entry process essentially provides the means for authenticating users, and, initiating report generation. A messaging interface is provided between StarOE to the Broadband Web Server 860 functioning as a client to receive authentication information and Bill ID and Level of service information which are supplied in response to launch of the Broadband applet.

To establish Basic level reporting, the Broadband Server 860 transmits new customer information to the PRS1 component 880 when it is received. The customer Bill ID and circuit information are entered into the PRS1 tables via messaging interface 884. Any additions to or updates of User Name, User ID, Bill IDs are periodically passed from the Broadband Server 860 to the PRS1 880 via FTP messaging interface 883 in response to the periodic, e.g., nightly, updates to the Broadband server from StarOE. Particularly, the Broadband server 860 receives from the StarOE server 39 a file containing all current BB customers with the following information: a date/time stamp; a username; a userid; a service level indicator; and, the number of billing ids and bill ids. For the level of service indicator, Broadband offers the following options: 1) Basic; 2) Standard; 3) Enhanced SNMP; 4) Premium; 5) Enhanced Ad hoc Reporting; 6) Enhanced SNMP+Ad hoc Reporting; and 7) Dedicated SNMP. Specifically, from the information downloaded from StarOE, comma separated value (CSV) reports are automatically created on a daily basis by the PRS1 from the inception of service until service is discontinued. As an example, for the Basic level of service, the Broadband Server delivers three (3) CSV Files to StarWRS Inbox 270: Configuration report, Circuit usage, and PVC usage.

Figure 31:
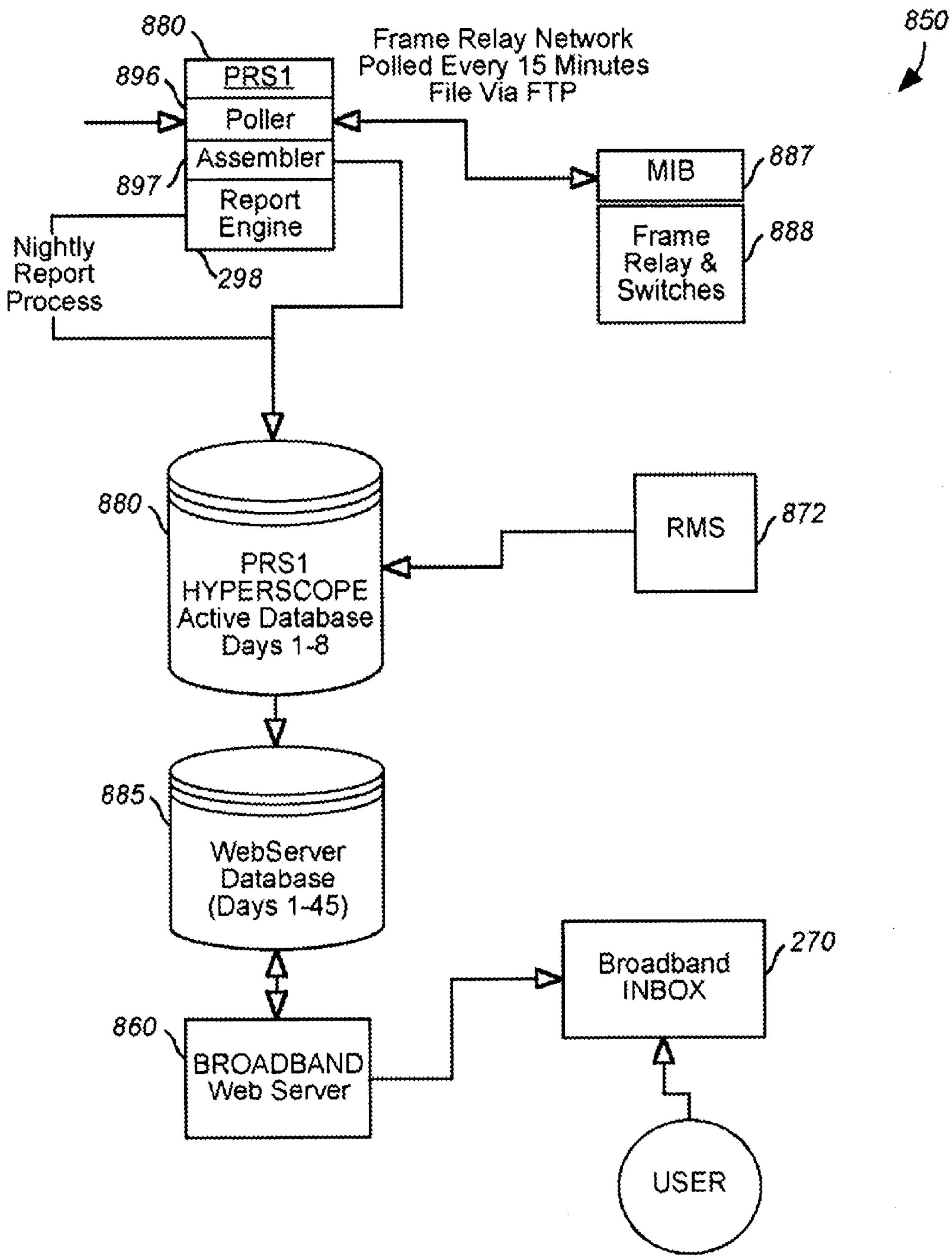
FIG. 31 illustrates those components utilized for Broadband performance reporting.

Referring to FIG. 31, the PRS device 880 performs the following: 1) queries the MIB 887 on each switch via interface 886 for information about that circuit; 2) collects the data; and, 3) assembles that data in the appropriate tables for storage in the Broadband Server database 885. A nightly process between the RMS 872 and PRS database 280 synchs up PRS level of service information with the RMS 270 to determine what level of reporting is assigned to each circuit/PVC and runs the appropriate reports. From these components, the following functions, reports and capabilities are available to nMCI Interact users: a) near real-time performance statistics; b) customer performance reports including: 1) Frame Relay Graphs including: Network Health (Daily-Monthly); Network Throughput (Daily-Weekly-Monthly); Busy Hour Circuit Trend (Daily-Weekly-Monthly); Customer Frame Delivery (Daily-Weekly-Monthly); PVC Utilization by Access Circuit Busy Hour (Daily-Weekly-Monthly); and Quality of Access Port by Hour (Daily); 2) Frame Relay Text Reports including: Network Throughput (Daily-Weekly-Monthly); Busy Hour Circuit Trend (Daily-Weekly-Monthly); Customer Frame Delivery (Daily-Weekly-Monthly); PVC Utilization by Access Circuit Busy Hour (Daily-Weekly-Monthly); Quality of Access Port by Hour (Daily); and, Customer Configuration (Daily); 3) Frame Relay Downloads including: Circuit Usage (Daily) and PVC Usage (Daily); and 4) SMDS Graphs including Circuit Statistics (Daily-Weekly-Monthly) and Busy Hour Circuit Trend (Daily-Weekly-Monthly). Additional capabilities include providing Near Real-time alarms and configuration reports (Frame and SMDS) relating to an MCI customer's virtual transport network. Thus, the Broadband system 200 of the invention provides a tool set by which a customer can understand the performance of their virtual data network. It provides the customer with the ability to trend network performance statistics over time, and then to determine whether the network should be changed to ensure that it is operating at maximum performance levels (i.e., meeting business needs). The Broadband reporting system thus enables customers to review network performance data over a period of time, e.g., up to 45 days, by creating and saving reports on their workstation, a network server, or a floppy disk. Alarm trending and analysis, correlating alarm occurrences to network availability, network performance and problem resolution may also be performed.

Figure 32A:
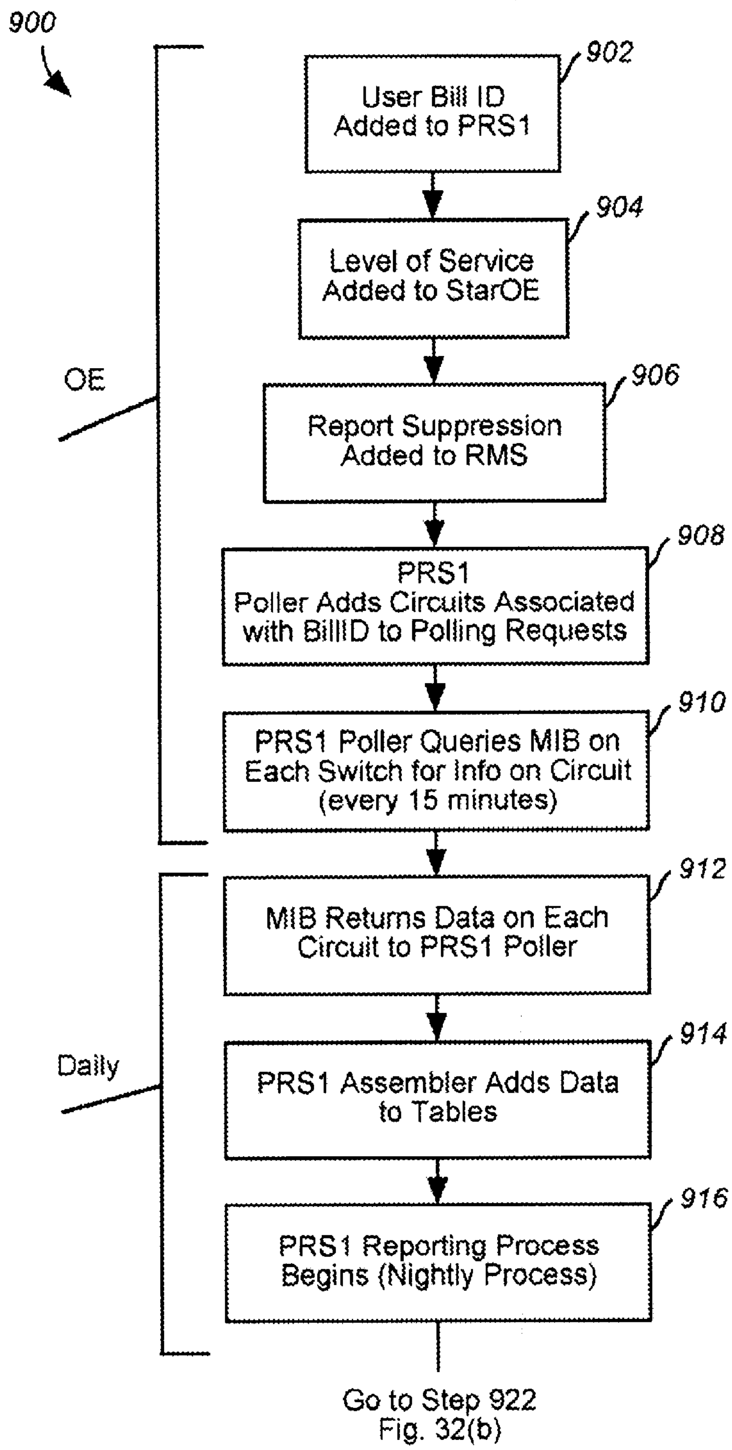
FIGS. 32(*a*)–32(*b*) illustrate the flow diagrams depicting the Broadband system report creation process 300.
Figure 32B:
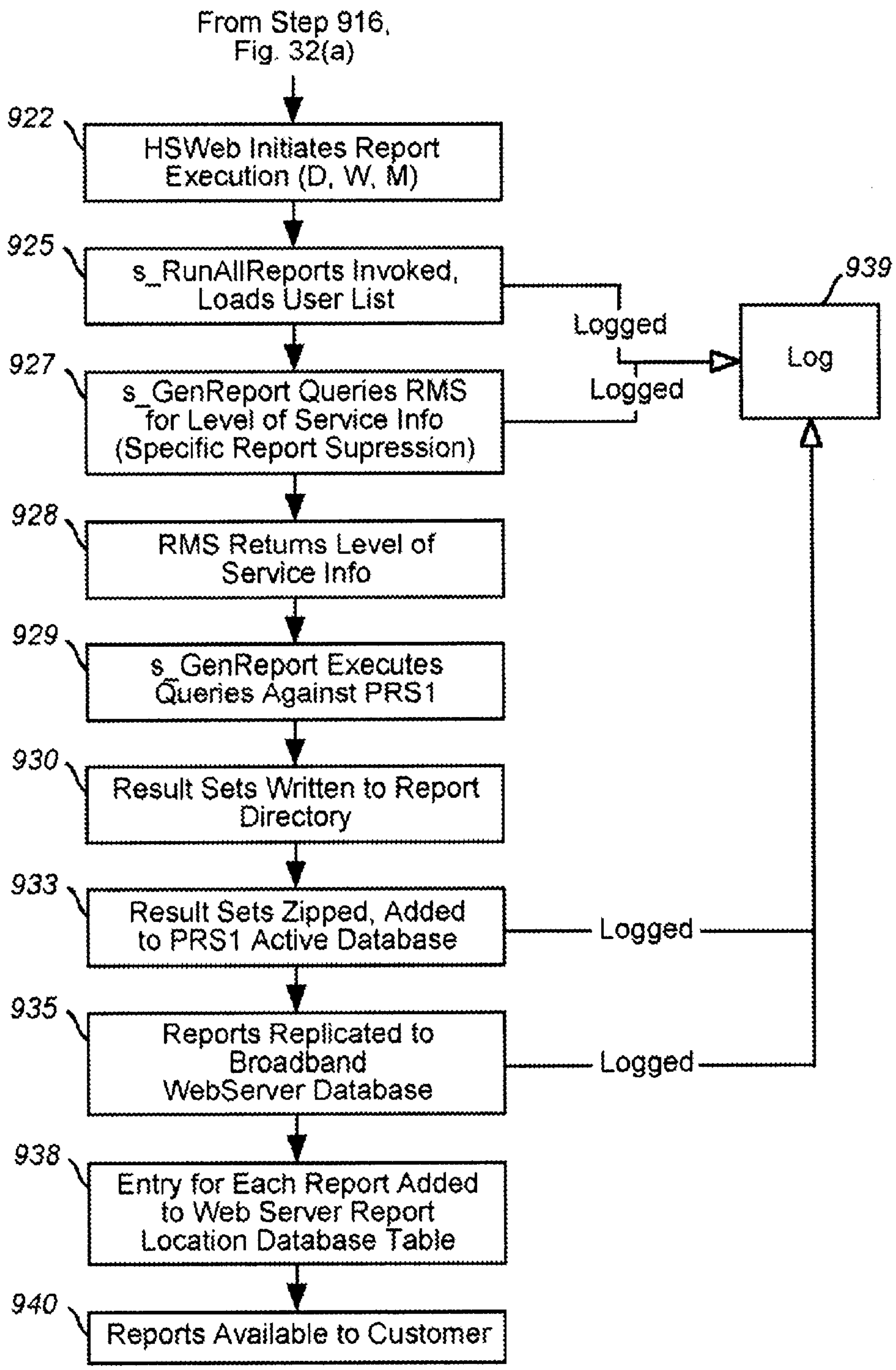

A detailed flow diagram illustrating the CSV report creation process is now illustrated in view of FIGS. 30, 31, 32(*a*) and 32(*b*). As shown in FIG. 32(*a*), steps 902–906 depict the addition of the User Bill ID to PRS1, the addition of a customer's level of service information to StarOE and, addition of any report suppression information to the RMS. As described, level of Service information is available from the StarOE system. Level of service information from StarOE is of a courser granularity and is used to enable access to the appropriate Broadband capabilities, based on the order entry process. A user can suppress the transmission of a report or set of reports using the BB application, however, this does not stop the collection of performance statistics, only the generation of reports.

The next few steps 908–914 relate to the data collection process. Specifically, data on the performance of all circuits associated with a particular Bill ID is collected from all switches in the ATM or Frame Relay Network by an automated periodic polling process, e.g., hourly. The addition of a new Bill ID to the PRS1 tables (step 902) is utilized by the polling process which process adds circuits and PVC to its polling requests based on association with the new Bill ID, as indicated at step 908. Then, as indicated at step 910, the poller queries the MIB 887 on each switch in the network for statistics on selected circuits and PVC on a cyclical basis, e.g., every 15 minutes. As shown in FIG. 31, the PRS poller function 896 polls the MIB 887 at each switch 888 in the network, e.g., Frame Relay or ATM network, in sequence. The Poller sends a UDP packet to the MIB on each switch in sequence for statistics on all circuits/PVCs enabled for Broadband service. In response to the UDP request, at step 912, the MIB returns all the current statistics on circuit/PVC data from the switch. In the event that a switch is not reachable, the polling process logs an error in a PRS1 error log indicating that the specific switch was not reachable. Next, as indicated at step 914, the PRS1 writes the data to a text file and a Sybase bulk loader process adds the information to a raw data table. Particularly, as shown in FIG. 31, a PRS assembler process 897 distributes statistics to the appropriate tables in a PRS1 active database 880. The assembler process compares the previous hour's data to the data in the raw table, compares values and writes the deltas to the hourly tables, which tables are then replicated to the reporter.

Then, in FIG. 32(*a*) at step 916, an automated process runs selected reports on available statistics in the PRS database tables. In the preferred embodiment, as shown in FIG. 31, this reporting process 298 occurs nightly, however, it can be run on any periodic basis. The specific reports that are run are determined by the level of service for which the Bill ID is enrolled as stored in StarOE tables.

Referring to FIG. 32(*b*), as indicated at step 922, for each Bill ID, the reporter determines which reports are to be produced, generates queries against the appropriate tables, runs the queries at the appropriate time and delivers reports to the users BB Inbox 270. Report creation is done in sequence: all dailies, then all weeklies (if appropriate) then all monthlies (as appropriate). Particularly, as indicated at steps 925 and 927, a control process "s_RunAllReports" is invoked to load all customer lists, and at step 925 calls "s_GenReport" which collects level of service information for all customers. As indicated at step 928, the RMS process returns level of service information indicating any report suppression, and, at steps 929, the "s_GenReport" creates and executes queries against the data collected in the PRS1 database. At step 930, result sets are written to a temporary report directory and are then compressed at step 933 and added to the PRS database which may store the report for a predetermined amount of time, e.g., one week. Next, as indicated at step 935, the reports are replicated using off-the-shelf components, e.g., Sybases's RepServer, and saved on a Broadband server report location database ("RLD") 885 which can be remote mounted by the Broadband Server 860. Particularly, the PRS reporter 298 shares a drive on which these reports are located with the Broadband Server via a remote file mount. The Broadband Server database retains data and reports for a predetermined period of time, e.g., 45 days, prior to the current data.

Finally, as indicated at step 938, the Broadband Server 860 determines which reports have been produced and forwards them directly to of with the Broadband Inbox component associated with the Bill ID. Broadband Server creates a unique filename for each CSV report and places each report on the Broadband Inbox 270 (FIG. 30) for customer retrieval, as indicated at step 940. The steps of 922–938 are depicted in a condensed physical architecture diagram of the Broadband system shown in FIG. 31.

As shown in FIG. 32(*b*) at steps 925–927, 933–935 a determination is made as to whether the processing performed in each step was successful. If the processing performed in each step was not successful, or, an error occurs, then the error may be logged in a log file 939 at the Broadband Server and at Inbox for subsequent review, when necessary.

Figure 33:
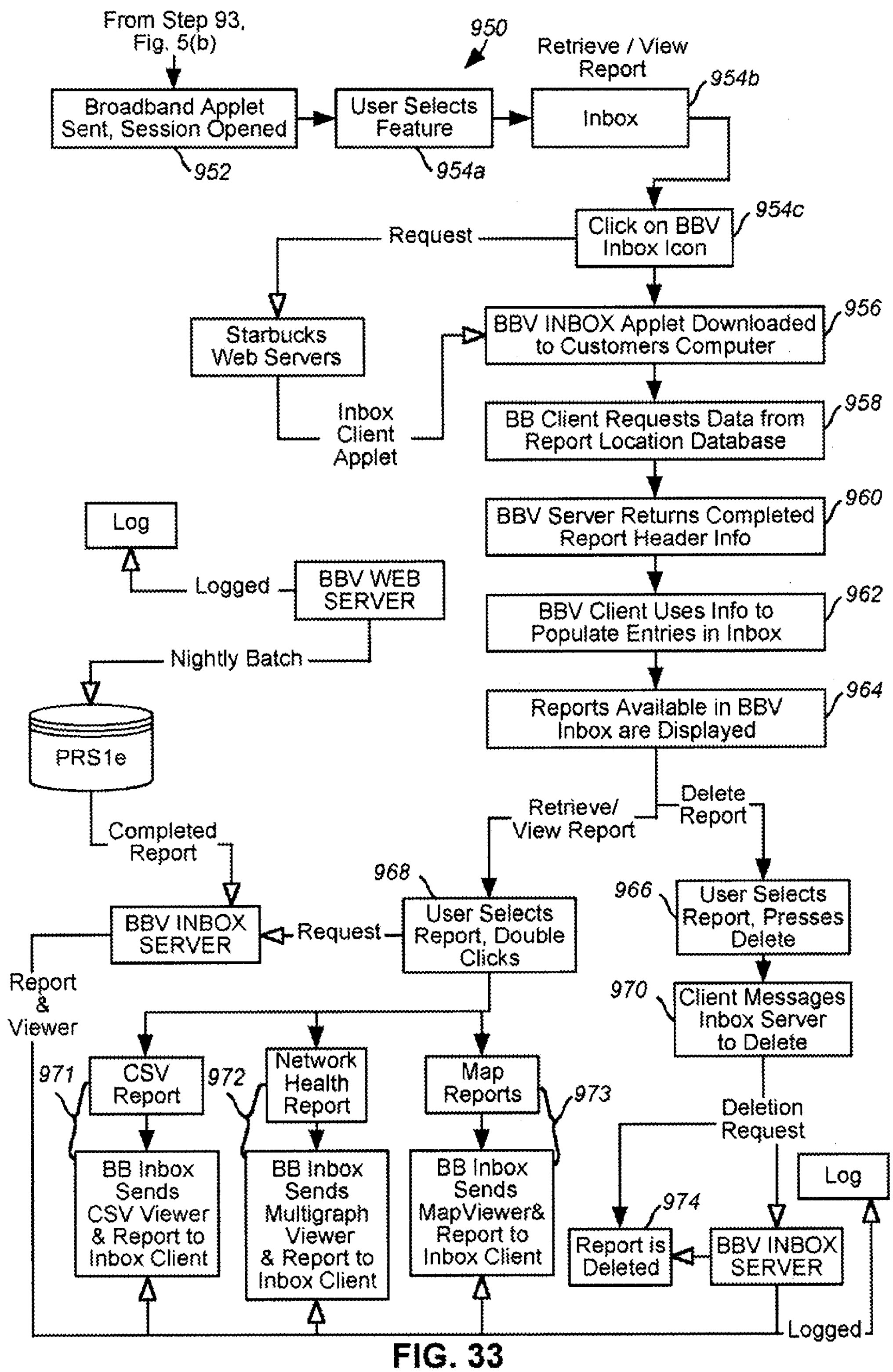
FIG. 33 illustrates a process flow diagram depicting various Broadband reporting data retrieval process.
Figure 34A:
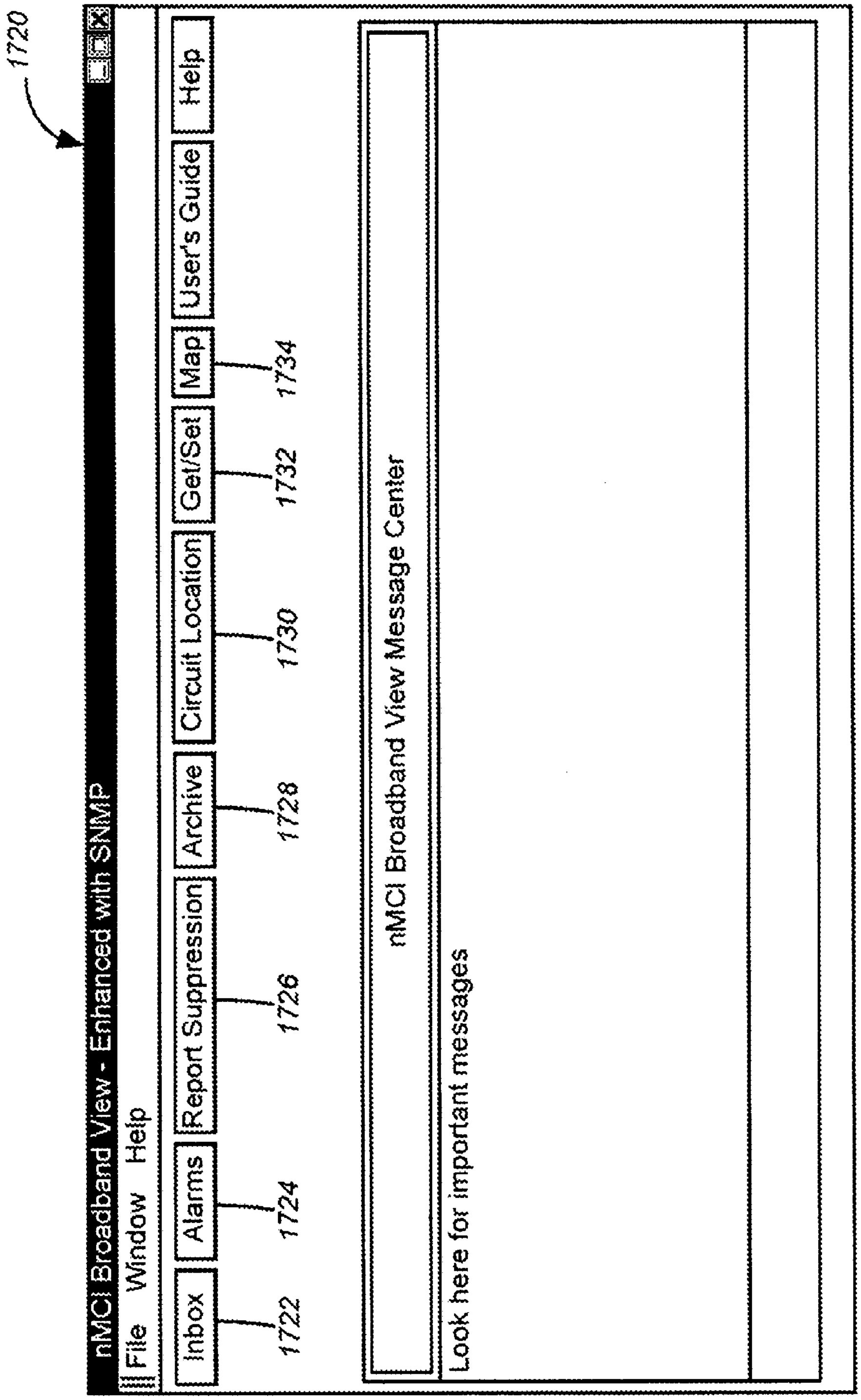
FIGS. 34(*a*)–34(*g*) depict example graphic reports relating to a customer's Frame Relay (Broadband) network.
Figure 34B:
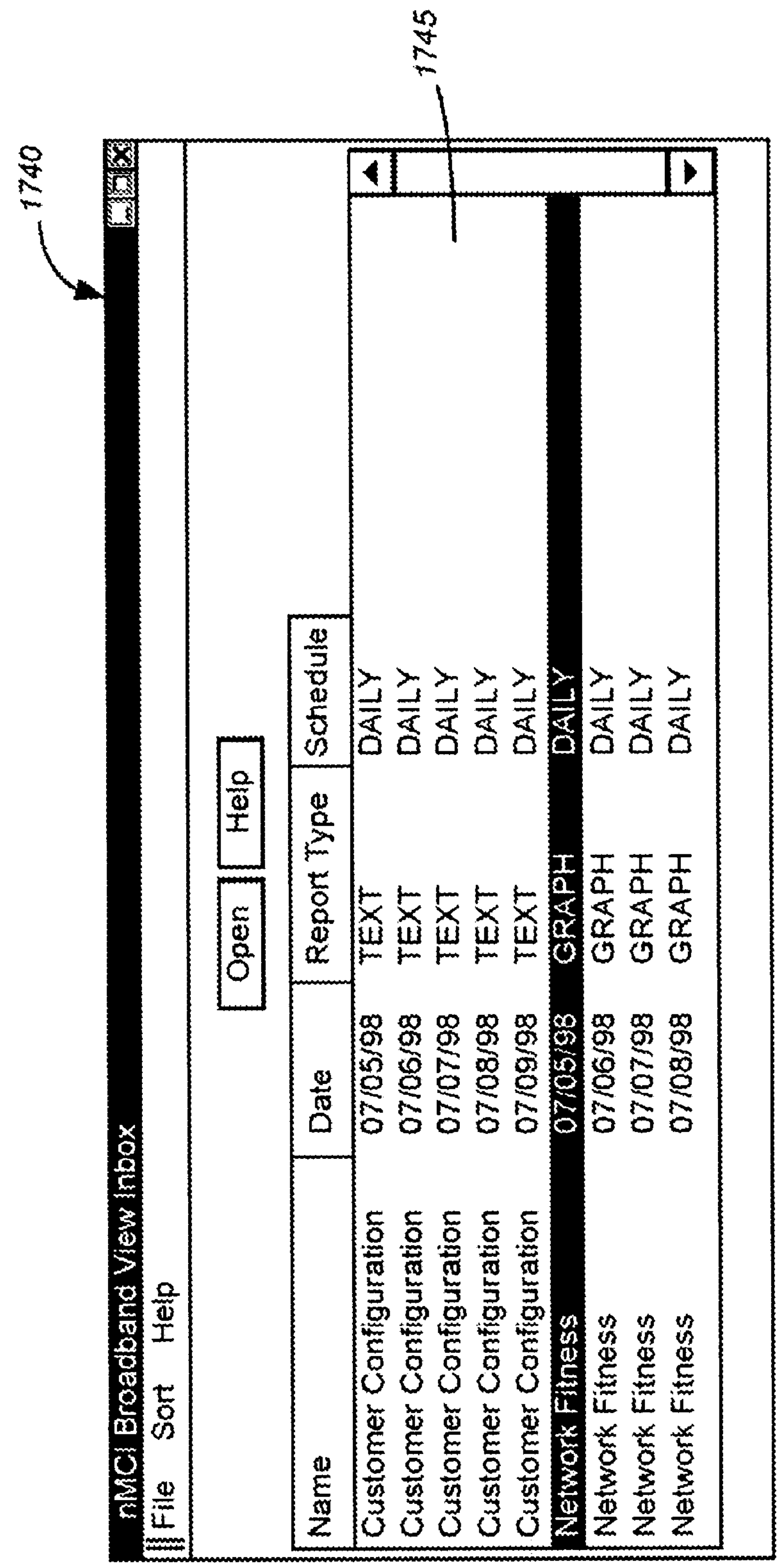
Figure 34C:
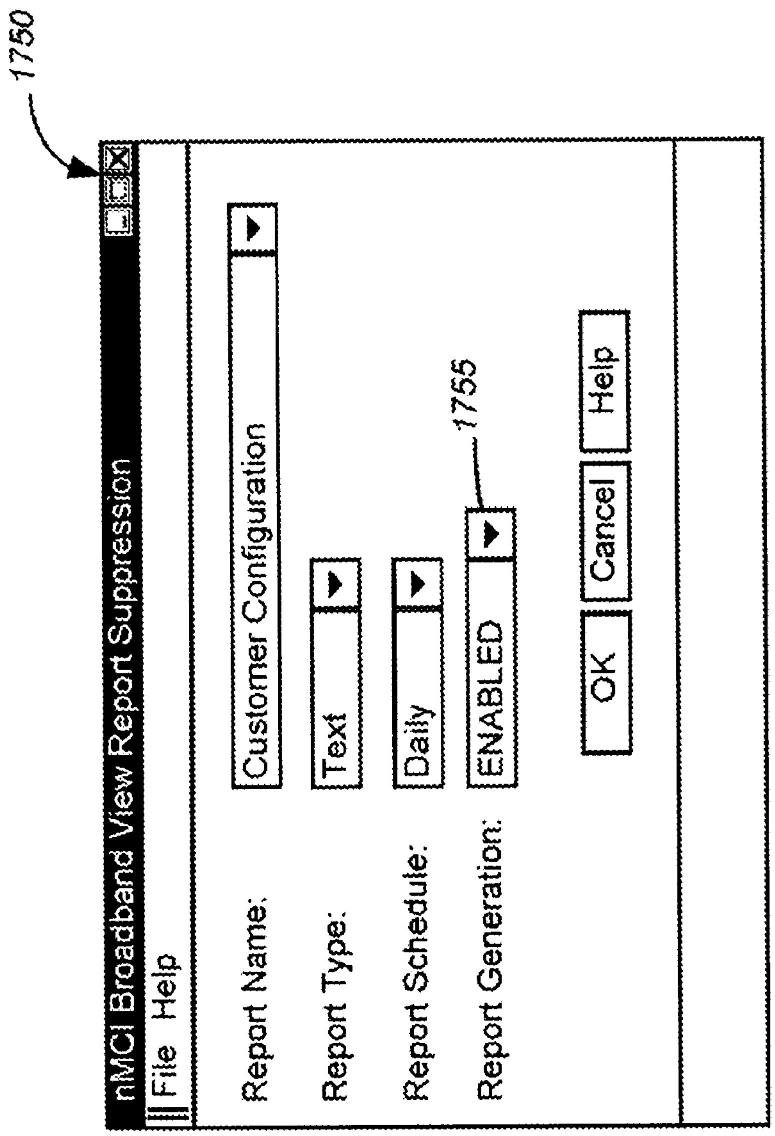
Figure 34D:
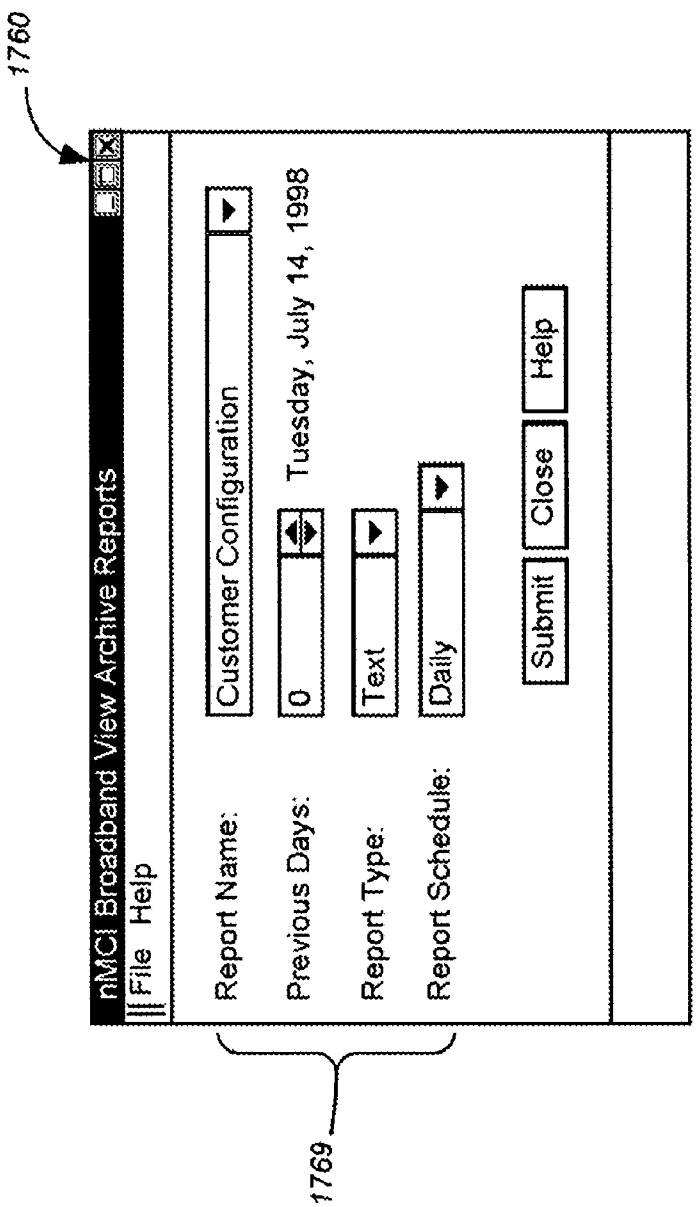
Figure 34E:
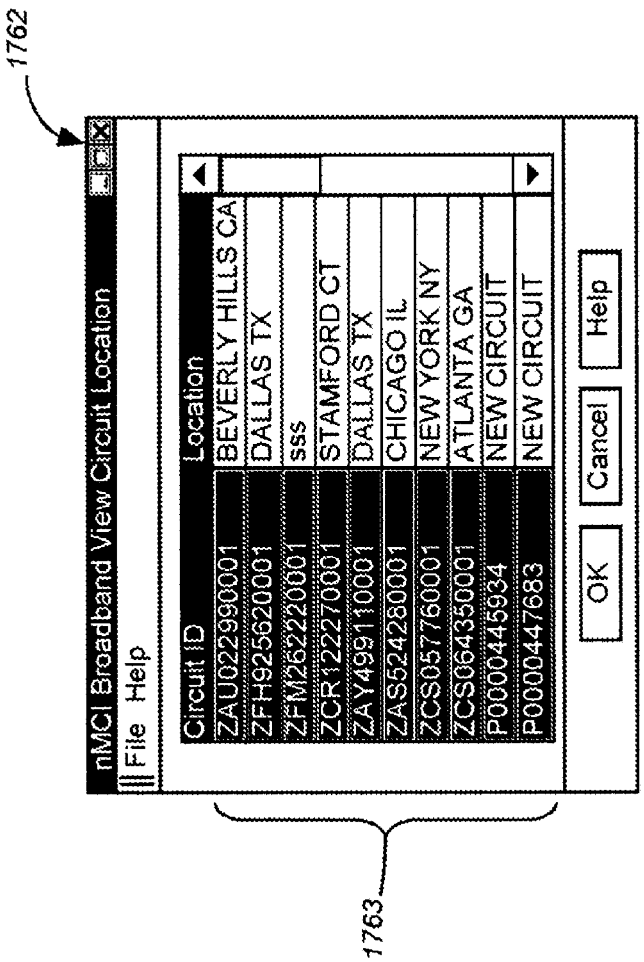
Figure 34F:
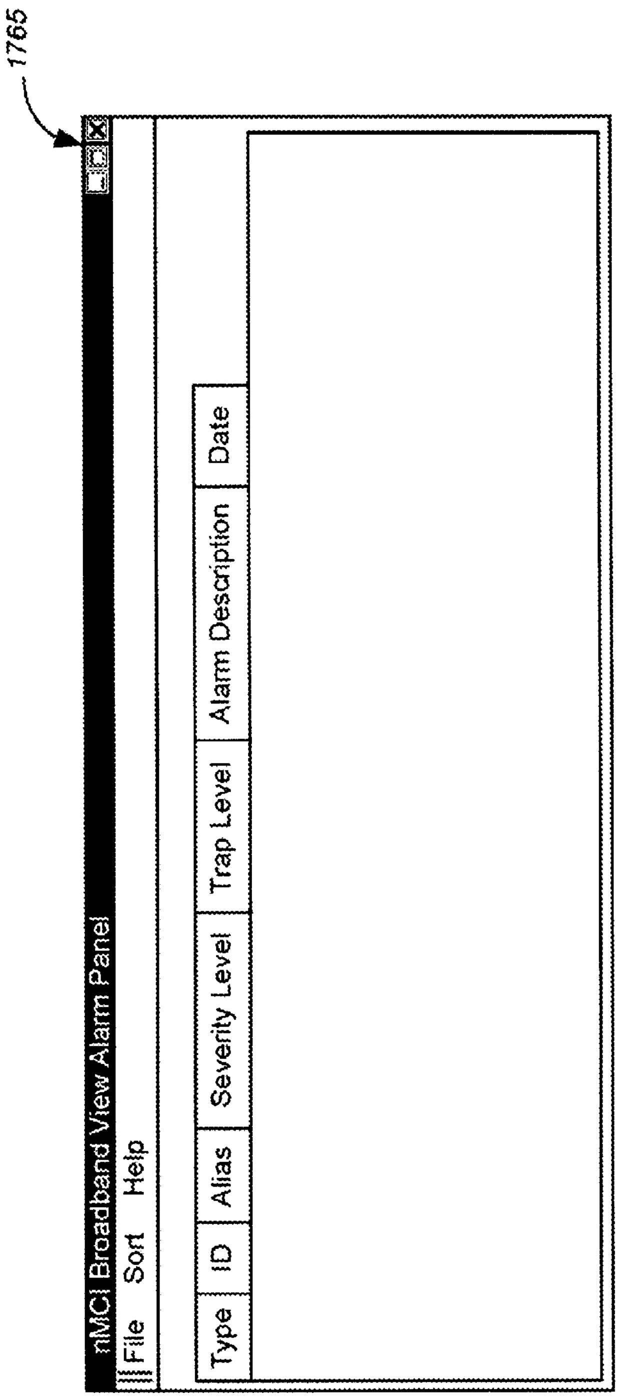
Figure 34G:
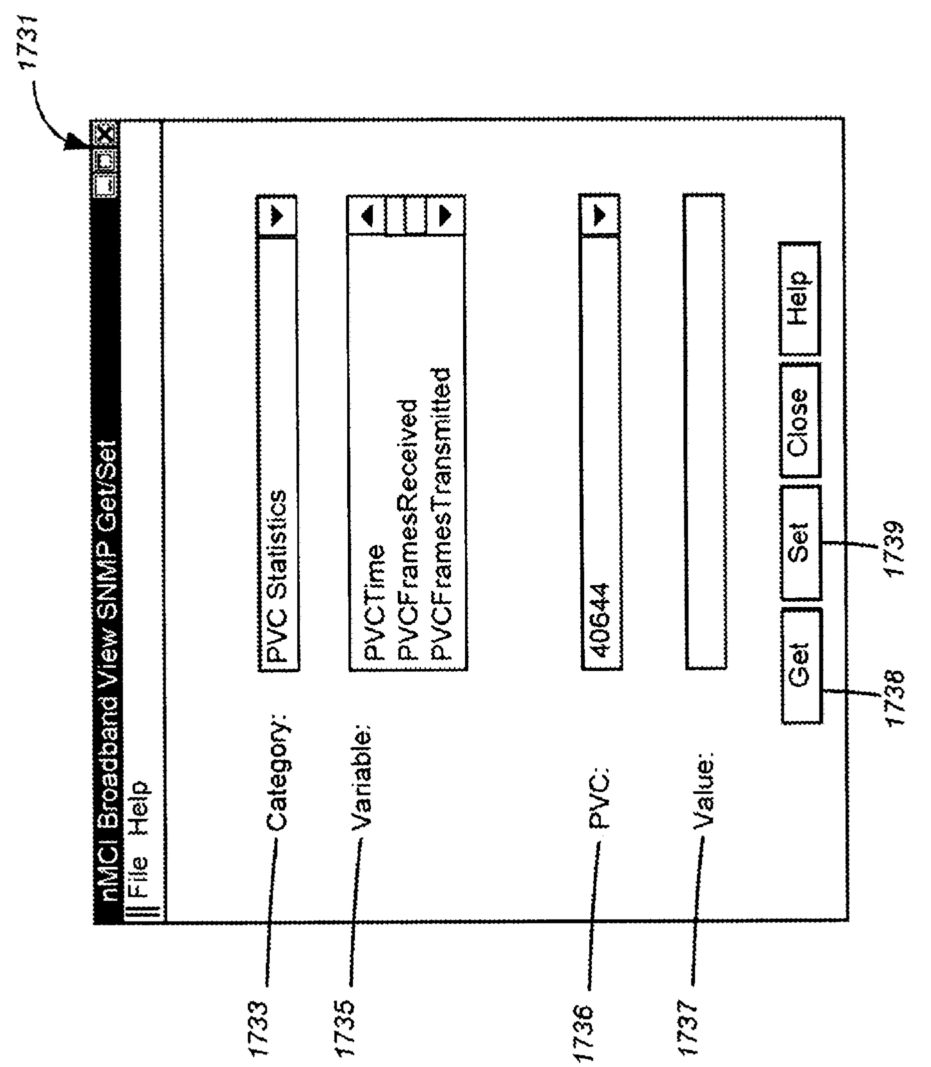

Details of the Broadband report retrieval process 950 is now described in view of FIG. 33. It is assumed that StarOE has already validated the user's id and password, and that the user is entitled to receive Broadband services. Thus, upon selection of the Broadband Services icon 93 from the nMCI Interact home page (FIG. 5(*b*)) the user may enter into the Broadband Services system and particularly, to access the Broadband Client front end. A client Broadband applet is thus, downloaded to the customer who is presented with the Broadband main display screen, as indicated at step 952.

An exemplary Broadband web-page BB Main Display screen 1720 is shown in FIG. 34(*a*) which presents a variety of user-selectable Broadband options including: 1) an Inbox option 1722 enabling a user to retrieve their Broadband reports; 2) an option 1724 enabling a user to view SNMP alarms; 3) an option 1726 enabling a user to specify reports to be suppressed; 4) an option 1728 enabling a user to retrieve Broadband reports that have been archived; 5) an option 1730 enabling a user to receive information regarding their circuit locations; 6) an option 1732 enabling the "get/set" functionality for providing meaningful labels to circuit locations to improve report readability; and, 7) an option 1734 enabling the retrieval of a map viewer application for generating maps portraying the customer's virtual networks. Details of each of these Broadband applications may be found in commonly-owned, co-pending U.S. patent application Ser. No. 09/159,702 entitled INTEGRATED PROXY INTERFACE FOR WEB BASED BROADBAND TELECOMMUNICATIONS MANAGEMENT, the contents and disclosure of which is incorporated by reference herein.

In the preferred embodiment, a Broadband Main Display applet is provided as a launching pad for accessing all of the aforementioned Broadband services. The Main Display applet is preferably a Java applet running inside the user web browser 20 and utilizing classes which extend the basic Java applet functionality in areas such as application management, user session management, user-interface, inter-applet communication, and client/server communications. Particularly, from the Broadband Main Display applet access to and communications between Broadband applications is provided using the Common Object COApplet, COApp, and COBackPlane services which are objects functioning in the manner as described herein. In the manner as shown in FIG. 3, the Main Display applet BBMainDisplay inherits from COAppIMPL class with a COApplet interface and is launched from the nMCI Interact COBackPlane using the COApplet interface. When a user clicks on a Broadband service toolbar button or menu item, BBMainDisplay creates an instance of a COApp(let) to manage the corresponding application. When the user exits from Broadband services, the COBackPlane is utilized to destroy the application and its windows.

The Broadband Main Display applet provides a menu-bar, toolbar, and status bar for accessing Broadband services according to the customer's subscribed service option which includes: Basic; Standard; Enhanced SNMP; Premium; Enhanced Ad hoc Reporting; Enhanced SNMP+Ad hoc Reporting; and Dedicated SNMP. As determined by the user logon session with the StarOE server 260, if the user is not entitled or does not have authorization for a particular service, the corresponding toolbar icon or menu item is disabled (ghosted-out) and will be rendered insensitive to user input in accordance with the customer service option.

When BBMainDisplay is launched, the Main Display first determines the user's Broadband level of service option, e.g., Basic, Standard, Enhanced SNMP, etc. A user selects a Broadband service, e.g., custom reporting, archive reporting, or SNMP features such as Get/Set and alarm panel by clicking on the corresponding toolbar icon or pull-down menu item on the Main Display applet (FIG. 34(*a*)). For the case of custom (Ad hoc) reporting of data, e.g., from the Frame Relay MIB, a custom reporting applet interface is provided. From this web interface, a customer can select from the available data variables (i.e. physical or logical circuit, data point value, time frame for report, etc.). Specific responsibilities of the custom report applet include: 1) allowing customers to define a custom report query using single performance statistics category, statistics range, and date/time range; 2) allowing customers to select reports presenting statistics relating to their current network Access Circuits or network PVCs. This comprises enabling a customer to select either Access Circuit or PVC reporting category type, in which case a drop down list displays current performance statistics for the selected category. The Customer then selects a single performance statistics category from drop down list; 3) allowing a customer to specify range on statistic value using relational operators and numerical values, e.g., value >=80%; 4) allowing a customer to specify report date/time range covering, for example, the previous 45 days of service. A customer can select start and stop date/time anytime within range; 5) allowing the customer to save the custom defined queries by providing a "Save Query" option; and, 6) providing an "Auto Run" function to allow custom reports to be run automatically and available when the default reports are produced through the Broadband Inbox. Once the user submits the custom report request it is forwarded to the Broadband Inbox for subsequent view.

When basic service option is provided, the Broadband main display applet has the responsibility of: 1) requesting service type (entitlements) either from StarOE authentication server or as data from BackPlane (FIG. 3); 2) requesting reports that are no longer on the Inbox server to be retrieved from a report data archive if a pre-determined period of time has elapsed, e.g., 45 days, and provide these reports to the customer via the Broadband Inbox; 3) defining how the customer reports should be requested, e.g. report ID, date, etc.; 4) providing on-line context sensitive help for all aspects of the Broadband WEB application; 5) providing access to the Broadband User's Guide; 6) providing the ability to spawn separate dialog windows, for example, to explain reporting activity in progress; 7) providing a "send mail" function to provide the customer with a method to create a mail memo for distribution to a help desk; and, depending upon the customer's service option, 8) providing access to custom reporting capability (Ad hoc Reporting) via toolbar and menu; and, 9) providing access to the SNMP features (Get/Set and Alarm) via toolbar and pull-down menu.

Referring back to FIG. 33, the user may select the BB Inbox feature as indicated at steps 954*a*–954*c* by clicking on the BB Inbox icon. By clicking the BB Inbox icon a download of the BroadBand Inbox applet is initiated, as indicated at step 956. Via this applet, the BroadBand View Inbox client requests all available report data (headers) from the Report Location Database as indicated at step 958. Then, at step 960, the RLD returns header information such as report name, id, location, date/time requested, data time produced to the client, and uses the information to auto-populate the entries in the Broadband Inbox at step 962. The report availability is then displayed in the BB Inbox (client) screen at step 964. It should be understood that by the time a user has received the welcome packages from nMCI Interact, backend data collection and report generation activities at the appropriate level of service have already begun. As a result, completed reports are available at the first login.

FIG. 34(*b*) depicts an example Broadband view Inbox screen display 1740 having a screen area 1745 for displaying the currently available reports. Referring back to FIG. 33, a user may retrieve any report for viewing by double clicking on the report desired which action causes a request for the report and the appropriate viewer to be sent to the BroadBand Server, as indicated at step 968. BroadBand Server responds by locating the file (using the RLD) and transferring the file to the user and the appropriate viewer to the client. In the preferred embodiment, the user is enabled to display comma separated value ("CSV") textual reports, as indicated at step 971; network health multigraph reports, as indicated at step 972; and, map reports, as indicated at step 973.

Thus, in the preferred embodiment, the Broadband Report Viewer component includes Java applet viewer classes that enable the downloading and display of performance reports generated from the Broadband server 860. In the preferred embodiment, there are at least two types of viewer classes providing the following reports: 1) Monthly Network Health Reports which are static standard and multi-graph reports having three information areas: i) domestic latency, i.e., network delays; ii) delivery, i.e., network throughput; and iii) Peak Utilization, e.g., based on committed information rates; and, 2) Daily Network Health Reports which are static standard and multi-graph reports having the domestic latency, delivery and Peak Utilization reporting views, in addition to a fourth reporting Exceptions view. Besides having the ability to select reports on a daily or monthly basis, a custom reporting Java applet is provided to enable customers to select Broadband "ad hoc" (one time) reports at any previously defined interval. For example, a customer may have a standard "Daily Throughput Performance" report delivered each day. However, for a particular day, the same customer may choose to submit an ad hoc "Throughput Performance" report for a previous time interval, e.g., previous week, or previous month. In the preferred embodiment, the Broadband web server adds completed report data in CSV to the Broadband Inbox server 270 which component enables the client reporting viewing process 215 to display reports. Particularly, the BB client application loads the report viewer, which loads the requested report and displays it to the user. For CSV/spreadsheet reports the user has the option to manipulate the data in the viewer. When viewing multi-graph reports such as the Network Health report, the viewer provides drill down capability: by double clicking on a section of a graph, the supporting data is displayed.

The Broadband Report Viewer component additionally includes Java applet classes enabling the display of customer configuration maps which are two dimensional maps having certain locations highlighted, e.g., customer gateways, in addition to lines connecting two or more locations representing a customer's dedicated data transport paths, e.g., permanent virtual connections ("PVC"), as will be hereinafter described in further detail. Besides having the ability to generate network performance reports and configuration maps, the Report Viewer component of the Broadband Reporting tool includes Java applet classes enabling the presentation of real- or near real-time alarm and network event data obtained from the network management platform, "NetExpert" 870 as shown as FIG. 31. Via a proxy application 871, events and alarm notifications are sent to the BB server 860 which processes the alarms for communication through the dispatcher/BBProxyServer applications directly to the BB client 852, via secure TCP/IP socket messaging, as will be described in greater detail hereinafter.

Referring back to FIG. 34(*a*), the selection of the report suppression option 1726 will enable the presentation of a BB view report suppression screen 1750, an example screen of which is shown in FIG. 34(*c*). From this screen, the user is enabled to suppress or enable the particular selected report name, type, schedule, by selecting pull-down menu 1755.

Furthermore, as shown in FIG. 34(*a*), the selection of the archive option 1728 will enable the presentation of a BB view archive report screen 1760, an example screen of which is shown in FIG. 34(*d*). From the screen of FIG. 34(*d*), the user is enabled to select the archived report to be displayed at the BB Inbox by name, type, scheduling period, and reporting time period in entry fields 1769. Details of the process flow in generating the Broadband archive reports corresponding to the archive option screen of FIG. 34(*d*) is described in above-referenced, co-pending U.S. patent application Ser. No. 09/159,407.

As further shown in FIG. 34(*a*), the selection of the circuit location option 1730 will enable the presentation of a BB view circuit location screen 1762, an example screen of which is shown in FIG. 34(*e*). From the screen of FIG. 34(*e*), the user is enabled to retrieve network configuration information pertaining to that customer's network by clicking the appropriate circuit id and location field from a list 1763. By clicking on this field, a textual report containing circuit configuration information may be displayed. The preferred method of reporting to a customer the current configuration of their MCI supplied virtual data network is via a web base geographical image map. The Broadband mapping report and Customer Configuration Map report are available for customers of all levels of service via the Broadband reporting system.

Preferably, all Broadband customers receive a basic report set comprising information on utilization, throughput and treatment of data transmitted over their virtual data networks as part of the default report set for the selected service option. Each service, e.g., SMDS and Frame Relay option, is provided reports specific to the performance indicators of that service (e.g. utilization, throughput and treatment of data transmitted over the virtual data network). The actual reports and the reporting interval may be unique, based on the type of report although default reports are available. A Customer Configuration text report is included within a default set of reports. The mapping report is preferably updated on a daily basis based on changes that have occurred within the customer's network in the previous 24-hour period. As the update is dependent upon a successful completion record, update latency can be greater than 24 hours from the actual event causing the change.

The data source for the customer's Configuration Map and Customer Configuration text reports includes: a customer name; Billing id; contact (name and phone number of customer representative for this account ); customer's mailing address; and the company providing FR service, e.g., MCI; a location field comprising a mnemonic identifying the MCI point of presence (POP), i.e., the city and state where the circuit is located; a circuit name assigned in circuit order management system for customer's FR access; a gateway field containing a mnemonic identifying the gateway that services this circuit; a Network Mgt. ID field that identifies the "NetExpert" system (FIG. 30) address by gateway, slot, port, and channel in the router card cage for this circuit; a Bandwidth field indicating circuit speed; a # PVC field indicating the Number of PVCs associated with this circuit (circuit name); a CIR total field indicating the sum of the CIRs for all PVCs on this circuit; an OVR SUB (%) field indicating the CIR Total (above) divided by the bandwidth times 100; a PVC field indicating a PVC number; a Gateway field comprising a mnemonic identifying the gateway that services the circuit on the A side of the PVC; a Circuit field indicating the circuit name assigned to the A side of the PVC; a DLCI field indicating the DLCI assigned to the A side of the PVC; a CIR field indicating the CIR for the A side of the PVC; a Gateway field comprising a mnemonic identifying the gateway that services circuit on the B side of the PVC; a Circuit field indicating the circuit name assigned to the B side of the PVC; a DLCI field indicating the DLCI assigned to the B side of the PVC; and, a CIR field indicating the CIR for the B side of the PVC.

As mentioned above, the BB Report Viewer component includes the capability of displaying maps. The Map viewer displays all available (BB enabled) circuits provisioned for the user. Clicking on a circuit enables a display of the latest statistics for the circuit. All display functions including sorting, saving to disk and printing the report are executed by the viewer locally.

Figure 35A:
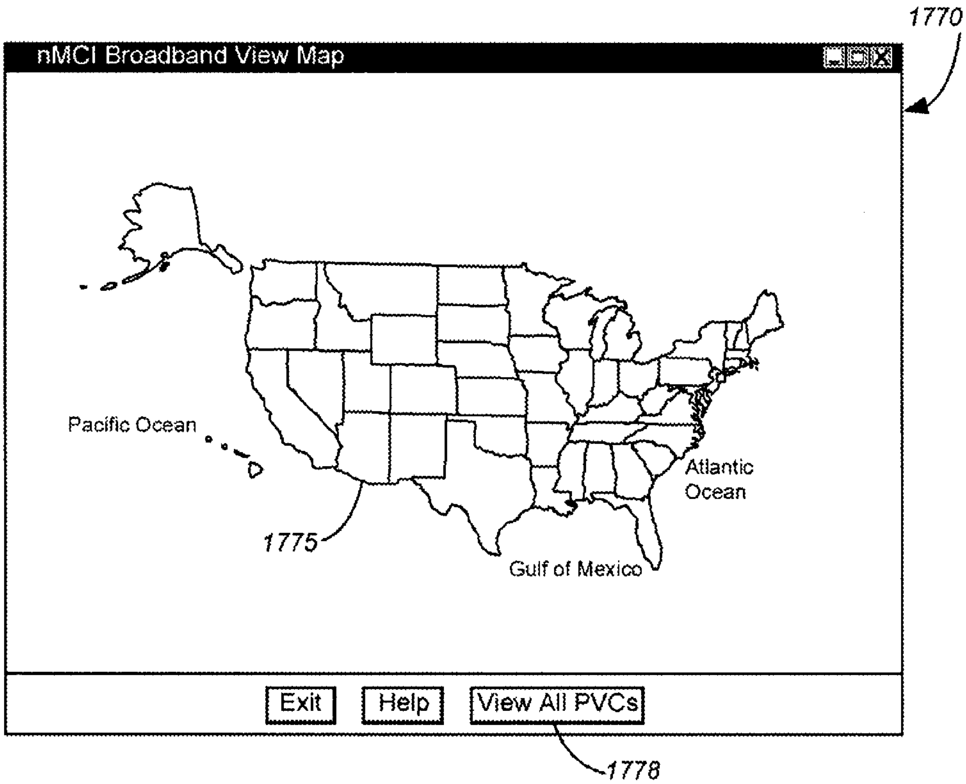
FIGS. 35(*a*)–35(*b*) illustrate two example views presented by the Broadband map viewer.
Figure 35B:
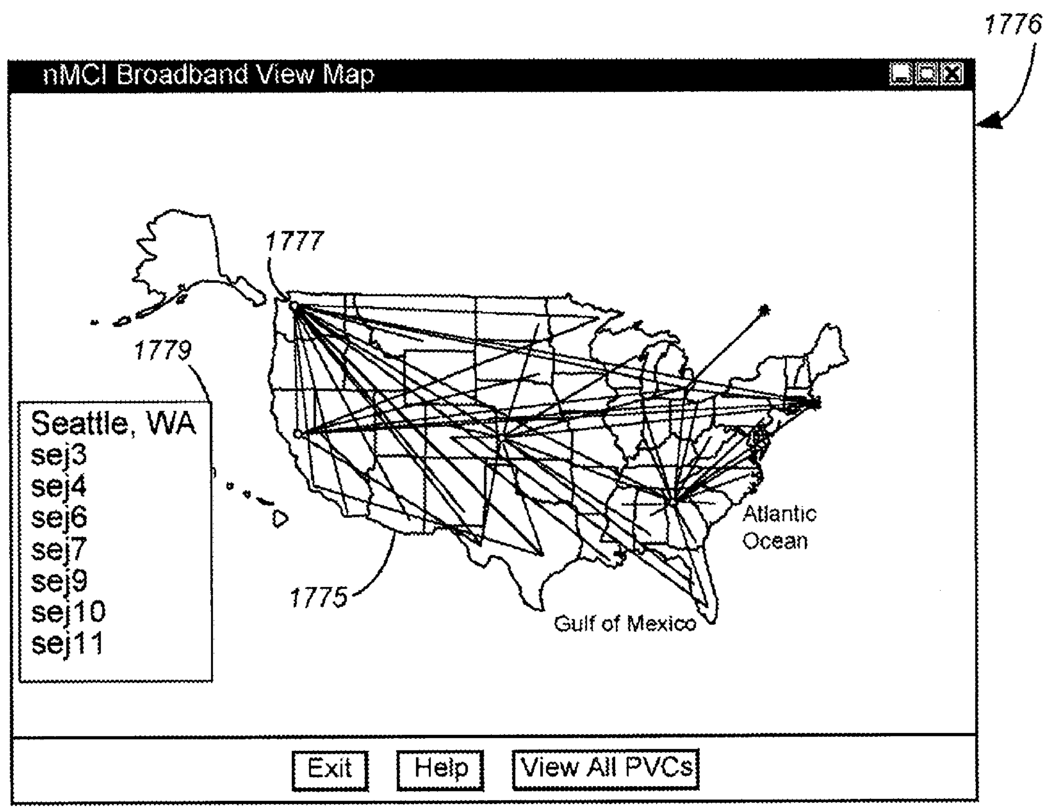

In the preferred embodiment, there are two graphical views of the configuration report to support both the Standard and Enhanced service level options: FIG. 35(*a*) illustrates the first map view 1770 which presents a two dimensional map of the United States with all end points of a customer's virtual data network represented with an indicator 1775, e.g. a star; Each star represents a customer's circuit end point location within an MCI data network, but may also indicate non-domestic frame relay, SMDS or LEC access end points. As shown in the FIG. 35(*a*), selection of the "View all PVC's" button 1778 enables the presentation of all circuits supported in the network. A second map view 1776 may also be displayed such as shown in FIG. 35(*b*). From this view, the customer may drill down on a selected endpoint by clicking on an identified location 1777 and receiving a changed view (text box) that includes a description 1779 of the physical circuits supported by that network end point. Thus, a click on any identified point provides greater detail about the circuits supported from that end point including: circuit location; Circuit number; Gateway mnemonic; Network Management ID; Bandwidth; # PVC; and, CIR Total. As shown in FIG. 35(*b*), lines connecting PVC end points are also drawn by a mouse click on an identified end point. In the preferred embodiment, map views of FIGS. 35(*a*) and 35(*b*) are supported by invocation of Java applets which have the advantage that an image map implemented as a Java applet provides instant feedback to users. When a user clicks on a map displayed by a Java applet, the applet locally computes a response to the click and instructs the browser to load a new page.

Referring back to the report retrieval process flow 400 illustrated in FIG. 33, at step 964, the customer is further enabled to delete a report by selecting the delete report option. To delete a report, the user highlights the report in the Inbox listing (FIG. 34(*b*)) and selects a delete function, as indicated at step 966. In response, at step 970, the client submits a delete request to the BB Inbox Server which locates the report, logs the request, deletes the file, and returns an acknowledgment to the client, as indicated at step 974. Upon receipt of the acknowledgment, the Inbox client refreshes the display to reflect the deletion. Errors in the deletion activity result in an error message which is logged at the server, and returned to the Inbox client. In response, the client may notify the user of the deletion failure by a pop-up dialog box on screen.

For the case of accessing SNMP capabilities, an SNMP application is launched from the Broadband SNMP Main Display Application if the customer has the SNMP dedicated or PRS Enhanced service option. Specific responsibilities of the SNMP application include: 1) providing SNMP Get/Set operations including: obtaining the selected variables from the Enterprise MIB upon initialization; 2) communicating with BBProxyServer and Broadband server database; 3) invoking Get/Set operations on MIB and returning results and displays; 4) providing an Alarm Panel for displaying alarms and event reporting; 5) handling customer near real time notification of updates to these alarms if the customer's web browser is pointed to a Broadband web page; and, 6) providing customer with SNMP get capability for the lowest interval data, e.g., 15 minutes to 1 hour.

Thus, as further shown in FIG. 34(*b*), the selection of the SNMP Alarm option 1724 enables the presentation of a BB alarm panel screen 1765 an example screen of which is shown in FIG. 34(*f*). From the screen of FIG. 34(*f*), the user is enabled to retrieve and view their virtual network alarm conditions including the following indications: an alarm type; circuit id; alias; alarm severity level; alarm trap level; alarm description; and, date of the alarm. Details regarding the process flow in providing near-real time Broadband alarms is found in above-referenced, co-pending U.S. patent application Ser. No.09/159,407.

In one embodiment, as shown in FIG. 34(*f*), the alarm data is handled by listing all of the PVCs and the associated Access Circuits as well. For each PVC and Access circuit all relevant events and alarms will be displayed. Preferably, color coding is used for indicating alarm severity in compliance with OSI standards, e.g., orange for major, red for critical. In the preferred embodiment, Broadband alarms may be grouped into two categories: Network Detected alarms and User Defined alarms. Network Detected alarms include: "Set alarms" that are generated when a condition exists indicating service degradation or failure, and "Clear alarms" which are generated when a previously set alarm condition no longer exists. Particularly, in order for alarm data to be updated, the alarm collection server process invokes two methods on BBProxyServer: 1) a "recordAlarm" method which records an alarm and writes the alarm data to the database; and 2) a "clearAlarm" method which clears an alarm and removes it from the database.

It should be understood that all Network Detected Alarms are event-based and discovered by SNMP Network Management tool. User Defined Alarms include "Ad-Hoc Threshold" alarms which are generated in instances where a customer set value in a custom report is exceeded. The alarms are generated as the reports are updated, based on the polling frequency, and only when the customer set threshold is exceeded. User defined alarms additionally includes SNMP alarms which are generated when a customer defined alarm condition exists based on the SNMP service.

Assuming that order entry for the user has been completed and the user is provisioned with a level of service which includes SNMP functionality, the user has additional access to SNMP functions Get and Set. The Get and Set represent paired functionality which is accessed when the user selects the SNMP Get/Set option 1732 from the BroadBand View Main Display of FIG. 34(*a*). The selection of the SNMP Get/Set option 1732 enables the presentation of a BB SNMP Get/Set screen 1731, an example screen of which is shown in FIG. 34(*g*). From the screen of FIG. 34(*g*), the user is enabled to: Get SNMP statistics and Set SNMP name.

Particularly, the process flow for providing SNMP Get/Set capabilities begins by invocation of an SNMP applet which is sent to the client workstation by the BB Server application. By selecting the SNMP Get/Set button 1732 (FIG. 34(*a*)) from the main display causes the creation of a SNMPGetSetApp (COApp) object to manage the session and create a series of objects, SNMPGetSetFrame, SNMPGetSetView, SNMPGetSetModel and SNMPGetSetController to handle the presentation to/interaction with the user. This also results in the presentation of the get/set display window (FIG. 34(*g*)) having a dialog box 1731 presenting the user with the customer, PVC or circuit to be queried. Particularly, the SNMP client stub invokes the following BBProxyServer methods for populating the dialog box with the PVC and circuit information: 1) a getSnmpCategories( ) method for communicating the request to retrieve SNMP variables from the MIB; 2) a "getPVCList( )" method for returning a list of customer PVC's; and, 3) a "getCircuitList( )" method for returning a list of customer's access circuits, i.e., circuit IDs. Preferably, the appropriate service is invoked on BBProxyServer, the BroadBand database is queried and the results are returned to the customer browser for display. The user selects the desired SNMP category 1733, e.g., customer, PVC, or access circuit, to be queried. For instance, as shown in FIG. 34(*g*), the selection of the PVC Statistics category 1733 will enable the variable list box 1735 to be updated with a list of only those variables from the selected category.

When a SNMP variable "GET" operation is desired, the user selects the particular SNMP variable. Then, the user invokes the get operation by selecting the GET button 1738 from the Get/Set display of FIG. 34(*g*). Selection of the GET button causes the SNMP client stub to invoke the BBProxyServer side "getAttribute" method which returns object <String>, the string being an SNMP attribute name, to the customer browser. By invoking the"getAttribute" method, the request is submitted to the BB server and communicated to the MIB to retrieve SNMP attributes, e.g., circuit and PVC statistics. The MIB obtains the latest SNMP data, transfers the data to the BB server, and returns control to the BB Client which handles the display of the data to the customer (FIG. 34(*g*)). Particularly, the BB server issues a GetService request in turn to the MIB on the appropriate switch(es). The MIB locates the latest polled status information and returns the data to the server, which passes the data back to the client with a GetService Response message. Upon receipt of the data, the client closes the thread and updates the display. Finally, the user may submit requests for SNMP variables from other circuits, or, may end the session.

Above-referenced, co-pending U.S. patent application Ser. No. 09/159,407 describes the valid customer attributes that a client may receive.

Likewise, when the user desires to Set a circuit name, the user first selects the particular SNMP variable and further, enters the "alias" variable value for the selected SNMP circuit. This "alias" variable value is entered in the "value" entry field 1737 as shown in FIG. 34(*g*). Then, the user invokes the set operation by selecting the SET button 1739 from the Get/Set display of FIG. 34(*g*). Selection of the SET button causes the SNMP client stub to invoke the BBProxyServer side "setAttribute" method which updates the selected SNMP variable in the Broadband database sets. By invoking the "setAttribute" method, the request is sent to the BB server which issues a setService( ) request to the MIB on the appropriate switch(es). The MIB changes the (user defined) alias assigned to the circuit and returns an acknowledgment to the server, which passes it to the client with a SetService Response message. Upon receipt of the data, the client closes the thread and updates the display, acknowledging that the circuit name has been changed. Finally, the user may submit new requests to set SNMP variables from other circuits, or, may end the session.

The nMCI Interact suite of network management applications further includes an event monitor tool 1000 for enabling customers to monitor, over the Internet or a company Intranet, their dedicated voice and data circuits. A Web-based user-friendly interface presents network alarms on degraded or broken circuits and provides network performance and alarm information, thereby effectively increasing the efficiency of troubleshooting and allowing customers to make informed network management decisions. It should be understood that the event monitor tool may be integrated with the Broadband network reporting service to provide a comprehensive data and voice network performance reporting and alarm monitoring system.

More specifically, the Event Monitor tool 1000 of the nMCI Interact System gives customers the ability to: exercise alarm management from a single workstation, the management including, triggering the alarms and clearing the events; acknowledge or recognize new alarm conditions as they occur; receive notification of fiber outages that impact their data circuits; define or display customized troubleshooting procedures for specific alarm or circuits; access a comprehensive database of their dedicated voice and data circuits; display or print lists of active alarms; define or display customized alarm filters to specify which alarms will appear in the alarm presentation; and generate reports about network performance.

Figure 36:
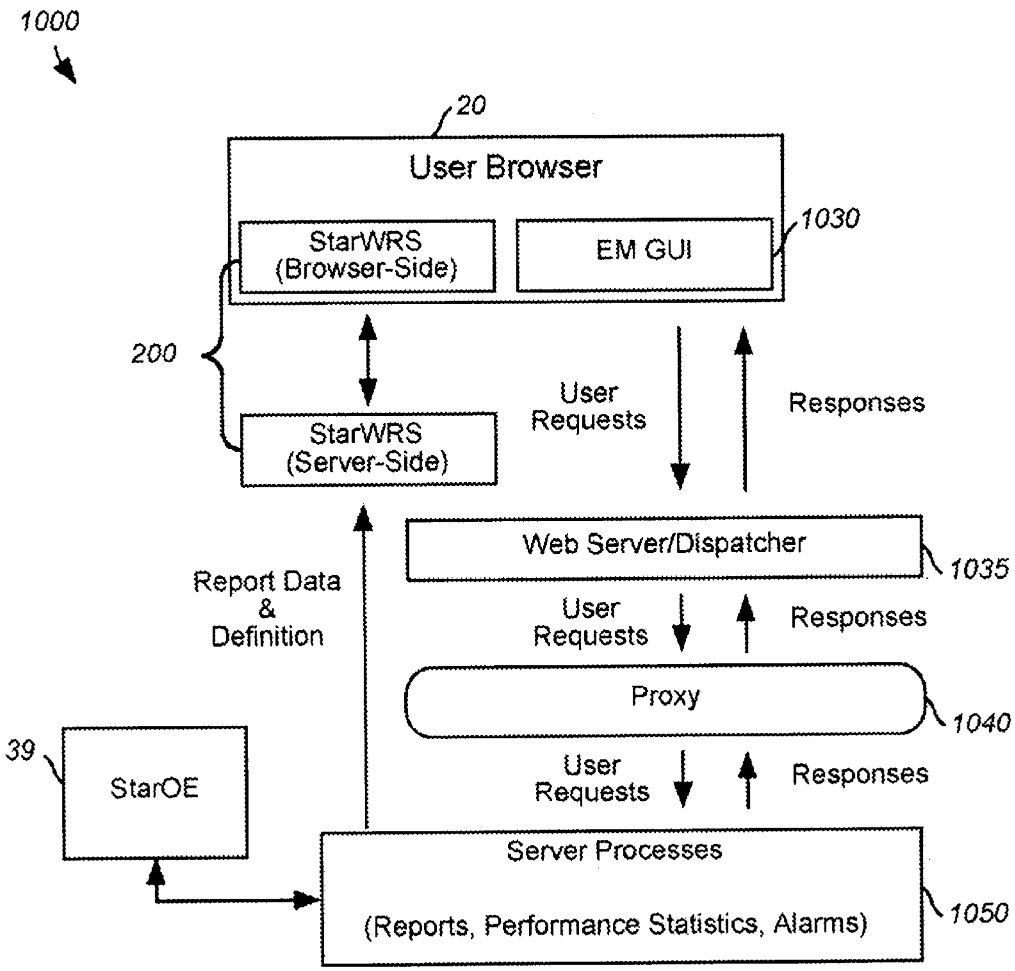
FIG. 36 is a block diagram illustrating an overview of the event monitor component of the nMCI Interact System.

A general block diagram illustrating the event monitor system architecture 1000 is shown in FIG. 36. Generally, as shown in FIG. 36, the Event Monitor system 1000 is integrated within the nMCI Interact system comprising: the user web browser 14 which employs an event monitor GUI 1030 enabling the generation of requests and receipt of responses from various event monitor system server processes 1050 over the Web/Internet via a secure socket connection for presentation of event monitor's alarms and reports; report viewer 215 and requester processes 212 (FIG. 10) of the StarWRS tool 200 which provides the support for generating and presenting reports relating to the conditions of the customer's voice and data networks as described herein; a corresponding server side reporting component having the above described inbox, report scheduler and report manager components, in addition to alarm and report viewer and requester components implementing Java applets having viewer classes that enable the downloading and display of performance reports generated from event monitor server processes 1050. In the preferred embodiment, the viewer classes provide the following types of network alarms on dedicated circuits that carry the following service types: inbound services, e.g., toll free and 900 numbers; outbound services, e.g., Vnet/Vision, and PRISM; and data services such as TDS 1.5. The circuit types for which the present invention presents network alarms include: dedicated access lines such as DALs; TDS 1.5 circuits; TDS45 circuits, DDS/DSO point to point circuits; ISDN DALs; and SW 56 DALs. In addition, the event monitor reporting feature enables customers to review alarm data over a period of time by creating and saving reports. The reports which may be generated include alarm summary, alarm detail, alarm duration, data circuit performance, and DAL performance. The alarm and performance reporting scheme effectually allows the customers to perform alarm trending and analysis, and to correlate alarm occurrences to network availability, network performance and problem resolution. Reports for fault reporting may be requested through the report requester component of StarWRS, and retrieved from the STarWRS inbox. Recurring reports may be requested on a timely basis, e.g., hourly, daily, weekly, and monthly. Moreover, through the report requester, a user may specify whether the user should be paged or e-mailed when a report is in the inbox.

Also shown as part of the event monitor system architecture 1000 of FIG. 36 is the web server/dispatcher component 1035 which provides for the transport between the web browser and an event monitor proxy interface including all authentication and encryption. Thus, secure communication from the customer browser to a DMZ web server is enabled over a first TCP/IP socket connection, such as SSL, and communication from the DMZ web server over an enterprise firewall to the dispatcher server is enabled over a second TCP/IP socket connection. These secure paths enable customer requests and server responses to be communicated from the client browser to the event monitor server 1050.

Specifically, the dispatcher forwards user requests to the event monitor server process 1050 that employs an integrated proxy application 1040 for receiving and interpreting the user messages and enabling the event monitor functionality. This proxy capability includes a multithreaded engine enabling multiple, simultaneously executing sessions supporting anticipated user load. The interface between the dispatcher server 1035 and the event monitor proxy process 1040 is also message-based, e.g., employing TCP/IP socket transport, and, as will be described, a defined messaging protocol which includes a generic message header followed by proxy-specific data. In the other direction, the same process is employed, i.e., the event monitor proxy 1040 sends the generic header followed by the proxy-specific response back to the dispatch server 1035 for communication over the firewall (not shown) and back to the user browser 20.

In the embodiment shown in FIG. 36, the necessary CSV data files and report definition metadata files may be downloaded to the StarWRS inbox messaging server 270 for eventual presentation to the StarWRS browser-side components 212, 215 for subsequent access. It should be understood, however, that all event monitor responses including CSV data files and report definition metadata files are forwarded through the dispatcher and intervening DMZ web servers for eventual display at the client. Additionally, the event monitor may return a report object of variable length which includes the report data to be displayed at the client workstation.

In a preferred embodiment, the event monitor server 1050 performs the various database queries and function calls in response to requests received from the customer via the event monitor proxy 1040. Particularly, the event monitor server 1050 is responsible for all tasks leading up to and including the management of alarms and performance reports including data collection, calculation, storage, and report generation.

In operation, the event monitor server 1050 supports communication with the StarOE server component 39 which provides order entry functions including functionality necessary to manage (create, update, delete) event monitor users, and allows for a feed of the appropriate order entry information to the event monitor server in order to properly associate the appropriate event monitor functionality and data to the right customer once given admission to the event monitor service. Thus, a messaging interface is provided between StarOE 39 to the event monitor server 1050 functioning as a client to receive authentication information including logon user identifiers which are supplied in response to launch of the event monitor GUI applet 1030. The billing identifiers and levels of services, including the specific entitlement information are supplied from StarOE 39 to the event monitor server 1050 via flat files which may be generated daily.

From the back-end legacy host, the event monitor server 1050 receives statistics on voice (DAL) and data (TDS 1.5) services for providing its functionality to the event monitor users. The DALs are groups of dedicated 64K circuits that carry voice traffic to and from a customer's premise terminating equipment, i.e., PBX, to a telecommunication service provider's switch. A TDS 1.5 data circuit is a dedicated point-to-point circuit that spans from one customer location directly to another. The data circuit includes at least two monitoring units, called Extended Superframe Monitoring Units(ESFMUs or ESF Cards), which generate alarms and collect statistics on the performance of the circuit. Alarms are presented near real-time and indicate that there is a failure associated with the data circuit. Performance statistics are compiled in 15-minute intervals and are used to derive performance alarms that provide the users with the indication that their network performance is degraded before the problem becomes service impacting.

Performance statistics are compared against pre-set performance parameters and deviations from these parameters are recorded. When a given threshold is exceeded, alarms are generated and notification is sent to the customers such that the customers may then view alarms and take necessary steps to correct the problem. The performance parameters and thresholds may be modifiable via the event monitor GUI applet 1030 by those customers having proper access level entitlements as verified by the StarOE 39. Each of the components shown in FIG. 36 and their respective processes will be described in further detail herein.

Event Monitor GUI Client Application

All alarms and reports for event monitor are accessible via the "networkMCI Interact" alarming and reporting structure established within the nMCI Interact home page 79. Event monitor alarms are viewed via an alarm monitoring system in which both broadband and event monitor alarms may appear. The event monitor GUI client application is launched via the event monitor icon 87 on the home page (FIG. 5(*a*)). Reports for fault reporting may be requested through the report requestor component of StarWRS, and the inbox server.

In the preferred embodiment, the event monitor GUI client application 1030 is launched by selecting the event monitor icon 87 from the "networkMCI Interact" home page (FIG. 5(*a*)). The event monitor GUI client application provides a menu bar, toolbar, and status bar for accessing event monitor services depending on the customer's service subscriptions. Event monitor service availability is determined by user logon session with StarOE server 1060. If the user is not entitled or does not have authorization for a particular service, the corresponding toolbar icon or menu item is disabled. Thus, in accordance with the customer service option, the corresponding service icon and/or menu item is not activated and would not respond to a user input.

In providing its basic services, the event monitor display applet may have the responsibility of: 1) requesting reports that are no longer on the inbox server to be retrieved from a report data archive if a pre-determined period of time has elapsed, e.g., 45 days, and provide these reports to the customer via the inbox; 2) defining alarm thresholds and parameters and trouble shooting procedures; 3) defining how the customer reports should be requested, e.g., report id, date, etc.; 4) providing on-line context sensitive help for all aspects of the event monitor web-based application; 5) providing the ability to spawn separate dialog windows, for example, to explain reporting activity in progress; and 6) providing access to custom reporting capability via the toolbar and menu.

In the preferred embodiment, the event monitor GUI application is implemented in Java to ensure platform independence and particularly is developed using many of the networkMCI Interact's common objects as described herein. Particularly, the Event monitor GUI application, via the COApp object, may create its own display space and present its user interface in a separate frame by having the space in one or more COAppFrame windows. The COAppFrame class and its COStdAppFrame subclass are wrappers for the Java Frame class which provide COApps with standard look-and-feel elements and implement some standard behavior, such as participating in COBackPlane's window management functions. The COAppFrame is a desktop window, separate from the browser. It presents the user with a preset layout of a menu, toolbar, status bar, enterprise logo, an application icon, etc., and a main viewing area. Since a separate frame does not need to be located inside a Web page, a concurrent (side-by-side) access to more than one networkMCI Interact application service is possible.

In another embodiment, the event monitor GUI application's startup code may be implemented using the COApplet class.

For determining the user's event monitor service options, the GUI client application requests and retrieves user profiles including the user entitlements from an event monitor customer database populated by a periodic feed (e.g., on a daily basis) from StarOE 39 (FIG. 36).

From the event monitor GUI client application, an alarm management object is also launched upon initialization of the GUI client application. The alarm management object essentially creates a blank user interface and starts a thread to handle communications with the event monitor server for events or alarms. The alarm thread is created to run periodically, e.g., every two minutes. Specifically, the AlarmThread invokes a COAsynchronousTransaction with the web server to poll for current event monitor alarms. When the AlarmThread receives the data back from the web server, it creates a command to update the display and executes the command.

The event monitor alarms are generally grouped into two categories: voice alarms and data circuit alarms, including broadband and SNMP alarms. Voice alarms are further divided into two types: service outage alarms which are generated when a percentage of circuits in a trunk group are not available to complete calls; and traffic alarms which are generated when a percentage of DALs reach a predefined percentage for blockage, terminating failure rates and originating failure rates. Traffic alarms are based on data accumulated for five or thirty minute intervals. Data alarms are divided into two types: service affecting alarms which are generated in instances where the service cannot be used because there is a loss of signal, unframed signal or equipment failure; and performance affecting alarms which are generated when high error rates are received for ten seconds or more, out-of-frame conditions occur or frame slips exist but service is still available. A Drill down view depicting each alarm down to the individual circuit is available via the GUI as will be described below.

Reporting Functionality

As described above, the existing and new event monitor reports may be requested via the report requester, a component of StarWRS. The reports are then posted in the inbox. Customers view the reports by launching the report viewer applet, another component of StarWRS. Once the report is made available, at the customer's preference and selection based on priorities and severity, the customers may receive notification through one or any combination of page, e-mail, or fax in addition to the display option of the notification on the customer's inbox. For example, a customer may choose to receive page and e-mail notification on all level 1 severity alarms and just display notifications in the inbox for level 2 severity alarms, etc.

Recurring reports may also be created by the user to run on a timely basis, e.g., hourly, daily, weekly, and monthly, as well as ad hoc (one time) reports. For example, a customer may have a standard DAL performance report delivered on a daily basis, and on a particular day, the same customer may choose to submit an ad hoc DAL performance report for any given interval, i.e., previous hour, previous several hours or days.

In addition, the event monitor may provide the ability to drill down within customer's premise equipment to view a breakdown of the customer's equipment and the ability to monitor performance and report alarms on individual channels within each circuit. Giving customers the capability to create and save a variety of reports and graphical views allows them to perform customized trending and analysis for maintaining better control and problem resolution schemes during their network management process.

Moreover, the event monitor presents via the report viewer applet, the map of the continental U.S. (World for global customers/services) for purposes of displaying the configuration of a customer's network. The customer may view their sites, the various connections between any two or more of these sites, and information about each specific site and circuit. The topographical mapping display allows customers to see a logical depiction of their network. The ability to drill down into individual sites, nodes and circuits are also available via the viewer applet. For example, if a customer has a circuit between New York and Los Angeles the highest level of the map shown may be the two locations on either end as well as the circuit between them. If a customer clicks on the circuit itself, raw data pertaining to the current throughput of that circuit or any alarm conditions that exist on the circuit may be displayed. Additionally, if the customer clicks on either of the two locations, further drill down for logical design layout of the customer premise equipment, such as a DSU or CSU, may be enabled. Furthermore, if alarms are present for that particular site, the drill down view may depict each alarm down to the individual circuit on a 24 channel T-1.

Another type of reporting service provided by the event monitor is called an integrated management services bouncing busy intervals report. This report provides a picture of a DAL group during its busiest time of the day by reporting statistics for the current or one of the previous 7 days at the busiest interval. The busiest interval is defined to be the 30-minute or 60-minute time period in which total usage was at the highest point. Other reports which may be obtained through the event monitor include: monitoring and performance reporting of individual DS3 and OC3 circuits, IDSN channels, International voice or data point-to-point private lines, E1 lines; and trunk utilization reports.

Alarming Functionality

The event monitor presents all detected alarms to the customer automatically, without the customer's intervention. The detected alarms within the event monitor are sent to the customers' inbox for spreadsheet display for on-line reviews. All current alarms are retrieved by the customer's web browser GUI applet using polling techniques at session initiation. Customers may define a period of time during which their alarms remain in current status, allowing non-current alarms to be deleted.

In addition to providing alarm notifications to customers, the event monitor may also provide a scheme in which a pre-defined trouble shooting procedure, modifiable by a customer, is launched automatically when an alarm is detected. For example, if an alarm is generated regarding a fiber outage that impacts a customer's toll free circuit, an option allows the user to go directly from the alarm message in the inbox to the appropriate alternate routing plan. In order to integrate two services, i.e., event monitor with toll free network manager (TFNM), the event monitor key data and alarm are communicated to allow TFNM to find the appropriate routing plan associated with the outage. The key data may include: toll free number, service id, circuit id, and type of service, e.g., toll free or broadband. The TFNM application is typically launched directly from an alarm view with the above parameters for finding the associated routing plan. User profile information needed by TFNM for authentication and entitlement verification before actually proceeding with the alternate routing plan, are also passed as parameters to the TFNM application at the same time.

Performance Metrics

The event monitor follows and conforms to general "networkMCI Interact" reporting standards in order to provide a consistent and common interface to the customers. Weekly reports do not have to be on a calendar week and may cover any consecutive 7 days. Monthly reports are, unlike the weekly reports, calendar based and are defined to cover the entire month. Ad-hoc reports are reports outside the pre-selected reporting structure and are available to customers within two minutes from the point of request by customers.

In a preferred embodiment, the event monitor alarms are distinguished into two types: event-based alarms, and statistical alarms. Event-based alarms are alarms generated on the physical connection between the customers CSU/DSU circuits and the telecommunication service provider's switches, e.g., alarms occurring due to a loss or bring-down of a circuit. In addition, the customer may specify this notification to be sent as a page, fax, or e-mail. In these cases, the notification is sent within the required 30-second window from the moment the alarm is detected by the event monitor.

Statistical alarms are alarms generated due to the percentage of down time or of other statistical nature. Statistical alarms depend on the frequency at which the customer's web browser is polled, e.g., 2–4 minute intervals. Once polling is established and an alarm is detected, the time-to-deliver notification of the alarm is similar to the event-based alarms, i.e., within 30 seconds.

The Event Monitor Back-end Configuration

Figure 37:
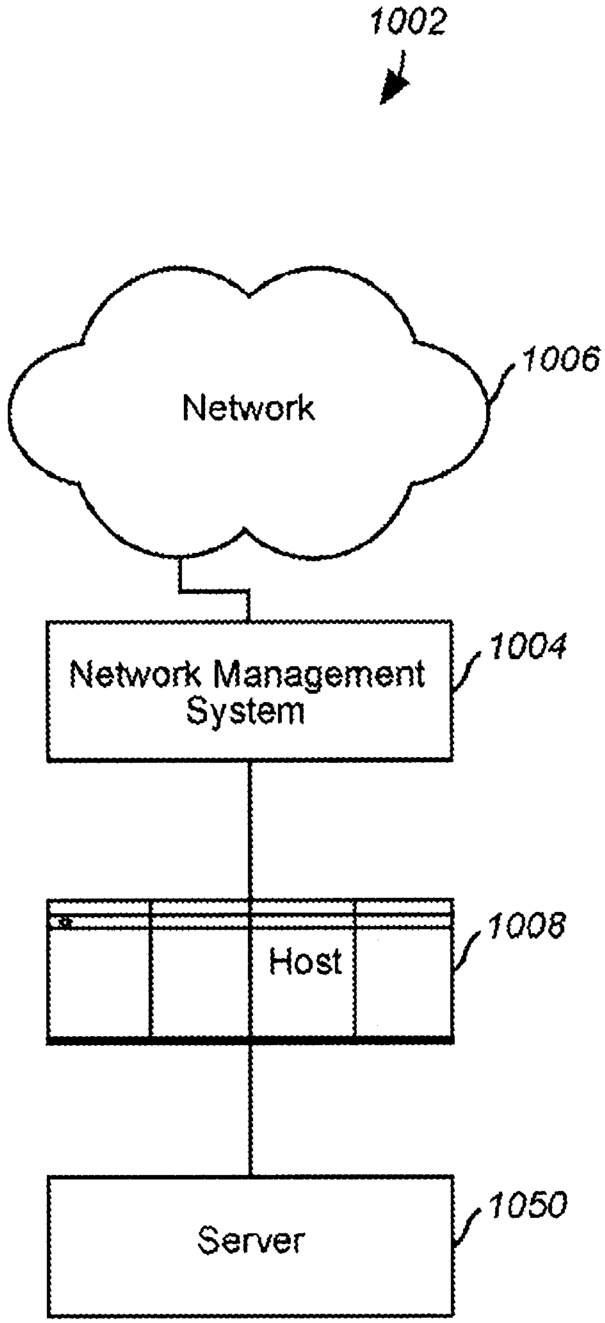
FIG. 37 illustrates an example of a back-end configuration for the fault management system.

FIG. 37 illustrates an example of a back-end configuration 1002 for the fault management system for reporting telecommunication service conditions. The back-end configuration includes a network management system 1004 which collects network events, including alarms and traffic densities from a common carrier network 1006. All of the events collected by network management system 1004 are reported to an event monitor host 1008. The common carrier keeps track of the performance and network faults for network 1006 through a myriad of network management systems 1004 and routes the information in real-time to the event monitor host 1008. In order to provide information regarding a particular customer's leased services, events collected by event monitor host 1008 are downloaded to event monitor server 1050.

Event monitor server 1050 accumulates in near real-time a database of events pertinent to each customer's leased services. The accumulated data is viewable via the client browser application GUI and also via the StarWRS reporting system as described above. Because individual customers may subscribe to various different services which may experience different events, event monitor server 1050 must not only collect different sets of data on a real-time basis, but the client browser application GUI and the reporting system must also present the data in a format relevant to the particular services to which the customer subscribes. This data may be organized for display to the user in an event queue.

Figure 38:
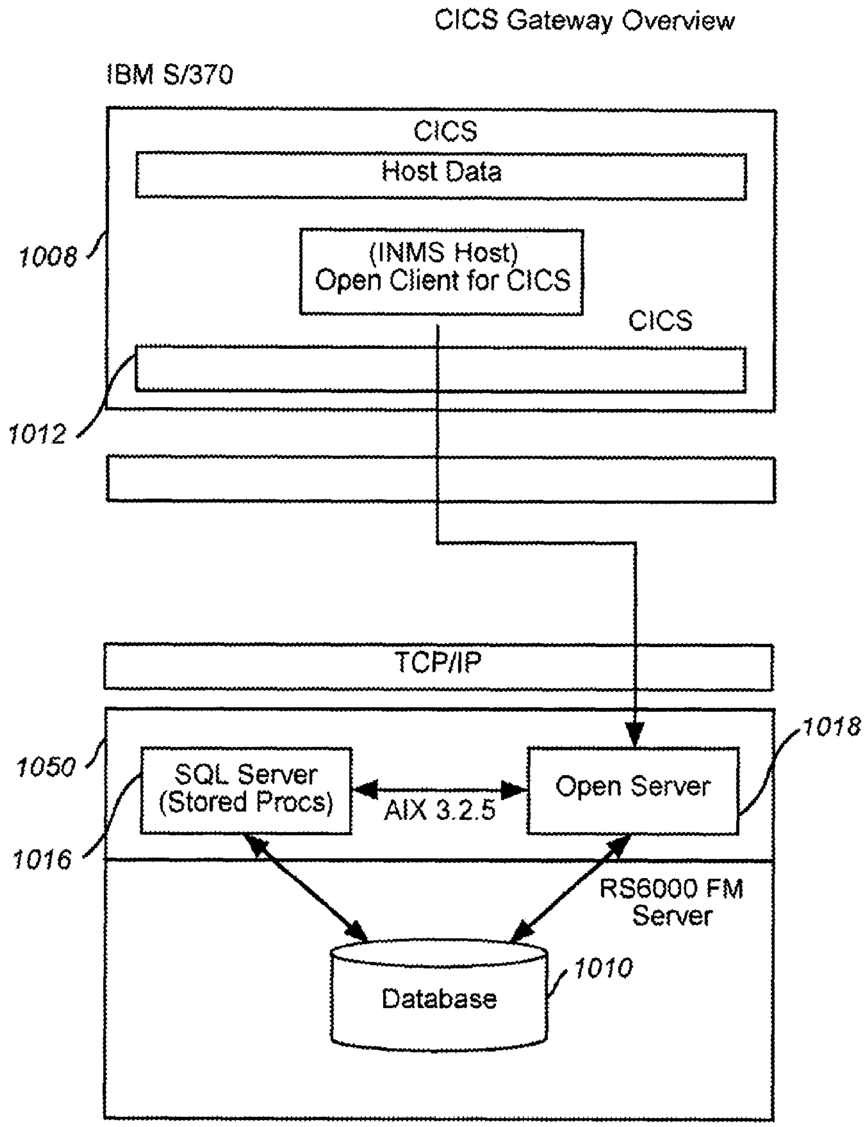
FIG. 38 illustrates an architectural view of a fault management host.

In the preferred embodiment of the present invention, event monitor host 1008 is an Integrated Network Management System (INMS) host implemented as an IBM S/370 mainframe and the event monitor server 1050 is implemented as the DEC Alpha and Sun Solaris; the architecture of this embodiment is depicted in FIG. 38. The present invention may be implemented in other ways, as would be apparent to one skilled in the relevant art.

Referring to FIG. 38, the INMS host 1008 operates in an IBM Customer Information Control System (CICS) environment with a Transport Control Protocol/Internet Protocol (TCP/IP) connection to DEC Alapha event monitor server 1050, which operates under the DEC UNIX operating system.

The Server 1050 comprises two servers: a Structure Query Language (SQL) server 1016 and an open server 1018. Open server 1018 receives events from INMS host 1008 and stores them on a database 1010 stored on server 1050. The SQL server 1016 is a database engine providing access to and managing database 1010. In the preferred embodiment, database 410 is a Sybase® database and SQL server 406 is a Sybase® SQL server.

The Database 1010 compiles information that is sent on a regular basis by INMS host 1008. The data stored in the SQL server may be queried at will by a user via the client browser application for analysis. Database 1010 is a relational database using SQL server 1016 as the database management system (DBMS). In the preferred embodiment, database 1010 comprises a database having four partitions.

The Database 1010 includes a number of tables of data which are accessed by the client browser application GUI to event displays, including alarm displays, alarm report, facilities cross-references and event log displays. In addition to the StarOE authentication and entitlement checking, user access to database 1010 is monitored by SQL server 1016; levels of security may be provided to permit tiers of access to different levels of information within database 1010, as would be apparent to one skilled in the relevant art.

The data within database 1010 is organized in views. For example, an alarm view provides an alarm description, an alarm severity representing the degree of consequence for the alarm, and selected conditions associated with the alarm.

The interface between INMS host 1008 and server 1050 is two-way. In this scenario, the INMS host 1008 is a client, issuing calls for stored procedures to SQL server 1016 via TCP/IP when there is an event to report.

When a new customer is provisioned, the Event Monitor server 1050 makes a client call to an INMS host session and updates the user profile table on the INMS host.

Figure 39:
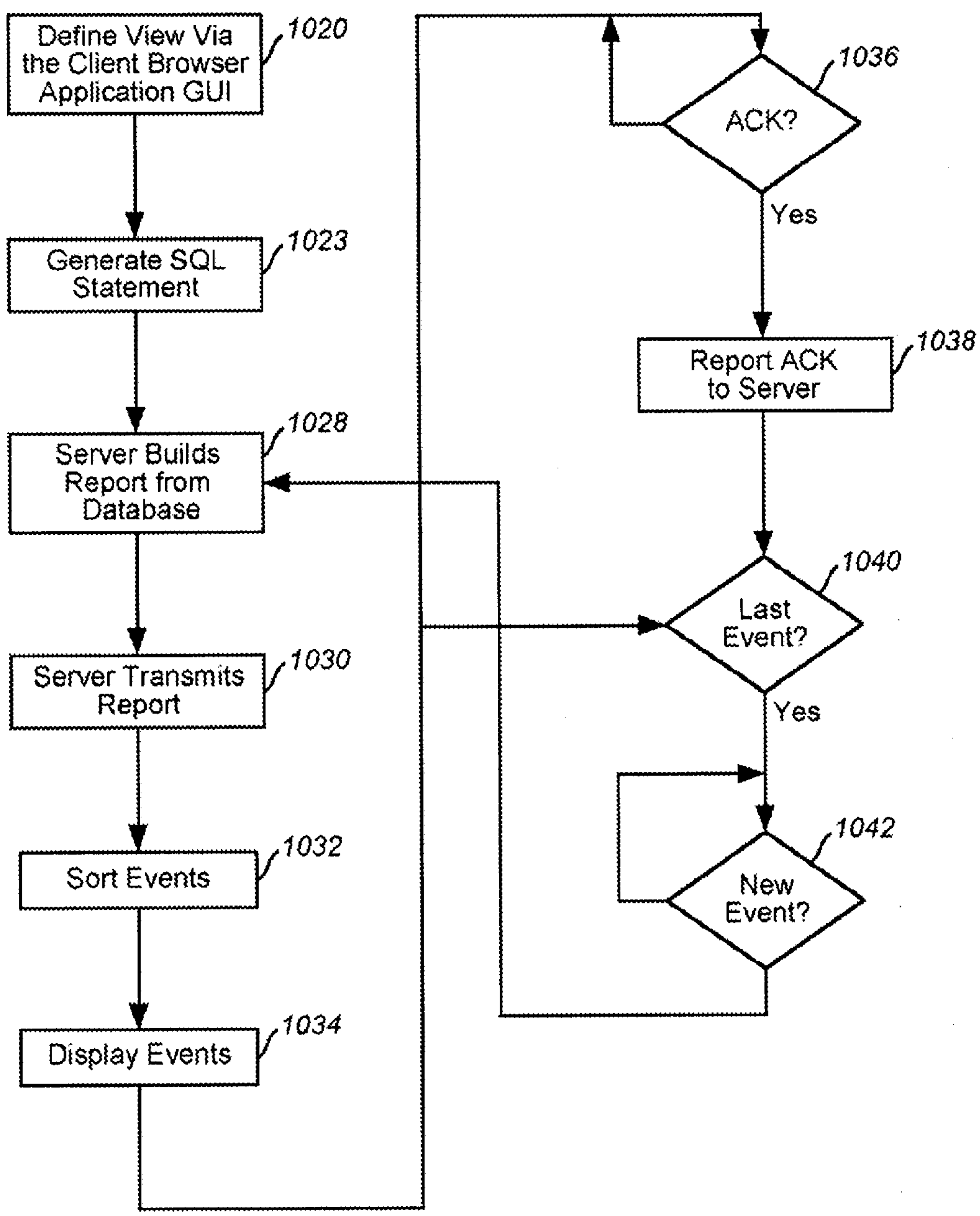
FIG. 39 is a high level logic flowchart depicting the operation of the event monitor component of the nMCI Interact System.

FIG. 39 is a high level logic flowchart depicting the operation of the preferred embodiment of the present invention. Typically, a customer subscribes to several particular leased services. In order to limit data collection to data germane to those particular services, the user must specify the data to be collected. The user does this by defining an event view of data to be collected, as shown in a step 1020. The event view specifies, for example, which services are to be monitored and what data is to be collected and reported for those services. For example, the event view may include the following items: Severity: critical, major, minor, informational, no alert; Service Types (MCI): 800, 900, TDS 1.5, TDS 45, VNET, Prism®, Vision®, ISDN, SW56, and DDS/DDO; Corporate Identifiers: A list of corporate identifiers related to the customer's enterprise and for which the user is authorized access; Facilities: All elements of a physical telephone plant required to provide a service and to which the user is authorized access (for example, trunk groups and circuits); Data Elements: The user can configure a customized event view by selecting the data fields to be displayed; Date and Time Elements: The user can configure a customized event view by selecting the date and time period for the custom event view; Sort Order: The user can configure a customized event view by selecting, for example, the data fields on which the data to be displayed is sorted.

Once the event view has been defined, the client browser application transmits a transaction request to the server 1050 via the web/dispatch server. A pre-defined stored procedure, which takes as input a "where" clause and an "order by" clause, is used to create the event view from data stored in database 1010. In the preferred embodiment, the SQL statement is constructed such that each element/field is joined by an "AND" and values within each element/field are joined by an "OR." Thus, a partial SQL statement would be similar to:

```
Severity=critical OR severity=major
  AND
Service Type=VNET
  AND
CORPID=123434 OR CORPID=32432423
  AND . . . etc.
```

The SQL statement created in step 1023 is forwarded to SQL server 1016. The SQL statement identifies to SQL server 1016 the particular stored procedure to be activated to obtain the event view specified by the SQL statement. The SQL server 1016 then executes the stored procedure and builds a report of event data specified by the event view, as shown in a step 1028.

Once the event report is built, it is sent to the client browser via the web/dispatcher servers. The events are typically loaded into an event queue, which is a pass through mechanism existing between the INMS host and the Sybase database. The events in the event queue are sorted by sort criteria entered by the user when defining the event view, as shown at step 1032. In a preferred embodiment, the primary sort criterium is severity. The sorted events are displayed to the user on the client browser application GUI in a step 1034. Each event displayed is accompanied by an acknowledgment field for the user to indicate his acknowledgment of the event; for example, the user may acknowledge an event, if so authorized, by entering an asterisk in the associated acknowledgment field. When the user acknowledges an event, as indicated by the "Y" branch from step 1036, the client browser application reports the acknowledgment to server 1050, as shown at step 1038. When the user has acknowledged the last event in the event queue, as indicated by the "Y" branch from step 1040, event processing ends. At this point, the user may either retain the session or close it.

If the session remains open, server 1050 will report new events defined by the event view as they are received by server 1050. When server 1050 receives a new event, as indicated by the "Y" branch from step 1042, processing resumes at step 1028, as shown in FIG. 39.

Thus, in accordance with the event view defined by the user and communicated to event monitor server 1050, reports of events identified in the event view may be periodically forwarded, based upon a customer configurable interval, to the client browser application, and made available in an event queue for display to the user in order of the severity of the event.

The Event Monitor Proxy

U.S. patent application Ser. No. 09/159,517 entitled INTEGRATED PROXY INTERFACE FOR WEB BASED ALARM MANAGEMENT TOOLS, the contents and disclosure of which is incorporated by reference as if fully set forth herein, describes the Event Monitor proxy process for validating, translating, and communicating customer requests to the fulfilling back-end system. Validation includes of parsing incoming requests, analyzing them, and confirming that they include validly formatted messages for the service with acceptable parameters. If necessary, the message is translated into an underlying message or networking protocol. If no errors in the message are found, the proxy then manages the communication with the middle-tier server to actually get the request serviced. The application proxy supports application specific translation and communication with the back-end application server for both the Web Server (java applet originated) messages and application server messages.

Proxy functions and utilities provided include enabling multithreaded proxy functionality in order that the proxies may service multiple clients simultaneously.

In general, the Event Monitor proxy (FIG. 36 at 1040) servers 1) invoke methods received when their corresponding client side stub method is invoked by the browser 1030 and; 2) return responses for the requesting client side stub method, if required.

In particular, the Event Monitor Server proxy 1040 is a process with multiple interfaces to the Event Monitor Web server database and GUI 1030, each interface providing method signatures for a series of discrete services via specific Java methods. These interface/method combinations include: 1) HSAlarmServerInterface which provides SNMP alarm functionality via 1a) getAlarmList method; 1b) recordAlarm method; and 1c) clearAlarm method. 2) HSMapServerInterface which provides graphical configuration mapping functionality via 2a) getSwitchLocations method; 2b) getAccessCircuits method; and 2c) getPVCList method; 3) HSReportServerInterface which provides report management and delivery functionality via 3a) getReport method; 3) b getReportList method; 3c) getInboxReports method; and 3d) setReportGeneration method; 4) HSServerInterface which provides Broadband Web server access functionality via 4a) logon method; 5) HSSnmpServerInterface which provides SNMP Get/Set functionality via 5a) getSnmpCategories method; 5b) getPVCList method; 5c) getCircuitList method; 5d) setAttribute method; and 5e) getAttribute method; 6) HSUtilityServerInterface which provides the interface for all other browser functionality via 6a) getLevelOfService method; 6b) getHelpDeskNumber method; 6c) getCircuitLocation method; 6d) setCircuitLocation method; 6e) getServiceType method; and 6f) getMessageCenterText method; 7) HSEMReportServerInterface which provides an interface to the features available in the Event Monitor database via 7a) changeReportName method; 7b) createReport method; 7c) deleteReport method; 7d) getAlarms method; 7e) getAlarmTypes method; 7f) getCorpIDList method; 7g) getDALGroups method; 7h) getDataCircuits method; 7I) getFacilities method; 7j) getReport method; 7k) getReportCategories method; 7l) getReportList method; 7m) getServiceTypes method; 7n) getvoiceCircuits method; and 7o) updateReport method.

Each server side method 1) performs a specific back-end function. It may also, 2) return an object, or basic type (int, float, etc.) to the invoking client side stub. Most methods generally perform back-end database updates, keyed by values as documented below. Object returning methods return either 1) a single object made up of string values as documented below or 2) vector objects, including lists. The vector objects are variable byte streams and are essentially objects that are containers for a group of related objects. Every server side method has the ability of throwing error exceptions, in lieu of generated return codes.

The interface/method combinations mentioned above are described in greater detail in above-referenced, co-pending U.S. patent application Ser. No. 09/159,517.

Call Manager

Figure 40:
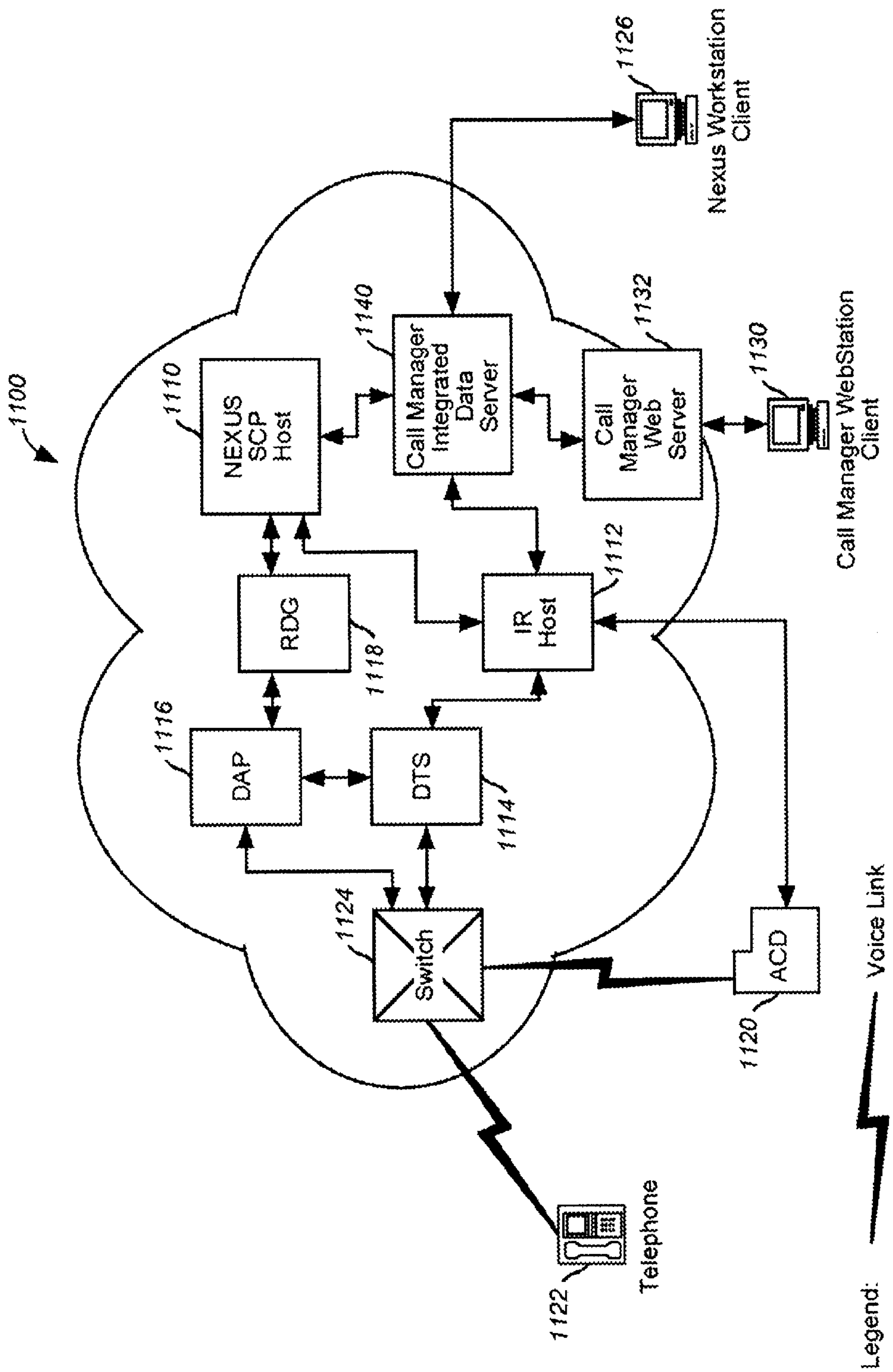
FIG. 40 illustrates a high level overview of the call manager system environment.

Another application of the suite of telecommunications network management applications is the call manager ("CM") system which provides sophisticated mechanisms, e.g., intelligent call routing, for call center customers to control delivery of toll free calls from the telecommunications enterprise network to call centers, including call centers having multiple Automatic Call Distributors (ACDs). Particularly, using the CM system the customers have the ability to define routing rules which, on a call by call basis, determine the best place to route incoming toll free calls. A high level overview of the call manager system environment 1100 is illustrated in FIG. 40. The call manager system 1100 generally includes a service control point (SCP) 1110 for providing call manager routing features, known as "call by call" (CXC) routing; an intelligent routing customer element (ICE) (not shown); an intelligent routing host (IR host) 1112; and client workstations, i.e., call manager webstation client 1130, and/or Nexus workstation client 1126. The SCP 1110 is a routing engine which essentially maintains call routing rules and uses those rules to determine where to route the calls. A typical call processing flow for a call received from a caller 1122 includes routing requests and responses from the enterprise switches 1124 through above-mentioned data access points (DAPs) 616 and remote data gateways (RDGs) 1118 into and out of the SCP 1110. The DAP 616 executes a routing plan by translating a toll free number passed by the switch 1124 into a network number, and maps it to an address. The RDG 1118 provides a standard gateway allowing communication between the SCP host 1110 and the enterprise's backbone network. The translated network number is then communicated to the SCP host 1110 via the RDG 1118.

Data collection and storage of ACD-based statistics from customer call centers and network statistics are supported by DAP traffic statistics (DTS) 1114, the IR host 1112 and the ICE components. The DTS collects network routing statistics from the DAP 2906 and passes them to the IR host 1112. The IR host 1112 stores routing statistics from DTS 1114 and the ACD 1120. The ACD 1120 data statistics are collected by the ICE for each ACD 1120, normalized by the IR host 1112 and provided to the SCP 1110. When the SCP 1110 receives a routing request, the SCP 1110 typically determines the best location to route a call by modeling each call center using periodic Automatic Call Distributor (ACD) 1120 data statistics to keep the model in line with what is actually going on at each location.

Upon completion of call processing according to customer routing plan, the DAP 2906 passes routing instructions to the switch 1124 for setting up the call to a customer's ACD 1120. The ACD 1120 balances the load of calls based upon customer defined rules such as the "busy-ness" of a call center. Calls may be distributed evenly using a "round robin" technique, or directed in which calls are routed based on a percentage allotted to each destination identifier. Voice communications are carried from the switch 1124 to the ACD 1120 which terminates the call at the appropriate trunk or destination identifier.

The routing capabilities supported by SCP 1110 include a termination selection based upon one or more of the following: initial list of eligible destinations, destinations eliminated from consideration based upon tested conditions, artificially biased evaluation criteria, percent allocation, and manipulation of user-defined peg-counter variables. SCP 1110 also supports the routing and blocking of incoming calls using event-level data based on one or more of the following characteristics: day of the week, day of year, preference of destination choices, time of day, membership of the automatic number identification (ANI) or caller entered digits (CED) in a defined list of values, load balancing and/or availability at specific destinations, user-defined quota schemes, user-defined peg-counters, preference of destination choices, and artificial bias of load balancing algorithms.

The Call Manager Integrated Data Server(s) (CMIDS) 1140 are included to provide a front-end functionality to the SCP host 1110 and off-load various workstation-related processing from the routing engine. In addition, the CMIDS 1140 may directly access data stored on the IR host or on other data servers. Further details of the CMIDS 1140 will be described with reference to FIGS. 41 and 45.

As shown in FIG. 2, the call manager system of the nMCI Interact System further includes one or more web servers 1132 for providing browser-based customer connections from the World Wide Web (WWW or Web). The call manager web server 1132 passes the customer connections through to the SCP host 1110 via the CMIDS 1140, and thus delivers the call manager functionality to the call manager webstation client 1030 via a standard web browser and the Internet. The web server 24 is accessed by customers using the public Internet by directing a web browser 20 running on the call manager webstation to point to a call manager Uniform Resource Locator (URL).

The call manager webstation 1130 may be any hardware/software platform connected to the public Internet and running a supported web browser. The call manager webstation 1120 is typically owned and maintained by the customer. The call manager webstation 1130 includes a web-based graphical user interface (GUI) application which enables the customers to define their call terminations, and provision routing rules and associated tabular data to control routing by the SCP host 1110. The GUI application also presents alarms and near real time graphical displays of peg counts and ACD-based statistics. The application also provides reports and data extracts of historical data, including call detail records (CDRs), ACD-based statistic, and peg counts. In addition, user-id administration functions including business hierarchy structures and function profiles may be performed via the call manager webstation's web-based GUI application.

In addition, the Nexus client workstation 1126 is included as an alternate client for the SCP host 1110. The presence of the call manager webstation 1130 does not preclude use of the Nexus client workstations 1126. The Nexus client workstation 1126 typically runs a graphical user interface application for enabling the customer to define their call terminations, routing rules and to display the ACD and routing information in either tabular or graphical forms. The Nexus client workstation 1126 are directly connected to the SCP host 1110 typically via dedicated circuits to customer premise locations or through the enterprise backbone networks for the enterprise locations.

Call Manager Webstation Architecture

Figure 41:
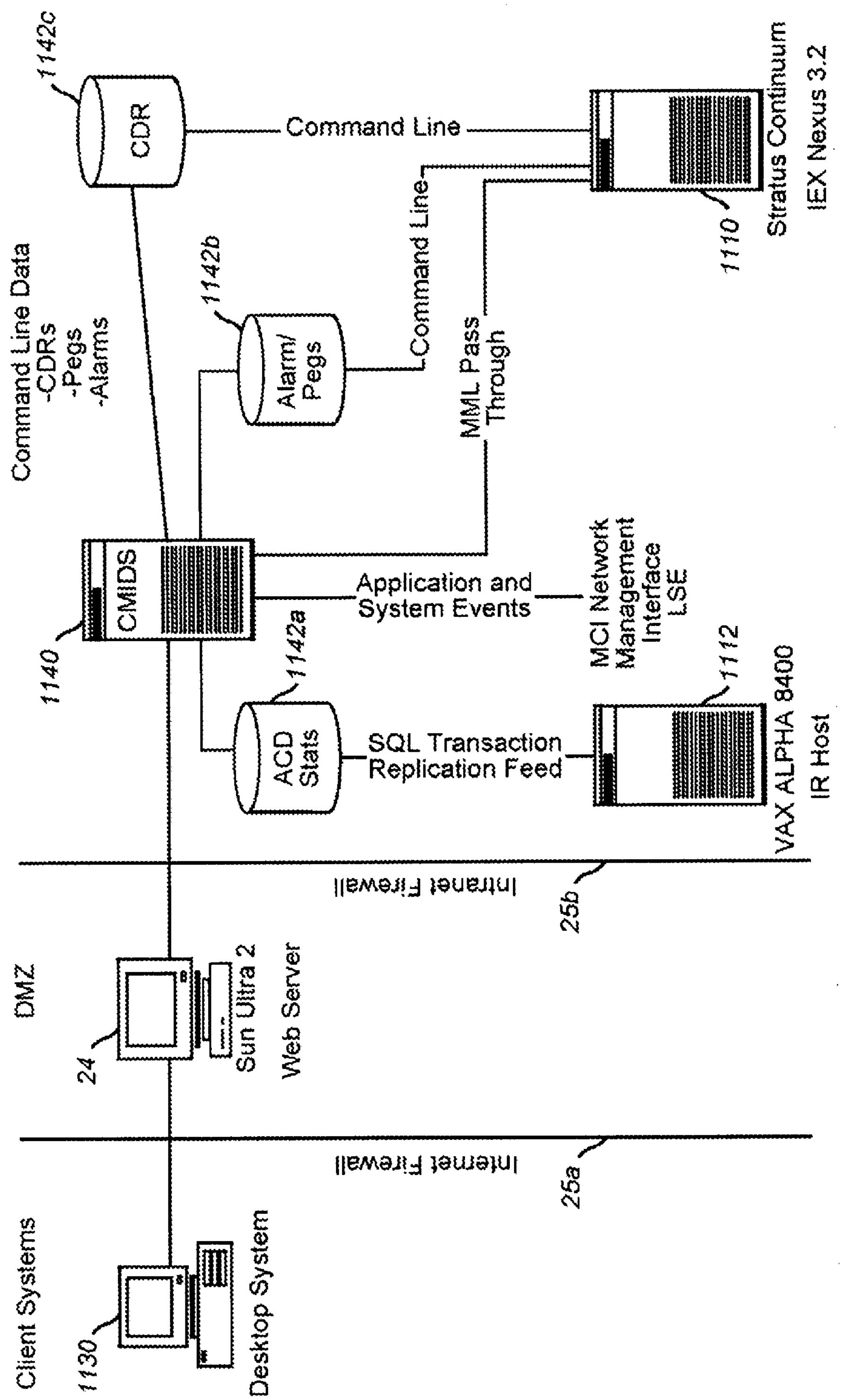
FIG. 41 illustrates call manager webstation component architecture of the nMCI Interact system, showing interconnections among the components.

FIG. 41 illustrates the call manager webstation component architecture showing interconnections among the components. In a preferred embodiment, the call manager webstation system includes three components of the call manager platform: client desktop systems, or a workstation, hereinafter referred also as the client webstations 1130 for delivering call manager functions through a standard web browser; a web server 1132 for supporting secure access for internet or extranet/intranet-based clients to call manager back-end and thus to SCP hosts; and call manager integrated data server (CMIDS) 1140, forming an integral part of the back-end call manager application and supporting access to SCP host systems. As shown in FIG. 41, the client desktop systems 1130 with Internet connectivity have standard browsers executing Java applets, i.e., a client GUI application, downloaded from the call manager web server 1132. The web server 1132 which is located in the above-described demilitarized zone (DMZ) 17 of the network MCI Interact system, include Java class files, but no storage of customer data to insure data security. The DMZ is generally bounded by two firewalls: an Internet firewall 25(*a*) and an enterprise intranet firewall 25(*b*). The call manager integrated data server (CMIDS) generally handles the business and data logic associated with the call manager functionality. Each of the above components will now be described in detail with reference to additional figures.

As described above, the client webstation 1130 provides a web-based graphical user interface (GUI) offering data management and data presentation features for the call manager system. The web-based front-end GUI is typically written using the Java programming language to insure platform independence. The client webstation 1130 typically includes a web browser with Java applets for the interface for providing access to the call manager webstation application from a standard web browser, e.g., Internet Explorer V4.01. In addition, the networkMCI Interact common objects, described in the above-referenced, U.S. Pat. No. 6,115,040 the contents and disclosure of which are incorporated by reference as if fully set forth herein, are used for implementing many functions needed for client/server communications protocols. The Java applets generally reside on the web servers 1132 and are dynamically downloaded to the client browsers (client webstations) 1130 when the Uniform Resource Locator (URL) for the call manager webstation client GUI application is accessed.

Figure 49:
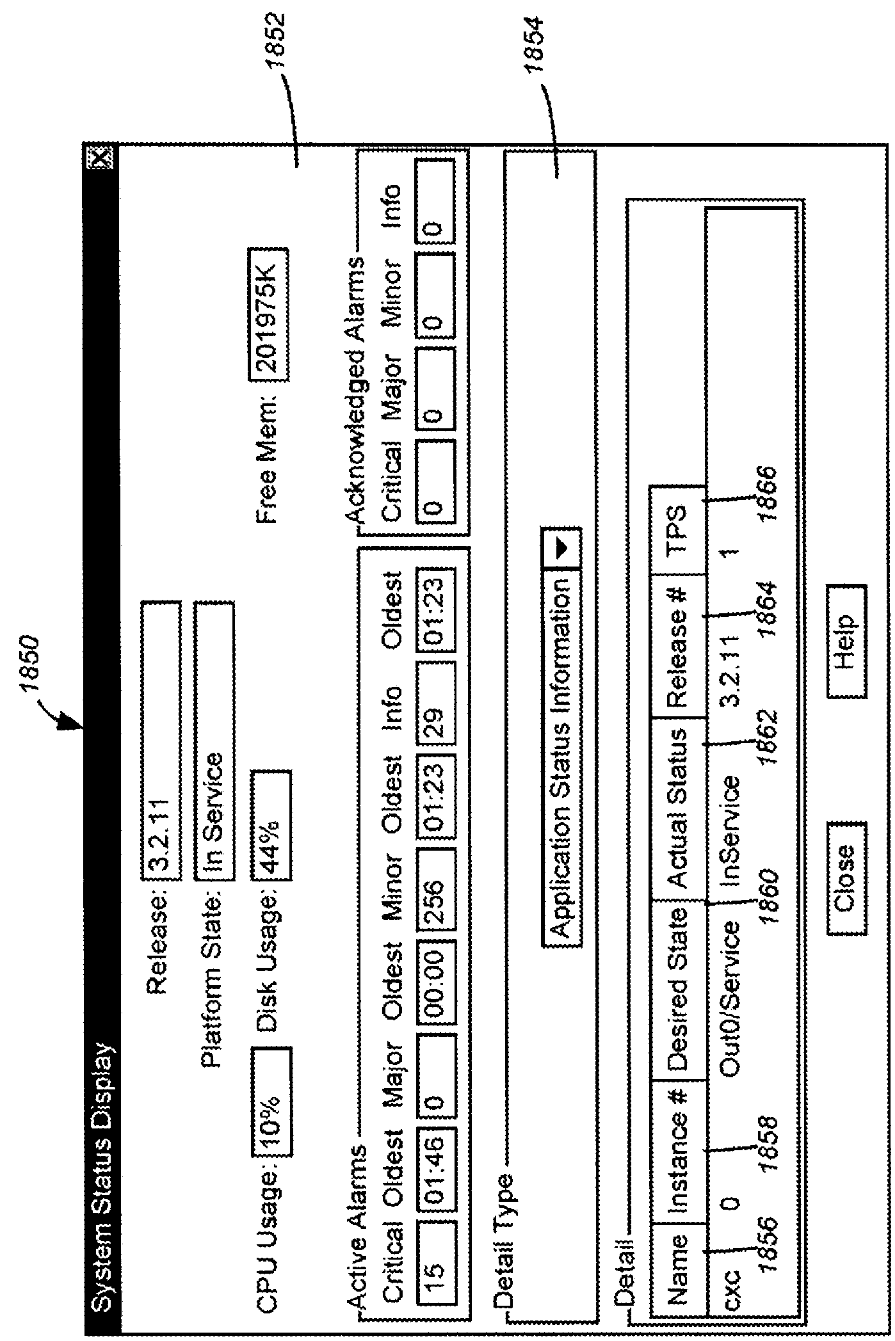
FIG. 49 shows an example of a system status display.

The call manager webstation client GUI application of the system of the present invention is typically invoked by clicking a “call manager” icon 97 from the networkMCI Interact home page 79*b* (FIG. 5(*b*)). The customer is then presented with a toolbar for launching each of the call manager webstation application features as shown in FIG. 49 at 11880. Moreover, on-line help is offered via hyper-text markup language (HTML) documents residing on the web servers 1132.

Each call manager webstation application feature may be accessed through an icon button in a tool bar 11880 as shown in FIG. 49. Moreover, each feature is brought up in a separate window frame, giving a consistent look and feel throughout the web environment. As shown in the example display of FIG. 49, the main features offered include: user setup and administration, i.e., security functions at 11882; business hierarchy setup; call by call application for rules writing and provisioning at 11874, 1884; graphic data display at 1878; alarm manager at 1872; and reporting and data extracts at 1876. A detailed description for each of feature will be provided with reference to FIG. 48 below.

Figure 42:
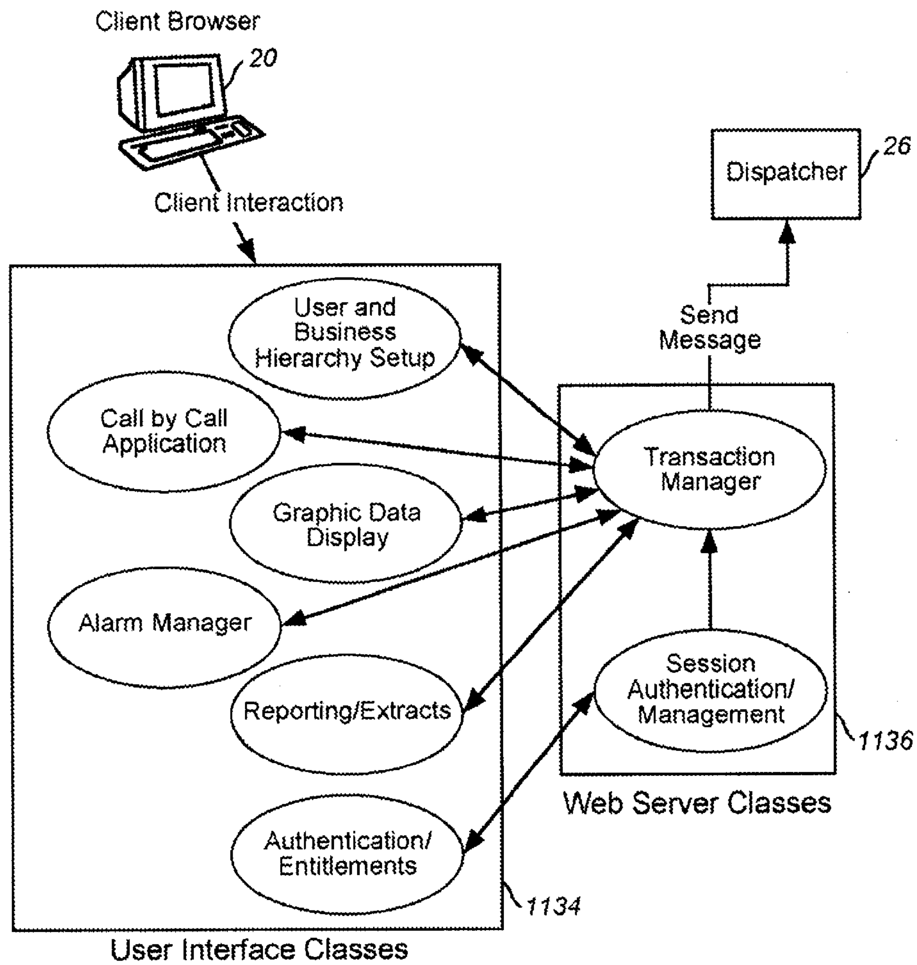
FIG. 42 illustrates the objects making up the client interface code, in one embodiment of the call manager system.

For providing the above features, the client browser includes class objects making up the client interface code, in a first embodiment shown in FIG. 42. Specifically, the user interface classes 1134 represent the main GUI objects for performing a call manager specific functionality. Each of the classes, i.e., user and business hierarchy setup, call by call application, graphic data display, alarm manager, reporting extracts, and authentication/entitlements, performs the corresponding client-side functionality associated with the call manager features provided. The web server classes 638 provide the communication pass through to the back-end server. The communication classes (not shown) are employed between the client browser 1130 and the web server 1132 for requesting transactions and/or data sets from the web server 1132.

In the first embodiment, the communications from the client 20 and back-end CMIDS 1140 (FIG. 41) via the web server 1132 are conducted using the common gateway interface (CGI). Requests from the client are typically first targeted at a CGI program, which then relays the request to the appropriate proxy process. Results are returned from back-end processes to the requesting client in the same manner. Each transaction or data request may be executed as a separate process, to allow processing to continue from other applications within the call manager webstation system.

In a preferred embodiment, a Netscape Server Application Program Interface (NSAPI) module may be used as an alternative to the CGI layer, the NSAPI module replacing the CGI-protocol communications layer between the client 20 and the web server 1132. The web server 1132 may be configured to pick up the NSAPI module and load on start up. Java client code 1134 (FIG. 42) may be configure to refer to the NSAPI module. For example, the Java client may invoke a method to communicate directly with the NSAPI module that performs the same function as the CGI program. Using the NSAPI module enhances performance and messaging throughput. When the server 1132 recognizes requests for the NSAPI module, it invokes a particular function in the module which performs essentially the same function as the CGI program. For example, a middle tier transaction handler, typically a message manager (msgmgr) and residing with the web servers 1132, may be modified to use the NSAPI instead of the HTTP CGI. The advantage of NSAPI over CGI is that a new process need not be created whenever a request comes in from the web client 20.

Figure 43:
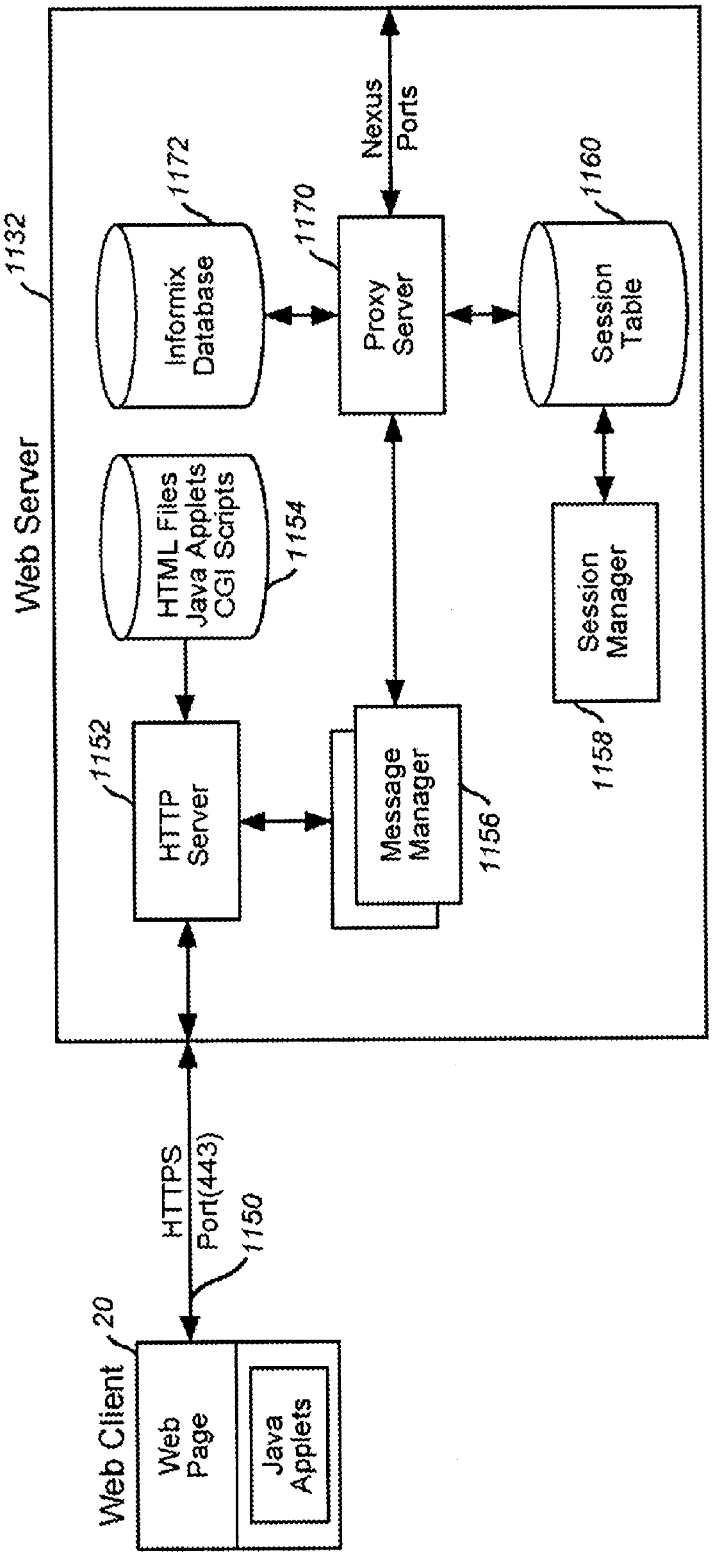
FIG. 43 illustrates one embodiment of the software architecture showing communications between the client 20 and the call manager web server 1132 and its components.

In general, and as described above, the web server 1132 provides a communication pass-through between the web client GUI application 1130 and the back-end call manager integrated data server (CMIDS) 1140 which may communicate with the SCP host. FIG. 43 illustrates one embodiment of the software architecture showing communications between the client 20 and the web server 1132 and its components. The web server 1132 provides web-based call manager applications to web clients having a web browser on their client workstations 20. The web server 1132 includes an HTTP service manager 1152 and a message manager 1156. The HTTP service manager 1152 generally handles requests from multiple clients 1130 to download web pages and Java applets for display within a browser. Web pages include hypertext markup language (HTML) files and Java applets 654 that are downloaded to the clients 20 and are executed within a browser by the Java applets. The HTTP service manager 1152 also handles message transactions via the POST method defined by the hyper-text transfer protocol (HTTP) protocol. The HTTP service manager may be standard off-the-shelf World Wide Web server software, e.g., Netscape Enterprise Server.

The message manager 1156 is typically a CGI program that is executed as a spawned process within the HTTP service manager 1152 when a message transaction is received from the client via the POST method sent to the HTTPS port (443) 1150. The HTTP service manager 1152 spawns a process to run an instance of the message manager 1156 each time it receives a message transaction from the client. Alternatively, the message manager 1156 may be implemented as a function in the NSAPI module as described above. The HTTP service manager 1152 then invokes the message function in the NSAPI module. Both input and output streams are created by the message manager 1156 to receive message data from the client 20 and to reply back to the client 20. The message manager 1156 is generally responsible for the following: 1) accepting new user login by allocating a new session key for a newly created session; 2) attaching a dispatcher and proxy header to the web client's message and forwarding the message to the proxy server 1170; and receiving a SCP host response message from the proxy server 1170 and re-wrapping this message with dispatcher and proxy header and sending this formatted message to the web client 20. Message transactions are sent to the proxy server 1170 over a new connection by opening a new TCP socket to the proxy server 1170 while the original socket from the browser is blocking, waiting for a response from the web server 1132.

Typically, communications to and from the client 20 take place over hyper-text transfer protocol secure (HTTPS), which uses hyper-text transfer protocol (HTTP) over a secure socket layer (SSL) encrypted channel. Applications may include web pages in the form of hyper-text markup language (HTML) files and Java applets 654 that are stored on the web server 1132. The HTTP service manager 1152 downloads the HTML files and Java applets 654 to the client 1130 upon request via the HTTPS port 1150, typically configured to port number 443. Each transaction from a client 20 is sent to the web server 1132 in the form of a logical message that has been encrypted. The web server 1132 decrypts the message and wraps the message with the user's information, including environment variables and a server-generated session identifier (id). The message is then encrypted and forwarded to the CMID 1140, or alternately, as will be described below, to the proxy server component of the CMID 1140.

The message transactions created by the client 20 may be transmitted over HTTPS using the POST method defined within the HTTP protocol. Using the POST method, a specified CGI program and more specifically, an invoked message manager runs as a thread in the HTTP service manager 1152. Message data is passed to the message manager 1156 by opening an input stream and an output stream within the thread. As described previously, the HTTP service manager 1152 spawns a message manager process 1156 for each message transaction sent to web server 1132. Each message transaction is a single request from the client 20 that is answered by a single reply from the web server 1132.

The web server 1132 also includes a session manager 1158 and a session table 25(*a*) for providing session management functions including the authentication of various web requests. A session is defined as the amount of time between which a client 20 logs onto the web server 1132 and when the client logs off. During a session, a client 20 may submit many message transactions to the web server 1132. State data for each session is stored in the session table 25(*a*). Session entries are deleted from the session table 25(*a*) when a user logs off or when a session is aged. Each message transaction received by the web server 1132 is associated with an active session. If a session no longer exists for a particular transaction, the message transaction is returned to the client 20 as rejected. The application then may prompt the user to login again.

Generally, the session table 1160 is a table that has state information on all current client sessions that are active on the web server 1132. When a client logs onto the web server 1132 and is authenticated, the client is provided a "session id" which is a unique server-generated key. The client holds this and returns it to the server as part of subsequent message transaction. The session table 1160 maintains a "session key table" which maps these keys to the associated session. The session table also includes a time stamp for each client session. A client session's time stamp is updated each time a message transaction comprising the session id for the session is received. A session is aged if no message transactions belonging to the session are seen after a given amount of time. If so, the session, with its entry deleted from the session table 1160, is logged off from the SCP host 1110.

The session manager 1158 is generally responsible for monitoring all current client sessions. The session manager 1158 typically monitors the sessions by accessing the session table 1160 and checking the current time stamp values for each current session. If the time stamp value shows that a session has aged, the session entry for the aged session is cleared from the session table 1160. Clearing the session entry forces any further message transactions associated with the session identifier to be rejected, requiring the user to restart the session.

For communications to and from the web client 20 and the back-end, the middle-tier web server 1132 supports three types of transport mechanisms which are provided by the networkMCI Interact platform: synchronous, asynchronous, and bulk transfer, as described herein. Particularly, the Synchronous transaction type typically has a single TCP connection which is kept open until a full message reply has been retrieved. The Asynchronous transaction type is typically used for handling message transactions requiring a long delay in the back-end server response. A server process handling the message transaction responds back to the web client 20 immediately with a unique transaction identifier and then closes the connection. The web client 20 may then poll the web server 1132 using the transaction identifier to determine when the original message transaction has completed. The bulk transfer type of transport mechanism is typically used for large data transfers which may be virtually unlimited in size.

In the embodiment shown in FIG. 43, the web server 1132 includes a proxy server 1170 and a database 1172, e.g., Informix database. In this embodiment, the web server 1132 includes capability to communicate directly to the SCP host, bypassing the CMIDS 1140, by having the proxy server reside physically in the web server.

Figure 44:
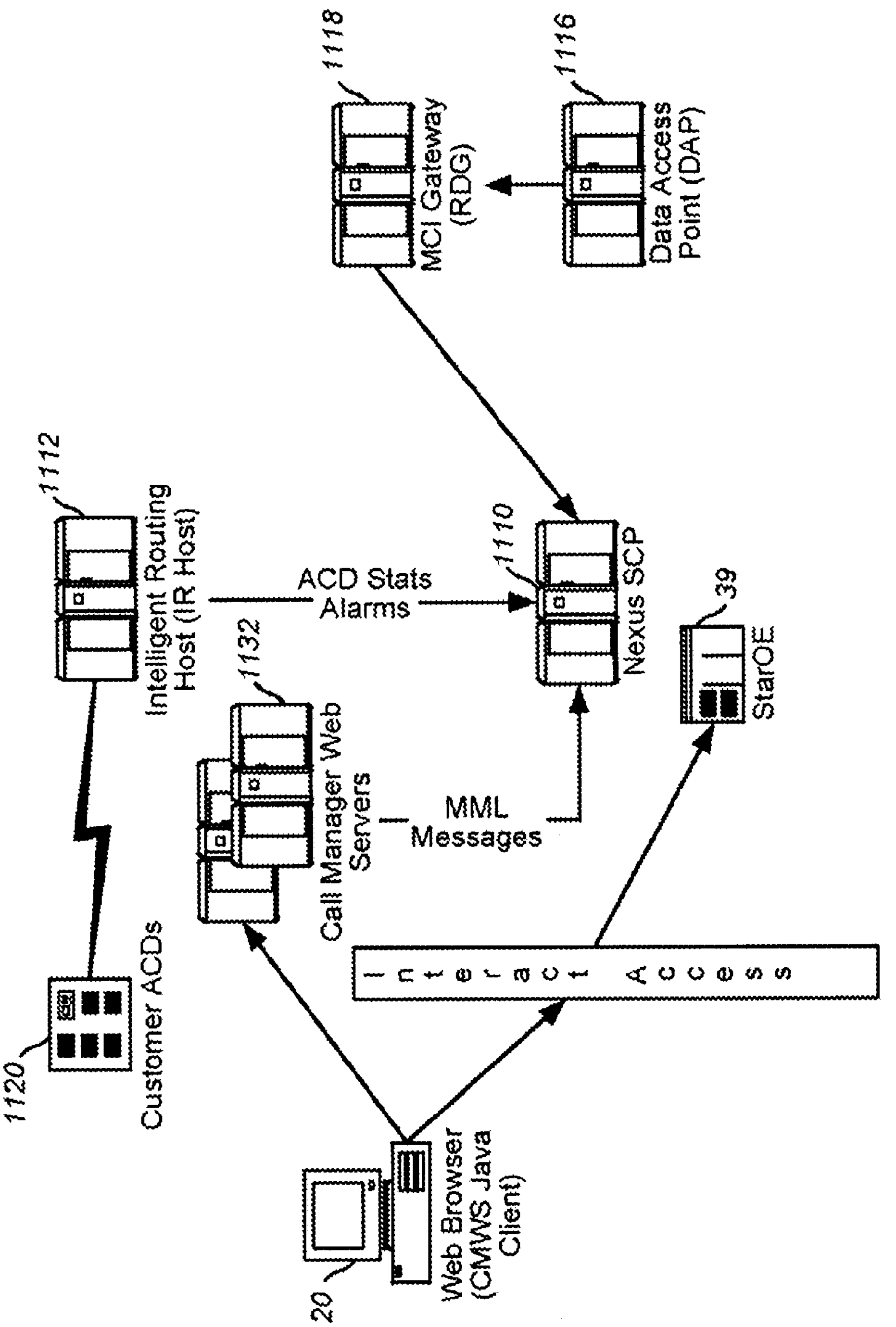
FIG. 44 illustrates an example of call manager webstation application physical architecture when one or more call manager web servers 1132 bypass the CMIDS component 1140.

FIG. 44 illustrates an example of call manager webstation application physical architecture when one or more call manager web servers 1132 bypass the CMIDS component of the present invention. As shown, the call manager web servers 1132 directly communicate the MML messages, i.e., translated client requests, to the Nexus SCP host 1110. In addition, in this embodiment, it is the SCP host 1110 which receives ACD statistics, alarms and other information from the IR host 1112, and communicates the information to the web servers 1132. The SCP host 1110 serves as the routing engine through which customer provision routing rules and associated tables or list, view alarms, route peg counts, etc. It houses the applications used by customers to manipulate the features of their automated call distributor (ACD). FIG. 44 also shows the call manager web client 20 as being authenticated via the networkMIC Interact platform and the StarOE authentication and entitlement system 29 as described herein, i.e., the networkMCI Interact platform validates the password and authenticates with the StarOE system 631, verifying that a customer's profile allows access to the call manager webstation application. Upon valid authentication, the call manager webstation application session may begin with the client webstation communicating with the call manager web servers 1132 for providing the various functionalities.

In another embodiment, the data processing components for business and data logic, i.e., the proxy server and the database, resides with the CMIDS 1140, thereby reducing the functions of the web server 1132 to an application server providing primarily state and session management. Porting the proxy server 1170 over to the CMIDS 1140 may be easily performed. The transaction handler in the middle tier, i.e., the message manager 1156 still passes messages between the Web client 20 and the CMIDS 1140. The only change needed is that the transaction handler connects to the proxy residing on the CMIDS 1140, as opposed to the proxy 1170 on the web server 1132.

The proxy server 1170 generally processes message transactions from the client 20 and is multithreaded to handle multiple message transactions simultaneously. The proxy server 1170 is designed to process one type of message transaction or a set of message transactions. In this embodiment, routing of the messages to and from the proxy is handled by the message manager 1156. The proxy server 1170 also interacts with a database 1172, e.g., Informix, to pass back information to be displayed by the client 20. The proxy server opens a connection to the SCP host 1110 to retrieve information about routing plans or report statistics by sending the SCP "man machine language" protocol (MML) commands. Upon retrieval, the proxy server 1170 formats a response message which is sent back to the client webstation 1130 so that it is displayed on the current web page. As the message reply is sent back to the client 20, each thread created by the proxy server 1170 is completed. It should be noted that the proxy server 1170 need not reside in the web servers 1132. Instead, as will be described with reference to FIG. 45, the proxy server 1170 may reside in the CMIDS 1140, the back-end server component.

The database 1172 generally maintains information needed to translate the messages to and from the SCP host 1110. A message translation program written in 4GL accesses the database 1172 when a message transaction is received. The program translates the message and sends the message to the SCP host 1110 for processing. After the message has been processed, the program translates the response and sends it back to the message manager 1156. The proxy server 1170 typically invokes an instance of the translation program for each message transaction it receives and processes. As noted above with reference to the proxy server, the database 1172 may also alternately reside in the CMIDS with the proxy server.

In the first embodiment, a data server, i.e., the CMIDS, is included. In this embodiment, much of the functions of the proxy server are performed within the data server. More specifically, the proxy server 1170 and the database 1172 may be ported over to the CMIDS 1140. The web server 1172 communicates to the proxy in the CMIDS 1140 which then communicates with the SCP host. The call manager integrated data server (CMIDS) 1140 generally services web requests for the webstation application and serves as a front-end for the SCP host 1110. Referring back to FIG. 41, the CMIDS 1140, in addition, provides data storage and management for data resident on the SCP host 1110, the IR host 1112, and/or other servers. The CMIDS 1140 also provides pass through connectivity for rules writing and other provisioning from the client webstation 1130 to the SCP host 1110. The CMIDS includes databases *1142a–c* and provides an interface 1162 to the call manager SCP host 1110 for rules writing and list management. CMIDS databases *1142a–c* are extracted or replicated from the SCP host 1110 and/or the IR host 1112. The SCP host 1110 services are typically requested and satisfied through a protocol known as "man machine language" (MML) commands. The CMIDS 1140 utilizes MML as well as other interface mechanisms supported by the SCP host 1110. The call manager integrated data server (CMIDS) 1140 physically resides on hardware located behind the intranet firewall 25(*b*) as shown.

The proxy server 1170 and the database 1172 which were described with reference to the web server 1132, may reside in the CMIDS 1140. In addition, the CMIDS 1140 may also include a session manager and associated session table for managing host sessions. As described above, the proxy server 1170 generally handles webstation client 20 requests passed from the web servers 1132 by accepting message transactions from the webstation client 20 via the web servers 1132, maintains logging information, sends the request to a session manager, and receives data from the back-end and forwards it to the web servers 1132. In addition the proxy server 1170 may accept messages originating from the Nexus client workstations (1126 at FIG. 40), and perform user logon validations for the Nexus client workstation 1126. The Nexus client transactions, with the exception of the user logons, are passed directly to the SCP host 1110 for processing via a Nexus port manager (not shown).

The session manager 1158, residing in the CMIDS 1140, receives data from the proxy server 1170. The session manager 1158 updates the sessions table 1160, validates that the user has proper privilege to perform the task and determines whether the transaction originated from a webstation 1130 or a Nexus client 1126. The user validation function may be performed for the webstation client 20 also, in addition to a validation conducted by the networkMCI Interact StarOE authentication and entitlement system during the session logon.

CMIDS 1140 also may include a Nexus host formatter, a CMIDS transaction manager, and a Nexus port manager. The session manager 1158 typically passes a transaction request received from the web server 1132 to either the Nexus host formatter, or the CMID transaction manager. The Nexus host formatter module services transactions requiring SCP host services to fulfill the request. If the transaction originated from a Nexus client workstation 1126, the MML command message is adjusted to use a selected generic id for access to the SCP host 1110. If the transaction originated from a webstation client 20, the request is translated to the correct MML format. When the message is prepared, it is then sent to the Nexus host port manager component.

The CMIDS transaction manager module services transactions that do not require the SCP host 1110, i.e., the types of client request which may be serviced locally on CMIDS, including: obtaining NEMS alarm information, obtaining GDD information, and processing of user security. When the local processing is complete, results are sent back to the proxy server 1170 component.

The Nexus port manager component of the CMIDS manages pools of session with one or more SCP hosts 1110. The Nexus port manager logs onto each session in a pool using a "generic" user id. Using a "generic" user id enables each session to access an individual user's data without having to log each user onto the SCP host 1110. MML commands for a particular user are sent to a SCP host using any available session in the pool of "generic" session. After an MML command is sent and a response is received, the session is returned to the session pool and freed for use by the succeeding transactions. A session pool is defined as a set of sessions connected to one particular SCP host 1110. Therefore, the Nexus port manager component of CMIDS 1140 supports multiple session pools for communicating with multiple SCP hosts 1110.

The Nexus port manager also maintains state of each session in each pool. The Nexus port manager generates a keep-alive-message whenever a session is idle to keep the SCP host 1110 connection from being dropped. If a session in a pool has failed, the Nexus port manager will try to reestablish the session and add it back into the pool when establishment is completed. The Nexus port manager determines the communication channel to use to access the SCP host 1110 and keeps a number of connections open to the host 1110. Each message is sent to the SCP host 1110 and the channel blocked until a response is received.

Figure 45:
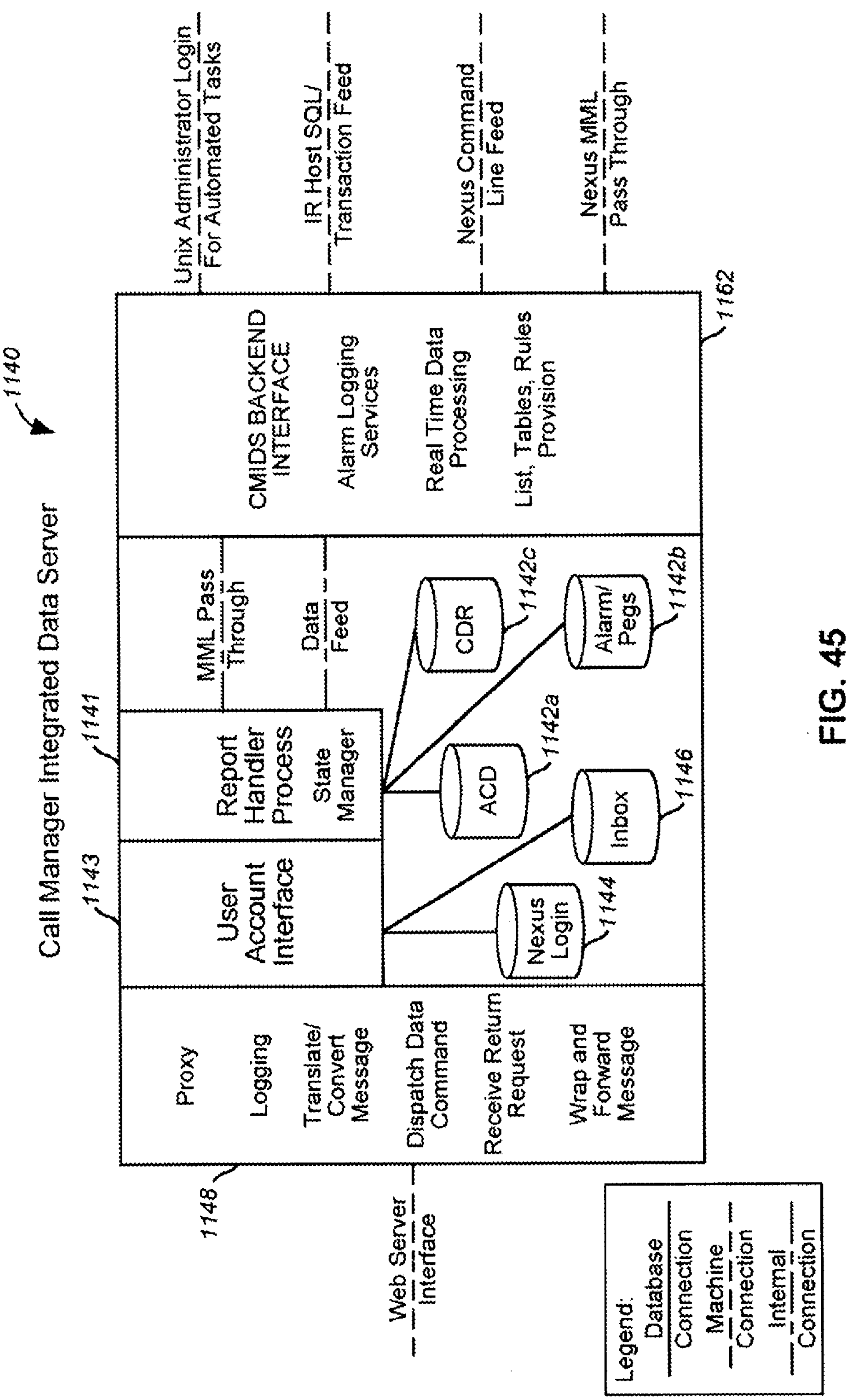
FIG. 45 is an example of a CMIDS conceptual model 1140 providing details of the CMIDS software components.

FIG. 45 is an example of a CMIDS conceptual model 1140 providing details of the CMIDS software components. The components perform specific functionalities of the back-end which will also be described with reference to FIG. 46. The CMIDS software architecture includes proxy 1148, proxy, system administration, and inbox components applicable to the call manager webstation (CMWS) application.

The CMWS proxy 1148 is generally a logical internal software entity which verifies application access and interfaces with host application. Depending on the application access chosen by the customer, either the networkMCI Interact dispatcher or the CMWS web server 1132 communicates client transactions to the CMWS proxy 1148. The networkMCI Interact, as described herein, typically accepts the encrypted customer request from the networkMCI Interact web server cluster, and it interfaces with a CMWS proxy. The user account interface software component 1143 generally maintains sessions with the SCP hosts and provides the functions of the Nexus port manager described above. The report handler process generally maintains databases 1142*a–c* and provides reporting facilities. The CMIDS back-end interface 1191 supports a number interface mechanisms including MML and command line access to the Nexus SCP host, common alarm and logging services, and data retrieval from the IR host.

The Call Manager Webstation Back-end

As described generally above, the back-end is responsible for transmitting web client request to the SCP host and delivering the host reply information back to the web clients. For supporting the request/reply transmissions, the back-end system of the present invention generally includes three logical components: front-end interface (BFI), translate/data manager (TDM), and back-end to Nexus, i.e., SCP host interface (BNI). It should be noted that SCP host functionality is currently implemented on the Nexus, hence the acronym, BNI. However, other host systems are not precluded as having capability to support the SCP host functionality for the purposes of the call manager webstation system of the present invention.

Figure 46:
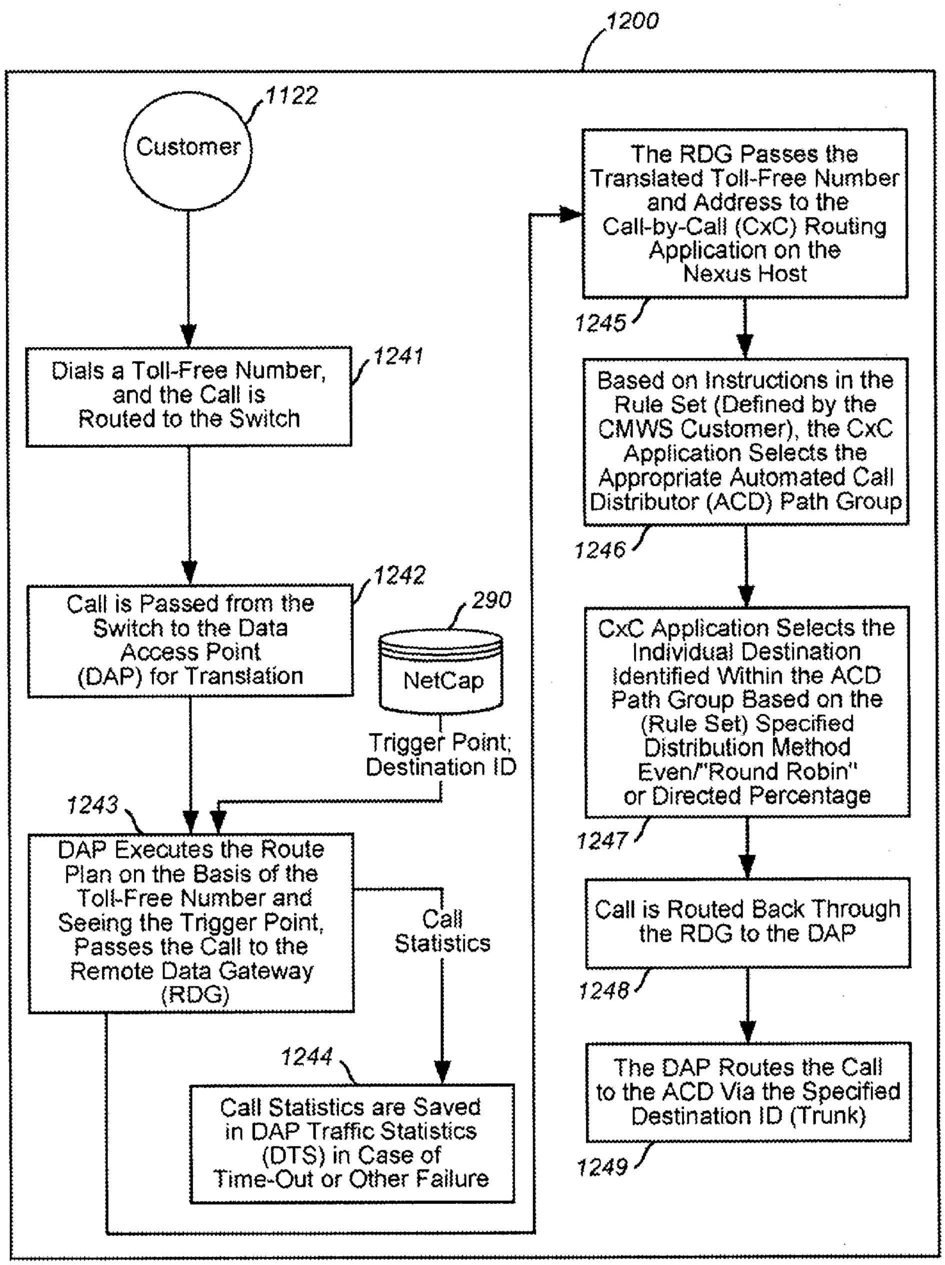
FIG. 46 illustrates a back-end process flow for the call manager system component of the present invention.

FIG. 46 illustrates a back-end process flow 1200 for the system of the present invention. A customer 1122 typically dials a toll-free number. As an illustrative example, this toll-free number may be provided by a company having operators taking telephone orders. In addition, the company provides three trunk lines or destination identifiers going into its ACD. The company services a call centered media-based sales application, e.g., home shopping network through this ACD which includes a toll-free number for customers to call. To handle calls to the home shopping network client, the company sets up an ACD path group called "HSN." This ACD path group includes the three trunk lines as member destinations and reports agent and call statistics from the total number of agents servicing home shopping network, regardless of the particular trunk lines.

Accordingly, as shown at step 1241, when the customer 1122 dials the toll-free number, the call goes to the network through the switch. At step 1242, the call is passed from the switch to the DAP for translation. The DAP translates the toll-free number to a network number and maps it to an address readable by the RDG. NetCap 290 generally houses routing plans, destination labels, toll-free numbers, logical terminations, DAP-based details and trigger plans required for the call manager webstation system. Most of this data may be provisioned in NetCap 290 via the Toll Free Network Manager (TFNM) application service, as described herein. Seeing the trigger point and other DAP-based data provisioned from NetCap 290, the DAP passes the call to the RDG at step 1243. At step 1244, call statistics are saved in DAP traffic statistics (DTS) for use in case of time-out or other failures. They are also stored within the IR host. At step 1245, the RDG, with its ability to communicate with the SCP host, passes the network number and associated address to the call-by-call (C×C) routing application on the SCP host. Based on instructions in the rule set defined by the call manager webstation system customer, the C×C application selects the HSN ACD path group at step 1246. At step 1247, C×C application then selects the individual destination identifier within the ACD path based on the specified distribution method which may be either even/"round robin" or directed/percentage distribution. At step 1248, the call is routed back through the RDG to the DAP. Then at step 1249, the DAP routes the call to the ACD via the specified destination id or trunk. Specifically, referring back to the above illustrated example, calls received on Thursdays between 5:00 and 7:00 GMT may be set to be routed to Orlando, and accordingly the destination id is Orlando Central. The C×C routing application returns destination id "Orlando Central" to the network, which routes the call to the ACD via the Orlando Central destination id or trunk.

Call Manager Client GUI Application Implementation

As in the other nMCI Internet network management client applications, the call manager client application (CMApp) is preferably derived from the (common object) COApp class and may be launched by a backplane object that is typically derived from the COBackPlane class, including the networkMCI Interact backplane (FIG. 3).

In one embodiment of the present invention, the call manager client application is launched in a separate browser window from the one within which the networkMCI Interact backplane is running. For example, after validating that a customer's profile allows access to the call manager application, and after a customer clicks the call manager icon 97 on the networkMCI Interact home page (FIG. 5(*b*)), the networkMCI Interact backplane creates a separate browser window and populates the call manager webstation URL. The call manager webstation web server then downloads the call manager client application for execution within the new browser window. The call manager client application downloaded from the server includes a CMBackPlane class which is an applet derived and inherits from the COBackPlane class. The CMBackPlane is launched with the call manager webstation web page and provides backplane functionalities within the context of the call manager webstation application. The call manager client application also includes a aFeature class from which the CMFeature is derived. The CMFeature typically is invoked by the CMApp and provides an application specific functionality within the call manager application such as reporting, alarm management (NEM), graphical data display (GDD), and call by call application (C×C).

Above-mentioned co-pending U.S. patent application Ser. No. 09/159,506 illustrates a class diagram for a call manager global attribute display icon. A scenario diagram illustrating the class interactions when setting the global attribute and a scenario diagram showing the class interactions when the call manager application is launched from a web home page having the backplane applet is also described in co-pending U.S. patent application Ser. No. 09/159,506. Upon the call manager application launch and initialization, the main toolbar sets its icon. For example, the browser starts the backplane applet which launches the CMApp by calling its init method. The CMApp calls seticon method for setting up an icon for the main toolbar. The main toolbar may be implemented using a view of a model in a MVC paradigm described above. Above-referenced, co-pending U.S. patent application Ser. No. 09/159,506 also describes the class interactions when an icon is set on feature initialization. When a user presses a button on the main toolbar to launch a feature, e.g., NEMS, Rules, Provisioning, etc., the CMAppView derived from the theMainToolbar class creates/activates the selected feature and initializes it. When the CMFeature is instantiated or started, it invokes a seticon method to create a frame, the CMFeatureFrame, in which to run the selected feature.

Call Manager Webstation Client Application Features

As described above, the call manager webstation application allows authorized customers to manage their ACD data networks via a web-based interface. Specifically, customers are enabled to provision hierarchies for their business; control all routing of their toll-free traffic; create, modify or delete agent pools; manipulate capacity tables; and define quota schemes, value lists and schedule tables.

In the manner as described herein, a customer at a client webstation 20 having Internet connectivity and a web browser, and after logon, is presented with the networkMCI Interact home page [FIG. 5(*b*)] downloaded from the web server. With downloading and presenting of the home page, the web browser at the webstation 20, deploys a backplane applet via which the call manager GUI client application is invoked. The backplane requests a list of authorized applications from the StarOE authentication and entitlement system for the networkMCI Interact platform and a select list of applications which may include the call manager webstation application, is enabled on the home page according to the customer specific entitlements. The call manager webstation application is then accessed from the home page [FIG. 5(*b*)].

The customer may be presented with a call manager webstation application logon dialog box, in which the customer enters the call manager webstation logon name and password. In addition, the customer may be presented with a change password dialog. This dialog implements a password expiration design feature, which due to security reasons, the customer must change after a predetermined period of time. In addition, multiple hosts may be handled through the web client front-end and translation processing at the back-end. The front-end client application sends the "get-nexus-host" command to retrieve a list of SCP host names. The host information is stored at the back-end with the Informix database and, typically an SQL routine retrieves the available Nexus SCP host machines. The proxy residing at the back-end returns a list of the available Nexus SCP host machines to the front-end web GUI client application. The proxy generally maintains a "hosts" list having SCP host names and their IP addresses. Maintaining the list of host names on the proxy allows for easy modification of host names and IP addresses with no impact to the client code.

When the front-end web GUI client application receives the list, a list of host names may be displayed in a drop-down list for the customer to select, or the customer may be prompted for the Nexus SCP host machine desired. The selected host name is sent along with a login transaction having user name/password to the back-end, when the customer clicks a "login" button from the login dialog. The "establish-session" command is then sent to the back-end where the proxy may open a connection to that host. The proxy maps the SCP host name to the appropriate IP address and forwards the user login request to the host. The SCP host id selected at login is populated in the toolbar (FIG. 48 at 1880) at the client webstation.

Figure 47:
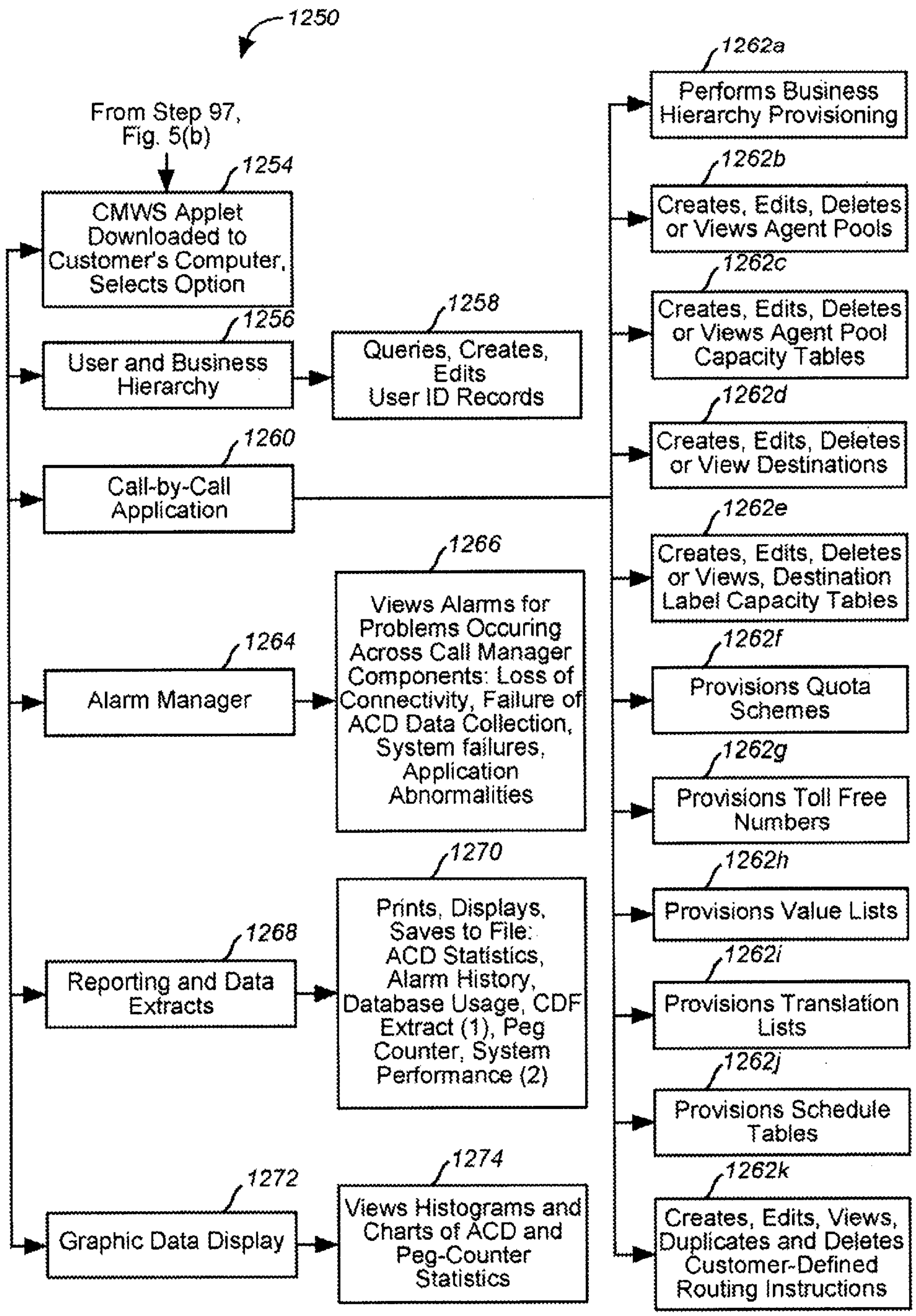
FIG. 47 illustrates an application-level process flow 1250 for the call manager system component of the present invention.

An application-level process flow 1250 for the CMWS system is now presented in view of FIG. 47. After an entered login name is validated by StarOE and user entitlements ascertained, the call manager webstation applet is downloaded to the customer webstation 1130, and as indicated at step 1254, the customer is presented with the screen 1870 shown in FIG. 48 through which the customer may perform the call manager features of the present invention provided. These features include: manipulating user and business hierarchy by querying, creating, or editing user id records as shown at steps 1256 and 1258; managing routing schemes via the call by call application as shown at steps 1260 and 1262*a–k*; invoking alarm manager at step 1264 and 1266 to view problems occurring across the call manager components, such as loss of connectivity, failure of ACD data collection, system failures, and application abnormalities; reporting and data extracts at steps 1268, 1270 for printing, displaying and managing ACD statistics, alarm history, database usage, peg counter, and system performance; and graphic data display at steps 1272, 1274 for viewing histograms and charts of ACD and peg-count statistics.

More specifically, by selecting the option at step 1256, to manage a user and business hierarchy, via, e.g., the security button 1882 (FIG. 48) from the toolbar 1880 (FIG. 48), a customer may search for a user id and, with appropriate privileges, create or edit a user id for a business level below their own. Through this option the customer may also access reporting visibility to all data items belonging to the customer and any business level below their own. In addition, the customer may assign a read, read/write, or no access privileges to each function in the user id profile. Moreover, the customers may administer and modify limits on the number of entities that a business unit may own in the provisioning database.

Figure 48:
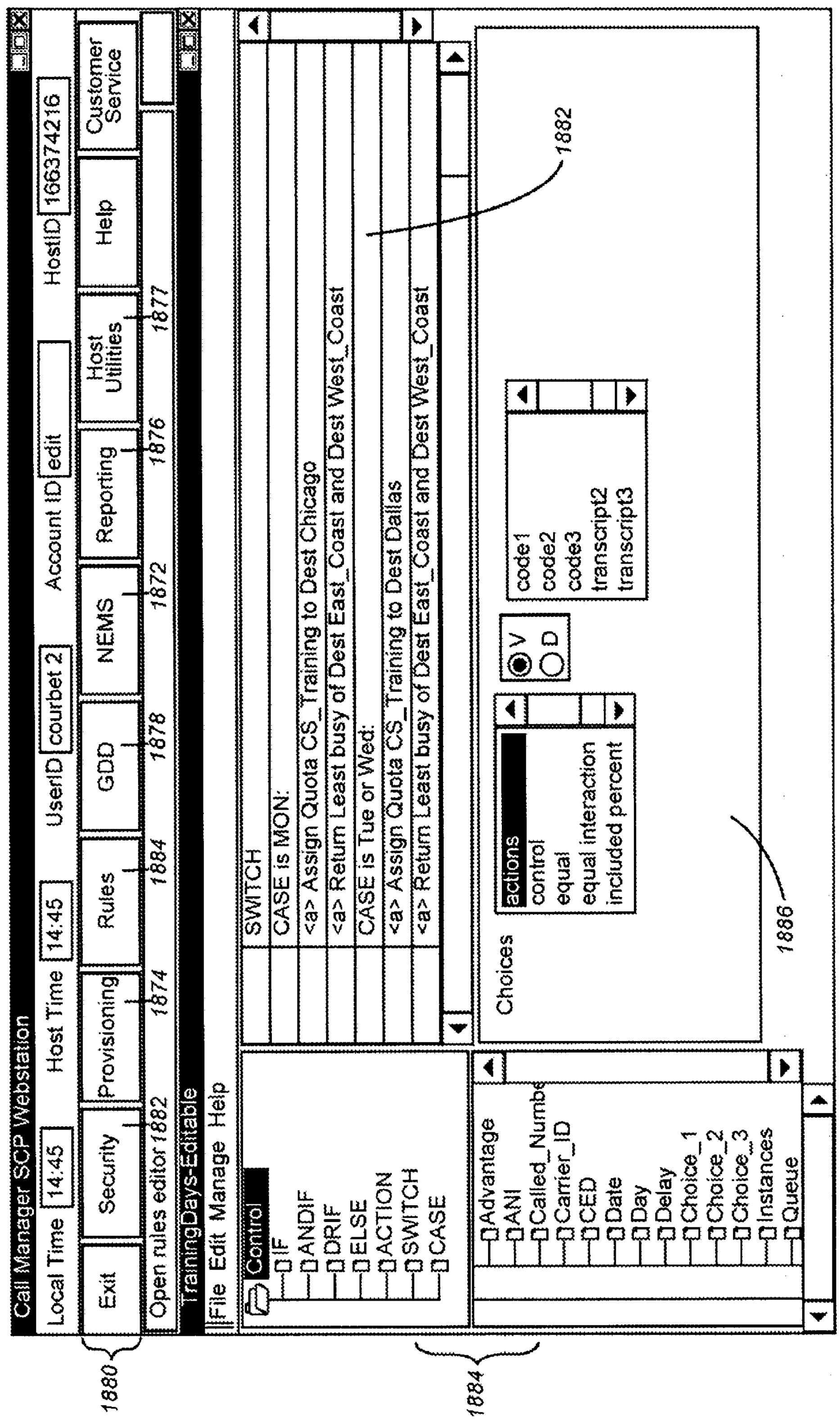
FIG. 48 illustrates an example of a call manager webstation application screen including the toolbar and the route writing palette.

By selecting the call by call application at step 1260, for example, by clicking on an icon labeled "Provisioning" (FIG. 48 at 1874) on the call manager web station tool bar displayed on the screen 1870 in FIG. 48, the customer may perform business hierarchy provisioning as shown at step 1262*a*. The customer may select the option at step 1262*b* and perform load-balancing by determining the degree of "busy-ness" by tracking the average call handling time, the number of agents, and the number of calls routed to each destination. At steps 1262*c* and 1262*e*, the customer is enabled to provision capacity tables for providing a default staffing allocation for use by the load balancing algorithm. With the C×C option and shown at step 1262*d*, the customer may also provision basic destination ids representing a single call termination on the network which may be a single telephone instrument or a line termination into a PBX. Destination ids with ACD feeds, which may represent a single call termination into an ACD, may also be provisioned. Provisioning of ACD path groups representing a set of destination ids that terminate on the same physical ACD and share the same statistical data feed is also enabled. Provisioning of Destination Groups representing a set of logically related destination ids and/or ACD path groups is possible via the C×C option. Destination Groups are a convenience mechanism for writing rules that refer to multiple destinations without having to list each destination separately. In addition, the customer may provision distribution methods, e.g., even, which is a round-robin selection of destination ids or directed, in which the calls are routed to destination ids based on a percentage allotted to each destination id.

At step 1262*f*, quota customers to specify and maintain call routing quotas for destinations. At step 1262*g*, the customer is enabled to provision called numbers. For example, the customer creates a rule set associated with the called number. The rule set typically determines the location of the caller and selects the appropriate destination number for the nearest warehouse. At step 1262*h*, the customer may provision value lists which are sets of related numeric values. They are typically used in rule sets to test the attributes of an incoming call to determine a characteristic of the call or caller. An attribute of the call (such as the ANI) is tested against a value list. If the value of the call attribute matches an entry in the value list, then other rules are executed based on this logical condition. This feature is highly useful for non-English-speaking callers. At step 1262*i*, the customer may provision translation tables. The translation tables include a highly flexible mechanism for performing a table lookup and returning a value that corresponds with the search argument. At steps 1262*j* and 1262*k*, the customers may maintain user variables such as setting up names for peg counters and rule variables and routing instructions.

By selecting the alarm manager option at step 1264, for example, by clicking on an icon labeled "NEMS" (FIG. 48 at 1872) on the call manager web station tool bar displayed on the screen 1870 in FIG. 48, the customer may display various alarms for problems occurring across the call manager components. These components were described above. Typically, alarming is performed through the BMC patrol software agents with monitoring provided by the system operational support (SOS) organization, which monitors other components of the call manager platform. Patrol's "logwatch.cinfig" allows setting up a file name and a selection string. Patrol agents typically monitor the file and pass alarms matching the selection string to the web clients. For logging application level alarms, a UNIX syslog facility is used. A set of "send-alarm functions" interfaced between the application processes and syslog daemon is added to a common utility library. Through the send-alarm function the call manager application processes send the alarm messages to the same log file with different levels of severity. The alarms with high level of severity is generally monitored by system operational support (SOS) organization through BMC patrol software. Each alarm message typically includes a process name, an alarm number, and a severity level. A typical alarm message looks like: "Apr 8 17:23:31 cmjwstest Process Name [Process PID]:[LOG_Alert Number] can't set up a connection to XXX Nexus at Line 65 File proxy." The alert number then may be used to determine possible solutions.

Referring back to FIG. 47, selecting the reporting and data extracts option at step 1268, for example, by clicking on an icon labeled "Reporting" (FIG. 48 at 1876) on the call manager web station tool bar displayed on the screen 1870 in FIG. 48, enables the customer to obtain reports of ACD statistics, alarm history, database usage, CDR extracts, Peg counters, and system performance. Each of these reports may be generated on-line or by a print function within the application. The ACD statistics are monitored in live, near-real-time by the SCP Host application. A load-balancing algorithm uses ACD statistics to determine the "busy-ness" of a destination. When an ACD Path Group is selected as the least busy location by the load-balancing algorithm, one of the individual destination ids within that ACD path group is picked to carry the call. The reports of alarm history permit the customer to view the status of alarms and events on the various hosts. An alarm or event may be an informational message sent autonomously from a host. Database usage reports generally provide information on users, typically by user id, accessing a workstation, SCP host, or C×C application. CDR extracts generally provide a database record of call detail record information about a called number translation query and its outcome of the routing translation process. Peg counters generally represent a series of accumulators that are available to the user for counting actions or situations encountered in a rule set. System performance reports allow the customer at a workstation (webstation) to monitor capacity of the host and application components to foresee and prevent possible outages.

Selecting the graphic data display option at step 1272, for example, by clicking on an icon labeled "GDD" (FIG. 48 at 1878) on the call manager web station tool bar displayed on the screen 1870, enables the customer to obtain and view histogram, chart, and line graph displays of ACD-based statistics and routing peg counts, which may be refreshed as frequently as once per minute.

Rules Writing, Testing, Debugging Application Features

The rules feature (FIG. 48 at 1884) allows users to write rules for routing of toll free calls. Rules may load balance based on call center capacity and route based on automatic number identification (ANI), caller entered digits (CED), or quotas. Via this feature, users may also test, install, uninstall, and swap rules as shown at FIG. 48. The bottom half of screen 1870 in FIG. 48 displays a typical rules writing/editing template. The users may build rules on the rules construction area 1882 by including statements selected from the constructs list box and the statements list box 1884. The users may also select various options 1886 available for the selected construct or statement for building the rule.

For enabling a rule writer to test a rule set, the rules feature provides a rules debugger/tester functionality which runs a rule set against a set of test data, i.e., call context, simulating call scenarios in which to test a rule set logic.

This optional facility allows rule writers to check if their rule set exhibits the expected behavior, for example, before installing the rule set on the network. Moreover, because this test feature is purely optional, a rule writer need not run the rule testing functionality before the rule is installed.

When a customer, e.g., a rule writer, selects the debugger/tester feature option, a rules testing dialog appears. Via this dialog, a user may define a call context parameters for simulating call scenarios in which to test a rule set logic. The basic call context includes called-number, ANI, CED, carrier, date and time of the call. Optionally, the user may also modify the different parameters of destinations and quotas that may affect the load balancing.

In addition, an option to allow the database to be updated during the simulation is also provided. During the testing process, the customer may step through the simulation one line at a time or choose a "Run" command to run through the entire call all at once. Furthermore, during the simulation, the customer may select from various view tabs to view, including, a log view, a destination status view, a destination details view, a CDR view and a user variable view.

For executing the testing process, the debugger/tester uses the MML interface to Nexus, i.e., the debugger/tester formulates the user actions to one or more MML commands and sends the translated command to the SCP host. The SCP host typically stores the state of testing (including the different views of the log), and manages the test execution.

System Status Display

Typically, a system status display 1850 shown in FIG. 49, is opened by selecting "System Status Display" from the security button on the main toolbar (FIG. 48 at 1882). The dialog is non-modal having a top half having a dialog 1852 including general information about the system, and, a bottom half including a combination box 1854 that allows the user to select between the different options described above, i.e: application status, ACD gateway status, partner links status, signaling network links status, and webstation session links status. Selecting an option displays a list including information relevant to that option. As shown at 1854, selection the application status displays information including application names 1856, instance numbers 1858, desired states 970, actual states 1862, release numbers 1864 and TPS 1866. Similarly, selecting the ACD gateway status option displays information including gateway names, gateway states, gateway link states, collector link states, and dates/times of last change. Selecting the partner links status option displays host names, states, link states, sync states information. Likewise the signaling network links status option displays information which includes linkset names, link names, states, dates/times of last change, and adjacent point codes. Selecting the WebStation session links status option displays information such as workstation instance numbers, locations, states, user ids, and dates/times of last change.

Example MML and (SCP) host system status messaging supporting the system status display feature of the CMWS application is described in above-referenced, co-pending U.S. patent application Ser. No. 09/159,506. When a message prompting user readiness is received by the host, the host sends system status messages on a regular interval. The length of the interval may vary anywhere from every second to every minute. The system status display messages are automatically sent from the SCP host, once the messages are turned on. The backend typically stores this type of message received from the SCP host until the client queries for it. A unique set of data is stored for each user currently performing a system status display. Subsequent messages received from the SCP host typically overwrite previous data.

The Host Administration Functions

A user may select to perform host administrations by selecting the appropriate icon from the main tool bar (FIG. 48). In response, a pull-down menu from is presented with options including: a backup option for backing up server database to a user-selectable back-up medium, e.g., tape or a disk; an ACD gateway administration option for providing users with the ability to view, create, delete and edit ACD gateways; an ACD collector administration option for providing the user with the ability to view, create, delete and edit ACD collectors; a FMS gateway administration option for providing the ability to view, create, delete and edit FMS gateways; and FMS collector administration for providing the ability to view, create, delete and edit FMS collectors.

Figure 50:
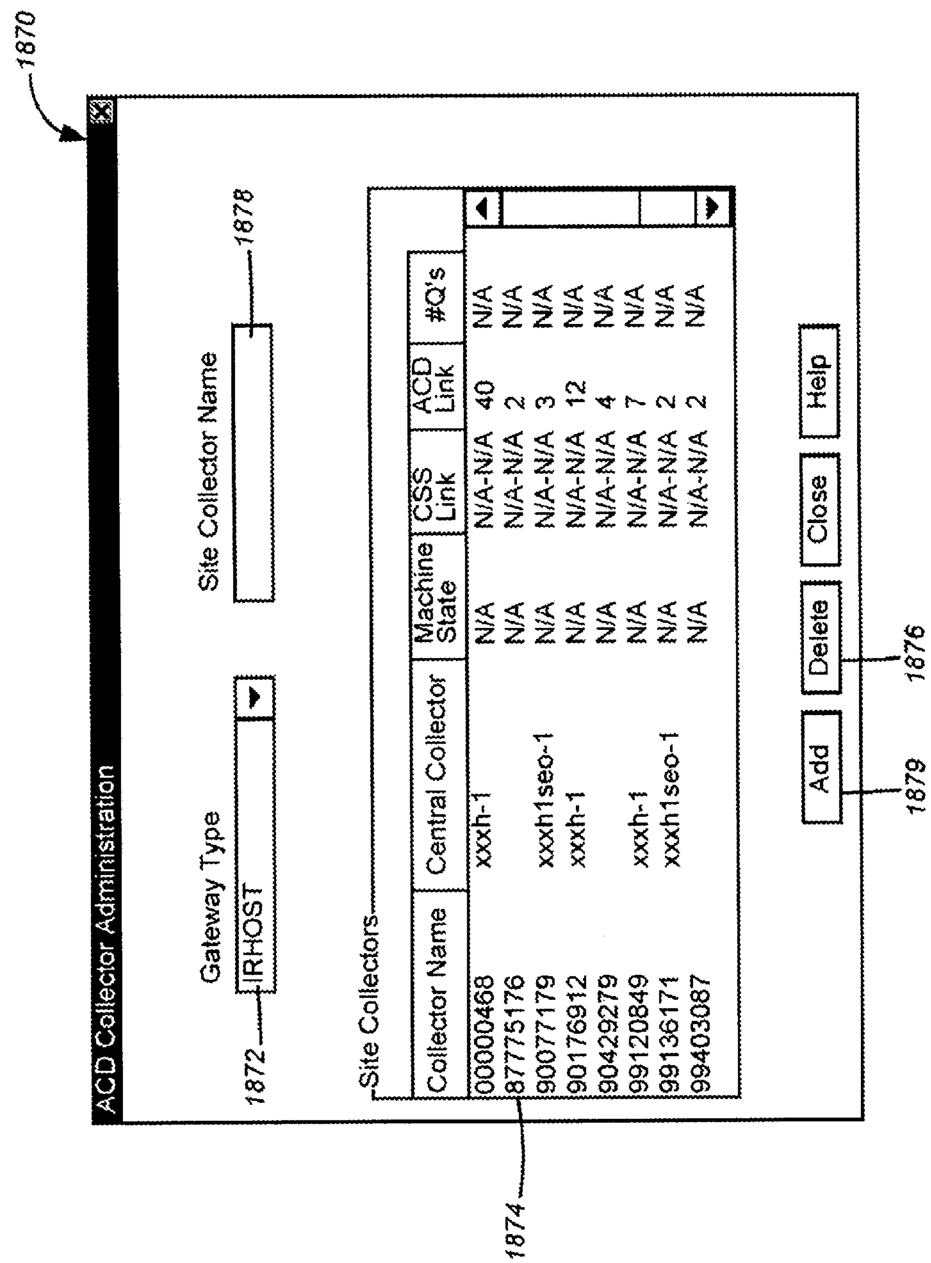
FIG. 50 illustrates an example of a ACD collector administration function screen displayed for providing the user with the ability to view, create, delete and edit ACD collectors.

When the ACD collector administration option is selected, a dialog 1870 shown in FIG. 50 opens with a list of retrieved gateway types. Typically the client GUI application sends two messages to retrieve information needed to populate the dialog box 1870. A "rtrv-acd-type" is used to fill the gateway type combo box 1872. A "rtrv-acd-status" is sent to retrieve information 1874 on the selected gateway type. Clicking a row in the list 1874 of enables the delete button. Typing characters into the site collector name 1878 enables the Add button 1879. The FMS administration dialogs share the same dialog box with the above described ACD gateway and collector administration functionalities. The same messages, i.e., the "rtrv-acd-type," and the "rtrv-acd-status," are sent to the back-end but with different parameter types, e.g., "FSM" or "ACD."

Company Branding

The CMWS component of the nMCI Interact system supports a branding functionality which allows users to open the call manager webstation application in a company specific context. Details including an example class diagram including classes used in branding process and, a scenario diagram showing an example of branding process for presenting a warning dialog with a company brand is found in above-referenced, co-pending U.S. patent application Ser. No. 09/159,506.

Language Support

The CMWS component of the nMCI Interact system additionally provides an internationalization feature, supporting local languages for text displays. This optional feature allows a user to open the call manager application in a language as set by the user. Subsequent texts and phrases are rendered in the language chosen. Typically, the call manager webstation application is opened with a default language as set by the operating system. The user is also given an option to select a language other than the default. A call manager applet typically determines the locale set for the operating system and launches the appropriate language version by including the locale as a parameter. For example, the parameter with a name "locale" may have one of the following values: "en_US" for English US, "en_CA" for English-Canada, and "fr_CA" for French Canada. The applet uses this value to set the locale for the system string and phrase resources. A scenario diagram for setting the locale via the call manager applet is found in above-referenced, co-pending U.S. patent application Ser. No. 09/159,506. As described in co-pending U.S. patent application Ser. No. 09/159,506 a CMResource class handles the general resources of character encoding, numeric formatting and date formatting.

Online Invoicing

Figure 51:
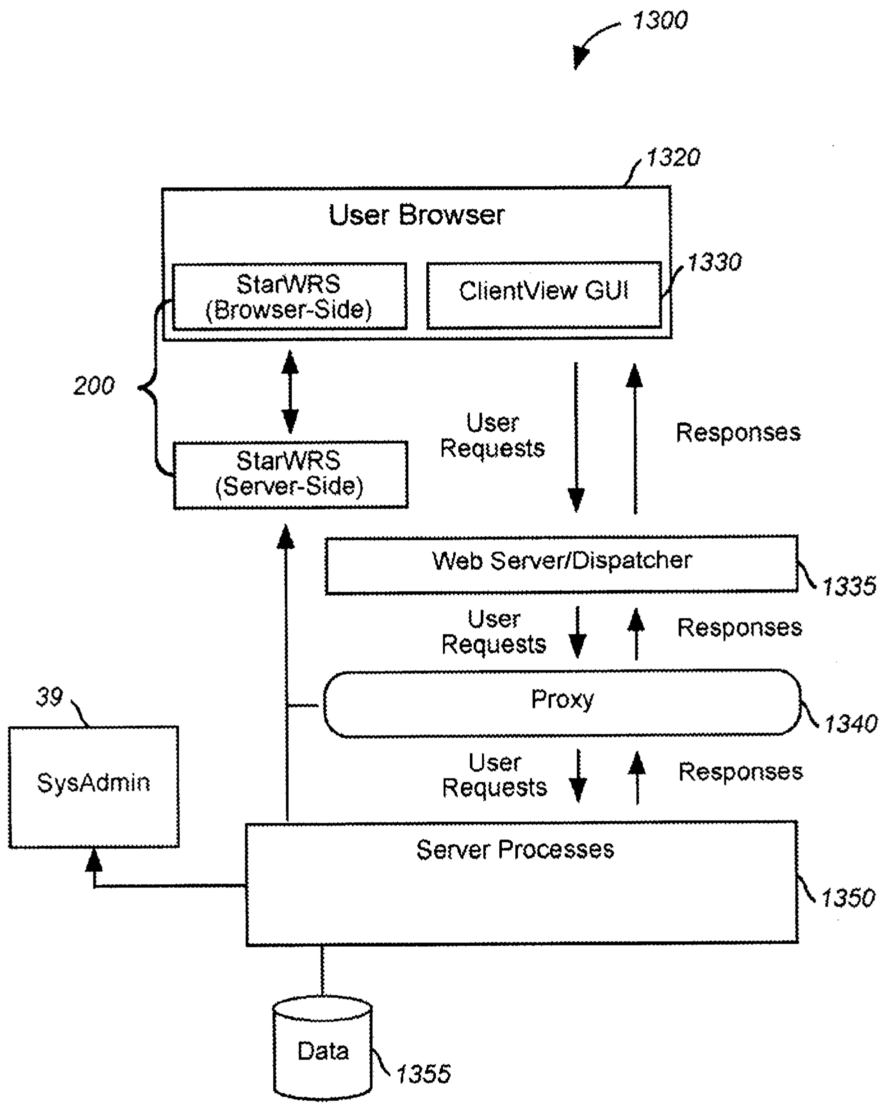
FIG. 51 illustrates an architectural schematic of the online invoicing system 1300 component of nMCI Interact.

Another application of the suite of telecommunications network management applications is an online invoicing system, herein referred to as "ClientView," which provides customers with the ability to view invoices and reports online, and offers a facility for printing and faxing documents. The online invoicing system takes information available from different billing systems and incorporates that information into its database for subsequent retrieval and presentation to a user according to user-specified requests. A general block diagram illustrating the online invoicing system architecture 1300, integrated with the networkMCI Interact platform, is shown in FIG. 51. Generally, as shown in FIG. 51, the ClientView system 1300 is integrated within the nMCI Interact system comprising: the user web browser 1320 which employs a ClientView GUI 1330 for providing an interface to which a customer may request and view various billing invoices associated with the application services subscribed by the customer and provided by the networkMCI Interact system via a secure socket connection for presentation of invoice reports. For example, using the GUI client application 20, customers may drill down on their applicable invoices, typically accessing them via the given customer identifiers such as the corp id, bill payer, or mega account numbers. The invoice reports may also be available for various application services including toll free, Frame Relay, and ATM; StarWRS client-side report viewer and requester processes 200 which provides the support for generating and presenting reports relating to the conditions of the customer's dedicated voice and data networks as described herein; a corresponding server side reporting component having the above described inbox, report scheduler and report manager components, in addition to alarm and report viewer and requester components implementing Java applets having viewer classes that enable the downloading and display of reports generated from ClientView server processes 1350.

Also shown as part of the online invoicing invoice viewing system architecture 1300 of FIG. 51 is the Web server/dispatcher component 1335 which provides for the transport between the Web browser and an online invoicing proxy interface 1340 including all secure communications and encryption. Thus, customer requests and server responses may be communicated from the user browser 1320 to the online invoicing server 1350 in a secure manner. Specifically, the dispatcher 1335 forwards user requests, such as "get index" message for retrieving a list of documents available for viewing by a customer, to the online invoicing server 1350 process that employs an integrated proxy application 1340 for receiving and interpreting the user messages and performing the online invoicing functionality. This proxy capability includes a multithreaded engine enabling multiple, simultaneously executing sessions supporting anticipated user load. The interface between the dispatcher server 1335 and the online invoicing server 1350 is also message-based, employing, e.g., TCP/IP socket transport, and, as will be described, a messaging protocol that is defined and which includes a generic message header followed by proxy-specific data. The same process of messaging scheme is employed in the other direction. That is, the online invoicing proxy 1340 sends the generic header, followed by the proxy-specific response back to the dispatch server 1335 for communications over the firewall and back to the user browser 20.

The online invoicing proxy 1340 uses the networkMCI Interact platform's "template proxy" as an implementation of the listener/slave portion of the proxy. The proxy 1340 passively listens on a previously defined port number and forks a process on an interrupt basis, after which the parent proxy continues to listen for other request. The forked process is generally dedicated to handling the detected requests. The forked process detects a transaction type from the proxy protocol header. The transaction types generally include synchronous, asynchronous, and bulk transfer, as described above. The proxy 1340 then calls a "back-end" function whose function is dependent on the transaction type detected. The back-end functions typically provide individual services for which the application is responsible.

For example, if the transaction type for a detected request is of "synch" type, the forked process executes the synch back-end function and passes the request as an argument. The synch back-end function generally passes the request to a CICS task on the online invoicing server and waits for a response. More specifically, the synch function first establishes a CICS task via a direct TCP/IP socket connection to the CICS TCP/IP interface service. The synch function then waits for a response indicating whether a connection was successfully established or an error occurred. If an error is occurred, an error response from the CICS task is returned to the synch function, which then terminates appropriately.

If a connection to the CICS task is successfully established, the request is sent to the task and the synch function waits on a response. The response is generally preceded with a preamble block, indicating the status of request and the number of bytes to follow. The preamble block may include an error code, indicating error conditions that may have occurred during the CICS task processing. Certain error indications may prompt the synch function to terminate the CICS task connection, and also to exit the synch function.

If the preamble block indicates that the request was successfully processed, the preamble block is returned, and the byte count specified in the preamble block is piped from the CICS task, to the requesting process, and typically all the way back to the client GUI application. Upon completion of piping the data, the synch function disconnects the CICS task and exits. The forked process which called the synch function also terminates itself by exiting.

In the preferred embodiment, the online invoicing server 1350 stores documents from various billing systems and performs the various database queries and function calls in response to requests received from the customer via the online invoicing proxy 1340. Particularly, the online invoicing server 1350 is responsible for tasks including data collection, calculation, storage, and report generation. A more detailed description of the server 1350 is provided with reference to FIGS. 55 and 56.

During its operation, the online invoicing server 1350 supports communications with the StarOE server 39 which provides for authentication of users, supplying of entitlement information, and enabling order entry for the various online invoicing invoice viewing services order entry functions including functionality necessary to manage (create, update, delete) online invoicing users, and feed the appropriate order entry information to the online invoicing server 1350 in order to properly associate the appropriate online invoicing functionality and data to the right customer once given admission to the online invoicing invoice viewing service.

As described previously, order entry for the networkMCI Interact browser and all applications on networkMCI may be made through the networkMCI StarOE order entry system. The online invoicing application service may be ordered for all business markets customers. For example, a user may select to have online invoicing invoices for a given enterprise, corp, bill payer, and/or mega account number. These include all NCBS, Toll Free, PLBS, and Mega invoices. In addition, selections may include invoice images for MCI CVNS-ROW, MCI CVNS-Mexico, MCI CVNS-Canada as well as Stentor Advantage Vnet/CVNS invoice images.

In the preferred embodiment, a messaging interface is utilized between the StarOE 39 and the online invoicing server 1350 for communications means. The online invoicing server 1350, typically functions as a client and receives authentication information, billing ids, and level of service information, which may also be supplied in response to the launch of the online invoicing GUI client application 1330. For example, when online invoicing client application 1330 is launched from the home page [FIG. 5(*b*)], a customer identifier such as the userid and the applicable corp ids and mega account numbers may be retrieved by the order entry system administration server, StarOE 39, and passed to the online invoicing server. The online invoicing server then makes the necessary association to individual bill payers that the user is authorized to view. The view of invoices may include a particular portion of the invoice as well as the entire invoice.

The online invoicing server 1350 also may interact with the StarWRS inbox server 270 by storing the news information regarding the online invoicing service, in addition to the event notifications, and report data from the networkMCI Interact application services.

In addition, the invoice files saved on the inbox may be retrieved and viewed using the report requester 212 and the report viewer 215 components of StarWRS 200 (FIG. 10) residing in the user browser 20. Via the report requester, the customer may request tailored reports regarding the invoice files and view or print the customized invoice reports displayed by the report viewer as described herein.

Figure 52:
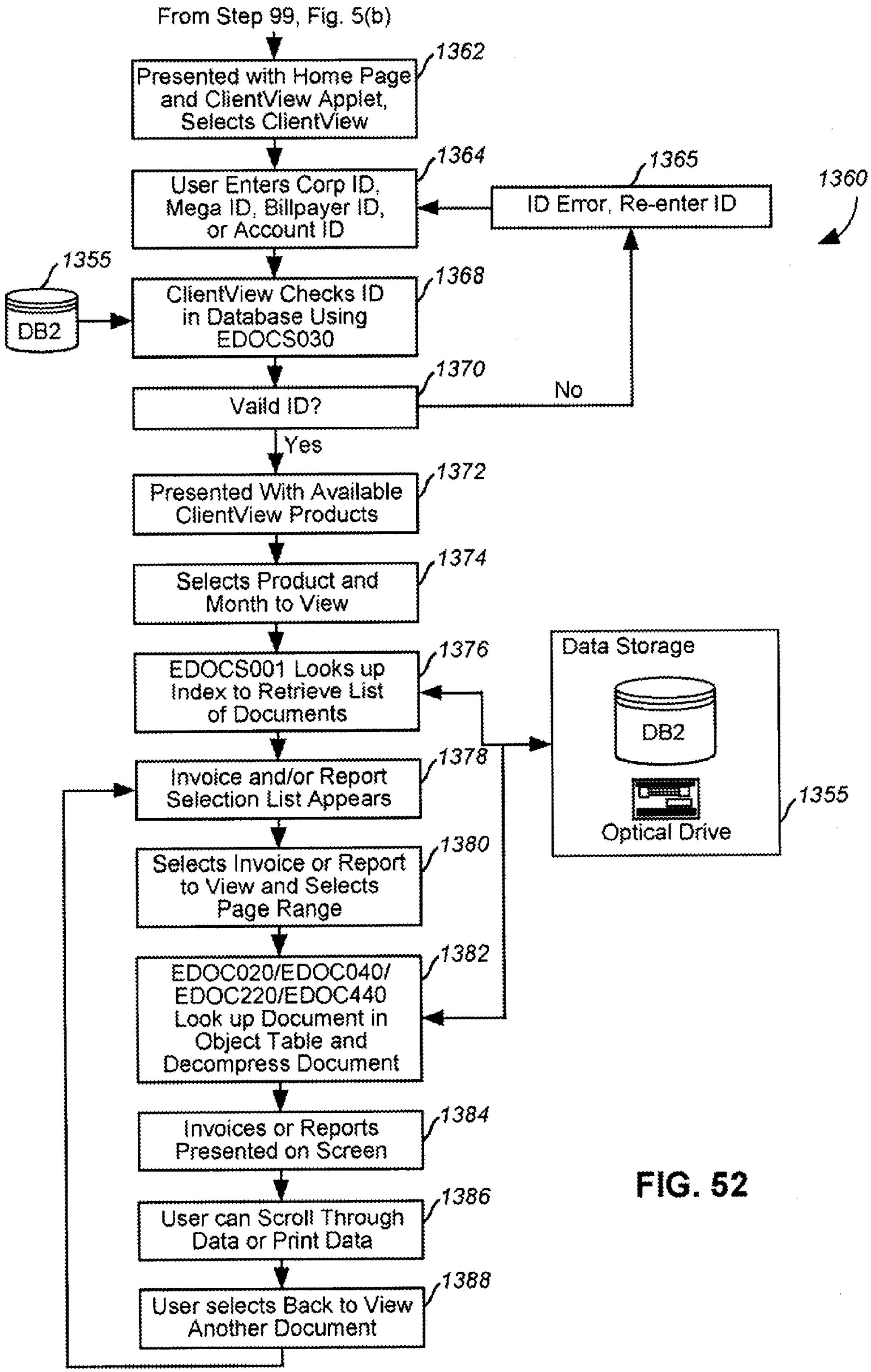
FIG. 52 is a flow diagram illustrating an online invoicing process flow.

An application-level process flow 1360 for the ClientView system is now presented in view of FIG. 52. After successful logon and entitlement determination (by StarOE server), and upon selection of the online invoice (ClientView) application from the downloaded networkMCI Interact homepage to the user [FIG. 5(*b*)], a ClientView applet is invoked at step 1362 to display an online invoice screen at the customer workstation. As indicated at step 1364, the user then enters the customer identifiers on the online invoice screen which are then checked against the available list of customer identifiers in the online invoice server's database at step 1368. If the customer identifier does not exist or is not a valid type at step 1370, the user is prompted to re-enter the identifier at step 1365. When the customer identifier is properly validated, the user is presented with the online invoicing products associated with the customer identifier at step 1372. The user then may select products by their date ranges at step 1374 for viewing. At step 1376, a server module then retrieves a list of document based on the selected product and date range from the online invoicing database, and at step 1378, the list is presented to the user, from which the user may select to view a document, at step 1380. Upon the user selection, the server modules retrieve the document from the database at step 1382. At step 1384, the invoice and/or report documents are presented to the user at the user's workstation. At step 1836, the user may scroll through, or print the data presented, or the user may, at step 1388, select to view another document at step 1378.

The information stored in the database 1355 generally originate from different billing systems. When data is available from these billing systems, the online invoicing server typically performs a conversion process and stores the converted data on tape until an audit approval. When the converted data is audited and approved, the data having the invoicing documents are stored to the database 1355. After the data has been stored in the database for a predetermined period, it may be moved from a direct access storage device (DASD) and stored on optical platters. These platters may remain in an optical jukebox for another predetermined period and then migrated to an optical shelf where the data may be available for a certain period.

Having described generally, an overview of the online invoicing application service and its integration with the networkMCI Interact's network and data infrastructure, the specific functionalities of the online invoicing application, namely the online invoicing GUI application on the client platform side and the online invoicing server in the enterprise Intranet, will now be described in detail below.

Online Invoicing GUI Application

Figure 53A:
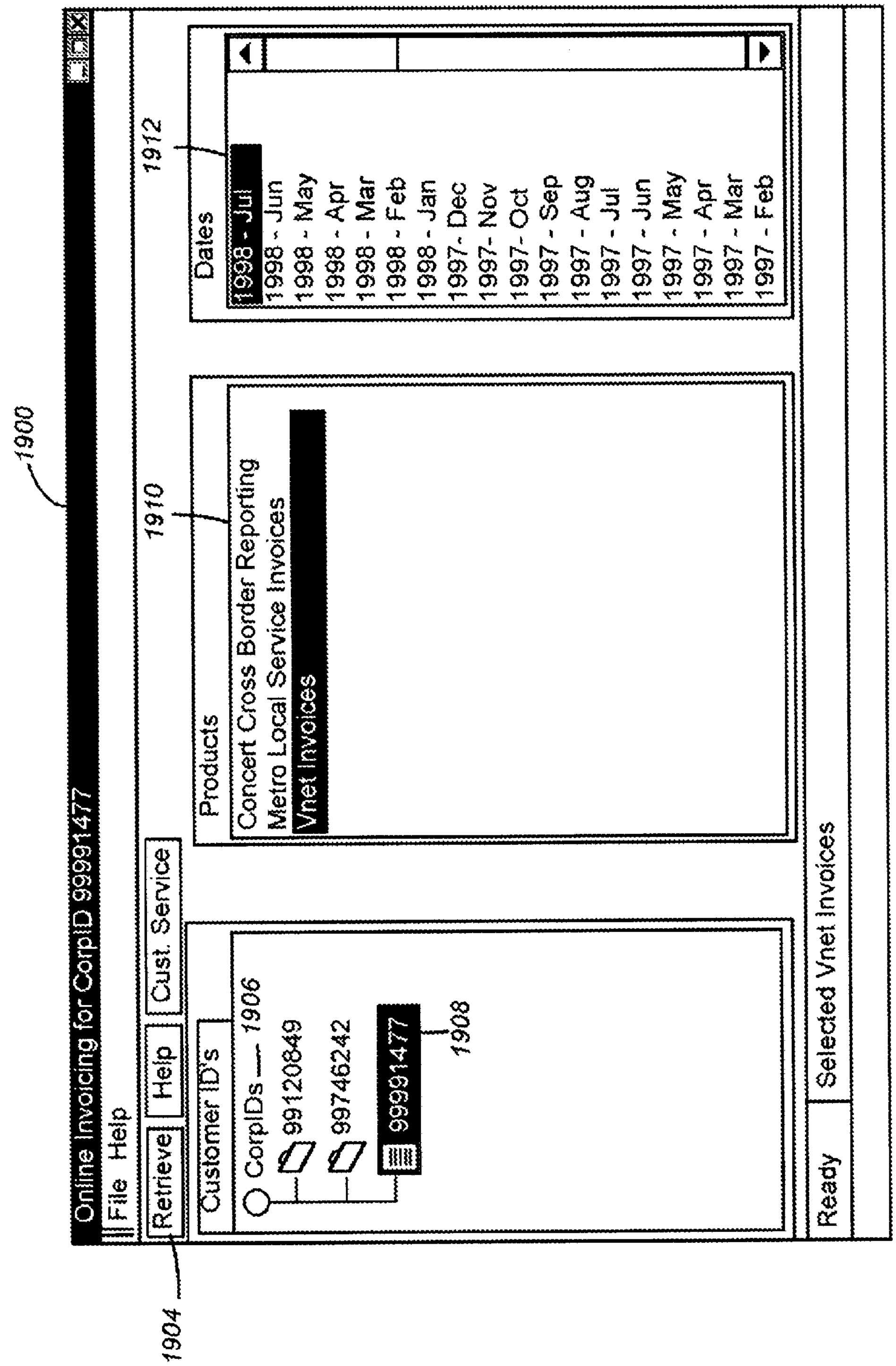
FIG. 53(*a*) is a sample criteria screen launched from the nMCI Interact home page.
Figure 53B:
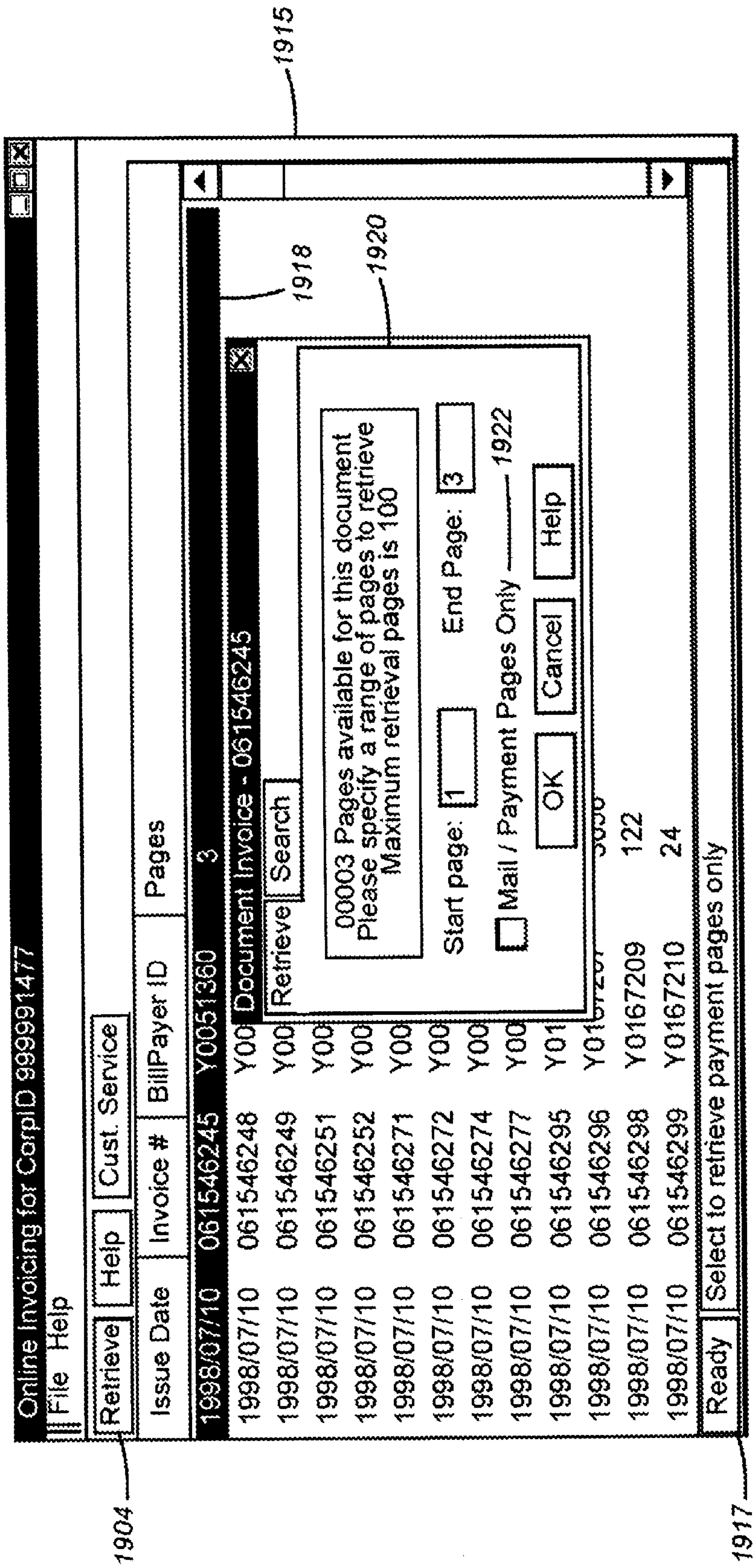

As in the other nMCI Internet network management client applications, the online invoicing client application is implemented in Java to ensure platform independence and particularly is developed in accordance with many of the networkMCI Interact's common objects, as described herein, for achieving interoperability with the application backplane. The client component of the online invoicing includes a client interface for the user to select what data to retrieve. The data is then retrieved through various application processing, and a list of invoices and reports are provided for the user to choose from for online viewing. When a customer clicks on the "online invoice" icon 99 on the home page [FIG. 5(*b*)], after a proper authentication via a logon, the customer is presented with a criteria screen 1900 as shown in FIG. 53(*a*) from which the customer may specify various types of, and date ranges for, invoices desired, e.g., Vnet invoices and the Concert Cross Border Reporting. The criteria screen 1900 is divided into a customer identifier section 1902, products section 1910, and dates section 1912. The customer identifier type includes identification by corporate id 1906, account id, bill payer id, and/or mega id. Each online invoicing user is given at least one identifier type 1906 and a customer identifier number 1908 associated with the type at the time of order entry via the StarOE. The StarOE maintains this customer information and communicates the information to the online invoicing GUI application, when the application is invoked by the backplane applet. Accordingly, at the same time the online invoicing GUI application displays the criteria screen 1900, it also populates the identifier type 1906 and customer identifier 1908 fields automatically as received from the StarOE user authentication and entitlement system.

The user may then select a desired identifier type from the list of identifier types shown at 1906. The online invoicing GUI application then automatically fills in the customer identifier field 1908 associated with the identifier type selected. In addition, if the customer's last selection was made with a certain type, e.g., corp id, the next time the customer views the criteria screen 1900, the corp id identifier type will be selected automatically. After selecting a desired identifier, the user typically then may execute the search of invoices available for that identifier by clicking on the retrieve button 1904, pressing an enter key, or using a fast key combination such as Alt+S.

The products and dates sections 1910, 1912 are used for displaying the service products for which invoice viewing is available for a given customer identifier type and the date range for the available invoices. When the user executes the search, the products field 1910 is filled in with the date ranges 1912, indicating available invoice reports for various period ranges. For retrieving invoice documents, the user may select ranges of dates including multiple ranges of dates as shown, and then click on the retrieve button 1904, press enter, use the fast key combination Alt+R, or click on any area within the date range list box 1912.

Upon executing the retrieve user command, the online invoicing GUI application displays the screen 1915 shown at FIG. 53(*b*) listing the report documents. For each document, date, invoice number, bill payer id, and number of pages are displayed as shown in screen display 1915. The status bar 1917 at the bottom of the screen may display a number of indices (document lists) loaded. The number of indices which may be loaded at one time may be configurable by a customer via the online invoicing GUI application. An invoice report listed then may be selected and retrieved by clicking on the retrieve button 1904, pressing an enter key or double clicking on a highlighted item 1918, or using a fast key combination such as alt+R. When a selection is entered, a page range selection box 1920 appears. The selection box 1920 allows customers to enter in the desired page range for viewing. The mail/payment option 1922 for retrieving only the remittance pages without having to retrieve additional invoice pages, is available from this screen.

Figure 54:
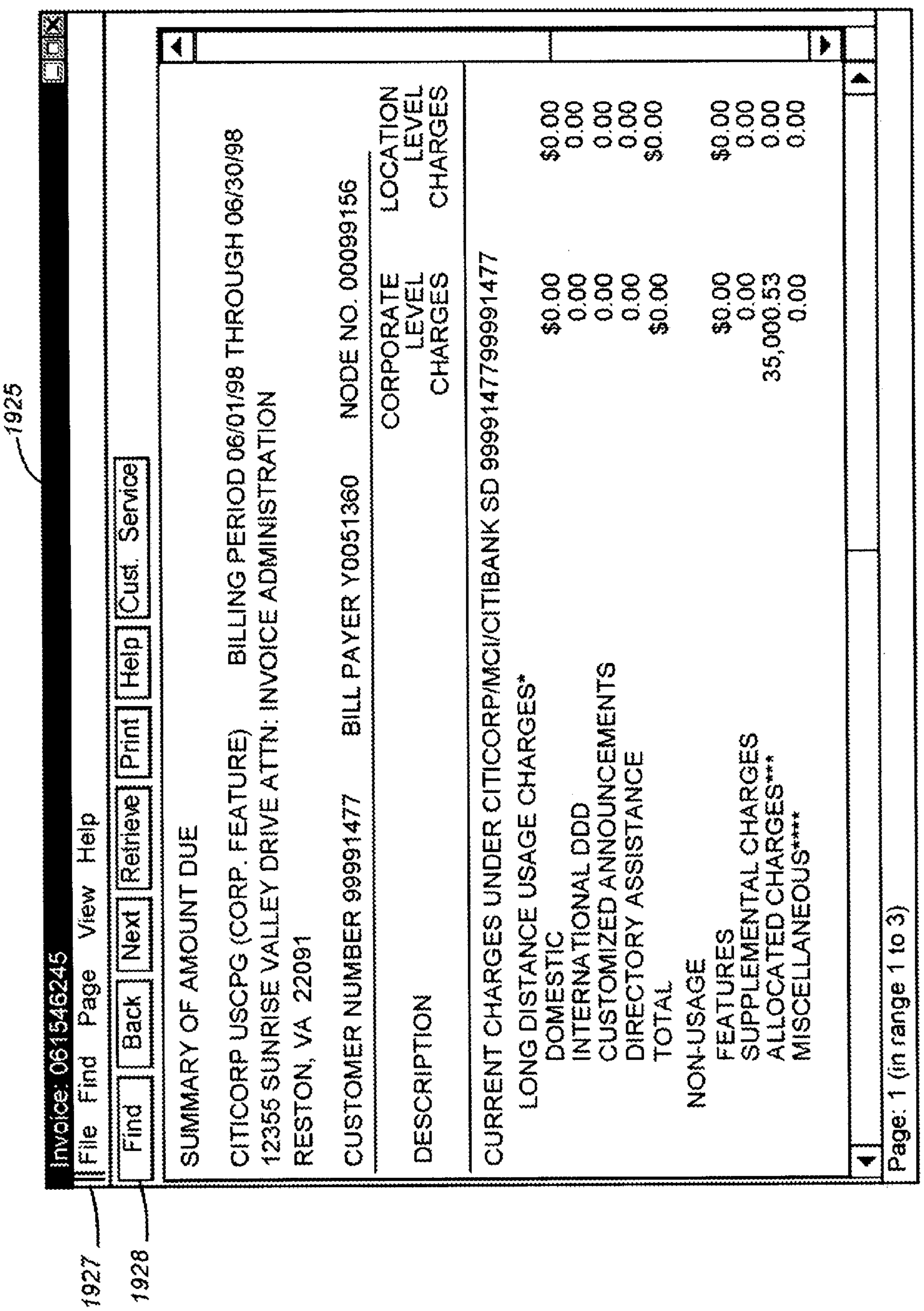
FIG. 54 is a sample screen displaying an invoice document generated by the online invoicing system component of the invention.

FIG. 54 illustrates a sample invoice document 1925 retrieved when an invoice item is selected from a screen 1915 shown at FIG. 53(*b*). Using the menu bar 1927 or a tool bar 1928, a customer may access the following functions: open a saved document; save the current document; print the current document; fax the current document; Batch Print a document; Search the document for word(s); display the first downloaded page; display the previous page; display the next page; display the last downloaded page; Go to a specified page; increase the font size of the displayed document; reset the font of the displayed document to the default; decrease the font size of the displayed document; and, return to the screen that invoked the document.

With more particularity, the batch print option may allow customers to send a batch print job to be performed at the enterprise Intranet to the customers, e.g., via Federal Express, at a location specified by the customer. An example batch print data entry screen and pop-up confirmation screen can be found in commonly owned, co-pending U.S. patent application Ser. No. 09/159,405 entitled WEB BASED INTEGRATED CUSTOMER INTERFACE FOR INVOICE REPORTING, the contents and disclosure of which is incorporated by reference as if fully set forth herein.

Another feature provided by the ClientView system 1300 includes an accumulator function which allows customers to add up numerical figures, such as minutes and charges, by highlighting the numbers directly on the screen. Details regarding the accumulator function can be found in above-referenced, co-pending U.S. patent application Ser. No. 09/159,405.

The above-mentioned fax current document option offered by the online invoicing application includes an ability to fax to the customer, at a customer specified location, a current page, specified range of pages, or the entire document by making an appropriate selection in a fax dialog box such as described in above-referenced, co-pending U.S. patent application Ser. No. 09/159,405.

Online Invoicing Server

As described above, the online invoicing provides on-line visibility to various networkMCI Interact documents. In presenting various documents online to a customer, the GUI client application communicates to a online invoicing server via the proxy for retrieving up-to-date information which the server maintains. These documents are indexed and stored in the online invoicing's database 1355 (FIG. 52). The online invoicing server includes several processes for performing the indexing and storing of the documents.

Figure 55:
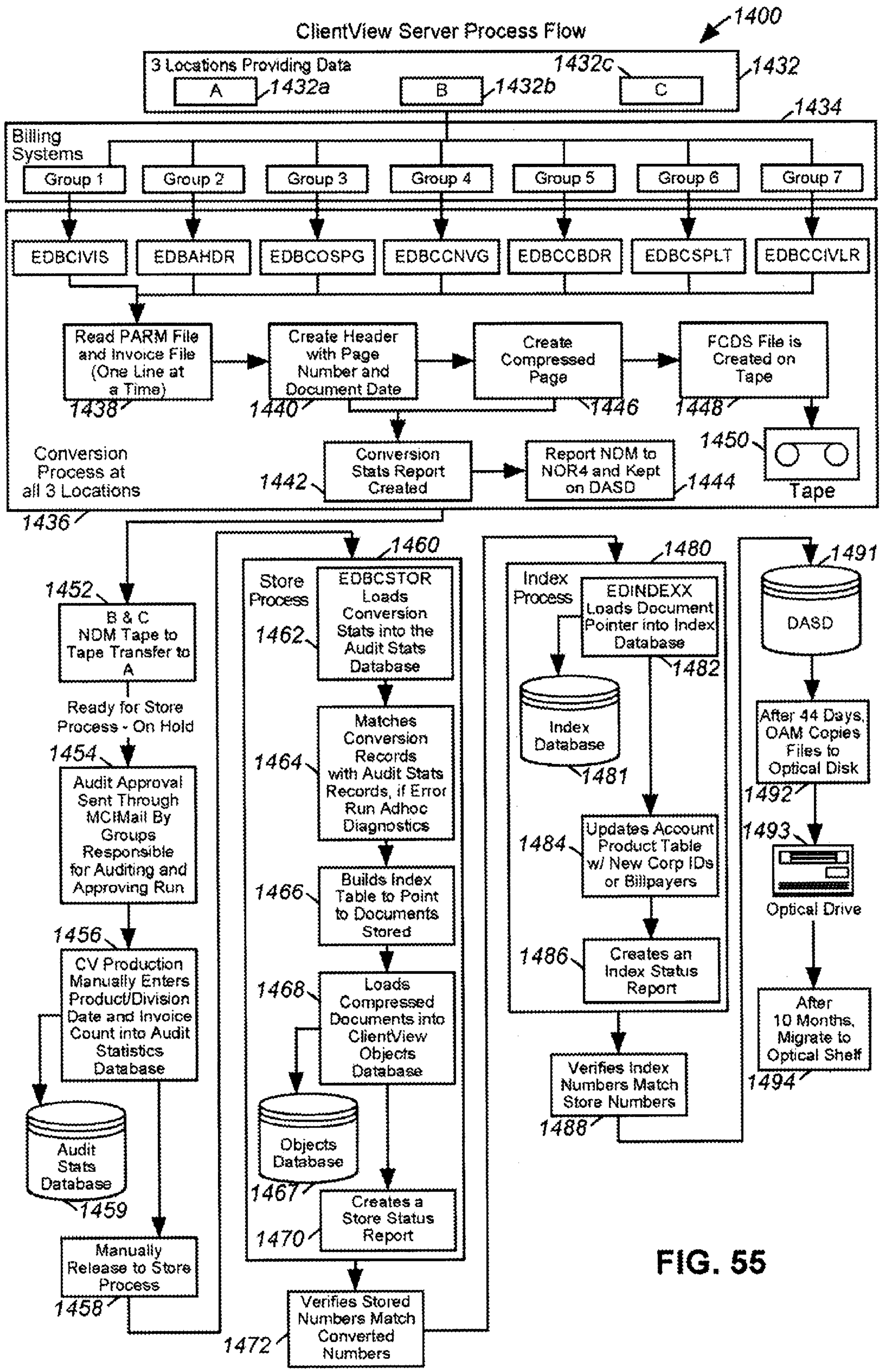
FIG. 55 is a flow diagram illustrating an online invoicing back-end server process flow 1400 during document indexing and storing.
Figure 56:
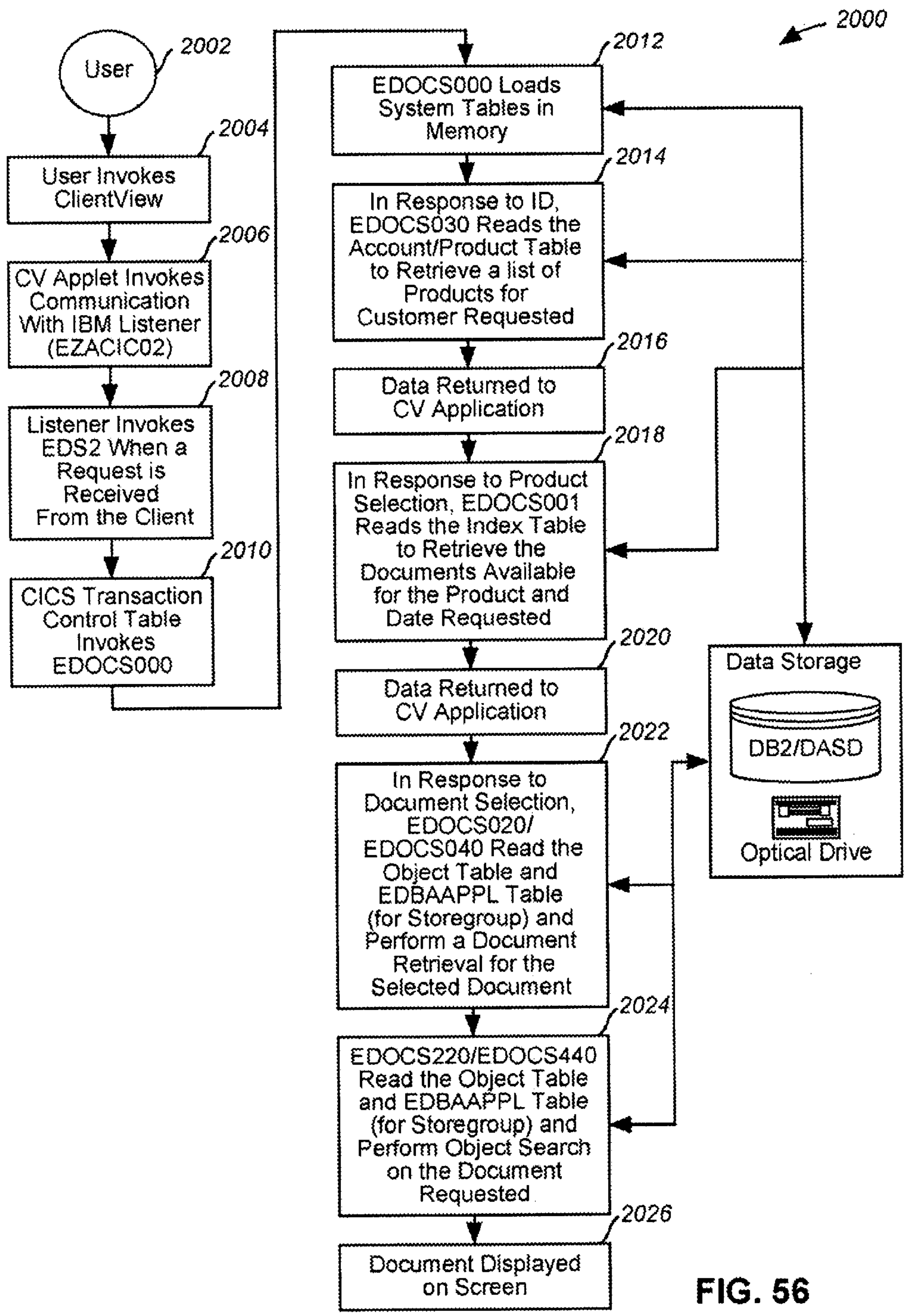
FIG. 56 is a flow diagram illustrating an online invoicing back-end server process flow when responding to client requests for document presentation.

FIG. 55 illustrates a process flow 1400 of the online invoicing server 1350. The server may receive data from a number of data centers 1432. FIG. 56 shows three data center locations: location "A" 1432*a,* location "B" 1432*b,* and location "C" 1432*c,* as illustrative examples. At each site, invoice data associated with various products is available from various billings systems associated with the products, as shown at 1434. The products may include Vnet, toll free, Cross Border, Mega, etc.

In a preferred embodiment, an online invoicing's conversion process 1436 is used to convert documents at each of the data centers. The conversion process generally defines the key information necessary to retrieve the document and compresses the document for storing. Each conversion process 1436 generally performs the same tasks. More specifically, these tasks include creating a formatted compressed data set (FCDS) file and a conversion stats report for each conversion run. The FCDS file is the document which may eventually be incorporated into the online invoicing database. At step 1438, the online invoicing conversion process reads in a PARM file and an invoice file. The PARM file includes document information such as the logical record length. The invoice file is read one line at a time and at step 1440, key information including page numbers and document dates is placed in a header record which is kept in memory until the FCDS file is created. At step 1446, the conversion process creates compressed pages of the document. The compressed pages follow the header record in the FCDS file. Once the FCDS file is created at step 1448, the file is stored on tape at step 1450, and the B and C locations NDM the tape to A at step 1452. At step 1452, the conversion stats report is also created which includes page information and conversion information associated with each conversion run. The last line of the report has the conversion stats record, which includes the number of pages converted and the number of headers created. This report is then NDM'd to A by B 1432*b* and C 1432*c* and kept on DASD for future reviews and audit verification.

The FCDS file is generally placed on hold, as indicated at step 1454, until audit approval is received through MCIMail, which is sent by various groups responsible for auditing and approving the document files sent to the online invoicing. Once the audit approval e-mail is received, an online invoicing production manually enters the product/division date and the invoice count into the audit statistics database 1459, at step 1456. The store job is manually released at step 1458 by the online invoicing production control after audit approval is received.

The online invoicing includes a DB2 database subsystem residing in a NOR4 mainframe. The subsystem further includes an object database and an index database. An online invoicing store process 1460 loads the compressed document to an online invoicing object database and an online invoicing index load process 1480 stores index pointers to each document in the index database. An audit check is executed to ensure that the correct number of documents are added to the online invoicing databases during the object load and index load processes.

More particularly, the store process loads the conversion stats record into the audit stats database at step 1462. At step 1464, the conversion records are then matched against the manually entered audit stats records. The store process 1460 also includes loading of the FCDS file from which is builds an index for each object and an index file, which includes the pointers to the document, as shown at step 1466. The store process 1460, the loads the compressed documents into the online invoicing object database 1467, as indicated at step

1468. At step 1470, the store process 1460 then creates a store status report and loads the report into the audit stats database 1459. At step 1472, an audit checkpoint verifies that the stored numbers match the converted numbers. If there are nay errors with the numbers in the audit stats database at any point in this process, the job may automatically stop the store process 1460 until the feed/problem is corrected. Once these numbers are verified, the index process 1480 may begin.

The index process 1480 at step 1482, i.e., EDINDEXX as shown in FIG. 55 as an example, generally loads the index pointer for each document, which are typically created by the store process 1460. At step 1484, the process 1480 also updates the account product table with new customer identifiers such as the corp ids or billpayers. At step 1486, the index process 1480 creates an index status report. At step 1488, another audit checkpoint verifies that the index numbers match the stored numbers. The stored and indexed data are kept on DASD 1491 for a predetermined number of days, e.g., 45 days as shown at step 1492. After the predetermined number of days, the object access method (OAM) copies the files from DASD 1491 to an optical disk via the optical drive 1493. After another predetermined period, OAM migrates the objects from the optical disk to the optical shelf as shown at step 1494, where they remain available for another predetermined period of time. Once the indexes are loaded into the database, the documents are available for viewing.

The following database tables are included in the online invoicing database: a product cross reference table which assigns the online invoicing product code to the product name; a CDSPARM table which keeps the store precess run statistics to allow for a restart when necessary and which includes an entry for each product code and runstream; an EDBAAPPL table which assigns a product code to a store group; a statistics audit table which keeps audit statistics for each product/runstream logged by the store process; and a conversion program parameter file which defines where the conversion may find the documents key information.

The information on documents for imaging and storing are typically received from the various networkMCI Interact's application services. A list of the various billing systems providing product feeds to online invoicing for document imaging is provided in above-referenced, co-pending U.S. patent application Ser. No. 09/159,405.

The online invoicing server application is typically written in COBOL II using CICS/DB2 and OAM. The persons skilled in the art would appreciate that the server application may also be implemented with any other compiler languages or software tools. The server application includes a startup transaction (EDUP), and a multipurpose transaction, EDS2. The EDUP transaction passes several DB2 tables such as a function table, a version control table, and the batch print request table. The EDUP transaction also calls OAM to verify OAM is active and to get the token for future calls to OAM. An in-core table is built for system information and temp storage records are built for version control and batch print pricing. The EDUP is generally executed at CICS startup time.

EDS2 is a multi-purpose transaction which is started when a request is received from a client GUI application. Its functions may include product and date listing, index retrieval such as shown at 1915 FIG. 53(*b*), and batch print request storing. The transaction uses the common top-level function (EDOCS000) and links to a lower level function designed to perform a specific task, based on a specific function. The lower level function results are passed back to the top-level function which checks return codes for possible error. The data result is then passed to the client GUI application via the proxy and the Web/dispatcher 1335 (FIG. 51), and statistics are written to a VSAM file. EDS2 is also executed for document retrieval for retrieving invoice documents shown at 1925 FIG. 54. It uses the common top-level function and links to lower level functions to perform the retrieval processing.

FIG. 56 is a detailed ClientView server process flow diagram 2000 illustrating the server processes for responding to the client requests. After a user 2002 properly logs on the networkMCI Interact and invokes the online invoicing application at step 2004, by selecting an appropriate icon on the networkMCI Interact homepage, the online invoicing client GUI application, at step 2006, generally requests communications with a listener process running in the server.

Generally, the communications from the online invoicing server to the client workstation is performed by a set of calls to the TCP/IP address space. As an example, a listener process, EZACIC02 is activated at CICS initiation, and constantly "listens" for activities. When a request is received from the client, the listener, e.g., EZACIC02, invokes the EDS2 transaction, at step 2008. At step 2010, CICS invokes the first program, i.e., EDOCS000 in the example shown, in the transaction EDS2 via the CICS transaction control table. Then, at step 2012, EDOCS000 loads system tables into memory. In addition, EDOCS000 also makes calls to TCP/IP to communicate with the client GUI application. EDOCS000 is also responsible for logging both successful and unsuccessful requests, as well as routing the request to one of many sub-programs, based on a function code and an object name. The sub-programs include EDOCS030, EDOCS001, EDOCS020/EDOCS040, and EDOCS220/EDOCS440, each of which will be described in more detail below.

When the listener process has a data to pass to EDOCS000, EDOCS000 invokes a RETRIEVE command to get the data. EDOCS000 then performs a take socket and responds to the client by a write socket. The client then typically responds to the server with a function code and additional data such as a customer identifier, dates, etc. EDOCS000 performs data validation such as function codes, checks to see if the system is up, supplies pricing information for batch print, links to lower level functions, checks the results of the lower level results, produces error entries where needed, writes statistics, and passes any data retrieved (or an error) back to the client GUI application.

After each call to a subroutine, EDOCS000 checks a return code. EDOCS000 also checks return codes from calls to the TCP/IP and posts an error message when the TCP/IP return code is a non-zero value, indicating an error. The errors are generally logged in the TCP data file and may be reviewed as needed. When all the processing necessary for responding to the client is complete and response data is successfully sent to the client, the client GUI application sends an acknowledgment for the receipt of the data, back to the server. The socket is then closed, freeing it for another request to be communicated.

Referring back to FIG. 56 at step 2014, EDOCS030 is executed when a request is made to retrieve all products and dates associated with a customer identifier. This process gets all entries from the account/product cross-reference table for the customer identifier received from the client GUI application. For each entry in the account/product cross-reference table found, the process looks up the product on the product cross-reference table. If the group is different than any group processed yet, then the process adds an additional entry at the group level, gets the product description from the product cross-reference, and gets distinct dates for addition to the table. When the entries in the table have been exhausted, the process sorts the products, e.g., in an alphabetical order by product description followed by dates sorted in descending order, for proper display at the client workstation. At step 2016, the sorted data is returned to the client GUI application for viewing by the user.

EDOCS000 links to EDOCS001 and executes it when a client GUI application requests index retrieval for specified dates within specified products. EDOCS000 passes in the customer identifier, the product and a list of dates received from the client GUI application as entered in the criteria screen 1900 at FIG. 53(*a*). At step 2018, EDOCS0001 reads the index table and extracts from the online invoicing database all matching entries and sorts them in order of date and invoice numbers. Different sorting order may be utilized for different products. The entries meeting the product/date criteria are then sent back to the client GUI application for presentation to a customer at step 2020. The matching entry message, which is sent to the client GUI application includes a subset of entry records found.

EDOCS000 links to EDOCS020/EDOCS040 and executes either one when a client GUI application requests for document retrieval such as the invoice document 1925 shown at FIG. 54. EDOCS020 and EDOCS040 are generally used for document retrieval and are clones of each other. The difference between the two is that EDOCS020 was written for new style objects and EDOCS040 was written to handle old style objects. In their operation, EDOCS020 and EDOCS040 generally allocate storage for the document and retrieve the document meeting the requested page range into the allocated storage as shown at step 2022. The retrieved document is then sent back to the client GUI application for presentation to the customer.

At step 2024, EDOCS220 and EDOCS440 are used for object searches on the document requested. These processes perform similar functions as do the EDOCS020 and EDOCS040 processes. They typically get the collection name and the object, and loop through the index portion of the object to find pages in the requested range for the requested document. At step 2026, the retrieved document is sent back to the client GUI application and is displayed on the user's workstation.

For servicing batch-printing requests, EDOCS000 may link to EDOCS050 and execute it. A next available request number is determined by getting the EDBPREQ record in the database and adding one to the last request number. EDBPREQ record is then updated. The information passed to EDOCS050 is then mapped into the EDBPRINT table layout, and a new row is inserted into DB2. Errors from EDOCS050 are sent to EDOCS000, which reports them to the client GUI application.

Communications Security

Communications security, which relates to the authenticity of the enterprise web servers 24 (FIG. 2) and the security of the transmitted data is now described with respect to an implementation in the preferred embodiment of the invention of the Secure Sockets Layer (SSL) version of HTTPS.

In order for a communication to be secure, it must be known that the message comes from the correct source, that it arrives at the correct destination, that it has not been modified, and has not been intercepted and understood by a third party. Normal encryption protects against understanding the message, even if intercepted, and certain types of cipher encryption provide the ability to determine that the message has been tampered with and in some cases reconstruct the message even if intercepted and intentionally garbled. The disadvantage of normal encryption is the difficulty associated with the secure distribution and updates of the keys used for encryption and decryption.

Public key encryption solves the distribution and update problem, but does not, for the public Internet, ensure the identity of the party with whom one is communicating. A spoofer who appropriates the DNS address of an enterprise for a leg of the Internet can substitute the spoofers public key for the public key of the enterprise with whom the user is attempting to communicate, thereby fooling the user into revealing the user name and password used on the enterprise system. To avoid this problem, digital signatures have been developed to ensure the identity of the sender. They also, simultaneously, commit the sender to the message, avoiding subsequent repudiation.

The communications link between the enterprise and the user may be secured with S-HTTP, HTTPS, or proprietary encryption methodologies, such as VNP or PPTP tunneling, but in the preferred embodiment utilizes the Secure Sockets Layer (SSL) protocol developed by Netscape Communications. It is noted that these solutions are intended for use with IPv4, and that Ipv6, presently under comment by the Internet Engineering Steering Group, may enable secure transmissions between client and server without resort to proprietary protocols. The remaining security protocols of the present invention may be used with Ipv6 when it becomes an available standard for secure IP communications.

The SSL component of the HTTPS also includes non-repudiation techniques to guarantee that a message originating from a source is the actual identified sender. One technique employed to combat repudiation includes use of an audit trail with electronically signed one-way message digests included with each transaction. This technique employs SSL public-key cryptography with one-way hashing functions.

Another communications issue involving the secure communications link, is the trust associated with allowing the download of the Java common objects used in the present invention, as discussed earlier with respect to the browser, since the Java objects used require that the user authorize disk and I/O access by the Java object.

Digital Certificates, such as those developed by VeriSign, Inc. entitled Verisign Digital ID™ provide a means to simultaneously verify the server to the user, and to verify the source of the Java object to be downloaded as a trusted source as will hereinafter be described in greater detail.

The above-mentioned authentication and encryption processes are performed in the handshake protocol, which can be summarized as follows: The client sends a client hello message to which the server must respond with a server hello message, or else a fatal error will occur and the connection will fail. The client hello and server hello are used to establish security enhancement capabilities between client and server. The client hello and server hello establish the following attributes: Protocol Version, Session ID, Cipher Suite, and Compression Method. Additionally, two random values are generated and exchanged: ClientHello.random and ServerHello.random.

Following the hello messages, the server will send its digital certificate. Alternately, a server key exchange message may be sent, if it is required (e.g. if their server has no certificate, or if its certificate is for signing only). Once the server is authenticated, it may optionally request a certificate from the client, if that is appropriate to the cipher suite selected.

The server will then send the server hello done message, indicating that the hello-message phase of the handshake is complete. The server will then wait for a client response. If the server has sent a certificate request Message, the client must send either the certificate message or a no_certificate alert. The client key exchange message is now sent, and the content of that message will depend on the public key algorithm selected between the client hello and the server hello. If the client has sent a certificate with signing ability, a digitally-signed certificate verify message is sent to explicitly verify the certificate.

At this point, a change cipher spec message is sent by the client, and the client copies the pending Cipher Spec into the current Cipher Spec. The client then immediately sends the finished message under the new algorithms, keys, and secrets. In response, the server will send its own change cipher spec message, transfer the pending to the current Cipher Spec, and send its finished message under the new Cipher Spec. At this point, the handshake is complete and the client and server may begin to exchange user layer data.

| Client | | Server |
|---|---|---|
| ClientHello | → | |
| ServerHello | | |
| Certificate* | | |
| ServerKeyExchange* | | |
| | | CertificateRequest* |
| | ← | ServerHelloDone |
| Certificate* | | |
| ClientKeyExchange | | |
| CertificateVerify* | | |
| [ChangeCipherSpec] | | |
| Finished | → | |
| [ChangeCipherSpec] | | |
| | ← | |
| Finished | | |
| Login Data | ←→ | Login HTML |

*Indicates optional or situation-dependent messages that are not always sent.

Figure 57:
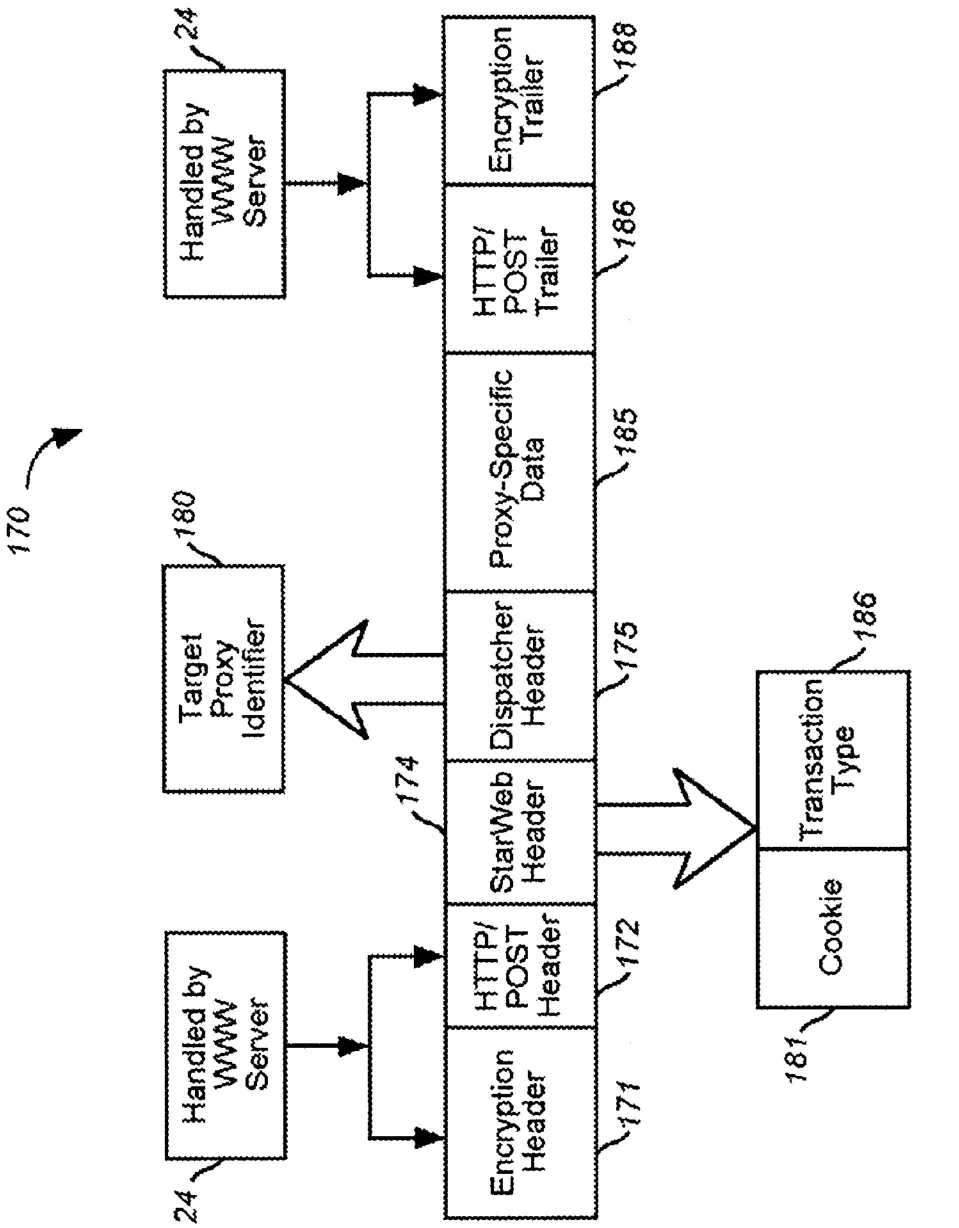
FIG. 57 is a schematic illustration of the message format passed from the user workstation 20 to the secure web server 24 over the public internet.

FIG. 57 is a schematic illustration of a logical message format sent from the client browser to the desired middle tier server for a particular application.

As mentioned herein, the messages created by the client applications (Java software) are transmitted to the secure Web Servers 24 over HTTPS. For incoming (client-to-server) communications, the Secure Web servers 24 decrypt a request, authenticate and verify the session information. The logical message format from the client to the Web server is shown as follows:

|| TCP/IP || encryption || http || web header || dispatcher header || proxy-specific data || where "||" separates a logical protocol level, and protocols nested from left to right. FIG. 57 illustrates a specific message sent from the client browser to the desired middle tier server for the particular application. As shown in FIG. 57, the client message 170 includes an SSL encryption header 171 and a network-level protocol HTTP/POST header 172 which are decrypted by the Secure web Server(s) 24 to access the underlying message; a DMZ Web header 174 which is used to generate a cookie 181 and transaction type identifier 186 for managing the client/server session; a dispatcher header 175 which includes the target proxy identifier 180 associated with the particular type of transaction requested; proxy specific data 185 including the application specific metadata utilized by the target proxy to form the particular messages for the particular middle tier server providing a service; and, the network-level HTTP/POST trailer 186 and encryption trailer 188 which are also decrypted by the secure DMZ Web server 24.

Referring back to FIG. 2, after establishing that the request has come from a valid user and mapping the request to its associated session, the request is then forwarded through the firewall 25*b* over a socket connection 23 to one or more decode/dispatch servers 26 located within the corporate Intranet 30. The messaging sent to the Dispatch Server 26 will include the user identifier and session information, the target proxy identifier, and the proxy specific data. The decode/dispatch server 26 then authenticates the user's access to the desired middle-tier service from cached data previously received from the StarOE server as will be hereinafter described in greater detail in connection with User Identification and Authentication.

As shown in FIG. 2, the Secure Web server 24 forwards the Dispatcher header and proxy-specific data to the Dispatch Server 26 "enriched" with the identity of the user (and any other session-related information) as provided by the session data/cookie mapping, the target proxy identifier and the proxy-specific data. The dispatch server 26 receives the requests forwarded by the Secure Web server(s) 24 and dispatches them to the appropriate application server or its proxy. The message wrappers are examined, revealing the user and the target middle-tier service for the request. A first-level validation is performed, making sure that the user is entitled to communicate with the desired service. The user's entitlements in this regard are fetched by the dispatch server from StarOE server 39 at logon time and cached. Assuming that the Requestor is authorized to communicate with the target service, the message is then forwarded to the desired service's prox. Each of these proxy processes further performs: a validation process for examining incoming requests and confirming that they include validly formatted messages for the service with acceptable parameters; a translation process for translating a message into an underlying message or networking protocol; and, a management process for managing the communication of the specific customer request with the middle-tier server to actually get the request serviced. Data returned from the middle-tier server is translated back to client format, if necessary, and returned to the dispatch server as a response to the request.

It should be understood that the application server proxies can either reside on the dispatch server 26 itself, or, preferably, can be resident on the middle-tier application server, i.e., the dispatcher front end code can locate proxies resident on other servers.

Session Security

As described previously, the SLL protocol includes one level of session security, and may negotiate and change in cipher code between sessions. Additionally, the present invention employs the "cookie" feature set of contemporary browsers to maintain session security, and prevent session hijacking or the use of a name and password obtain by sniffing, spoofing or EMR monitoring.

Figure 58:
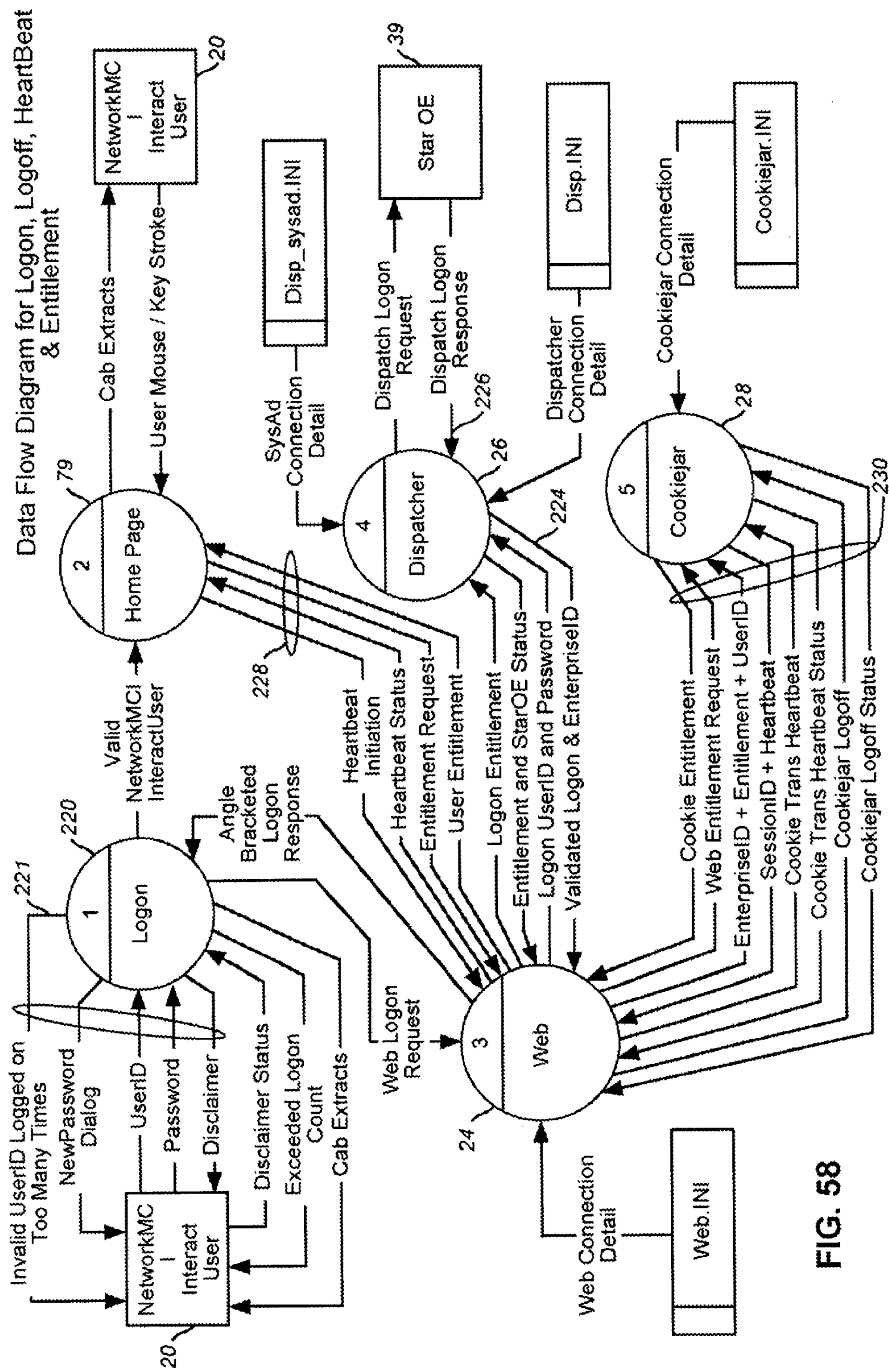
FIG. 58 is a data flow diagram illustrating the present invention's process flow during logon, entitlement request/response, heartbeat transmissions and logoff procedures.

FIG. 58 is a data flow diagram illustrating data flow among the processing modules of the "network MCI Interact" during logon, entitlement request/response, heartbeat transmissions and logoff procedures. As shown in FIG. 58, the client platform includes the networkMCI Interact user 20 representing a customer, a logon Web page having a logon object for logon processing 220, a home page 79 having the backplane object. The Web server 24, the dispatcher 26, cookie jar server 28, and StarOE server 39 are typically located at the enterprise site.

As described above, following the SSL handshake, certain cab files, class files and disclaimer requests are downloaded with the logon Web page as shown at 221. At the logon Web page, the customer 20 then enters a userid and password for user authentication as illustrated at 221. The customer also enters disclaimer acknowledgment 221 on the logon page 220. If the entered userid and password are not valid or if there were too many unsuccessful logon transactions, the logon object 220 communicates the appropriate message to the customer 20 as shown at 221. A logon object 220, typically an applet launched in the logon Web page, connects to the Web server 24, for communicating a logon request to the system as shown at 222. The logon data, having an encrypted userid and password, is sent to the dispatcher 26 when the connection is established as shown at 224. The dispatcher 26 then decrypts the logon data and sends the data to the StarOE 39 after establishing a connection as shown at 26. The StarOE server 39 validates the userid and password and sends the results back to the dispatcher 26 as illustrated at 226 together with the user application entitlements. The dispatcher 26 passes the data results obtained from the StarOE 39 to the Web server 24 as shown at 224, which passes the data back to the logon object 220 as shown at 222. The customer 20 is then notified of the logon results as shown as 221.

When the customer 20 is validated properly, the customer is presented with another Web page, referred to as the home page 79, from which the backplane is launched typically. After the user validation, the backplane generally manages the entire user session until the user logs off the "network-MCI Interact." As shown at 228, the backplane initiates a session heartbeat which is used to detect and keep the communications alive between the client platform and the enterprise Intranet site. The backplane also instantiates a COUser object for housekeeping of all client information as received from the StarOE 39. For example, to determine which applications a current customer is entitled to access and to activate only those application options on the home page for enabling the customer to select, the backplane sends a "get application list" message via the Web server 24 and the dispatcher 26 to the StarOE 39 as shown at 228, 224, and 226. The entitlement list for the customer is then sent from the StarOE 39 back to the dispatcher 26, to the Web server 24 and to the backplane at the home page 79 via the path shown at 226, 224, and 228. The application entitlements for the customer are kept in the COUser object for appropriate use by the backplane and for subsequent retrieval by the client applications.

The entitlement information for COUser is stored in a cookie jar 28, maintained in the cookie jar server 28 (illustrated in FIGS. 2 and 58). When the Web server receives the entitlement requests from the backplane at the home page 79 or from any other client applications, the Web server 24 makes a connection to the cookie jar 28 and checks if the requested information is included in the cookie jar 28 as shown at 230. The cookie jar 28 is a repository for various customer sessions and each session details are included in a cookie including the entitlement information from the OE server 39. During the logon process described above, the OE server 39 may include in its response, the entitlements for the validated customer. The dispatcher 26 transfers the entitlement data to the Web server 24, which translates it into a binary format. The Web server 24 then transmits the binary entitlement data to the cookie jar 28 for storage and retrieval for the duration of a session. Accordingly, if the requested information can be located in the cookie jar 28, no further request to the StarOE 39 may be made. This mechanism cuts down on the response time in processing the request. Although the same information, for example, customer application entitlements or entitlements for corp ids, may be stored in the COUser object and maintained at the client platform as described above, a second check is usually made with the cookie jar 28 via the Web server 24 in order to insure against a corrupted or tampered COUser object's information. Thus, entitlements are typically checked in two places: the client platform 10 via COUser object and the Web server 24 via the cookie jar 28.

When a connection is established with the cookie jar 28, the Web server 24 makes a request for the entitlements for a given session as shown at 230. The cookie jar 28 goes through its stored list of cookies, identifies the cookie for the session and returns the cookie to the Web server 24 also shown at 230. The Web server 24 typically converts the entitlements which are received in binary format, to string representation of entitlements, and sends the entitlement string back to the backplane running on the client platform 10.

Furthermore, the cookie jar 28 is used to manage heartbeat transactions. Heartbeat transactions, as described above, are used to determine session continuity and to identify those processes which have died abnormally as a result of a process failure, system crash or a communications failure, for example. During a customer session initialization, the cookie jar 28 generates a session id and sets up "heartbeat" transactions for the customer's session. Subsequently, a heartbeat request is typically sent from a process running on a client platform to the Web server 24, when a connection is established, as shown at 228. The Web server 24 connects to the cookie jar 28 and requests heartbeat update for a given session. The cookie jar 28 searches its stored list of cookies, identifies the cookie for the session and updates the heartbeat time. The cookie jar 28 then sends the Web server 24 the updated status heartbeat as shown at 230. The Web server 24 then sends the status back to the client platform process, also as shown at 230.

When a customer wants to logoff, a logoff request transaction may be sent to the Web server 24. The Web server 24 then connects to the cookie jar 28 and requests logoff for the session as shown at 230. The cookie jar 28 identifies the cookie for the session and deletes the cookie. After deleting the cookie, the cookie jar 28 sends a logoff status to the Web server 24, which returns the status to the client platform.

Figure 59:
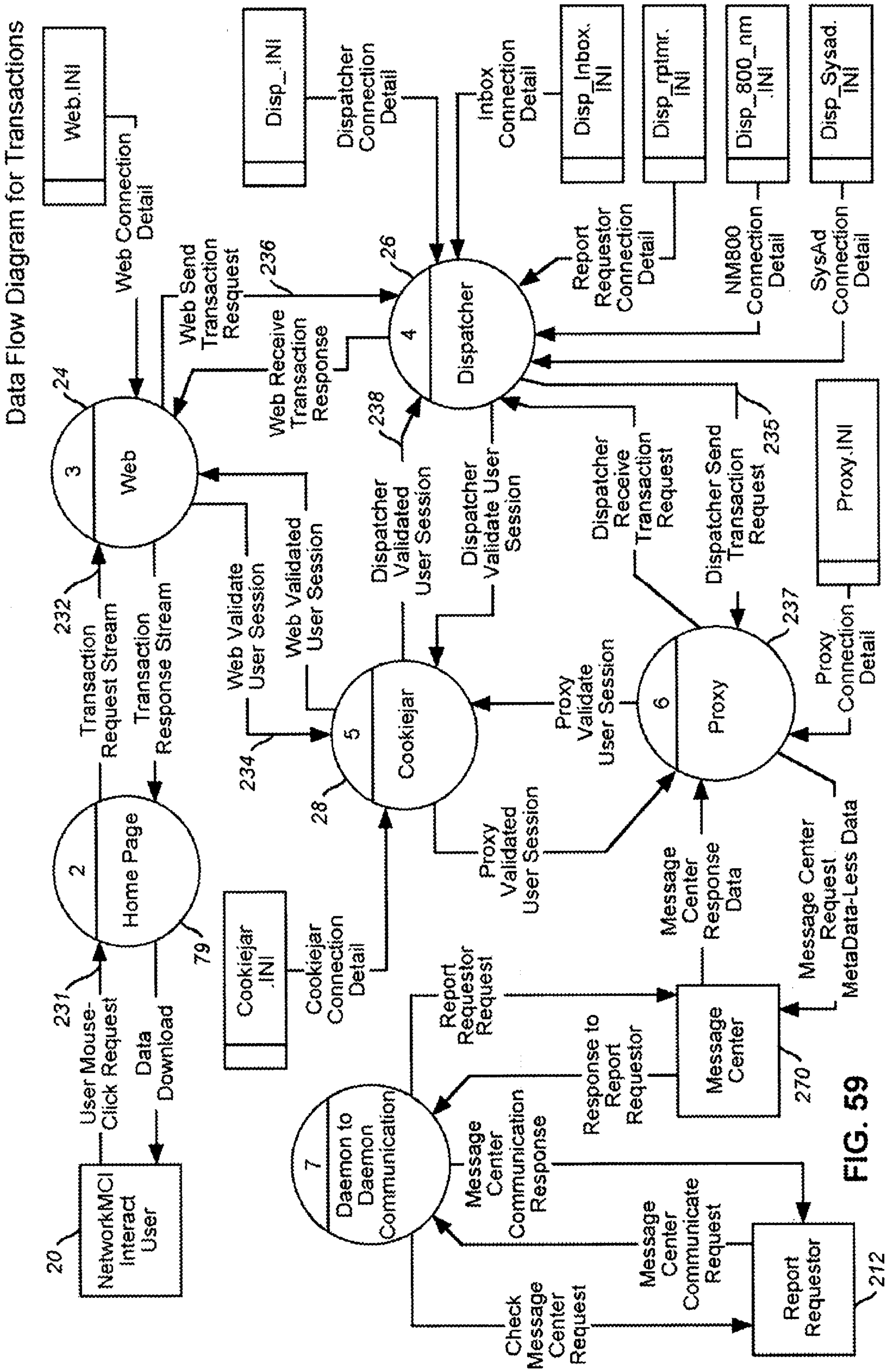
FIG. 59 is a data flow diagram for various transactions communicated in the nMCI Interact system.

Other transaction requests are also sent via the Web server 24 and the cookie jar 28 as shown in FIG. 59. FIG. 59 is a data flow diagram for various transactions communicated in the system of the present invention. Typically, when a customer enters a mouse click on an application link as shown at 231, an appropriate transaction request stream is sent to the Web server as shown at 232. The Web server 24 typically decrypts the transaction stream and connects to the cookie jar 28 to check if a given session is still valid as shown at 234. The cookie jar 28 identifies the cookie for the session and sends it back to the Web server 24 as shown at 234. The Web server 24 on receipt of valid session connects to the dispatcher 26 and sends the transaction request as shown at 236. When the dispatcher 26 obtains the request, it may also connect to the cookie jar 28 to validate the session as shown at 238. The cookie jar 28 identifies the cookie for the session and sends it back to the dispatcher 26 as shown at 238. The dispatcher 26, upon receiving the valid session connects to a targeted application server or proxy 237, which may include StarOE, and sends the request transaction to the target proxy as shown at 235. The server or proxy 237 processes the request and sends back the response as stream of data which is piped back to the dispatcher 26 as shown at 235. The dispatcher 26 pipes the data back to the Web server 24 as shown at 236, which encrypts and pipes the data to the client platform as shown at 232, referred to as the home page 79 in FIG. 59.

The present invention includes a client communications unit for providing a single interface from which the back-plane and the applications may send messages and requests to back-end services. The client communications unit includes a client session unit and a transactions unit. The client session unit and the transactions unit comprise classes used by client applications to create objects that handle communications to the various application proxies and or servers. Generally, the entire communications processes start with the creation of a client session after a login process. This is started through the login process. The user logs into user's Web page with a username and password. During a login process, a client session object of class COClientSession is created, and the COClientSession object passes the username and password information pair obtained from the login process to a remote system administrative service which validates the pair. The following code instructions are implemented, for example, to start up a session using the COClientSession class. COClientSession ss=new COClientSession( );

```
try {
    ss.setURL(urlString);
    ss.logon("jsmith", "myPassword");
} catch (COClientLogonException e) {. . .
} catch (MalformedURLException e) {. . .};
```

In addition, the CoClientSession object contains a reference to a valid COUser object associated with the user of the current COClientSession object.

The client session object also provides a session, where a customer logs on to the system at the start of the session, and if successfully authenticated, is authorized to use the system until the session ends. The client session object at the same time provides a capability to maintain session-specific information for the life/duration of the session. Generally, communications to and from the client takes place over HTTPS which uses the HTTP protocols over an SSL encrypted channel. Each HTTP request/reply is a separate TCP/IP connection, completely independent of all previous or future connections between the same server and client. Because HTTP is stateless, meaning that each connection consists of a single request from the client which is answered by a single reply by a server, a novel method is provided to associate a given HTTP request with the logical session to which it belongs.

When a user is authenticated at login via the system administrative server, the client session object is given a "cookie," a unique server-generated key which identifies a session. The session key is typically encapsulated in a class COWebCookie, "public COWebCookie (int value).", where value represents a given cookie's value. The client session object holds this key and returns it to the server as part of the subsequent HTTP request. The Web server maintains a "cookie jar" which is resident on the dispatch server and which maps these keys to the associated session. This form of session management also functions as an additional authentication of each HTTPS request, adding security to the overall process. In the preferred embodiment, a single cookie typically suffices for the entire session. Alternatively, a new cookie may be generated on each transaction for added security. Moreover, the cookie jar may be shared between the multiple physical servers in case of a failure of one server. This mechanism prevents sessions being dropped on a server failure.

In addition, to enable a server software to detect client sessions which have "died," e.g., the client session has been disconnected from the server without notice because of a client-side crash or network problem, the client application using the client session object "heartbeats" every predefined period, e.g., 1 minutes to the Web server to "renew" the session key (or record). The Web server in turn makes a heartbeat transaction request to the cookie jar. Upon receipt of the request, the cookie jar service "marks" the session record with a timestamp indicating the most recent time the client communicated to the server using the heartbeat. The cookie jar service also alarms itself, on a configurable period, to read through the cookie jar records (session keys) and check the timestamp (indicating the time at which the client was last heard) against the current time. If a session record's delta is greater than a predetermined amount of time, the cookie jar service clears the session record, effectively making a session key dead. Any subsequent transactions received with a dead session key, i.e., nonexistent in the cookie jar, are forbidden access through the Firewall.

The heartbeat messages are typically enabled by invoking the COClientSession object's method "public synchronized void enableSessionHeartbeat (boolean enableHeartbeat)," where enableHeartbeat is a flag to enable or disable heartbeat for a session. The heartbeat messages are typically transmitted periodically by first invoking the COClientSession object's method "public synchronized void setHeartbeatInterval (long millsecsInterval)," where the heartbeat interval is set in milliseconds, and by the CoClientSession object's method "protected int startHeartbeat( )," where the heartbeat process starts as soon as the heartbeat interval is reached. Failure to "heartbeat" for consecutive predefined period, e.g., one hour, would result in the expiration of the session key.

Enterprise Security

Enterprise Security is directed to the security of the enterprise network and the data maintained by the various enterprise applications with respect to the open nature of the Internet, and the various attacks on the system or data likely to result from exposure to the Internet. Usual enterprise security is focused on internal procedures and employees, since this represents the biggest single area of exposure. Strong passwords, unique user Ids and the physical security of the workstations are applicable to both internal employees and external customers and users who will access the enterprise applications. It is noted that many of the previously described features relating to data encryption for communications security and session security are essential parts of enterprise security, and cooperate with enterprise architecture and software infrastructure to provide security for the enterprise.

For example, as will be hereinafter described in detail, the present invention uses strong symmetric key encryption for communications through the firewalls to the application servers. This internal symmetric key encryption, when coupled with external public key encryption provides an extra level of security for both the data and the software infrastructure.

Figure 60:
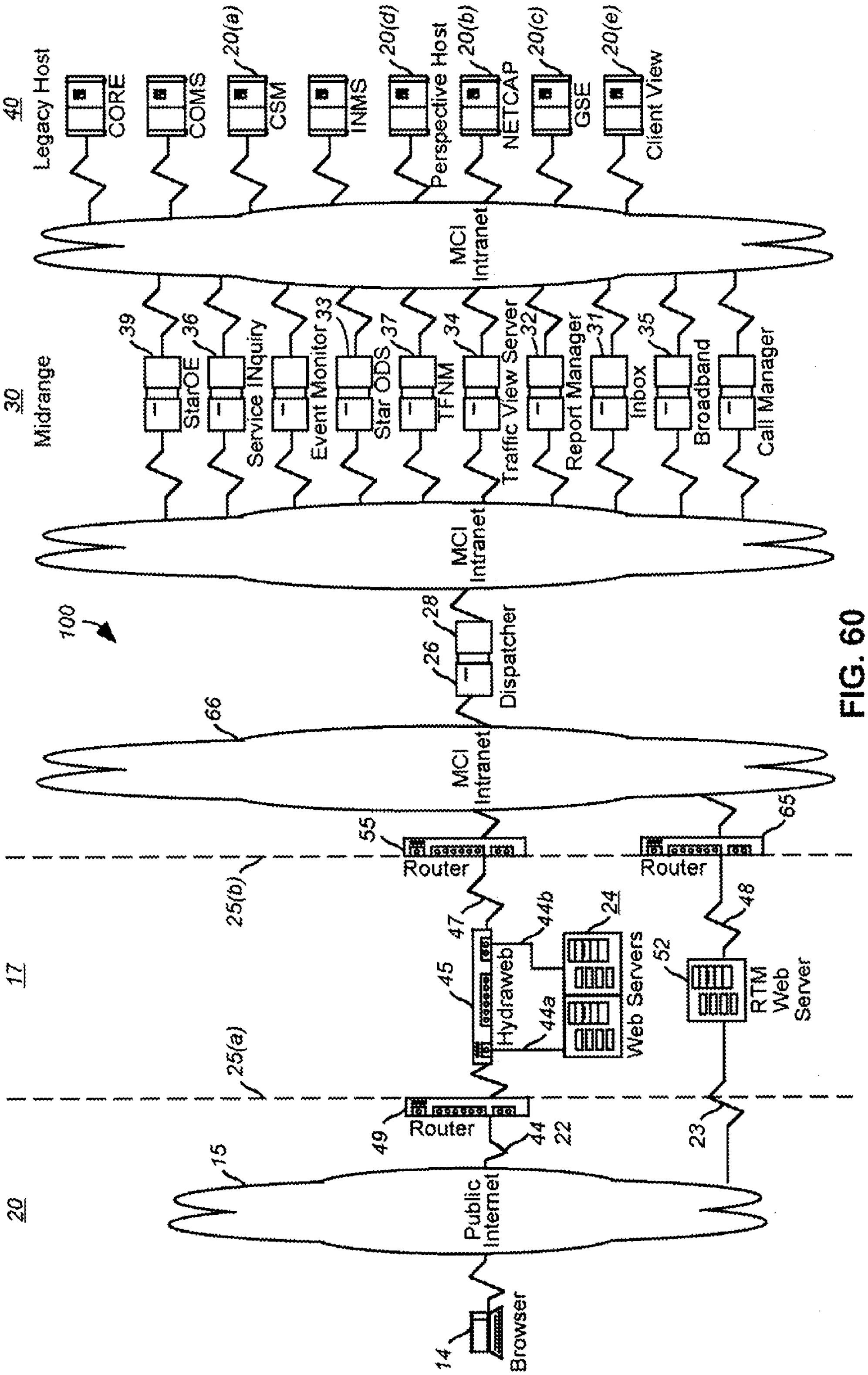
FIG. 60 is a diagram depicting the physical network architecture of the nMCI Interact system of the present invention.

FIG. 60 is a diagram depicting the physical networkMCI Interact system architecture 100. As shown in FIG. 60, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 60, a double or complex firewall system defines a "demilitarized zone" (DMZ) between two firewalls 25*a*, 25*b*. In the preferred embodiment, one of the firewalls 25 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 25*a* in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The Hydraweb™ unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb™ unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 60, the most available Web server 24 receives subscriber HTTPS requests, for example, from the HydraWEB™ 45 over a connection 35*a* and generates the appropriate encrypted messages for routing the request to the appropriate MCI Intranet midrange web server over connection 35*b*, router 55 and connection 23. Via the Hydraweb™ unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 32. As described in co-pending U.S. patent application Ser. No. 09/159,516 this server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 60, the networkMCI Interact physical architecture includes two routers: a first router 55 for routing encrypted subscriber messages from a Secure Web server 24 to the Dispatcher server 26 located inside the second firewall 25*b*; and, a second router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

Figure 61A:
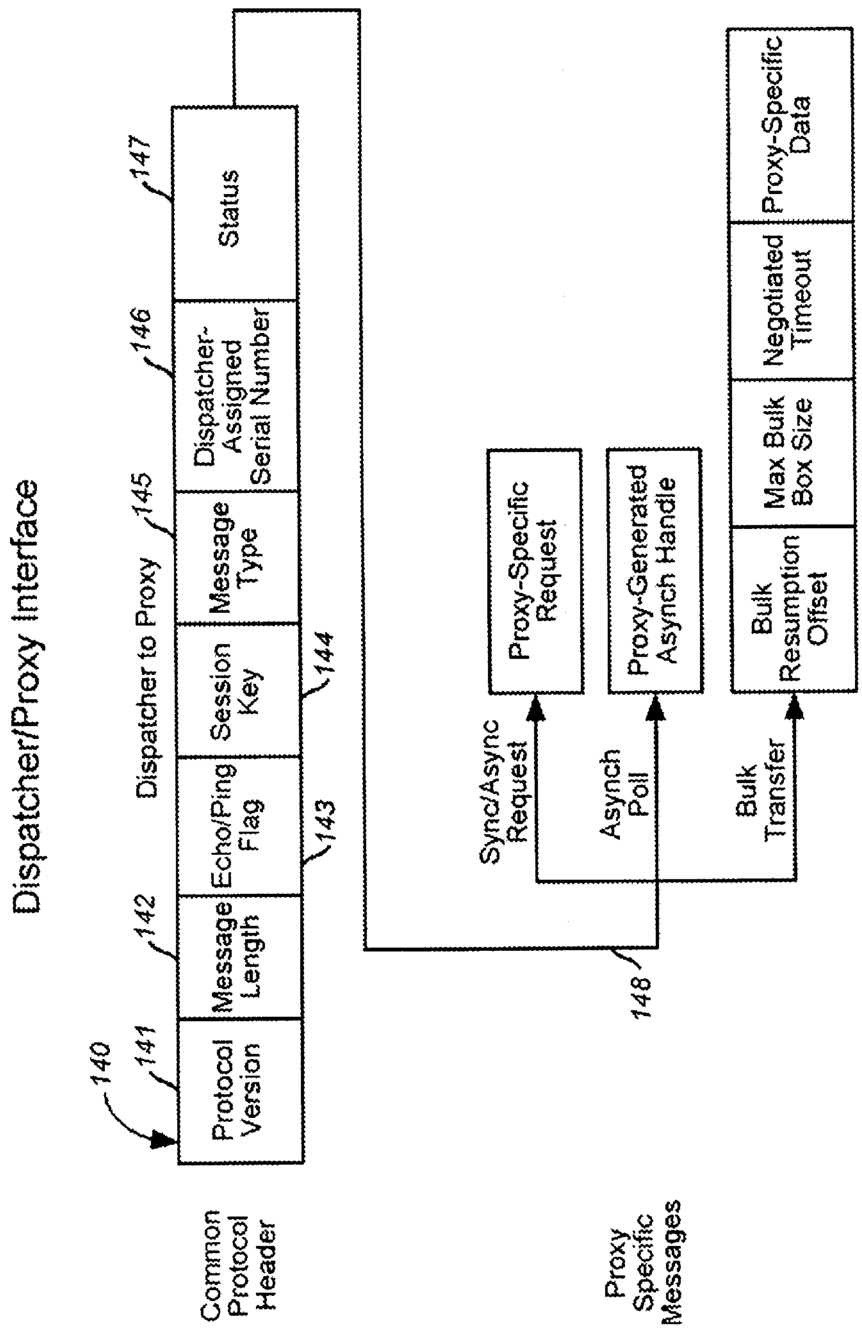
FIG. 61(*a*) is a schematic illustration showing the message format passed between the Dispatcher server and the application specific proxy.
Figure 61B:
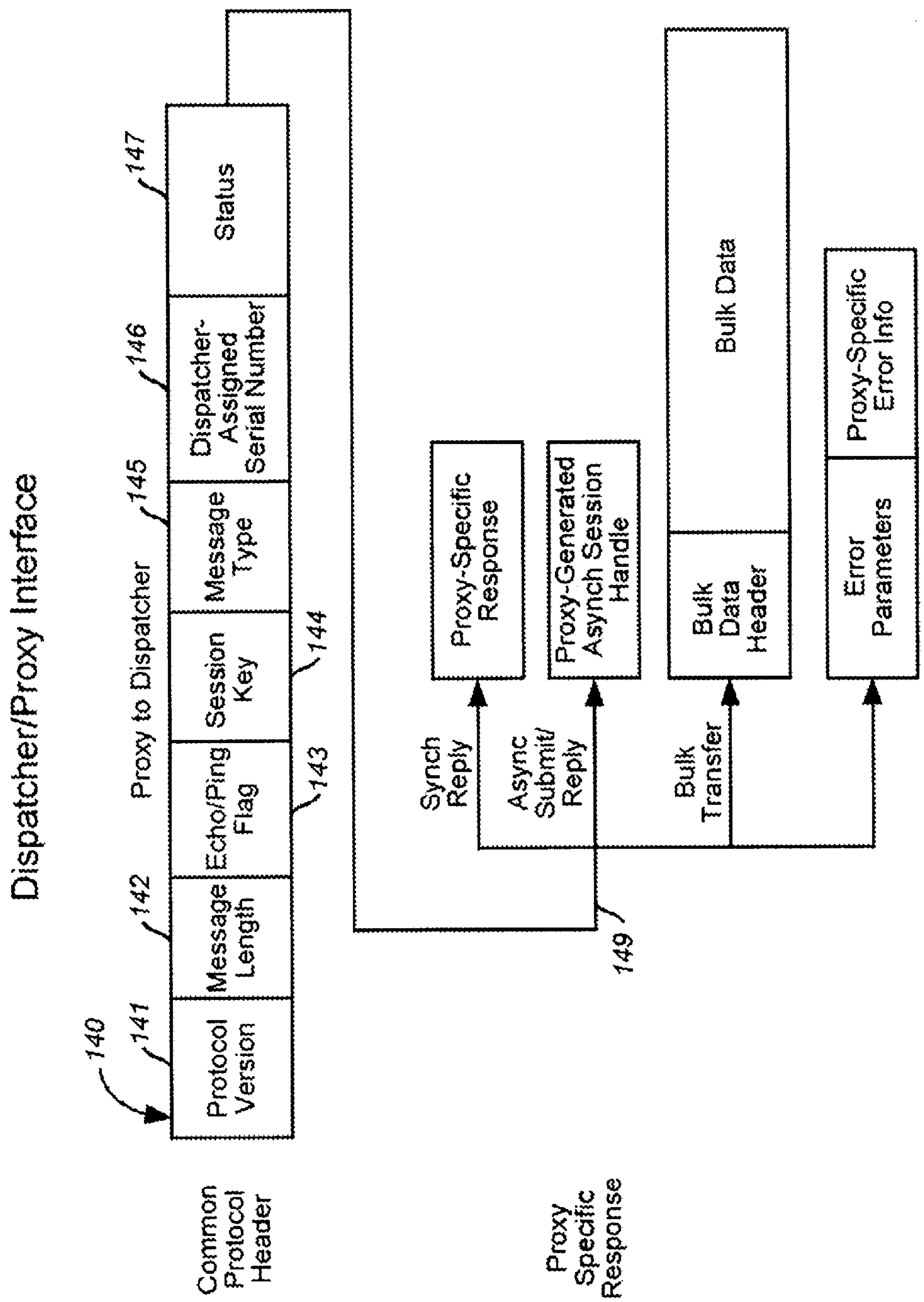

FIG. 61(*a*) and 61(*b*) are schematic illustrations showing the message format passed between the dispatcher 26 and the relevant application specific proxy, (FIG. 61(*a*)) and the message format passed between the application specific proxy back to the Dispatcher 26 (FIG. 61(*b*)). As shown in FIG. 61(*a*), all messages between the Dispatcher and the Proxies, in both directions, begin with a common header 140 to allow leverage of common code for processing the messages. A first portion of the header includes the protocol version 141 which may comprise a byte of data for identifying version control for the protocol, i.e., the message format itself, and is intended to prevent undesired mismatches in versions of the dispatcher and proxies. The next portion includes the message length 142 which, preferably, is a 32-bit integer providing the total length of the message including all headers. Next is the echo/ping flag portion 143 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 144 which is the unique session key or "cookie" provided by the Web browser and used to uniquely identify the session at the browser. As described above, since the communications middleware is capable of supporting several types of transport mechanisms, the next portion of the common protocol header indicates the message type/mechanism 145 which may be one of four values indicating one of the following four message mechanisms and types: 1)Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 146 that is unique across all dispatcher processes and needs to be coordinated across processes (like the Web cookie (see above)), and, further, is used to allow for failover and process migration and enable multiplexing control between the proxies and dispatcher, if desired. A field 147 indicates the status is unused in the request header but is used in the response header to indicate the success or failure of the requested transaction. More complete error data will be included in the specific error message returned. The status field 147 is included to maintain consistency between requests and replies. As shown in FIG. 61(*a*), the proxy specific messages 148 are the metadata message requests from the report requester client and can be transmitted via synchronous, asynchronous or bulk transfer mechanisms. Likewise, the proxy specific responses are metadata response messages 149 again, capable of being transmitted via a synch, asynch or bulk transfer transport mechanism.

It should be understood that the application server proxies can either reside on the dispatch server 26 itself, or, preferably, can be resident on the middle-tier application servers 30, i.e., the dispatcher front end code can locate proxies resident on other servers.

As mentioned, the proxy validation process includes parsing incoming requests, analyzing them, and confirming that they include validly formatted messages for the service with acceptable parameters. If necessary, the message is translated into an underlying message or networking protocol. If no errors are found, the proxy then manages the communication with the middle-tier server to actually get the request serviced. The application proxy supports application specific translation and communication with the back-end application server for both the Web Server (java applet originated) messages and application server messages.

For example, in performing the verification, translation and communication functions, the Report Manager server, the Report Scheduler server and Inbox server proxies (FIG. 10) each employ front end proxy C++ objects and components. For instance, a utils.c program and a C++ components library, is provided for implementing general functions/objects. Various C++ parser objects are invoked which are part of an object class used as a repository for the RM metadata and parses the string it receives. The class has a build member function which reads the string which contains the data to store. After a message is received, the parser object is created in the RMDispatcher.c object which is file containing the business logic for handling metadata messages at the back-end. It uses the services of an RMParser class. Upon determining that the client has sent a valid message, the appropriate member function is invoked to service the request. Invocation occurs in MCIRMServerSocket.C when an incoming message is received and is determined not to be a Talarian message. RMSErverSocket.c is a class implementing the message management feature in the Report Manager server. Public inheritance is from MCIServerSocket in order to create a specific instance of this object. This object is created in the main loop and is called when a message needs to be sent and received; a Socket.c class implementing client type sockets under Unix using, e.g., TCP/IP or TCP/UDP. Socket.C is inherited by ClientSocket.C:: Socket(theSocketType, thePortNum) and ServerSocket.C:: Socket(theSocketType, thePortNum) when ClientSocket or ServerSocket is created. A ServerSocket.c class implements client type sockets under Unix using either TCP/IP or TCP/UDP. ServerSocket.C is inherited by RMServerSocket when RMServerSocket is created. An InboxParser.c class used as a repository for the RM Metadata. The class' "build" member function reads the string which contains the data to store and the class parses the string it receives. After a message has been received, the MCIInboxParser object is created in inboxutl.c which is a file containing the functions which process the Inbox requests, i.e, Add, Delete, List, Fetch and Update. Additional objects/classes include: Environ.c which provides access to a UNIX environment; Process.c which provides a mechanism to spawn slave processes in the UNIX environment; Daemon.c for enabling a process to become a daemon; Exception.c for exception handling in C++ programs; and, RMlog.c for facilitating RM logging. In addition custom ESQL code for RM/database interface is provided which includes the ESQC C interface (Informix) stored procedures for performing the ARD, DRD, DUR, URS, GRD, CRD, and GPL messages as described with reference to Appendix A in copending U.S. patent application Ser. No. 09/159,409. The functions call the stored procedures according to the message, and the response is build inside the functions depending on the returned values of the stored procedures. A mainsql.c program provides the ESQL C interface for messages from the report manager and report viewer.

Outgoing (server-to-client) communications follow the reverse route, i.e., the proxies feed responses to the decode/dispatch server 26 and communicate them to the DMZ Web servers 24 over the socket connection. The Web servers 26 will forward the information to the client 10 using SSL. The logical message format returned to the client from the middle tier service is shown as follows:

|| TCP/IP || encryption || http || web response || dispatcher response || proxy-specific response || where "||" separates a logical protocol level, and protocols nested from left to right.

While the invention has been particularly shown and described with respect to preferred embodiments thereof, it will be understood by those skilled in the art that the foregoing and other changes in form and details may be made therein without departing from the spirit and scope of the invention.

What is claimed is:

1. An integrated system for providing communications network management to a customer, said system comprising:

one or more secure web servers for managing one or more secure client sessions over a data network in response to customer entry into said system, each said one or more secure web servers supporting secure communications with a client workstation;

one or more client applications for providing a customer interface integrated within a web-based Graphical User Interface (GUI) and enabling interactive communications with one or more communications network management resources via the one or more secure web servers, wherein each of said one or more secure web servers supports communication of request message entered by said customer via said customer interface to said one or more network management resources, wherein one or more remote application resources process said request messages and provide responses to said one or more secure web servers for secure uploading to said client browser and display via said integrated customer interface, wherein at least one of the one or more network management resources comprises an authentication server for downloading a logon object to be launched within said web-based GUI, the logon object accepting logon transactions from the customer and communicating with said authentication server for authentication of said customer, wherein upon successful authentication of said customer, the logon object is configured to send a command to the authentication server to initiate a download of said one or more client applications, wherein said downloaded web-based GUI comprises a backplane object downloaded with, and launched by said web-based GUI, said backplane object launching said one or more client applications upon initiation by said customer, the backplane object further enabling inter-application communications among the client applications and also with said backplane object, wherein said backplane object and the client applications interoperate with one another to provide said integrated customer interface to a plurality of communications network management products and services subscribed by the customer, wherein upon successful authentication of said customer, the logon object is further configured to send a command to the authentication server to download said web-based GUI having the backplane object;

a user object for representing a current customer, the user object communicating with said authentication server to determine the customer's entitlements to the web enabled communications network management services, wherein the backplane uses the entitlements to display via said integrated interface only those web enabled services and products to which the user has privilege, wherein the backplane object maintains session information received from a network management resource in static memory for the duration of a session, and enables the one or more client applications to access the static memory, wherein at least one of the one or more network management resources comprises a server for providing a customer data report management function comprising and a database for maintaining an inventory of reports associated with a customer, at least one of said one or more client applications including, a report requestor application enabling creation and scheduling of customer specific reports pertaining to usage of their switched communications networks and initiating generation of report request messages for said one or more network management resources via said integrated interface, and a report viewer application enabling display of reports in accordance with customer-entitled reporting options, wherein said report manager server accesses report items from said database according to a received report request message, and generates a response message including a metadata description of reporting items to be included in said report, wherein customer-specific data from at least one of said one or more network management resources and said metadata description of customer-selected reporting items are utilized to generate a completed report for presentation to said customer via said integrated interface, wherein at least one of the one or more network management resources further comprises a report scheduler system for initiating periodic generation of reports from other network management resources at a customer-specified frequency, wherein at least one of the one or more network management resources includes a database for storing and maintaining customer specific report data to be reported to said customer, and, a centralized inbox server for receiving a report availability response from said report management server including a metadata description for generating said report, said inbox server uploading said stored customer specific report data and the metadata description associated with the report data to said client workstation via the one or more secure web servers for generation and presentation of a customer report via said integrated interface.

2. The integrated system as claimed in claim 1, at least one of said one or more client applications comprises an inbox client application launched by the backplane for storing a notification alert received from said inbox server, said inbox client application receiving and presenting the notification alert to the customer via said integrated interface.

3. The integrated system as claimed in claim 2, wherein the inbox client application further includes a polling thread for detecting an incoming connection, the polling thread further starting a new thread upon detection of the incoming message, wherein the new starts and listens on a second secure connection for detecting new messages, while the polling thread received the incoming message on a first secure connection, and wherein multiple messages are downloaded simultaneously as detected.

4. The integrated system as claimed in claim 1, wherein the database for storing and maintaining said customer specific reporting data further comprises a pre-defined directory associated with each of the one or more network management resources, wherein each of the one or more network management resources stores the report data and the notification alert data to its respective pre-defined directory in the inbox server.

5. The integrated system as claimed in claim 1, wherein at least one of said one or more network management resources provides a priced call detail data reporting function for providing customer specific data pertaining to usage of a customer's switched communications network.

6. The integrated system as claimed in claim 5, wherein a at least one of said one or more network management resources providing a priced call detail data reporting function comprises:

a system for extracting call detail data records from billing systems generating priced call detail records specific to a customer's communications network, a system for harvesting said extracted priced call detail records for storage in an database storage device; and a decision support server for receiving customer request messages for said priced call detail data, said decision support server accessing said customer-specific priced call detail data from said database storage device and transmitting said customer-specific priced call detail data to said inbox server in accordance with said customer request.

7. The integrated system as claimed in claim 6, wherein a reporting option includes running a pre-defined report at a pre-determined frequency, said report scheduler system communicating a message to said decision support server to run said pre-defined report at said pre-determined frequency, each said pre-defined report being updated with recent customer-specific priced call detail data available at a run time.

8. The integrated system as claimed in claim 1, wherein at least one of said one or more network management resources provides a near real-time unpriced call detail data reporting function for providing customer specific data pertaining to usage of a customer's switched communications network, said unpriced call detail data reporting service receiving customer request messages for customer-specific unpriced call detail data and transmitting said customer-specific unpriced call detail data to said inbox server in accordance with said customer request.

9. The integrated system as claimed in claim 8, wherein a reporting option includes running a customer-defined unpriced call detail data report at a pre-determined frequency, said report scheduler system communicating a message to an unpriced call detail data reporting server for obtaining recent customer-specific unpriced call detail data.

10. The integrated system as claimed in claim 8, wherein at least one of said one or more network management resources comprises:

a system for generating statistical data based on real-time call data obtained from a circuit-switched communications network, said statistical data being generated according to said customer entitlements; and, a client application for integrating retrieved statistical data within a Web-based GUI for presentation to said customer via said integrated interface, said Web-based GUI being updated to contain statistical data at customer-specified time intervals.

11. The integrated system as claimed in claim 10, wherein said customer entitlement includes specification of one or more toll free numbers associated with a customer's communications network for which statistical data are to be generated.

12. The integrated system as claimed in claim 11, wherein said system for generating statistical data includes script mechanism for initiating update of said web-based GUI with most recent statistical data.

13. The integrated system as claimed in claim 10, wherein at least one of said one or more network management resources comprises:

a communications network configuration device for maintaining an inventory of customer's network call routing plans and associated call routing plan details, and interfacing with a plurality of network control elements for configuring a customer's communications network according to a desired call routing plan; and, a network management server for receiving customer request messages for accessing said call routing plan details from said communications network configuration device, retrieving said call routing plan details according to customer entitlements, and downloading said call routing plan details for customers via said integrated interface.

14. The integrated system as claimed in claim 13, wherein said report requestor application enables generation of messages specifying customer modification of said call-routing plan, said network management server receiving said messages via said integrated interface and translating said received modification request into commands for input to said network configuration device, wherein said commands are forwarded to said network control elements for configuring said customer's network according to said request.

15. The integrated system as claimed in claim 14, wherein said modification request messages includes a unique customer identifier enabling downloading of specific call routing plan details associated with said customer identifier.

16. The integrated system as claimed in claim 15, further comprising a customer request message, said customer request message including an order for modifying and existing customer network call routing plan for a predetermined period of time, said network management server enabling said customer network to automatically revert to a corresponding call routing plan configured prior to invocation of said order at a customer-specified revert time.

17. The integrated system as claimed in claim 16, wherein said customer request message includes an order for modifying a percent allocation of call traffic routed to a network number used in a particular call routing plan for a predetermined period of time, said network management server enabling said allocation of call traffic routed to a number to automatically revert to a corresponding percent allocation specified prior to invocation of said order at a customer-specified revert time.

18. The integrated system as claimed in claim 13, wherein at least one of said one or more network management resources comprises:

a customer's switched data circuit network; and, a device for periodically polling network switches of said switched data circuit network to obtain network performance data relating thereto and temporarily storing said network performance data; said integrated system further comprising: a broadband network server for receiving customer request messages for reporting network performance data, retrieving said network performance data according to customer entitlements, and downloading said network performance data to said customer for presentation via said integrated interface.

19. The integrated system as claimed in claim 18, wherein said report viewer application enables display of broadband network reports in accordance with selected customer reporting options, said customer reporting options including specification of graphical, tabular, and map views of said network performance data.

20. The integrated system as claimed in claim 19, wherein said report viewer application includes support for simultaneous multiple graph reporting views of specific broadband network performance data.

21. The integrated system as claimed in claim 20, wherein said customer's switched data network generates alarm status indications, said broadband network server receiving said alarm status indications pertaining to said customer's network and communicating alarm status data to said client workstation via said integrated interface.

22. The integrated system as claimed in claim 21, wherein said report requester application enables generation of messages specifying network performance thresholds for enabling reporting of specific data network behavior via said integrated interface.

23. The integrated system as claimed in claim 22, wherein said report viewer supports display of a graphical view comprising an area map view having indicators depicting locations of a customer's data network, said report viewer application enabling said customer to select said indicators on said graphical representation and provide a textual view of network performance characteristics relating to physical circuits supported at said selected network location.

24. The integrated system as claimed in claim 23, wherein said physical circuits supported at said selected network location includes permanent virtual circuits.

25. The integrated system as claimed claim 18, wherein at least one of said one or more network management resources includes a system for providing an alarm management function including a device for deriving performance alarms based on performances stastics collected on the performance of a customer's data network; said integrated system further comprising: an event monitor server for receiving and storing the network performances stastistic and the derived alarms from the deriving device, and communicating said network performances stastistics and the derived alarms for presentation to said customer via said integrated interface.

26. The integrated system as claimed in claim 25, wherein said report requestor application further enables customers to define and submit network performance thresholds specifying reporting of specific network behavior via said integrated interface, said event monitor server enabling filtering of said network alarms and performance statistics according to the customer-defined threshold for presentation to the customer at the client workstation.

27. The integrated system as claimed in claim 26, wherein said report requestor application further enables customers to define and enter troubleshooting procedures for specific alarms or circuits pertaining to the data network via the integrated interface.

28. The integrated system as claimed in claim 27, wherein at least one of said one or more client applications that is associated with said event monitor server enables customers to acknowledge receipt of a network alarm, via said integrated interface, said event monitor server comprising a process for automatically launching the trouble shooting procedure upon acknowledgment of the alarm associated with the trouble shooting procedure.

29. The integrated system as claimed in claim 13, wherein at least one of the one or more network management resources further comprises a system for providing a circuit switched call center management function, said integrated system further comprising:

a client application downloaded from the one or more secure web servers for enabling a customer to monitor, define, and manipulate call routing parameters, the client application further formatting customer defined parameters into client message transactions and communicating the client message transactions to the secure server over the secure connection; and, a routing engine device for maintaining call routing rules and interfacing with said plurality of network control elements for directing call routing and receiving data statistics, the routing engine device further using the rules, the data statistics, and the customer defined parameters in determining where to route calls, whereby customer control of call routing via said integrated interface is enabled.

30. The integrated system as claimed in claim 29, further comprising a proxy server for processing a plurality of transaction requests received from the client application via the one or more secure servers by opening a connection to the routing engine device and retrieving information relating to the transaction requests and forwarding back the information to the client application via the one or more secure servers, and wherein the client application presents the information to the customer at the client workstation.

31. The integrated system as claimed in claim 30, further comprising one or more databases for storing the data statistics generated by the routing engine device and the plurality of network control elements, said one or more databases residing with the proxy server, the proxy server further processing predetermined transaction requests locally by retrieving information related to the transaction requests from said one or more database(s), and forwarding the information to the one or more client applications.

32. The integrated system as claimed in claim 13, further comprising:

a client application downloaded from the secure web server for enabling a customer to generate trouble tickets to be processed by a trouble ticket resolution entity; and, a service inquiry application server for receiving request for a customer's trouble ticket information, translating said request into commands for retrieving trouble ticket information from said communications network configuration device, and downloading response messages including said requested trouble ticket information to said customer via said integrated interface.

33. The integrated system as claimed in claim 13, further comprising:

a client application downloaded from said secure web server for enabling customers to manage and track outbound network management features associated with that customer's communications network; and, an outbound network management server for receiving requests for outbound network management features associated with a customer network including calling party numbers, dialing plans, calling card number and customer identification code sets, or, combinations thereof, translating said received requests into commands for retrieving said outbound network management feature information from said communications network configuration device, and downloading response messages including said requested outbound network management feature information to said customer via said integrated interface.

34. A method for enabling management of communications network assets, said method comprising:

enabling interactive communications with a customer over a data network with a protocol invoked from within a client web browser;

managing a plurality of customer sessions over the data network with a secure web server providing session encryption;

initiating a download of a web-based Graphical User Interface (GUI) from said secure web server, said downloaded web-based GUI for launching one or more of a plurality of client applications available to a customer;

providing a customer interface integrated within said web-based GUI upon which to launch a selected client application, said customer interface enabling interactive communication of request messages with one or more of a plurality of communications network management resources capable of providing a selected communications network management function;

receiving, at a communications network management resource, said request messages, generating a response, and communicating said response to said secure web server for secure uploading to said client workstation for display via said integrated interface, downloading a logon object to be launched by said web-based GUI for accepting logon transactions from the customer and communicating with said authentication server to provide said customer authentication and for sending a command to the authentication server to download said one or more client applications, upon successful authentication of the customer;

providing a dispatch server for communicating with said secure web server and each of said plurality of said network management resources, said dispatch server verifying system access and proxy generation for said system resources after said customer's entitlements have been verified, wherein said downloaded web-based GUI comprises a backplane object downloaded with, and launched by said web based GUI, said backplane object launching said client applications programs upon initiation by said customer, wherein said backplane object and the client applications interoperate with one another to provide said integrated customer interface to a plurality of communications network management products and services subscribed by the customer;

upon succesful authentication of the customer, sending a command to the authentication server to download said web-based GUI having the backplane object;

providing a customer object for representing a current customer, the customer object communicating with said authentication server to determine the customer's entitlements to the web enabled communications network management services, wherein the backplane uses the entitlements to display via said integrated interface only those web enabled services to which the customer has privilege;

executing one or more of said plurality of client applications directly by the backplane object when the customer selects one or more of said plurality of client applications associated with a desired communications network management service, the selected client application running in a frame independent from a web browser's window;

maintaining session information received from at least one of said one or more network management resources in static memory for the duration of a session, and enabling the client applications to access the static memory, wherein at lest one of said one or more network management resources comprises a report manager server for providing a customer data report management function and a database for maintaining an inventory of reports associated with a customer;

providing a report requestor client application enabling creation and scheduling of customer specific reports pertaining to usage of their switched communications networks and initiating generation of report request messages for said one or more network management resources via said integrated interface;

providing a report viewer application enabling display of reports in accordance with customer-entitled reporting options;

accessing report items from said database of inventory reports according to a received report request message;

generating a response message including a metadata description of reporting items to be included in said report, wherein customer-specific data from a network management resource and said metadata description of customer-selected reporting items are utilized to generate a completed report for presentation to said customer via said integrated interface;

providing a report scheduler system for initiating periodic generation of reports from network management resources at a customer-specified frequency, wherein at least one of said one or more network management resources includes a database for storing and maintaining customer specific report data to be reported to said customer, and, a centralized inbox server for receiving a report availability response from said report management server including a metadata description for displaying said report; and uploading said stored customer specific report data and the metadata description associated with the report data from said inbox server to said client workstation via said secure web server for generation and presentation of a customer report via said integrated interface.

35. The method as claimed in claim 34, wherein said inbox server stores a notification alert received from a network management resource that a generated report is available, said method including: launching an inbox client application from the backplane for receiving and presenting the notification alert to the customer via said integrated interface.

36. The method as claimed in claim 35, further comprising:

implementing a polling thread in said inbox client application for detecting an incoming message from the inbox server via a first secure connection; and starting a new thread upon detection of the incoming message, wherein the new thread starts and listens on a second secure connection for detecting new messages, while the polling thread receives the incoming message on a first secure connection.

37. The method as claimed in claim 36, further including:

defining a pre-defined directory in said inbox server and customer specific reporting data storage database, a pre-defined directory being associated with each of the one or more network management resources, each of the network management resources storing reporting data and the notification alert data to its respective pre-defined directory in the inbox server.

38. The method as claimed in claim 36, wherein at least one of said one or more network management resources provides a priced call detail data reporting process for providing customer specific data pertaining to usage of a customer's switched communications network, said priced call detail data reporting process comprising the steps of:

extracting call detail data records from billing systems generating priced call detail records specific to a customer's communications network, harvesting said extracted priced call detail records for storage in a database storage device; and implementing decision support server for receiving customer request messages for said priced call detail data, accessing said customer-specific priced call detail data from said database storage device, and transmitting said customer-specific priced call detail data to said inbox server in accordance with said customer request.

39. The method as claimed in claim 38, further comprising:

running a pre-defined report at a pre-determined frequency, said report scheduler system communicating a message to said decision support server to run said pre-defined report at said pre-determined frequency, each said pre-defined report being updated with recent customer-specific priced call detail data available at a run time.

40. The method as claimed in claim 36, wherein at least one of said one or more network management resources provides a near real-time unpriced call detail data reporting function for providing customer-specific unpriced call detail data pertaining to usage of a customer's switched communications network, said method comprising:

providing an unpriced call detail data reporting server for receiving customer request messages for their unpriced call detail data;

obtaining said customer specific unpriced call detail data; and, transmitting said customer-specific unpriced call detail data to said inbox server in accordance with said customer request.

41. The method as claimed in claim 40, wherein a reporting option includes running a customer-defined unpriced call detail data report at a pre-determined frequency, said report scheduler system communicating a message to said unpriced call detail data reporting server for obtaining recent customer-specific unpriced call detail data.

42. The method as claimed in claim 40, wherein at least one of said one or more network management resources comprises a system for generating statistical data based on real-time call data obtained from a circuit-switched communications network, said statistical data being generated according to said customer entitlements, said method comprising:

integrating retrieved statistical data within a Web-based GUI for presentation to said customer via said integrated interface, said Web-based GUI being updated to contain statistical data at customer-specified time intervals.

43. The method as claimed in claim 42, further including specifying one or more toll free numbers associated with a customer's communications network for which statistical data are to be generated.

44. The method as claimed in claim 42, further comprising: implementing a script mechanism for initiating update of said web-based GUI with most recent statistical data.

45. The method as claimed in claim 34, wherein at least one of said one or more network management resources comprises a communications network configuration device for maintaining an inventory of customer's network call routing plans and associated call routing plan details, and interfacing with a plurality of network control elements for configuring a customer's communications network according to a desired call routing plan; said method further comprising:

providing a network management server for receiving customer request messages for accessing said call routing plan details from said communications network configuration device;

retrieving said call routing plan details according to customer entitlements; and, downloading said call routing plan details for presentation to customers via said integrated interface.

46. The method as claimed in claim 45, further comprising:

generating a customer request message specifying customer modification of said call-routing plan, said network management server receiving said request messages via said integrated interface and translating said received modification request into commands for input to said network configuration device; and, forwarding said commands to said network control elements for configuring said customer's network according to said request.

47. The method as claimed in claim 46, wherein said customer request message includes a unique customer identifier enabling downloading of specific call routing plan details associated with said customer identifier.

48. The method as claimed in claim 45, further comprising:

generating a customer request message including an order for modifying an existing customer network call routing plan for a predetermined period of time, said network management server enabling said customer network to automatically revert to a corresponding call routing plan configured prior to invocation of said order at a customer-specified revert time.

49. The method as claimed in claim 45, further comprising:

generating a customer request message including an order for modifying a percent allocation of call traffic routed to a network number used in a particular call routing plan for a predetermined period of time, said network management server enabling said allocation of call traffic routed to a number to automatically revert to a corresponding percent allocation specified prior to invocation of said order at a customer-specified revert time.

50. The method as claimed in claim 45, at least one of said one or more network management resources comprises: a customer's switched data circuit network; and, a device for periodically polling network switches of said switched data circuit network to obtain network performance data relating thereto and temporarily storing said network performance data, said method further comprising:

providing a broadband network server for receiving customer request messages for reporting network performance data;

retrieving said network performance data from temporary storage according to customer entitlements; and, downloading said network performance data to said customer for presentation via said integrated interface.

51. The method as claimed in claim 50, further comprising:

enabling display of broadband network reports in accordance with selected customer reporting options, said customer reporting options including specification of graphical, tabular, and map views of said network performance data.

52. The method as claimed in claim 50, wherein said report viewer application includes supporting simultaneous multiple graph reporting views of specific broadband network performance data.

53. The method as claimed in claim 50, wherein said customer's switched data network generates alarm status indications, said broadband network server receiving said alarm status indications pertaining to said customer's network and communicating alarm status data to said client workstation via said integrated interface.

54. The method as claimed in claim 53, further comprising the step of generating customer request messages specifying network performance thresholds for enabling reporting of specific data network behavior via said integrated interface.

55. The method as claimed in claim 54, wherein said report viewer supports display of a graphical view comprising an area map view having indicators depicting locations of a customer's data network, said method including enabling said customer to select said indicators on said graphical representation and providing a textual view of network performance characteristics relating to physical circuits supported at said selected network location.

56. The method as claimed in claim 50, wherein said network management resource includes a system for providing an alarm management function including a device for deriving performance alarms based on performance statistics collected on the performance of a customer's data network; said method further comprising:

providing an event monitor server for receiving and storing the network performance statistics and the derived alarms from the deriving device, and communicating said network performance statistics and the derived alarms for presentation to said customer via said integrated interface.

57. The method as claimed in claim 56, further enabling customers to define and submit network performance thresholds specifying reporting of specific network behavior via said integrated interface, said event monitor server filtering said network alarms and performance statistics according to the customer-defined threshold for presentation to the customer at the client workstation.

58. The method as claimed in claim 57, further comprising define and entering troubleshooting procedures for specific alarms or circuits pertaining to the data network via the integrated interface.

59. The method as claimed in claim 58, providing a client application for enabling customers to acknowledge receipt of a network alarm, via said integrated interface, said event monitor server automatically launching a trouble shooting procedure upon acknowledgment of the alarm associated with the trouble shooting procedure.

60. The method as claimed in claim 34, wherein said network management resource further comprises a system for providing a circuit switched call center management function, said method further comprising:

downloading a client application from the secure web server for enabling a customer to monitor, define, and manipulate call routing parameters, the client application further formatting customer defined parameters into client message transactions and communicating the client message transactions to the secure server over the secure connection; and, providing a routing engine device for maintaining call routing rules and interfacing with said plurality of network control elements for directing call routing and receiving data statistics, the routing engine device further using the rules, the data statistics, and the customer defined parameters in determining where to route calls, whereby customer control of call routing via said integrated interface is enabled.

61. The method as claimed in claim 60, further comprising:

processing a plurality of transaction requests received from the client application via the secure server by opening a connection to the routing engine device; and, retrieving information relating to the transaction requests and forwarding back the information to the client application via the secure server; said client application presenting the information to the customer at the client workstation via said integrated interface.

62. The method as claimed in claim 61, further comprising:

providing one or more database(s) for storing the data statistics generated by the routing engine device and the plurality of network control elements, said one or more databases operating in conjunction with a proxy server for processing predetermined transaction requests locally by retrieving information related to the transaction requests from said one or more database(s), and forwarding the information to the client application.

63. The integrated system as claimed in claim 13, wherein said one or more network management resources includes a system for generating invoice documents relating to communications management services provided by a communications service enterprise, said integrated system further comprising:

a client application downloaded from the one or more secure web servers for enabling selection and presentation of invoice documents in accordance with customer entitlements, said client application further generating an invoice request message in response to customer selection of a specific invoice option and forwarding the invoice request message via the secure web server; and an invoice application server for maintaining a database of image files associated with invoice documents from the application service and receiving the invoice request messages, said invoice application assigning the database in response to a request message, generating a response message include a customer selected invoice document, and downloading said response message to said client workstation, whereby said customer selected invoice document is formatted in a manner suitable for display via said integrated client interface.

64. The integrated system as claimed in claim 63, wherein the database of image files further includes an object database, said invoice application server further comprising:

a means for imaging documents by defining key information necessary to retrieve documents from the communications application service and compress the documents for storing; and a means for loading the compressed documents into the object database.

65. The integrated system as claimed in claim 64, wherein the database of image files further includes an index database, said invoice application server further including index load process for storing index pointers pointing to the compressed documents into the index database.

66. The method as claimed in claim 34, wherein said one or more network management resources include a system for generating invoice documents relating to communications network manage services provided by said communications service enterprise, said method further comprising:

downloading a client application from the secure web server for enabling selection and presentation of invoice documents in accordance with customer entitlements;

generating customer request messages including customer selection of a specific invoice option;

providing an invoice application server for maintaining a database of image files associated with invoice documents from the application service, said invoice application server receiving the invoice request message from said customer;

accessing the database in response to a request message;

generating a response message including a customer selected invoice document;

downloading said response message to said client workstation; and, formatting said customer selected invoice document in a manner suitable for display via said integrated client interface.

67. The method as claimed in claim 66 wherein the database of image files further includes an object database, said invoice application server further:

converting invoice documents to images;

defining key information necessary to retrieve documents from the communications network management resource application service and compressing the documents for storing; and loading the compressed documents into the object database.

68. The method as claimed in claim 67, wherein the database of image files further includes an index database, said method further including storing index pointers for pointing to the compressed documents in the index database.

* * * * *

UNITED STATES PATENT AND TRADEMARK OFFICE

CERTIFICATE OF CORRECTION

PATENT NO. : 7,225,249 B1
APPLICATION NO. : 09/159695
DATED : May 29, 2007
INVENTOR(S) : B. Reilly Barry It is certified that error appears in the above-identified patent and that said Letters Patent is hereby corrected as shown below:

On the Title Page of the patent, section [75] Inventors, after “Ridgefield, CT (US)”, please insert --Carol Y. Devine, Colorado Springs, CO (US)--.

Signed and Sealed this

Sixteenth Day of October, 2007

JON W. DUDAS
*Director of the United States Patent and Trademark Office*